US011839831B2

(12) United States Patent
Osendorf et al.

(10) Patent No.: US 11,839,831 B2
(45) **Date of Patent: *Dec. 12, 2023**

(54) FILTER ASSEMBLIES; COMPONENTS AND FEATURES THEREOF; AND, METHODS OF USE AND ASSEMBLY

(71) Applicant: Donaldson Company, Inc., Minneapolis, MN (US)

(72) Inventors: Richard Osendorf, West St. Paul, MN (US); Joseph Einberger, Oakdale, MN (US); Daniel Adamek, Bloomington, MN (US)

(73) Assignee: Donaldson Company, Inc, Bloomington, MN (US)

( * ) Notice: Subject to any disclaimer, the term of this patent is extended or adjusted under 35 U.S.C. 154(b) by 270 days.

This patent is subject to a terminal disclaimer.

(21) Appl. No.: 17/098,537

(22) Filed: Nov. 16, 2020

(65) Prior Publication Data

US 2021/0069623 A1 Mar. 11, 2021

Related U.S. Application Data

(63) Continuation of application No. 16/371,572, filed on Apr. 1, 2019, now Pat. No. 10,835,850, which is a (Continued)

(51) Int. Cl.

| | |
|---|---|
| ***B01D 46/00*** | (2022.01) |
| ***B01D 46/52*** | (2006.01) |
| ***B01D 46/24*** | (2006.01) |

(52) U.S. Cl.
CPC ..... *B01D 46/0005* (2013.01); *B01D 46/2414* (2013.01); *B01D 46/521* (2013.01); (Continued)

(58) Field of Classification Search
CPC ........... B01D 46/0005; B01D 46/2411; B01D 46/2414; B01D 46/525; B01D 46/527; (Continued)

(56) References Cited

U.S. PATENT DOCUMENTS 4,365,980 A * 12/1982 Culbert ............. B01D 46/0004 55/315
4,410,427 A 10/1983 Wydeven
(Continued)

FOREIGN PATENT DOCUMENTS

EP 1 106 232 6/2001
EP 2 742 986 12/2013
(Continued)

OTHER PUBLICATIONS

U.S. Appl. No. 14/518,102, filed Oct. 20, 2014.
(Continued)

*Primary Examiner* — Robert Clemente
(74) *Attorney, Agent, or Firm* — Merchant & Gould P.C.

(57) ABSTRACT

Filter assemblies, components therefor, and features thereof are described. Also described are methods of assembly and use. In depicted examples, the air cleaner assemblies and components use advantageous housing seal features. Also, methods of assembly and use are described.

37 Claims, 234 Drawing Sheets

Related U.S. Application Data continuation of application No. 15/204,104, filed on Jul. 7, 2016, now Pat. No. 10,258,913, which is a continuation of application No. 14/266,560, filed on Apr. 30, 2014, now Pat. No. 9,387,425, which is a continuation-in-part of application No. 13/662,022, filed on Oct. 26, 2012, now Pat. No. 8,864,866.

(60) Provisional application No. 61/712,454, filed on Oct. 11, 2012, provisional application No. 61/565,114, filed on Nov. 30, 2011, provisional application No. 61/551,741, filed on Oct. 26, 2011.

(52) U.S. Cl.
CPC ...... *B01D 46/527* (2013.01); *B01D 2265/021* (2013.01); *B01D 2265/06* (2013.01); *B01D 2271/027* (2013.01)

(58) Field of Classification Search
CPC .......... B01D 2265/021; B01D 2265/06; B01D 46/521; B01D 46/523
See application file for complete search history.

(56) References Cited

U.S. PATENT DOCUMENTS

| | | | |
|---|---|---|---|
| 4,589,983 A | 5/1986 | Wydevan | |
| 4,720,292 A | 11/1988 | Engel et al. | |
| D326,706 S | 6/1992 | Karlsson | |
| 5,487,767 A | 1/1996 | Brown | |
| 5,613,992 A | 3/1997 | Engel et al. | |
| 5,730,769 A | 3/1998 | Dungs | |
| 5,772,883 A | 6/1998 | Rothman et al. | |
| D396,098 S | 7/1998 | Gillingham et al. | |
| 5,792,247 A | 8/1998 | Gillingham et al. | |
| D398,046 S | 9/1998 | Gillingham et al. | |
| D399,944 S | 10/1998 | Gillingham et al. | |
| 5,820,646 A | 10/1998 | Gillingham et al. | |
| 5,888,262 A * | 3/1999 | Kahler | B01D 29/07 55/497 |
| 5,893,937 A | 4/1999 | Moessinger | |
| 5,895,574 A | 4/1999 | Friedmann et al. | |
| 5,902,364 A | 5/1999 | Tokar et al. | |
| D417,268 S | 11/1999 | Gillingham et al. | |
| 6,039,778 A | 3/2000 | Coulonvaux et al. | |
| D425,189 S | 5/2000 | Gillingham | |
| D428,128 S | 7/2000 | Gillingham et al. | |
| 6,179,890 B1 | 1/2001 | Ramos et al. | |
| D437,401 S | 2/2001 | Ramos et al. | |
| D437,402 S | 2/2001 | Gieseke et al. | |
| 6,190,432 B1 | 2/2001 | Gieseke et al. | |
| 6,210,469 B1 | 4/2001 | Tokar et al. | |
| 6,221,122 B1 | 4/2001 | Gieseke et al. | |
| 6,235,195 B1 | 5/2001 | Tokar | |
| D444,219 S | 6/2001 | Gieseke et al. | |
| D447,549 S | 9/2001 | Gieseke et al. | |
| D450,827 S | 11/2001 | Gieseke et al. | |
| D450,828 S | 11/2001 | Tokar | |
| 6,348,084 B1 | 2/2002 | Gieseke et al. | |
| 6,348,085 B1 | 2/2002 | Tokar et al. | |
| 6,350,291 B1 | 2/2002 | Gieseke et al. | |
| 6,350,296 B1 | 2/2002 | Warner | |
| 6,368,374 B1 | 4/2002 | Tokar et al. | |
| 6,387,162 B1 | 5/2002 | Kosmider et al. | |
| D460,169 S | 7/2002 | Anderson et al. | |
| D461,003 S | 7/2002 | Gieseke et al. | |
| 6,416,605 B1 | 7/2002 | Golden | |
| D464,129 S | 10/2002 | Xu et al. | |
| 6,482,247 B2 | 11/2002 | Jaroszczyk et al. | |
| 6,517,598 B2 | 2/2003 | Anderson et al. | |
| D471,623 S | 3/2003 | Gieseke et al. | |
| D473,637 S | 4/2003 | Golden | |
| 6,572,667 B1 | 6/2003 | Grief et al. | |
| D477,659 S | 7/2003 | Gieseke et al. | |
| 6,599,342 B2 | 7/2003 | Andress et al. | |
| 6,610,126 B2 | 8/2003 | Xu et al. | |
| D481,101 S | 10/2003 | Gieseke et al. | |
| 6,652,614 B2 | 11/2003 | Gieseke et al. | |
| D483,459 S | 12/2003 | Dewit et al. | |
| D484,584 S | 12/2003 | Anderson et al. | |
| 6,673,136 B2 | 1/2004 | Gillingham et al. | |
| 6,706,087 B1 | 3/2004 | Gebler et al. | |
| 6,743,317 B2 | 6/2004 | Wydeven | |
| D497,202 S | 10/2004 | Stavos et al. | |
| 6,852,141 B2 | 2/2005 | Bishop et al. | |
| D506,539 S | 6/2005 | Bishop et al. | |
| 6,936,084 B2 | 8/2005 | Schlensker et al. | |
| 6,966,940 B2 | 11/2005 | Krisko et al. | |
| 7,004,986 B2 | 2/2006 | Kopec et al. | |
| D520,619 S | 5/2006 | Kuempel et al. | |
| 7,070,642 B2 | 7/2006 | Scott et al. | |
| 7,090,708 B2 | 8/2006 | Winter | |
| 7,115,156 B2 | 10/2006 | Schaerlund et al. | |
| 7,282,075 B2 | 10/2007 | Spone et al. | |
| 7,329,326 B2 | 2/2008 | Wagner et al. | |
| 7,351,270 B2 | 4/2008 | Olson et al. | |
| 7,364,601 B2 | 4/2008 | Xu et al. | |
| 7,396,375 B2 | 7/2008 | Kuempel et al. | |
| 7,396,376 B2 | 7/2008 | Schrage et al. | |
| 7,488,365 B2 | 2/2009 | Golden et al. | |
| 7,520,913 B2 | 4/2009 | Mills et al. | |
| 7,524,349 B2 | 4/2009 | Schrage et al. | |
| 7,537,631 B2 | 5/2009 | Scott et al. | |
| 7,569,090 B2 | 8/2009 | Nelson | |
| D600,790 S | 9/2009 | Nelson et al. | |
| 7,625,419 B2 | 12/2009 | Nelson et al. | |
| 7,655,074 B2 | 2/2010 | Nepsund et al. | |
| 7,674,308 B2 | 3/2010 | Krisko et al. | |
| 7,682,416 B2 | 3/2010 | Engelland et al. | |
| 7,713,321 B2 | 5/2010 | Kuempel et al. | |
| RE42,174 E | 3/2011 | Gunderson et al. | |
| D635,233 S | 3/2011 | Nelson | |
| 7,905,936 B2 | 3/2011 | Olson et al. | |
| 7,967,886 B2 | 6/2011 | Schrage et al. | |
| 7,972,404 B2 | 7/2011 | Kuempel et al. | |
| 7,972,405 B2 | 7/2011 | Engelland et al. | |
| 7,981,183 B2 | 7/2011 | Nepsund et al. | |
| 7,997,425 B2 | 8/2011 | Golden et al. | |
| 8,016,903 B2 | 9/2011 | Nelson et al. | |
| 8,034,145 B2 | 10/2011 | Boehrs et al. | |
| 8,038,756 B2 | 10/2011 | Iddings et al. | |
| 8,048,188 B2 | 11/2011 | Engelland et al. | |
| 8,066,791 B2 | 11/2011 | Baseotto et al. | |
| 8,128,724 B2 | 3/2012 | Mills et al. | |
| 8,142,533 B2 | 3/2012 | Gillenberg et al. | |
| 8,147,576 B2 | 4/2012 | Gillenberg et al. | |
| 8,152,876 B2 | 4/2012 | Gillenberg et al. | |
| 8,163,056 B2 | 4/2012 | Coulonvaux et al. | |
| 8,167,142 B2 | 5/2012 | Hacker | |
| 8,182,569 B2 | 5/2012 | Casey et al. | |
| 8,216,334 B2 | 7/2012 | Nelson et al. | |
| 8,216,335 B2 | 7/2012 | Scott et al. | |
| 8,226,786 B2 | 7/2012 | Schrage et al. | |
| 8,273,143 B2 | 9/2012 | Coulonvaux et al. | |
| 8,277,532 B2 | 10/2012 | Reichter et al. | |
| 8,287,612 B2 | 10/2012 | Gillenberg et al. | |
| 8,292,983 B2 | 10/2012 | Reichter et al. | |
| 8,292,984 B2 | 10/2012 | Baseotto et al. | |
| 8,328,897 B2 | 12/2012 | Nelson et al. | |
| 8,357,219 B2 | 1/2013 | Boehrs et al. | |
| 8,361,181 B2 | 1/2013 | Osendorf et al. | |
| 8,414,675 B2 | 4/2013 | Iddings et al. | |
| 8,493,723 B2 | 7/2013 | Reichter et al. | |
| 8,557,007 B2 | 10/2013 | Read | |
| 8,591,621 B2 | 11/2013 | Ruhland et al. | |
| 8,663,355 B2 | 3/2014 | Nelson et al. | |
| 8,741,017 B2 | 6/2014 | Nelson | |
| 8,747,512 B2 | 6/2014 | Mills et al. | |
| 8,808,417 B2 | 8/2014 | Engelland et al. | |
| 8,814,973 B2 | 8/2014 | Baseotto et al. | |
| 8,840,699 B2 | 9/2014 | Bruce et al. | |
| 8,864,866 B2 * | 10/2014 | Osendorf | B01D 46/2414 55/498 |

(56) References Cited

U.S. PATENT DOCUMENTS

| | | | |
|---|---|---|---|
| 8,920,530 B2 | 12/2014 | Ruhland et al. | |
| 9,217,399 B2 | 12/2015 | Engelland et al. | |
| 9,254,457 B2 | 2/2016 | Kaufmann et al. | |
| 9,387,425 B2 * | 7/2016 | Osendorf | B01D 46/521 |
| 9,610,529 B2 | 4/2017 | Mills et al. | |
| 9,636,615 B2 | 5/2017 | Osendorf et al. | |
| 9,718,019 B2 | 8/2017 | Baseotto et al. | |
| 10,258,913 B2 | 4/2019 | Osendorf et al. | |
| 10,279,302 B2 | 5/2019 | Mills et al. | |
| 10,413,855 B2 | 9/2019 | Nelson et al. | |
| 10,576,403 B2 | 3/2020 | Osendorf et al. | |
| 10,653,991 B2 | 5/2020 | Mills et al. | |
| 10,710,017 B2 | 7/2020 | Baseotto et al. | |
| 10,758,859 B2 | 9/2020 | Gieseke et al. | |
| 10,835,850 B2 | 11/2020 | Osendorf et al. | |
| 11,311,829 B2 | 4/2022 | Nelson et al. | |
| 11,331,609 B2 | 5/2022 | Osendorf et al. | |
| 11,420,147 B2 | 8/2022 | Gieseke et al. | |
| 2002/0096247 A1 | 7/2002 | Wydeven et al. | |
| 2003/0146149 A1 | 8/2003 | Binder et al. | |
| 2004/0035097 A1 | 2/2004 | Schlensker et al. | |
| 2005/0166561 A1 | 8/2005 | Schrage et al. | |
| 2005/0252848 A1 | 11/2005 | Miller | |
| 2007/0039296 A1 | 2/2007 | Schrage et al. | |
| 2007/0235384 A1 | 10/2007 | Oku et al. | |
| 2008/0041026 A1 | 2/2008 | Engel et al. | |
| 2008/0110142 A1 | 5/2008 | Nelson et al. | |
| 2008/0115758 A1 | 5/2008 | Engelland et al. | |
| 2008/0190082 A1 | 8/2008 | Scott et al. | |
| 2008/0307759 A1 | 12/2008 | Reichter et al. | |
| 2009/0064646 A1 | 3/2009 | Reichter et al. | |
| 2009/0094951 A1 | 4/2009 | Baseotto et al. | |
| 2009/0100813 A1 | 4/2009 | Iddings et al. | |
| 2009/0151311 A1 | 6/2009 | Reichter et al. | |
| 2009/0211450 A1 | 8/2009 | Mosset et al. | |
| 2009/0217632 A1 | 9/2009 | Coulonvaux et al. | |
| 2009/0301045 A1 | 12/2009 | Nelson et al. | |
| 2010/0032365 A1 | 2/2010 | Moe et al. | |
| 2010/0043366 A1 | 2/2010 | Boehrs et al. | |
| 2010/0044295 A1 | 2/2010 | Campbell | |
| 2010/0146917 A1 | 6/2010 | Coulonvaux et al. | |
| 2010/0146919 A1 | 6/2010 | Nelson | |
| 2010/0146920 A1 | 6/2010 | Iddings et al. | |
| 2010/0293906 A1 | 11/2010 | Flagstad et al. | |
| 2011/0017657 A1 | 1/2011 | Jokschas et al. | |
| 2011/0094197 A1 | 4/2011 | Ruhland et al. | |
| 2011/0173937 A1 | 7/2011 | Nelson | |
| 2011/0232244 A1 | 9/2011 | Schrage et al. | |
| 2011/0247582 A1 | 10/2011 | Blossey et al. | |
| 2011/0308212 A1 | 12/2011 | Ruhland et al. | |
| 2013/0263744 A1 | 10/2013 | Osendorf et al. | |
| 2014/0102058 A1 | 4/2014 | Kaufmann et al. | |
| 2015/0101299 A1 | 4/2015 | Osendorf et al. | |
| 2019/0046915 A1 | 2/2019 | Gieseke et al. | |

FOREIGN PATENT DOCUMENTS

| | | |
|---|---|---|
| FR | 2 214 505 | 1/1973 |
| JP | 2004-136203 | 5/2004 |
| WO | WO 2004/071616 | 8/2004 |
| WO | WO 2005/079954 | 9/2005 |
| WO | WO 2007/044677 | 4/2007 |
| WO | WO 2014/194275 | 12/2014 |

OTHER PUBLICATIONS

Pending claims of U.S. Appl. No. 16/744,360 dated Jan. 5, 2021.
Pending claims of U.S. Appl. No. 16/918,790 dated Jan. 5, 2021.
Pending claims of U.S. Appl. No. 16/570,550 dated Jan. 5, 2021.
Pending claims of U.S. Appl. No. 16/942,327 dated Jan. 5, 2021.
Comparative Document of U.S. Appl. No. 15/204,104 (U.S. Pat. No. 8,864,866) and U.S. Appl. No. 15/204,104 dated Jan. 5, 2021.
Pending claims of U.S. Appl. No. 17/734,598 dated Nov. 21, 2022.
Allowed claims of U.S. Appl. No. 16/918,790 dated Nov. 21, 2022.
Pending claims of U.S. Appl. No. 17/699,664 dated Nov. 21, 2022.
Pending claims of U.S. Appl. No. 17/863,883 dated Nov. 21, 2022.
Pending claims of U.S. Appl. No. 17/980,712 dated Nov. 21, 2022.

* cited by examiner

FILTER ASSEMBLIES; COMPONENTS AND FEATURES THEREOF; AND, METHODS OF USE AND ASSEMBLY

CROSS-REFERENCE TO RELATED APPLICATIONS

The present application is a continuation of U.S. Ser. No. 16/371,572, filed Apr. 1, 2019. U.S. Ser. No. 16/371,572 is a continuation of U.S. Ser. No. 15/204,104, filed Jul. 7, 2016, now U.S. Pat. No. 10,258,913. U.S. Ser. No. 15/204,104 is a continuation of U.S. Ser. No. 14/266,560, filed Apr. 30, 2014, now U.S. Pat. No. 9,387,425 on Jul. 12, 2016. U.S. Ser. No. 14/266,560 was filed as a continuation-in-part of U.S. Ser. No. 13/662,022, filed Oct. 26, 2012, now U.S. Pat. No. 8,864,866. The present application, and U.S. Ser. No. 13/662,002 include the disclosures of, with edits, U.S. Provisional 61/712,454, filed Oct. 11, 2012; U.S. 61/565,114, filed Nov. 30, 2011; and, U.S. provisional 61/551,741, filed Oct. 26, 2011. The complete disclosures of the above referenced applications are incorporated herein by reference. A claim of priority is made to each of the above referenced application to the extent appropriate.

FIELD OF THE DISCLOSURE

The present disclosure relates to filter assemblies, for example air cleaner assemblies, and components and features thereof, and methods of assembly and use. The filter assemblies comprise a housing having a removable and replaceable filter cartridge therein. The filter cartridge is optionally configured with a housing seal arrangement, to advantage. Various features of filter housings and/or the cartridges are described, which can provide for advantage. Methods of assembly and use are described. An optional, advantageous, resonator/sonic choke arrangement is described.

BACKGROUND

Air or other gas filtering is desirable in a number of systems. A typical application is in the filtration of intake air to internal combustion engines. Another is in the filtration of crankcase ventilation filter assemblies. Typically, such systems comprise filter assemblies having a serviceable filter cartridge therein. After a period of use, filter media within a filter housing requires servicing, either through cleaning or complete replacement. Typically, for an air cleaner or crankcase ventilation filter assembly used with an internal combustion engine, for example on a vehicle, the filter media is contained in a removable and replaceable, i.e. serviceable, component, typically referred as a filter element or cartridge. The filter cartridge is configured to be removably sealed within the air cleaner, in use.

Improvements in filter arrangements relating to assembly, serviceability, use are desirable.

SUMMARY

Filter assemblies (such as air cleaner assemblies or crankcase ventilation filter assemblies) components therefor; and, features thereof are described. Also described are methods of assembly and use. The filter assemblies generally comprise a housing having a filter cartridge removably positioned therein. An example filter cartridge is depicted which has a housing seal surface comprising a radially directed surface having a plurality of radially outwardly projecting sections spaced, for example, by radially inwardly projecting sections.

In certain example arrangements depicted, the housing optionally includes a joint, with a portion thereof located between two housing seals positioned on the cartridge, to advantage.

Selected principles of the present application can be applied in filter cartridges which do not include two housing seals, but rather which include a single advantageous housing seal. In an example arrangement, a radially directed seal surface comprises a plurality of spaced lobes, or outwardly projecting (for example convex) sections, for example separated by optional non-straight sections, such as, for example, opposite inwardly projecting (for example concave) sections.

In certain example depicted, a radially directed surface is provided that is generally circular for a housing seal.

Certain applications of techniques described herein, filter cartridges are provided which include two housing seals thereon, which are each generally radially directed but which differ in outer perimeter size, typically one being substantially larger than the other. With such applications, both seals may be circular, alternatives are possible as discussed and shown.

There is no specific requirement that an air cleaner assembly, component therefor, or feature thereof include all of the detail characterized herein, to obtain some advantage according to the present disclosure.

BRIEF DESCRIPTION OF THE DRAWINGS

in FIG. 33, certain molded-in-place portions on an end cap of the cartridge not being shown so that internal structural detail is viewable.

in FIG. 33A, line 33-33 indicating the cross-section of FIG. 33.

FIG. 94 is a schematic fragmentary perspective view of the support structure of FIG. 93.

FIG. 95 is a second schematic fragmentary perspective view of the support structure of FIGS. 93 and 94.

FIG. 96 is a schematic perspective exploded view of an additional support structure variation usable in a cartridge according to the present disclosure.

FIG. 97 is a side elevational of the support structure variation of FIG. 96.

FIG. 98 is a schematic perspective view of the support structure variation of FIG. 97.

FIG. 99 is a schematic end view of the support structure variation of FIG. 98.

FIG. 100 is a schematic cross-sectional view of the support structure variation of FIG. 98.

FIG. 101 is an enlarged fragmentary view of the selected portion of FIG. 100.

FIG. 102 is an enlarged schematic perspective view of an alternate filter cartridge according to the present disclosure.

FIG. 103 is a schematic view of a step of assembling media for use in the cartridge of FIG. 90.

FIG. 104 is a schematic perspective view of a filter cartridge in accord with yet a further alternate application of the principles according to the present disclosure.

FIG. 105 is a schematic plan view of a filter cartridge depicted in FIG. 104.

Figure 106:
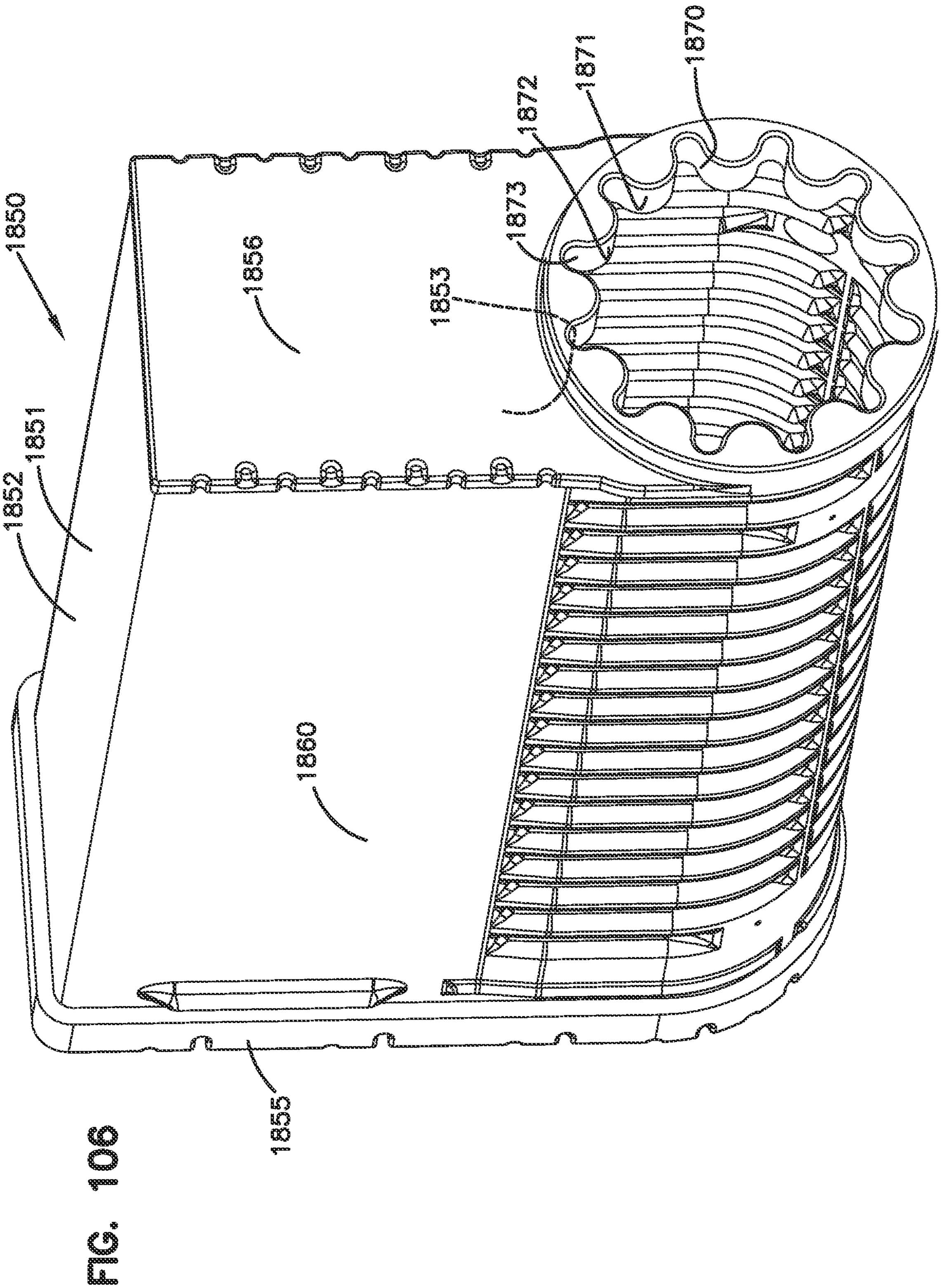

FIG. 106 is a schematic perspective view of a further variation in the filter cartridge applying selected principles according to the present disclosure.

Figure 107:
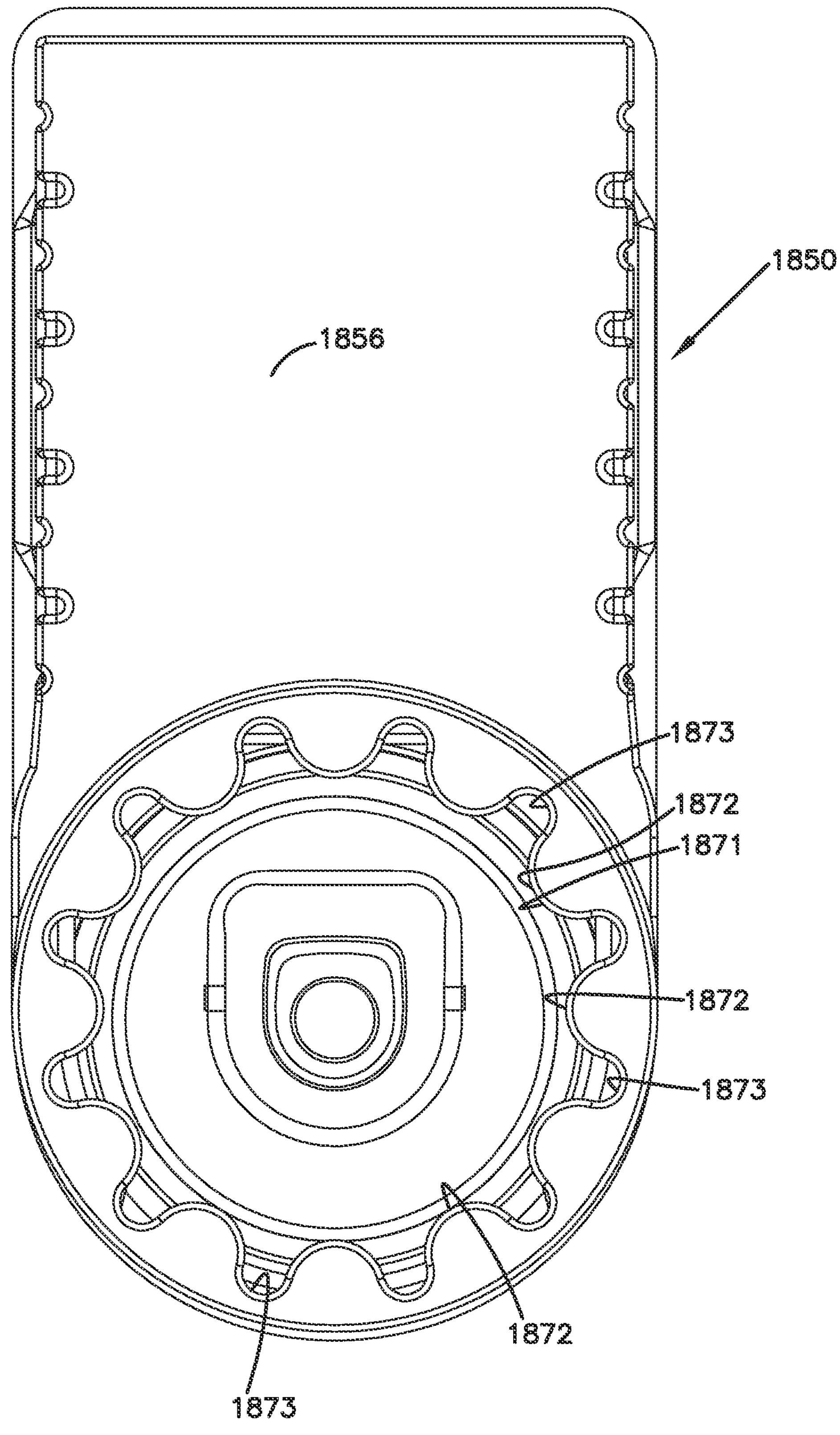

FIG. 107 is a side elevational view of the filter cartridge depicted in FIG. 106.

Figure 108:
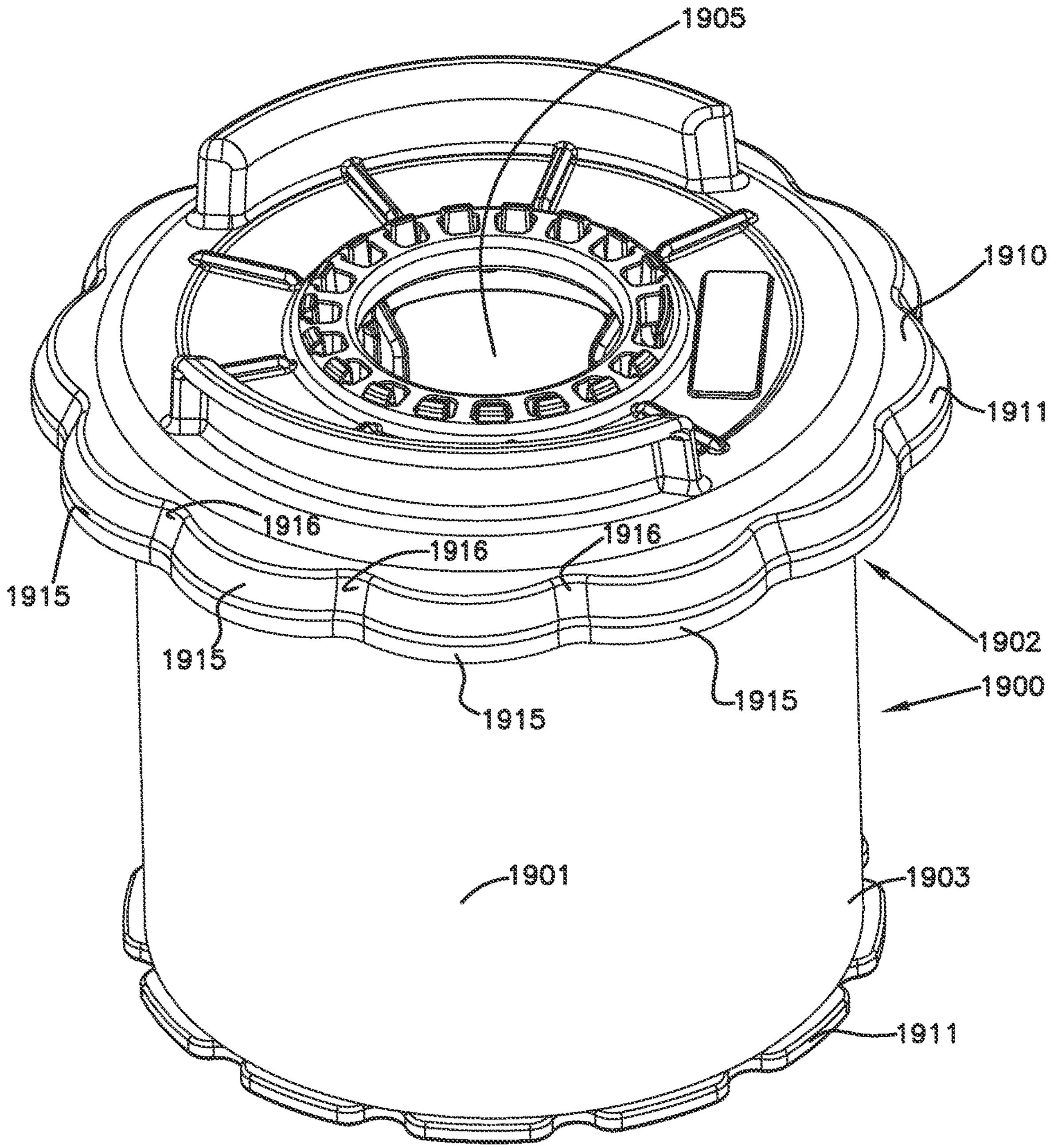

FIG. 108 is a schematic perspective view of a filter cartridge for use in a crankcase ventilation filtering, in an application of principles according to the present disclosure.

Figure 109:
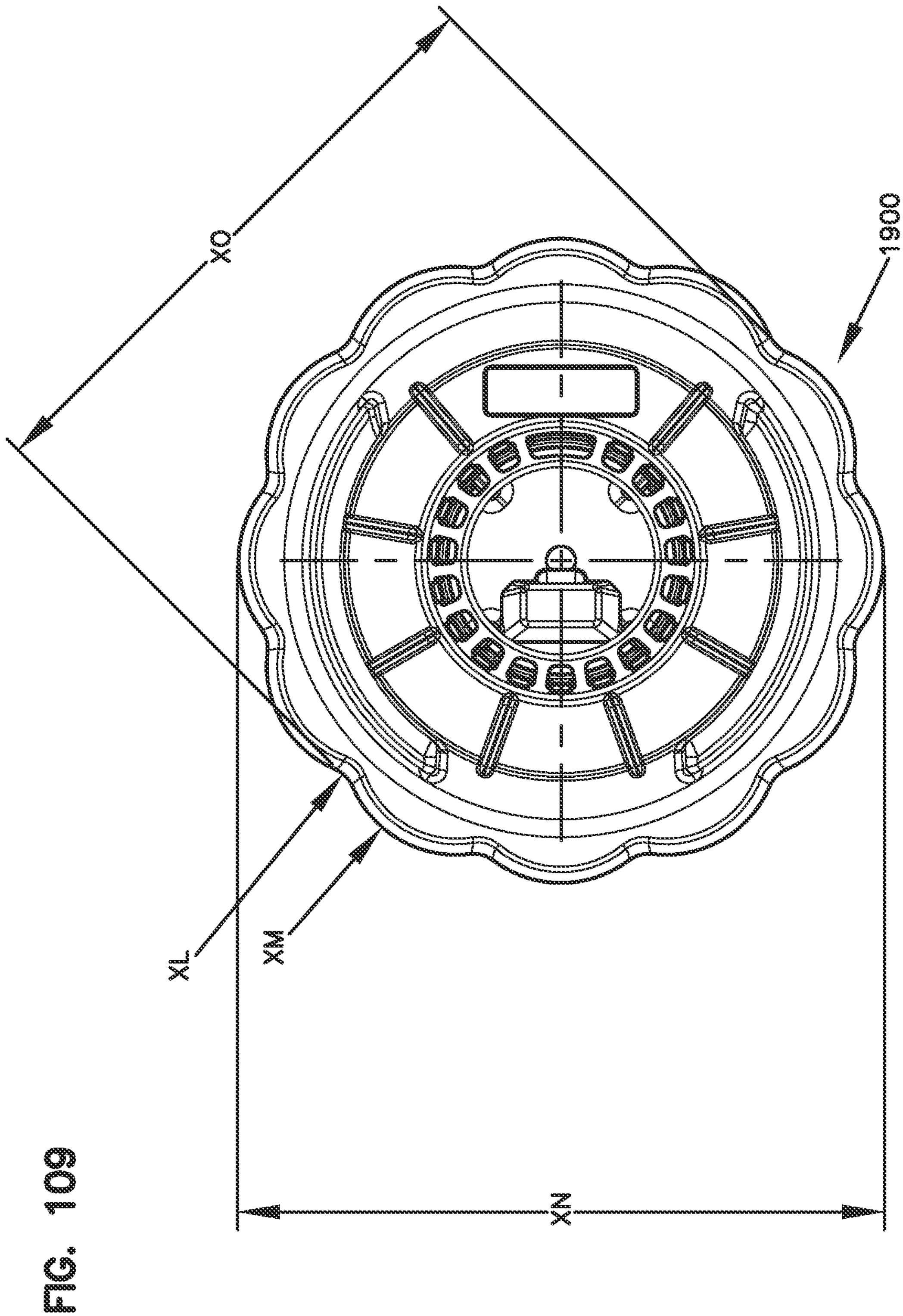

FIG. 109 is a schematic plan view of a filter cartridge of FIG. 108.

Figure 110:
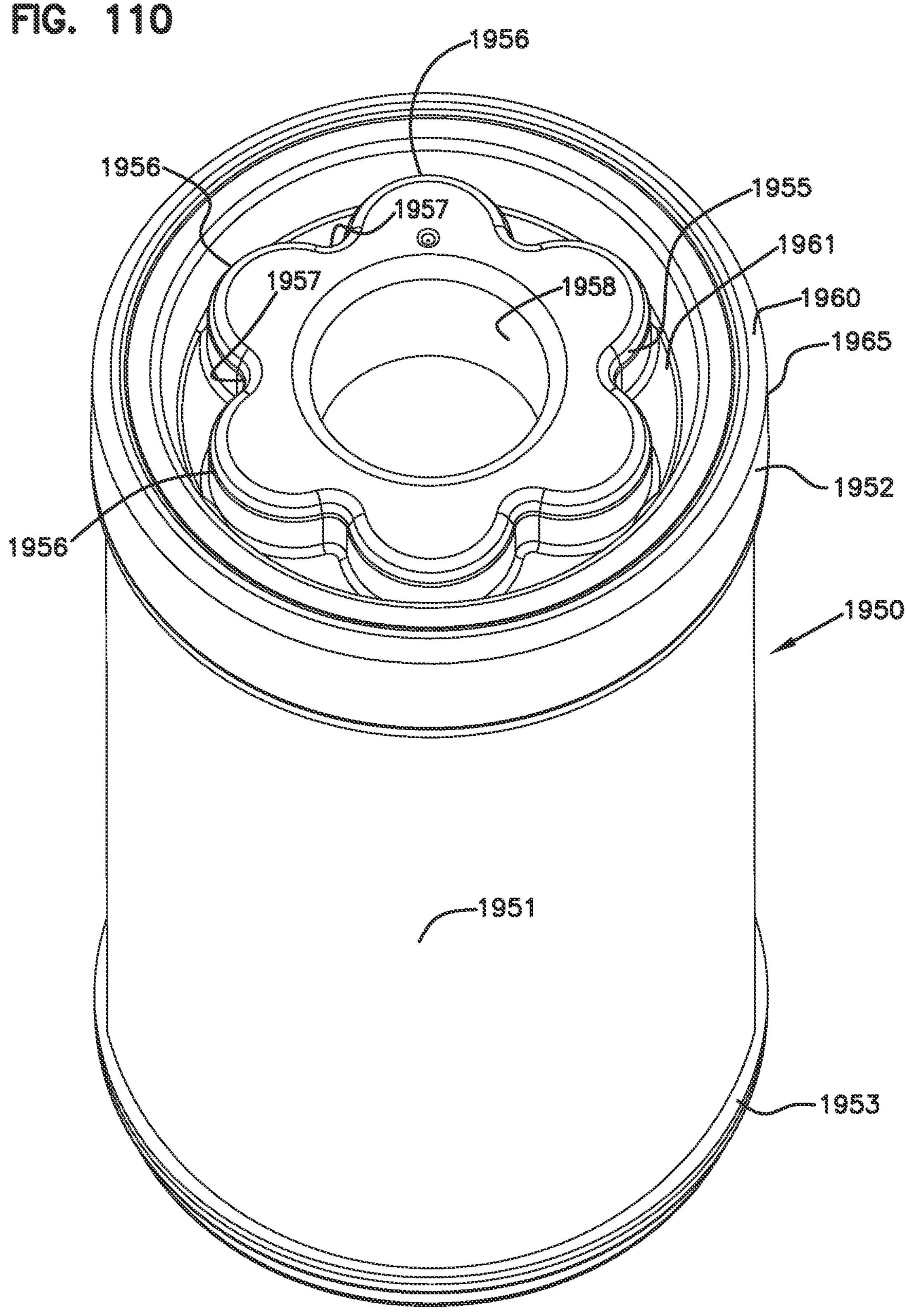

FIG. 110 is a schematic perspective view of a second filter cartridge for use in crankcase ventilation filtering, with application of the principles according to the present disclosure.

Figure 111:
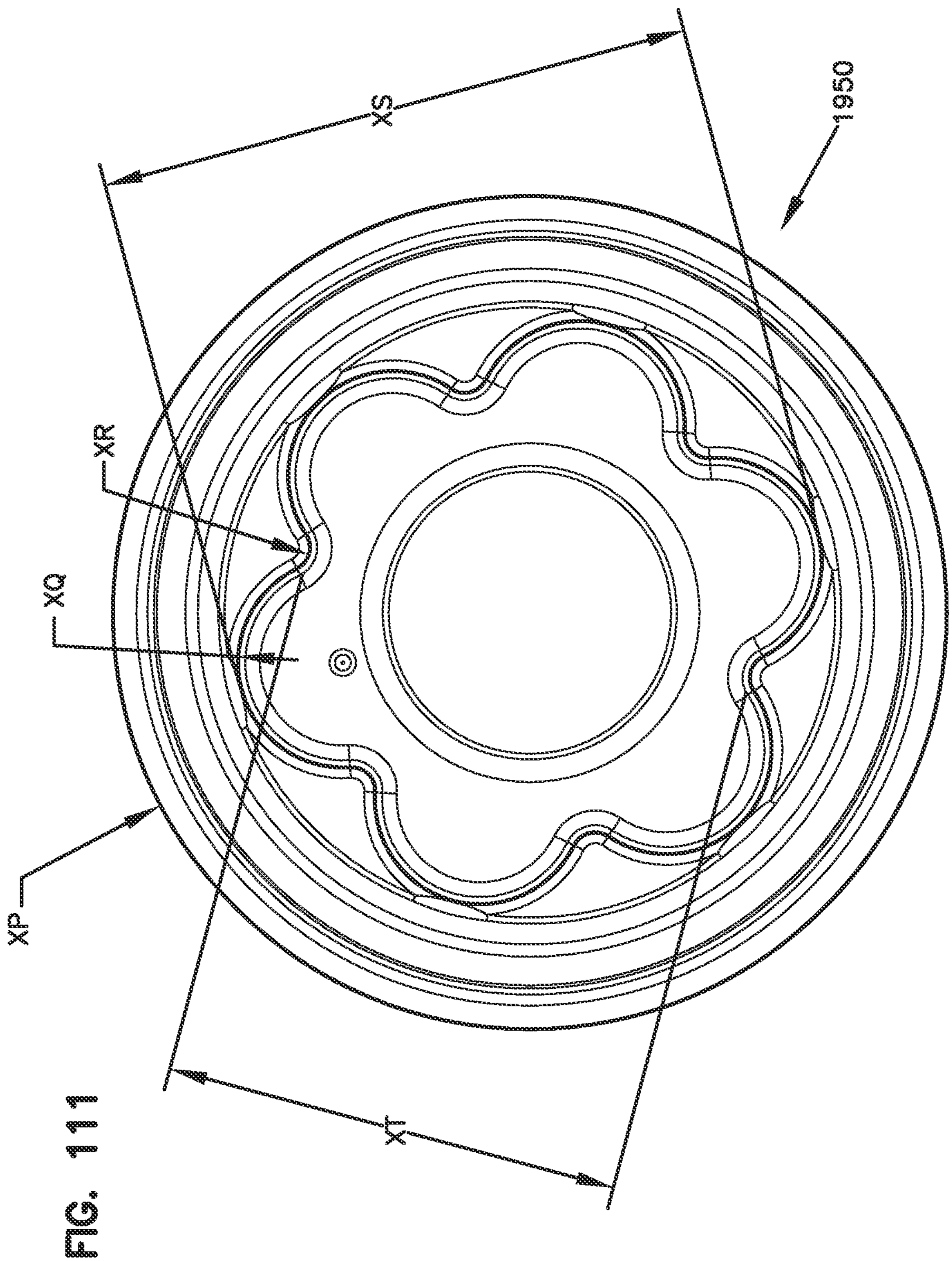

FIG. 111 is a schematic plan view of the filter cartridge depicted in FIG. 110.

Figure 112:
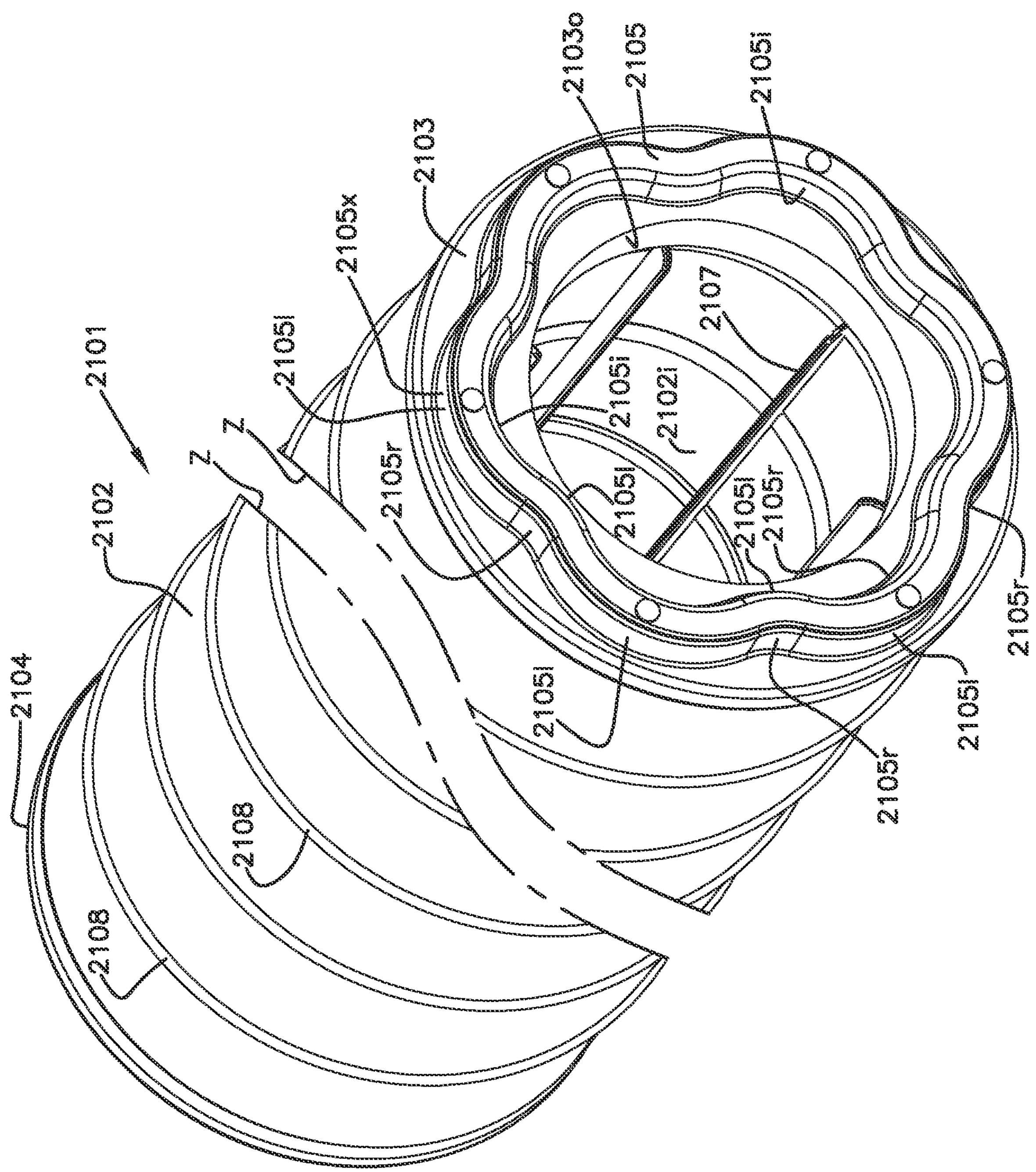

FIG. 112 is a schematic open end perspective view of a filter cartridge usable in an assembly according to, and in accordance with the principles of, the present disclosure; in FIG. 112, phantom or break lines being used to indicate a length variable.

Figure 112A:
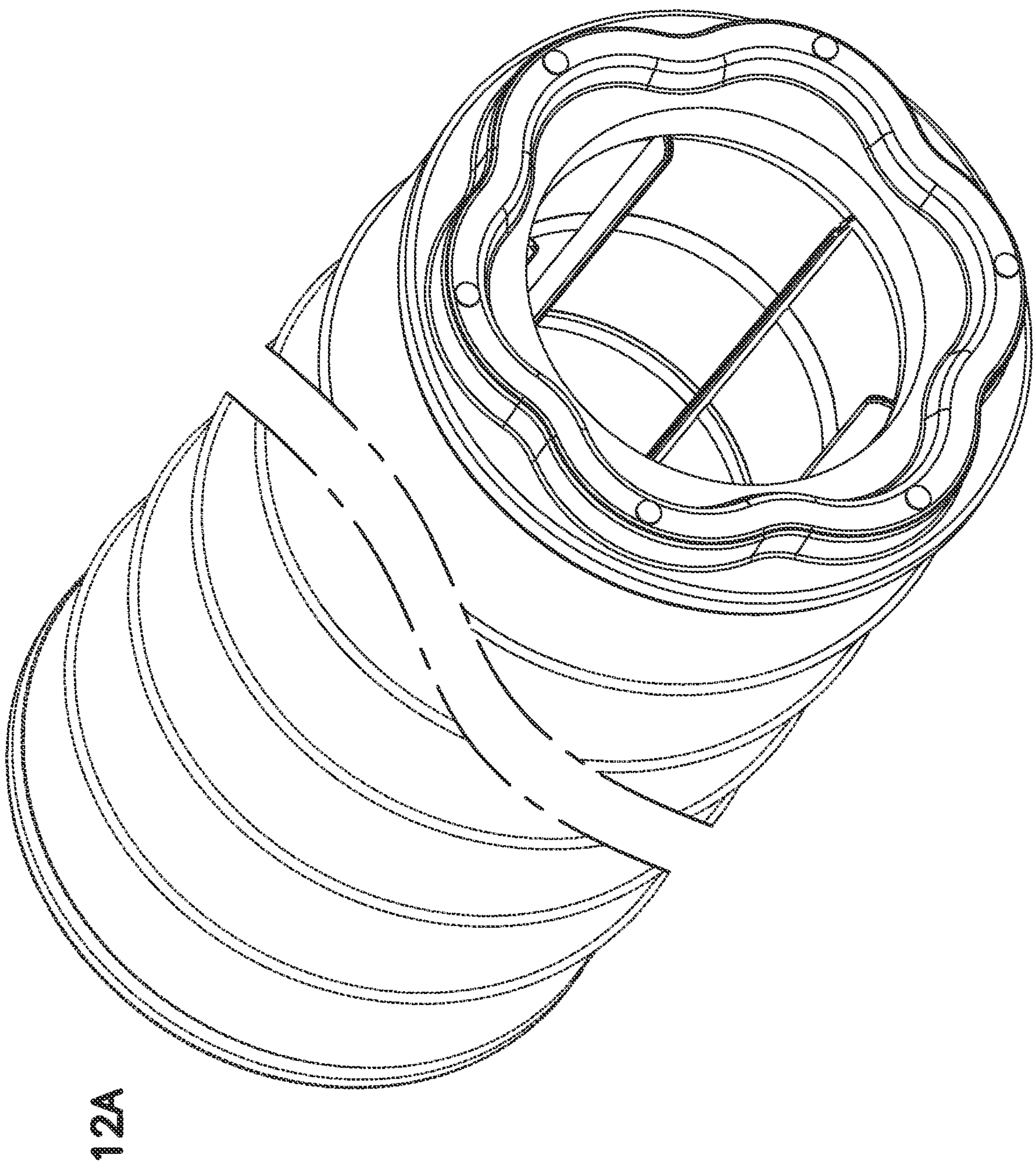

FIG. 112A is a first variation analogous to FIG. 112, with selected portions shown in phantom.

Figure 112B:
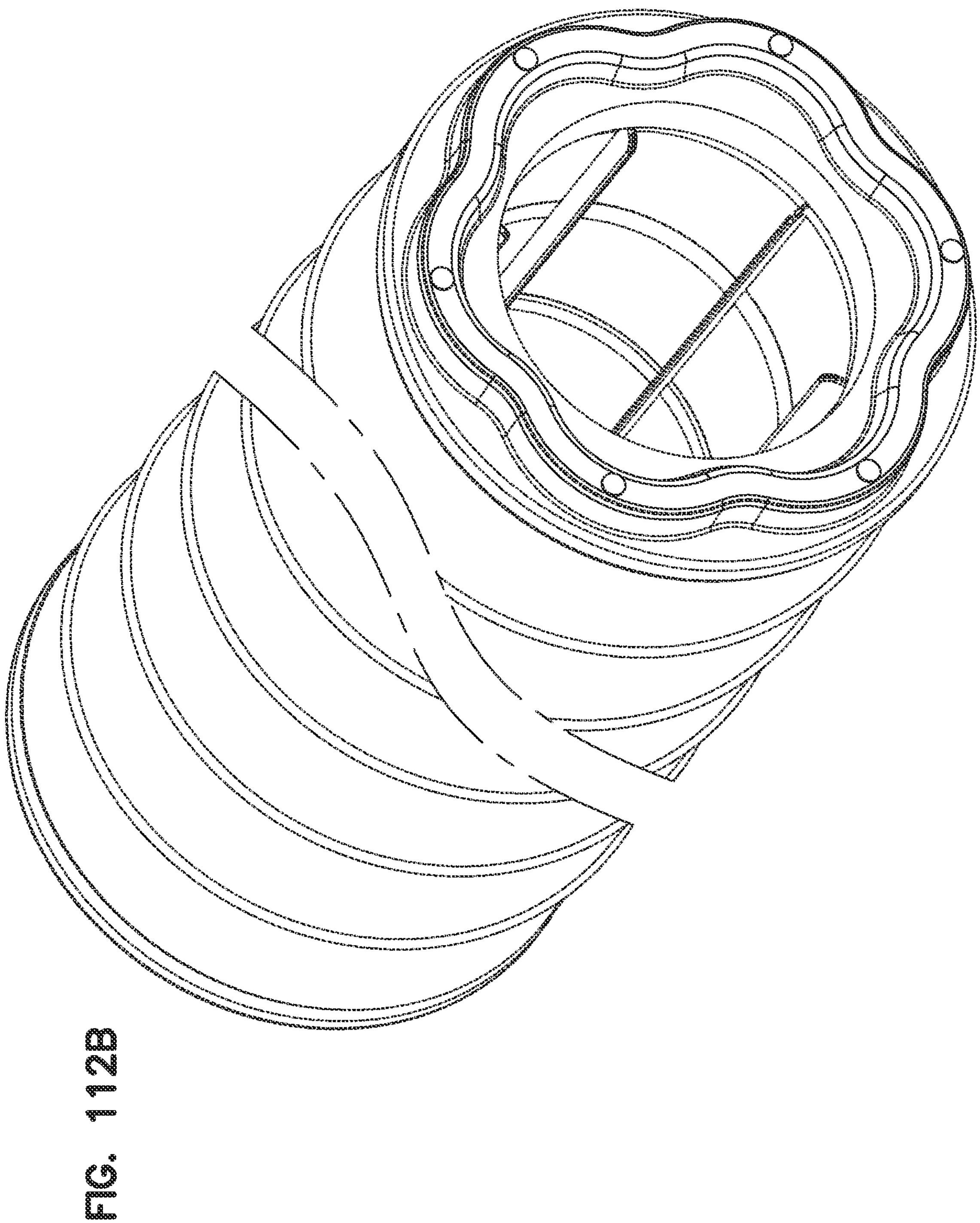

FIG. 112B is a second variation analogous to FIG. 112, with further portions shown in phantom.

Figure 113:
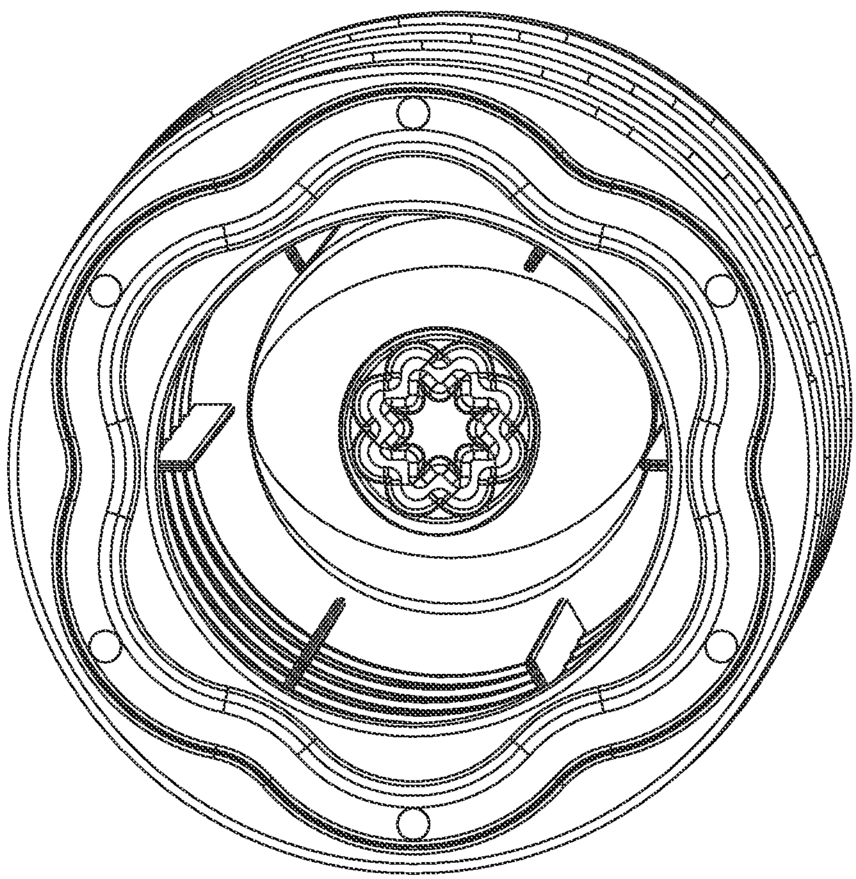
Figure 114:
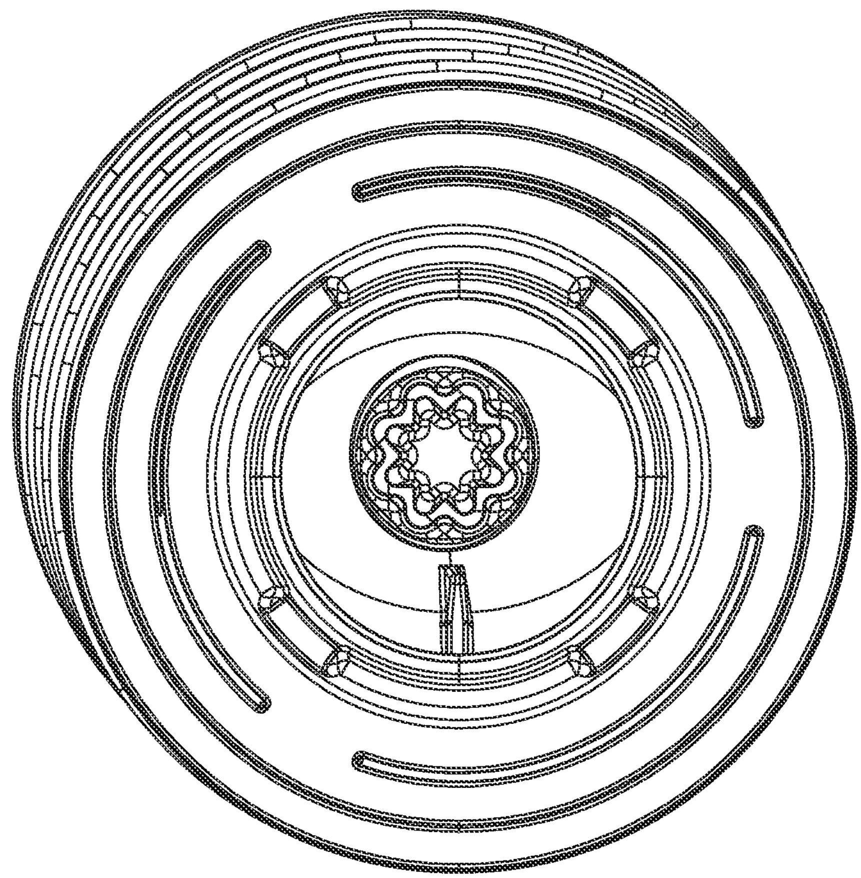

FIG. 113 is a schematic open end plan view of the filter cartridge depicted in FIG. 114.

Figure 113A:
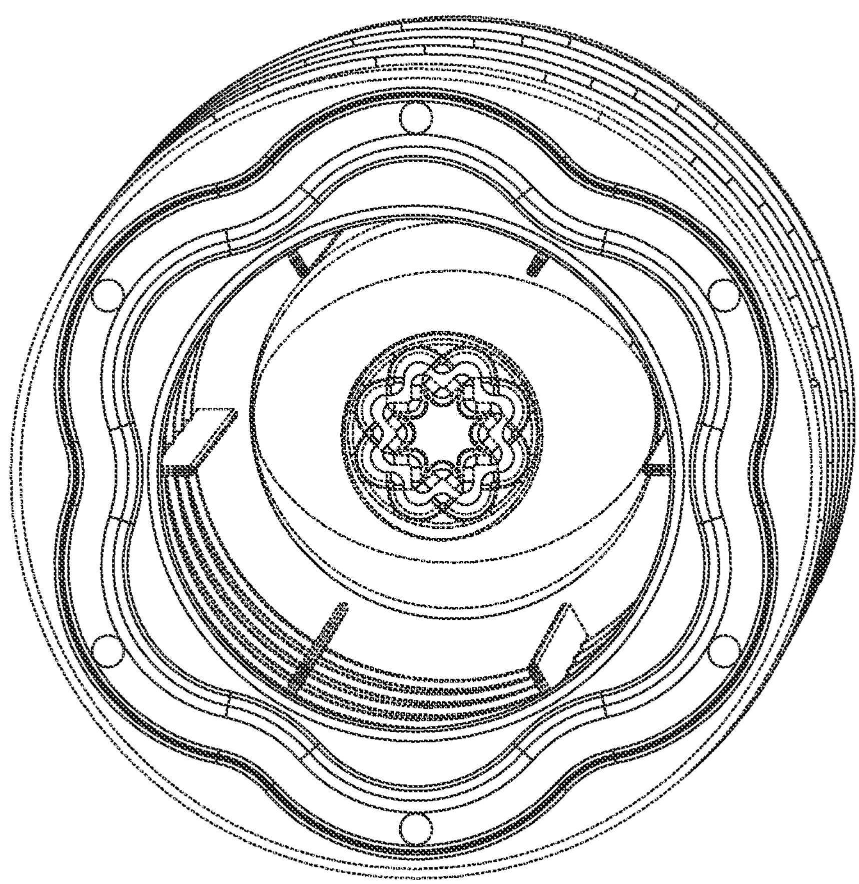

FIG. 113A is a schematic open end plan view of the filter cartridge shown in FIG. 112A.

Figure 113B:
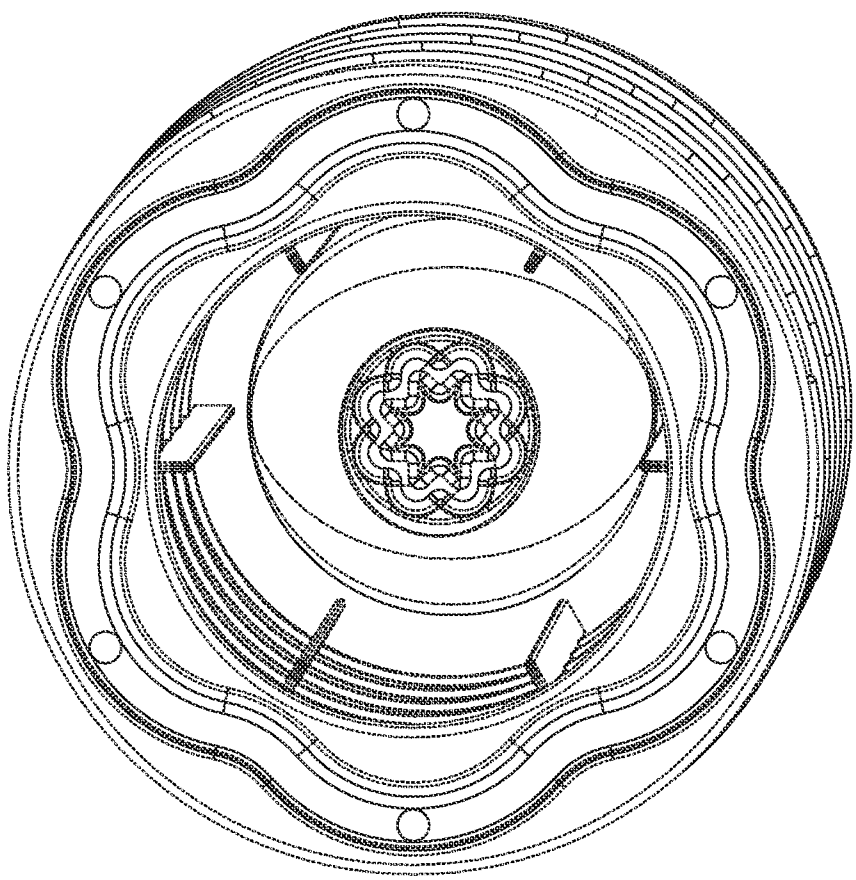

FIG. 113B is a schematic open end plan view of the filter cartridge shown in FIG. 112B.

FIG. 114 is a schematic closed end plan view of the filter cartridge depicted in FIG. 114.

Figure 114A:
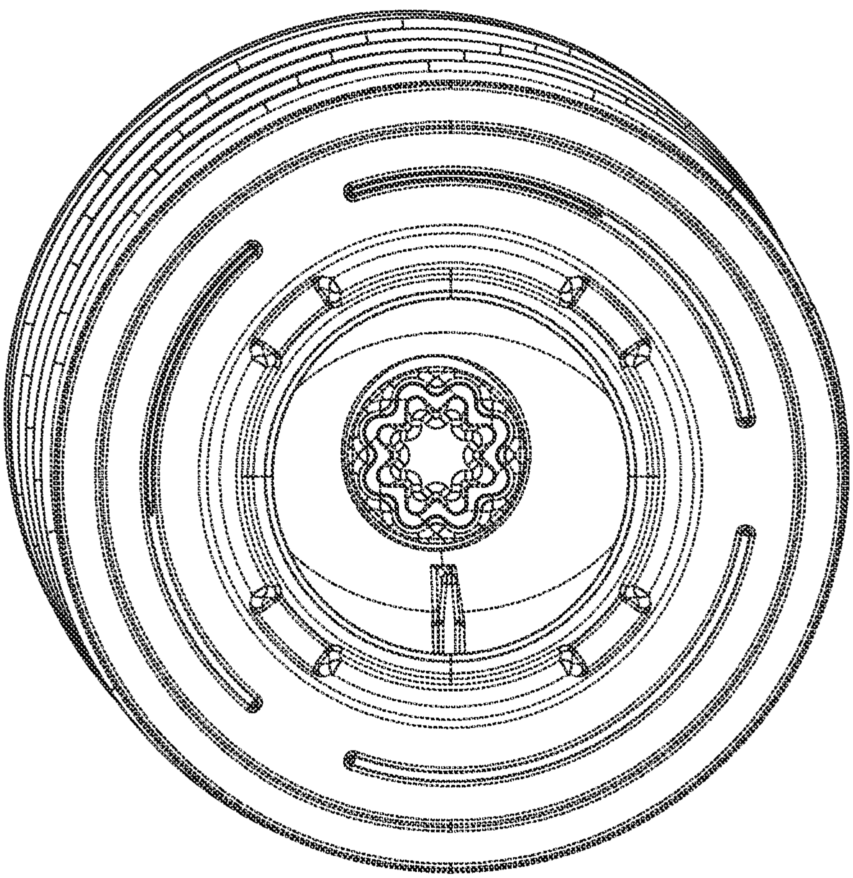

FIG. 114A is a schematic closed end plan view of the filter cartridge depicted in FIG. 112A.

Figure 114B:
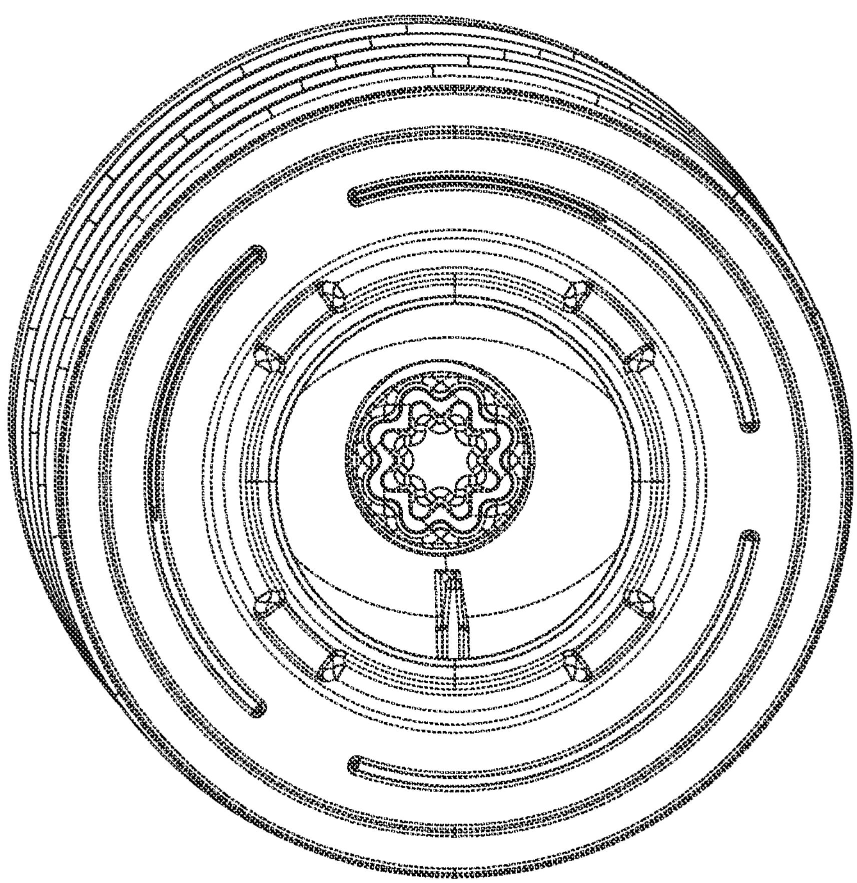

FIG. 114B is a schematic closed end plan view of the filter cartridge depicted in FIG. 112B.

Figure 115:
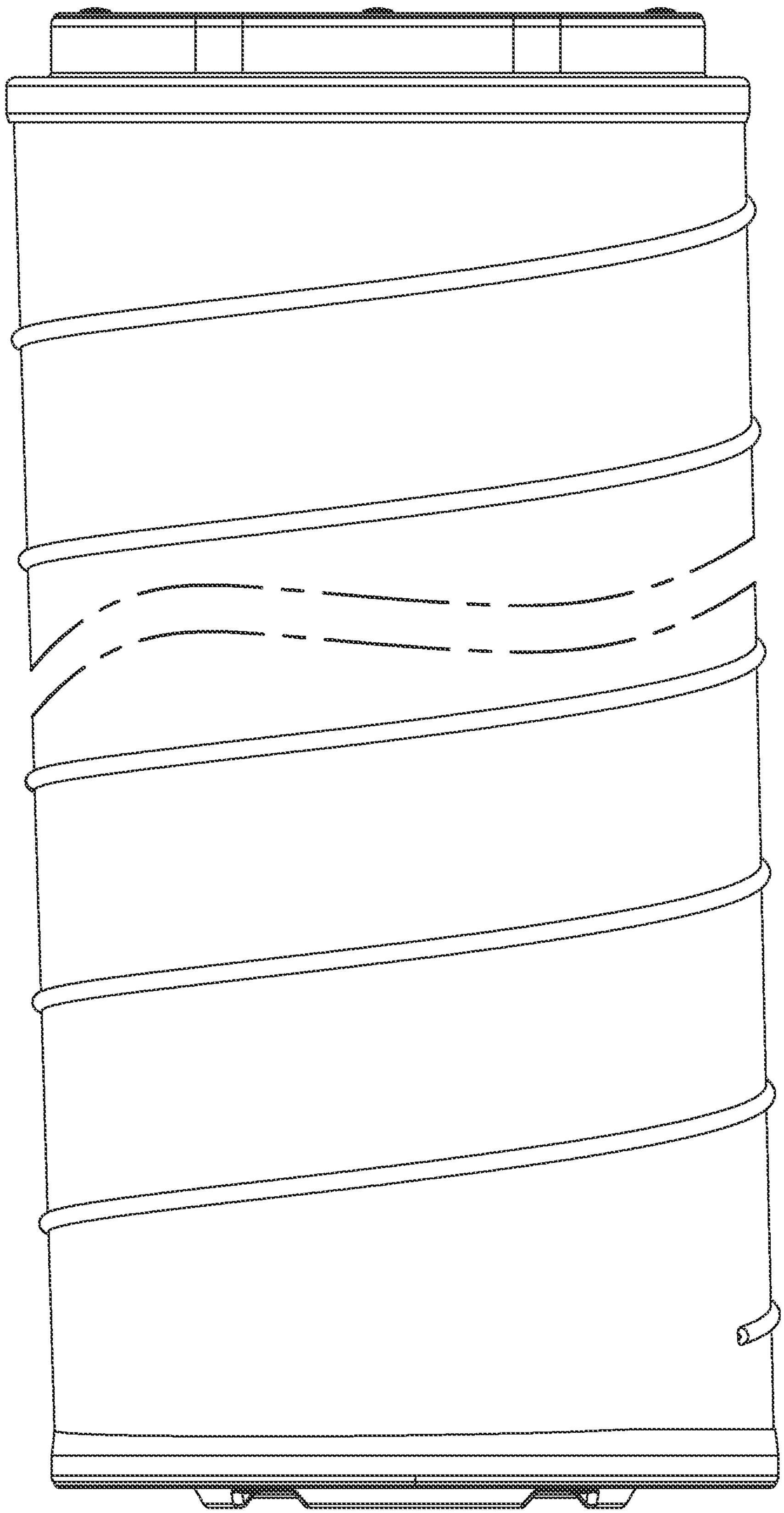

FIG. 115 is a schematic first side elevational view of the filter cartridge depicted in FIG. 112.

Figure 115A:
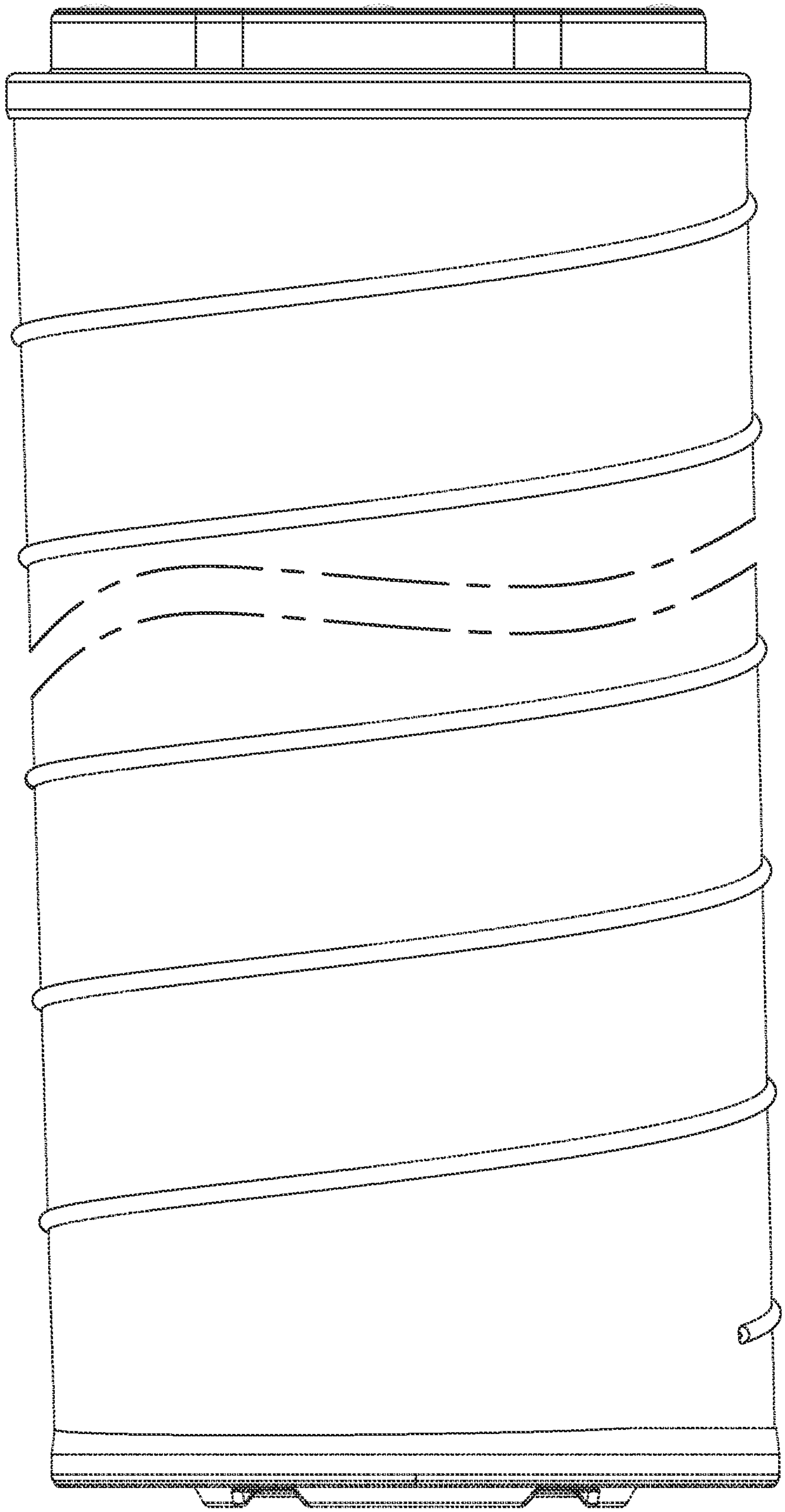

FIG. 115A is a schematic first side elevational view, analogous to FIG. 115, of the cartridge depicted in FIG. 112A.

Figure 115B:
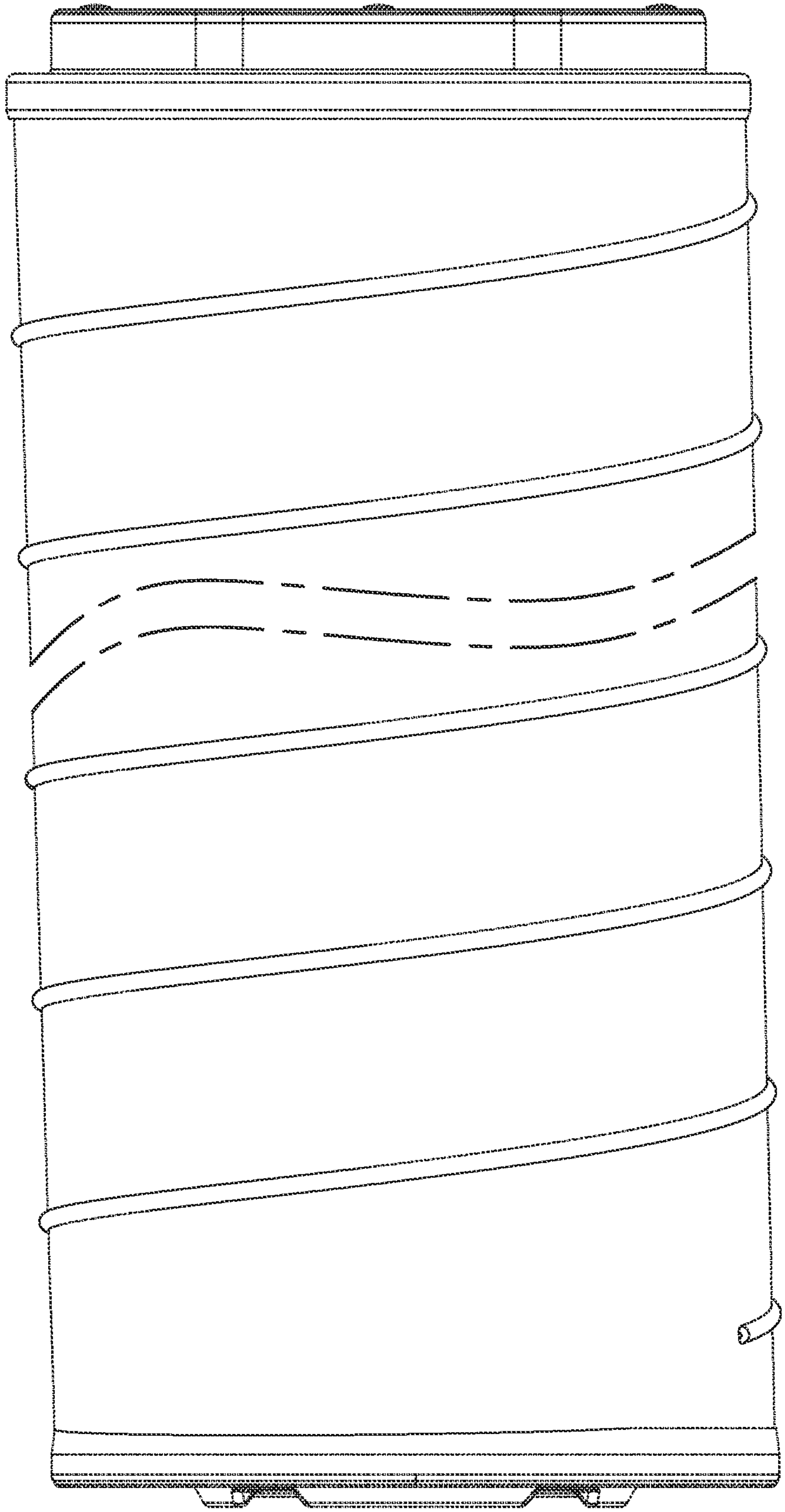

FIG. 115B is a schematic first side elevational view, analogous to FIG. 115, of the cartridge depicted in FIG. 112B.

Figure 116:
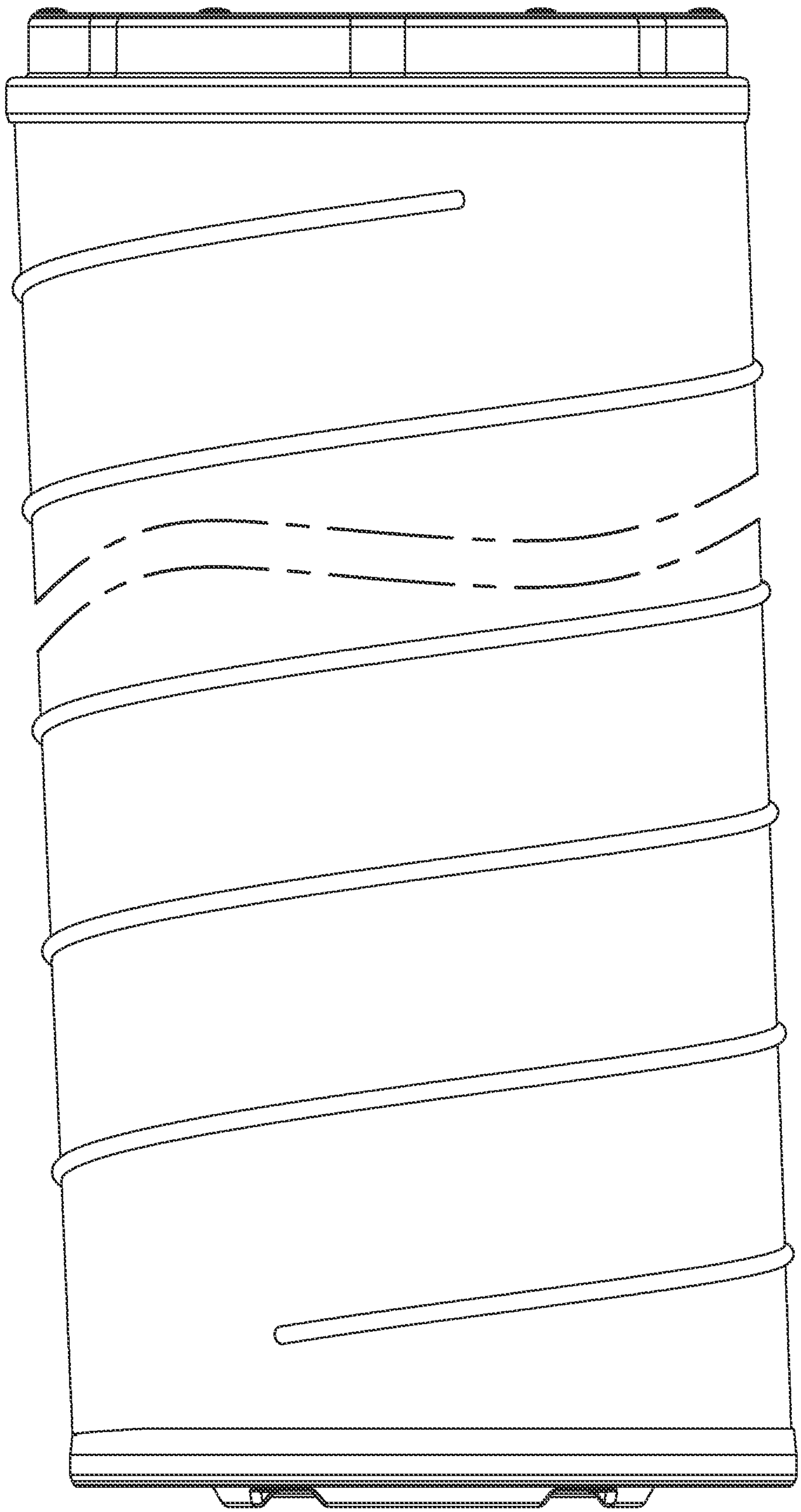

FIG. 116 is a schematic second side elevational view of the cartridge depicted in FIG. 112; the view of FIG. 116 being taken toward the right side of the view of FIG. 115.

Figure 116A:
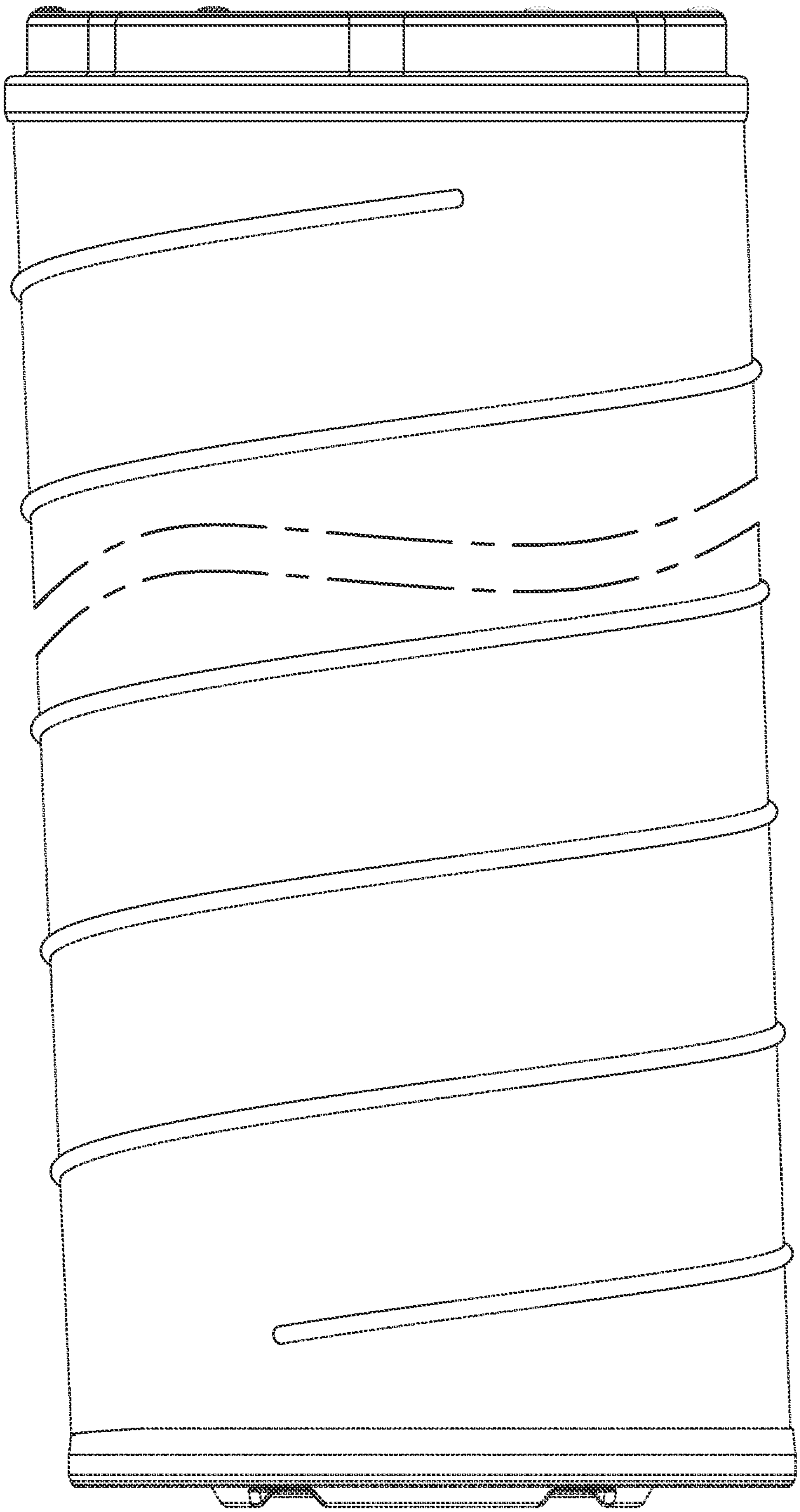

FIG. 116A is a schematic second side elevational view, analogous to FIG. 116, of the cartridge depicted in FIG. 112A.

Figure 116B:
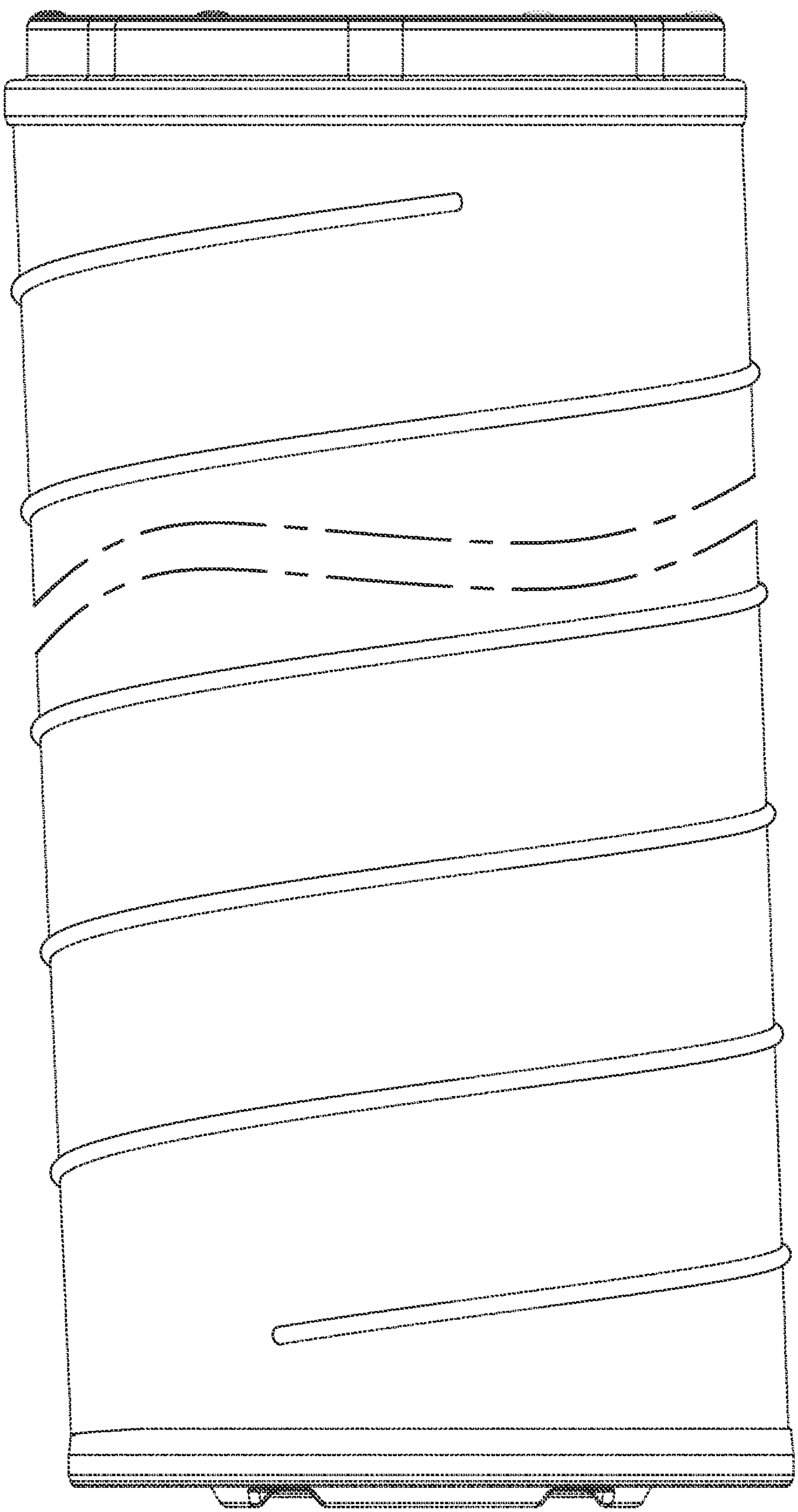

FIG. 116B is a schematic second side elevational view, analogous to FIG. 116, of the cartridge depicted in FIG. 112B.

Figure 117:
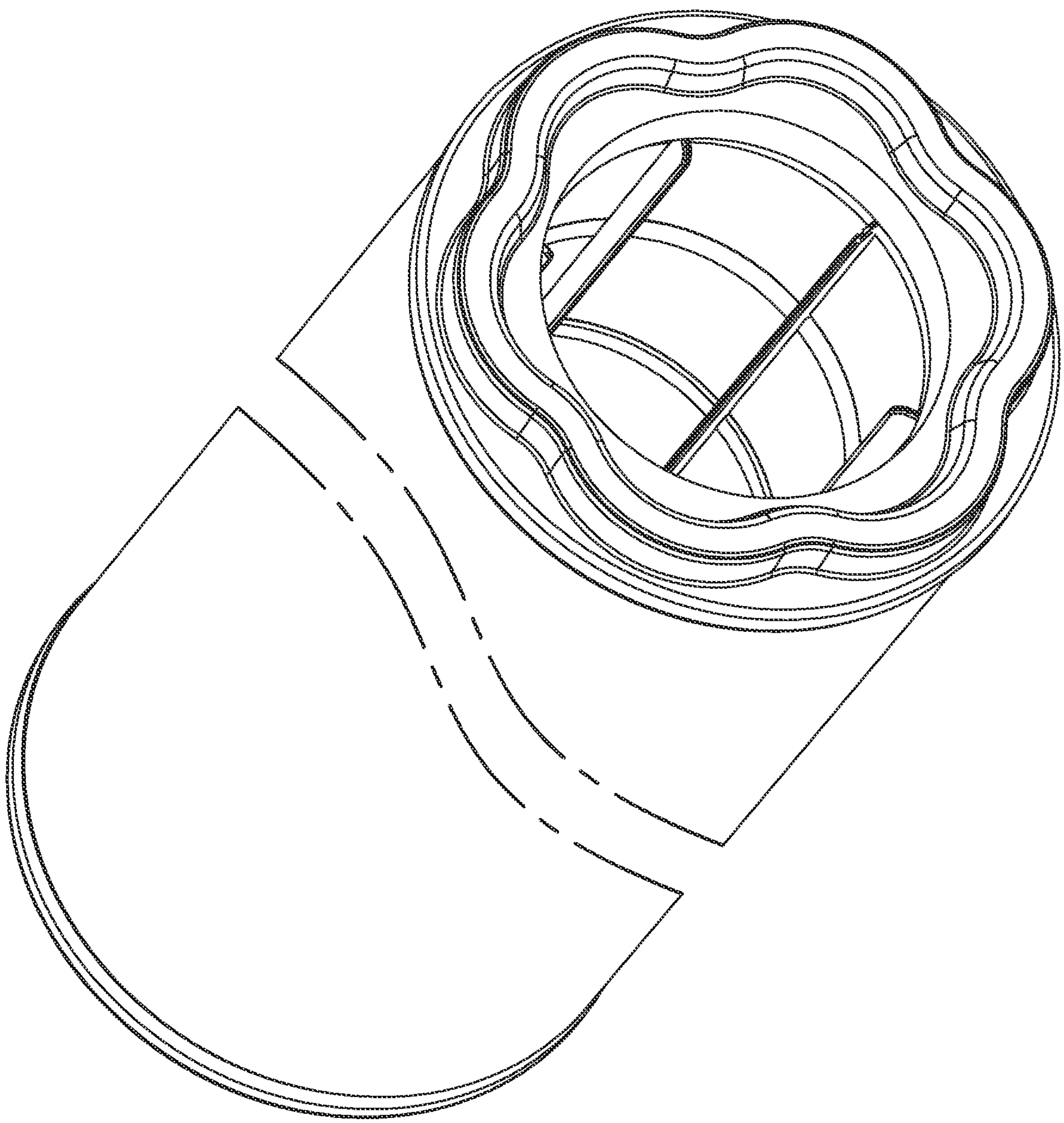

FIG. 117 is a schematic open end perspective view of another filter cartridge usable in an assembly according to, and in accordance with the principles of, the present disclosure; in FIG. 117, phantom or break lines being used to indicate a length variable.

Figure 118:
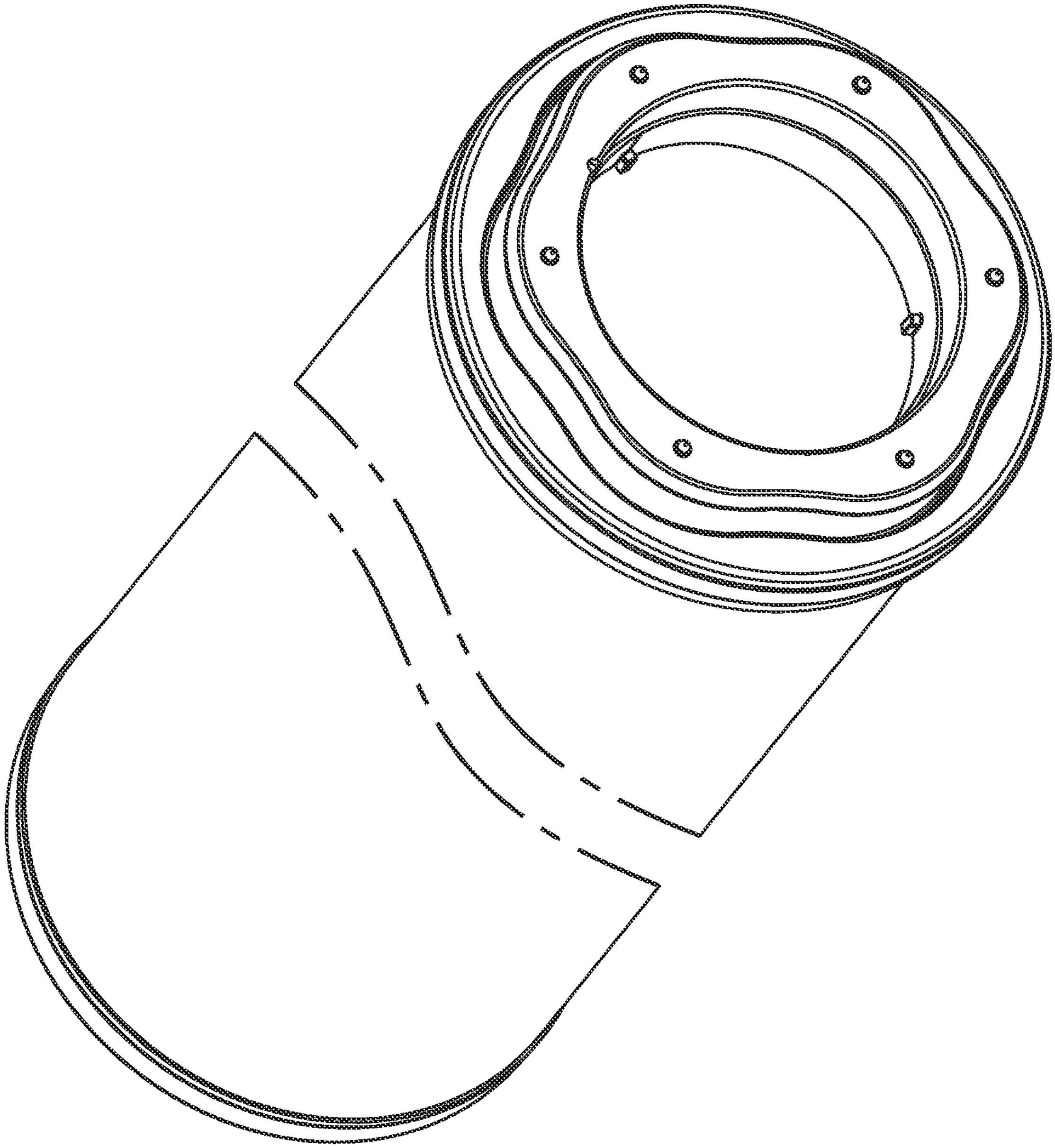

FIG. 118 is a schematic open end perspective view of another filter cartridge usable in an assembly according to, and in accordance with the principles of, the present disclosure; in FIG. 118, phantom or break lines being used to indicate a length variable.

Figure 119:
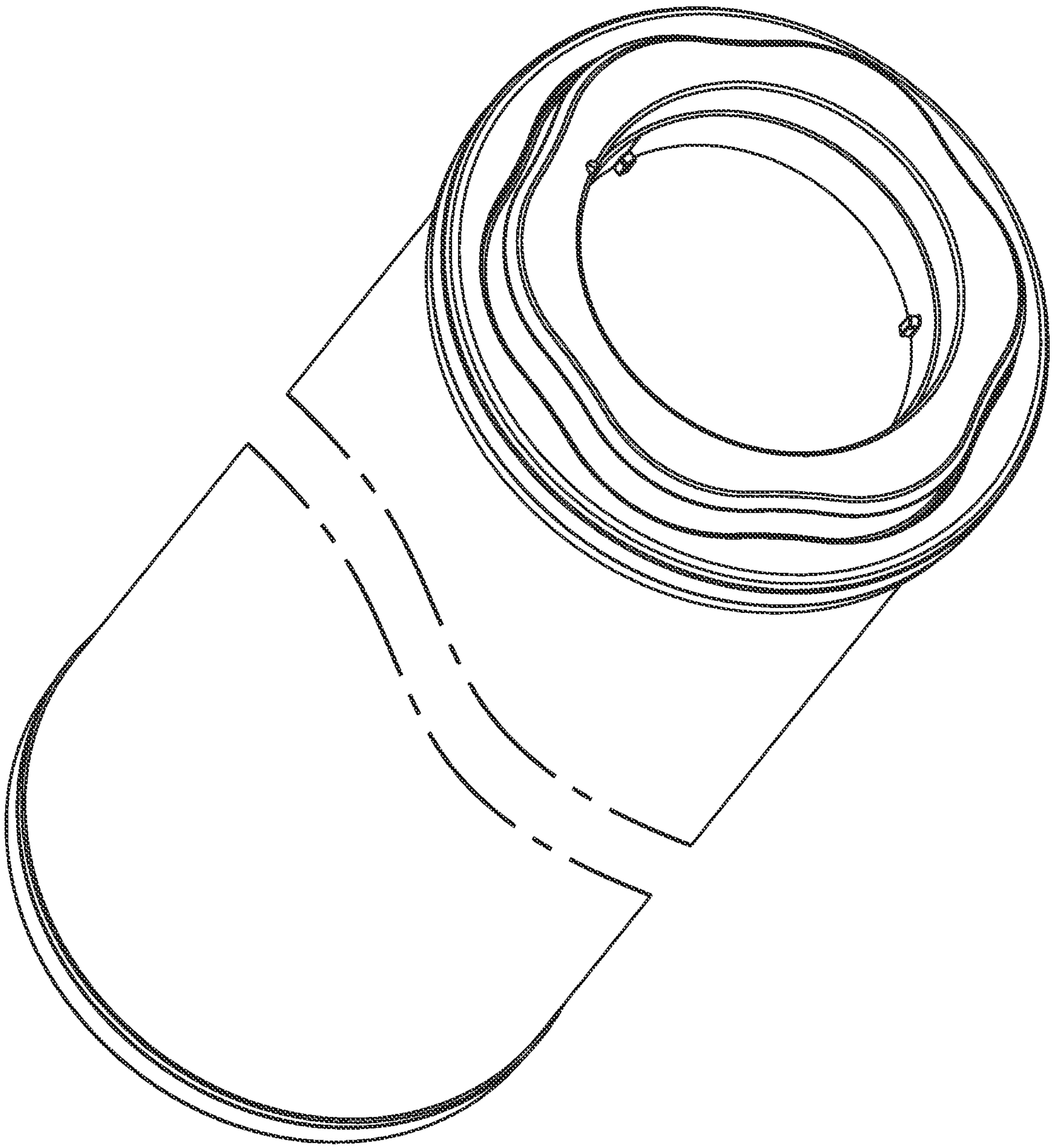

FIG. 119 is a schematic open end perspective view of another filter cartridge usable in an assembly according to, and in accordance with, the principles of, the present disclosure; in FIG. 119, phantom or break lines being used to indicate a length variable.

Figure 120:
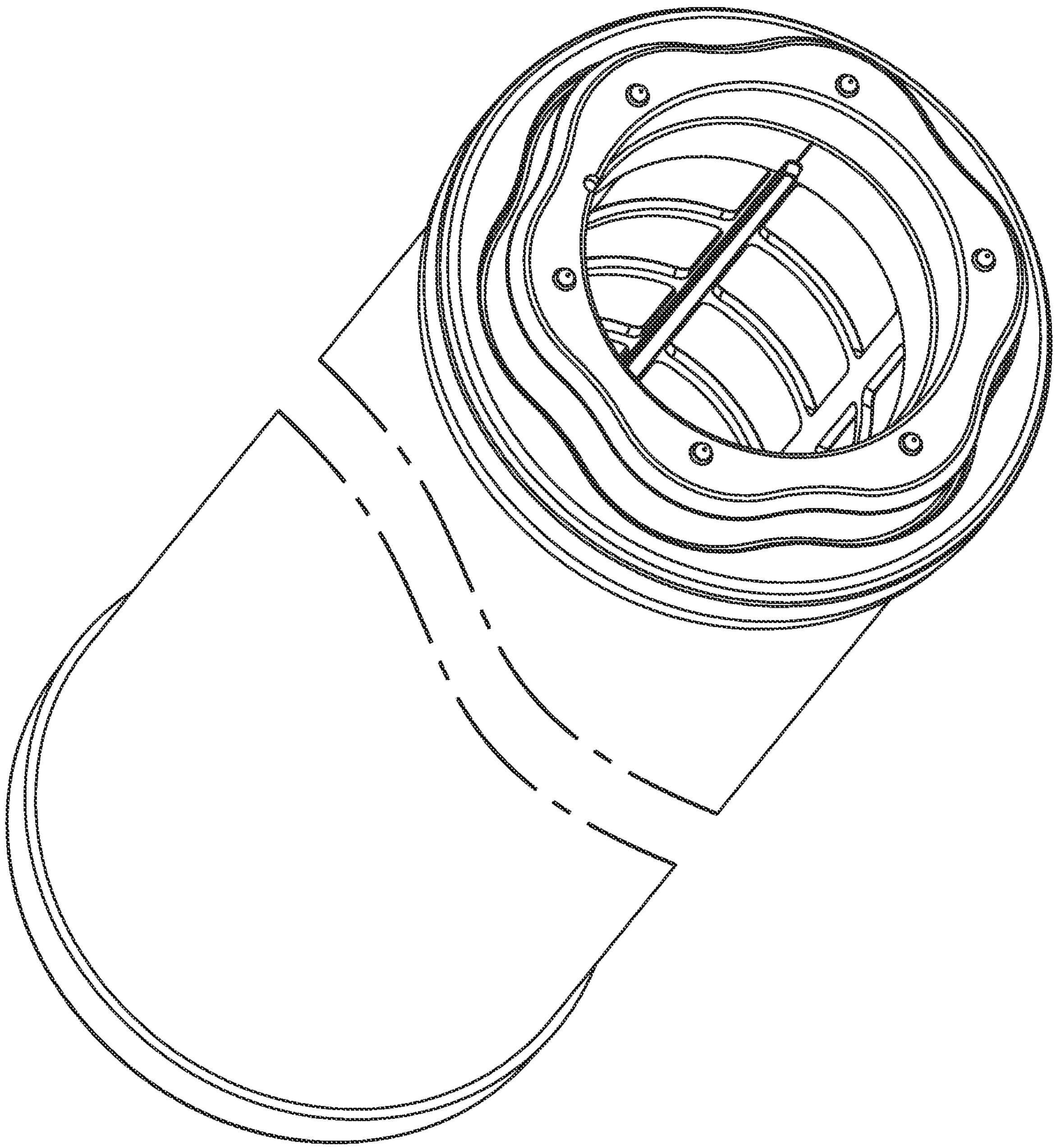

FIG. 120 is a schematic open end perspective view of another filter cartridge usable in an assembly according to, and in accordance with the principles of, the present disclosure; in FIG. 120, phantom or break lines being used to indicate a length variable.

Figure 121:
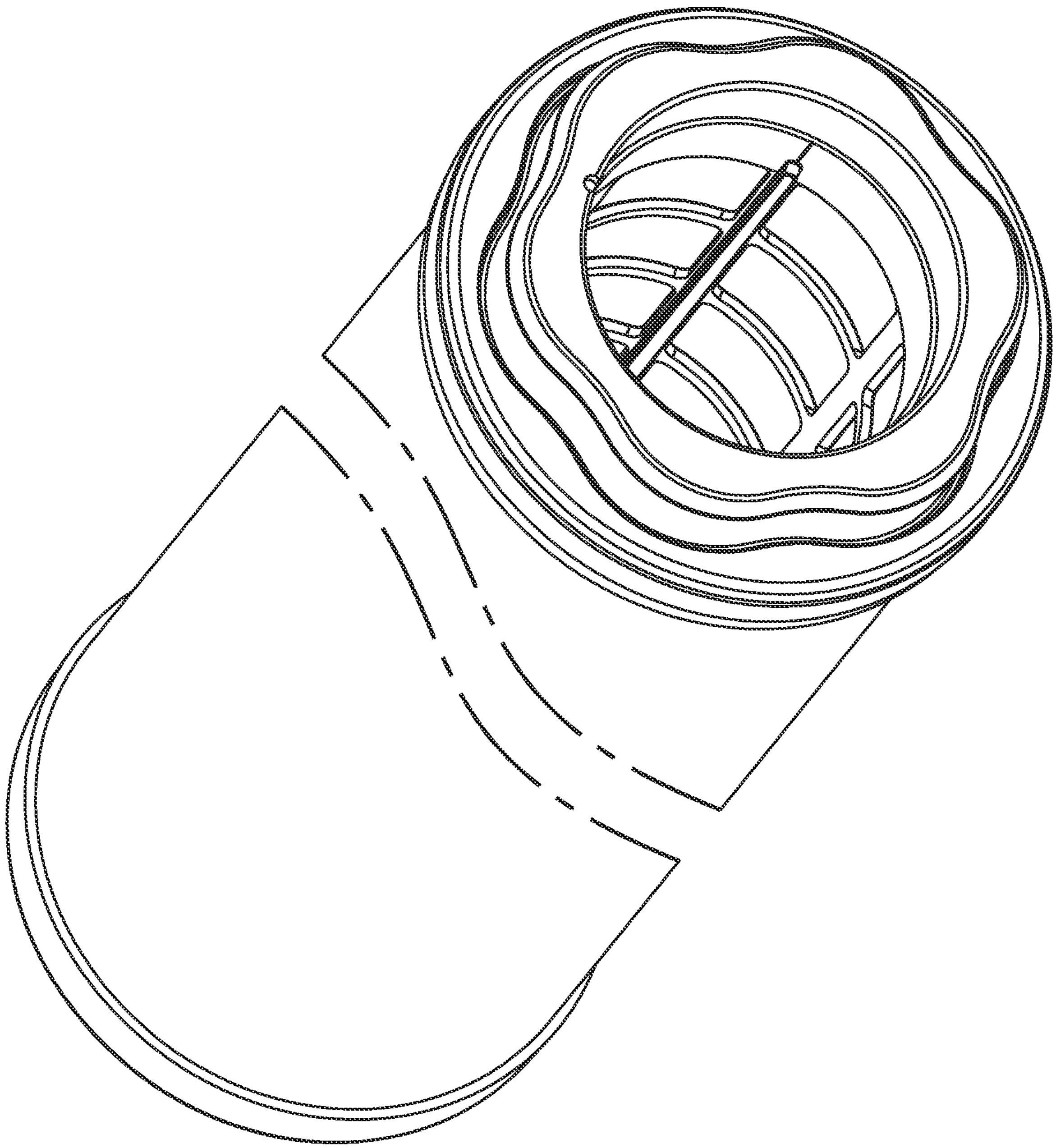

FIG. 121 is a schematic open end perspective view of another filter cartridge usable in an assembly according to, and in accordance with the principles of, the present disclosure; in FIG. 121, phantom or break lines being used to indicate a length variable.

Figure 122:
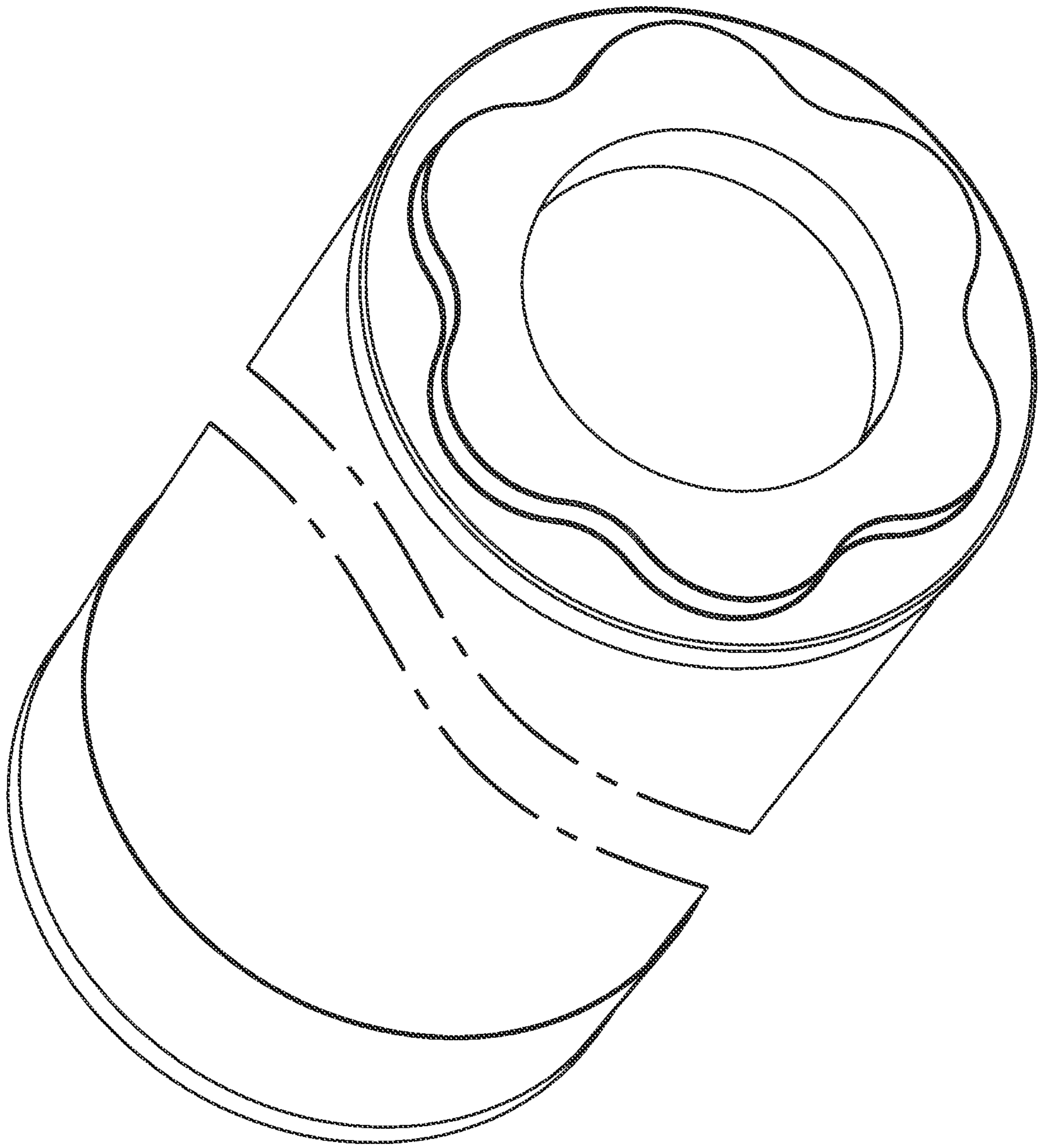

FIG. 122 is a schematic open end perspective view of another filter cartridge usable in an assembly according to, and in accordance with the principles of, the present disclosure; in FIG. 122, phantom or break lines being used to indicate a length variable.

Figure 123:
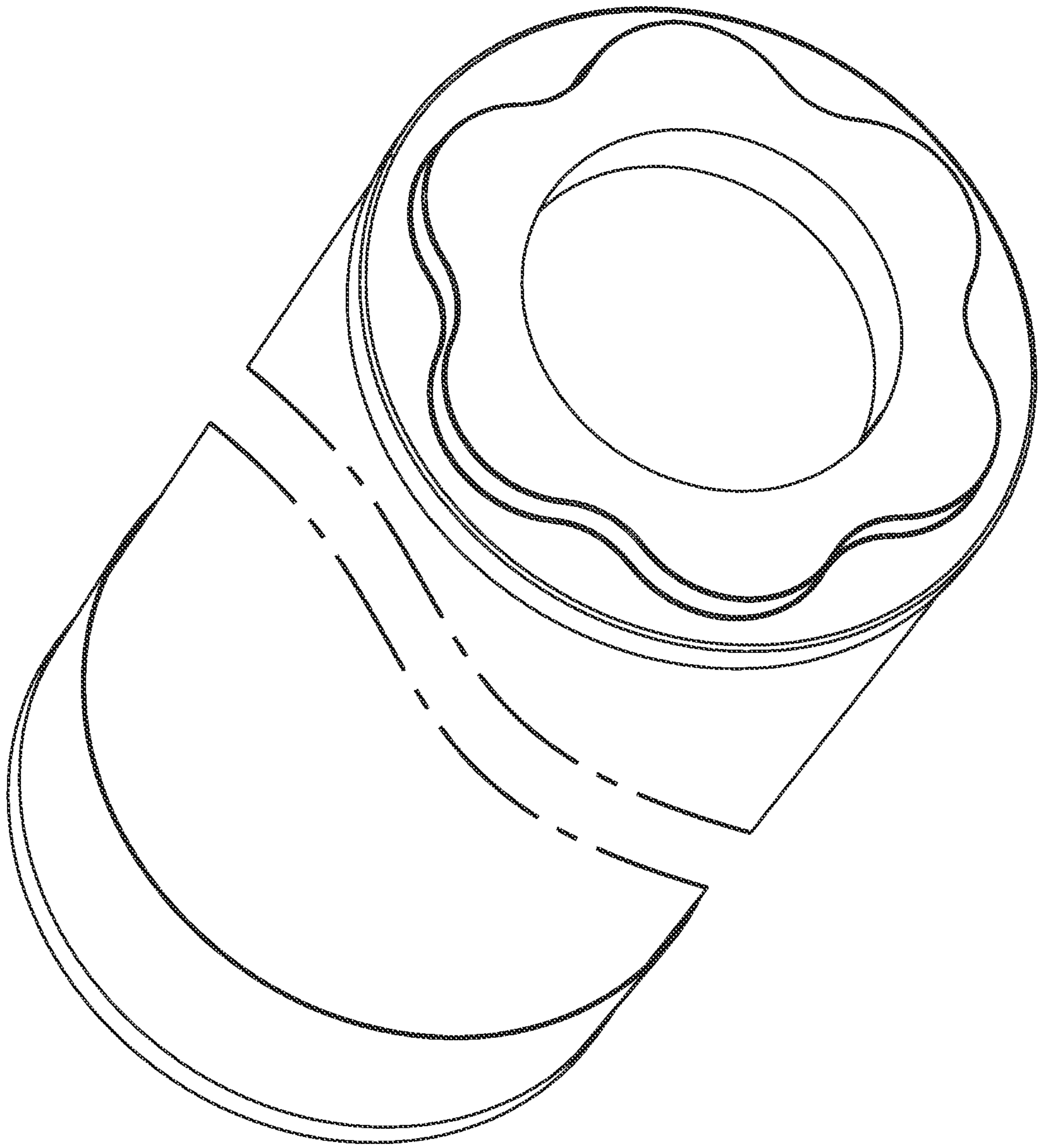

FIG. 123 is a schematic open end perspective view of another filter cartridge usable in an assembly according to, and in accordance with the principles of, the present disclosure; in FIG. 123, phantom or break lines being used to indicate a length variable.

Figure 124:
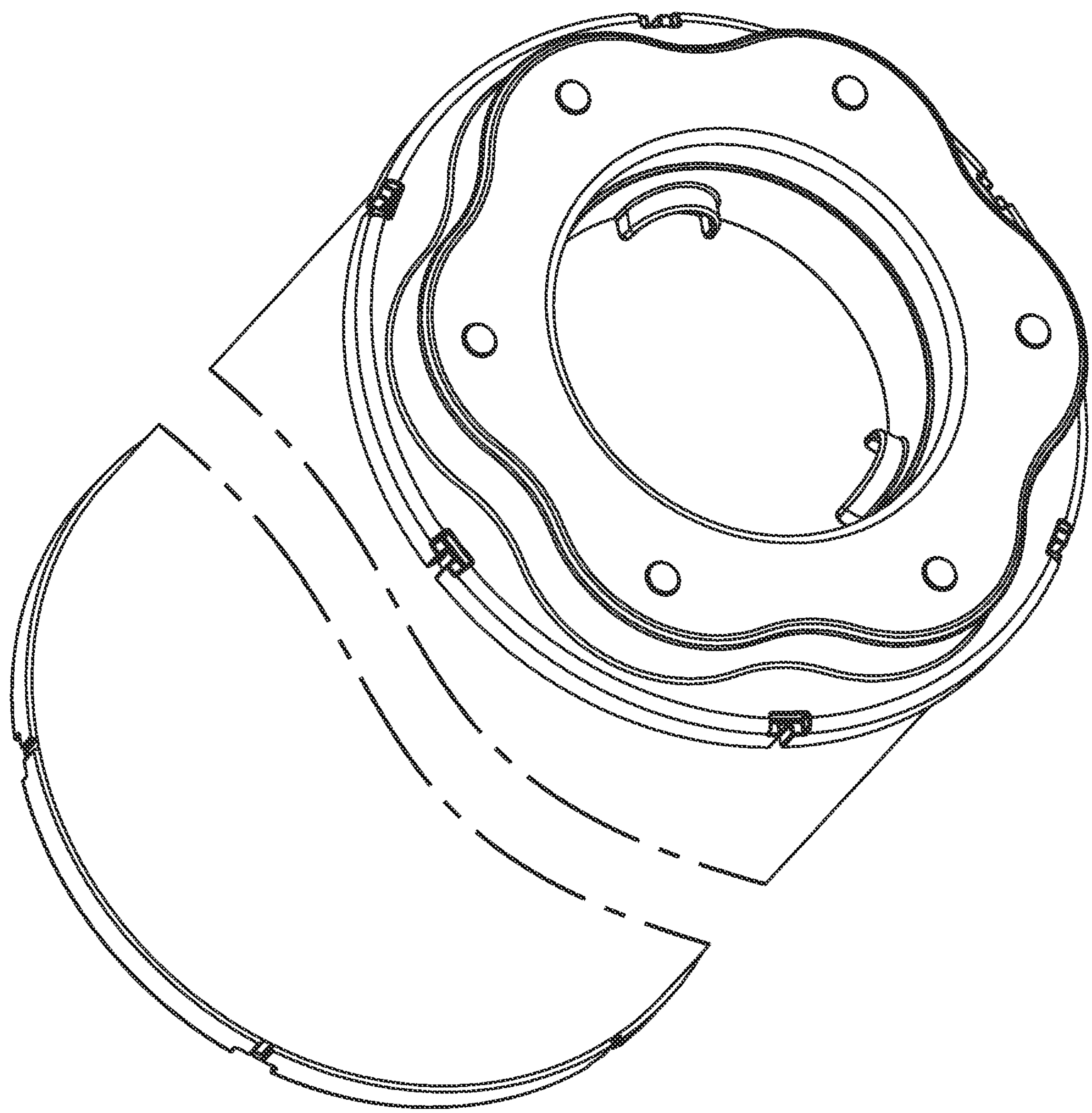

FIG. 124 is a schematic open end perspective view of another filter cartridge usable in an assembly according to, and in accordance with the principles of, the present disclosure; in FIG. 124, phantom or break lines being used to indicate a length variable.

Figure 125:
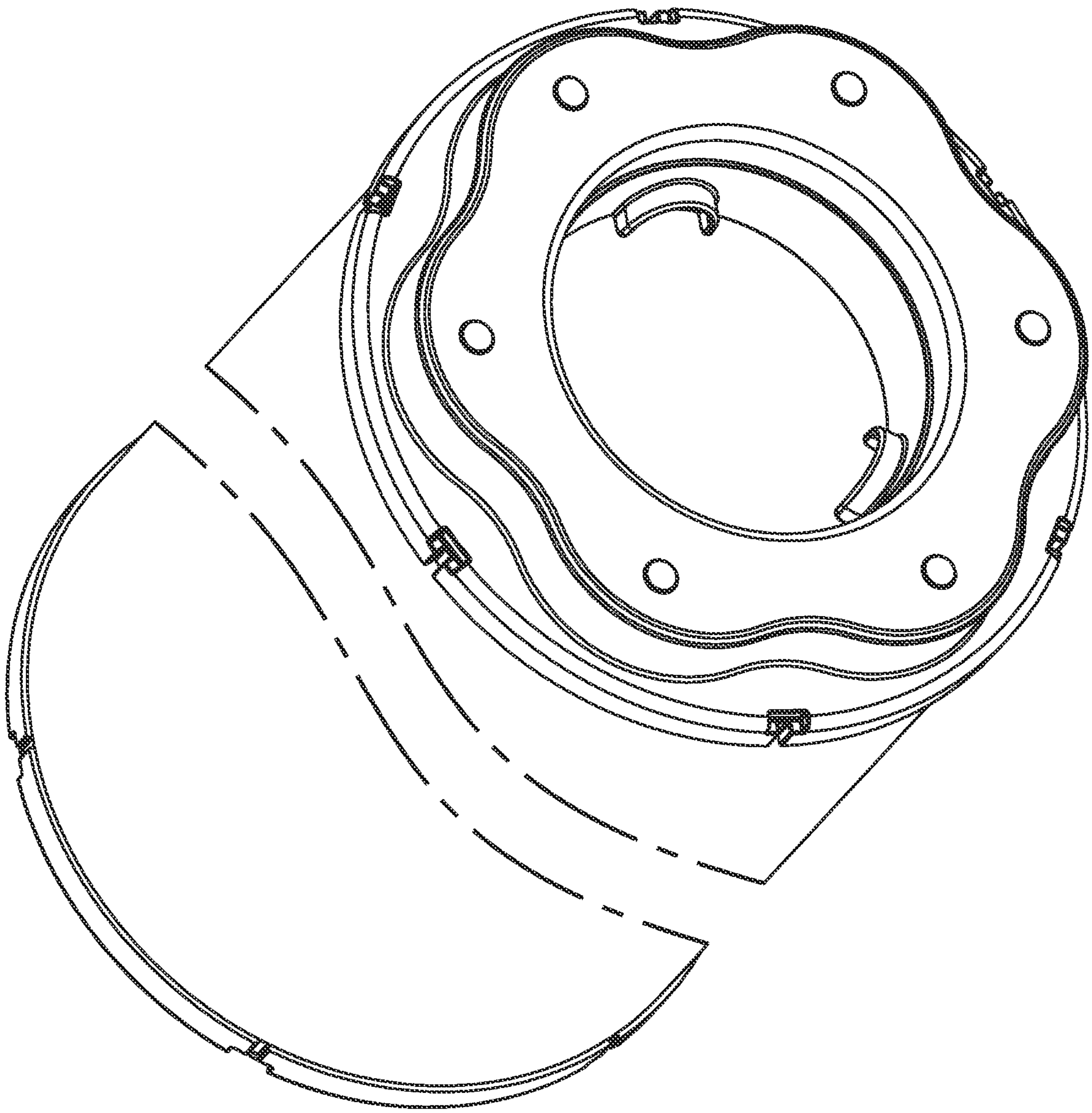

FIG. 125 is a schematic open end perspective view of another filter cartridge usable in an assembly according to, and in accordance with the principles of, the present disclosure; in FIG. 125, phantom or break lines being used to indicate a length variable.

Figure 126:
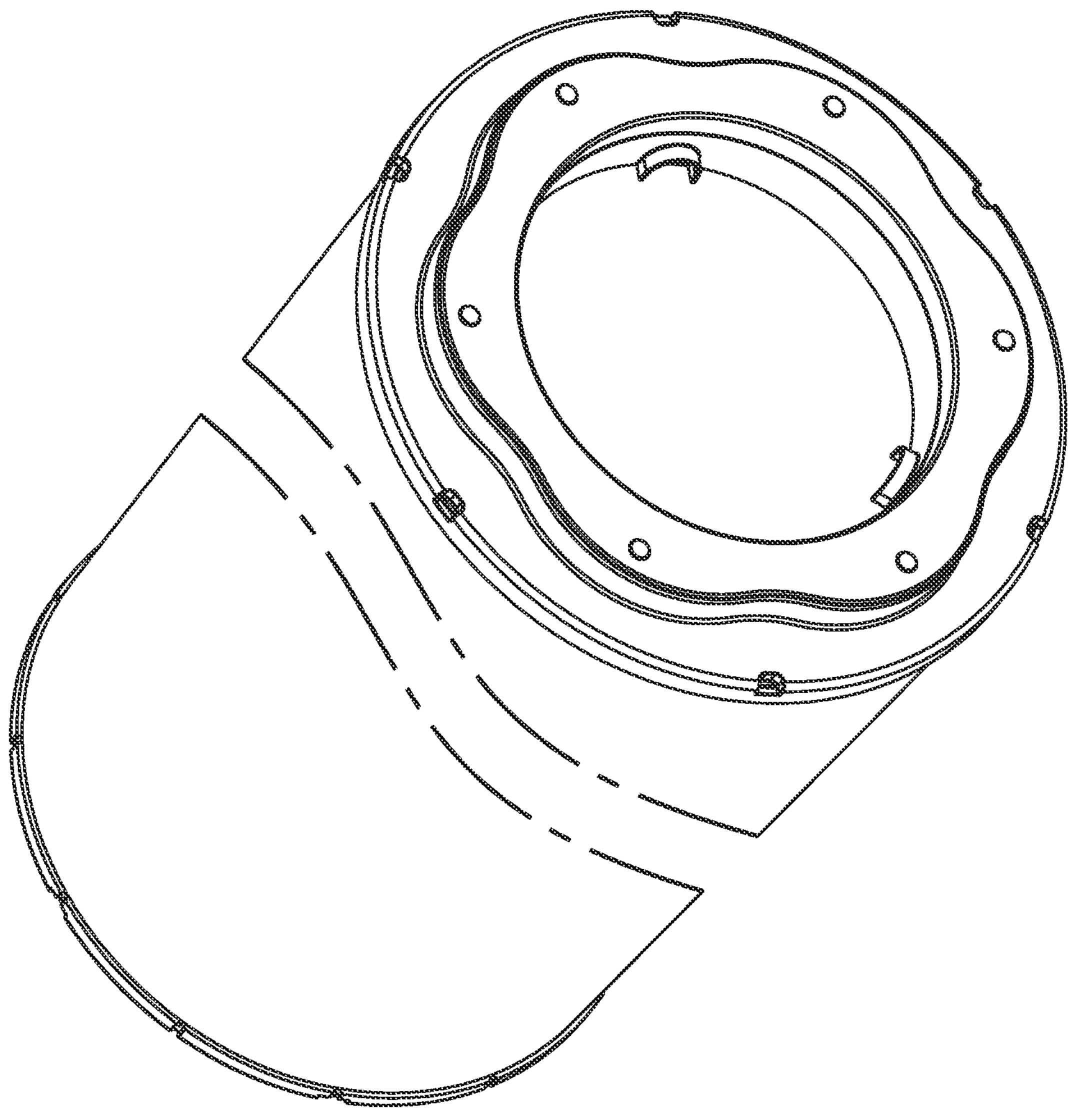

FIG. 126 is a schematic open end perspective view of another filter cartridge usable in an assembly according to, and in accordance with the principles of, the present disclosure; in FIG. 126, phantom or break lines being used to indicate a length variable.

Figure 127:
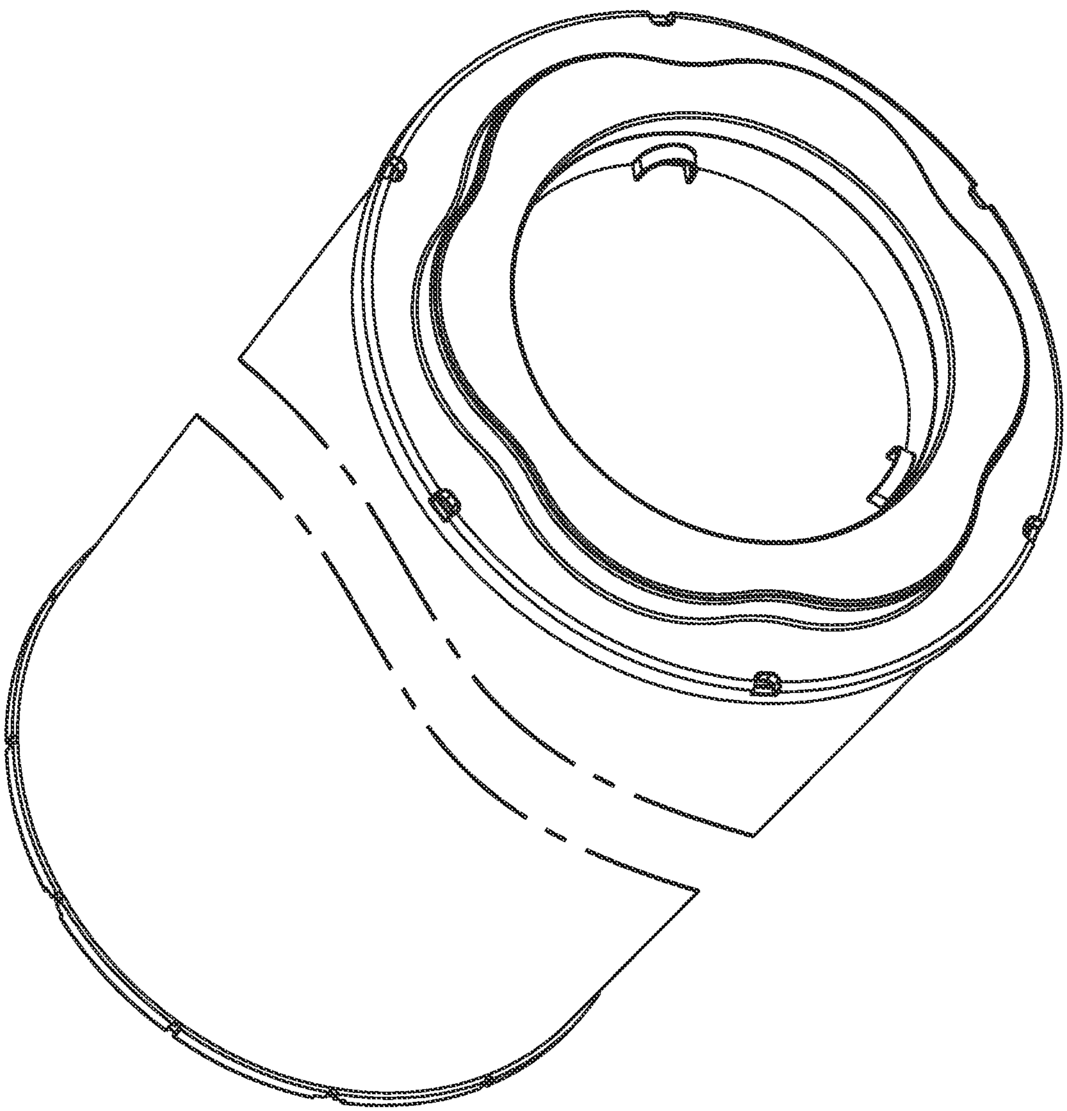

FIG. 127 is a schematic open end perspective view of another filter cartridge usable in an assembly according to, and in accordance with the principles of, the present disclosure; in FIG. 127, phantom or break lines being used to indicate a length variable.

Figure 128:
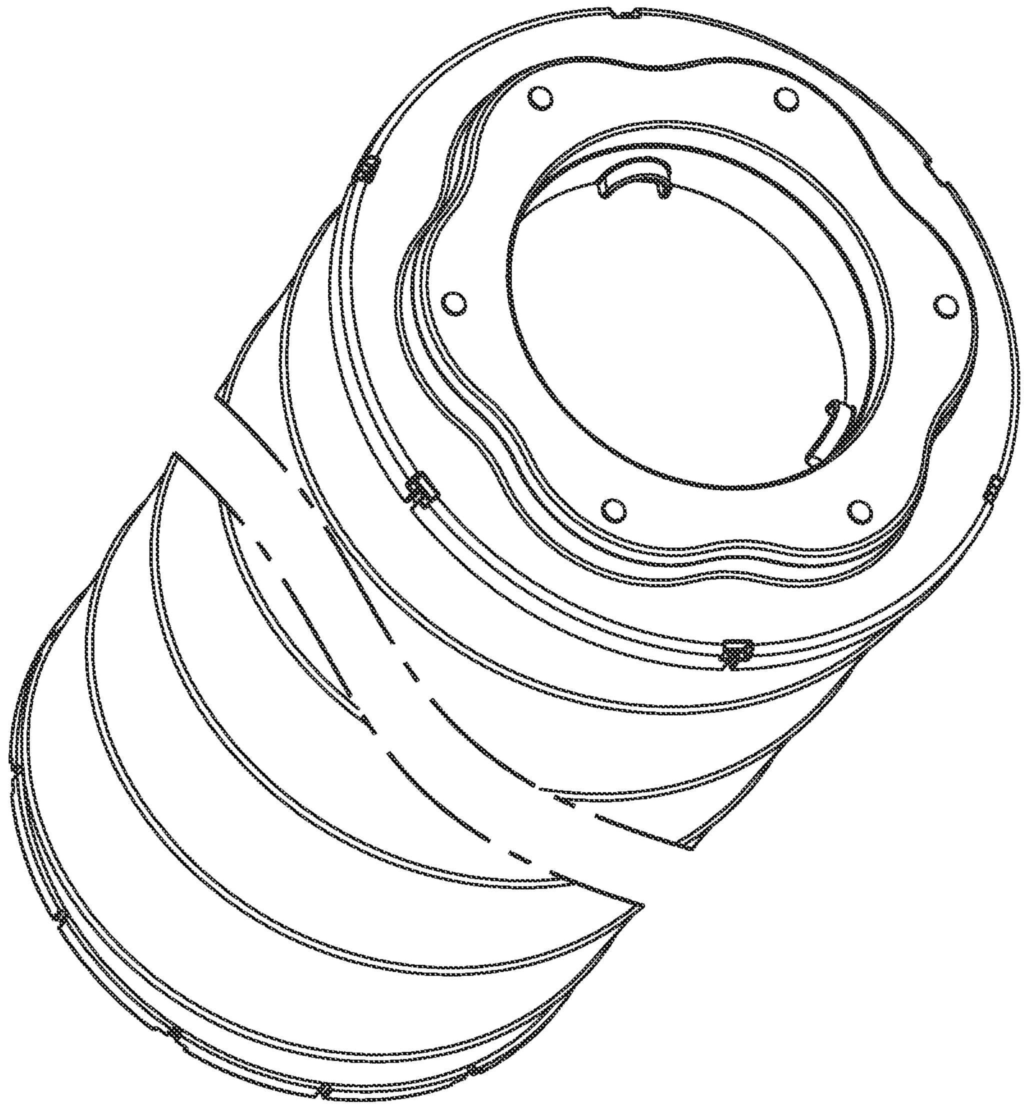

FIG. 128 is a schematic open end perspective view of another filter cartridge usable in an assembly according to, and in accordance with the principles of, the present disclosure; in FIG. 128, phantom or break lines being used to indicate a length variable.

Figure 129:
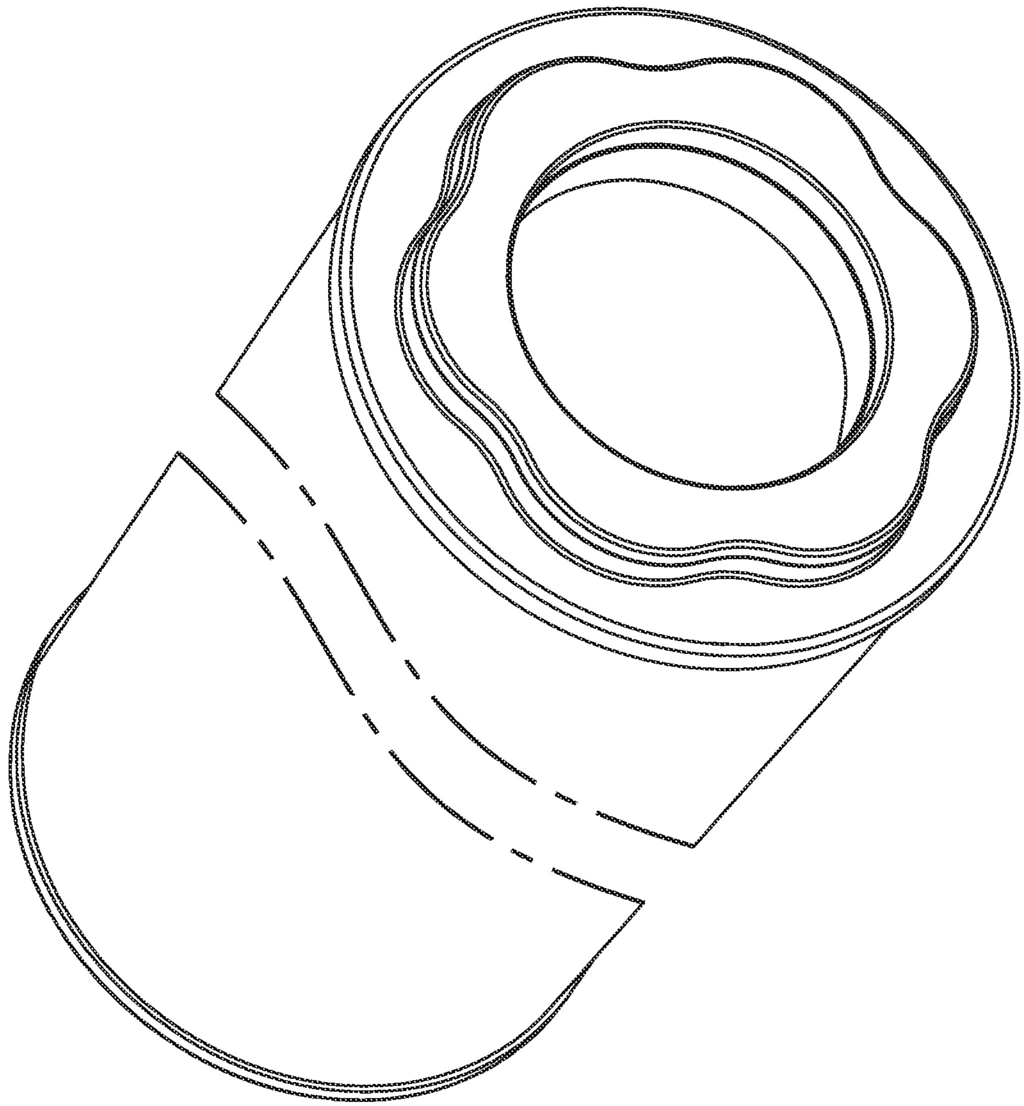

FIG. 129 is a schematic open end perspective view of another filter cartridge usable in an assembly according to, and in accordance with the principles of, the present disclosure; in FIG. 129, phantom or break lines being used to indicate a length variable.

Figure 130:
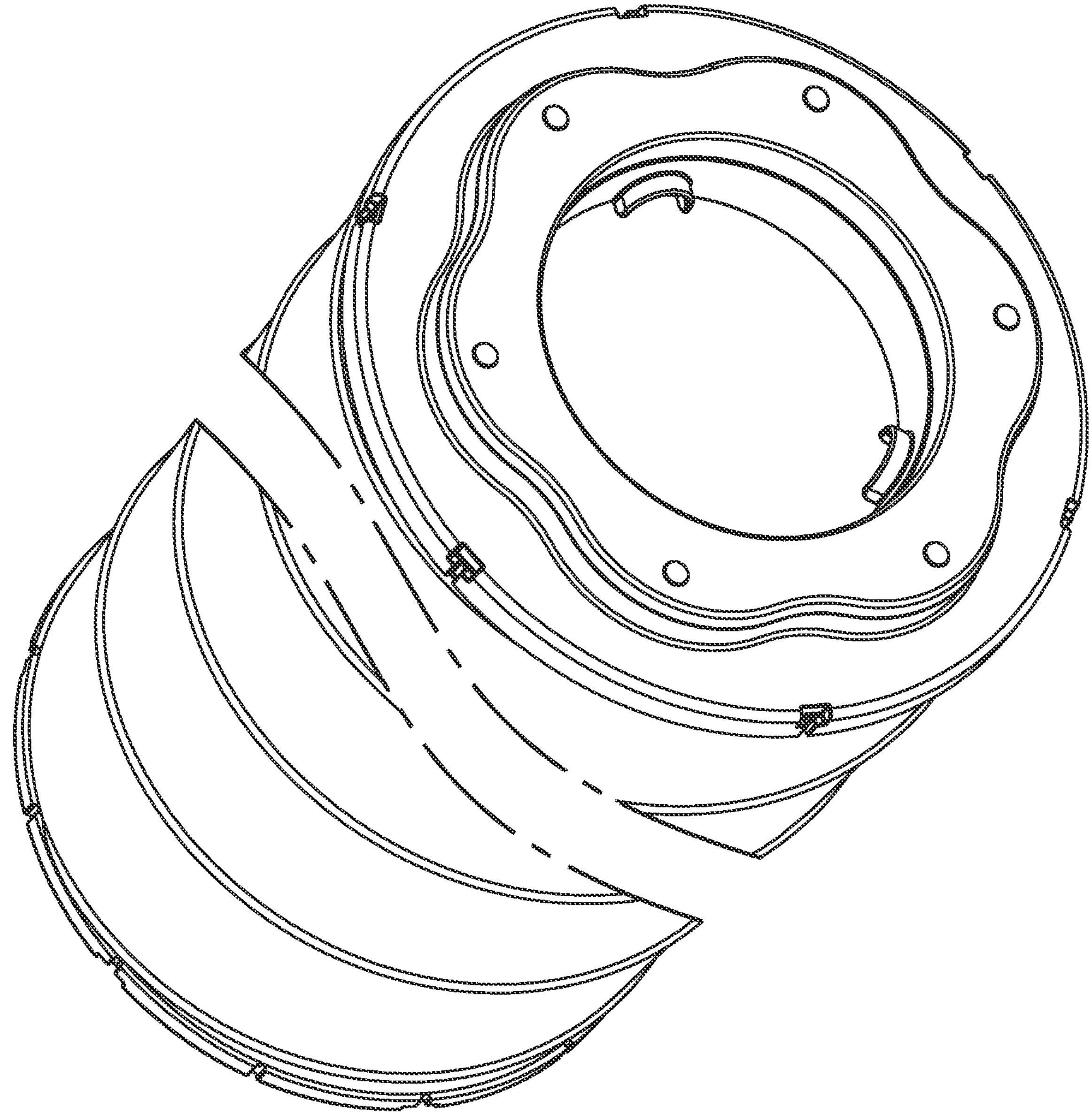

FIG. 130 is a schematic open end perspective view of another filter cartridge usable in an assembly according to, and in accordance with the principles of, the present disclosure; in FIG. 130, phantom or break lines being used to indicate a length variable.

Figure 131:
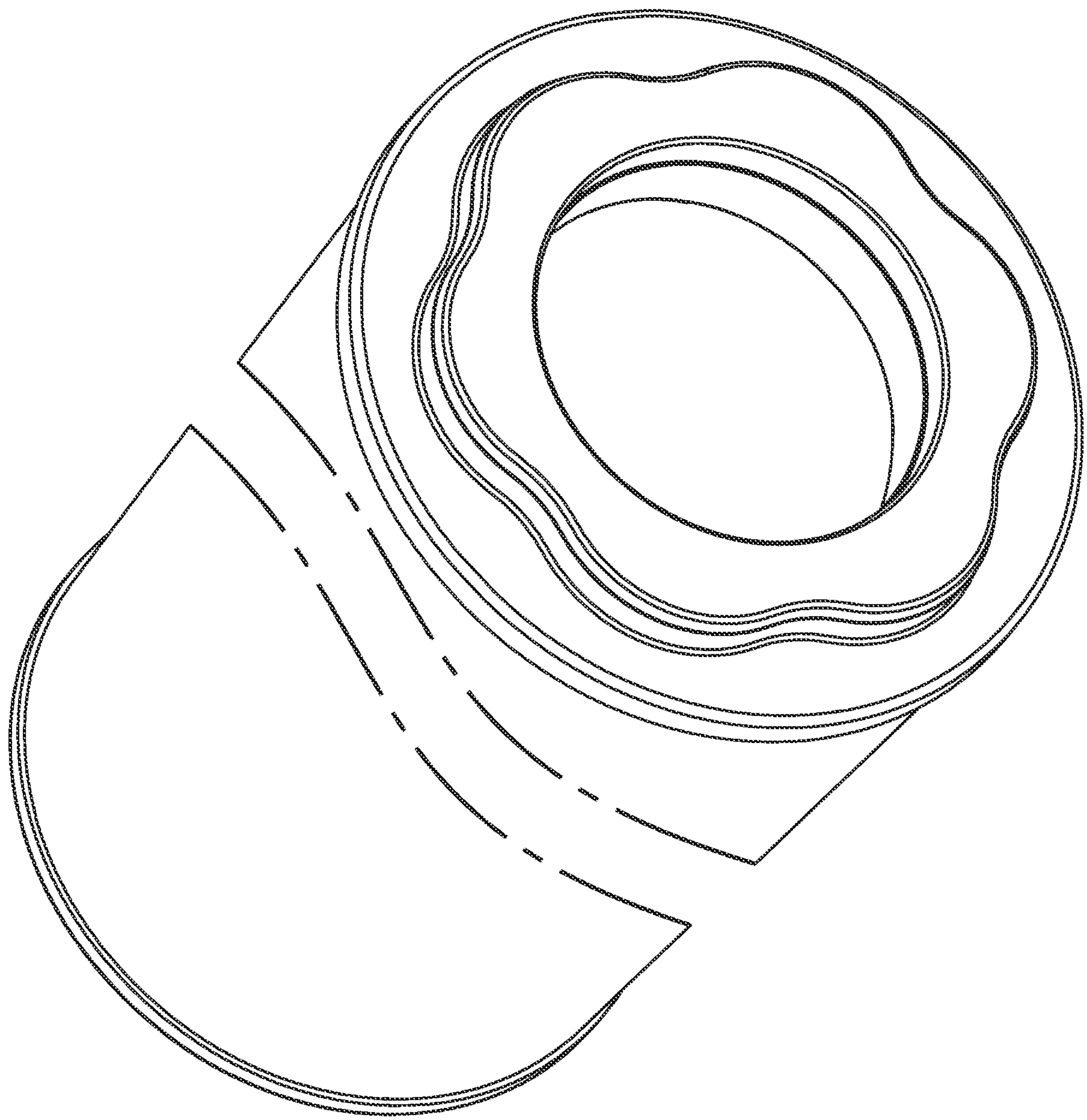

FIG. 131 is a schematic open end perspective view of another filter cartridge usable in an assembly according to, and in accordance with the principles of, the present disclosure; in FIG. 131, phantom or break lines being used to indicate a length variable.

Figure 132:
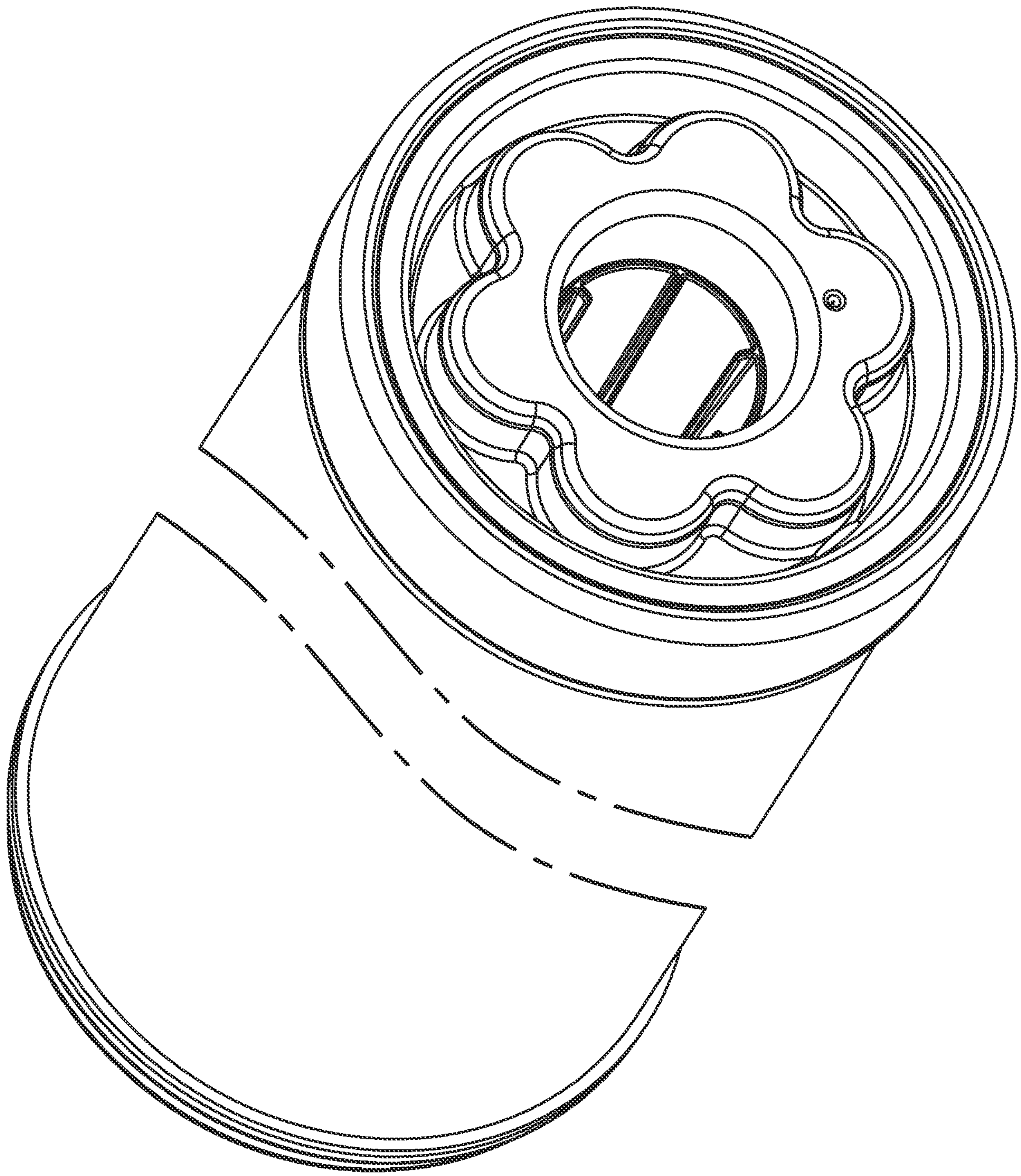

FIG. 132 is a schematic open end perspective view of another filter cartridge usable in an assembly according to, and in accordance with the principles of, the present disclosure; in FIG. 132, phantom or break lines being used to indicate a length variable.

Figure 133:
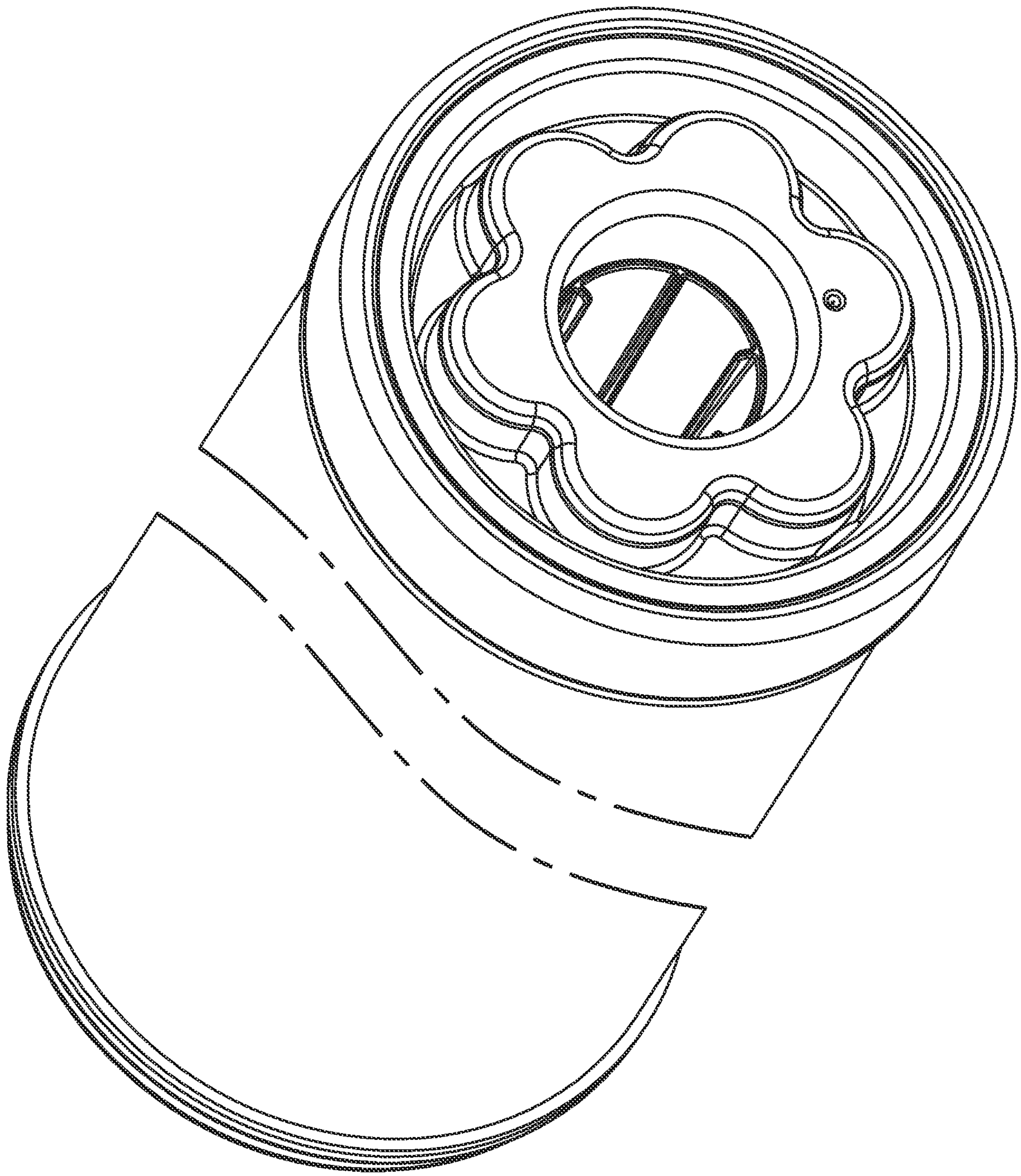

FIG. 133 is a schematic open end perspective view of another filter cartridge usable in an assembly according to, and in accordance with the principles of, the present disclosure; in FIG. 133, phantom or break lines being used to indicate a length variable.

Figure 134:
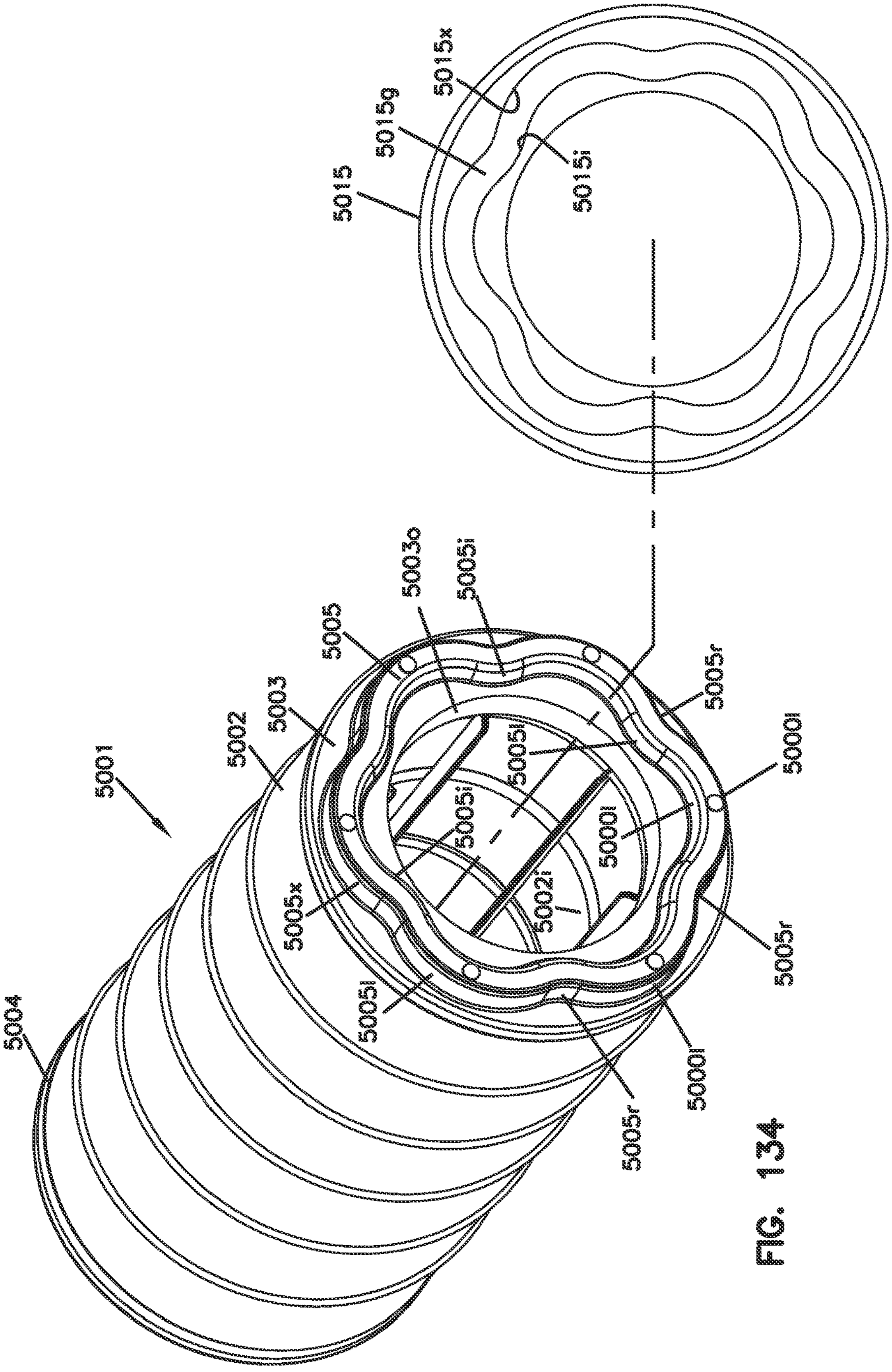

FIG. 134 is an exploded schematic view depicting an example filter cartridge in accord with the present disclosure, associated with the housing portion having a seal surface thereon in accord with the present disclosure.

Figure 135:
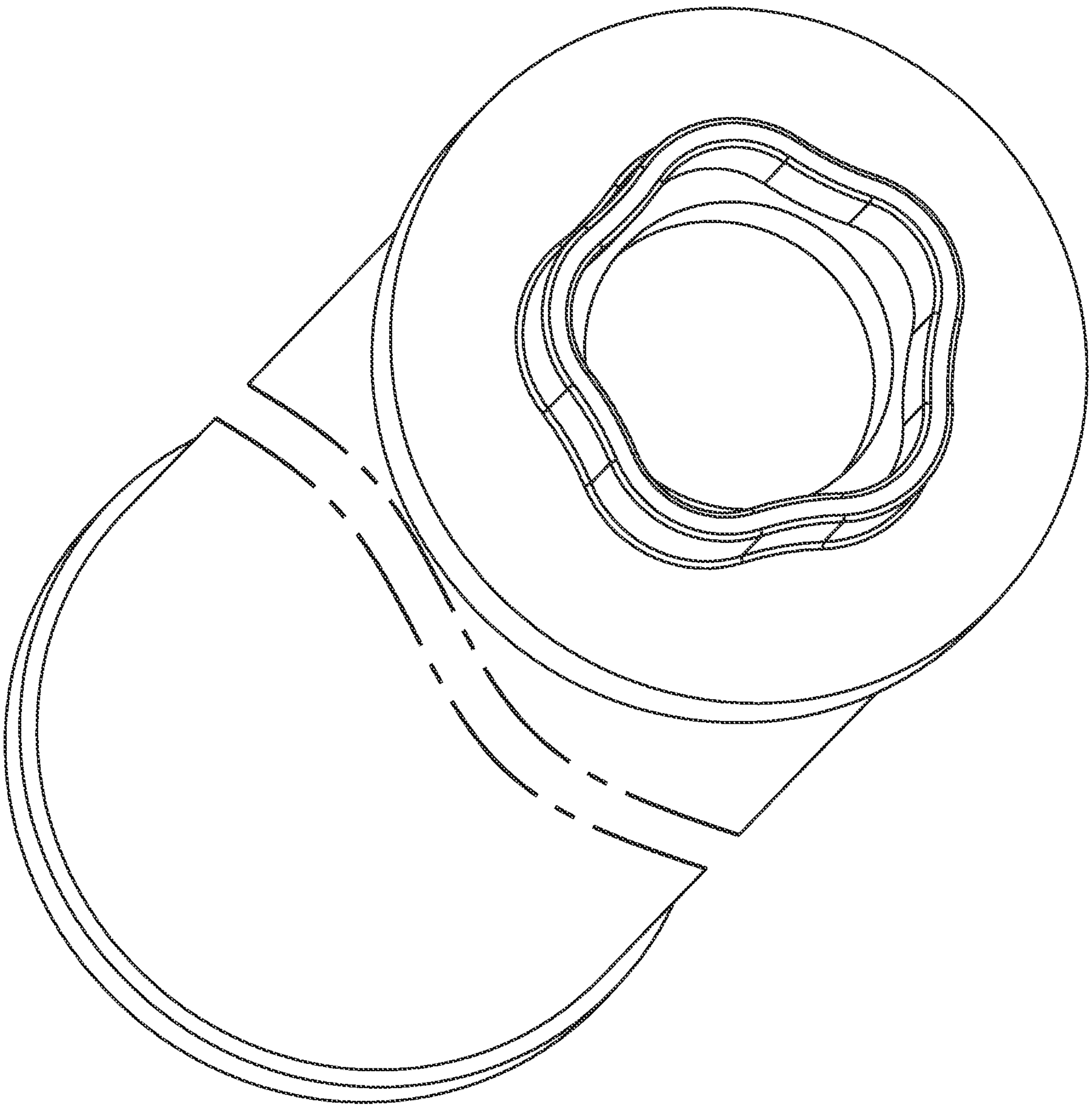

FIG. 135 is a schematic open end perspective view of another filter cartridge usable in an assembly according to, and in accordance with the principles of, the present disclosure; in FIG. 135, phantom or break lines being used to indicate a length variable.

Figure 136:
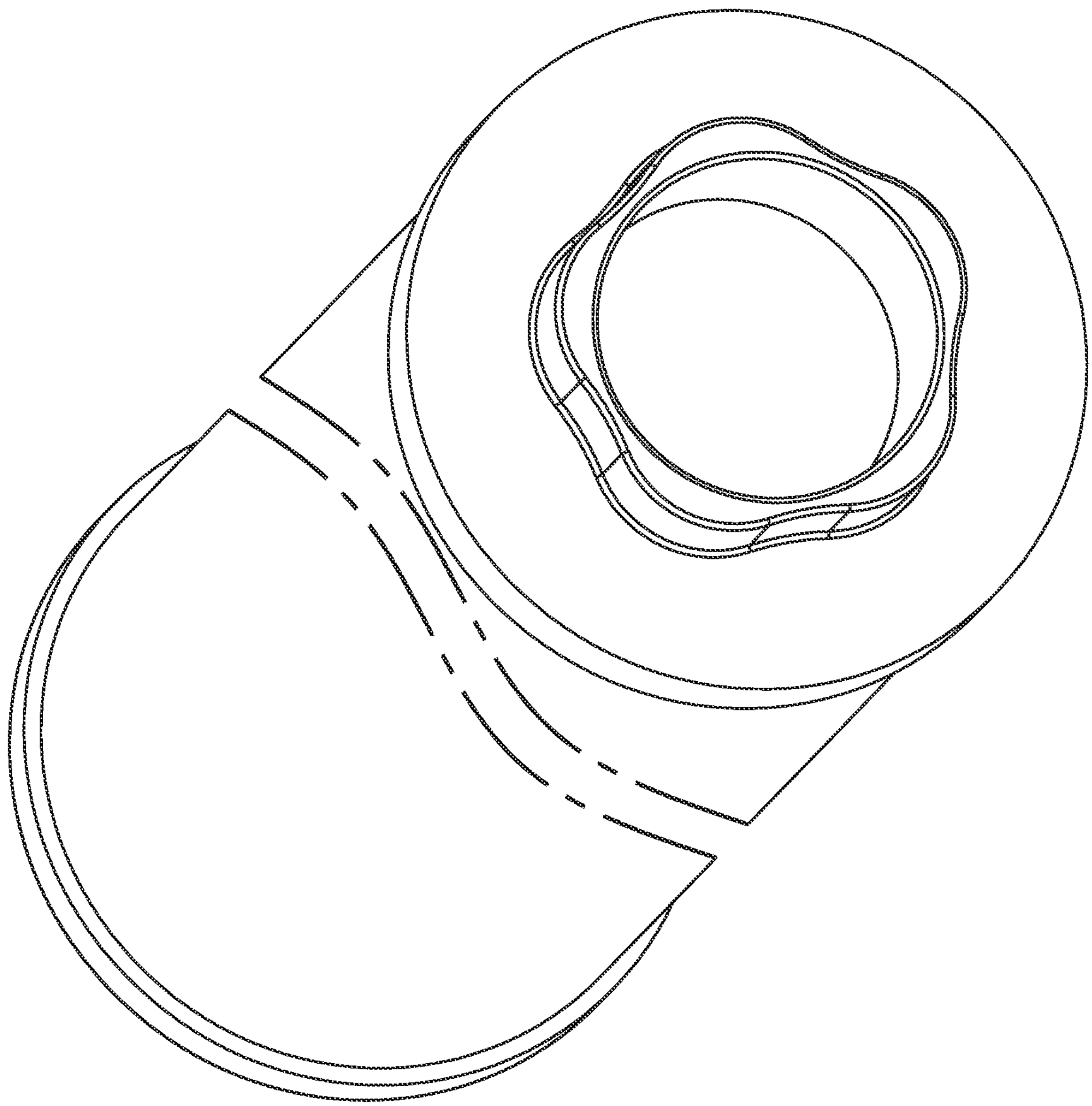

FIG. 136 is a schematic open end perspective view of another filter cartridge usable in an assembly according to, and in accordance with the principles of, the present disclosure; in FIG. 136, phantom or break lines being used to indicate a length variable.

Figure 137:
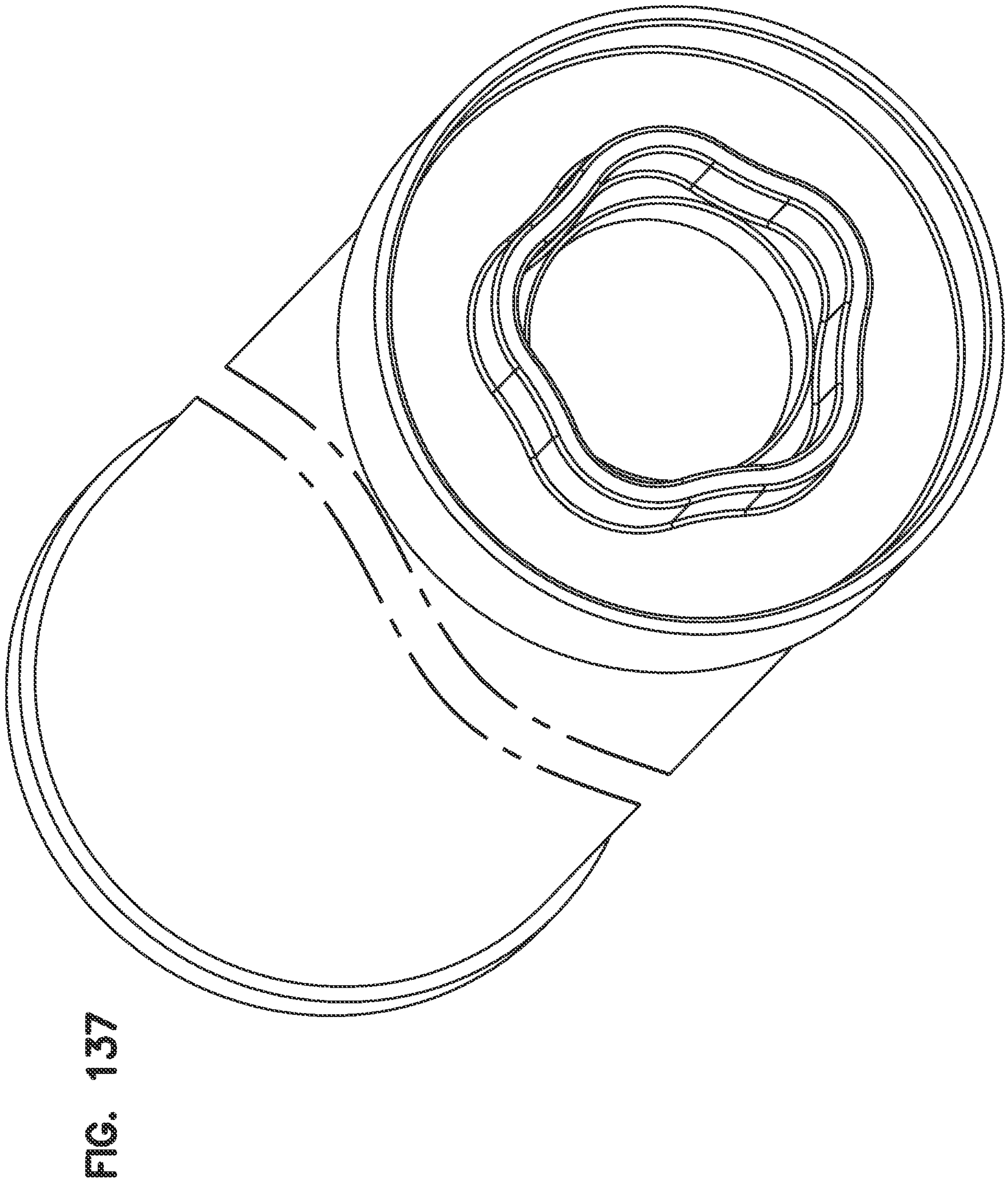

FIG. 137 is a schematic open end perspective view of another filter cartridge usable in an assembly according to, and in accordance with the principles of, the present disclosure; in FIG. 137, phantom or break lines being used to indicate a length variable.

Figure 138:
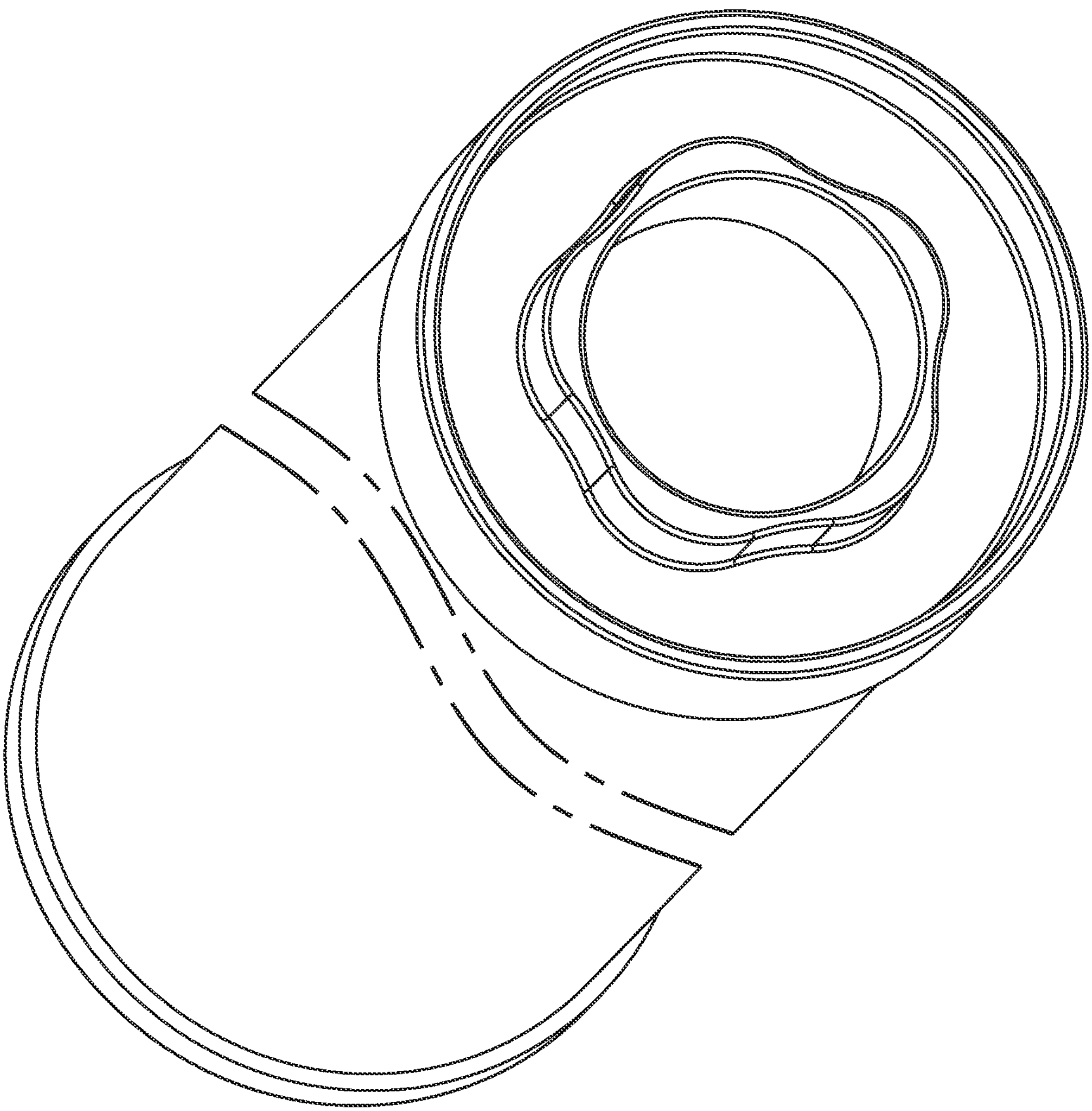

FIG. 138 is a schematic open end perspective view of another filter cartridge usable in an assembly according to, and in accordance with the principles of, the present disclosure; in FIG. 138, phantom or break lines being used to indicate a length variable.

Figure 139:
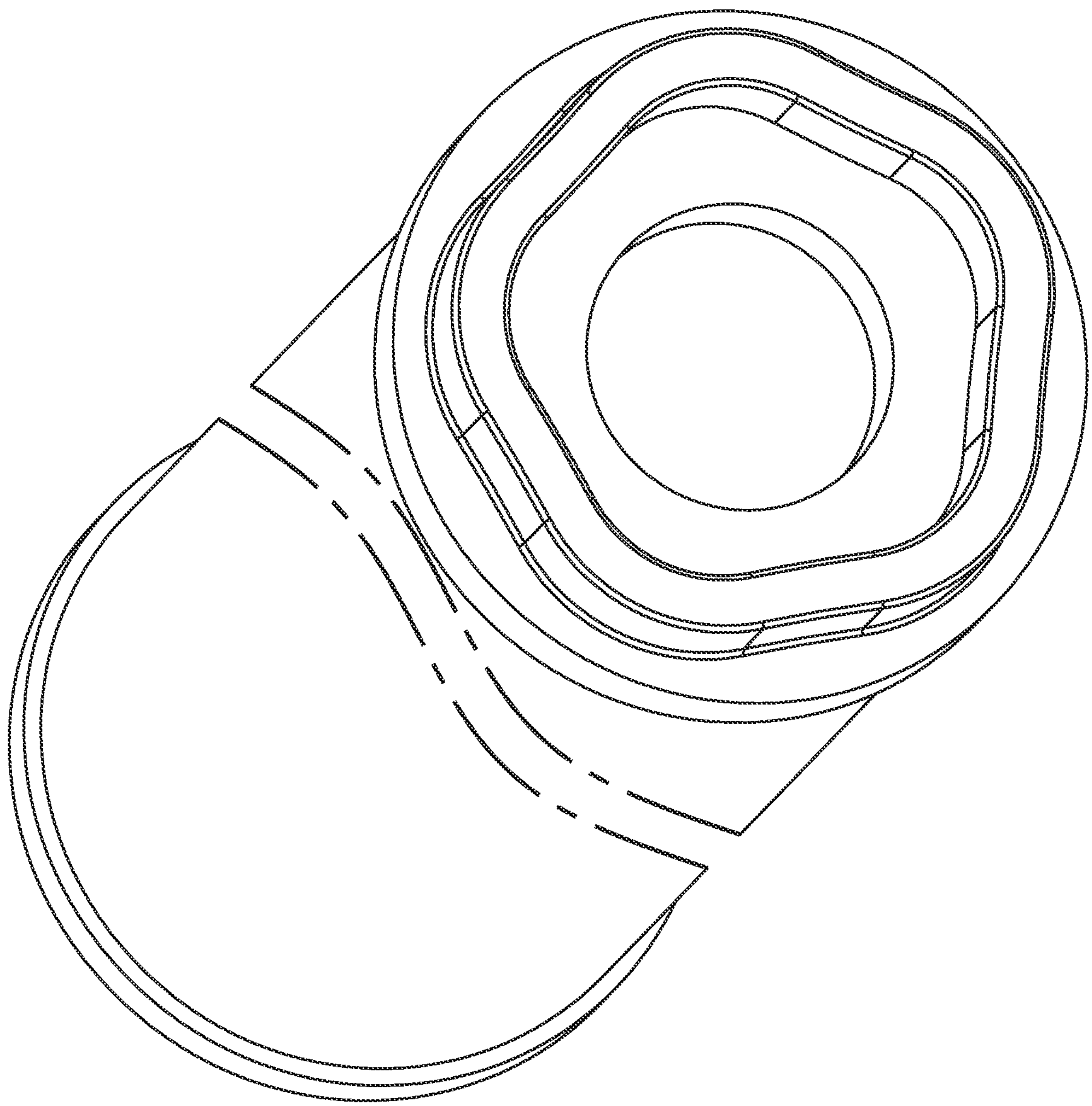

FIG. 139 is a schematic open end perspective view of another filter cartridge usable in an assembly according to, and in accordance with the principles of, the present disclosure; in FIG. 139, phantom or break lines being used to indicate a length variable.

Figure 140:
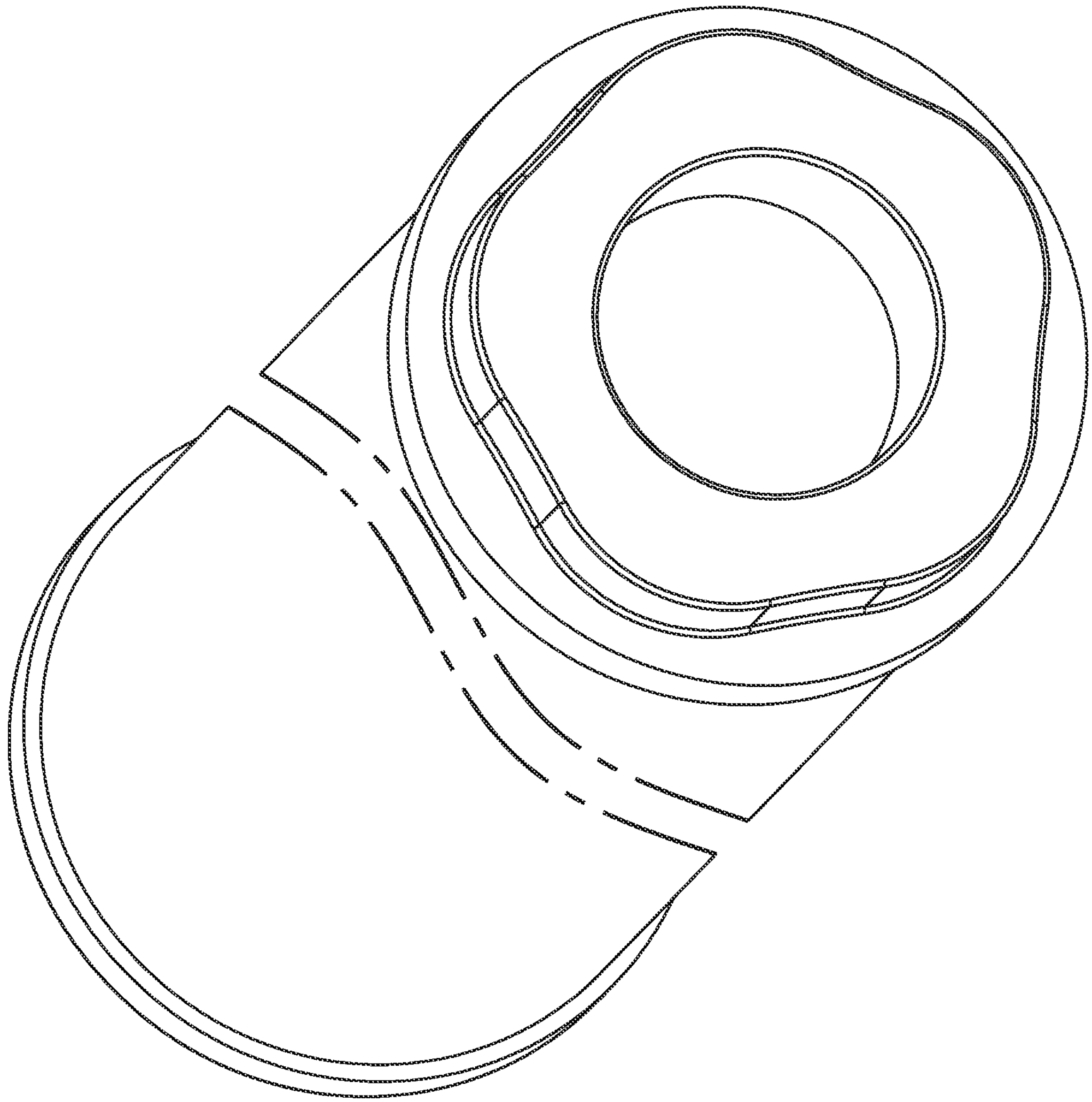

FIG. 140 is a schematic open end perspective view of another filter cartridge usable in an assembly according to, and in accordance with the principles of, the present disclosure; in FIG. 140, phantom or break lines being used to indicate a length variable.

Figure 141:
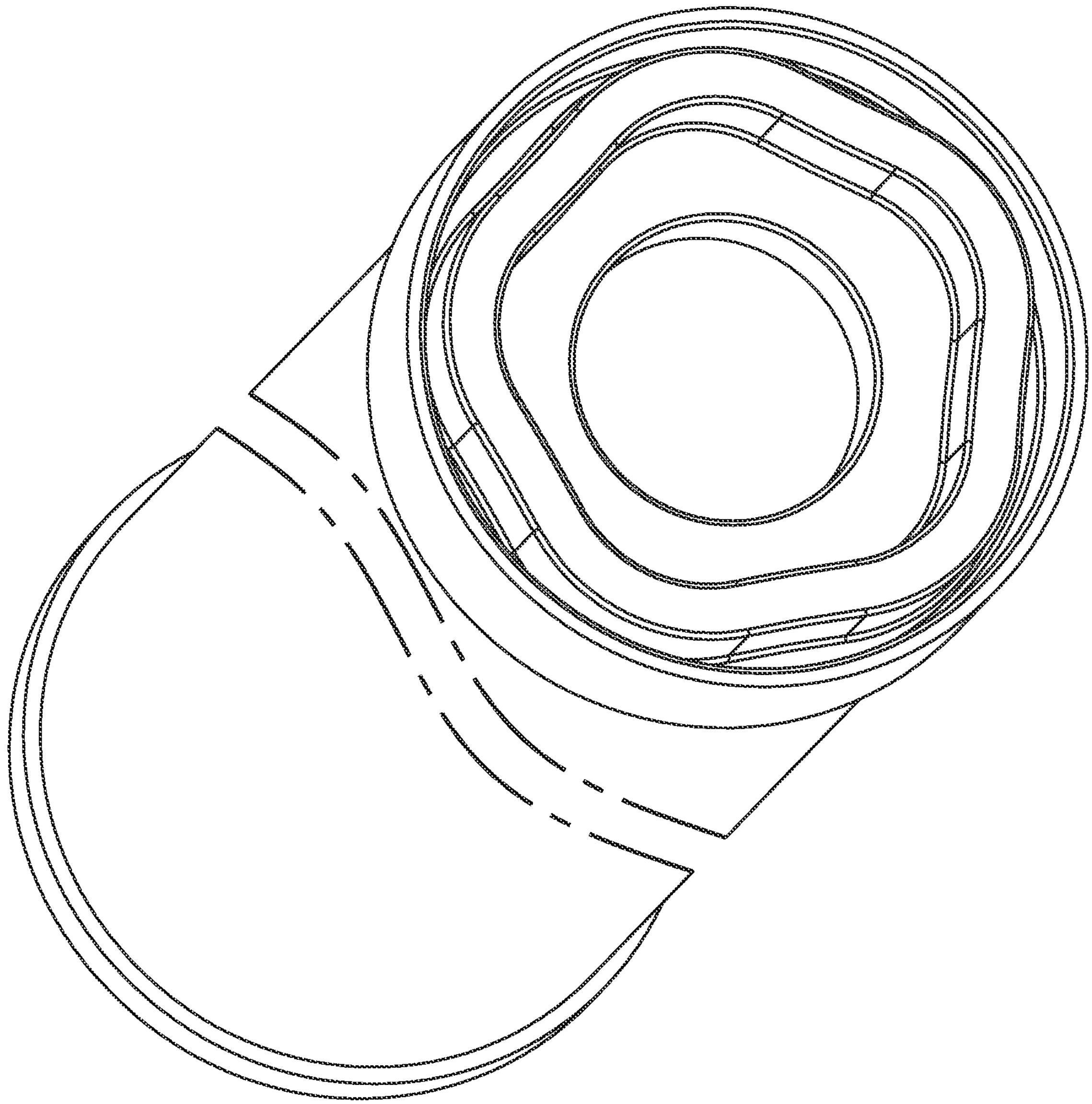

FIG. 141 is a schematic open end perspective view of another filter cartridge usable in an assembly according to, and in accordance with the principles of, the present disclosure; in FIG. 141, phantom or break lines being used to indicate a length variable.

Figure 142:
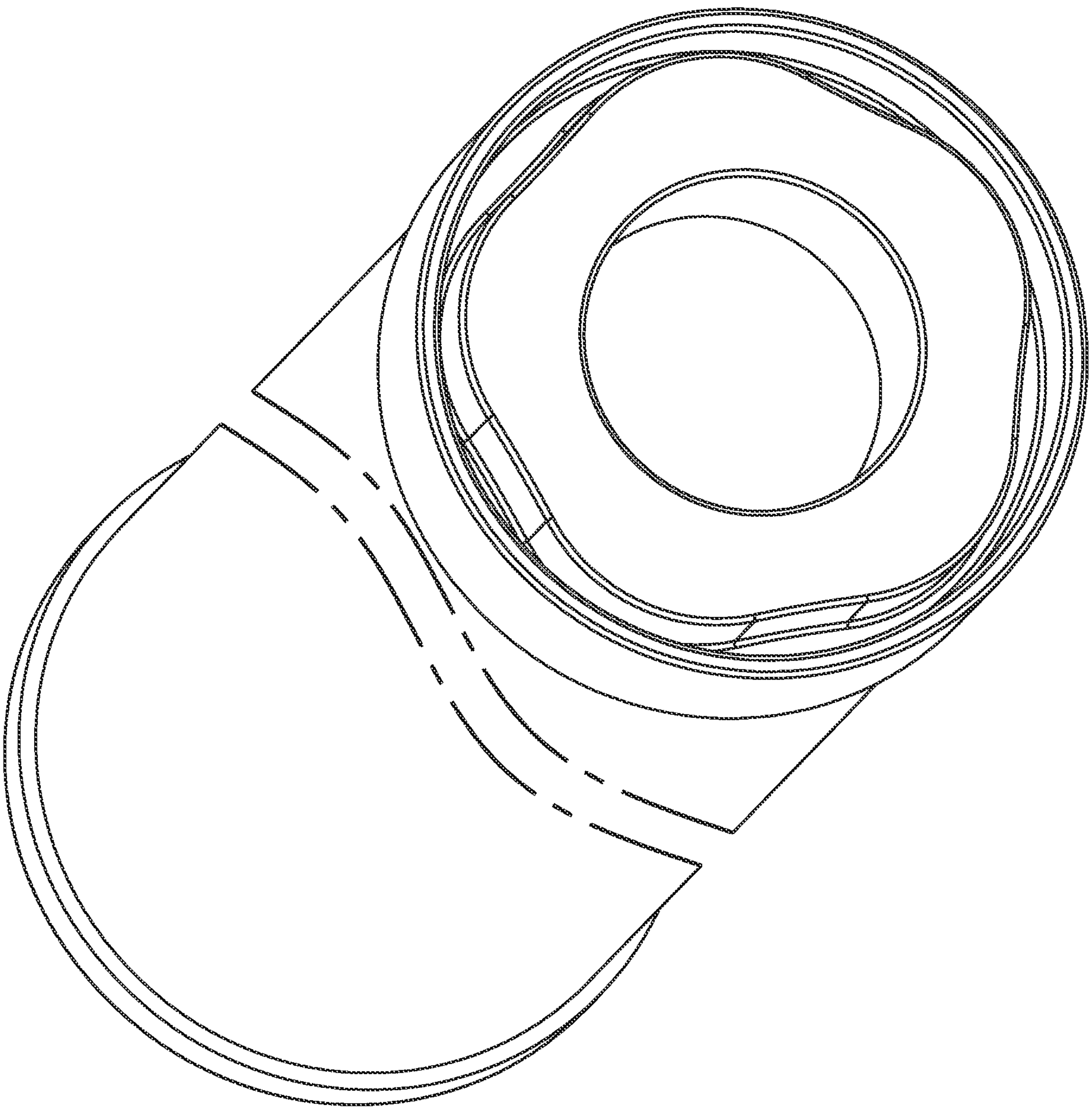

FIG. 142 is a schematic open end perspective view of another filter cartridge usable in an assembly according to, and in accordance with the principles of, the present disclosure; in FIG. 142, phantom or break lines being used to indicate a length variable.

Figure 143:
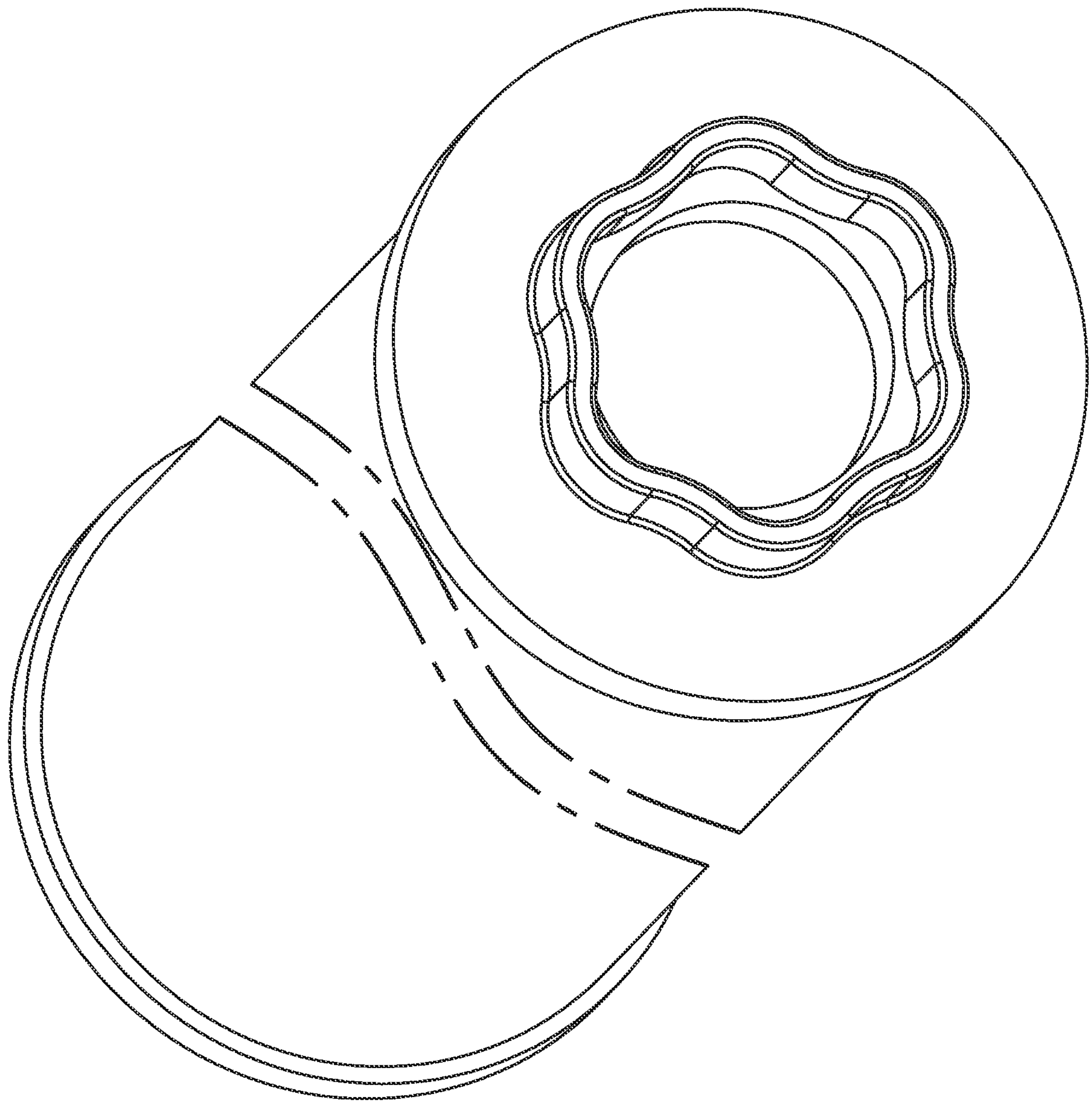

FIG. 143 is a schematic open end perspective view of another filter cartridge usable in an assembly according to, and in accordance with the principles of, the present disclosure; in FIG. 143, phantom or break lines being used to indicate a length variable.

Figure 144:
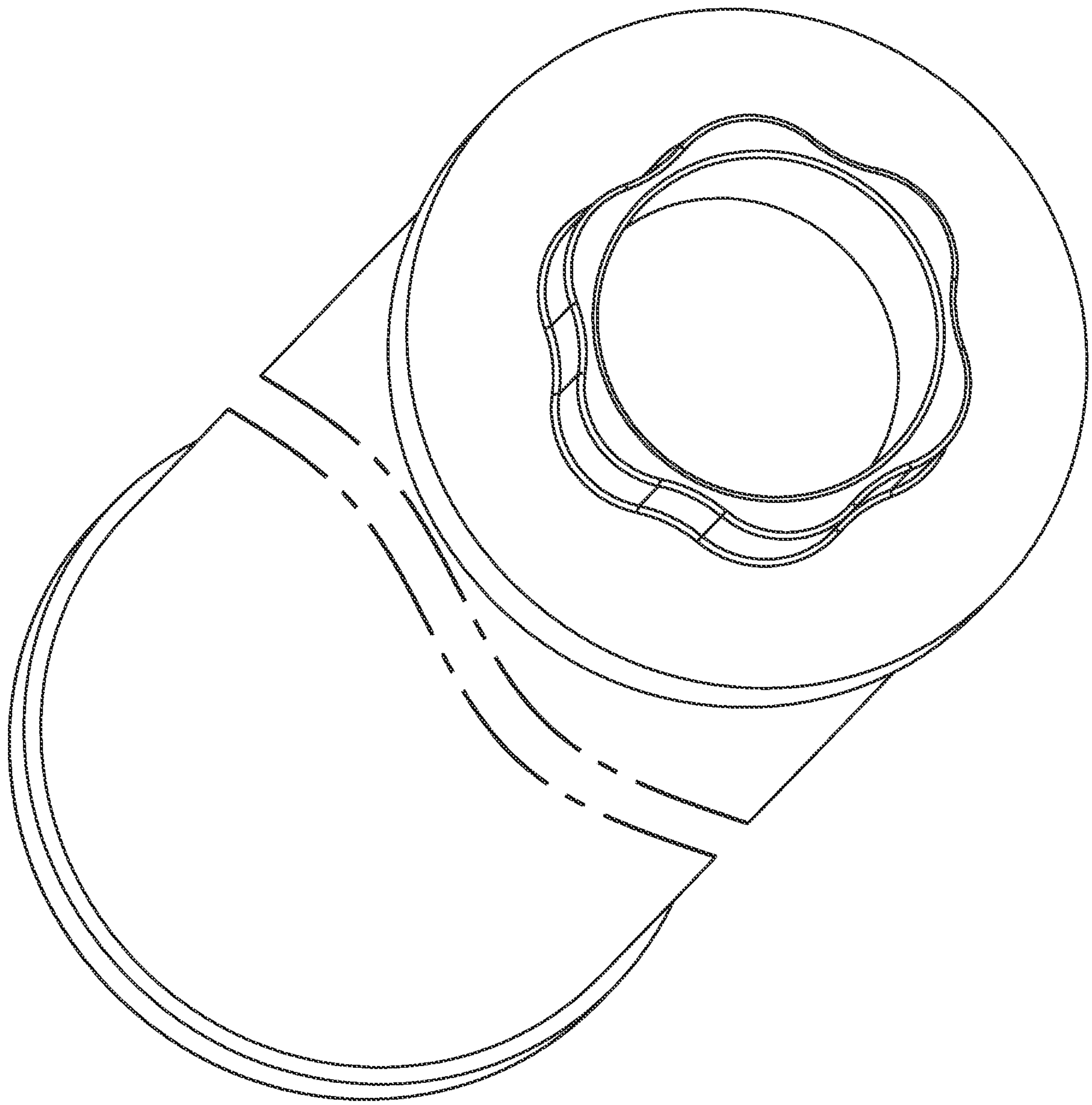

FIG. 144 is a schematic open end perspective view of another filter cartridge usable in an assembly according to, and in accordance with the principles of, the present disclosure; in FIG. 144, phantom or break lines being used to indicate a length variable.

Figure 145:
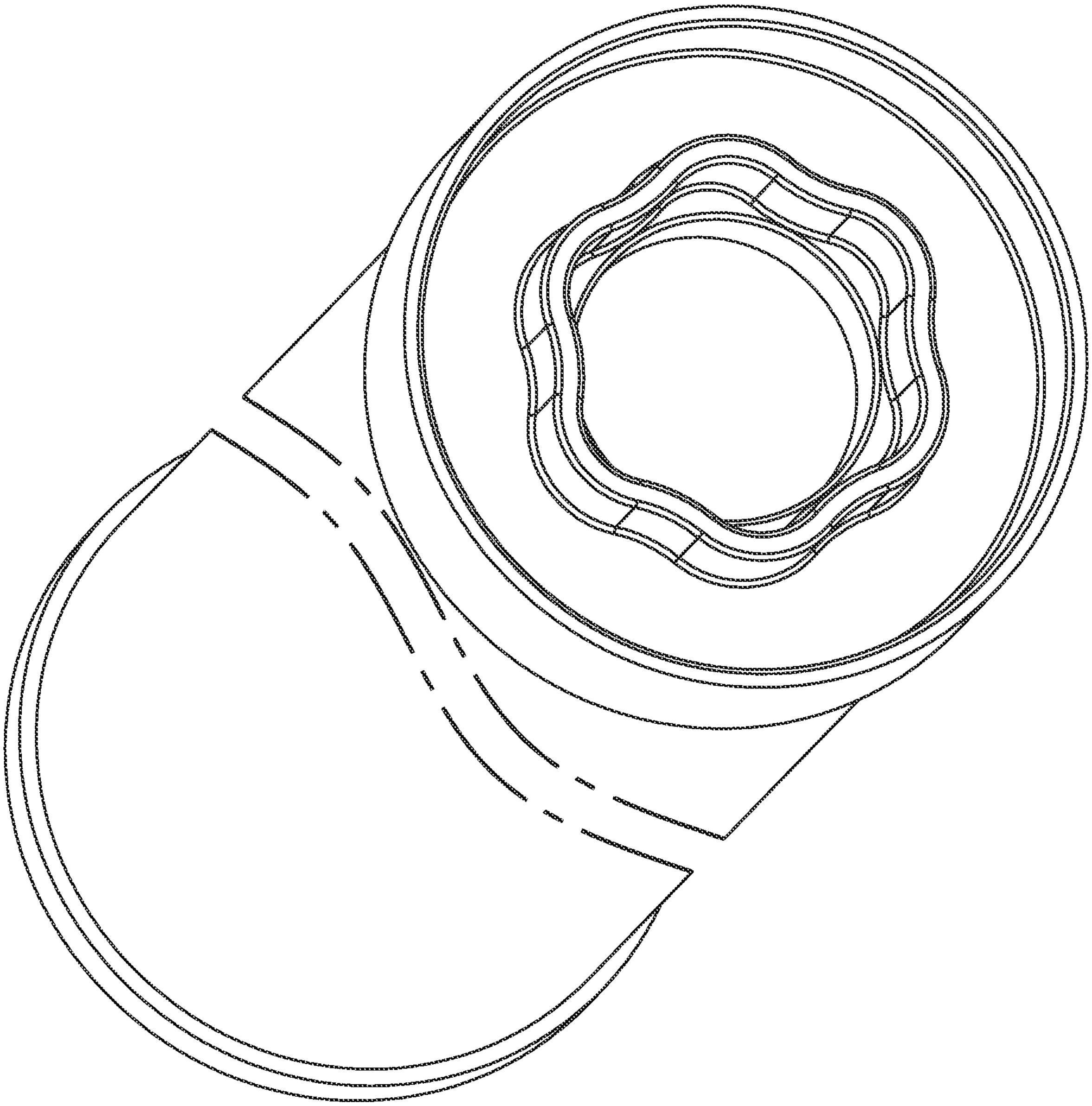

FIG. 145 is a schematic open end perspective view of another filter cartridge usable in an assembly according to, and in accordance with the principles of, the present disclosure; in FIG. 145, phantom or break lines being used to indicate a length variable.

Figure 146:
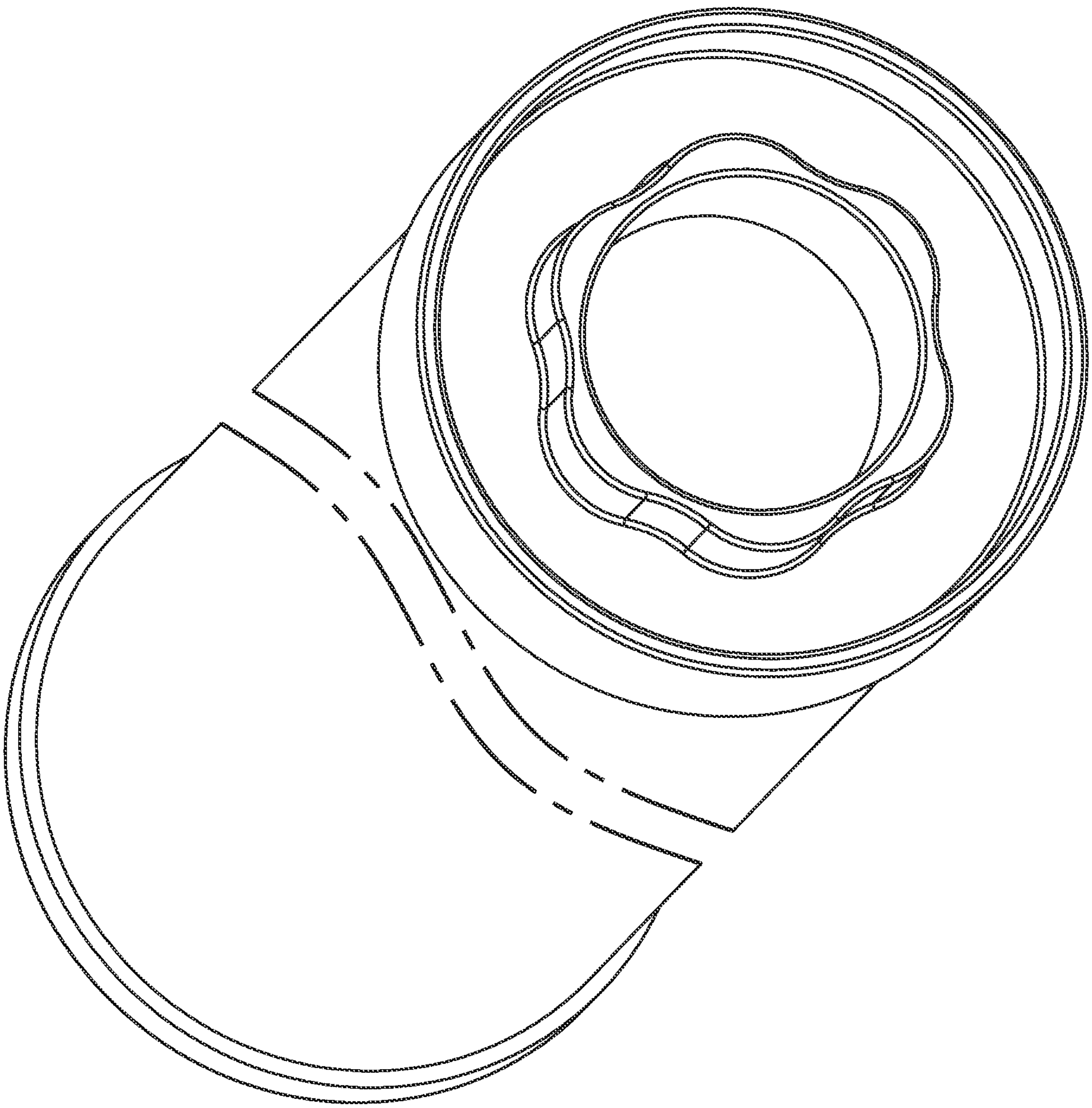

FIG. 146 is a schematic open end perspective view of another filter cartridge usable in an assembly according to, and in accordance with the principles of, the present disclosure; in FIG. 146, phantom or break lines being used to indicate a length variable.

Figure 147:
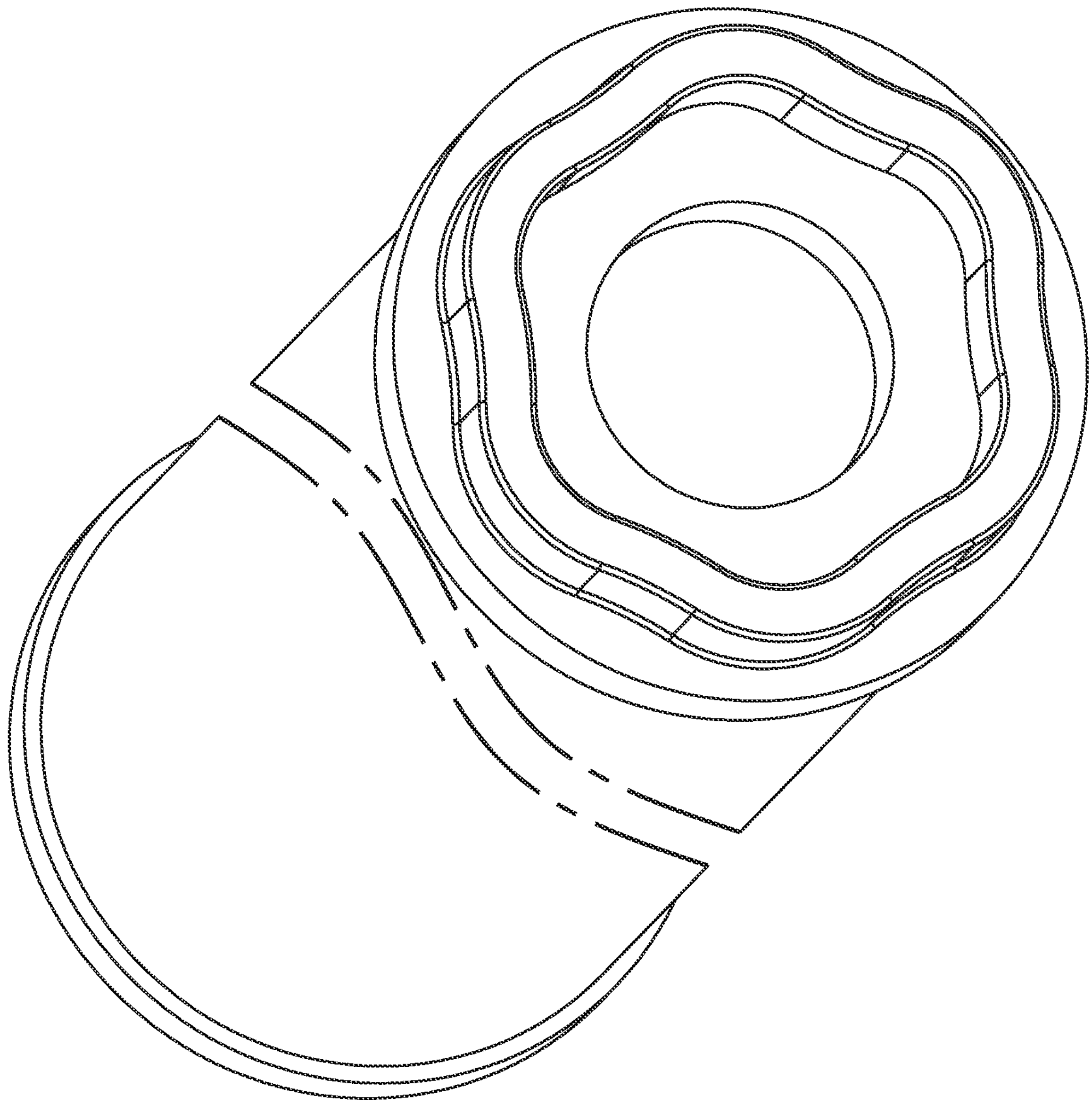

FIG. 147 is a schematic open end perspective view of another filter cartridge usable in an assembly according to, and in accordance with the principles of, the present disclosure; in FIG. 147, phantom or break lines being used to indicate a length variable.

Figure 148:
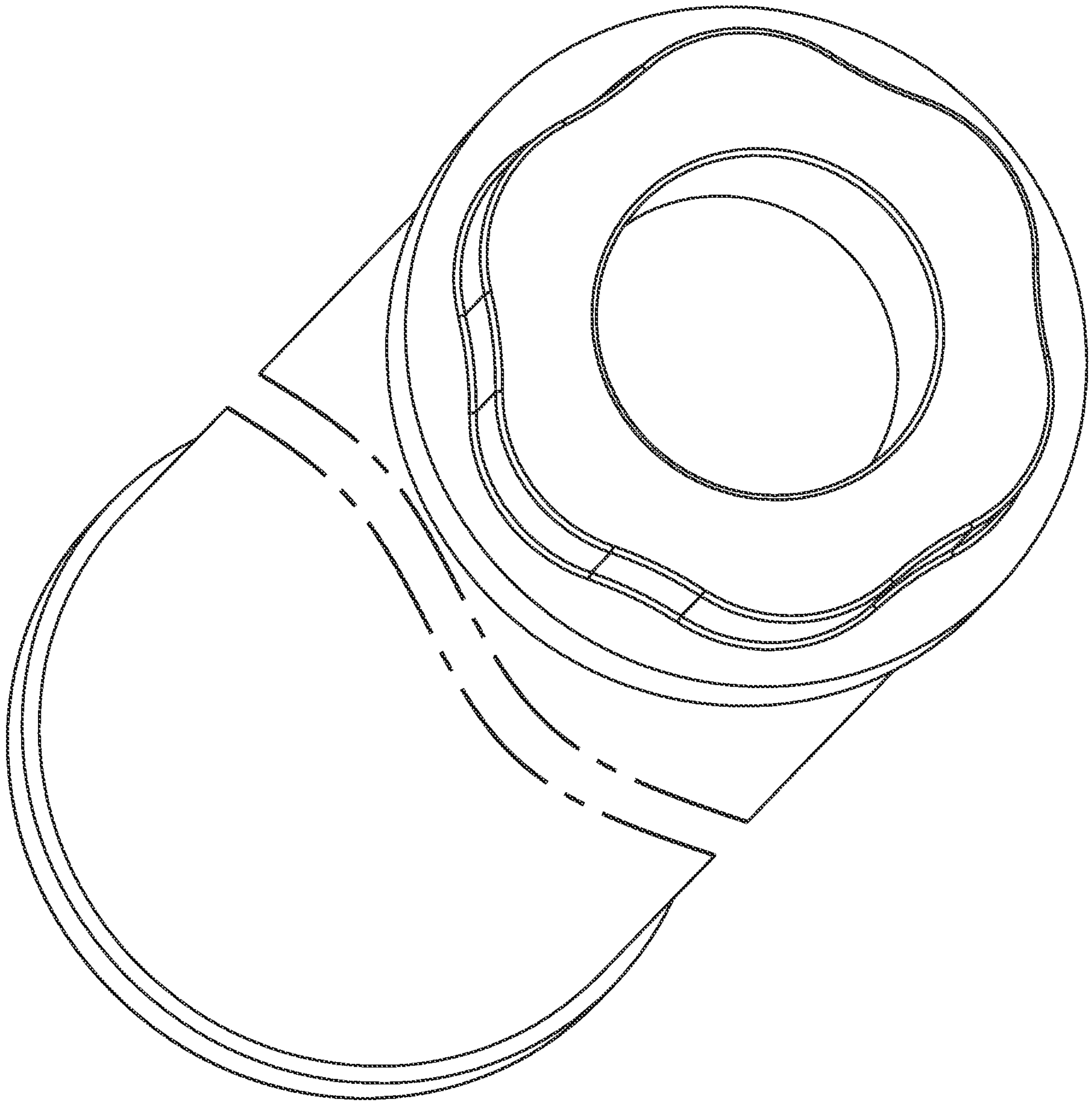

FIG. 148 is a schematic open end perspective view of another filter cartridge usable in an assembly according to, and in accordance with the principles of, the present disclosure; in FIG. 148, phantom or break lines being used to indicate a length variable.

Figure 149:
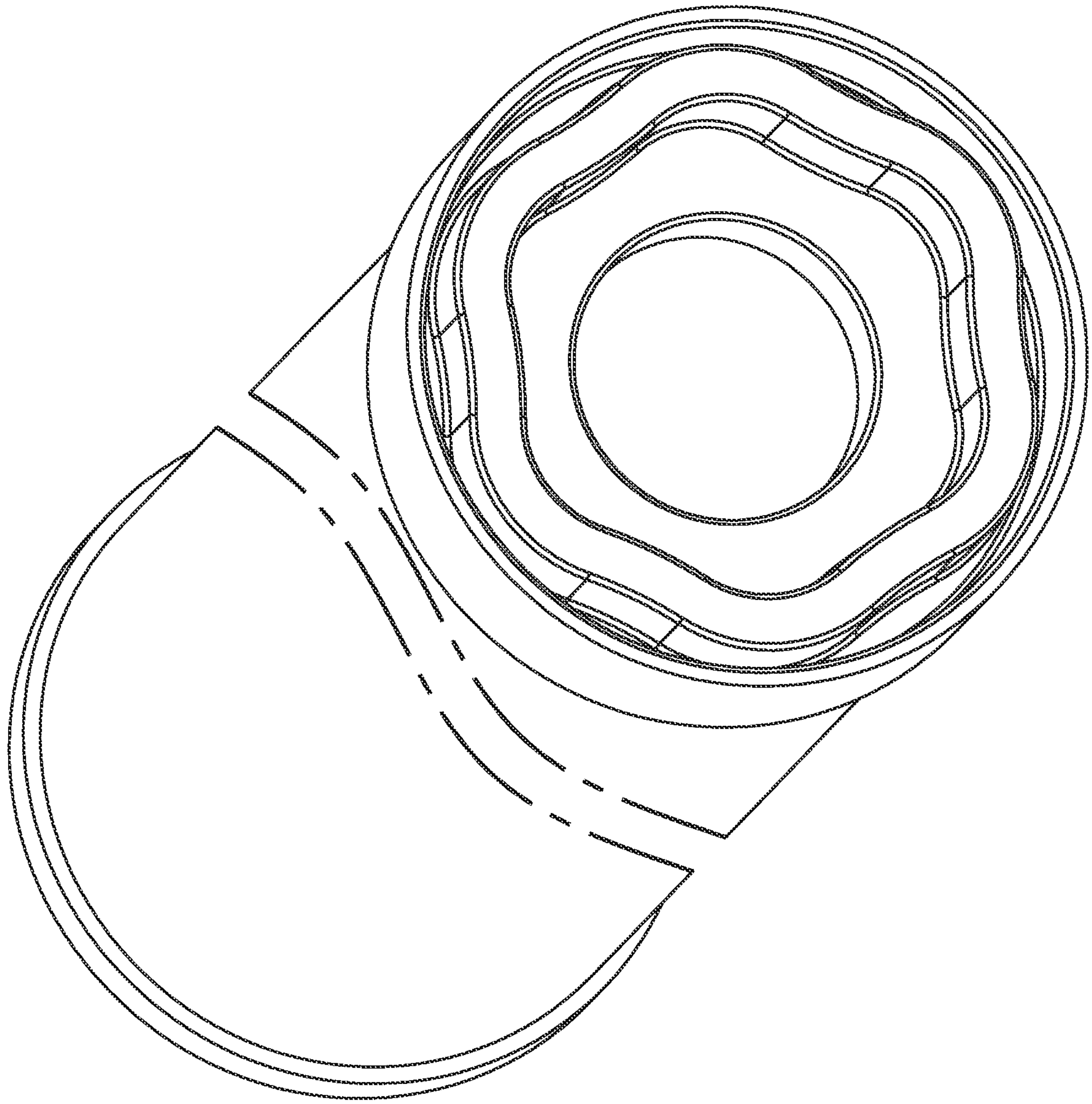

FIG. 149 is a schematic open end perspective view of another filter cartridge usable in an assembly according to, and in accordance with the principles of, the present disclosure; in FIG. 149, phantom or break lines being used to indicate a length variable.

Figure 150:
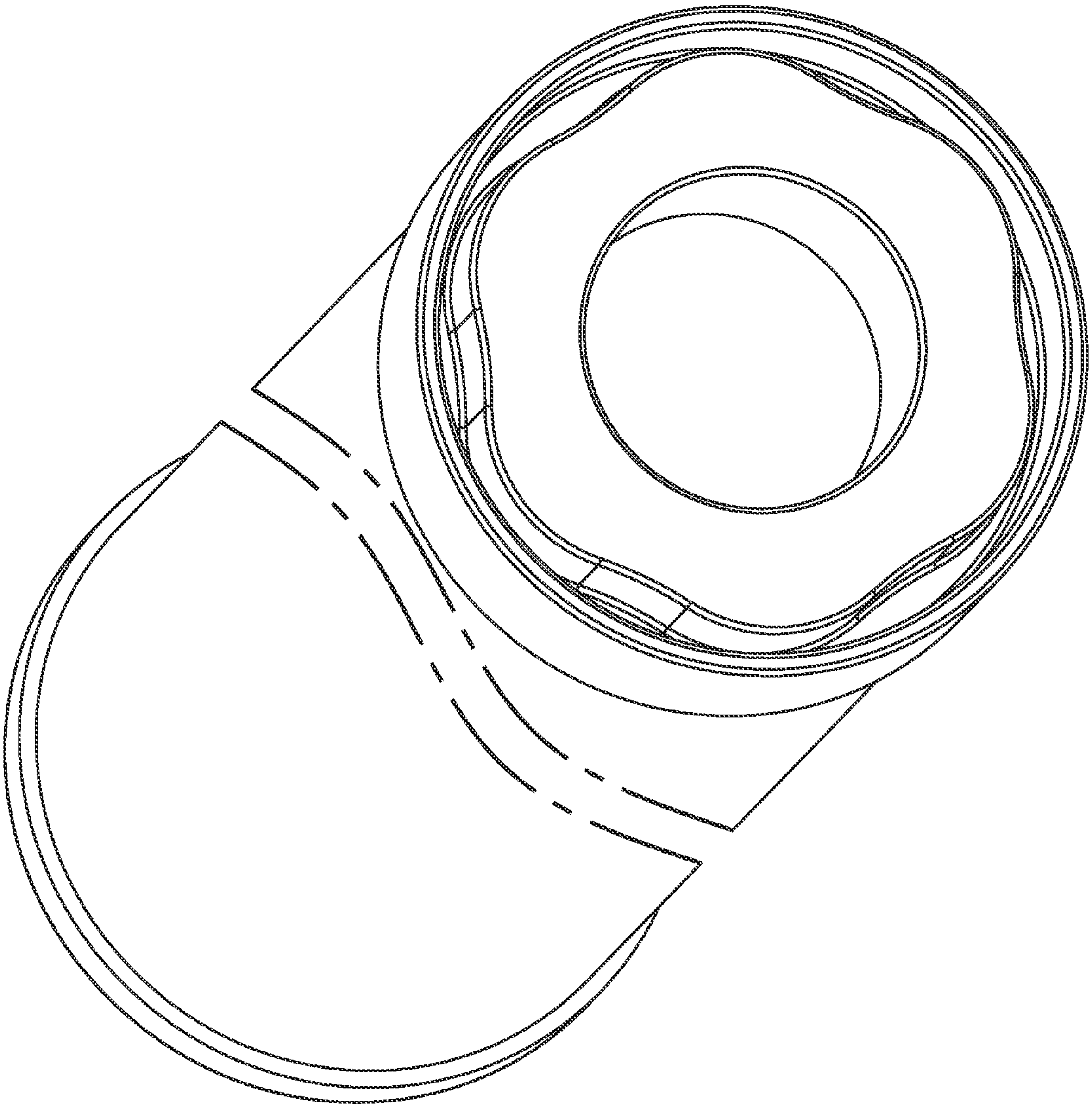

FIG. 150 is a schematic open end perspective view of another filter cartridge usable in an assembly according to, and in accordance with the principles of, the present disclosure; in FIG. 150, phantom or break lines being used to indicate a length variable.

Figure 151:
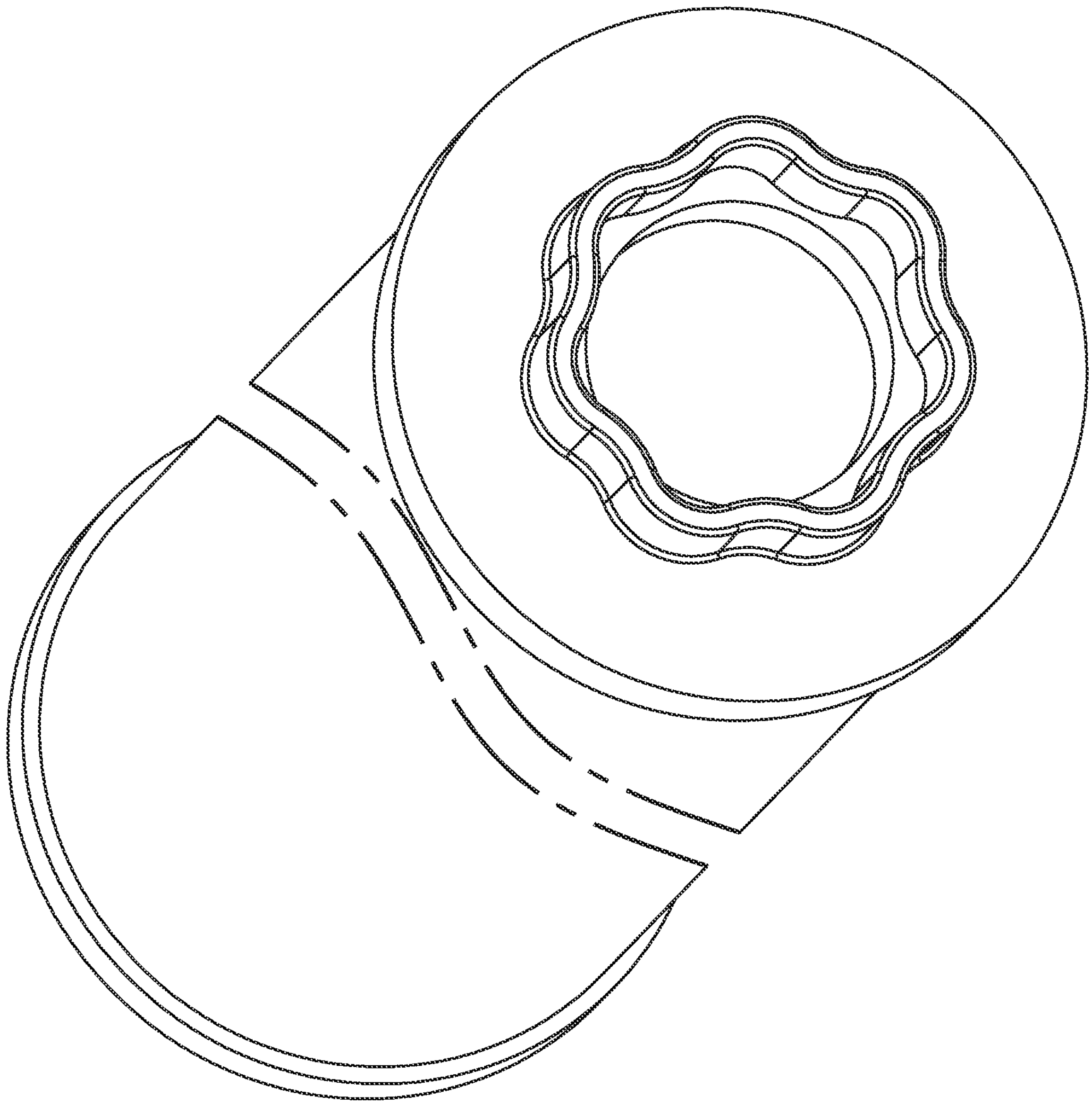

FIG. 151 is a schematic open end perspective view of another filter cartridge usable in an assembly according to, and in accordance with the principles of, the present disclosure; in FIG. 151, phantom or break lines being used to indicate a length variable.

Figure 152:
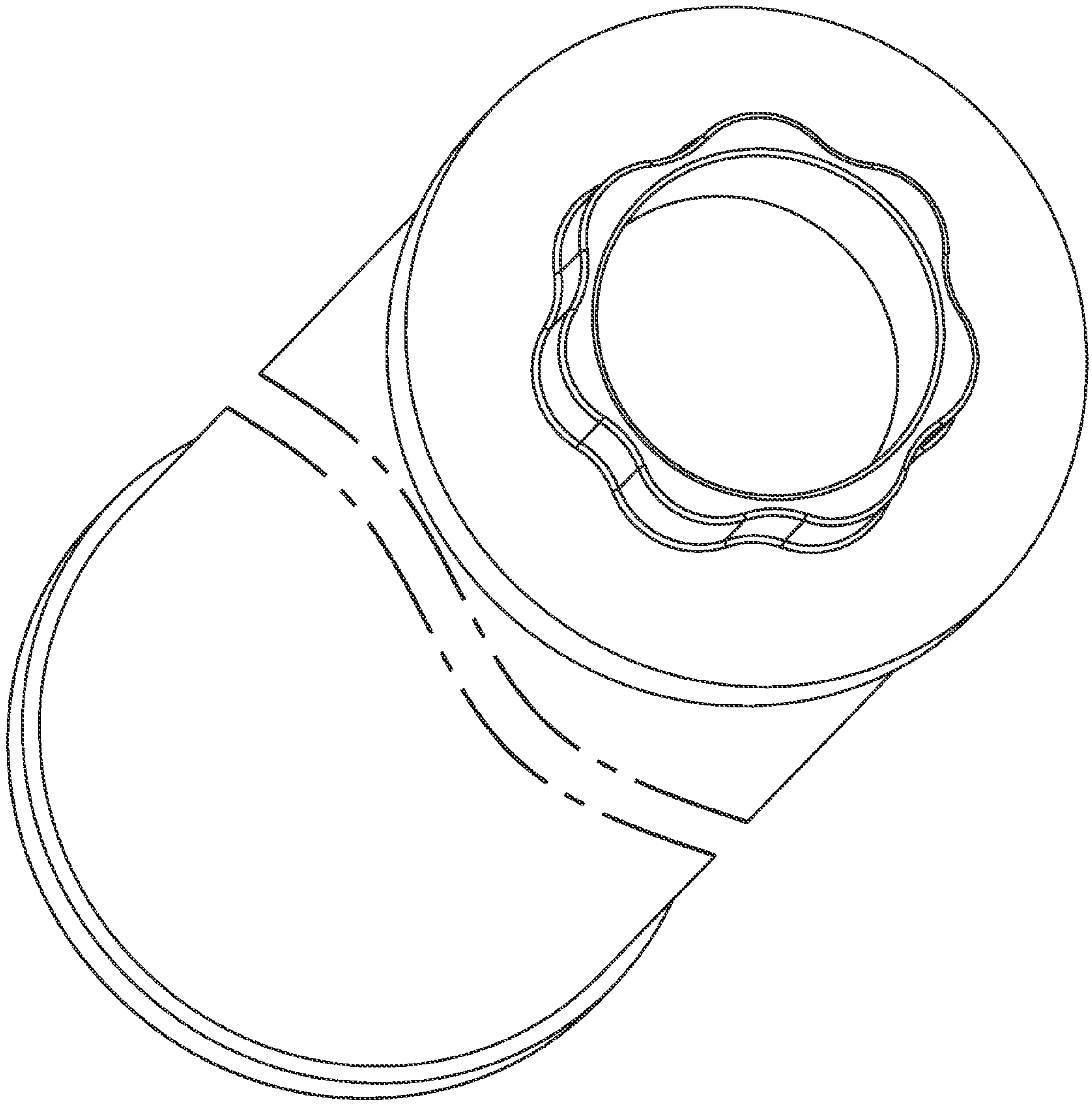

FIG. 152 is a schematic open end perspective view of another filter cartridge usable in an assembly according to, and in accordance with the principles of, the present disclosure; in FIG. 152, phantom or break lines being used to indicate a length variable.

Figure 153:
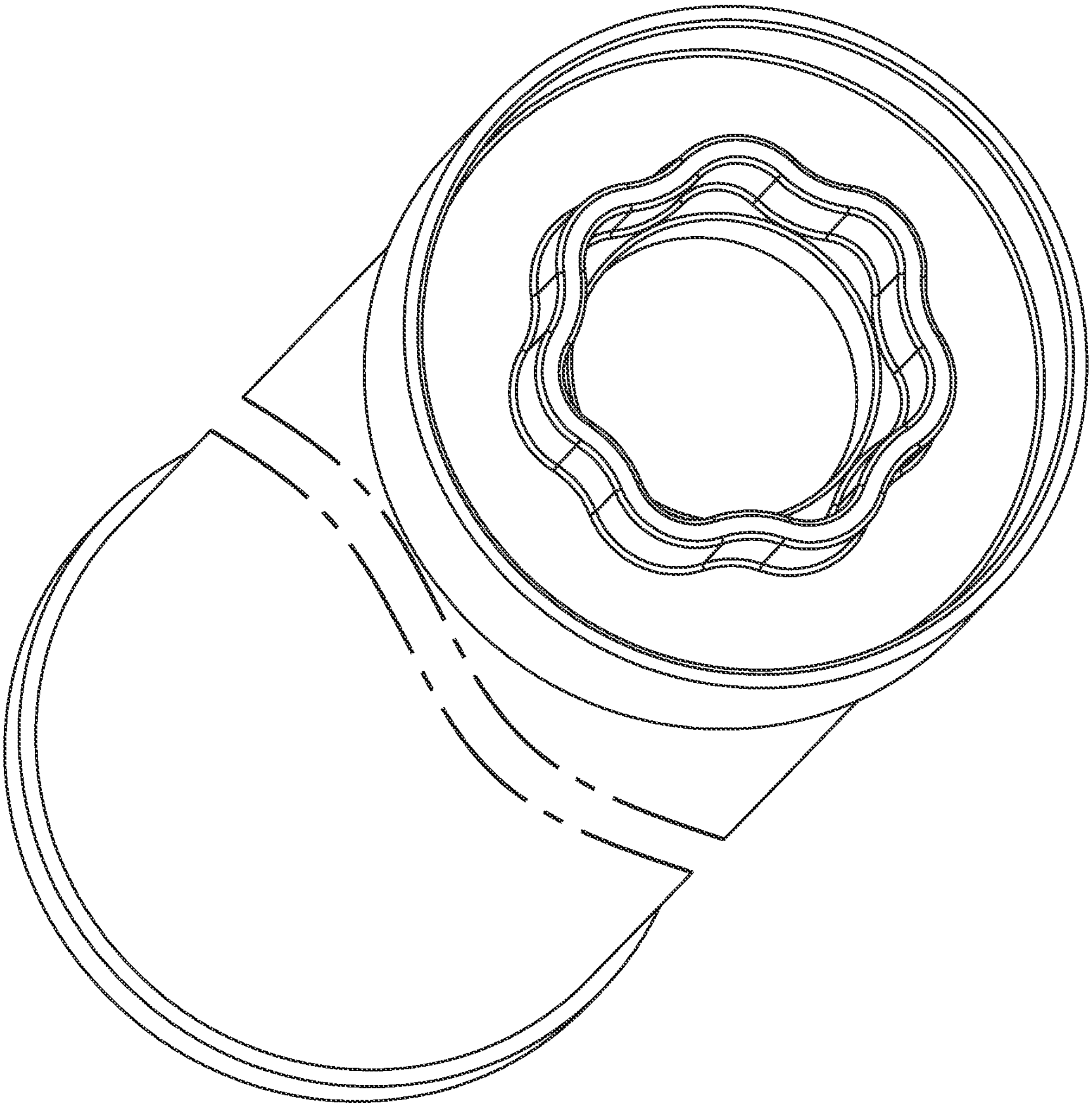

FIG. 153 is a schematic open end perspective view of another filter cartridge usable in an assembly according to, and in accordance with the principles of, the present disclosure; in FIG. 153, phantom or break lines being used to indicate a length variable.

Figure 154:
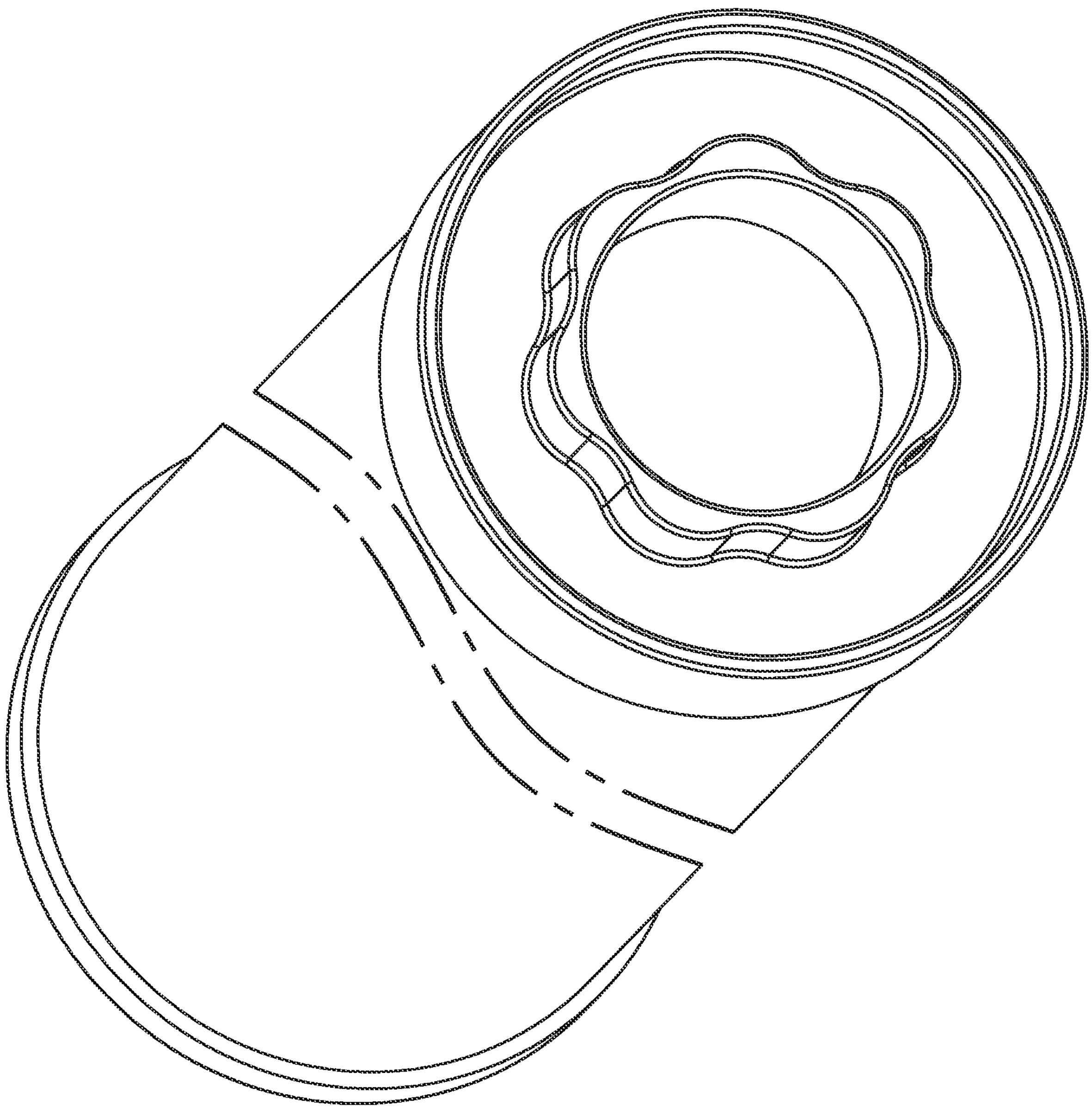

FIG. 154 is a schematic open end perspective view of another filter cartridge usable in an assembly according to, and in accordance with the principles of, the present disclosure; in FIG. 154, phantom or break lines being used to indicate a length variable.

Figure 155:
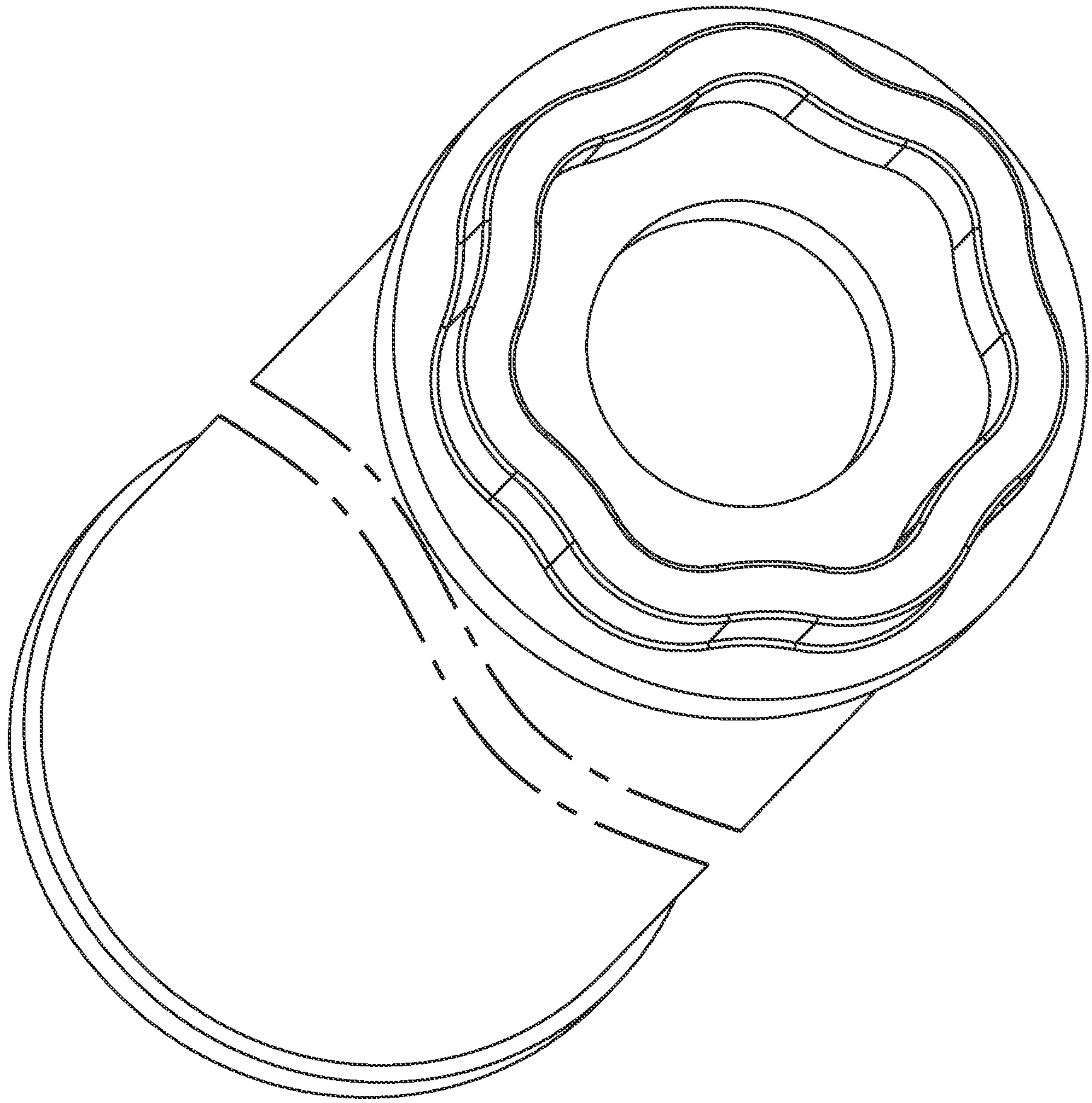

FIG. 155 is a schematic open end perspective view of another filter cartridge usable in an assembly according to, and in accordance with the principles of, the present disclosure; in FIG. 155, phantom or break lines being used to indicate a length variable.

Figure 156:
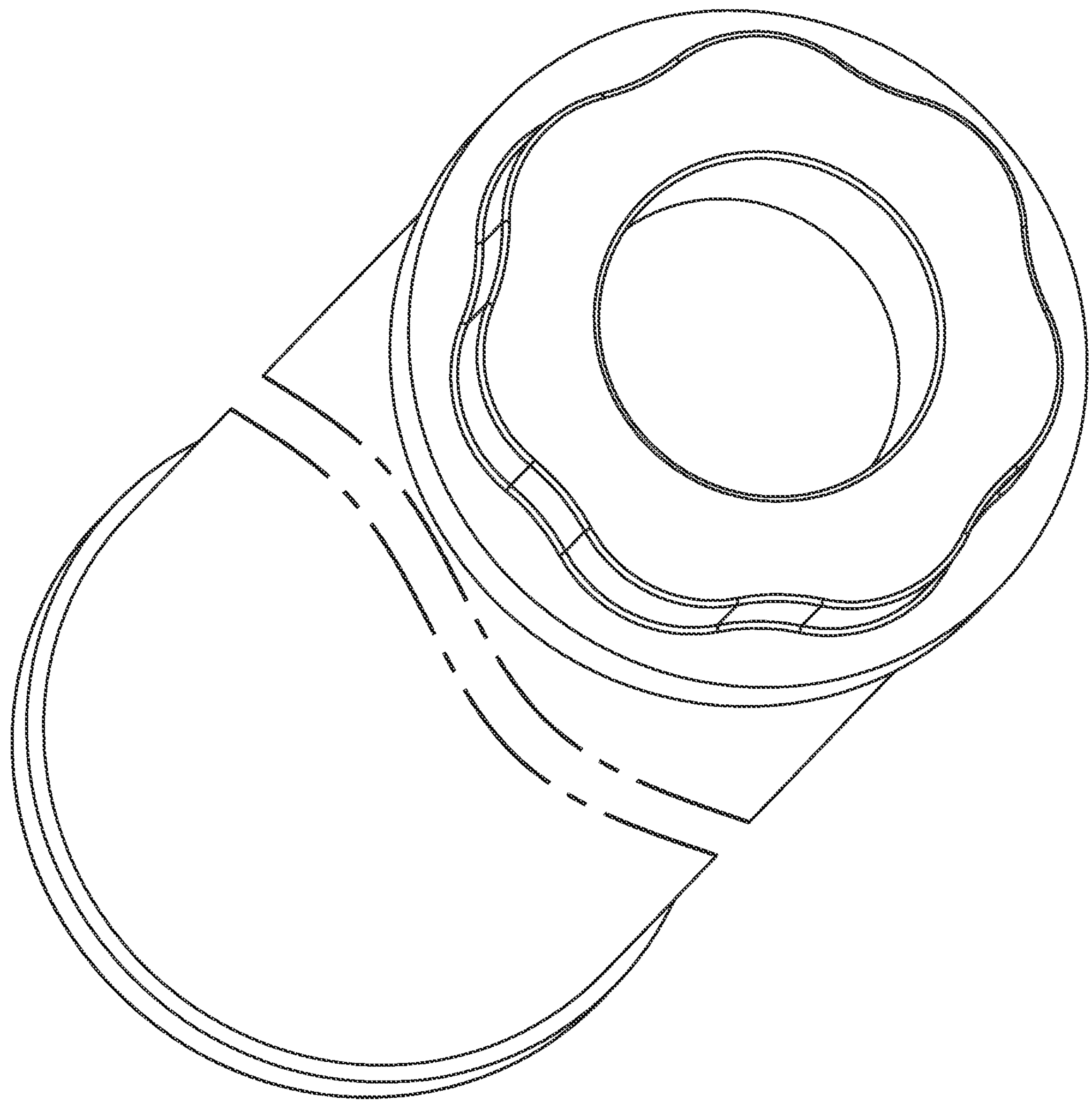

FIG. 156 is a schematic open end perspective view of another filter cartridge usable in an assembly according to, and in accordance with the principles of, the present disclosure; in FIG. 156, phantom or break lines being used to indicate a length variable.

Figure 157:
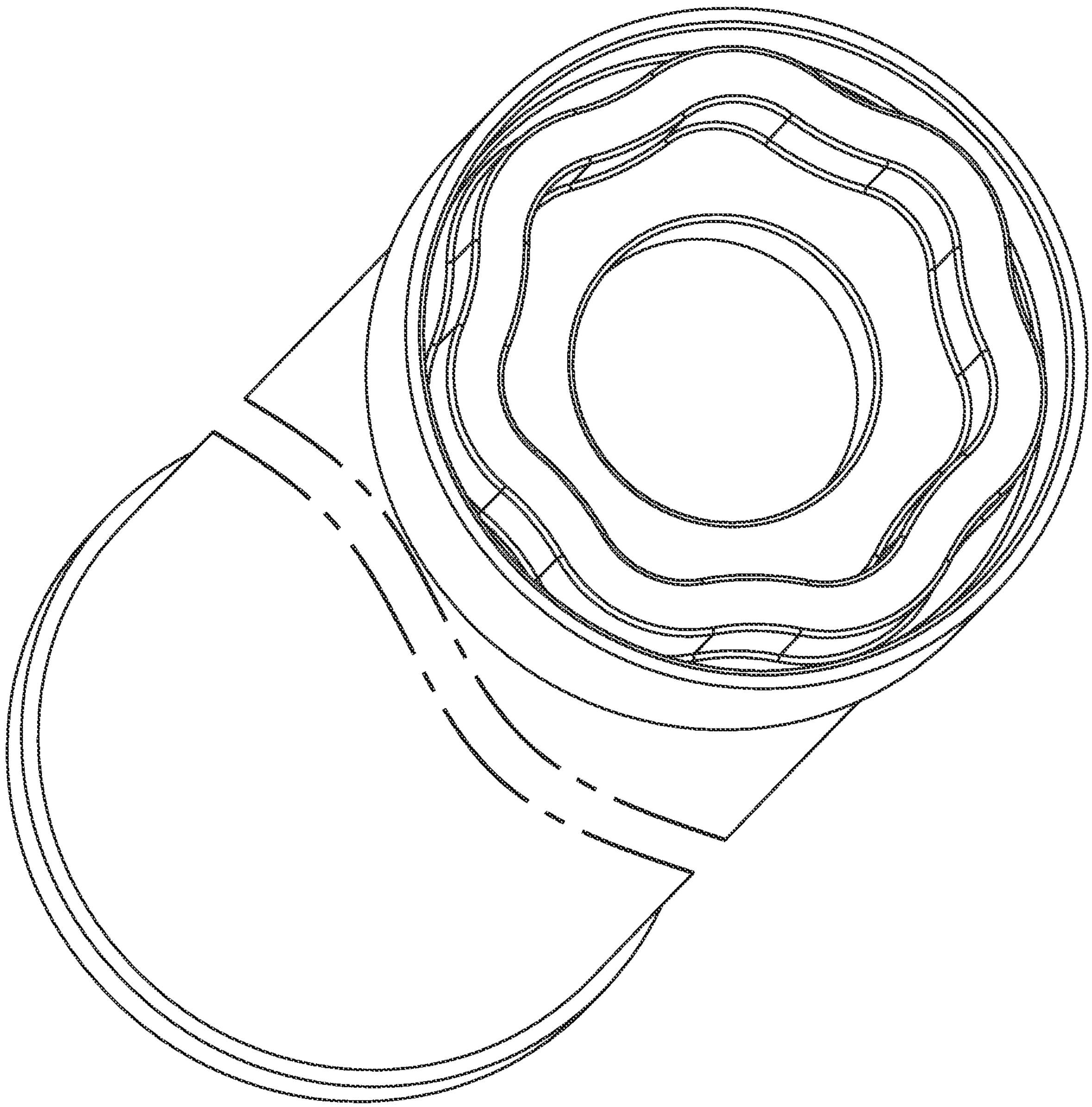

FIG. 157 is a schematic open end perspective view of another filter cartridge usable in an assembly according to, and in accordance with the principles of, the present disclosure; in FIG. 157, phantom or break lines being used to indicate a length variable.

Figure 158:
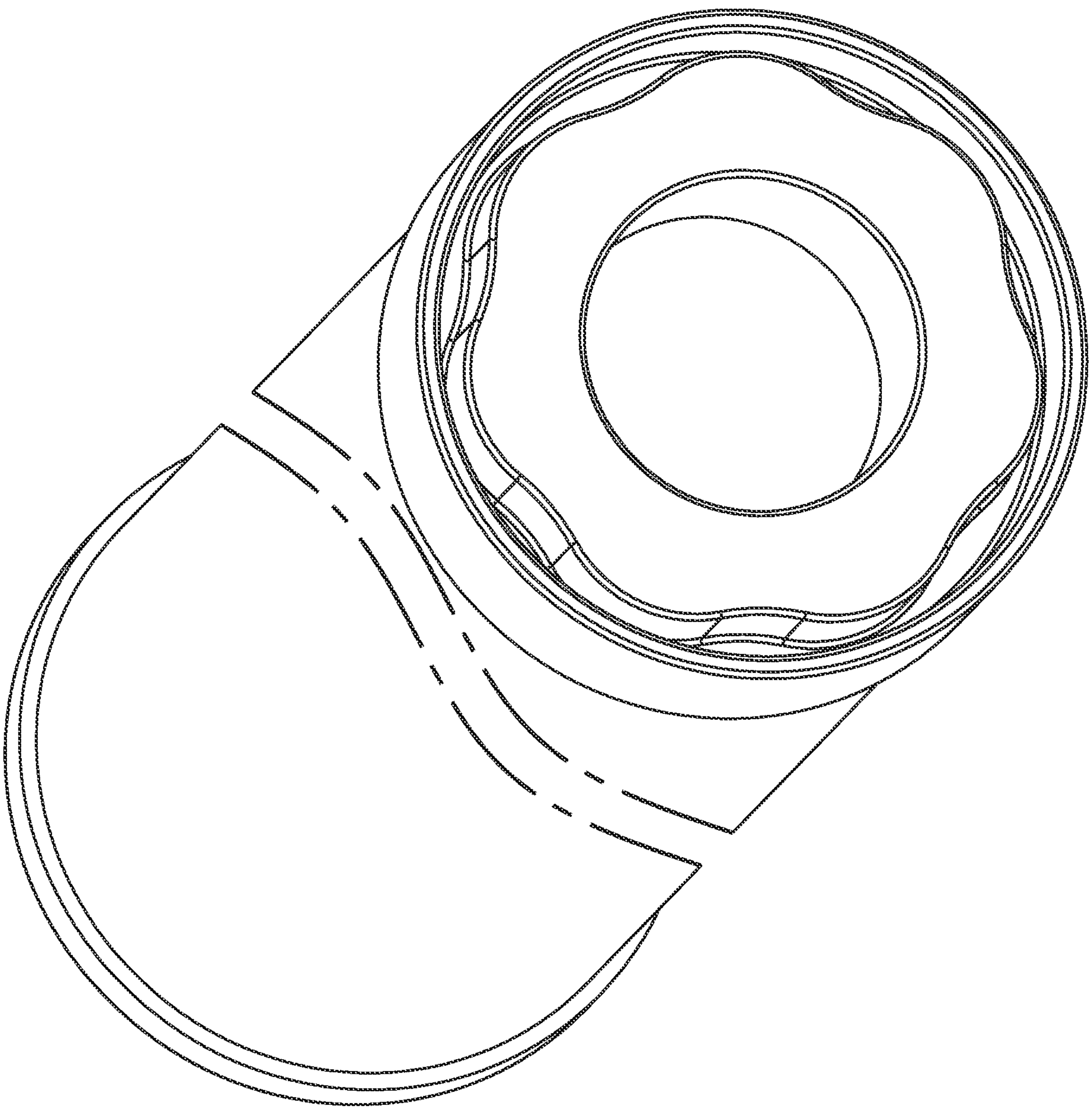

FIG. 158 is a schematic open end perspective view of another filter cartridge usable in an assembly according to, and in accordance with the principles of, the present disclosure; in FIG. 158, phantom or break lines being used to indicate a length variable.

Figure 159:
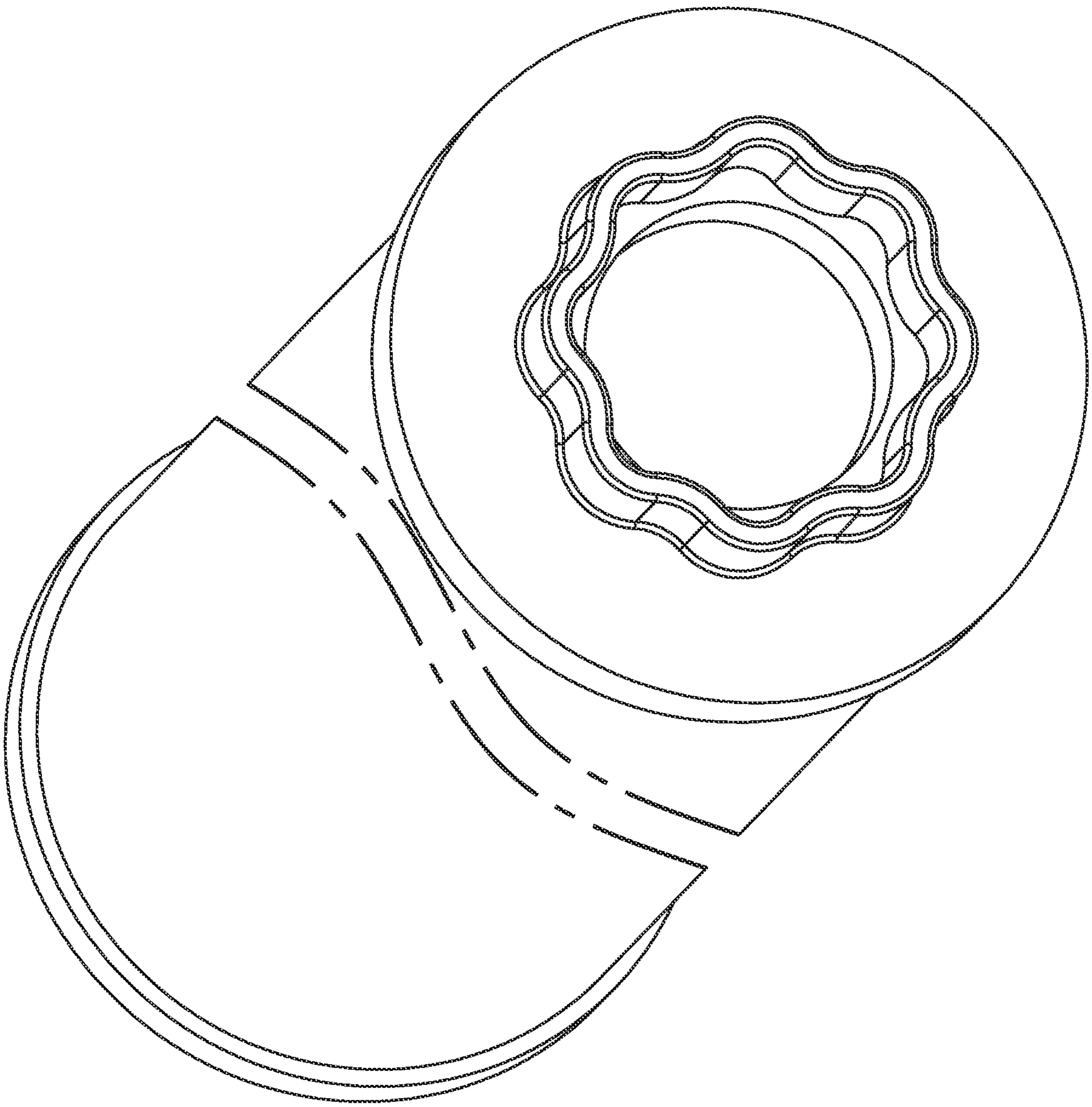

FIG. 159 is a schematic open end perspective view of another filter cartridge usable in an assembly according to, and in accordance with the principles of, the present disclosure; in FIG. 159, phantom or break lines being used to indicate a length variable.

Figure 160:
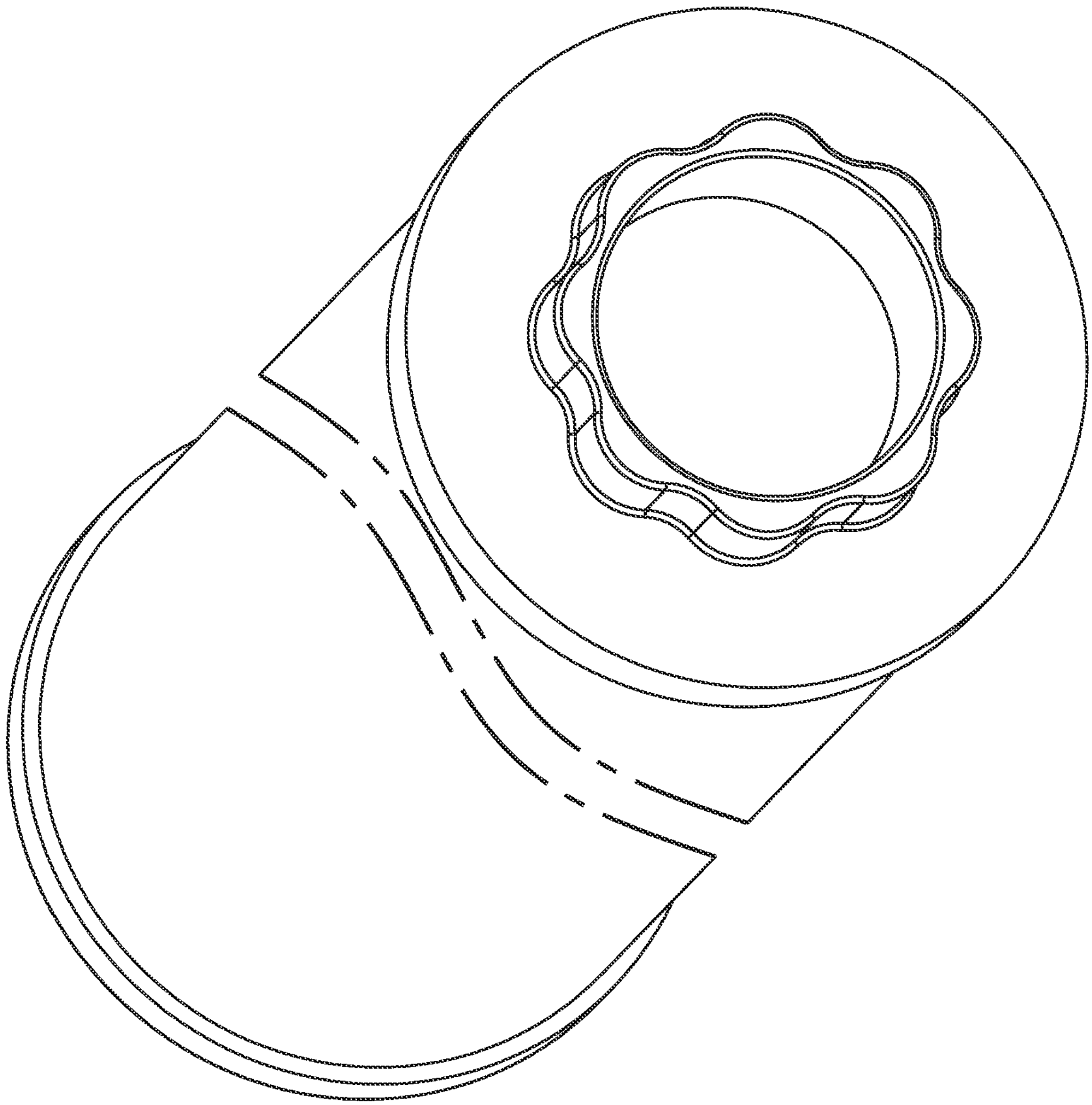

FIG. 160 is a schematic open end perspective view of another filter cartridge usable in an assembly according to, and in accordance with the principles of, the present disclosure; in FIG. 160, phantom or break lines being used to indicate a length variable.

Figure 161:
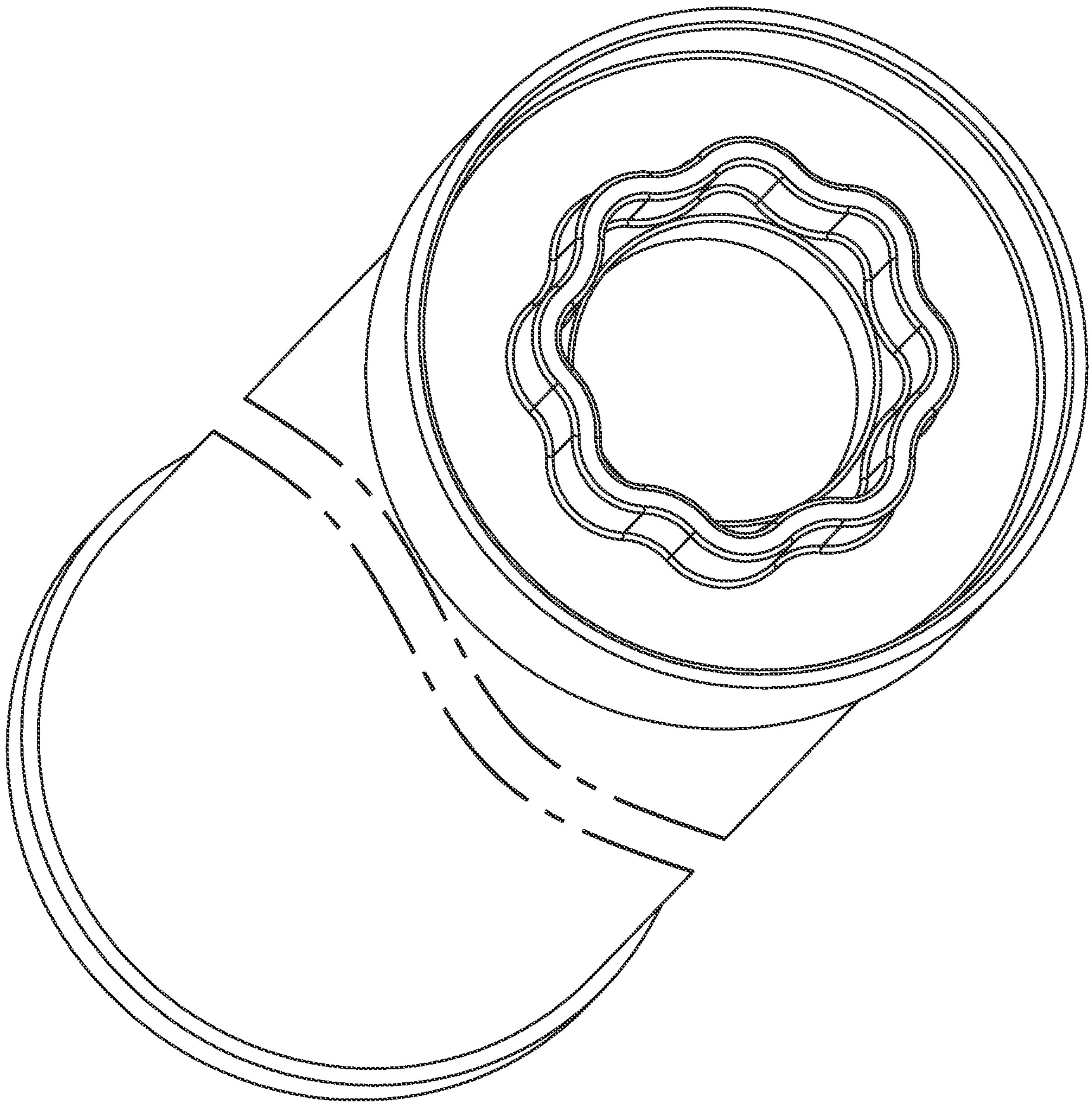

FIG. 161 is a schematic open end perspective view of another filter cartridge usable in an assembly according to, and in accordance with the principles of, the present disclosure; in FIG. 161, phantom or break lines being used to indicate a length variable.

Figure 162:
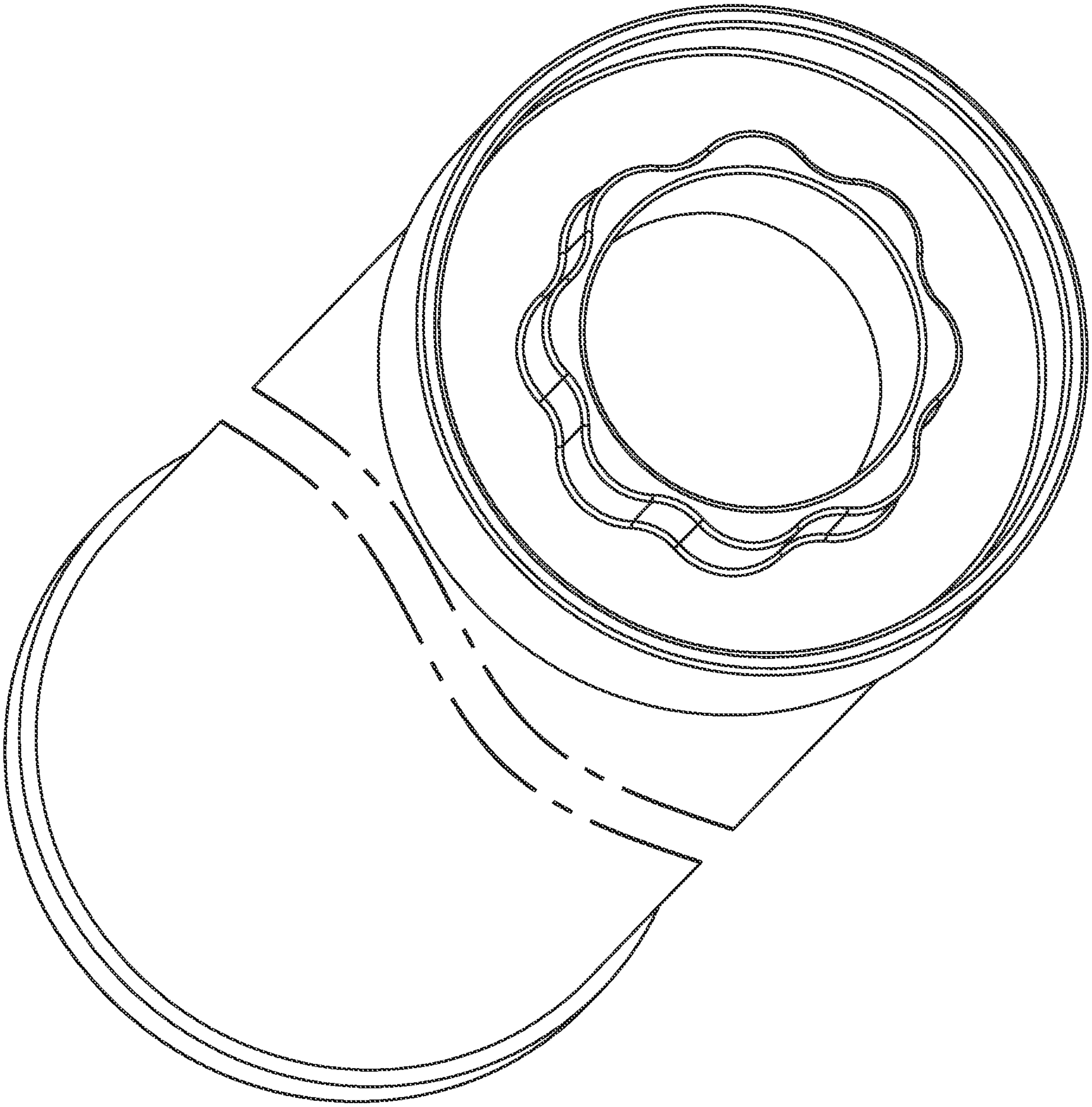

FIG. 162 is a schematic open end perspective view of another filter cartridge usable in an assembly according to, and in accordance with the principles of, the present disclosure; in FIG. 162, phantom or break lines being used to indicate a length variable.

Figure 163:
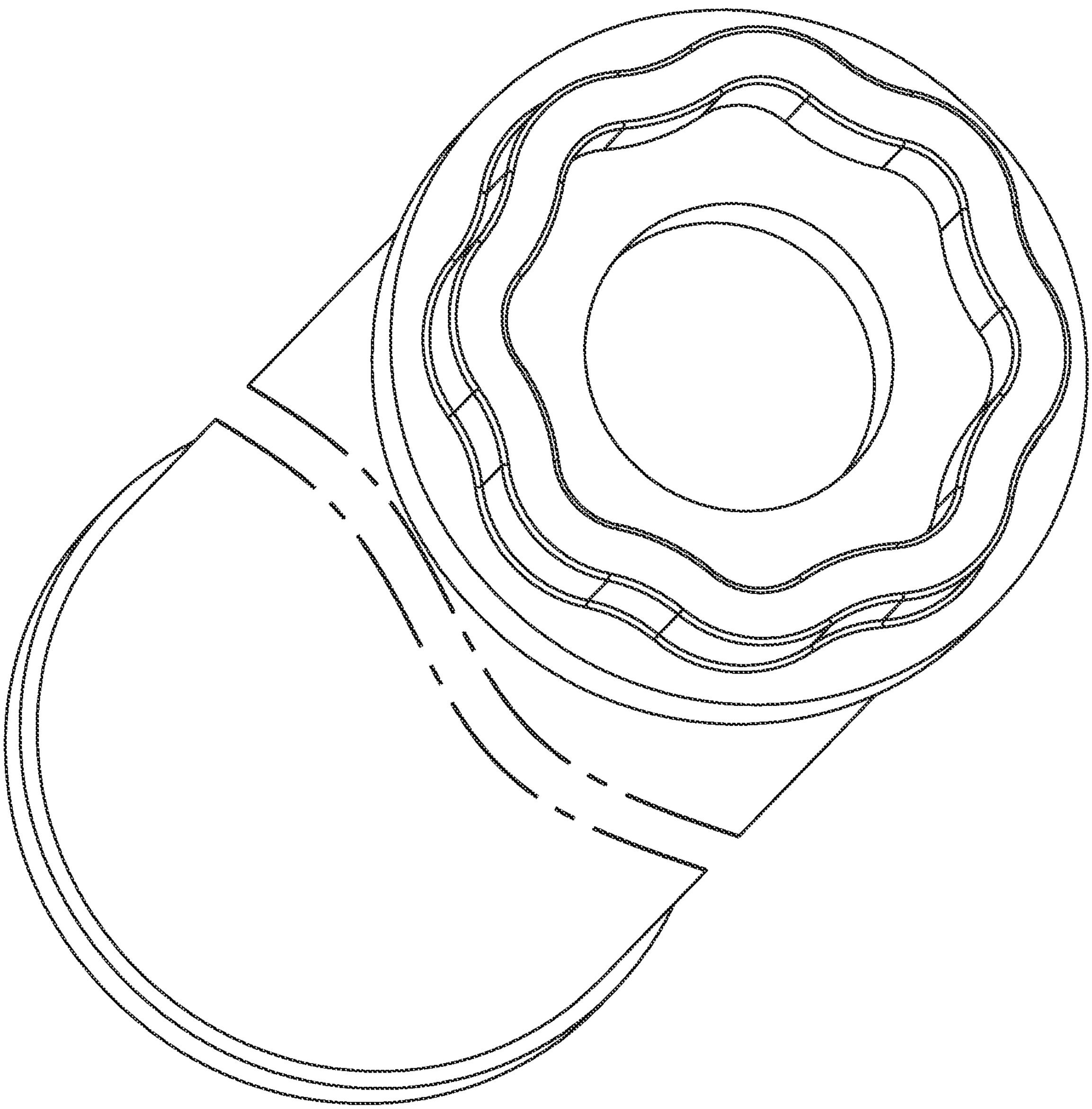

FIG. 163 is a schematic open end perspective view of another filter cartridge usable in an assembly according to, and in accordance with the principles of, the present disclosure; in FIG. 163, phantom or break lines being used to indicate a length variable.

Figure 164:
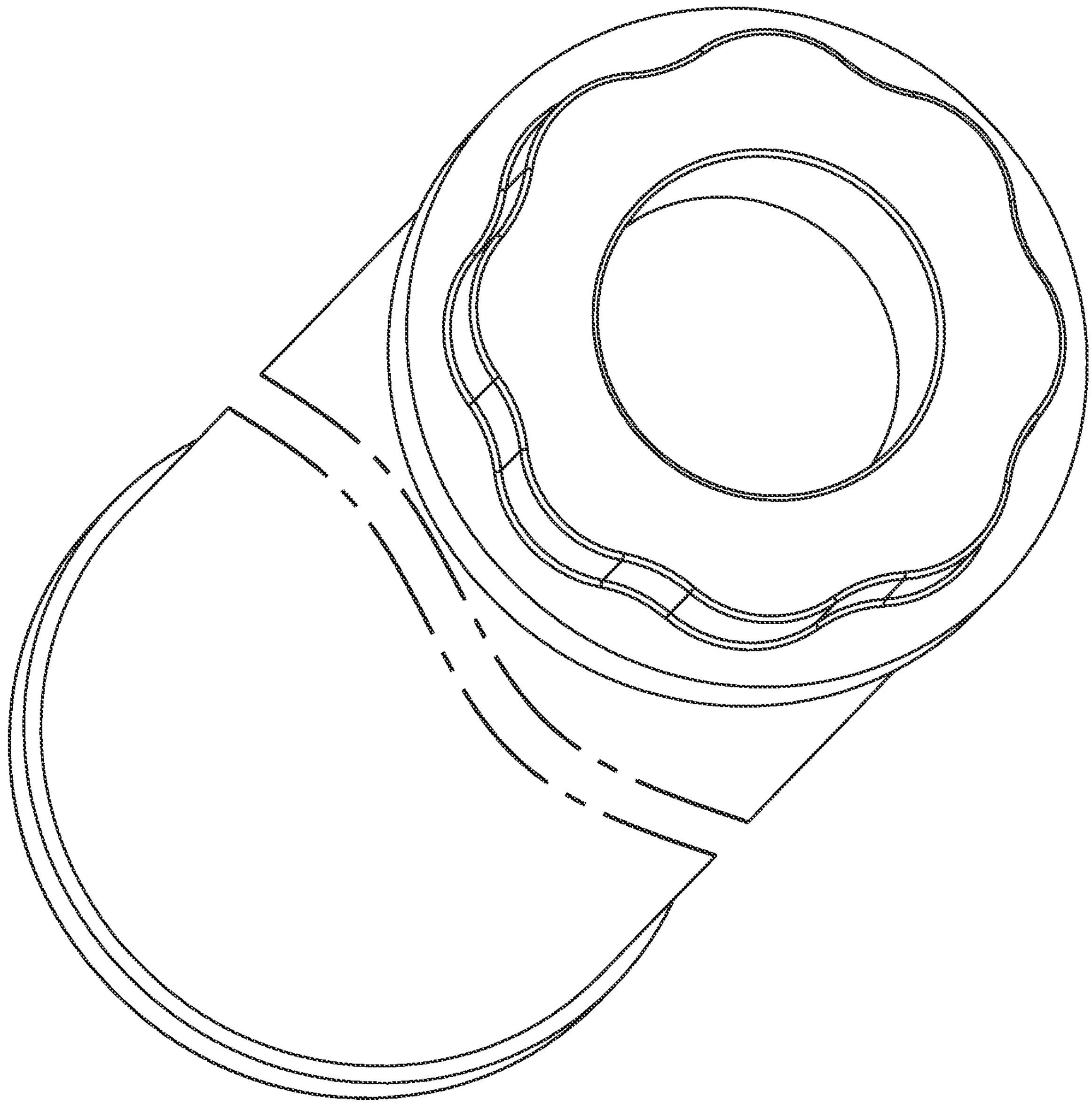

FIG. 164 is a schematic open end perspective view of another filter cartridge usable in an assembly according to, and in accordance with the principles of, the present disclosure; in FIG. 164, phantom or break lines being used to indicate a length variable.

Figure 165:
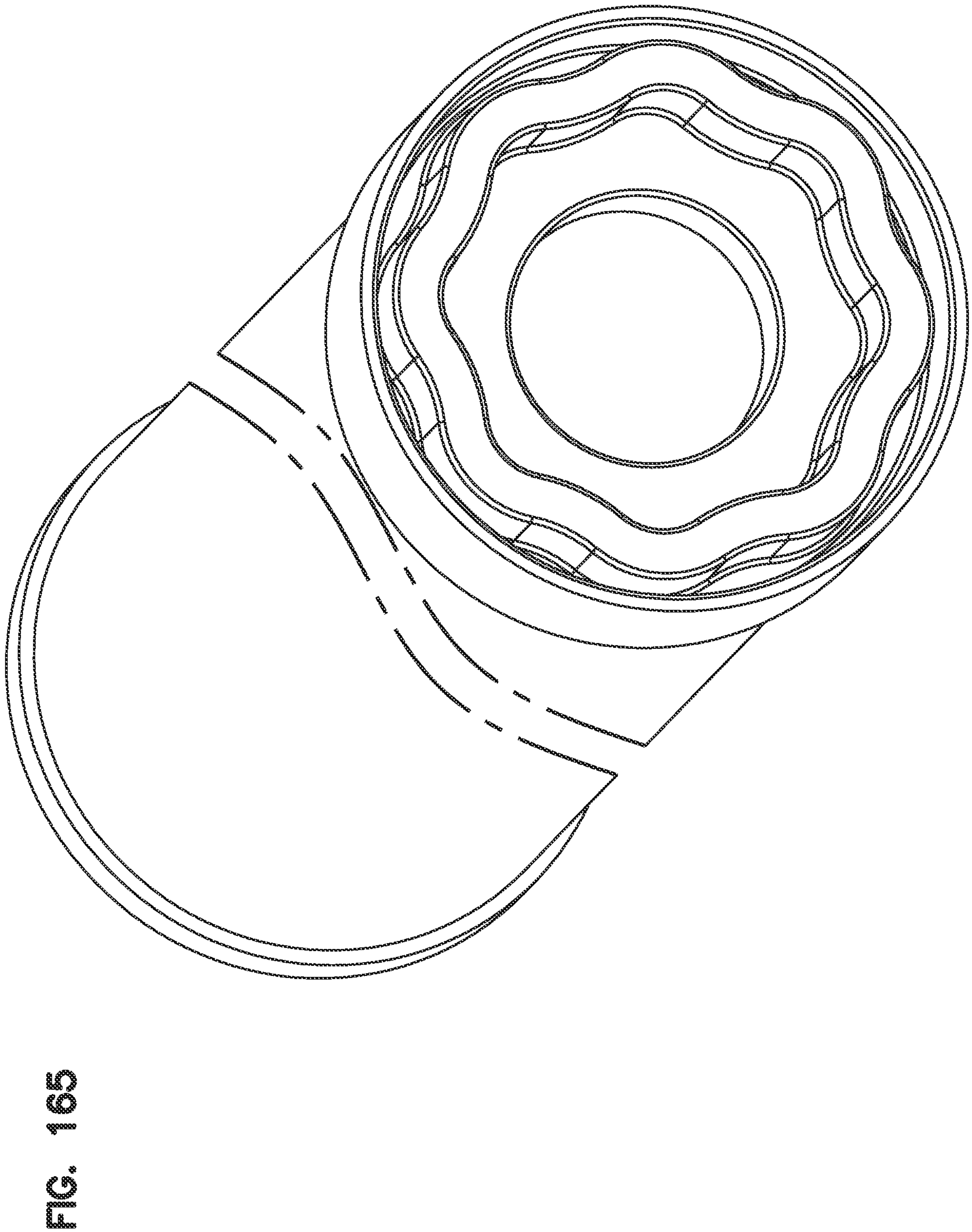

FIG. 165 is a schematic open end perspective view of another filter cartridge usable in an assembly according to, and in accordance with the principles of, the present disclosure; in FIG. 165, phantom or break lines being used to indicate a length variable.

Figure 166:
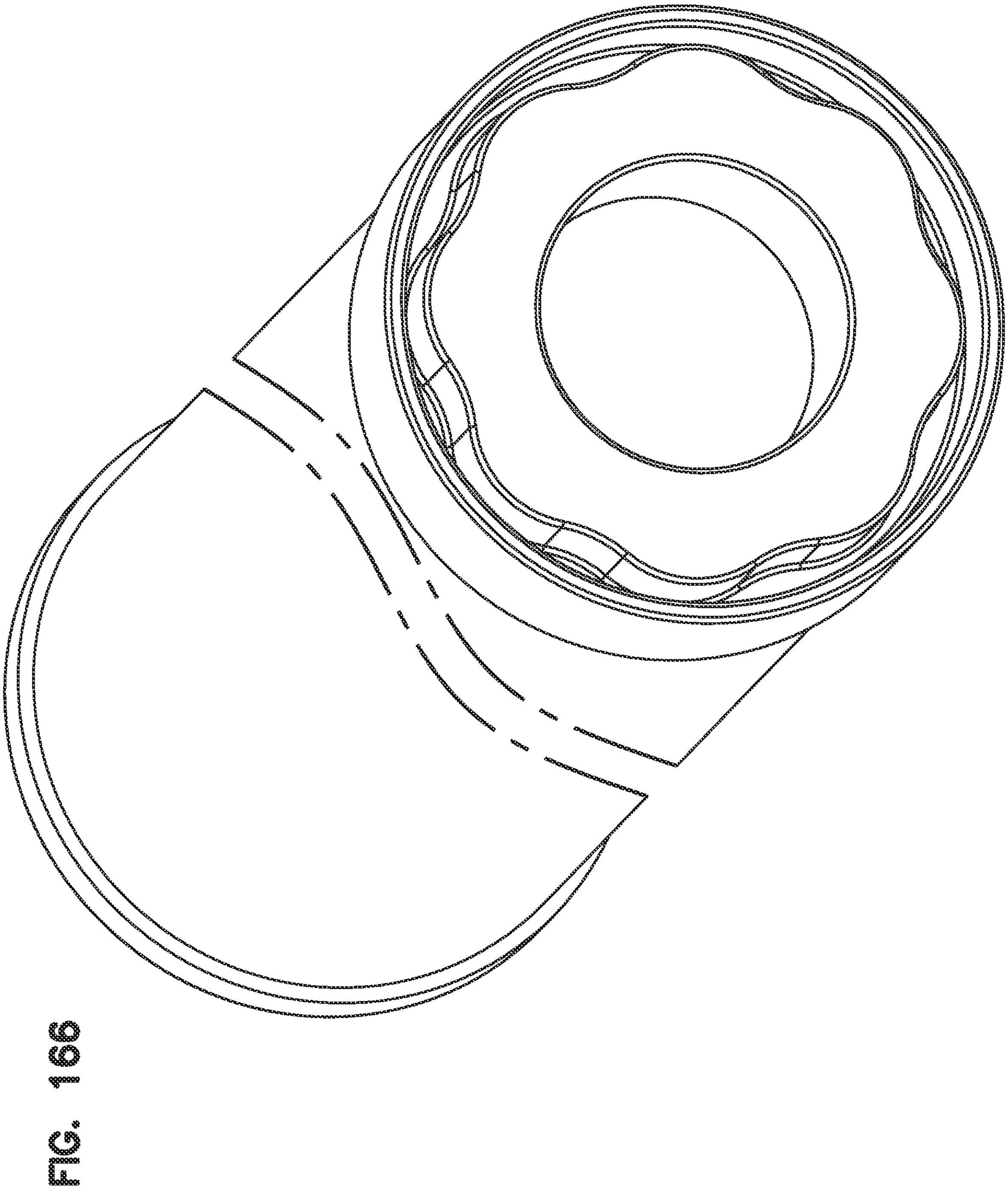

FIG. 166 is a schematic open end perspective view of another filter cartridge usable in an assembly according to, and in accordance with the principles of, the present disclosure; in FIG. 166, phantom or break lines being used to indicate a length variable.

Figure 167:
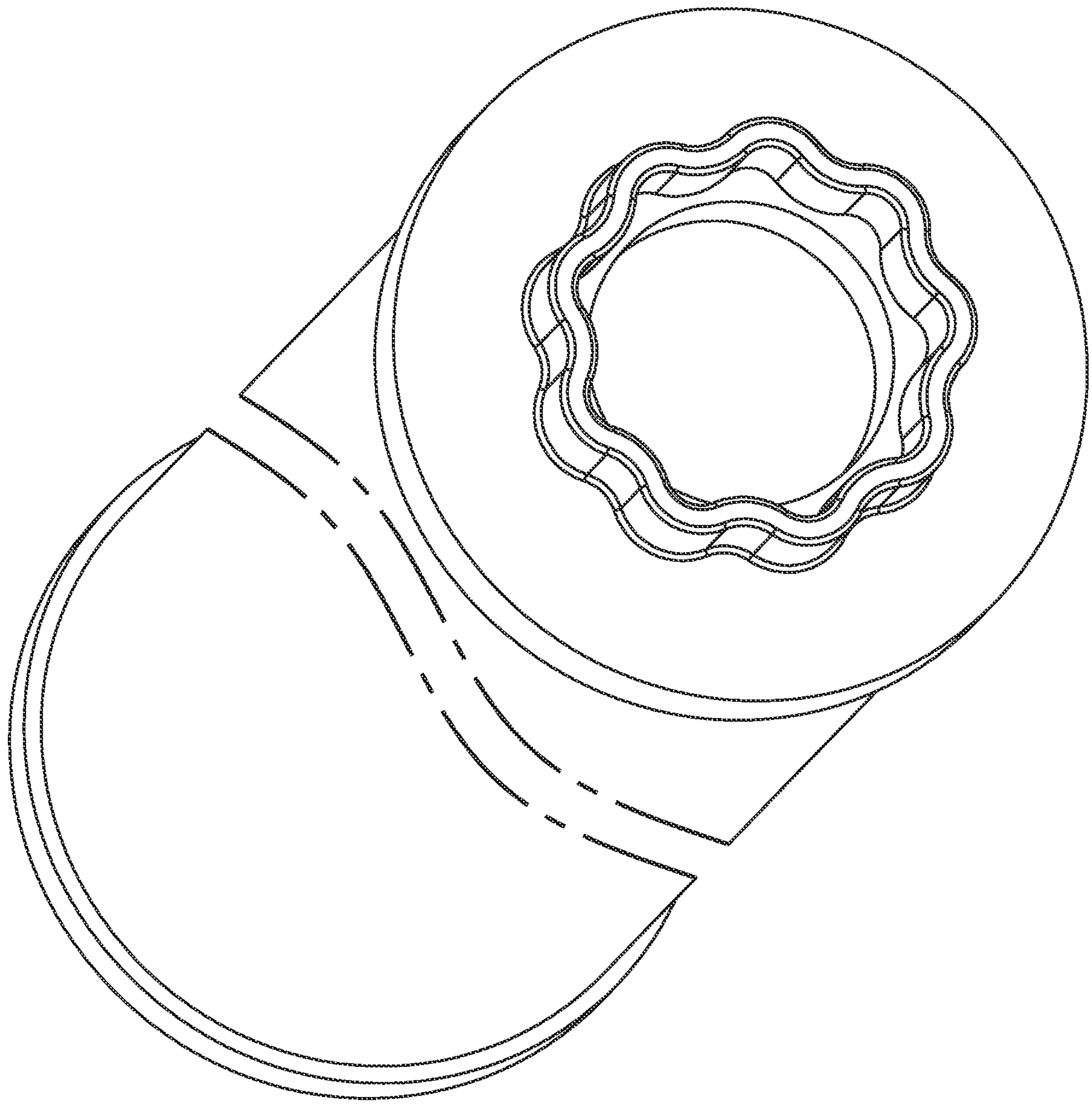

FIG. 167 is a schematic open end perspective view of another filter cartridge usable in an assembly according to, and in accordance with the principles of, the present disclosure; in FIG. 167, phantom or break lines being used to indicate a length variable.

Figure 168:
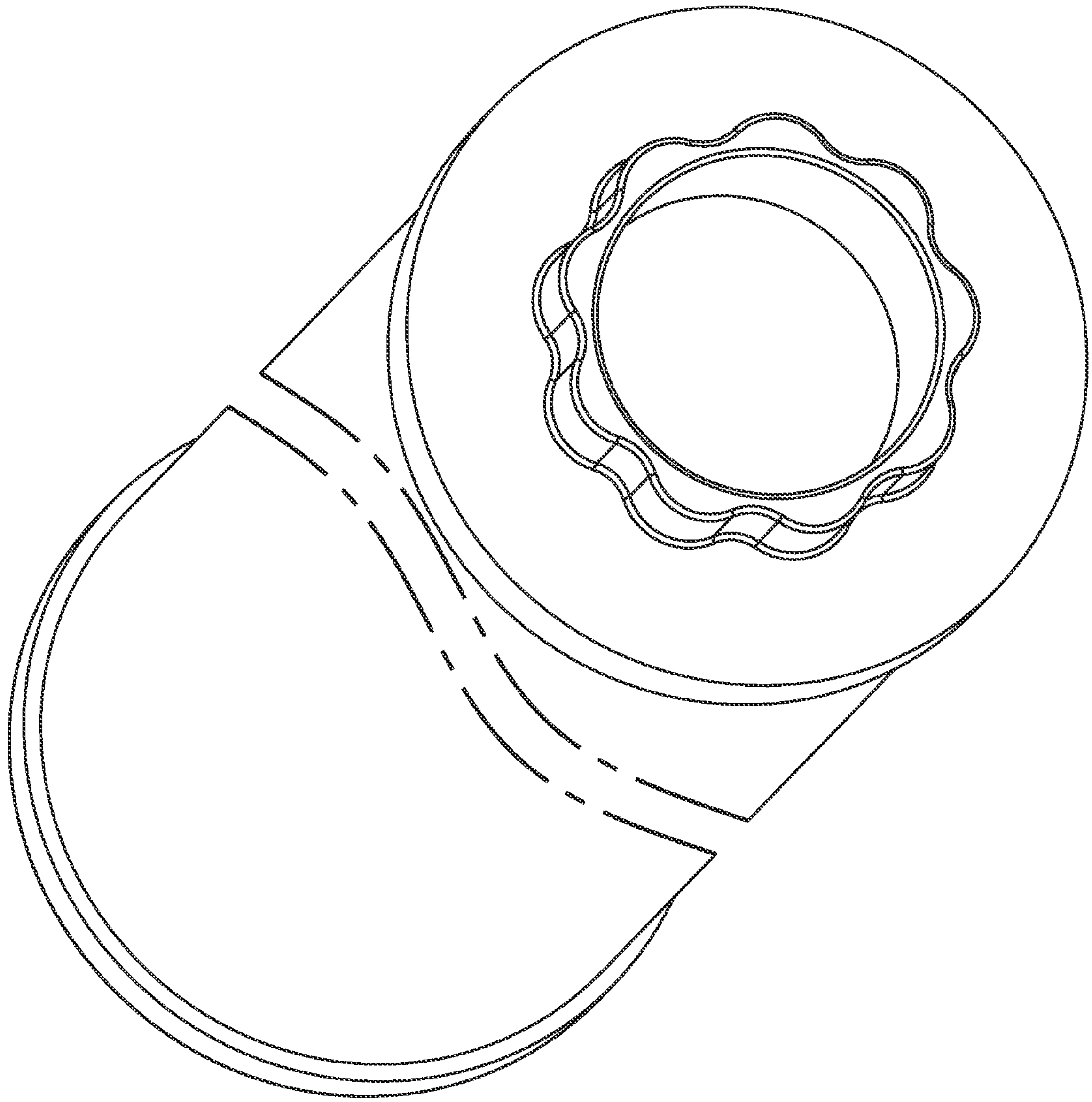

FIG. 168 is a schematic open end perspective view of another filter cartridge usable in an assembly according to, and in accordance with the principles of, the present disclosure; in FIG. 168, phantom or break lines being used to indicate a length variable.

Figure 169:
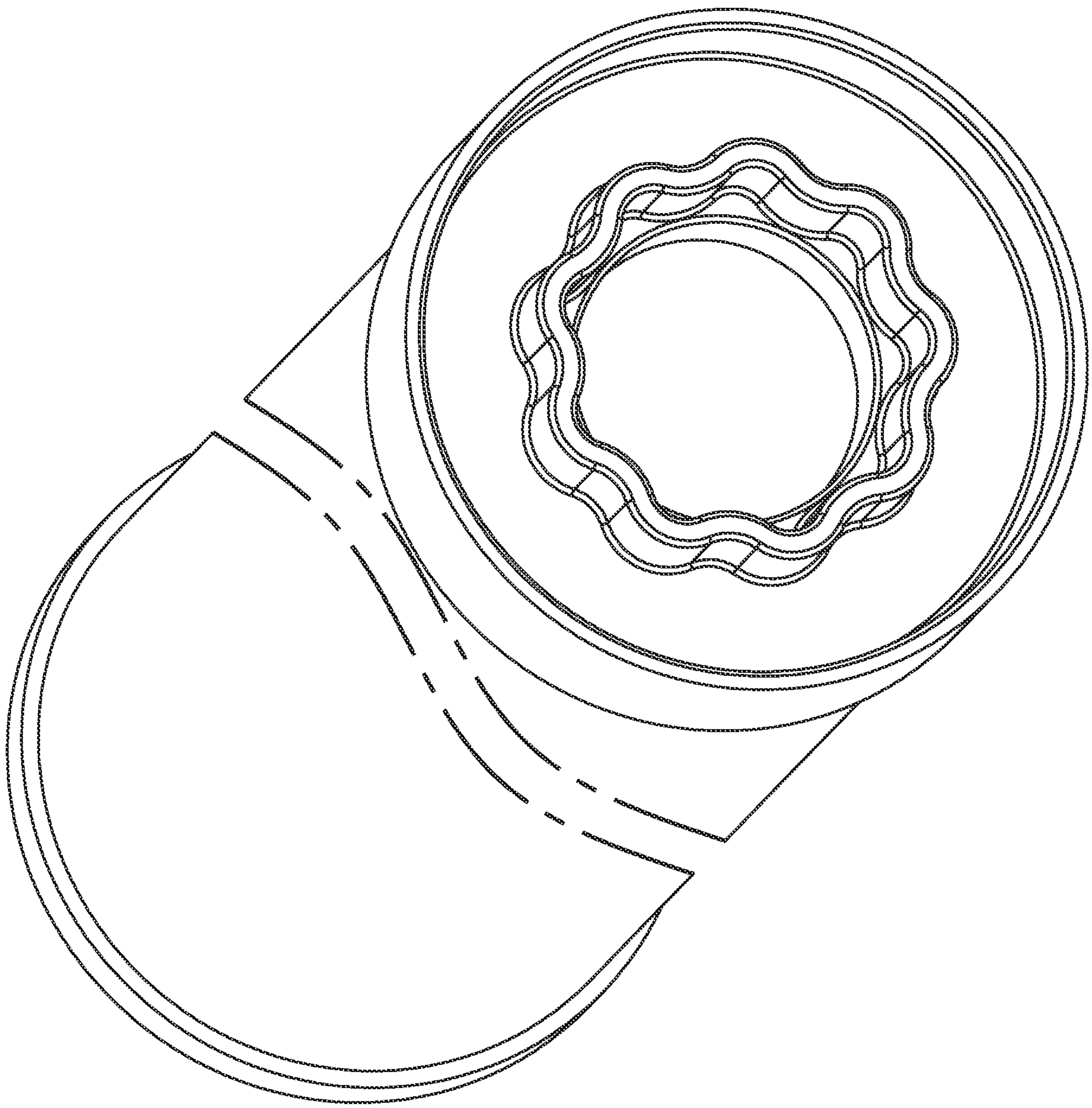

FIG. 169 is a schematic open end perspective view of another filter cartridge usable in an assembly according to, and in accordance with the principles of, the present disclosure; in FIG. 169, phantom or break lines being used to indicate a length variable.

Figure 170:
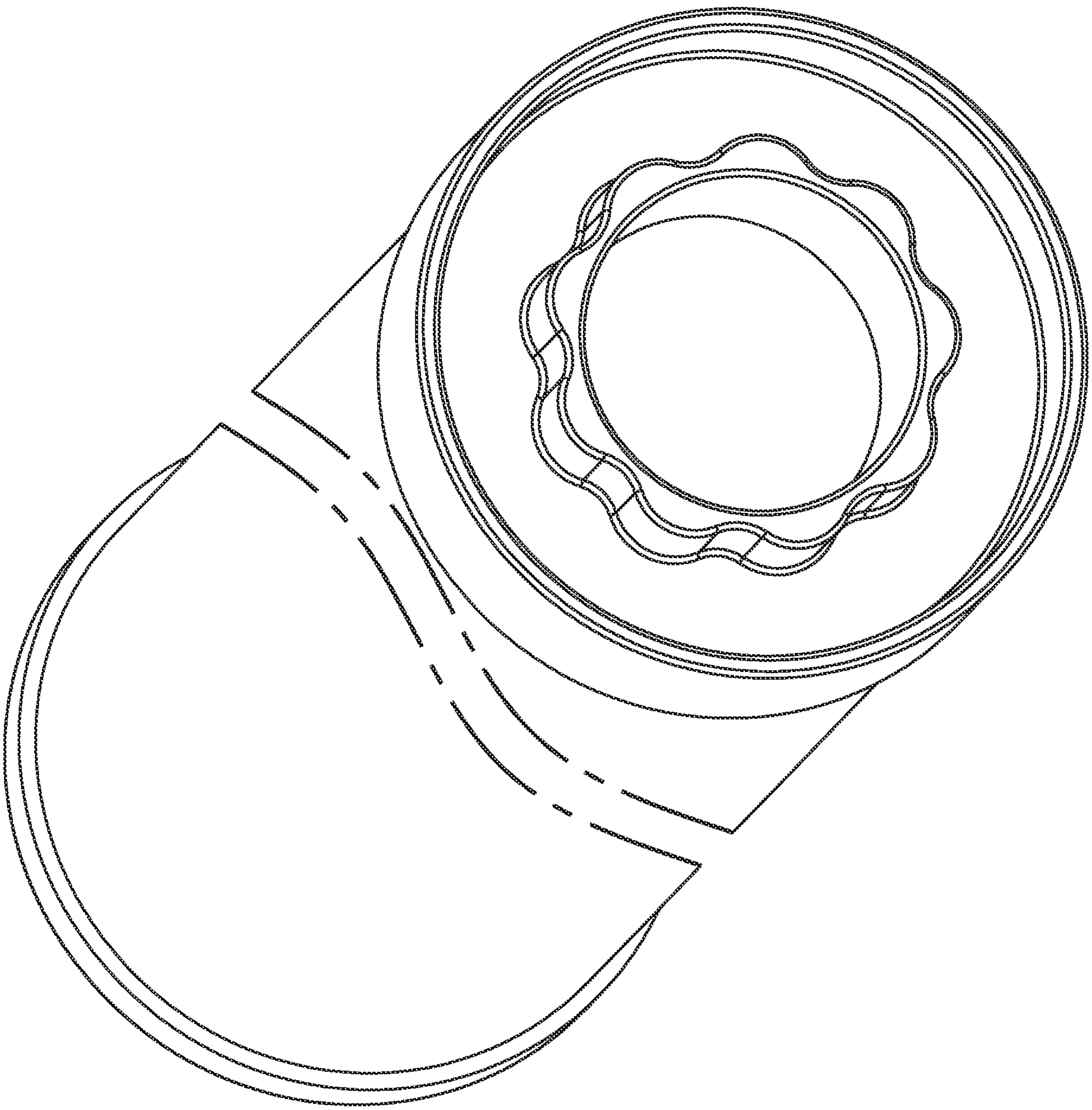

FIG. 170 is a schematic open end perspective view of another filter cartridge usable in an assembly according to, and in accordance with the principles of, the present disclosure; in FIG. 170, phantom or break lines being used to indicate a length variable.

Figure 171:
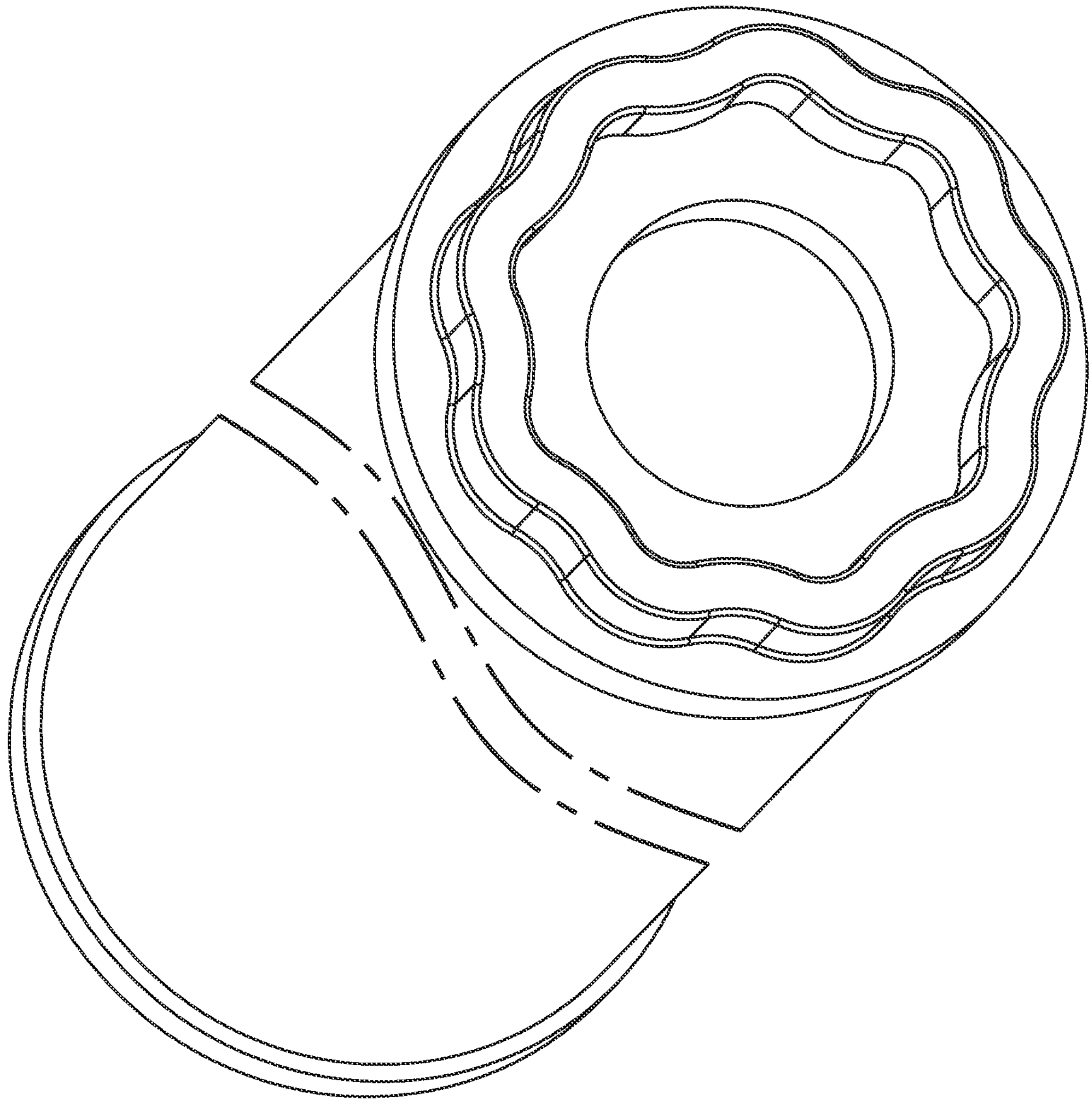

FIG. 171 is a schematic open end perspective view of another filter cartridge usable in an assembly according to, and in accordance with the principles of, the present disclosure; in FIG. 171, phantom or break lines being used to indicate a length variable.

Figure 172:
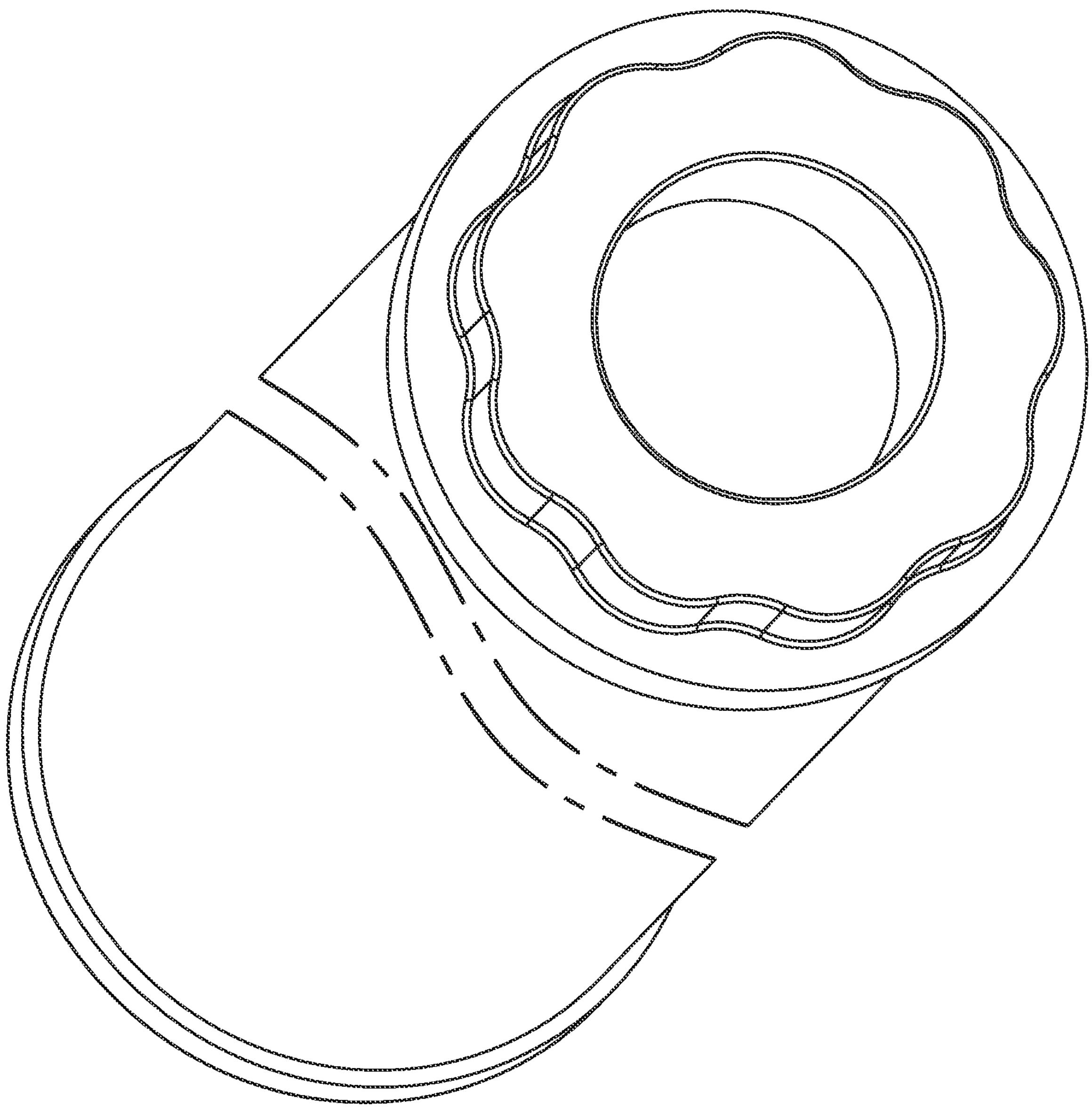

FIG. 172 is a schematic open end perspective view of another filter cartridge usable in an assembly according to, and in accordance with the principles of, the present disclosure; in FIG. 172, phantom or break lines being used to indicate a length variable.

Figure 173:
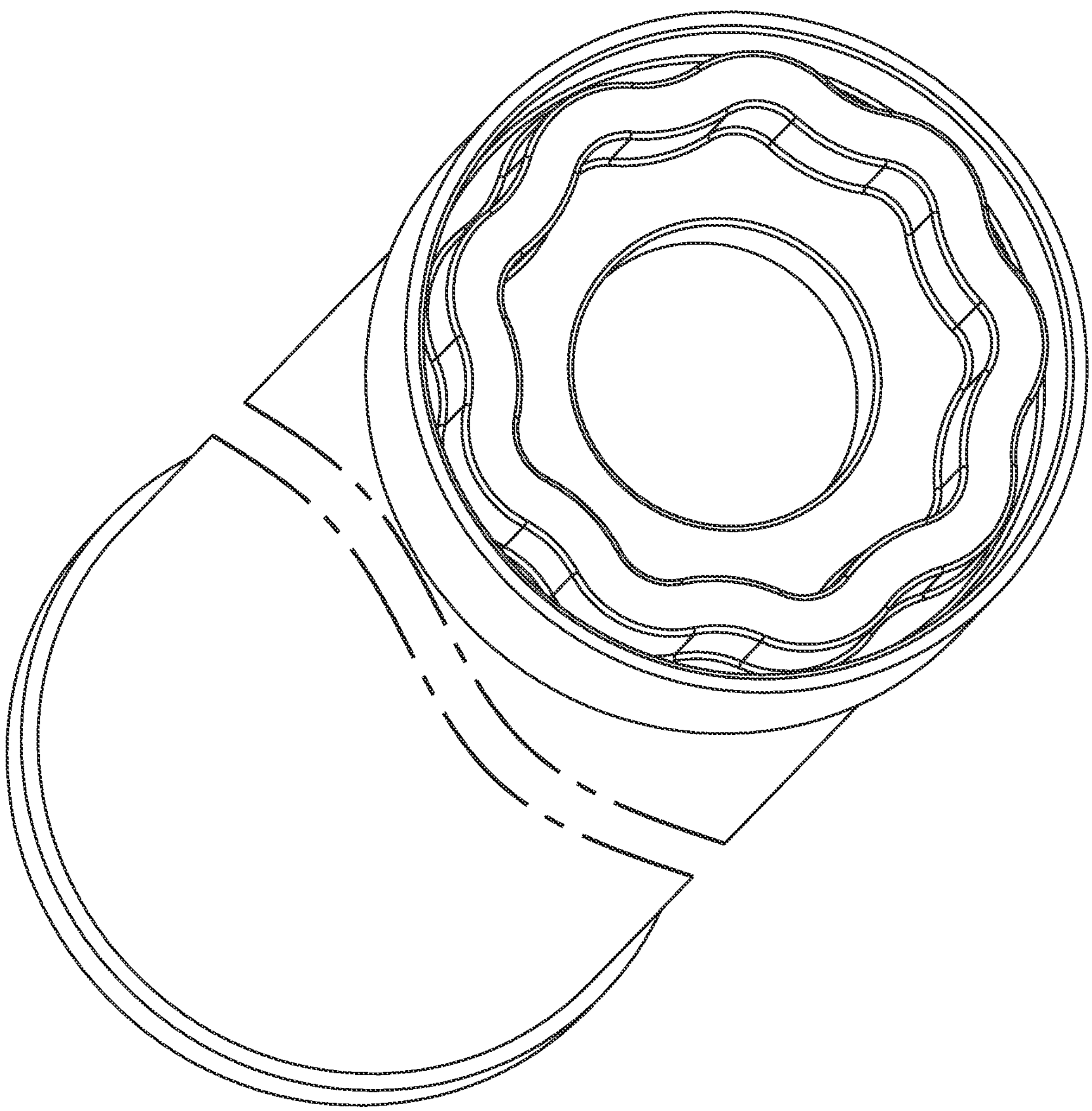

FIG. 173 is a schematic open end perspective view of another filter cartridge usable in an assembly according to, and in accordance with the principles of, the present disclosure; in FIG. 173, phantom or break lines being used to indicate a length variable.

Figure 174:
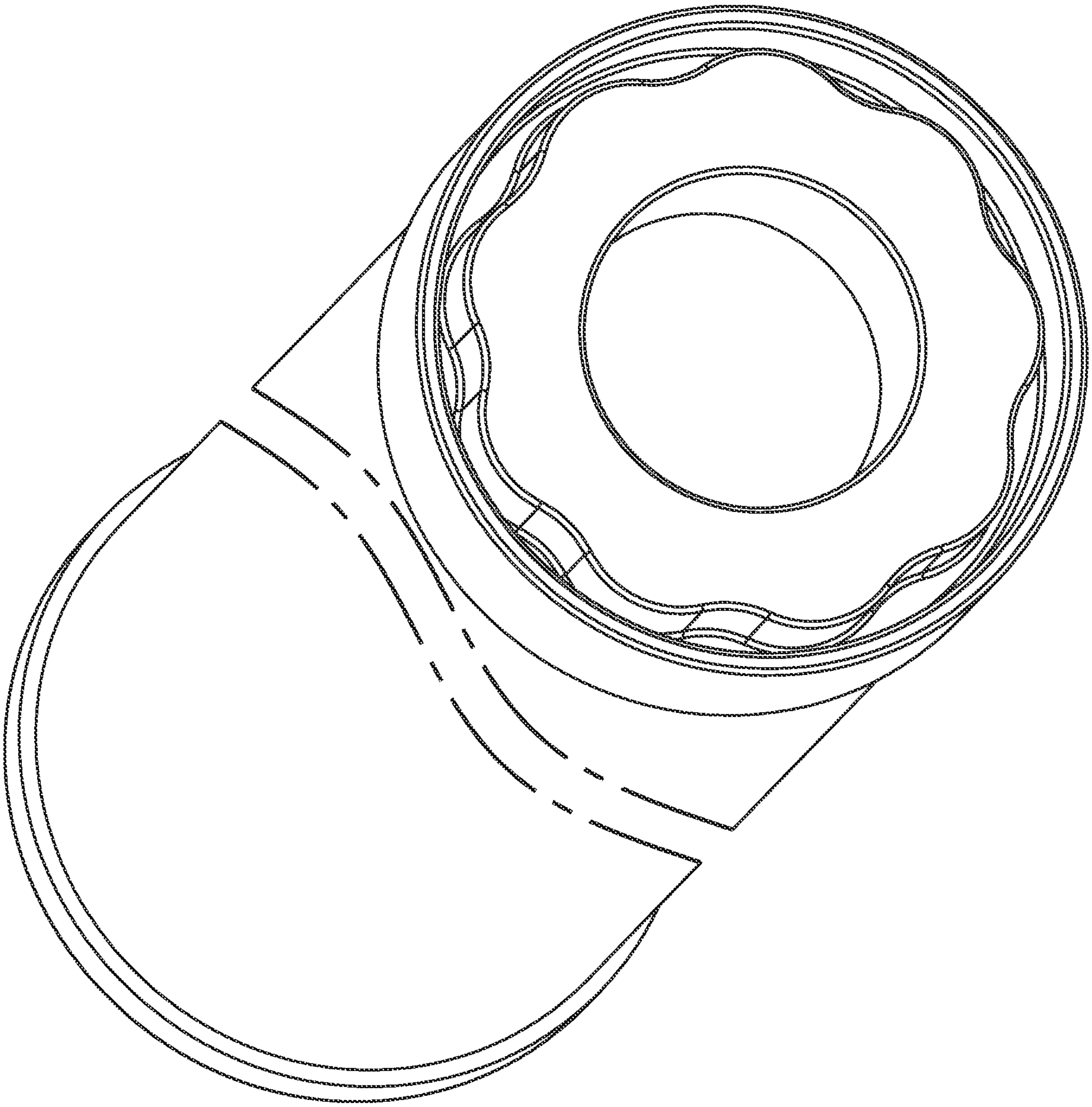

FIG. 174 is a schematic open end perspective view of another filter cartridge usable in an assembly according to, and in accordance with the principles of, the present disclosure; in FIG. 174, phantom or break lines being used to indicate a length variable.

Figure 175:
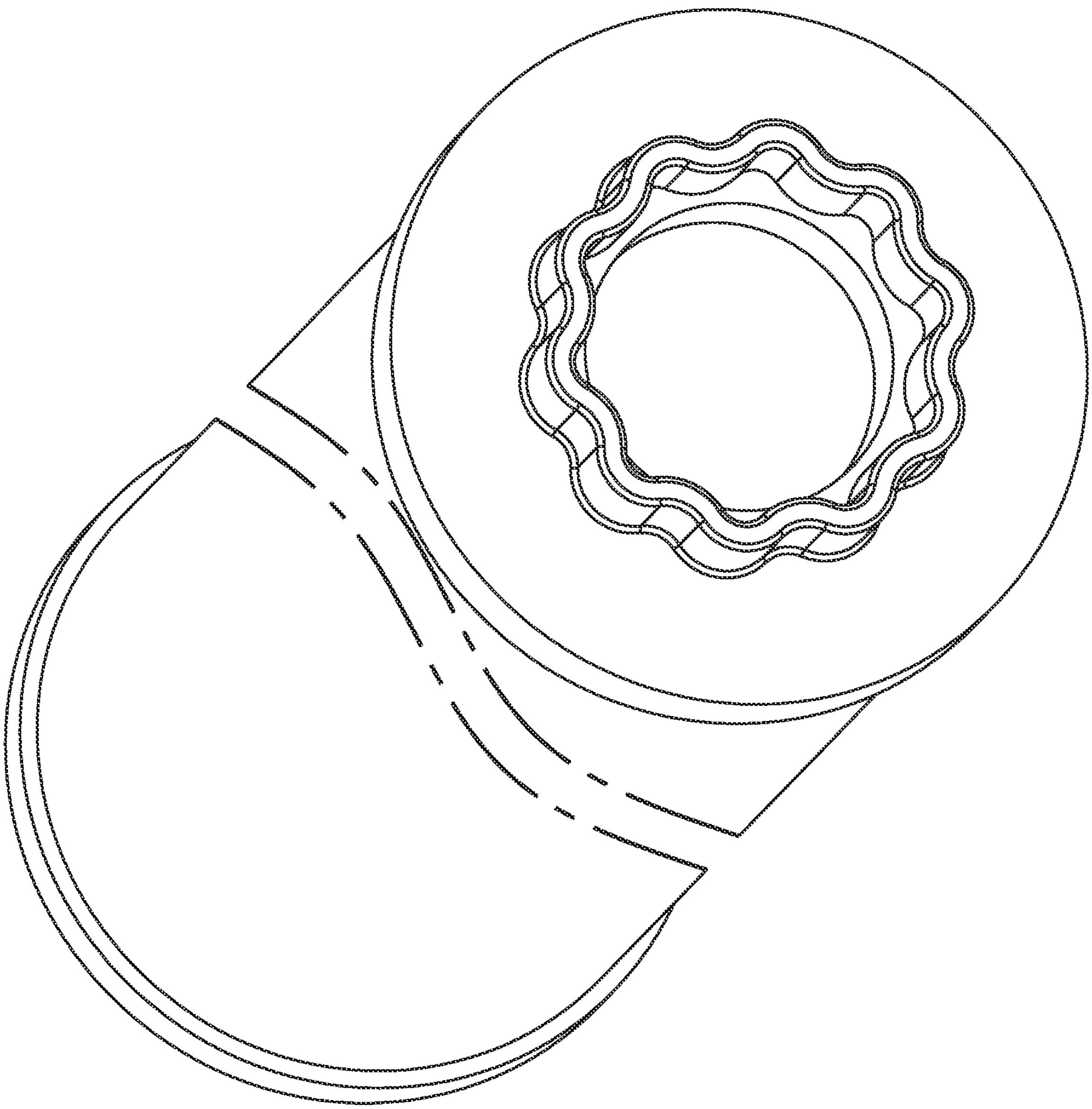

FIG. 175 is a schematic open end perspective view of a filter cartridge usable in an assembly according to, and in accordance with the principles of, the present disclosure; in FIG. 175, phantom or break lines being used to indicate a length variable.

Figure 176:
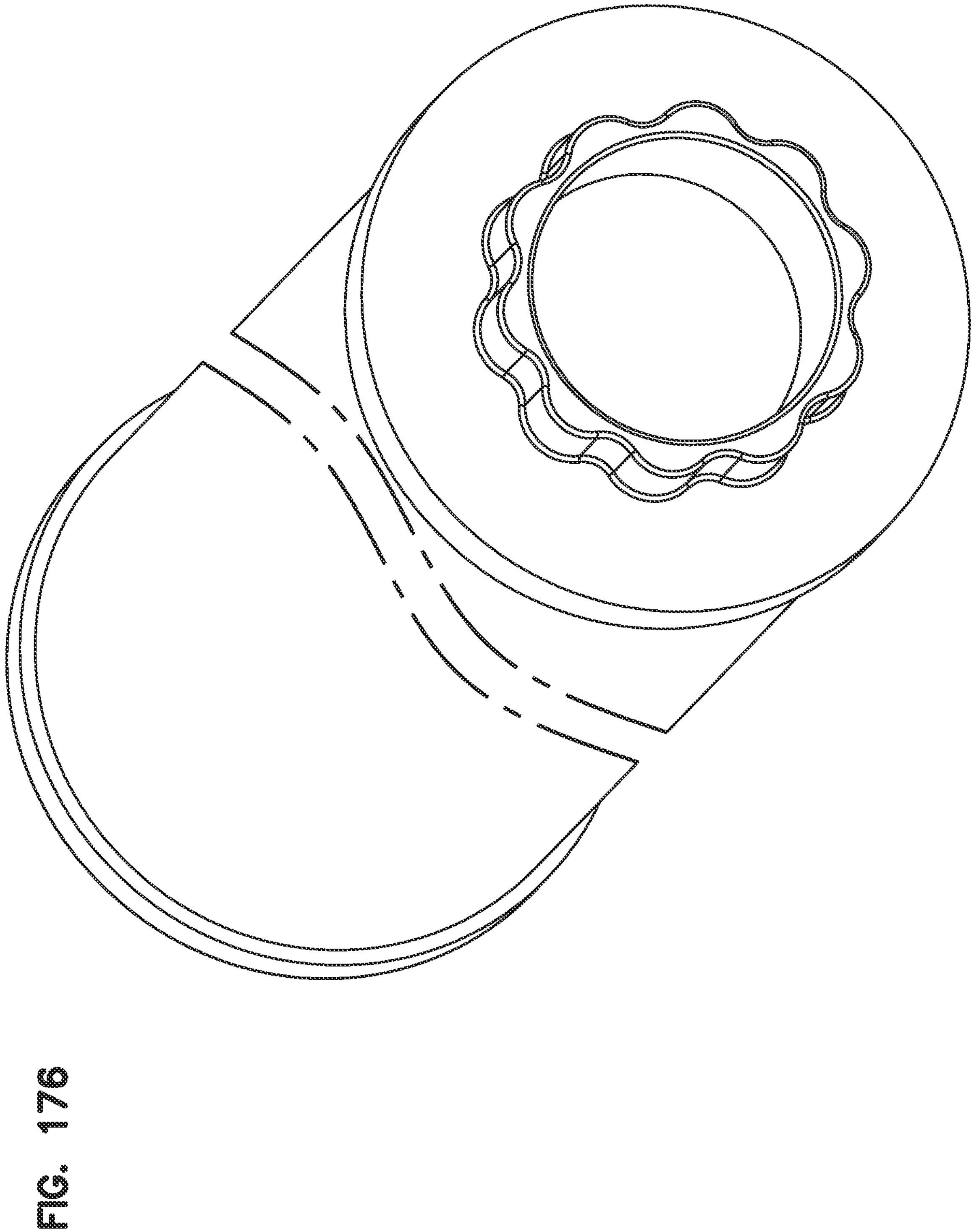

FIG. 176 is a schematic open end perspective view of a filter cartridge usable in an assembly according to, and in accordance with the principles of, the present disclosure; in FIG. 176, phantom or break lines being used to indicate a length variable.

Figure 177:
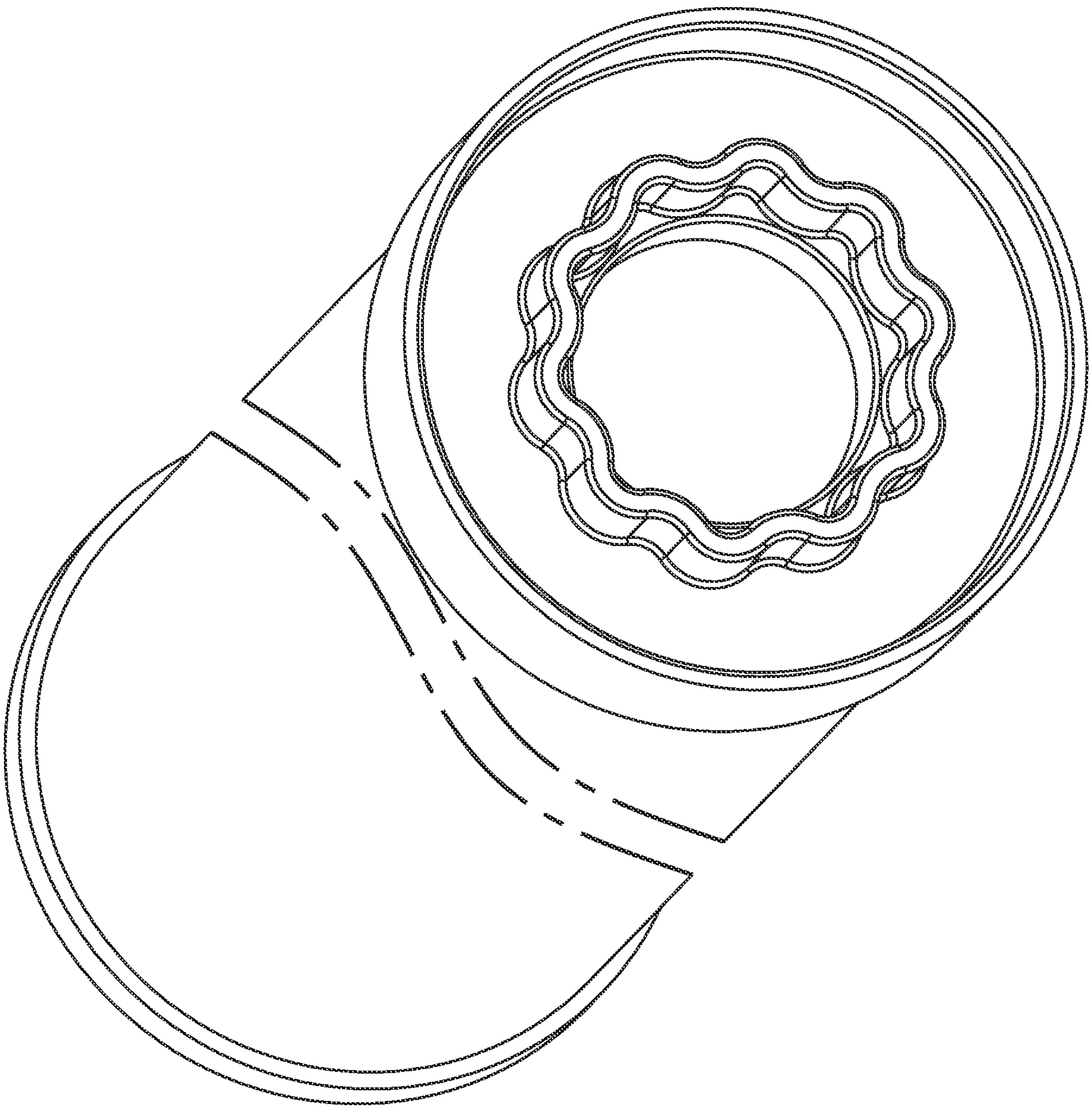

FIG. 177 is a schematic open end perspective view of a filter cartridge usable in an assembly according to, and in accordance with the principles of, the present disclosure; in FIG. 177, phantom or break lines being used to indicate a length variable.

Figure 178:
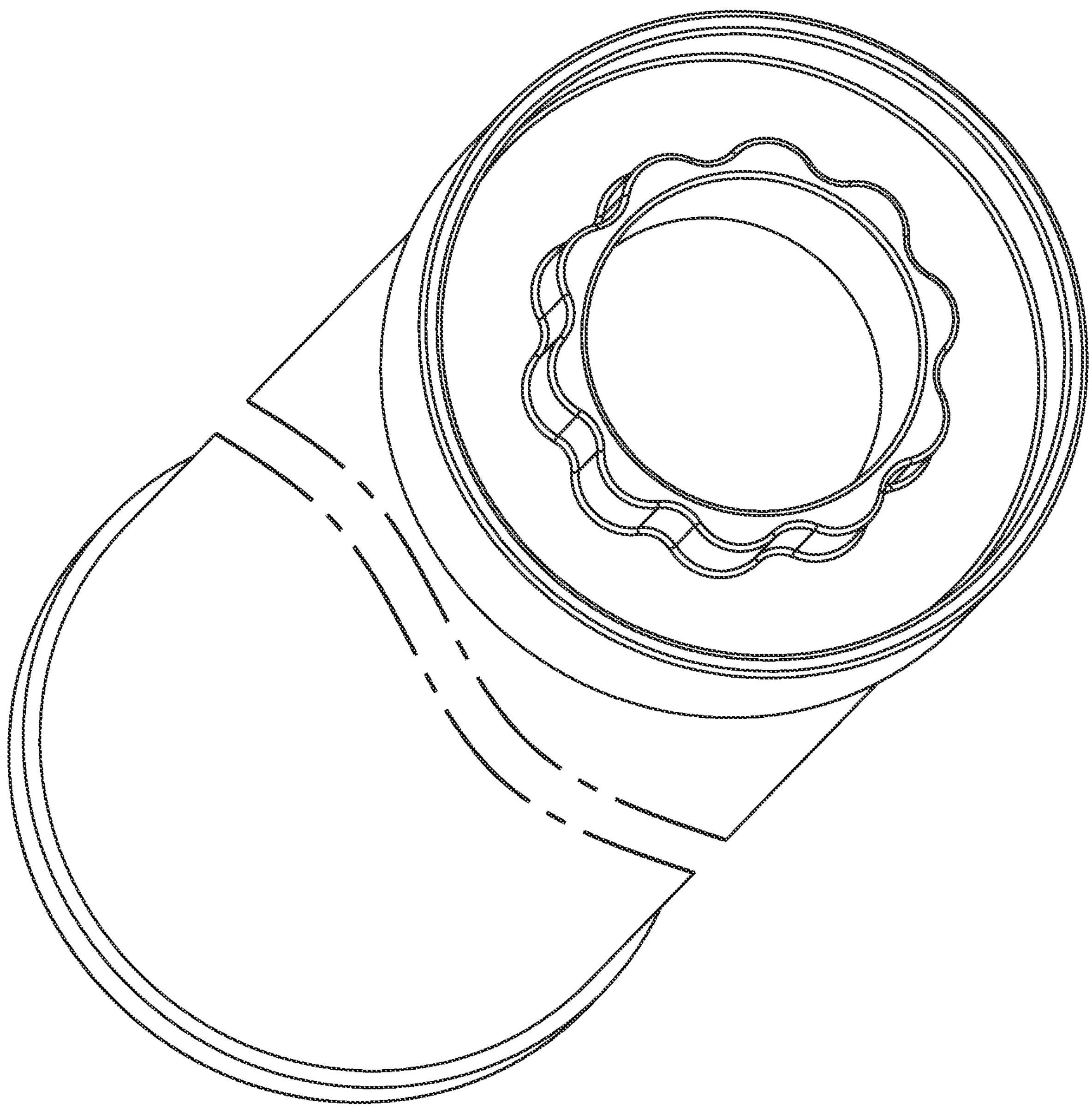

FIG. 178 is a schematic open end perspective view of a filter cartridge usable in an assembly according to, and in accordance with the principles of, the present disclosure; in FIG. 178, phantom or break lines being used to indicate a length variable.

Figure 179:
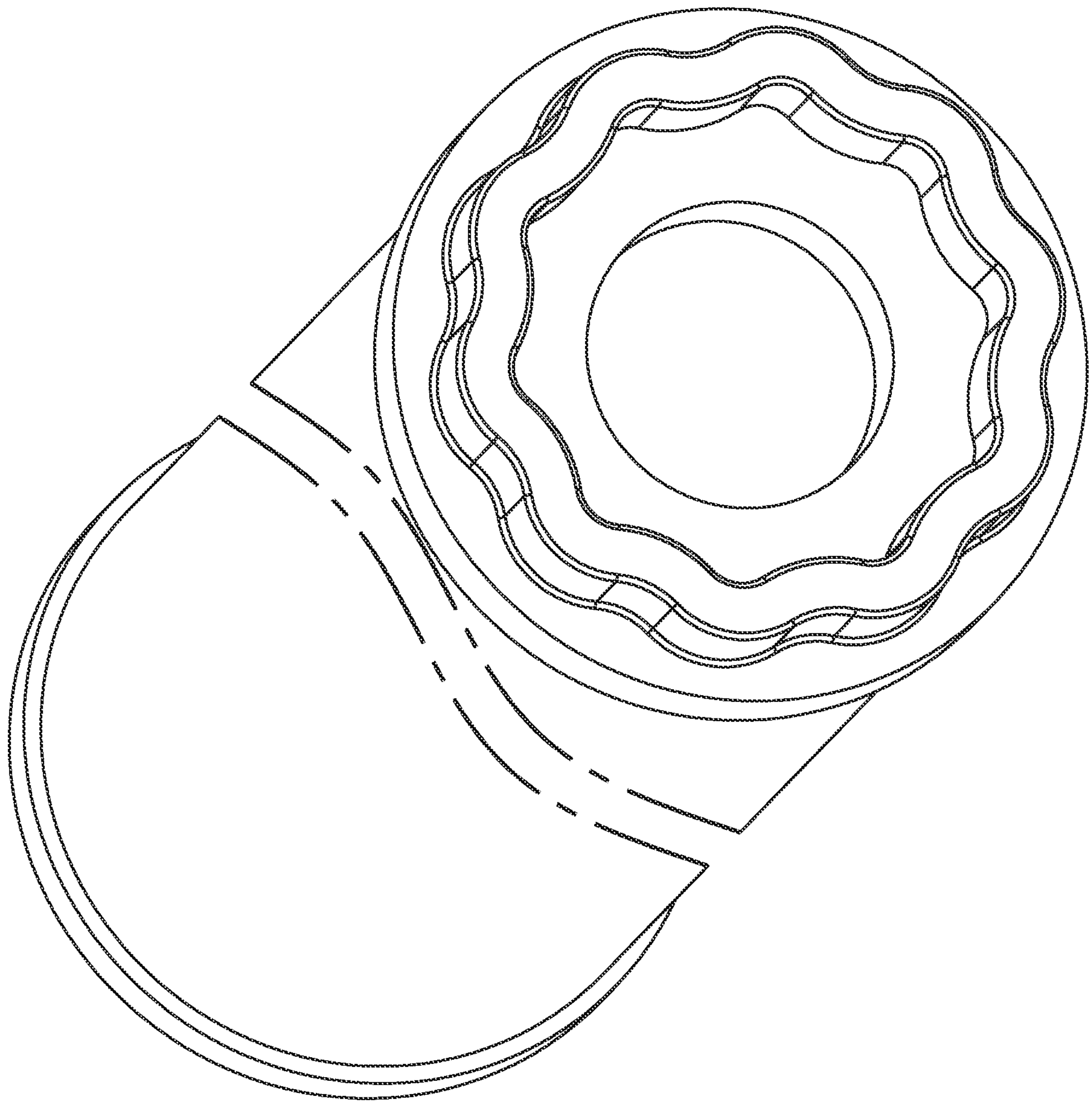

FIG. 179 is a schematic open end perspective view of a filter cartridge usable in an assembly according to, and in accordance with the principles of, the present disclosure; in FIG. 179, phantom or break lines being used to indicate a length variable.

Figure 180:
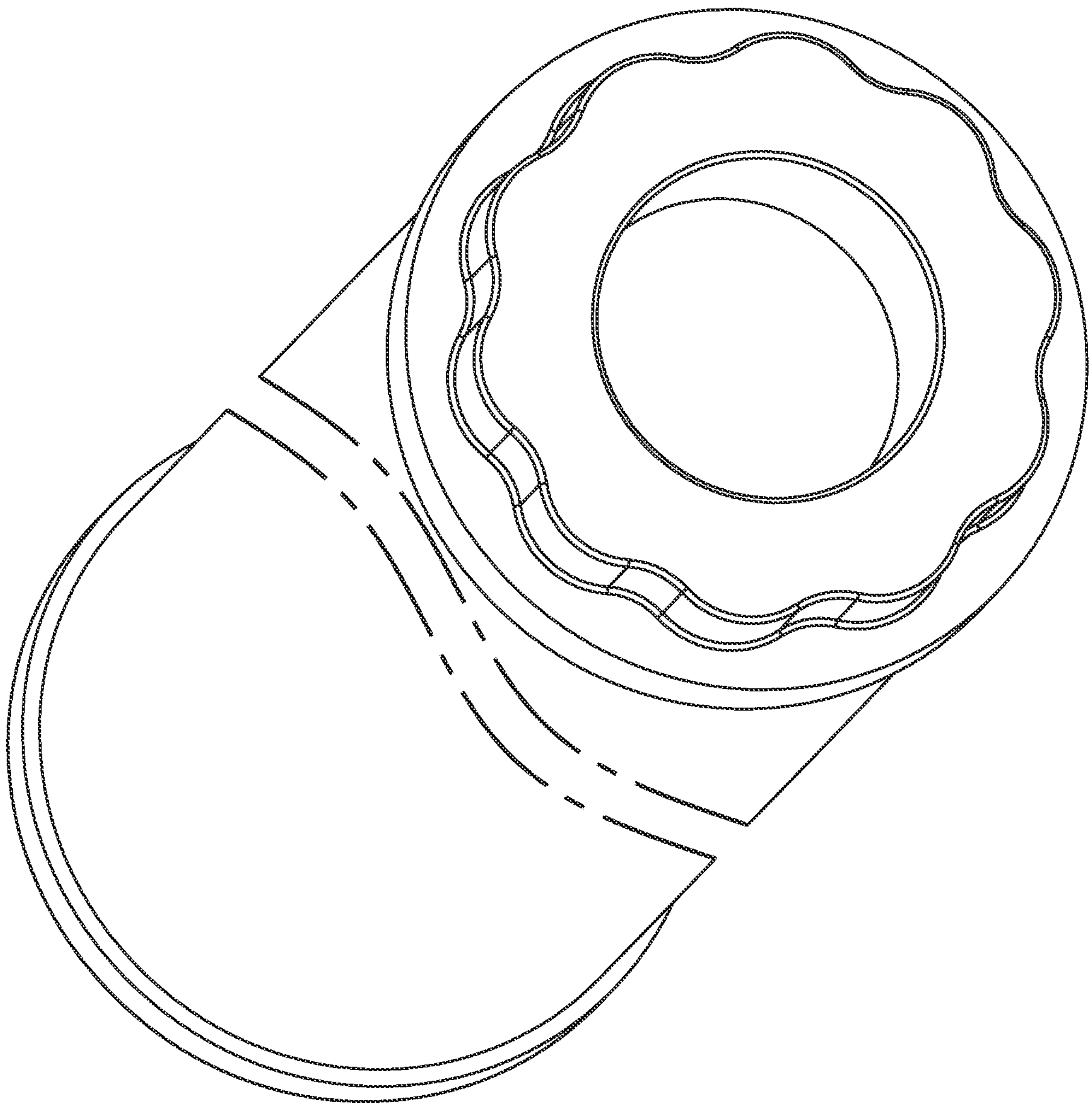

FIG. 180 is a schematic open end perspective view of a filter cartridge usable in an assembly according to, and in accordance with the principles of, the present disclosure; in FIG. 180, phantom or break lines being used to indicate a length variable.

Figure 181:
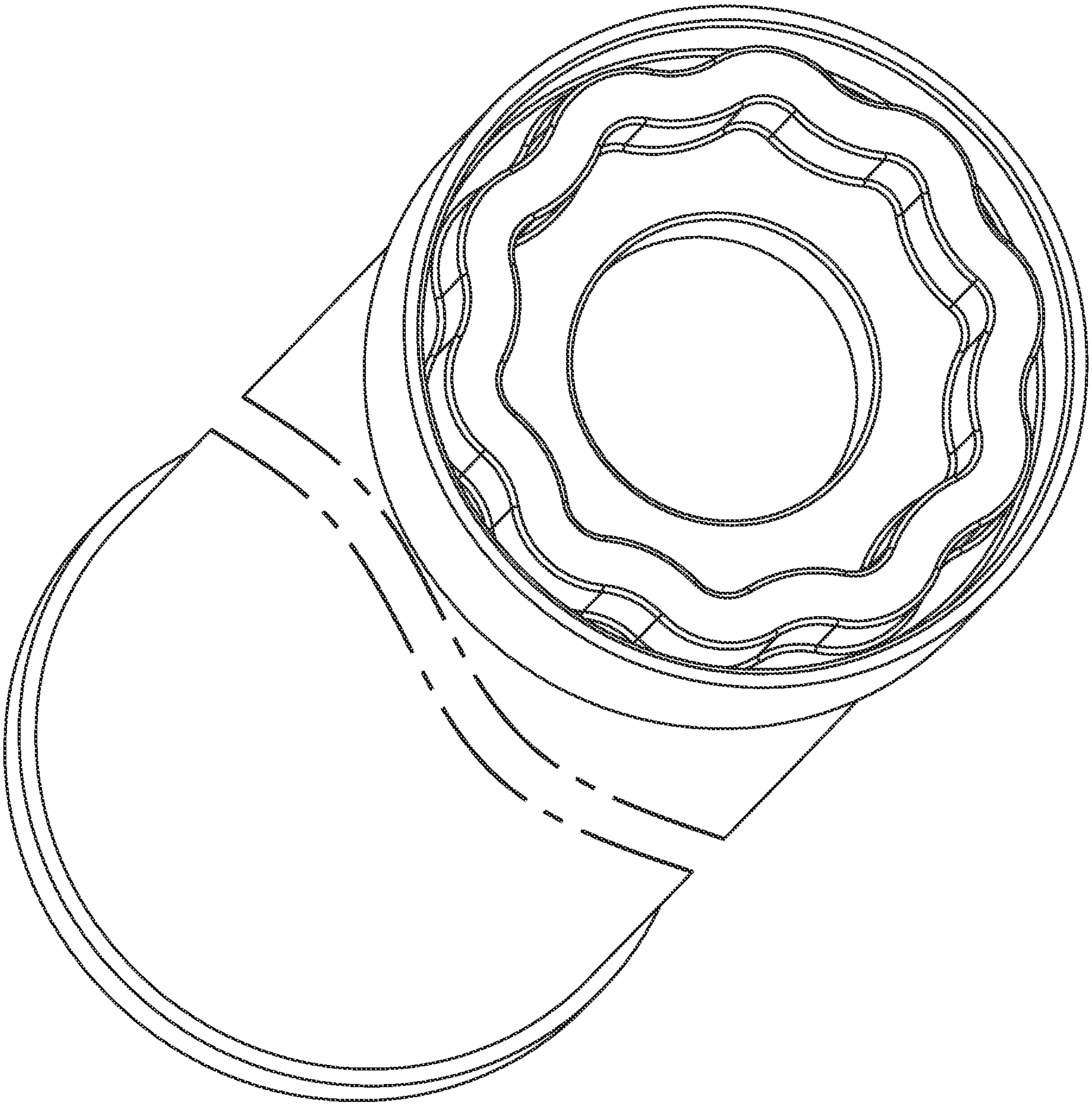

FIG. 181 is a schematic open end perspective view of a filter cartridge usable in an assembly according to, and in accordance with the principles of, the present disclosure; in FIG. 181, phantom or break lines being used to indicate a length variable.

Figure 182:
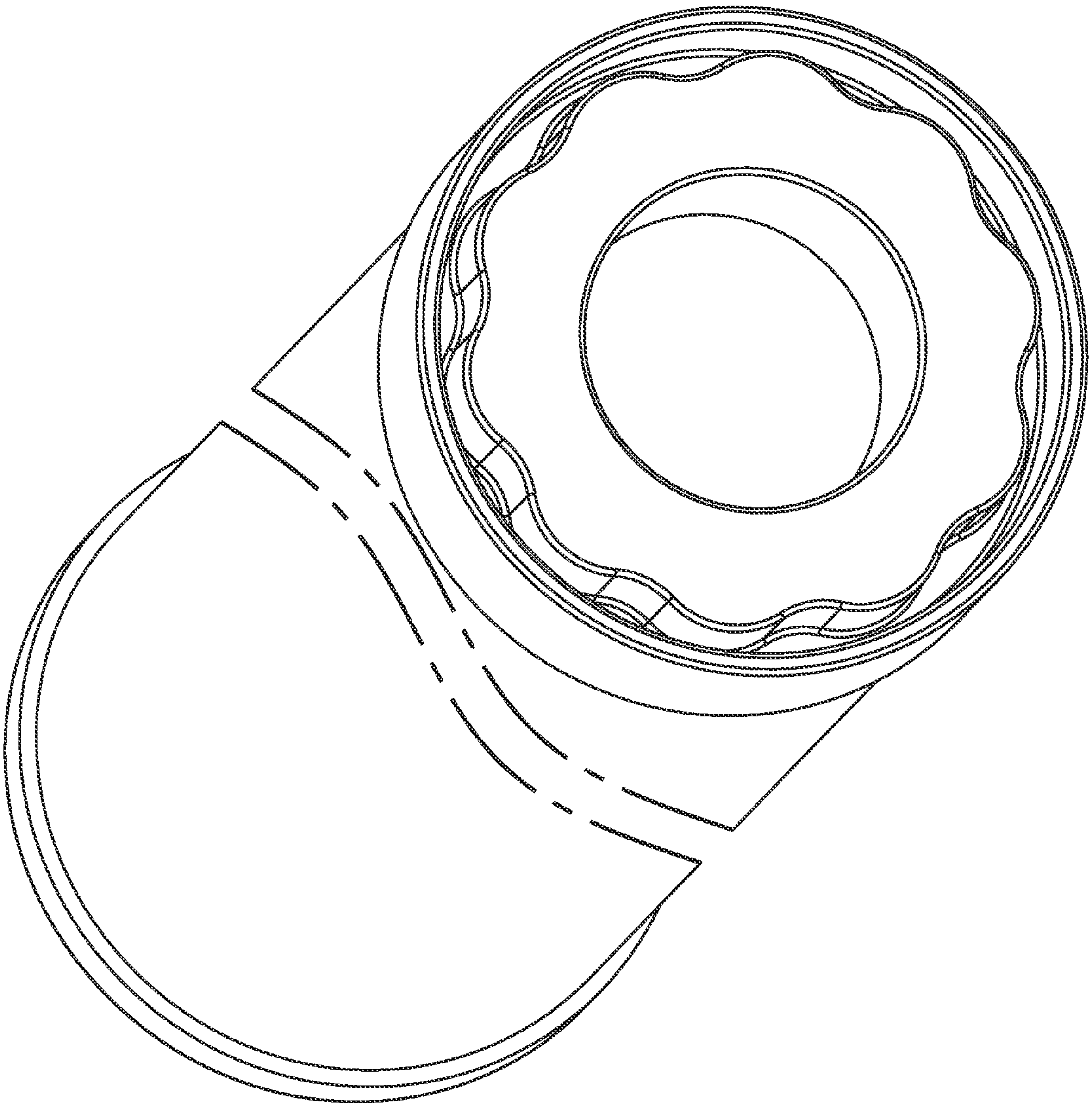

FIG. 182 is a schematic open end perspective view of a filter cartridge usable in an assembly according to, and in accordance with the principles of, the present disclosure; in FIG. 182, phantom or break lines being used to indicate a length variable.

Figure 183:
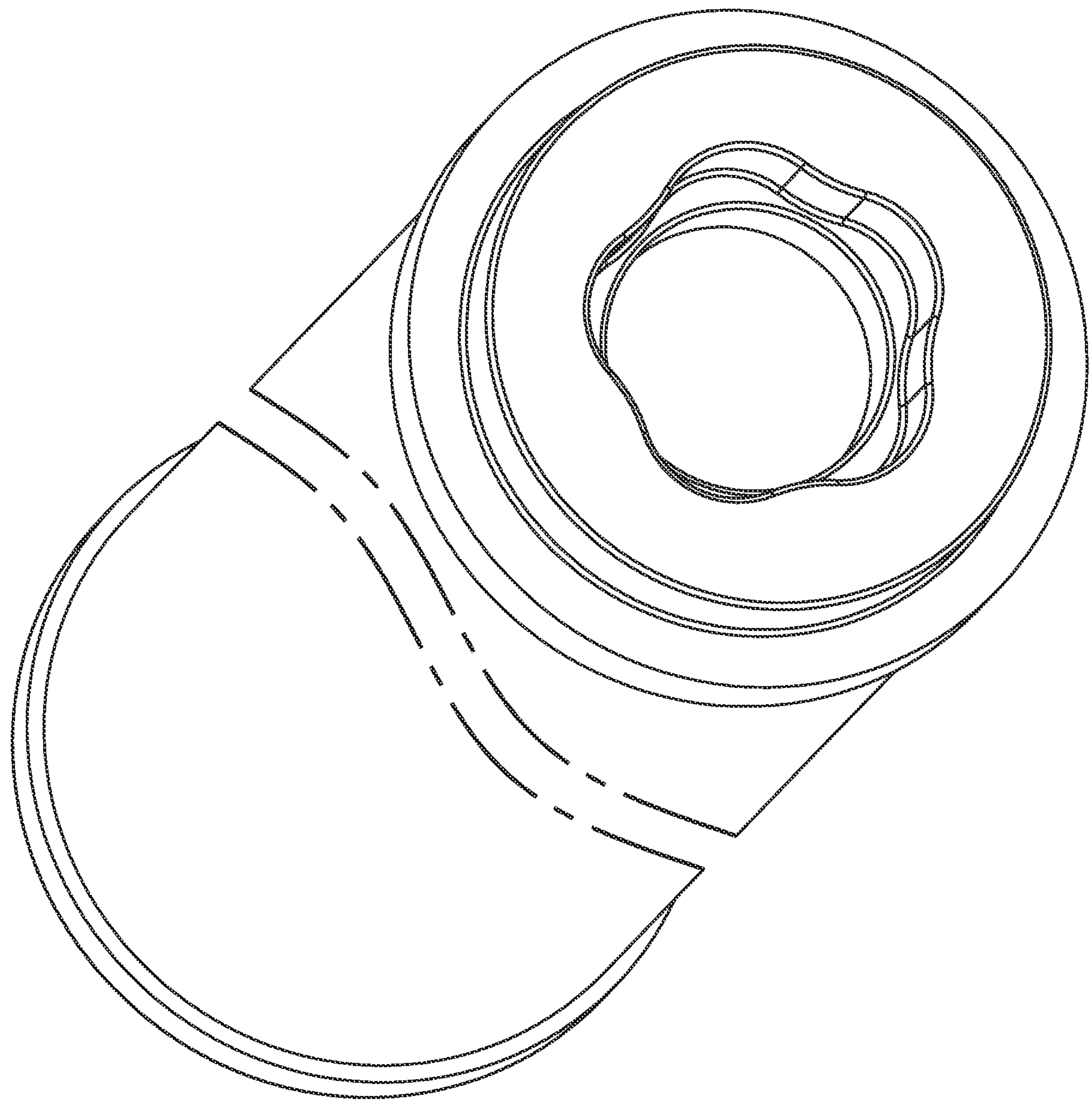

FIG. 183 is a schematic open end perspective view of a filter cartridge usable in an assembly according to, and in accordance with the principles of, the present disclosure; in FIG. 183, phantom or break lines being used to indicate a length variable.

Figure 184:
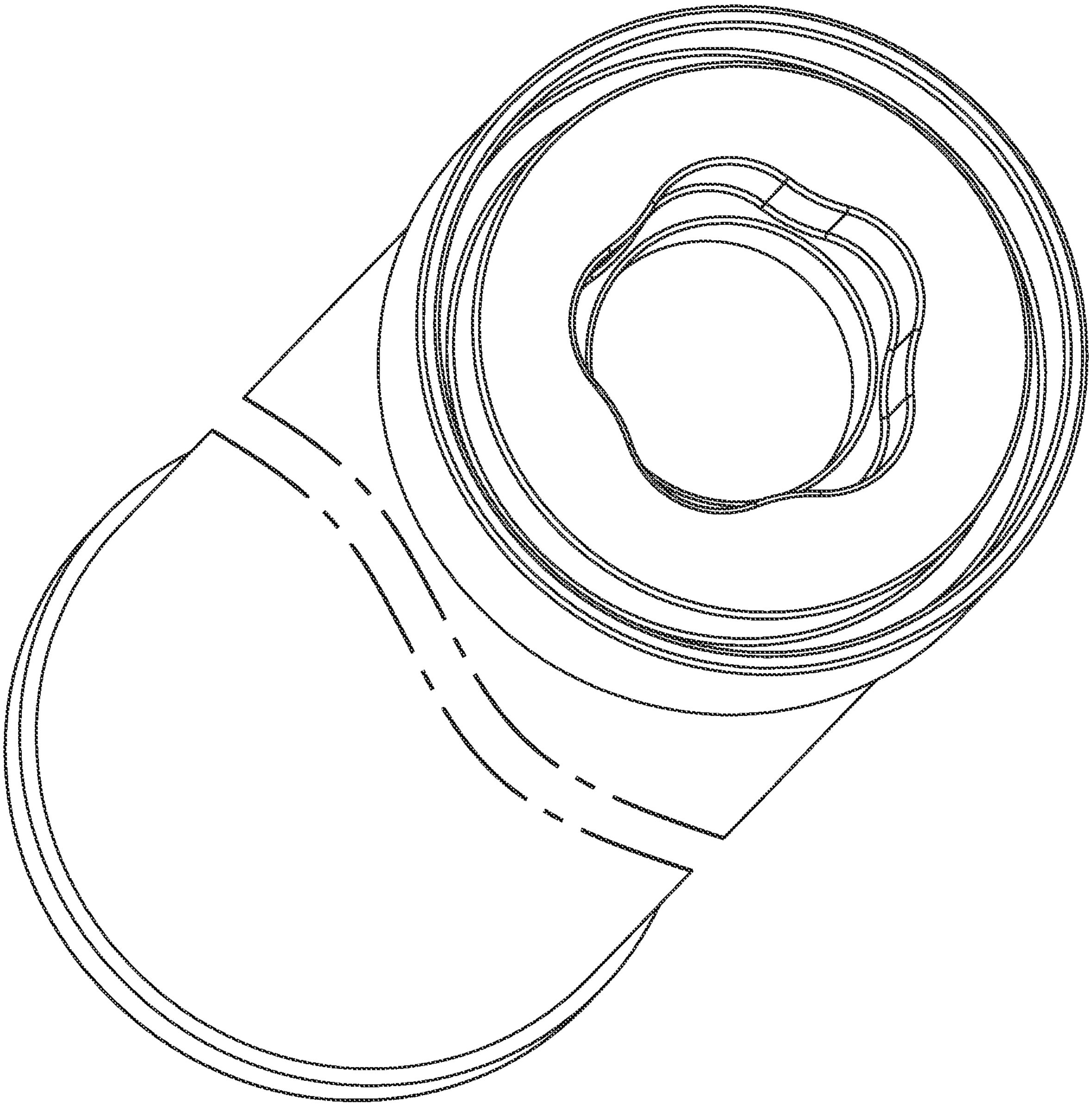

FIG. 184 is a schematic open end perspective view of a filter cartridge usable in an assembly according to, and in accordance with the principles of, the present disclosure; in FIG. 184, phantom or break lines being used to indicate a length variable.

Figure 185:
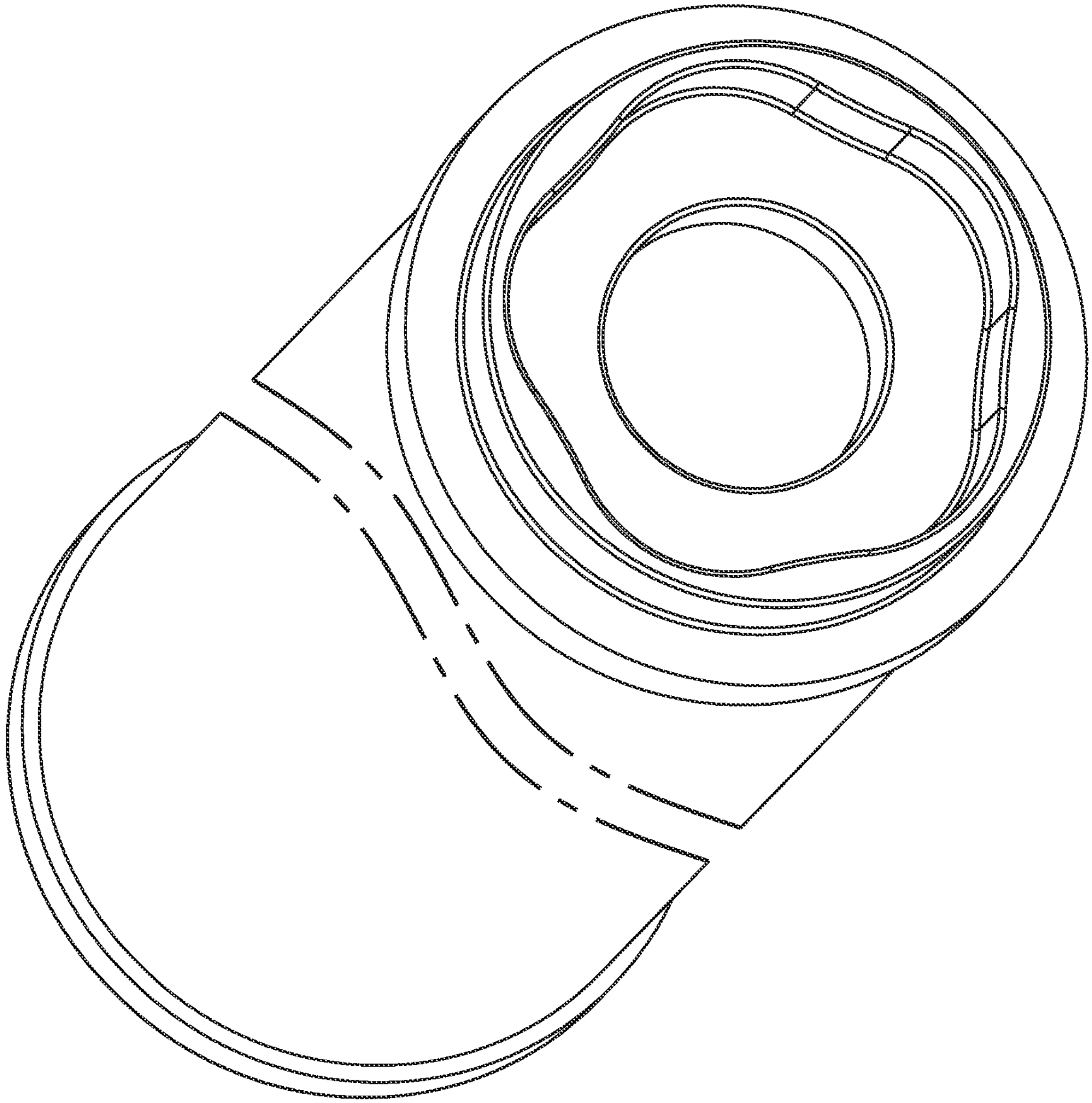

FIG. 185 is a schematic open end perspective view of a filter cartridge usable in an assembly according to, and in accordance with the principles of, the present disclosure; in FIG. 185, phantom or break lines being used to indicate a length variable.

Figure 186:
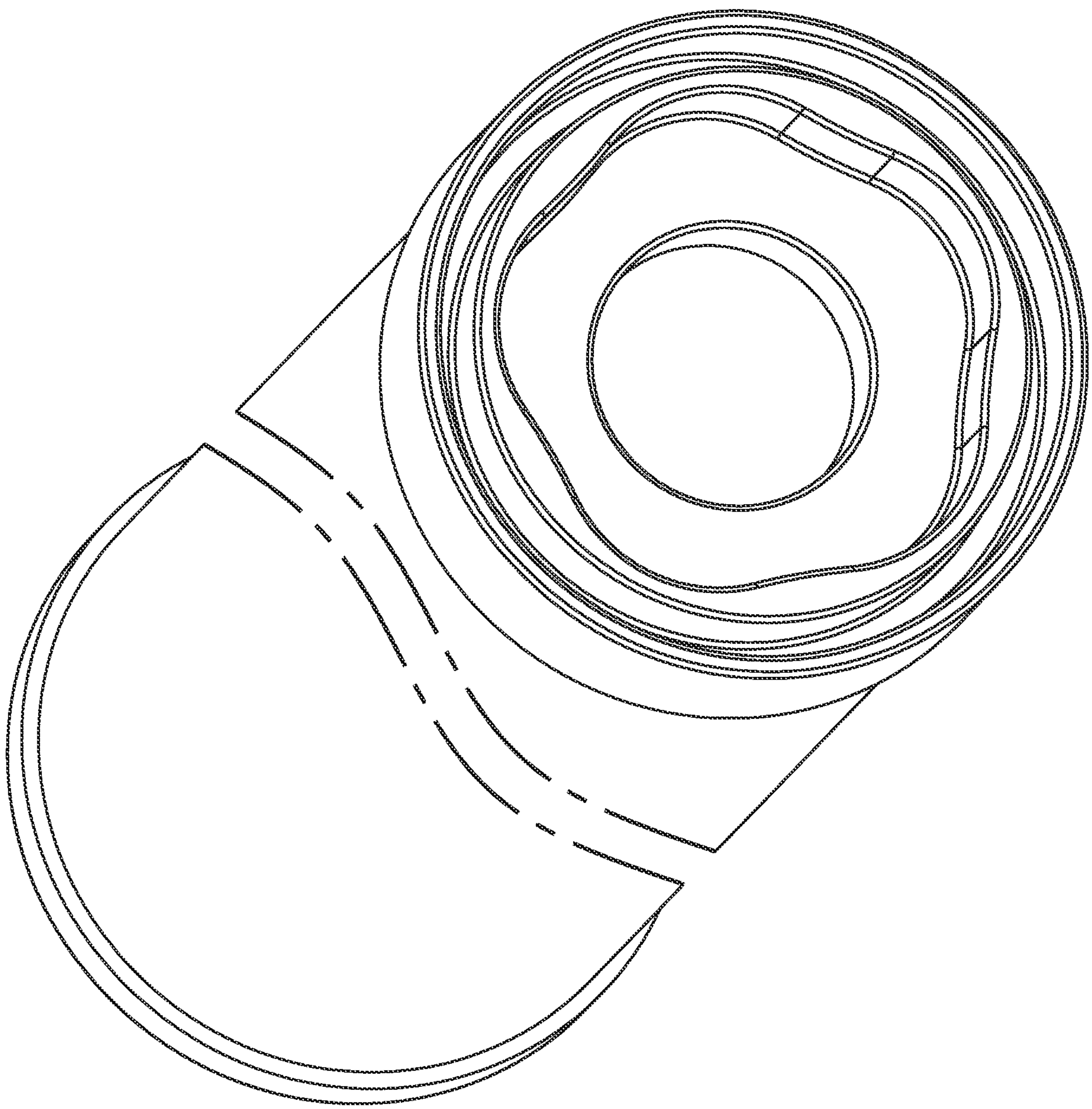

FIG. 186 is a schematic open end perspective view of a filter cartridge usable in an assembly according to, and in accordance with the principles of, the present disclosure; in FIG. 186, phantom or break lines being used to indicate a length variable.

Figure 187:
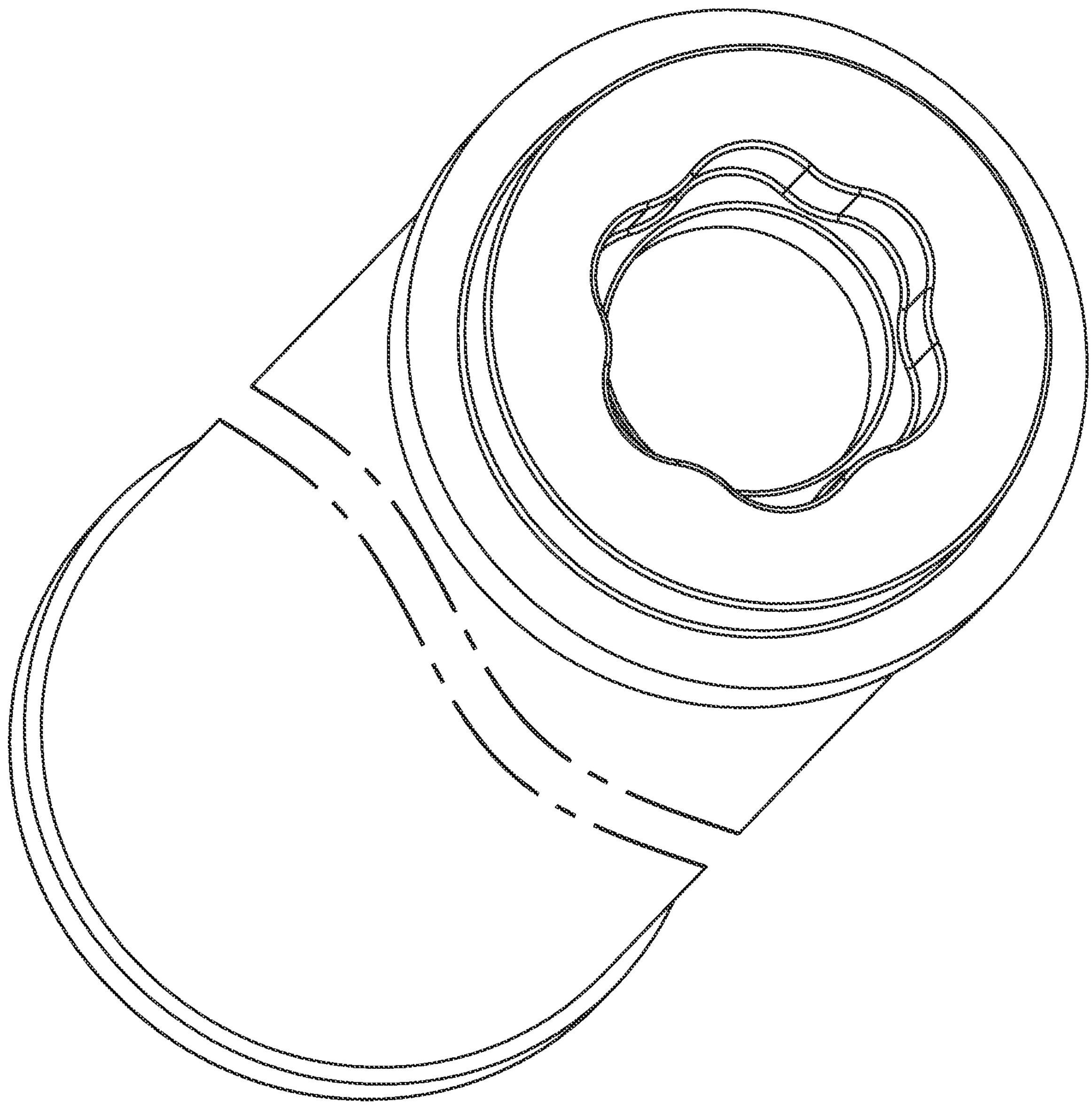

FIG. 187 is a schematic open end perspective view of a filter cartridge usable in an assembly according to, and in accordance with the principles of, the present disclosure; in FIG. 187, phantom or break lines being used to indicate a length variable.

Figure 188:
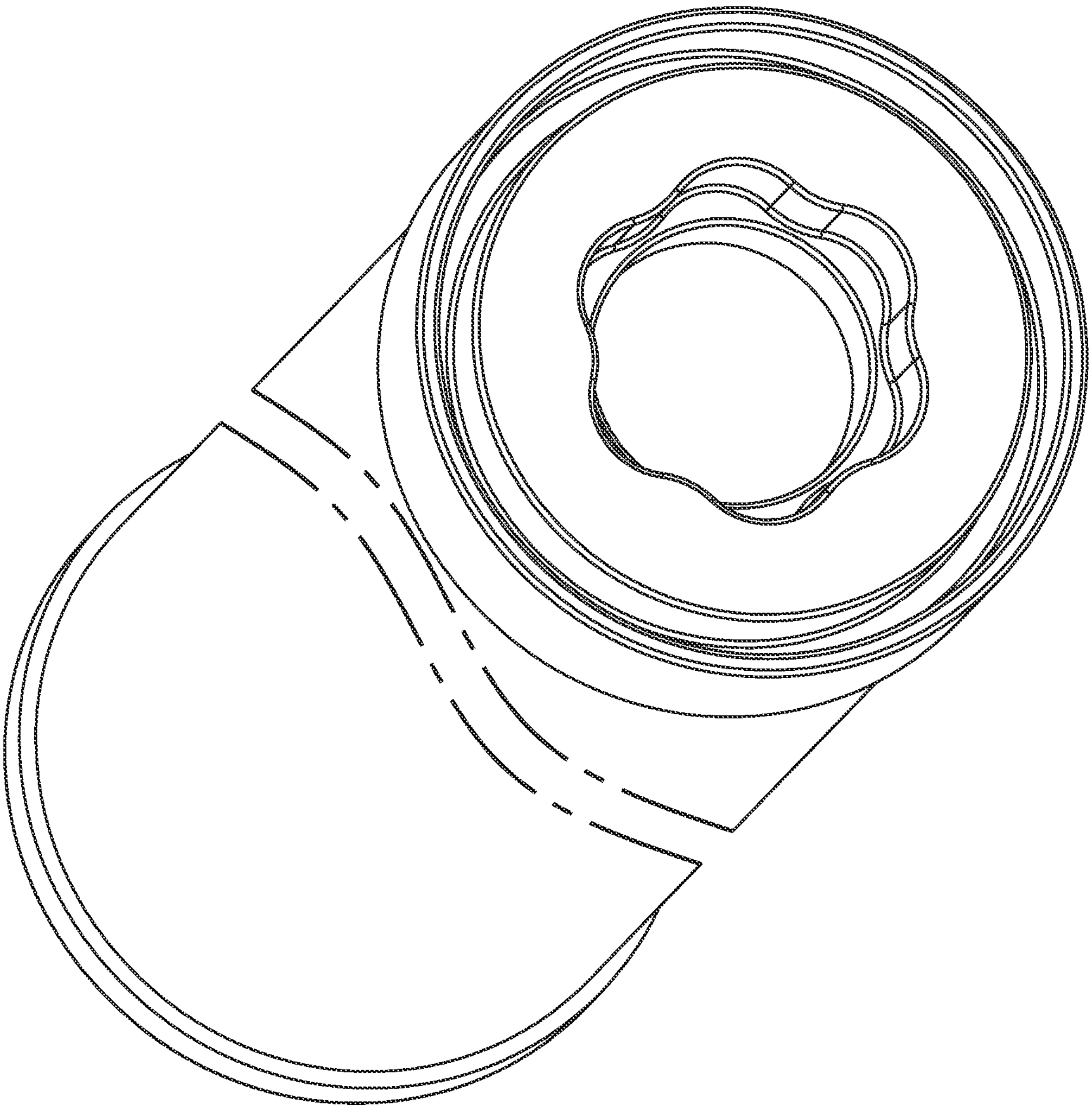

FIG. 188 is a schematic open end perspective view of a filter cartridge usable in an assembly according to, and in accordance with the principles of, the present disclosure; in FIG. 188, phantom or break lines being used to indicate a length variable.

Figure 189:
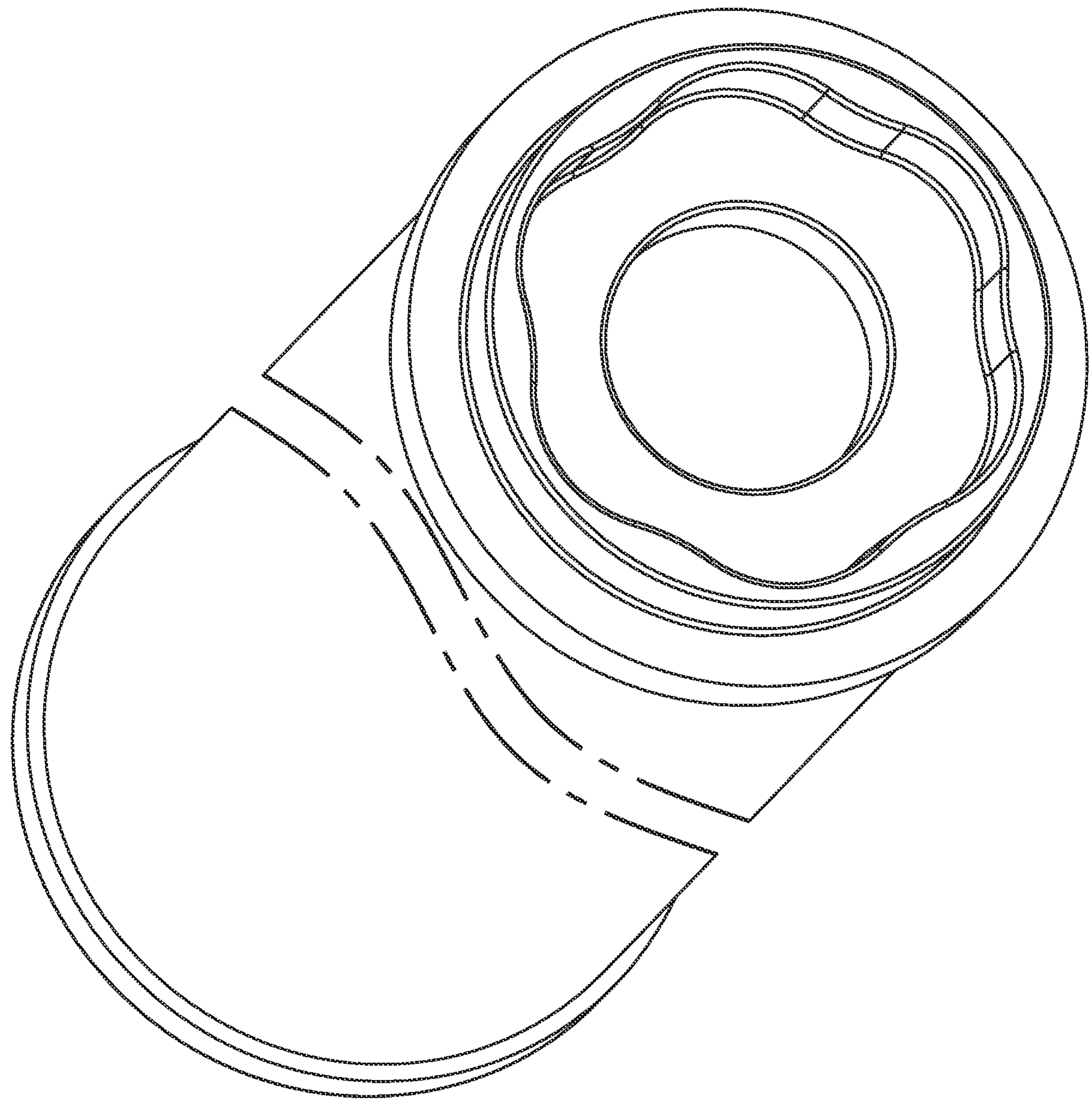

FIG. 189 is a schematic open end perspective view of a further filter cartridge according to the present disclosure.

Figure 190:
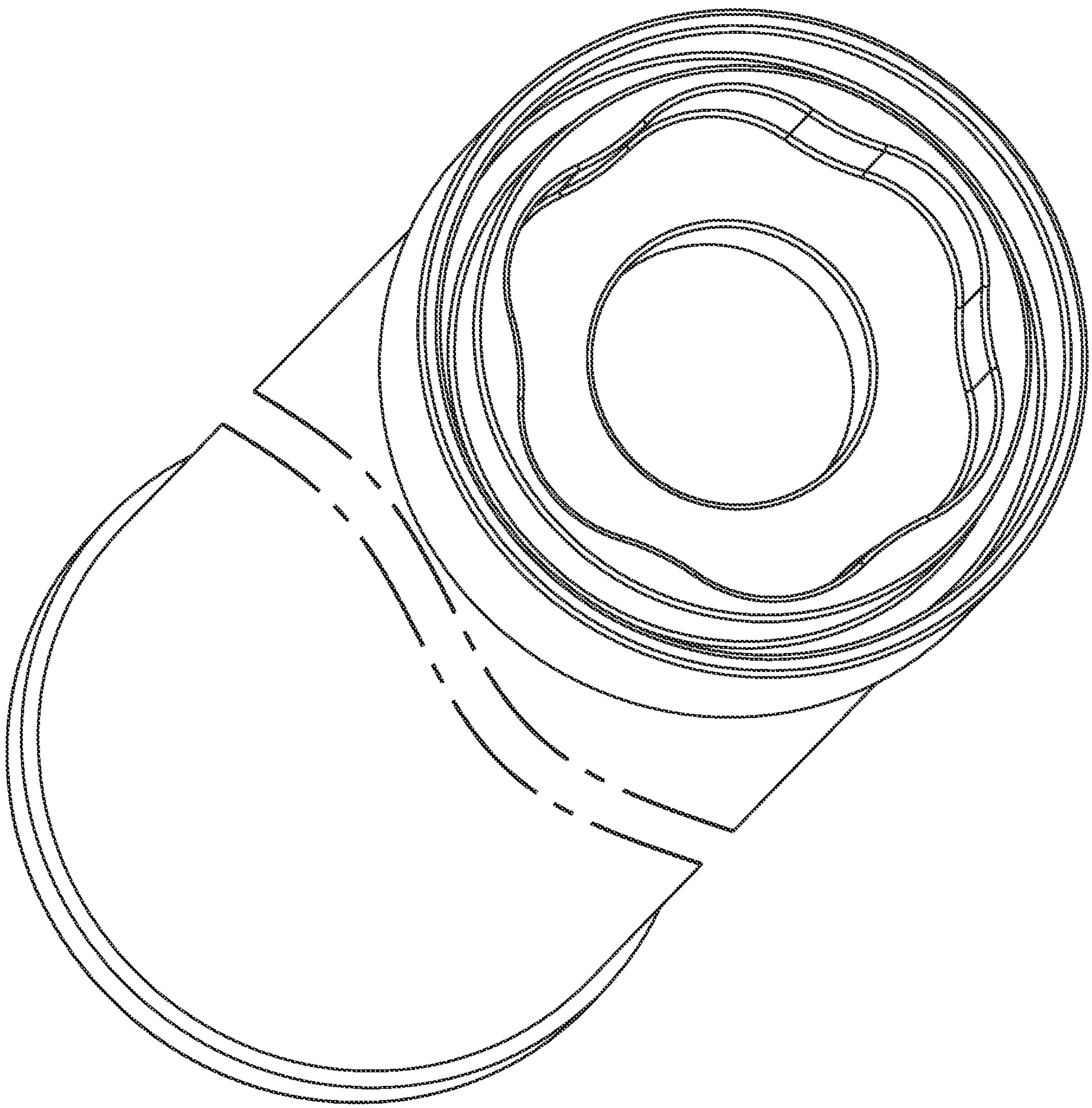

FIG. 190 is a schematic open end perspective view of a further filter cartridge.

Figure 191:
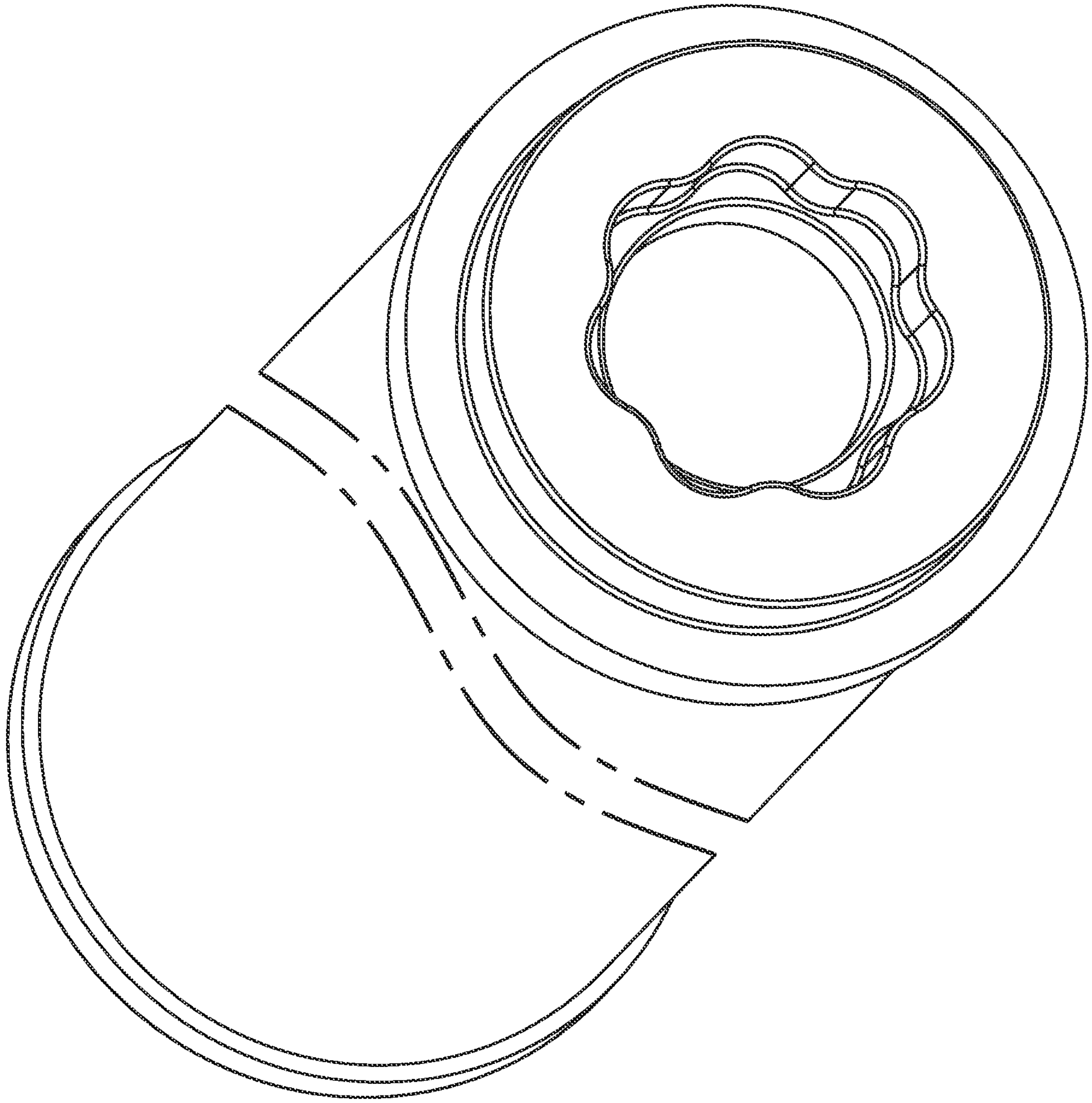

FIG. 191 is a schematic open end perspective view of a filter cartridge usable in an assembly according to, and in accordance with the principles of, the present disclosure; in FIG. 191, phantom or break lines being used to indicate a length variable.

Figure 192:
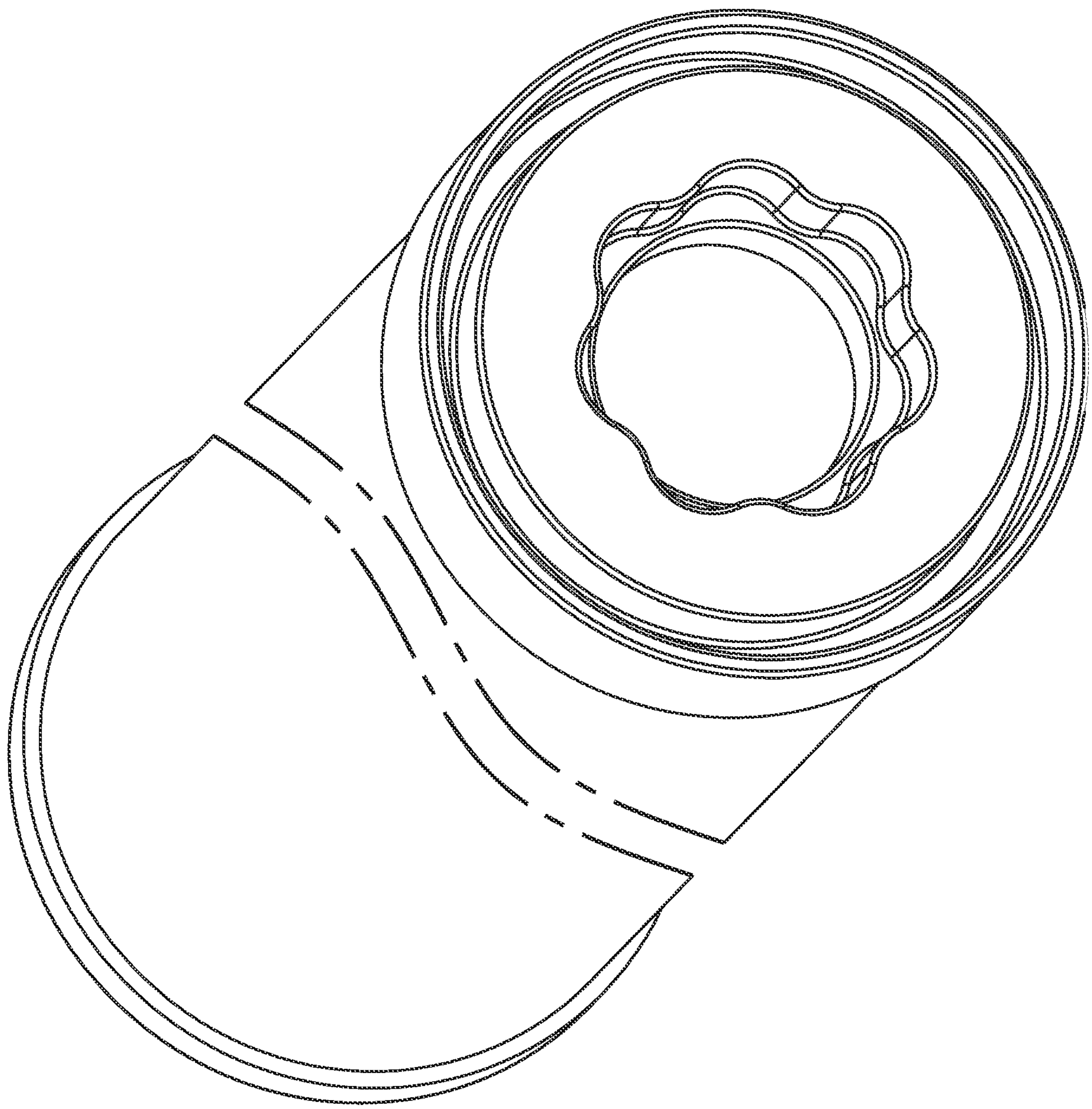

FIG. 192 is a schematic open end perspective view of a filter cartridge usable in an assembly according to, and in accordance with the principles of, the present disclosure; in FIG. 192, phantom or break lines being used to indicate a length variable.

Figure 193:
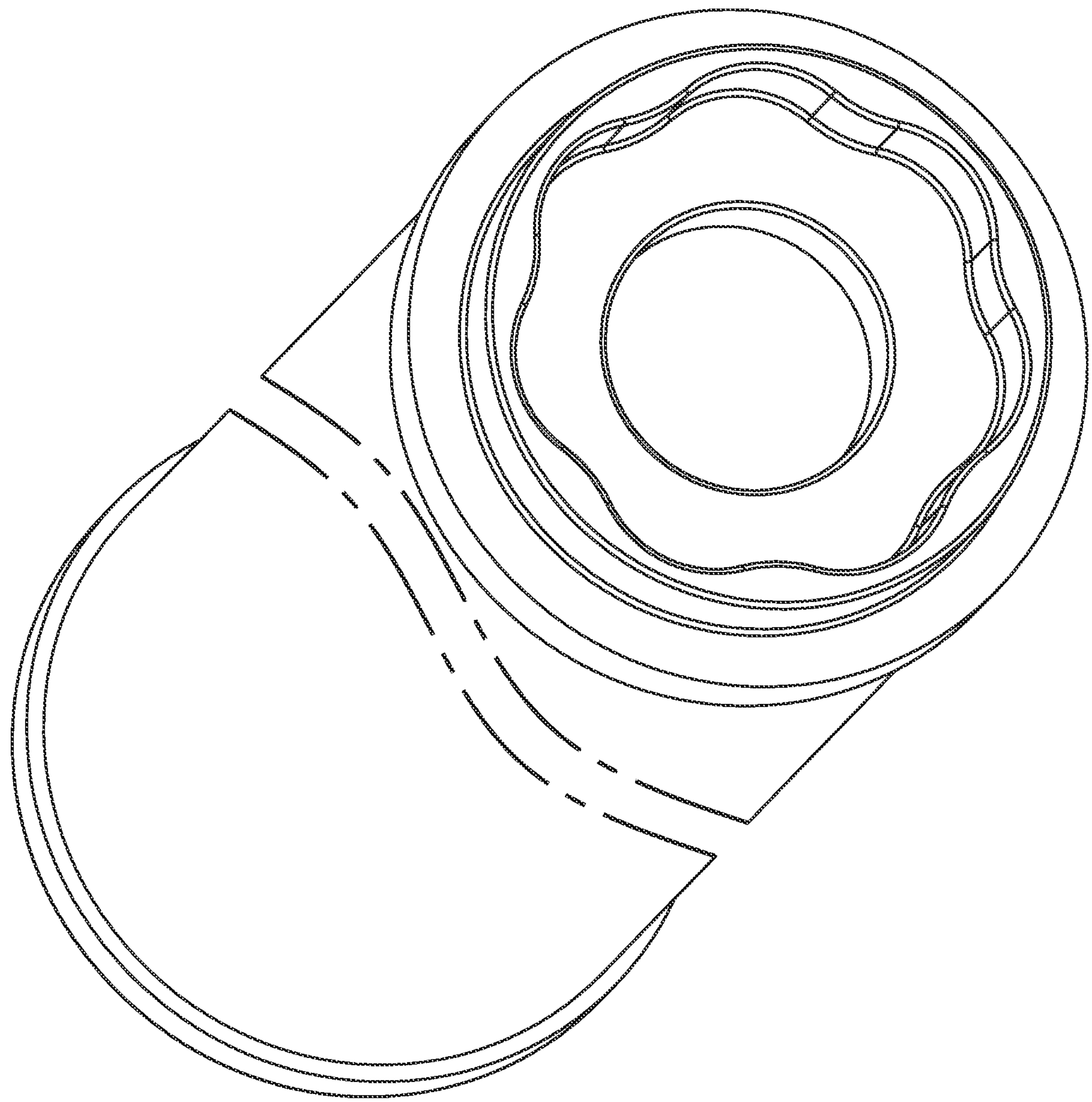

FIG. 193 is a schematic open end perspective view of a filter cartridge usable in an assembly according to, and in accordance with the principles of, the present disclosure; in FIG. 193, phantom or break lines being used to indicate a length variable.

Figure 194:
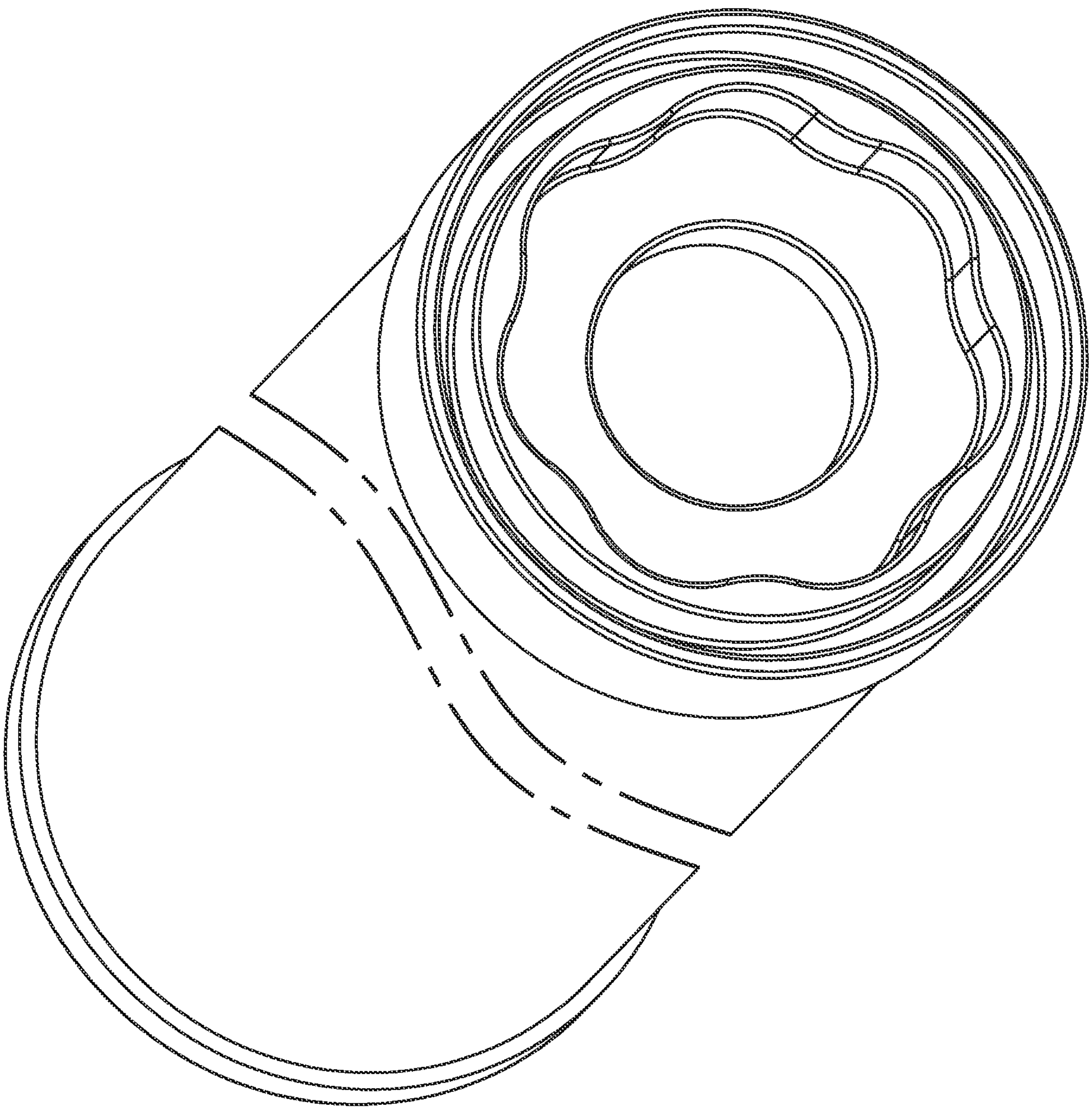

FIG. 194 is a schematic open end perspective view of a filter cartridge usable in an assembly according to, and in accordance with the principles of, the present disclosure; in FIG. 194, phantom or break lines being used to indicate a length variable.

Figure 195:
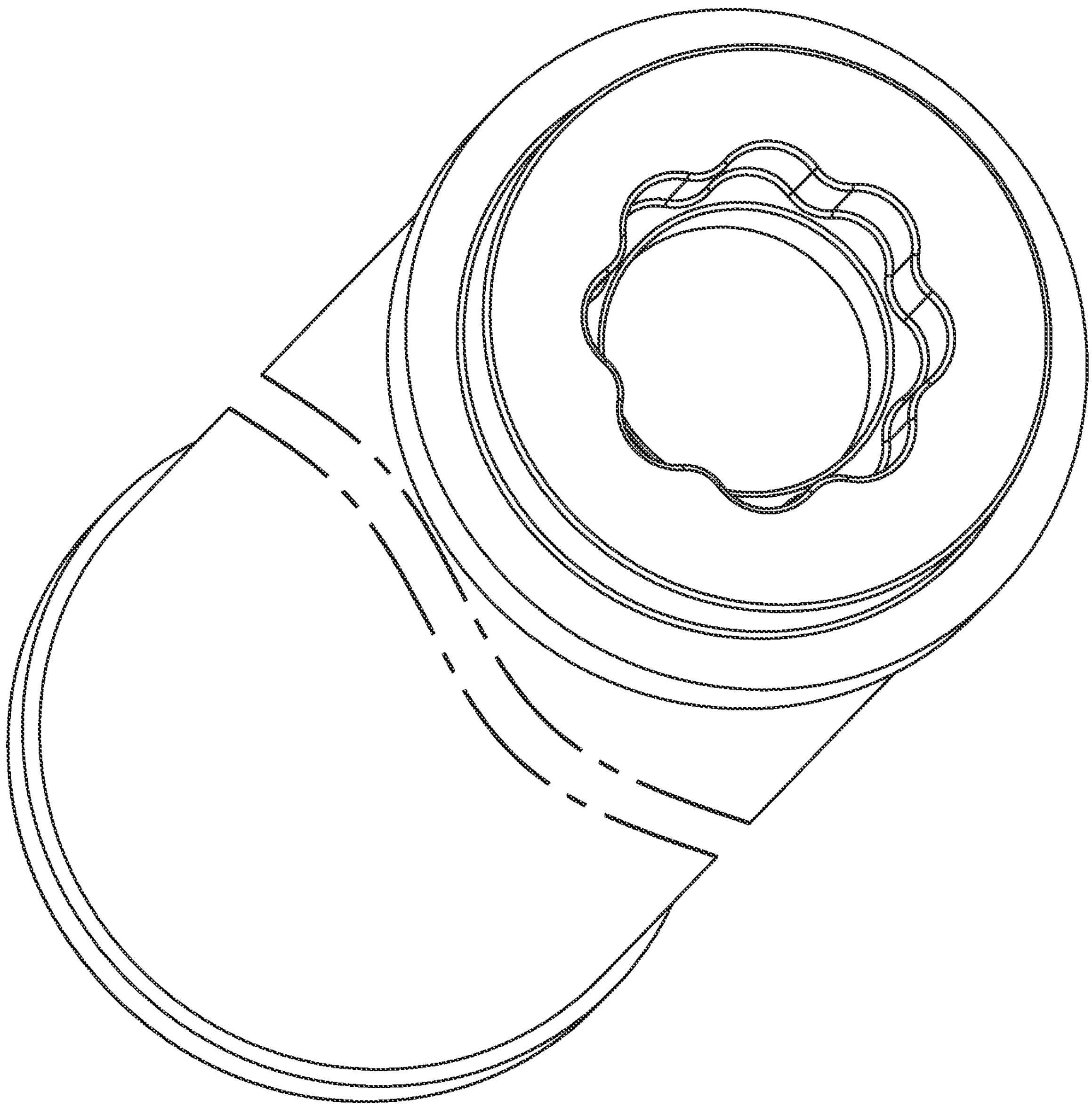

FIG. 195 is a schematic open end perspective view of a filter cartridge usable in an assembly according to, and in accordance with the principles of, the present disclosure; in FIG. 195, phantom or break lines being used to indicate a length variable.

Figure 196:
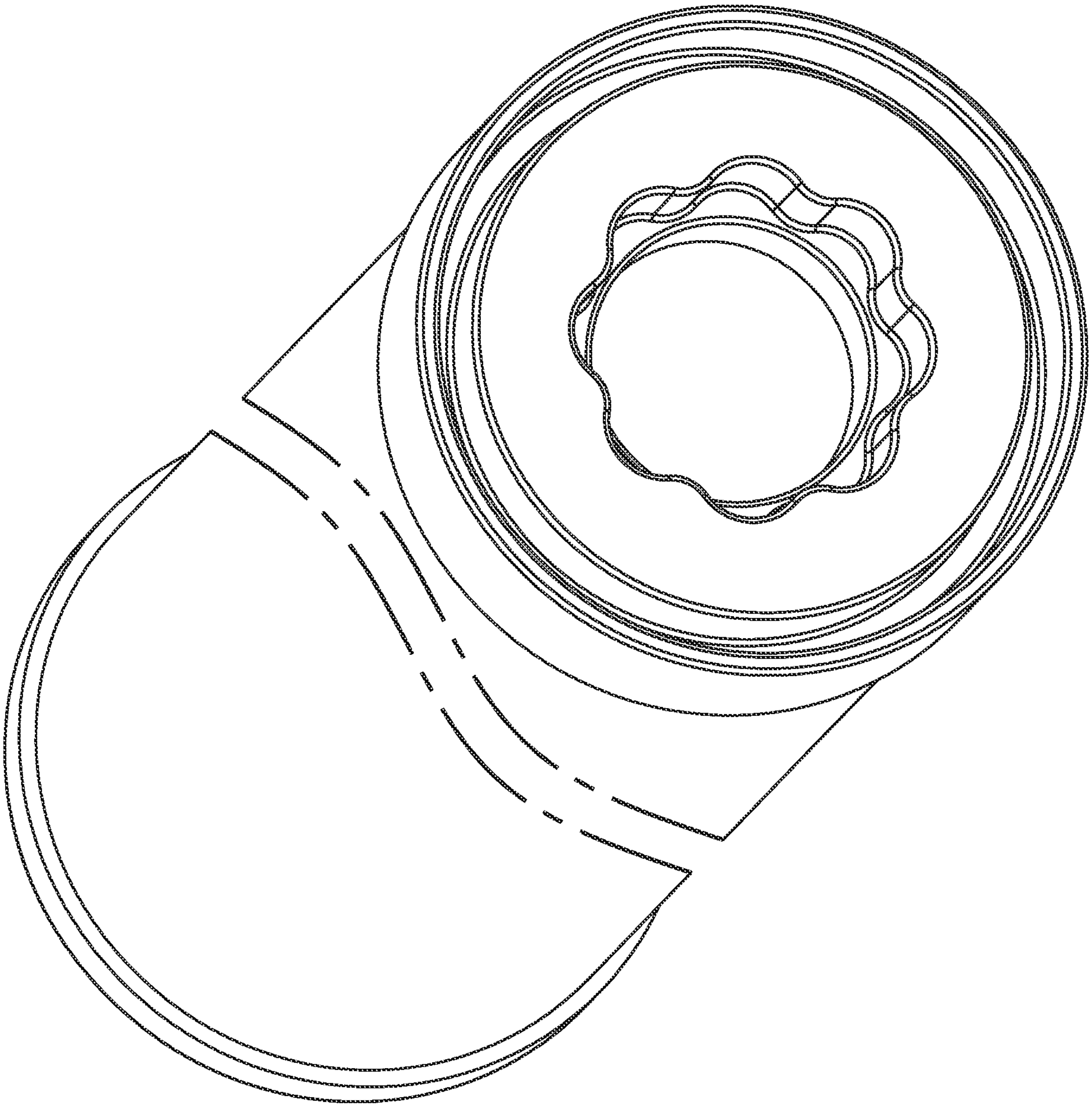

FIG. 196 is a schematic open end perspective view of a filter cartridge usable in an assembly according to, and in accordance with the principles of, the present disclosure; in FIG. 196, phantom or break lines being used to indicate a length variable.

Figure 197:
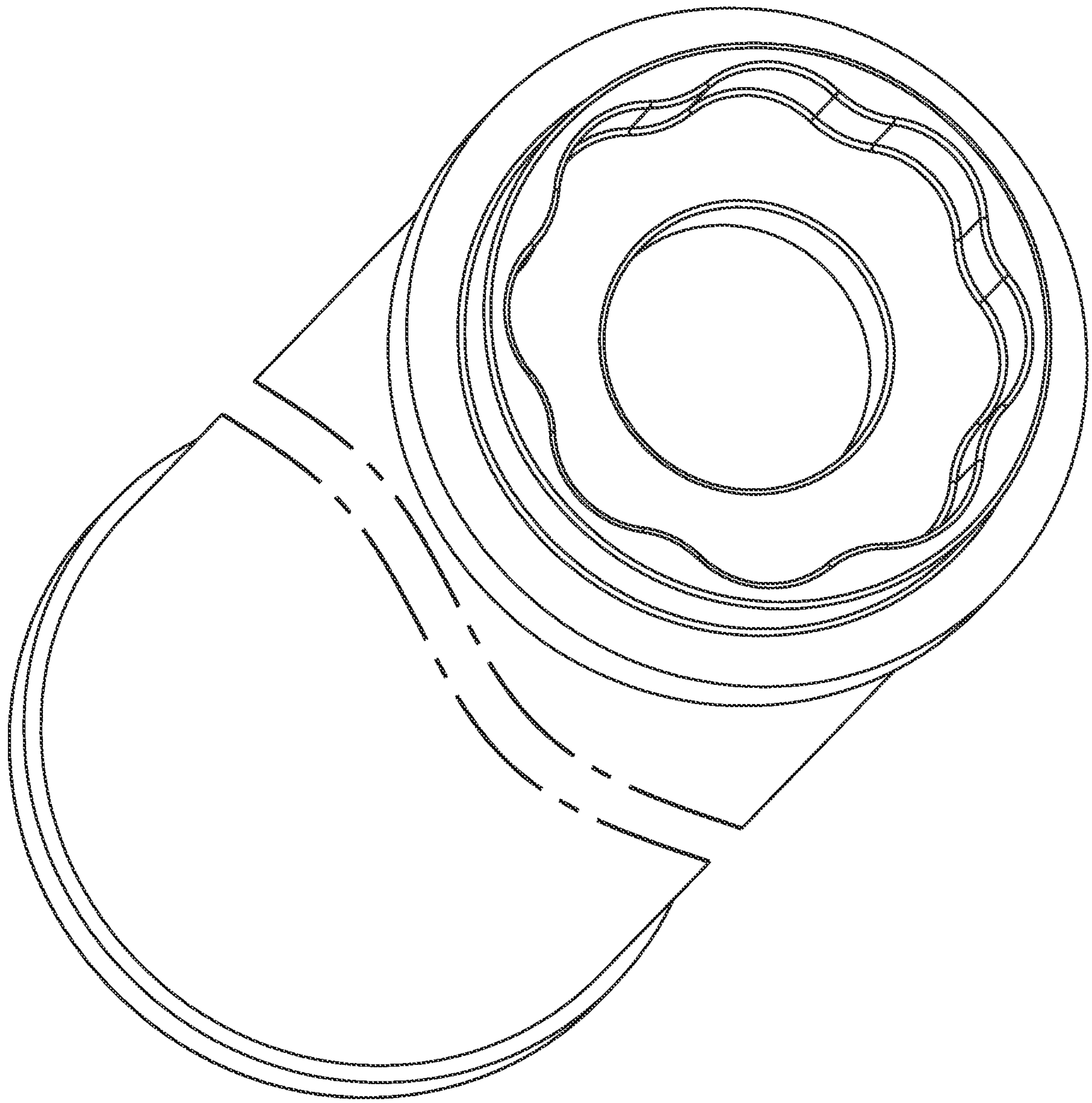

FIG. 197 is a schematic open end perspective view of a filter cartridge usable in an assembly according to, and in accordance with the principles of, the present disclosure; in FIG. 197, phantom or break lines being used to indicate a length variable.

Figure 198:
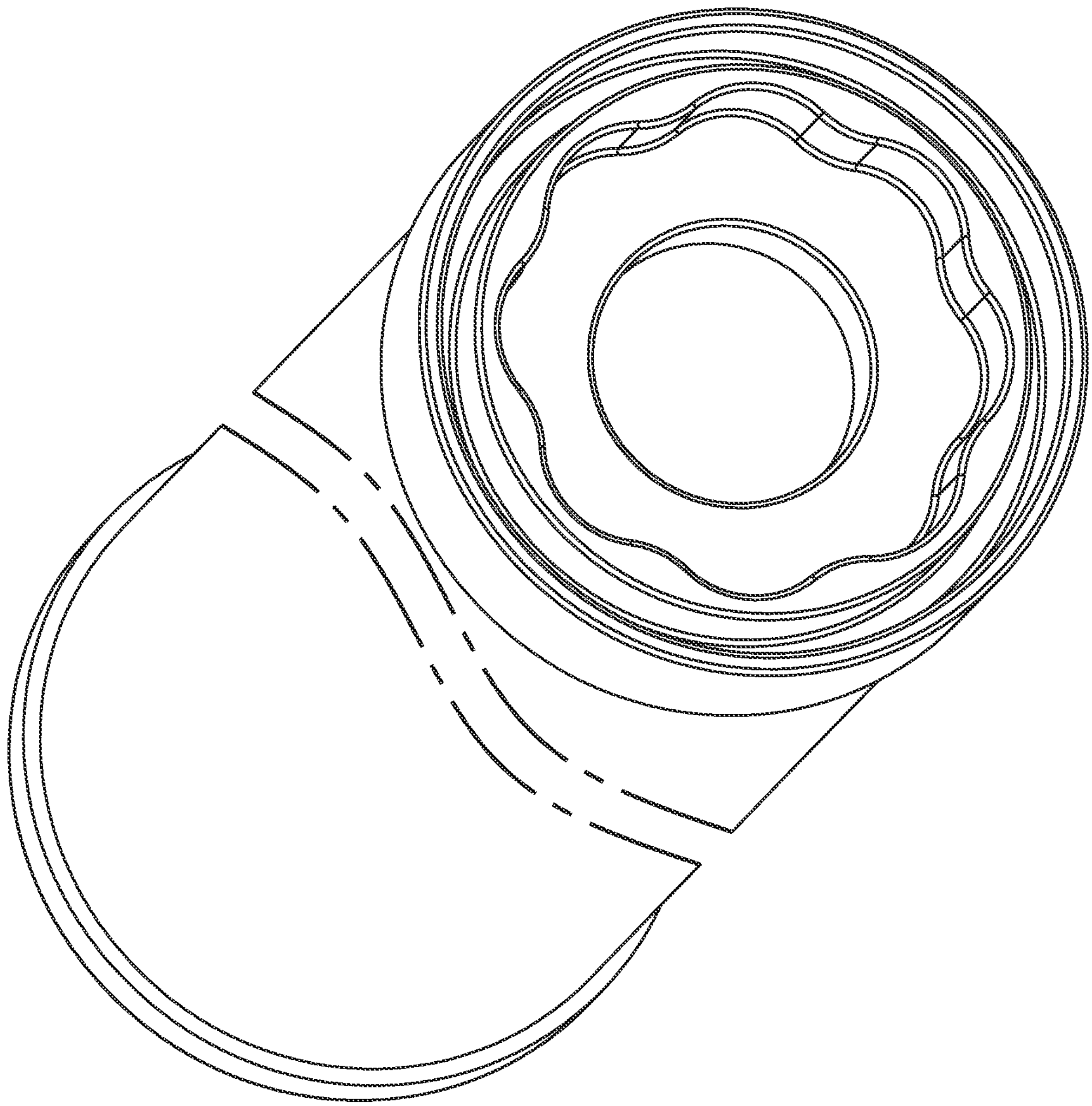

FIG. 198 is a schematic open end perspective view of a filter cartridge usable in an assembly according to, and in accordance with the principles of, the present disclosure; in FIG. 198, phantom or break lines being used to indicate a length variable.

Figure 199:
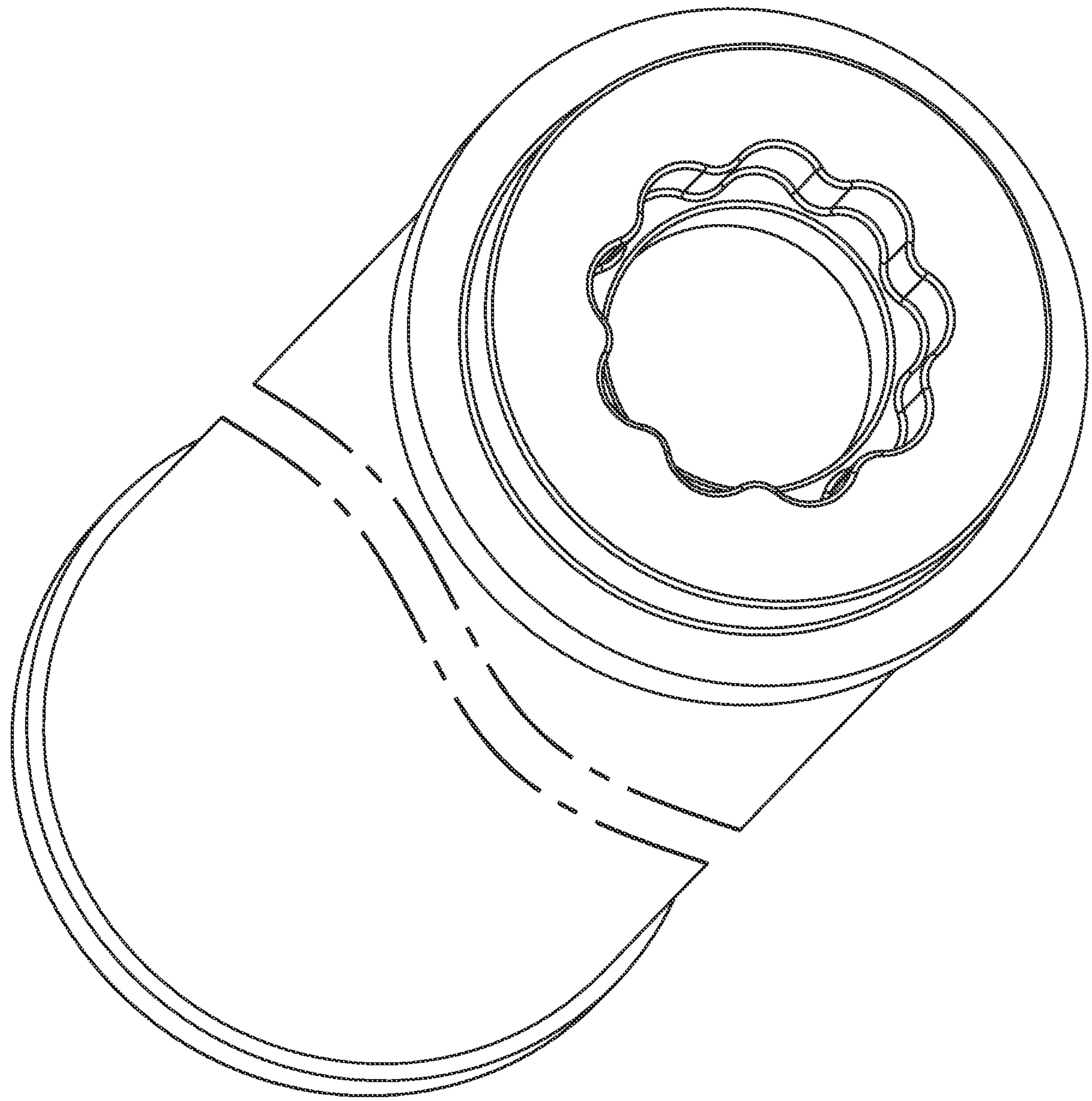

FIG. 199 is a schematic open end perspective view of a filter cartridge usable in an assembly according to, and in accordance with the principles of, the present disclosure; in FIG. 199, phantom or break lines being used to indicate a length variable.

Figure 200:
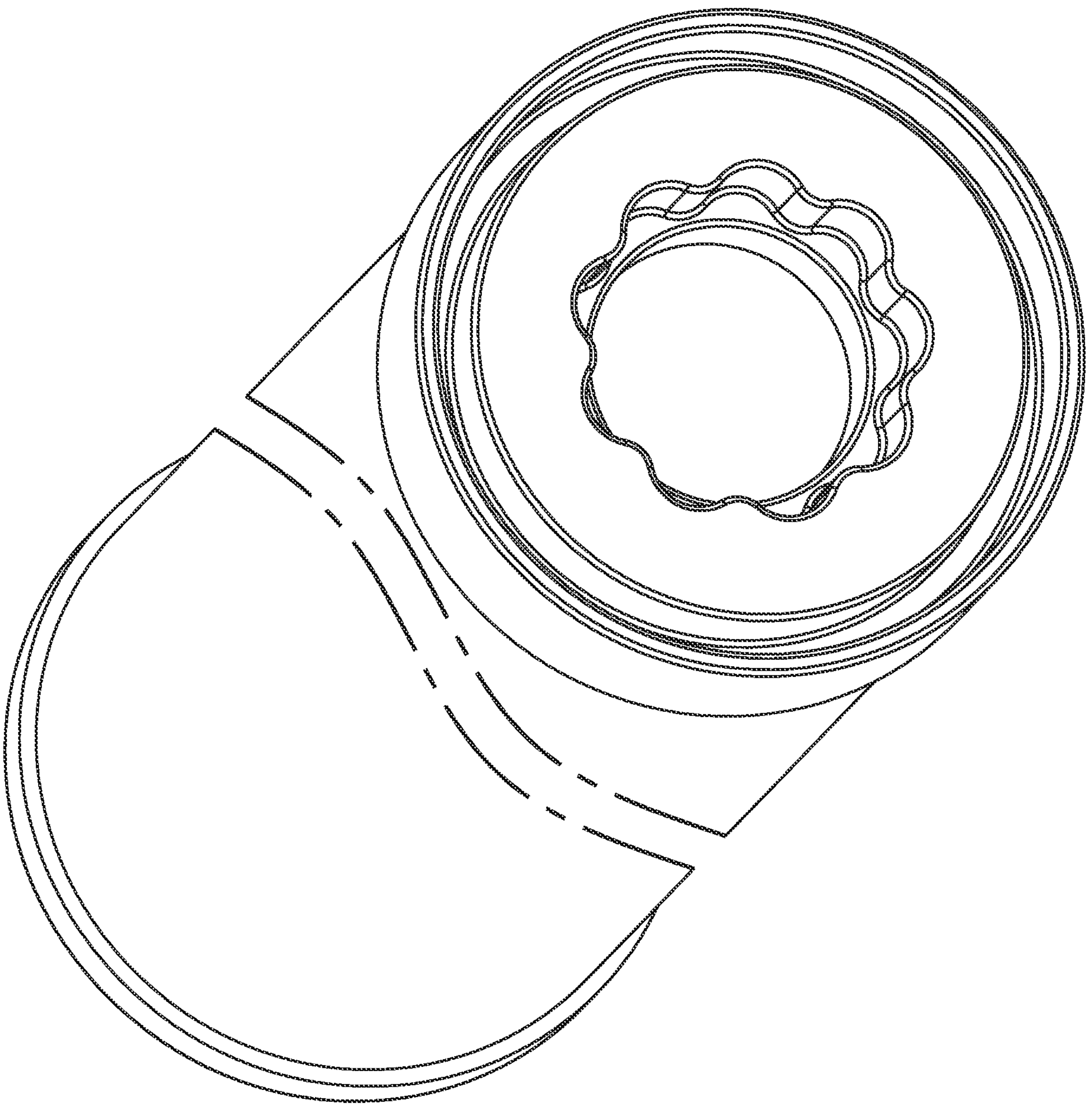

FIG. 200 is a schematic open end perspective view of a filter cartridge usable in an assembly according to, and in accordance with the principles of, the present disclosure; in FIG. 200, phantom or break lines being used to indicate a length variable.

Figure 201:
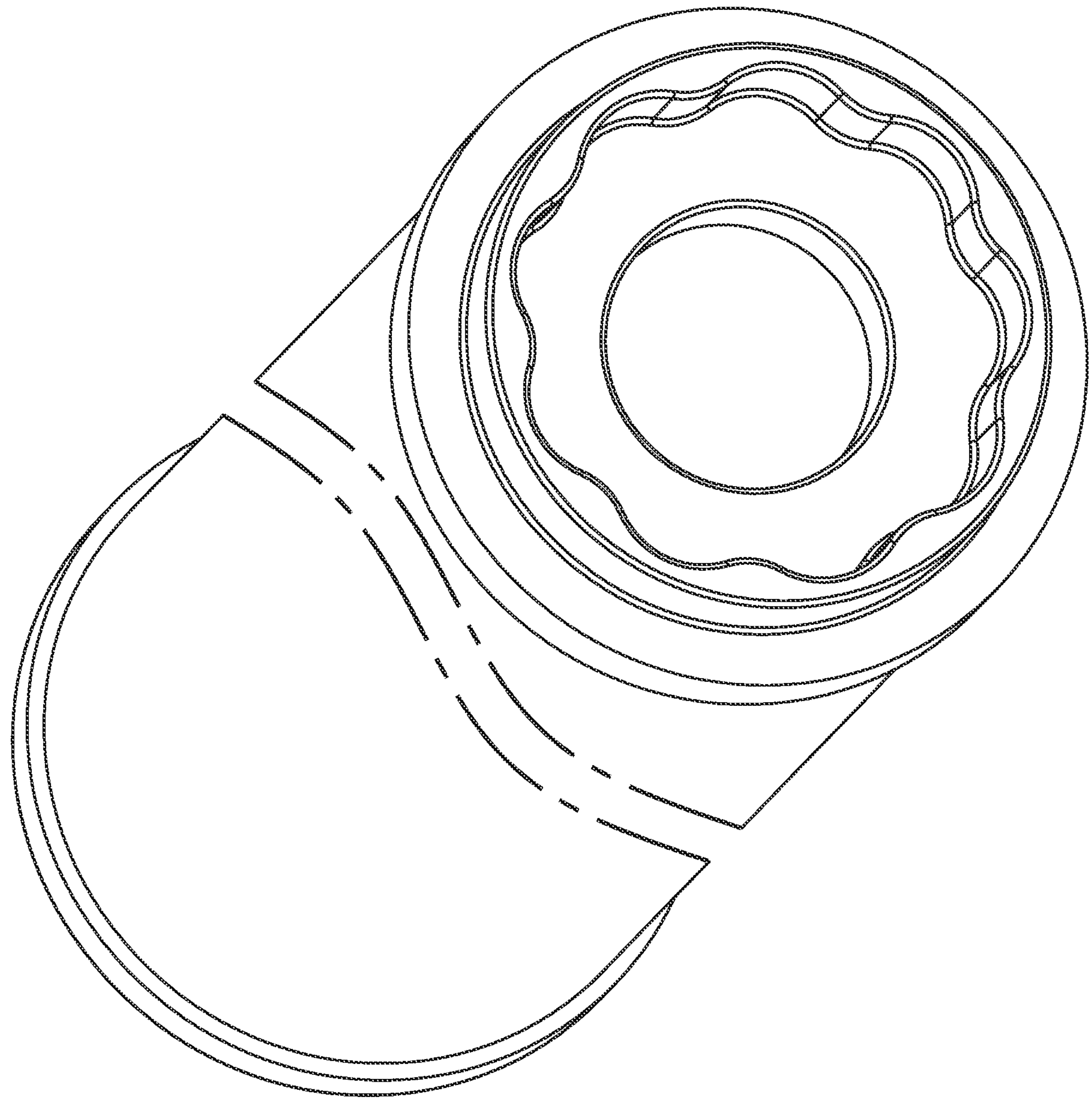

FIG. 201 is a schematic open end perspective view of a filter cartridge usable in an assembly according to, and in accordance with the principles of, the present disclosure; in FIG. 201, phantom or break lines being used to indicate a length variable.

Figure 202:
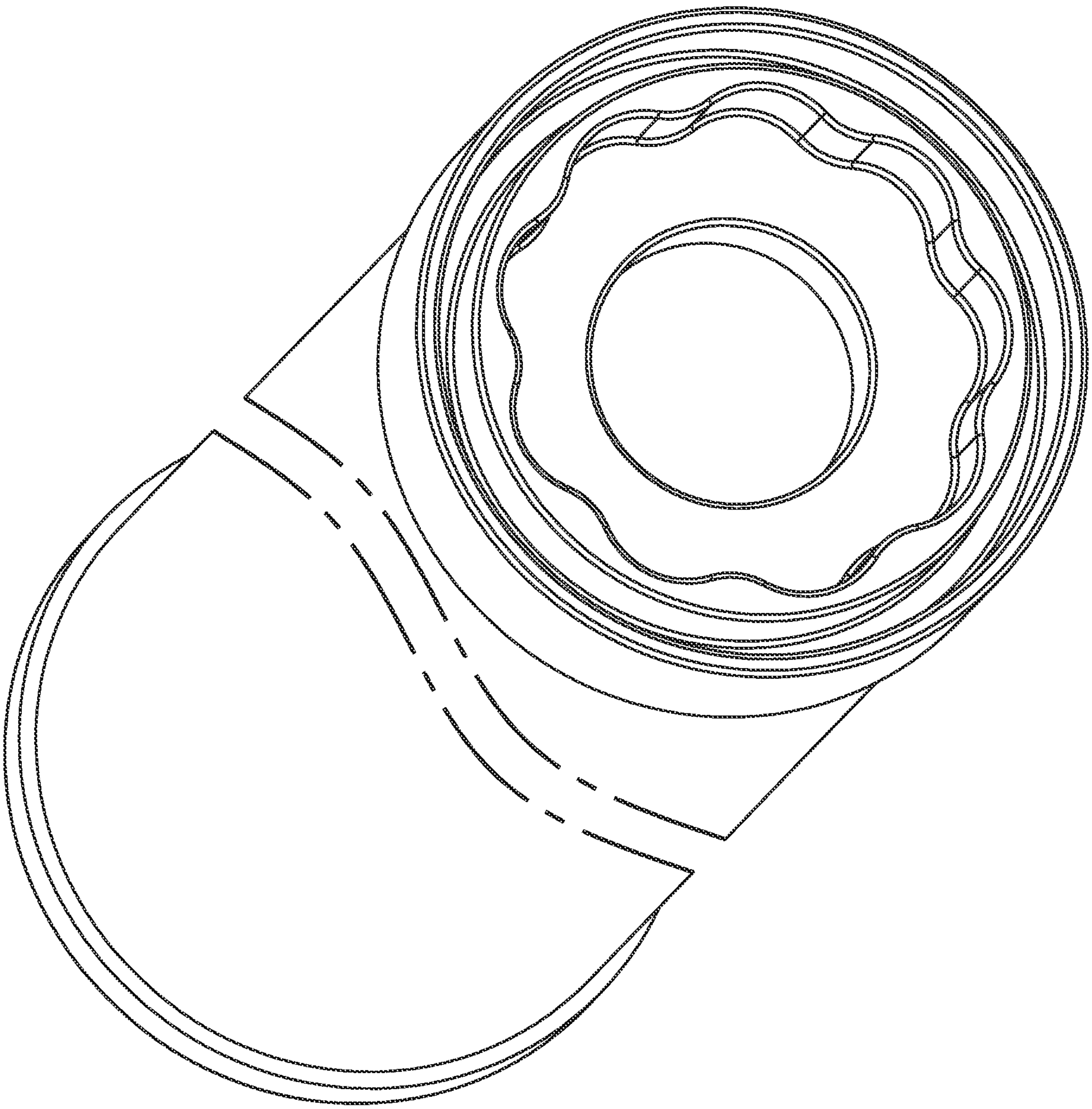

FIG. 202 is a schematic open end perspective view of a filter cartridge usable in an assembly according to, and in accordance with the principles of, the present disclosure; in FIG. 202, phantom or break lines being used to indicate a length variable.

Figure 203:
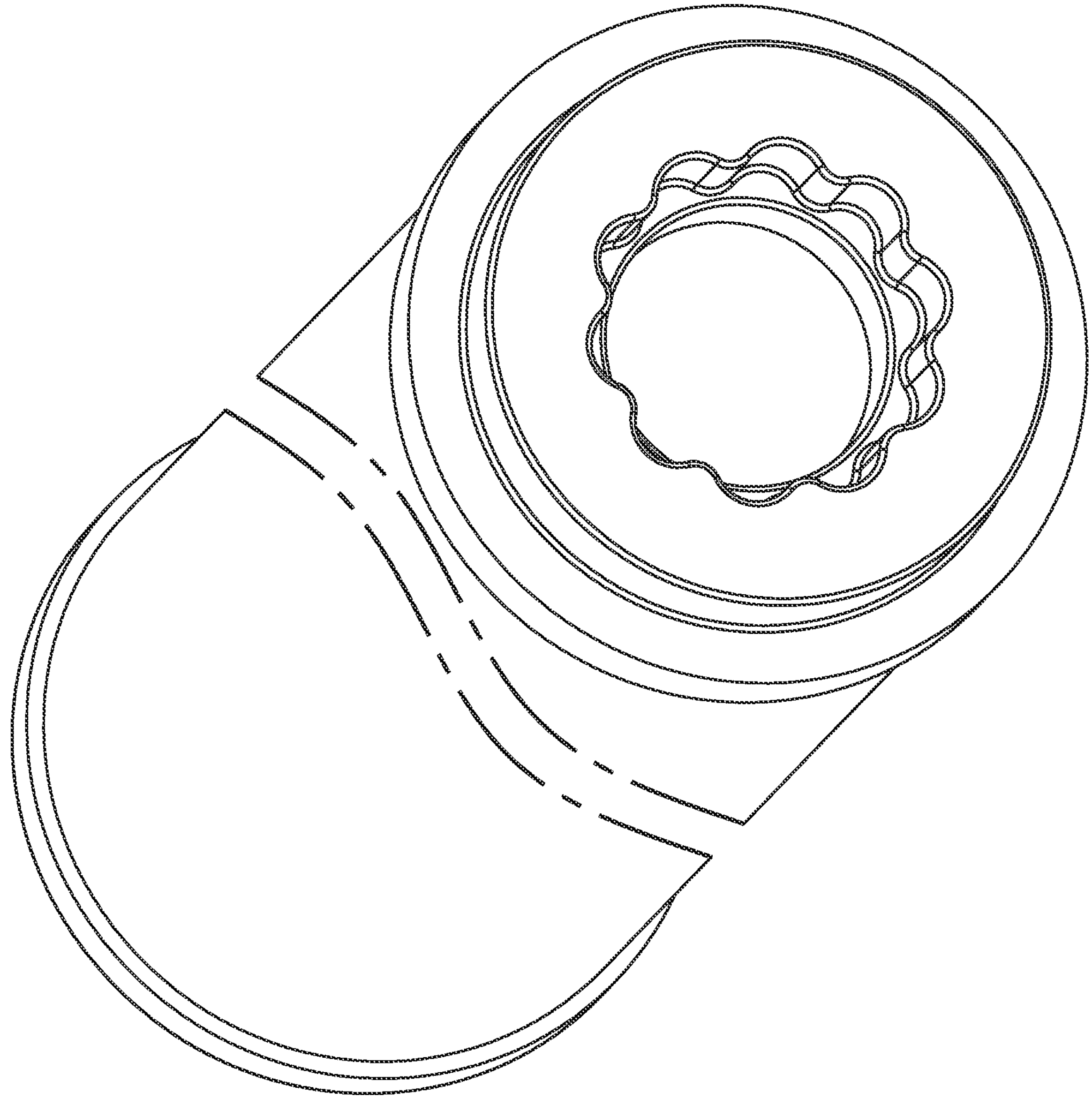

FIG. 203 is a schematic open end perspective view of a filter cartridge usable in an assembly according to, and in accordance with the principles of, the present disclosure; in FIG. 203, phantom or break lines being used to indicate a length variable.

Figure 204:
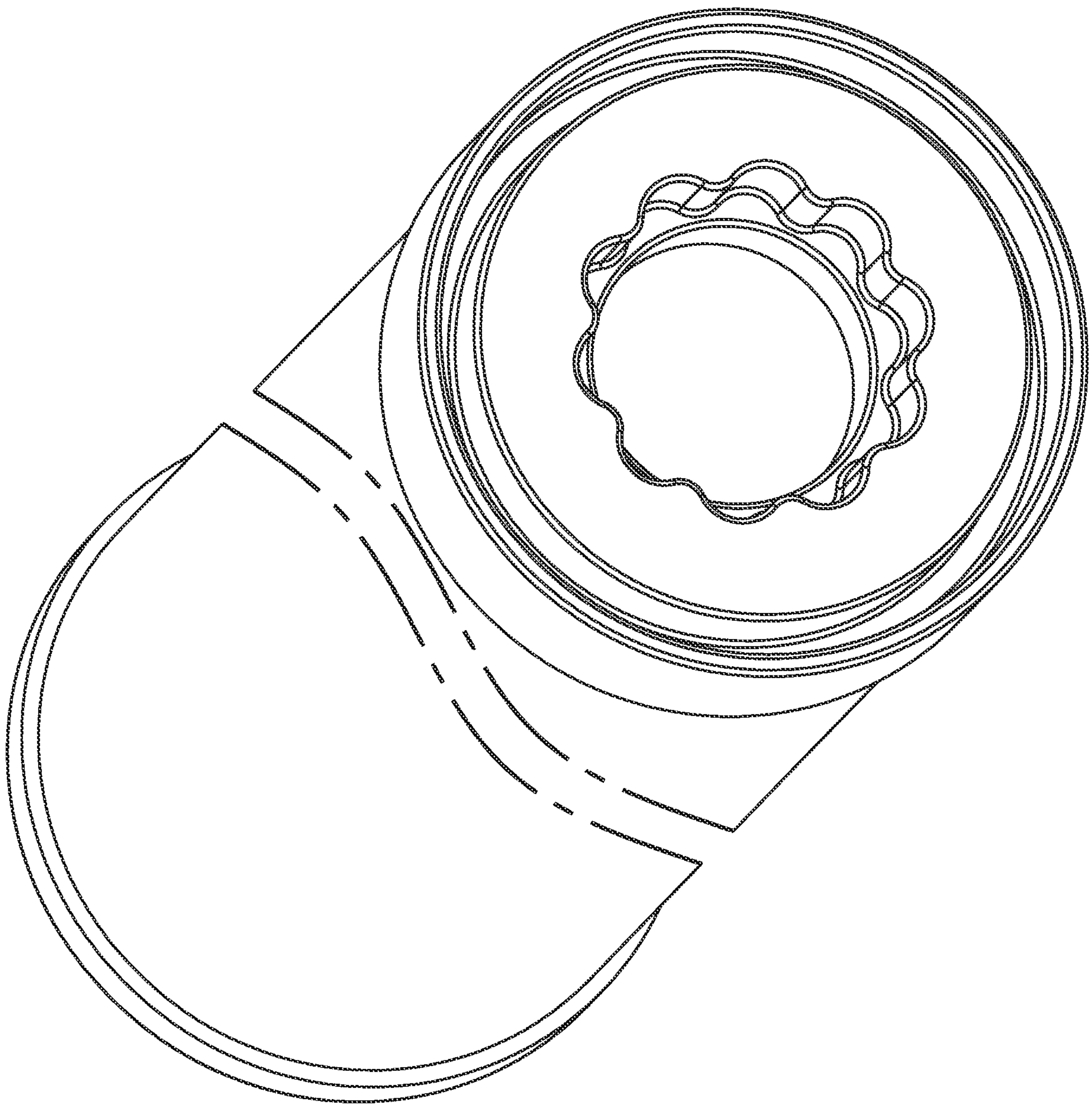

FIG. 204 is a schematic open end perspective view of a filter cartridge usable in an assembly according to, and in accordance with the principles of, the present disclosure; in FIG. 204, phantom or break lines being used to indicate a length variable.

Figure 205:
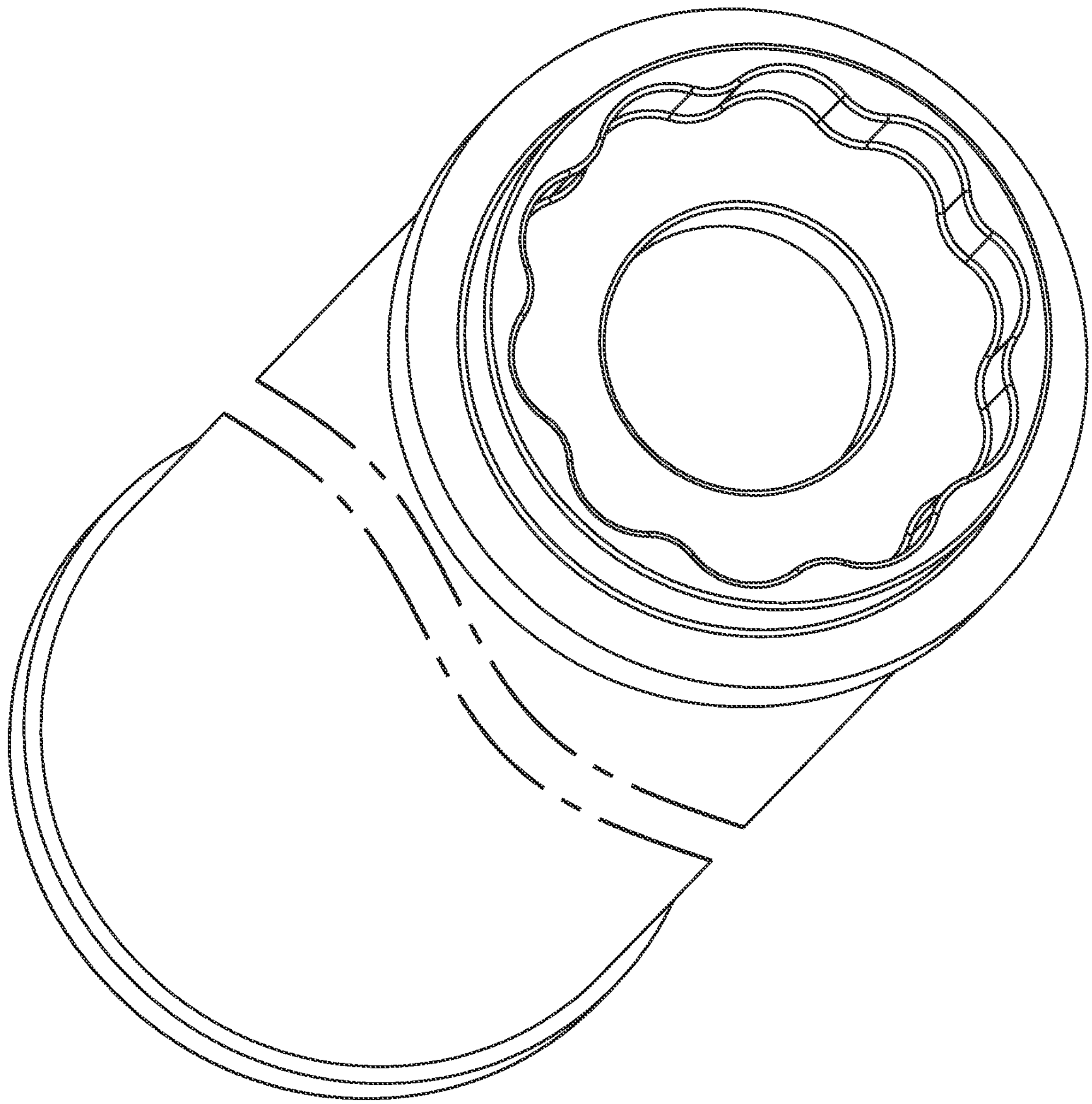

FIG. 205 is a schematic open end perspective view of a filter cartridge usable in an assembly according to, and in accordance with the principles of, the present disclosure; in FIG. 205, phantom or break lines being used to indicate a length variable.

Figure 206:
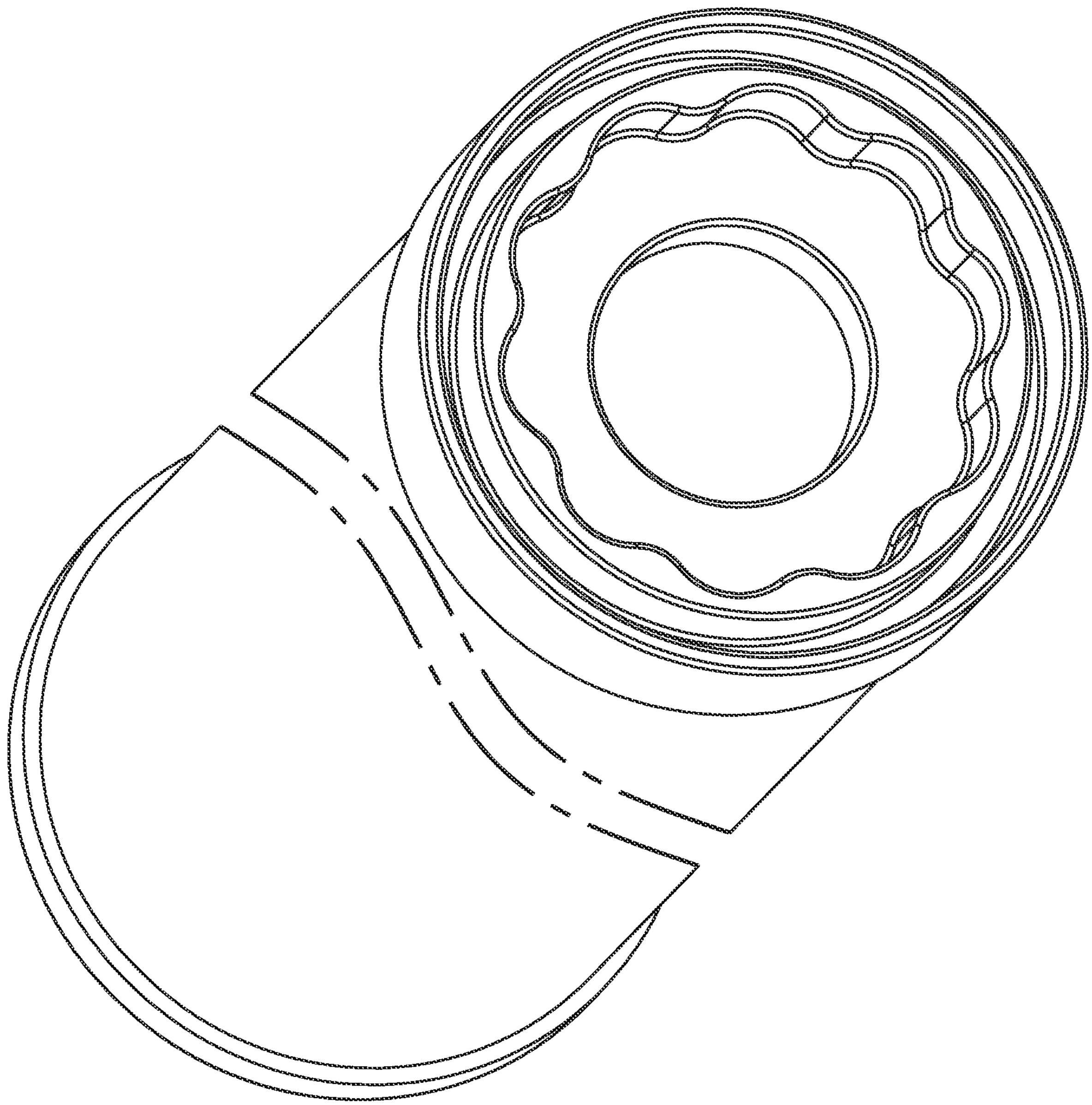

FIG. 206 is a schematic open end perspective view of a filter cartridge usable in an assembly according to, and in accordance with the principles of, the present disclosure; in FIG. 206, phantom or break lines being used to indicate a length variable.

DETAILED DESCRIPTION

Herein, an example filter assemblies, features and components therefor are described and depicted. A variety of specific features and components are characterized in detail. Many can be applied to provide advantage. There is no specific requirement that the various individual features and components be applied in an overall assembly with all of the features and characteristics described, however, in order to provide for some benefit in accord with the present disclosure.

It is noted that a plurality of embodiments are depicted and described. The embodiments are not meant to be exclusive with respect to features depicted. That is, selected features of one embodiment can be applied in or more of the other embodiments if desired, to advantage.

In many examples, the filter assembly depicted is an air cleaner assembly, for example, used to filter intake air for an internal combustion engine. Additional embodiments are described in which the filter assembly is a crankcase ventilation filter assembly, in which the filter cartridge is used to filter crankcase blowby gases which include, typically, both particulate and liquid contaminant therein. Both type of filter assemblies are generally “gas filter assemblies,” since the carrier stage being filtered is gas (air or crankcase ventilation gases). While the techniques described herein will typically be used in application for gas filtration, they can be used in the filtration of other materials, for example, liquids, if desired.

I. General Features of an Example Embodiment, FIGS. 1-3

Figure 1:
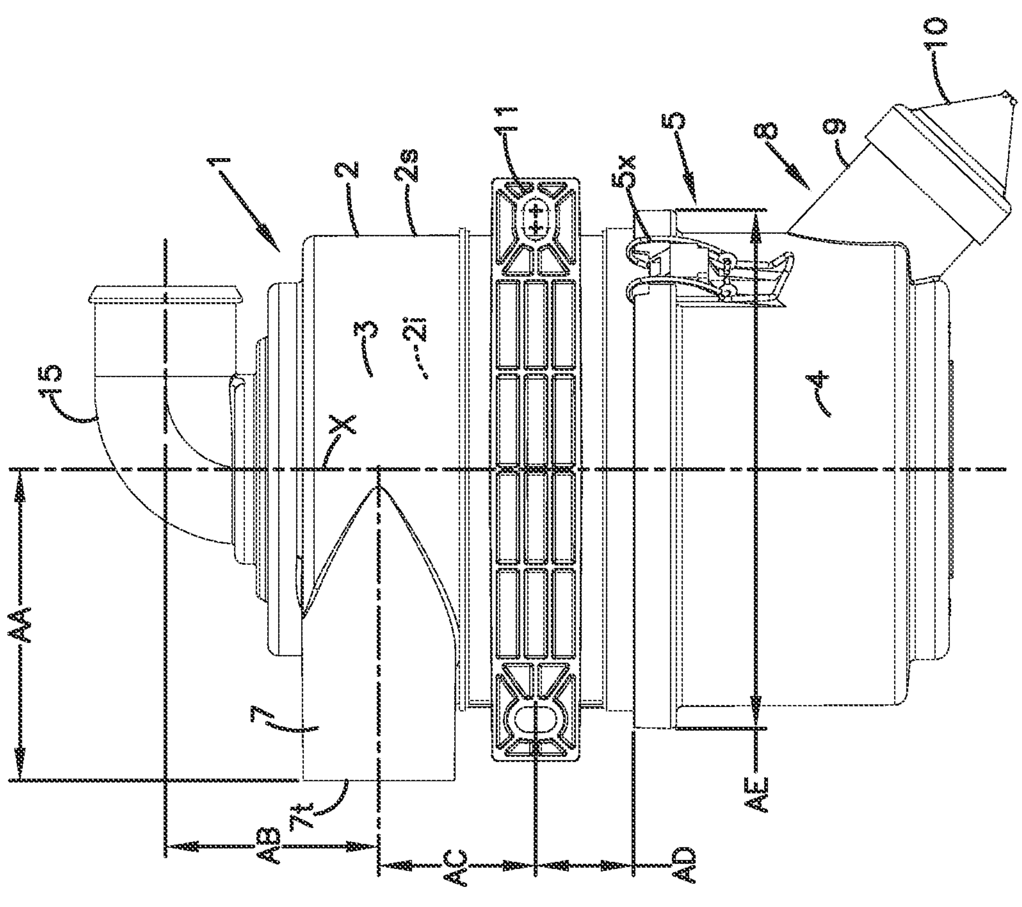
FIG. 1 is a schematic side elevational view of an air cleaner assembly according to the present disclosure.

The reference numeral 1, FIG. 1, generally indicates a filter assembly, for example an air cleaner or air cleaner assembly or arrangement in accord with the present disclosure. The filter assembly (in the example an air cleaner assembly) 1 comprises a housing 2. The housing 2 defines a sidewall 2*s* and includes: a first body section 3; and, second, body section or access cover 4. In the example depicted, the access cover 4 is removably secured to the first body section 3, but alternatives are possible. Also although alternatives are possible, for the example depicted attachment of the cover section 4 to the body section 3 is by latch arrangement 5; the latch arrangement typically comprising a plurality of over center latches 5*x*.

In general, the air (gas) cleaner 1 includes an air (gas) flow inlet arrangement 7. In the example depicted, the air flow inlet arrangement 7 is an inlet tube indicated at 7*t*, on the body section 3. The particular inlet tube 7*t* depicted, is configured as a side, tangential, inlet, i.e. gas flow is directed tangentially against an inner wall of housing 2, as opposed to being directed directly toward a housing central axis X. Alternate inlet arrangements, locations and direction are possible. However, the tangential inlet arrangement depicted is convenient and advantageous for reasons discussed below.

At 8, a dust/water ejector arrangement is depicted on the housing 2, comprising tube 9. In the example depicted, the tube 9 comprises a portion of access cover 4, although alternatives are possible. The tube 9 is covered by an evacuator valve arrangement 10, in the example depicted comprising a duck-billed valve of a type widely used with air cleaners, see for example WO 2006/06241 A1; and, U.S. Pat. No. 6,419,718 B1, incorporated herein by reference. Alternate evacuator valve arrangements can be used.

At 15, an outlet tube or flow tube is depicted, as a portion of housing 2 positioned on a remainder of the housing body section 3. The tube 15 can be formed integral with the housing body 3, but typically the tube 15 will be a separate piece snap-fit or otherwise attached to the housing body 3, as discussed below.

In operation, air (gas) to be filtered enters the air cleaner assembly through inlet tube 7*t*. Eventually the air passes through filter media of a filter cartridge arrangement positioned within interior 2*i* of the housing 2. After passage through media of the air filter cartridge, the filtered air is directed to exit the housing through outlet tube 15. From outlet tube 15, the filtered air is directed to downstream equipment such as to a turbo system or to the air intake of an engine system. (It is noted that in some instances, the assembly 1 can include an optional safety or secondary filter cartridge, not shown, through which the air is directed as it proceeds from the filter cartridge to the outlet tube 15).

The particular air cleaner (filter) assembly 1 depicted includes an optional precleaner stage. The precleaner stage is provided in part by directing air from inlet tube 7*t* tangentially into interior 2*i* of the housing 2. The air will then, in part as directed by an internal cyclonic ramp 17, FIG. 2, be directed into a cyclonic or helical pattern around an interior of the assembly 1. This will tend to drive a portion of any water or dust particles contained within the air stream, against an interior surface of sidewall 2*s*. This material, separated from the air stream, will eventually migrate to, and enter, the tube 9, from which ejection occurs through valve 10.

The particular air cleaner assembly 1 depicted is configured so that it can be mounted in a variety of orientations, for example with the central axis X directed vertically, or alternatively with the central axis X directed horizontally. This is facilitated by having outlet tube 9 directed downwardly, at an angle of 30-60° relative to the axis X, at a lower corner of access cover 4, so that the tube 9 can be directed downwardly whether the axis X is directed vertically or horizontally.

Figure 2:
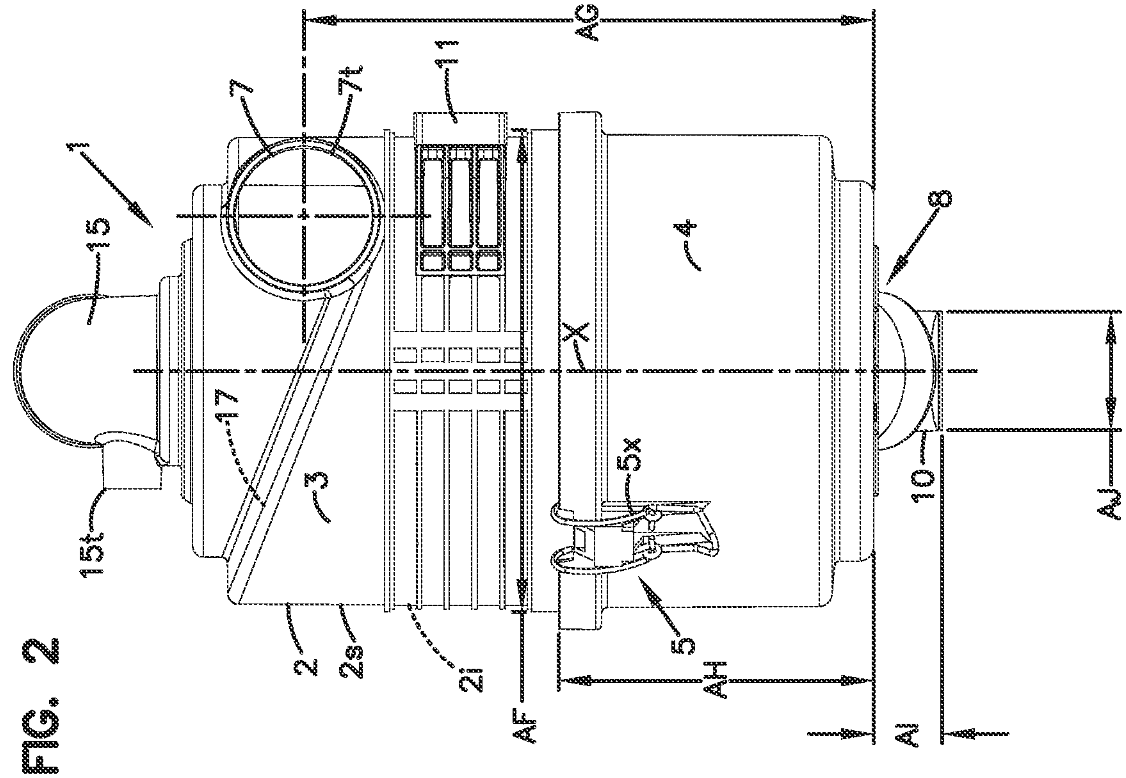
FIG. 2 is a schematic second side elevational view of the air cleaner assembly of FIG. 1, the view of FIG. 2 being taken from the right of FIG. 1.

Referring to FIGS. 1 and 2, housing body section 3 includes a mounting pad arrangement 11 thereon. The mounting pad arrangement 11 can be formed integral with a remainder of the housing 2 as shown, or it can be a separate piece. The mounting pad arrangement 11 is used to help secure the housing 2 in place, on equipment with which air cleaner 1 would be used. By having the mounting pad arrangement 11 on the housing section 3, the housing section 3 can be retained in place on the equipment by bolts, or other systems during servicing, with access cover 4 being removably secured to body section 3, for convenient servicing.

Referring to FIG. 2, it is noted that outlet tube 15 includes optional tap 15*t* thereon. Tap 15*t* can be used, for example, as a pressure tap for a restriction indicator (not shown) optionally used with air cleaner assembly 1.

As thus far described the air cleaner assembly is similar to many prior air cleaner assemblies, including those depicted and described in WO 2006/06241 A1; WO 2009014988; and, U.S. Pat. No. 6,419,718 B1, incorporated herein by reference.

Figure 3:
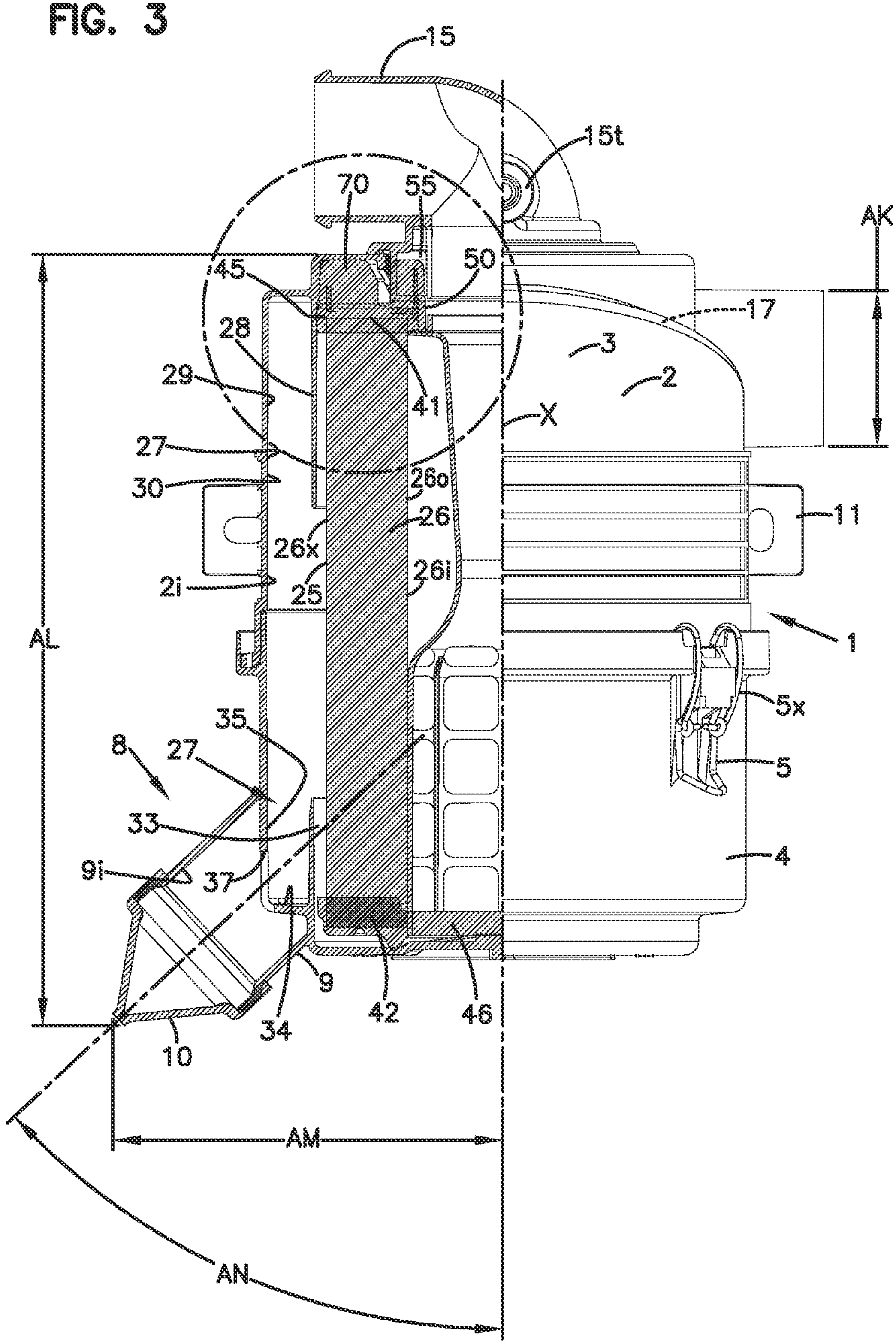
FIG. 3 is a schematic third side elevational view of the air cleaner assembly of FIGS. 1 and 2, with portions shown in cross-section to depict internal detail.

Attention is now directed to FIG. 3, in which air cleaner assembly 1 is depicted in an alternate elevational view with portions shown in cross-section. Referring to FIG. 3, filter cartridge 25 is viewable positioned within housing interior 2*i*. The filter cartridge 25 will be described in greater detail below. In general, the cartridge 25 is a serviceable component that includes an extension of filter media 26 through which air to be filtered passes, before it can exit assembly 1.

By the term "serviceable component" as used herein, and in reference to the cartridge 25, it is meant that the cartridge 25 is removable and replaceable in the air cleaner assembly 1. Thus, as the media 26 occludes during use, the cartridge 25 can be removed, and be refurbished or replaced.

Referring to FIG. 3, it can be seen that housing 2 includes an optional, but advantageous, shield arrangement 27 surrounding a selected portion of the cartridge 25. The shield arrangement 27 includes first shield section 28 in housing body section 3, oriented to surround a portion of the cartridge 25 at that location, creating an annulus 29 between the shield 28 and outer sidewall 30. Air from inlet 7 is directed into inlet annulus 29, (in a cyclonic pattern by an interior surface of ramp 17). Shield 28 inhibits direct impingement, of the dust and other material carried by the inlet air in annulus 24, and onto the media 26 until after the air has moved at least partially through the cyclonic pattern and past shield 28 in a direction toward access cover 4.

In FIG. 3, at 33 a second shield section of shield arrangement 27 is depicted in access cover 4. The second shield section 33 defines an annulus 34 between the shield 33 and sidewall 35 of section 4. At 37, an or outlet egress aperture in a sidewall 2 from housing interior 2*i* to interior 9*i* of tube 9 is depicted. The egress or outlet aperture 37 is in communication with the annulus 34. The shield 33 helps facilitate removal of dust and other materials through aperture 37 into dust ejector arrangement 8.

Use of shield arrangements analogous to shield arrangement 27, with one or more shields analogous to sections 28 and 33, is common in many air cleaner arrangements, see for example WO 2006/06241 A1; WO 2009/014988; U.S. Ser. No. 61/446,653; U.S. Ser. No. 61/473,296; and, U.S. Pat. No. 6,419,718 B1, incorporated herein by reference. Analogous features and principles can be used here.

Figure 3A:
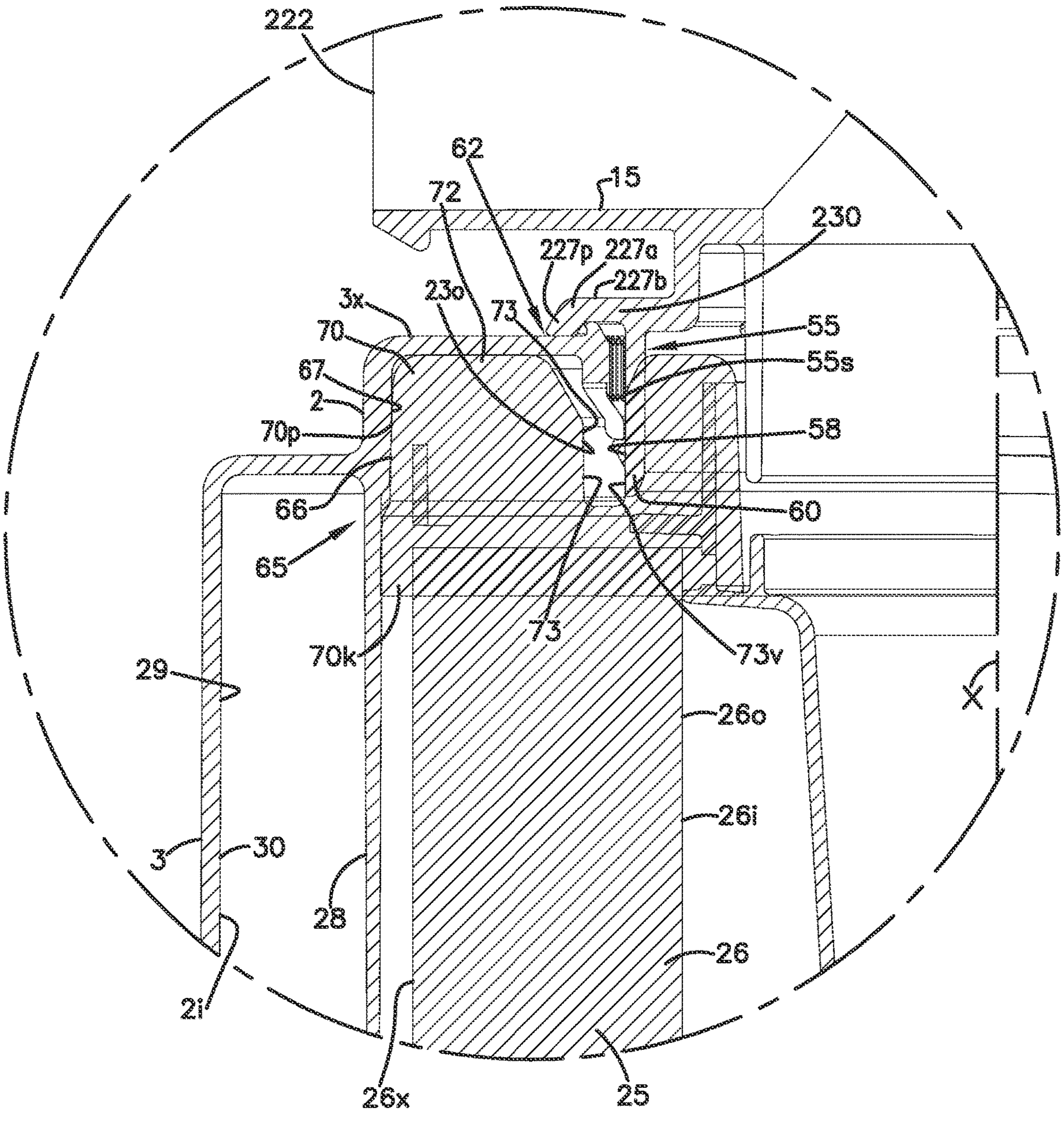
FIG. 3A is an enlarged fragmentary schematic cross-sectional view of a selected portion of FIG. 3.

In FIG. 3A, an enlarged fragmentary portion of FIG. 3 is depicted. Portions of the shield 28 and annulus 29 are viewable in this figure.

It is noted that the use of the shield arrangement 27 and dust ejector arrangement 8 is consistent with many applications in which a "dual stage" or "two stage" air (gas) cleaner is desired, having a first precleaner stage to separate water and larger particles from the air before it passes into the filter cartridge 25 (the second stage). However, such features are generally optional, and many of the principles of the present disclosure can be applied in air cleaners that do not have such a two stage configuration or precleaner stage.

It is noted that the particular air cleaner assembly 1 depicted, does not have a safety filter or safety cartridge positioned downstream of the media 26 and before the outlet 50. Again, many of the principles described herein can be applied in systems in which such a safety filter or safety cartridge is used.

II. Features Relating to a Housing Seal Arrangement—Generally

A. General

As indicated above, the features previously identified and discussed with respect to FIGS. 1-3A relating to general air cleaner configuration and operation are well known features, forms of which have been used in a variety of systems. Certain unique characteristics of the present air cleaner, of FIGS. 1-3A relate to specific features of the filter cartridge 25, in particular relating to its engagement with a remaining portion of the air cleaner assembly 1. In this section, selected features relating to this are discussed.

In general terms, again, the cartridge 25 is a service component. That is, it is removed and replaced through the lifetime of the air cleaner 1. A releasable seal is necessary between the cartridge 25 and the housing 2, to ensure that unfiltered air does not bypass the cartridge 25 and enter the outlet tube 15, as this can cause damage to the engine. The releasable sealing engagement between the filter cartridge 25 and the housing 2 that provides for this, is generally characterized herein as a housing seal arrangement.

Still referring to FIG. 3, the filter cartridge 25 generally comprises filter media 26 extending between first and second opposite media ends 41 and 42. First media end 41 is engaged by a first end cap or piece 45. The second media end 42 is engaged by a second end cap or piece 46. Thus, the media 26 extends between opposite end caps (or end pieces) 45, 46.

Although alternatives are possible with selected techniques described herein, for the example depicted, the filter media 26 is configured surrounding an open filter interior **26*i*, generally around a central axis X of the air cleaner 1 and cartridge 25. The media 26 can be pleated media, although alternatives are possible. The media 26 can be configured in a cylindrical pattern as shown, if desired, although alternatives are possible. For example, the media 26 can be somewhat conical in extension between the opposite ends 41, 42**. Also, the media can be configured with non-circular inner and/or outer perimeters; for example oval or other cross-sectional configurations are possible.

Although alternatives are possible with selected techniques described herein, the second end piece or cap 46 is typically a closed end piece or cap, extending completely across the media 26 at the second end 42, closing that end 42 of the media 26 and the filter interior **26*i*. That is, end piece or cap 46, for the example depicted, is a closed end piece or cap, i.e. an end cap having no aperture therethrough in communication with the open filter interior 26*i***.

First end piece or cap 45 on the other hand, is an open end piece or cap. That is, it surrounds and defines a central aperture 50 in communication with the media, in the example via open filter interior **26*i*. In typical use, aperture 50 is an air flow exit aperture from the media, for example open filter interior 26*i*, for filtered air. (In alternate applications with a reverse direction of gas flow during filtering aperture 50** can be an inlet aperture. In general, it is a gas flow aperture).

For the example depicted, first end piece 45 extends completely across all media 26 of the cartridge 25, from an outer perimeter **26*x* to an inner perimeter 26*o*. The first end piece 45 typically has only one, central, aperture 50** therethrough.

Again, when the access cover 4 is removed from the housing body section 3, access to interior **2*i* is provided for either installation or removal of the cartridge 25. The filter cartridge 25, then, needs to be adequately removably sealed to the housing 2 to protect against flow of unfiltered air into the exit tube 15. To provide for this, the cartridge 25 is provided with a first primary (or housing) seal arrangement 55**.

With respect to the first housing seal or primary seal arrangement 55, and other features of first end cap 45, attention is directed to FIG. 3A, an enlarged fragmentary view of an identified portion of FIG. 3. In FIG. 3A, the primary seal arrangement 55 can be seen as defining a radially directed seal or seal surface **55*s* directed to engage a portion of air cleaner assembly 1 indicated generally at 58, for releasable sealing. It is noted that in FIG. 3A, a schematic depiction is provided and the seal material forming seal surface 55*s* is shown non-distorted by engagement with structure 58. From this, one can understand how much interference is typically provided between the seal material of seal arrangement 55 and the surface 58** during sealing, although alternatives are possible. This is discussed in detail further below.

Still referring to FIG. 3A, it will be understood that the surface **55*s*, of primary seal arrangement 55, that forms a seal with structure 58 is generally a radially directed surface. Hence, the primary seal arrangement 55 is referred to as a radially directed seal. By "radially" in this context, it is meant that the seal or seal surface (and the compression of the seal surface during sealing) is directed generally toward or away from (i.e. around) central axis X. The particular surface 55*s* in the example depicted, is radially outwardly directed relative to the central axis X, so the seal arrangement 55** can be characterized as "radially outwardly directed." It is noted however, that a radially inwardly directed seal can be used with some principles in accord with the present disclosure.

It is noted that in the example depicted, the housing seal arrangement 55 comprises a portion of end cap 45. In more general terms, the housing seal arrangement mounted on a filter cartridge configured to releasably seal to a housing, whether that particular housing seal arrangement comprises a portion of an end piece or not.

The preferred and advantageous housing seal arrangements described herein are generally "non-clamp" or "clampless" housing seal arrangements. By this it is meant that they are established as the cartridge is inserted into the housing, without the need for tightening the clamp or connector of some type.

Specific features of the example primary seal arrangement 55 depicted are described in greater detail below.

In general, for the particular arrangement depicted in FIG. 3A, the surface 58 which the seal arrangement 55 removably engages to form the primary seal arrangement 55, comprises a seal flange 60 directed axially inwardly of housing 2 toward the access cover 4, FIG. 3. For the specific example shown, the seal flange 60 comprises a portion of a flow tube, in the example depicted the outlet tube 15.

Still referring to FIG. 3A, it can be seen that the outlet (flow) tube 15, for the example arrangement depicted, comprises a separately formed piece from housing section 3. For the particular example arrangement depicted, the flow tube 15 is snap-fit to an end 3*x* of the housing section 3, with a joint between the two being formed at 62. The joint 62 is a location for potential water or other material entry into an interior 2*i* of housing 2. Certain potential issues with respect to this are advantageously managed by an optional second (housing) seal arrangement 65.

In general, as an engine system (with which air cleaner assembly 1 is used) is operated, there is a vacuum draw or air suction at tube 15, FIG. 3, by which air is drawn through the air cleaner 1 and into the engine or other equipment system. This means that there is, in general, a potential suction draw of air from the ambient, into the interior 2*i* of the housing 2. This suction would tend to draw on joint 62 in a typical operation, but for the presence of the second seal 65.

In general, the second seal arrangement 65 defines a seal surface 66 on cartridge 25 which removably engages a seal surface 67 of housing section 3. The seal surface 66 is generally directed radially, and thus it is a radial seal. In the example depicted, seal surface 66 is a radially outwardly directed (perimeter) surface surrounded by a seal surface 67 of housing section 3, in installation.

It can be seen that the joint 62 communicates with an interior 2*i* of housing 2 at a location isolated from a remainder of housing 2, by the cartridge 25, between the primary seal arrangement 55 and the second seal arrangement 65. As a result, potential vacuum draw at joint 62 is inhibited, because there is no internal suction operating a joint 62 to pull water and/or additional material into the interior 2*i* at this location. It is noted that, for the embodiment shown, the second seal arrangement 65 is not provided to manage a substantial pressure differential thereacross, and/or to manage avoidance of unfiltered air entering (outlet) tube 15. Thus, the second seal arrangement 65 can be a secondary, less compressive, seal, or seal of less seal force, than the primary seal arrangement 55. As will be understood from detailed description below, for a particular preferred arrangement, seal material in the second seal arrangement 65 is typically configured to compress some, but less than the seal material in primary seal arrangement 55, when cartridge 25 is installed.

In the next section, features of the first seal arrangement 55 and the optional second seal arrangement 65 are discussed in greater detail.

B. End Piece Features Including the First Seal Arrangement 55 and Second Seal Arrangement 65, FIGS. 3 and 3A Referring to FIGS. 3 and 3A, for the particular assembly 1 depicted, the cartridge 25 is configured with first (end) piece 45 being a molded-in-place (end) piece 70 having a portion (in the example an end) 41 of media 26 secured thereto for example embedded therein. This will be typical, although alternatives are possible with selected principles according to the present disclosure. The end piece (cap) 70 closes end 41 of the media 26 completely thereacross from a media outer perimeter 26*x* to a media inner perimeter 26*o* in a typical arrangement. When the media 26 is pleated, outer perimeter 26*x* comprises outer pleat tips and inner perimeter 26*o* comprises inner pleat tips.

The end piece (cap) 70 typically comprises a soft compressible end piece (cap) material formed from foamed resin, such as a foamed polyurethane. Usable materials are discussed below.

Although alternatives are possible, for the particular cartridge 25 depicted, the first seal arrangement 65 and the second seal arrangement 65 are formed in a molded-in-place portion of end cap 70 as integral portions thereof. This is discussed in further below, in connection with the descriptions of FIGS. 4-8.

Before turning to FIGS. 4-8, attention is directed back to FIG. 3A. The end piece (cap) 70 includes an axial outer end surface 72, with a recess receiver or receiving groove 73 therein. The recess, receiver or receiving groove 73 is sized and positioned to receive, projecting therein, flange 60 and portion of housing section 3 indicated generally at 3*x*, when cartridge 25 is installed. That is, a portion of joint 62 projects into the recess, receiver or receiving groove 73. In the example depicted, a radially inner most surface 73*i* (radially outwardly directed surface) of recess, receiver or receiving groove 73 forms the sealing surface 55*s* of the primary seal arrangement 55. Although alternatives are possible, a radially outermost surface 73*o* (the radial inwardly directed surface) of recess, receiver or receiving groove 73, for the example arrangement depicted, preferably does not form a seal at all. Rather, typically surface 73*o* does not radially engage the housing section 3 or flange 58 at all, although alternatives are possible. It is noted that there is a portion 70*k* of the end cap 70, FIG. 3A, that does surround the media 26 at end 41. This will typically be the case, since, in the example, the media end 41 is embedded in the end piece (cap) 70. Region 70*k*, although it may engage a portion of the housing, does not typically compress substantially and often is not involved in sealing to the housing, although alternatives are possible.

Still referring to FIG. 3A, it is noted that the seal surface 66 of the secondary seal arrangement 65 comprises a portion of an outer perimeter 70*p* of an end piece (cap) 70. Thus, it is sometimes referenced as a perimeter radial seal. It is also noted that for the embodiment depicted, preferably no portion of the seal surface 66 that compresses while sealing surrounds the media 26, although alternatives are possible.

Figure 4:
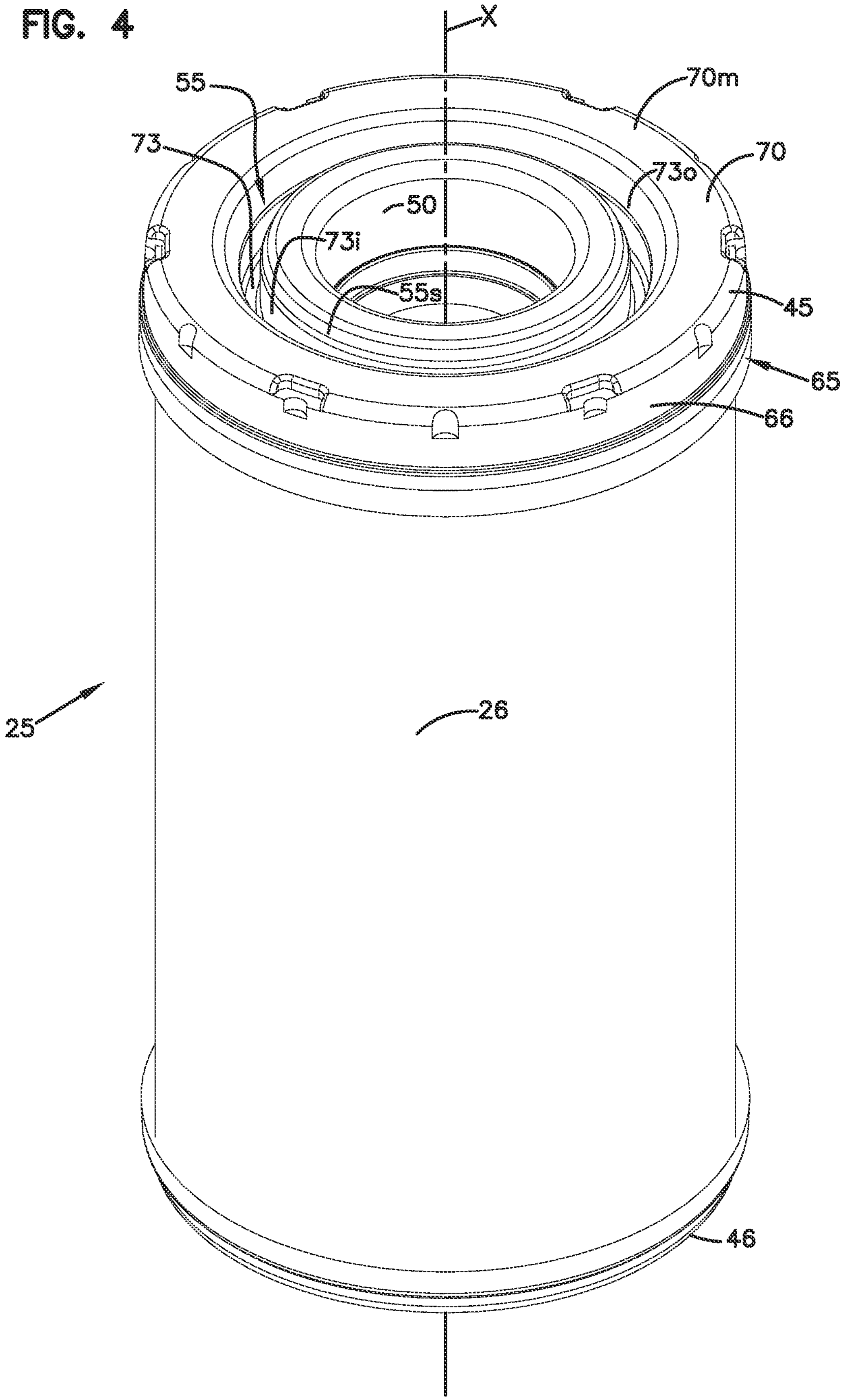
FIG. 4 is a schematic outlet end perspective view of a filter cartridge usable in the air cleaner assembly of FIG. 1-3.

Attention is now directed to FIG. 4, a schematic perspective view of the cartridge 25 taken generally toward an outlet end 75 and end piece (cap) 70. The cartridge 25, again, generally comprises media 26 extending between first and second end pieces (caps) 45, 46 and surrounding central cartridge axis X. In general, when a cartridge feature is referenced as radially directed, it is meant that the features are directed generally outward or away from a central axis, in the example a central cartridge axis X; and, when it is said that a feature is axial or directed "axially" it is meant generally that the feature is directed generally in alignment with a central axis, for example central axis cartridge X (although not necessarily parallel thereto). When a seal is characterized as "radially outwardly" directed, it is meant that the seal or seal surface is generally directed radially away from a central axis, such as central cartridge axis X.

Still referring to FIG. 4, end piece (cap) 45 can be seen as comprising molding 70*m*. The molding 70*m* defines open central aperture 50 through which (in the example filtered) air passes, in the example as it exits the cartridge 25. The end piece (cap) 70 (and thus the molding 70*m*) comprises an integrally molded end piece (cap), defining recess, receiver or receiving groove 73. A radially inwardly portion of recess, receiver or receiving groove 73, indicated generally at 73*i*, in part forms seal surface 55*s*. It can, again, be seen that surface 55*s*, is, generally, radially outwardly facing and forms a radially outwardly directed seal. The radially outer surface 73*o* of the recess, receiver or receiving groove 73 can be seen as defining a radially inwardly directed surface, i.e. a surface facing toward axis X. Again, for the particular cartridge depicted, surface 73*o* is not a sealing surface, but alternatives are possible.

It is noted that seal surface 55*x* can be provided surrounding a projection that is not a sidewall of a recess, receiver or receiving groove, such as recess, receiver, or receiving groove 73. However, for the particular embodiment depicted, having seal surface 55*x* comprise a sidewall 73*i* of a recess, receiver, or receiving groove 73 is advantageous.

Referring still to FIG. 4, at 66 the seal surface of second (optional) seal arrangement 65 is depicted. This is the portion of the outer perimeter of molding 70, for the example depicted, that engages the housing section 3 forming a second seal 65 therewith when the cartridge 25 is installed.

Figure 5:
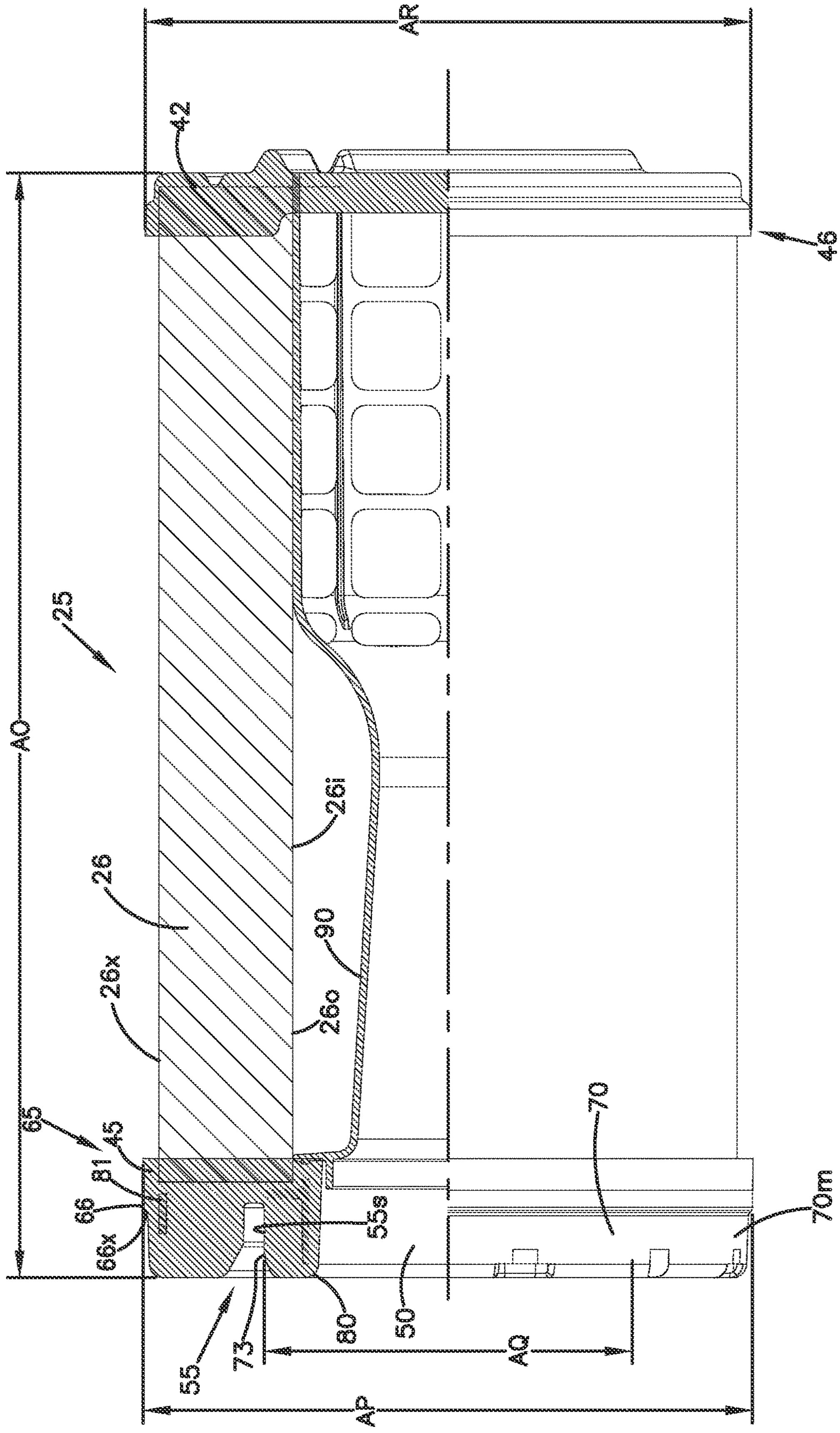
FIG. 5 is a schematic side elevational view of the filter cartridge depicted in FIG. 4, with portions shown in cross-sectional view to depict internal detail.

Attention is now directed to FIG. 5, in which the cartridge 25 is depicted with portions shown in cross-section to depict internal detail. For the discussion in this section, attention is specifically directed to the first end piece (cap) 45. Again, in the typical preferred arrangement, end piece (cap) 45 comprises a molding 70*m* (or end cap 70) positioned on end 41 of media 26. Seal surface 66 of the second seal arrangement 65 and seal surface 55*s* of the primary seal arrangement 55 can be seen. Also viewable in cross-section is groove 73.

Preferably sealing pressure for seal arrangements 55 and 65, at surfaces 55*s* and 66, respectively, is managed by having each seal provided of a radially compressible material and preferably (and optionally) having an embedded therein relatively rigid, radial support arrangement within end piece (cap) 70. For the primary seal arrangement 55 the radial support is shown at 80. For the secondary seal arrangement 65, the radial support is provided by support 81 embedded within end piece (cap) 70.

Typically, the support arrangement that provides support for the seal arrangements 55, 65, is a "preform" embedded within the end piece (cap) molding 70*m*. By "preform" in this context, it is meant that with the support arrangement or structure, i.e. a preformed or preform component used in the assembly of cartridge 25. Typically, the preform component is molded from plastic, although alternatives are possible. Typically, the preform component is secured to structure that extends toward the second end cap 42, although alternatives are possible.

The support 80 is typically embedded within seal material that forms the primary seal 55 at a location such that compression of the surface 55*s* radially towards central axis X will be backed up by the support 80 in a manner so that the amount of radial compression of end piece (cap) material in a region between surface 55*s* and the support 80 will have a maximum compression of at least 10%, typically at least 15%, preferably no more than about 35% and will typically be with a maximum compression within the range of about 20-30%, inclusive. Typically, to accomplish this, the support 80 is positioned spaced from the surface 55*s*, maximally, a distance of not greater than 20 mm, usually not greater than 15 mm and typically the amount of spacing is within the range of about 5-14 mm. The amount of spacing in this context is meant to refer to the maximum spacing, i.e. to refer to a distance between the support 80 and portion of surface 55*s* which, when surface 55*s* is undistorted by compression, is radially furthest from the support 80.

On the other hand, as indicated above, for the example, cartridge 25 is depicted the amount of compression (if any) for the optional second seal arrangement 65 is typically less than for the first seal arrangement 55, since the second seal arrangement 65 is not managing dust and water entry into the outlet tube 15, but rather serves to isolate joint 62, FIG. 3A from vacuum draw in the interior 2*i* of housing 2. It is noted that a second seal arrangement 65 can be provided with a support 81, but the support 81 is optional. In some instances, the alignment of the second seal surface 66 with the surrounding housing portion can be such that alignment with relative little compression, if any, occurs. Typically, when used, the optional support 81 is positioned from the radial outermost portion of surface 66 that compresses when the cartridge 25 is installed, a distance of no more than about 10 mm typically no more than about 8 mm, and usually within the range of 1-6 mm. Typically, the dimensions are also chosen so that the total amount of compression of seal material in region 66*x*, i.e. of surface 66 towards support 81, is at a maximum, no greater than about 25% usually no greater than 20%, is typically at least 3% often at least 5% and usually is an amount within the range of 5-20%, inclusive, although alternatives are possible.

Referring to FIG. 5, it can be seen that for the arrangement depicted, the portion of surface 66 that forms the outwardly radially seal, includes extension toward end cap 42, greater than a deepest portion of groove 73. This is optional, but can be preferred. That is, while there may be radial overlap between portions of surface 66 and 55*x*, optionally, in a typical embodiment, at least a portion of surface 66 will extend further toward end piece (cap) 42, than does any portion of surface 55*s*. This amount of extension (when used) will be at least 1 mm, usually at least 2 mm and in some instances at least 4 mm.

Before further characterization regarding the seal arrangement on end piece (cap) 70 is provided, while attention is directed to FIG. 5, selected additional features are briefly identified. These features are also discussed in further detail below in later sections of this report.

First, attention is directed to end piece (cap) 46 positioned at end 42 of the media 26. Although alternatives are possible, for the particular arrangement depicted end cap 46 is a molded-in-place end cap closing end 42 of the media 26 completely thereacross and across open interior 26*i*. The particular molded-in-place end piece 46 depicted can comprise a similar material to that used for molding 70, if desired, but alternatives are possible.

Also referring to FIG. 5, attention is directed to support 90. The example support 90 depicted is a central support surrounded by media 26 in extension completely between end pieces 41, 42, and indeed, in the example depicted, is embedded in end cap 45 (i.e. in molding 70*m*) and in end cap 46. Optional advantageous features of the particular support 90 depicted are discussed further in a later section of this description.

Figure 6:
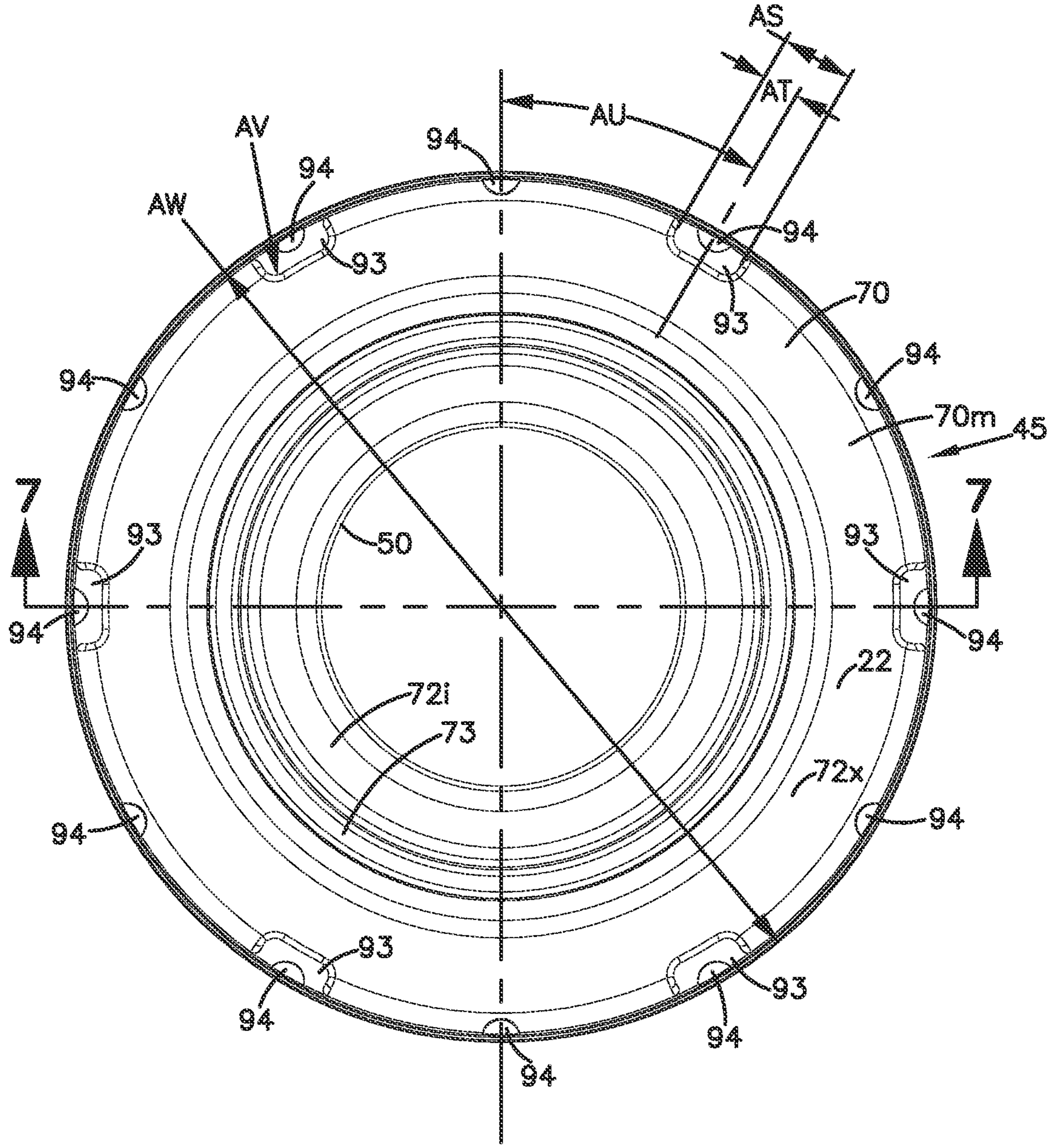
FIG. 6 is a schematic plan view of a molding at a first, open, end of the filter cartridge of FIG. 4.

Turning to FIG. 6, an end view of molding 70*m* (end piece or cap 70) is provided. Generally, the surfaces of end molding 70*m* that face the viewer in FIG. 6 are referred to herein as the axial end surfaces 72; in the example depicted primarily comprising an outer ring 72*x* and an inner ring 72*i* (see FIG. 5), at opposite sides of receiving groove 73. At an outer perimeter of ring 72*x*, the cartridge 25 includes a plurality of insets, generally of two types: insets 93, which are generally artifacts formed by mold stand-offs in a bottom of a mold in which the molding 70*m* would be formed; and, insets 94 which are generally formed from portions of a bottom side of a mold that are used to help center the media pack in the mold during the formation of molding 70*m*. It is noted that in the example depicted, stand-off artifacts 93 include selected ones of the centering artifacts 94 therein.

Figure 7:
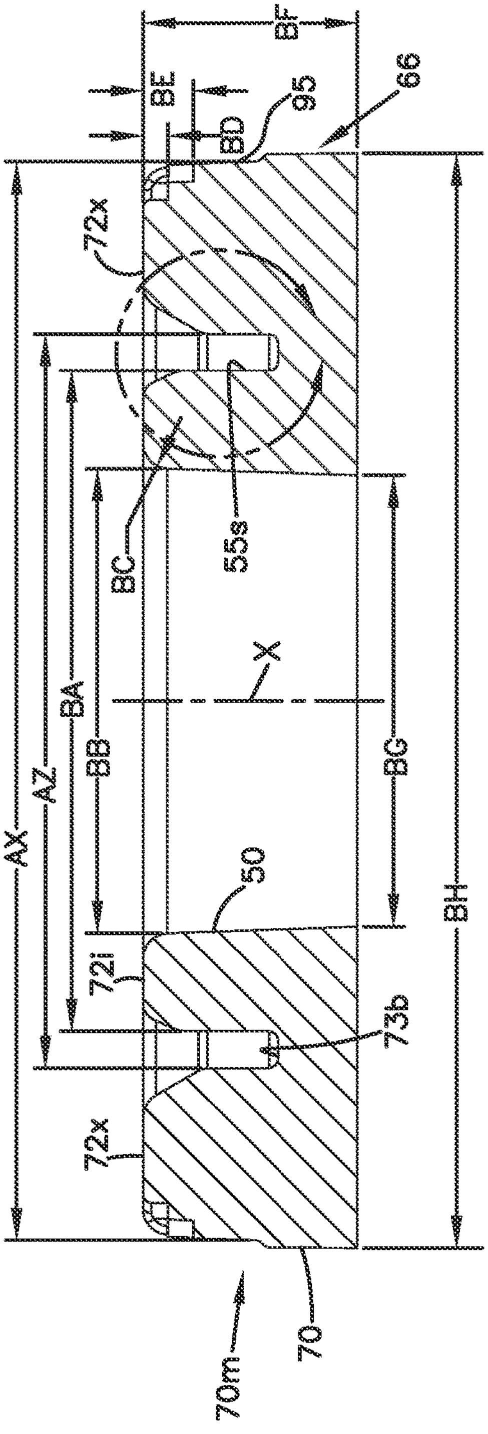
FIG. 7 is a schematic cross-sectional view of the molding of FIG. 6, taken along line 7-7 thereof.

Attention is now directed to FIG. 7, a cross-sectional view taken generally along line 7-7, FIG. 6. Here, molded-in-place material of end piece (cap) 41 or molding 70*m* is depicted. That is, the depiction is schematic and the various supports 80, 81 are not shown. Rather, FIG. 7 is meant to indicate generally the configuration of features formed from resin used to mold end piece (cap) 70. Referring to FIG. 7, at 66, a perimeter portion of molding 70 to form the secondary seal is shown. Between portion 66 and end 72*x*, an outer perimeter surface of molding 70*m* also includes an inwardly stepped or tapered region 95. This region is typically sized in cooperation with adjacent portions of an adjacent housing section in installation, to not be compressed substantially toward central axis X during installation, although alternatives are possible. Rather, region 95 is typically and preferably sized to form an approximate line-to-line fit with surrounding portions of a housing 2 in installation. Preferably, this line-to-line fit extends over a length of at least 4 mm. Alternatives are possible, for example some (for example minor) compression can be required occur in this region and/or the axial length of surface can be varied. Region 95, in cooperation with region 66 will not only inhibit draw at joint 62, FIG. 3A, but will also help stabilize the cartridge 25 in the housing 2.

Figure 8:
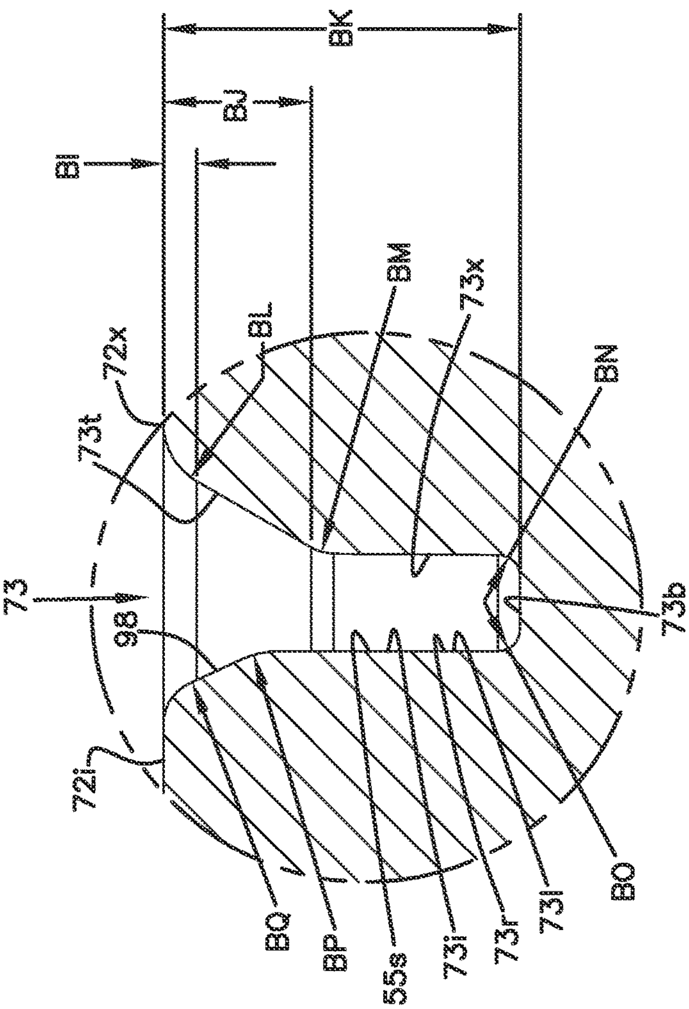
FIG. 8 is schematic, enlarged, fragmentary view of an identified portion of the molding in FIG. 7.

Attention is directed to FIG. 8, an enlarged fragmentary view of a selected portion of molding 70*m*, FIG. 7. Here receiving groove 73 can be seen. The radially inward surface 73*i* (radially outwardly directed surface) of groove 73 includes therein lower section 73*i* adjacent bottom 73*b* configured to form the most compressed portion of the radially outwardly directed radial seal of the primary seal arrangement 55. At 98, surface 73*i* is depicted as having a tapered outer section to facilitate guiding the cartridge 25 over flange 60 during installation. Radial outer surface 73*x* can be seen as including an outer end taper at 73*t*, also to facilitate fitting over the flange 60, and also a portion of housing section 3*t* during installation. The seal arrangements 55 and 65 are discussed further below after additional general description of the cartridge 25 and housing 2 are provided.

III. Assembly of the Cartridge 25; Additional Internal Detail

Figure 9:
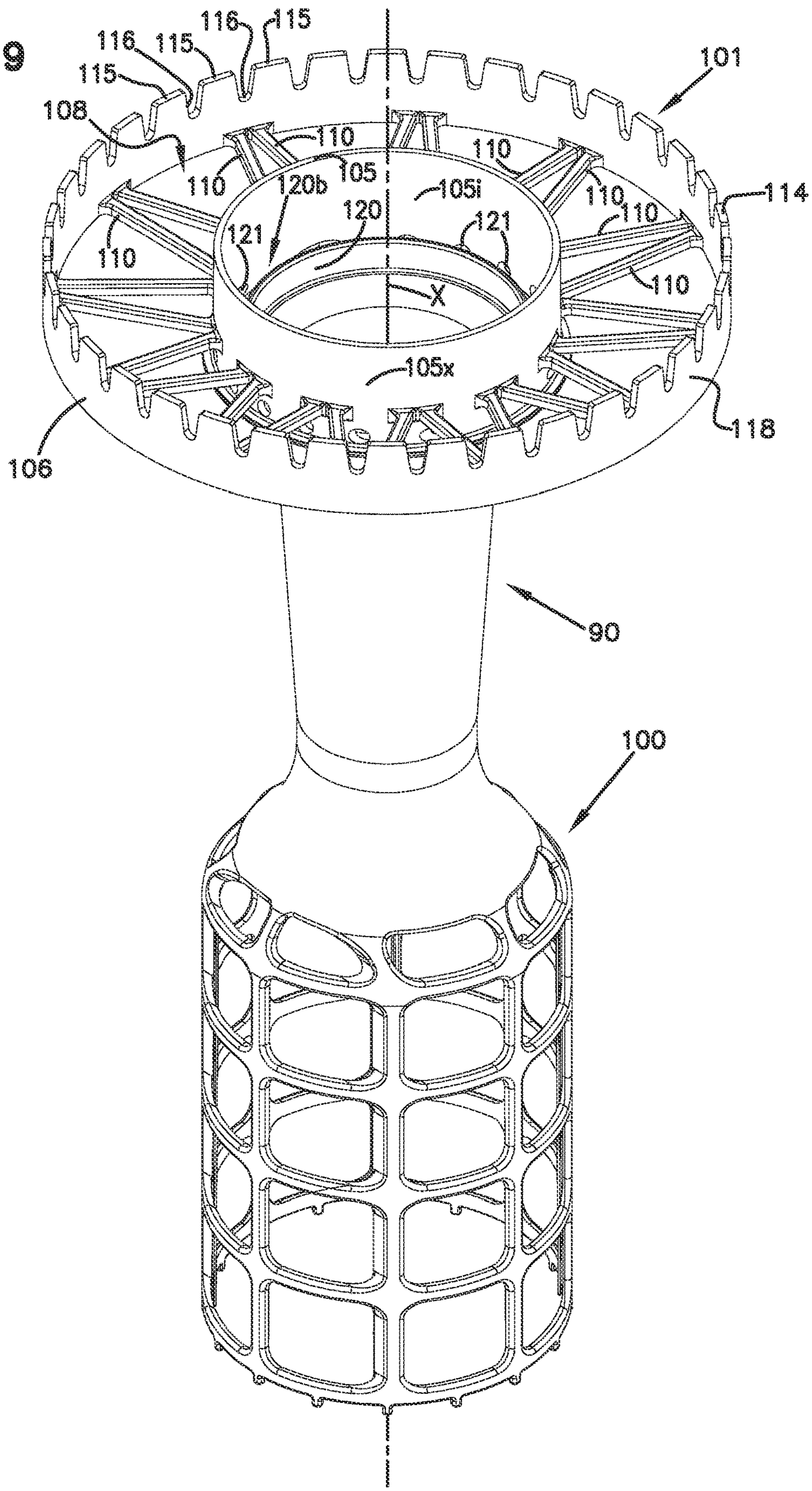
FIG. 9 is an outlet end schematic view of a support component of the filter cartridge of FIG. 4

Attention is now directed to FIG. 9. In FIG. 9, support 90 is depicted in perspective view. The support structure 90 generally comprises: liner section 100 and outlet end support section 101. Although alternatives are possible, for the example assembly depicted, the outer end support section 101 and liner section 100 are non-removably secured to one another. Typically they are molded integrally from a plastic, although alternatives are possible.

The outlet end support section 101 includes: an inner, central, support or hub 105; an optional outer peripheral ring 106 that surrounds and is spaced from hub 105; and, an open grid arrangement 108 extending therebetween. The grid arrangement 108 comprises a plurality of spaced struts, ribs or support pieces 110. The support pieces 110 extend between outer ring 106 and hub 105, securing the outer ring 106 in place. It is noted that the outer peripheral ring 106 is optional, but convenient. It provides structural support to end of the strips, ribs or support pieces 110. The outer ring 106, however, is not required in all applications of the present disclosure.

The struts, ribs or support pieces 110 are also optional. However, they do provide advantage in that they assist in assembly of the cartridge; and, they provide regions for mechanical interlock between the molded-in-place portions of the end cap and preform portions of the support structure 90.

Referring to FIG. 9, ring 106 includes an end edge 114. The end edge 114 is, generally, a portion of ring 106 that projects furthest into the molding 70*m* during formation of the cartridge 25. For the particular assembly depicted, the edge 114 is optionally and preferably defined by a plurality of spaced tabs 115 having grooves or recesses 116 therebetween. In general, recesses 116 facilitate resin flow across ring 106 in the region of end 114 and tabs 115, as end cap 70 is formed. A tabbed configuration is preferred, although alternatives are possible.

Ring 106 also includes optional seal support region 118. In general, if used, the seal support region 118 will provide, in the assembled cartridge 25, optional support 81, FIG. 3A, for the second seal arrangement 65.

Typically, the support section 101 is configured so that no portion of ring 106 surrounds the media, in installation, although alternatives are possible.

Still referring to FIG. 9, hub 105 includes an inner surface 105*i* and an outer surface 105*x*. In the example cartridge 25 depicted, outer surface 105*x* forms seal support 80, for the primary rib seal arrangement 55.

It is noted that support 90 also includes an optional inner ring 120 spaced radially inwardly from hub 105. A trough 120*t* is formed between ring 120 and hub 105 into which resin can flow during cartridge formation. In FIG. 9, some apertures 121 which allow for the resin flow into trough 120 are depicted.

Figure 10:
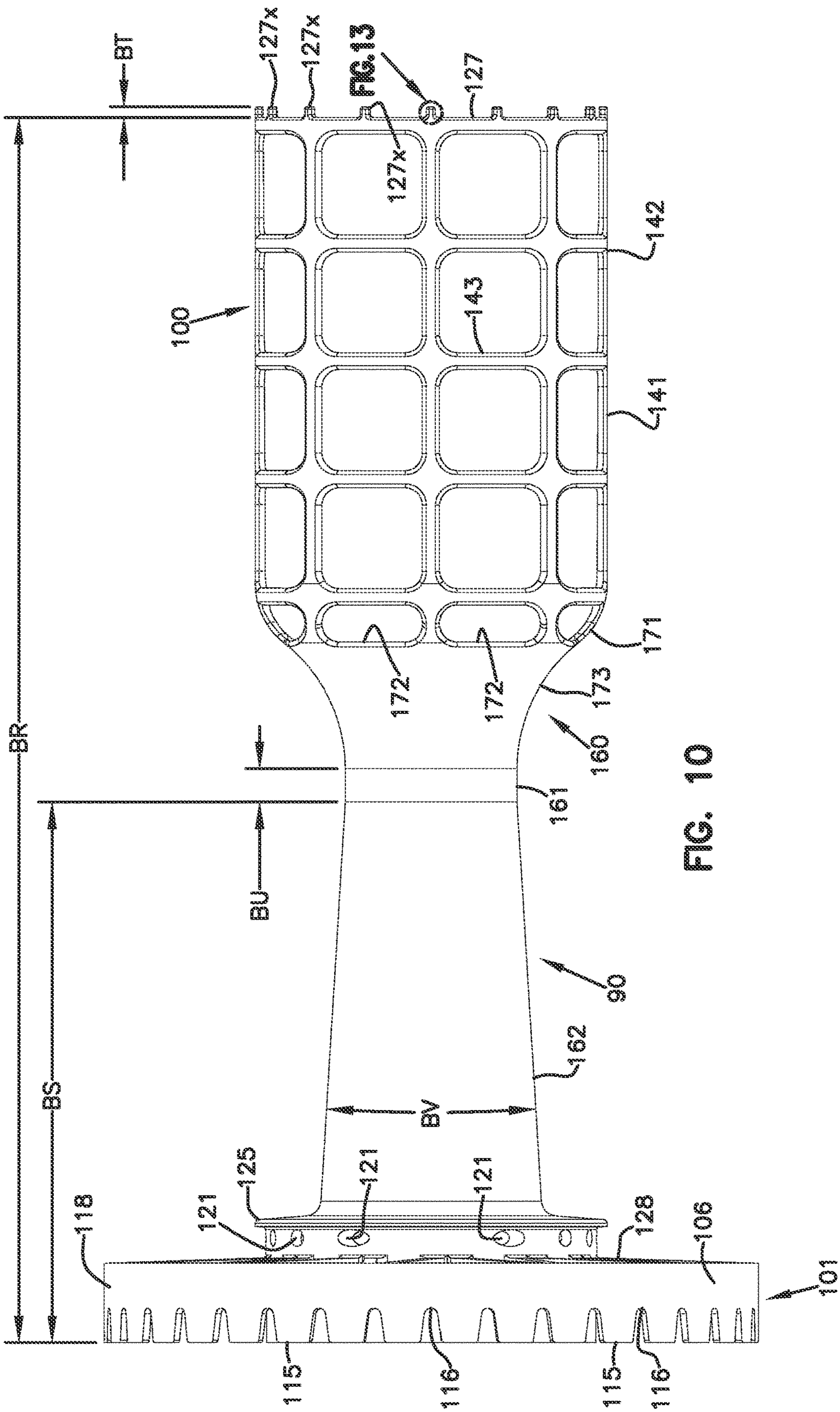
FIG. 10 is a schematic side elevational view of the support component of FIG. 9.

Attention is now directed to FIG. 10, a side elevational view of support 90. The support 90 in FIG. 10 can, again, be seen as including optional end ring 106 defining (optional) tabs 115, recess 116 and seal support region 118. Apertures 121 through ring 120 to facilitate resin flow are viewable.

Still referring to FIG. 10, optional media centering ring 125 is viewable on support 90. Media centering ring 125 is positioned so that an inner perimeter of media 26 (or a media pack), when positioned over support 90 for cartridge formation, engages support 90 along and around the ring 125, to facilitate formation of appropriate media shape before molding of end cap 70.

In general, construction of cartridge 25 involves positioning a media pack over support 90, typically by being pushed over end 127 until a media end 41, FIG. 3 engages the end section 101 generally in region 128, FIG. 10. The ring 125 will ensure that the media 26 adopts an appropriate perimeter shape near end support 100. It will also support the media 26 in the completed cartridge 25. Each of the end caps 45, 46, FIG. 5 can be molded-in-place onto the combination of the media pack 26 and support 90. During formation of end cap 45, resin will flow through recesses 116 and apertures 121 as well as into spaces between the supports 110 to provide: a good mechanical securing of the support 100 in place; and, a good sealing completely across end 41 of the media 26 whether pleated or not. The mold would also be configured to form, in the end piece (cap) 45, seal surfaces 55*s* and 66 as well as groove 73.

It is noted that the media pack is pushed over the support 90 can be provided with or without an outer liner, and can be provided with or without an inner liner. Typically, the media pack will comprise pleated media and no inner liner and no outer liner when pushed over the support 90. The media will typically be pleated and may include corrugations extending generally perpendicularly to the pleat tips, to facilitate keeping the pleats open during use. Various pleat tip folding techniques can be used to facilitate this, as are common in the art. Examples of this can be found in media packs the mark "PleatLoc" from Donaldson Company, Inc., of Minneapolis, MN, the Assignee of the present disclosure.

Figure 11:
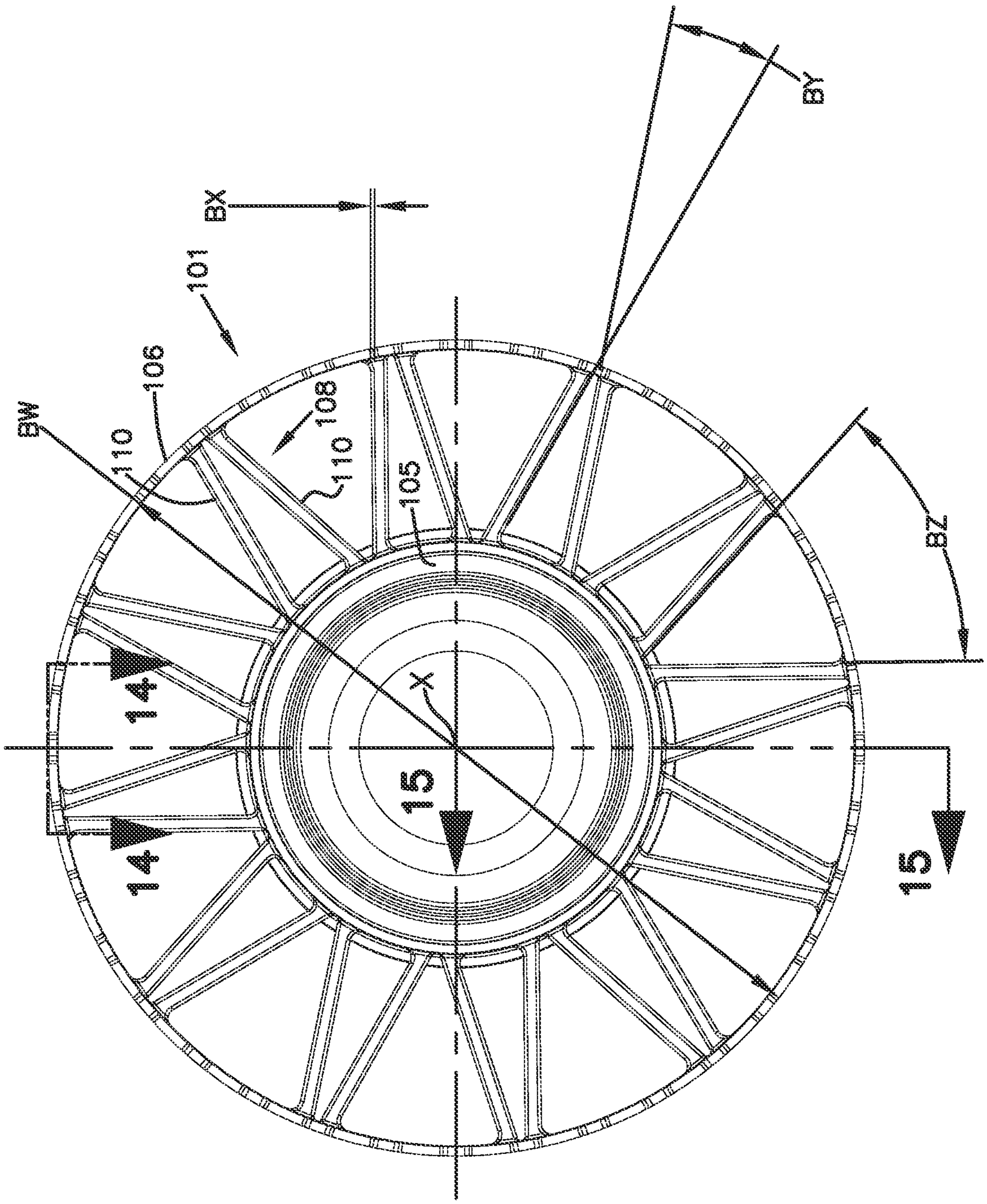
FIG. 11 is a schematic end view of the component of FIG. 10; the view of FIG. 11 being taken toward the left end of FIG. 10.

In FIG. 11, an end view is taken of support 90, generally toward end structure 100.

Figure 12:
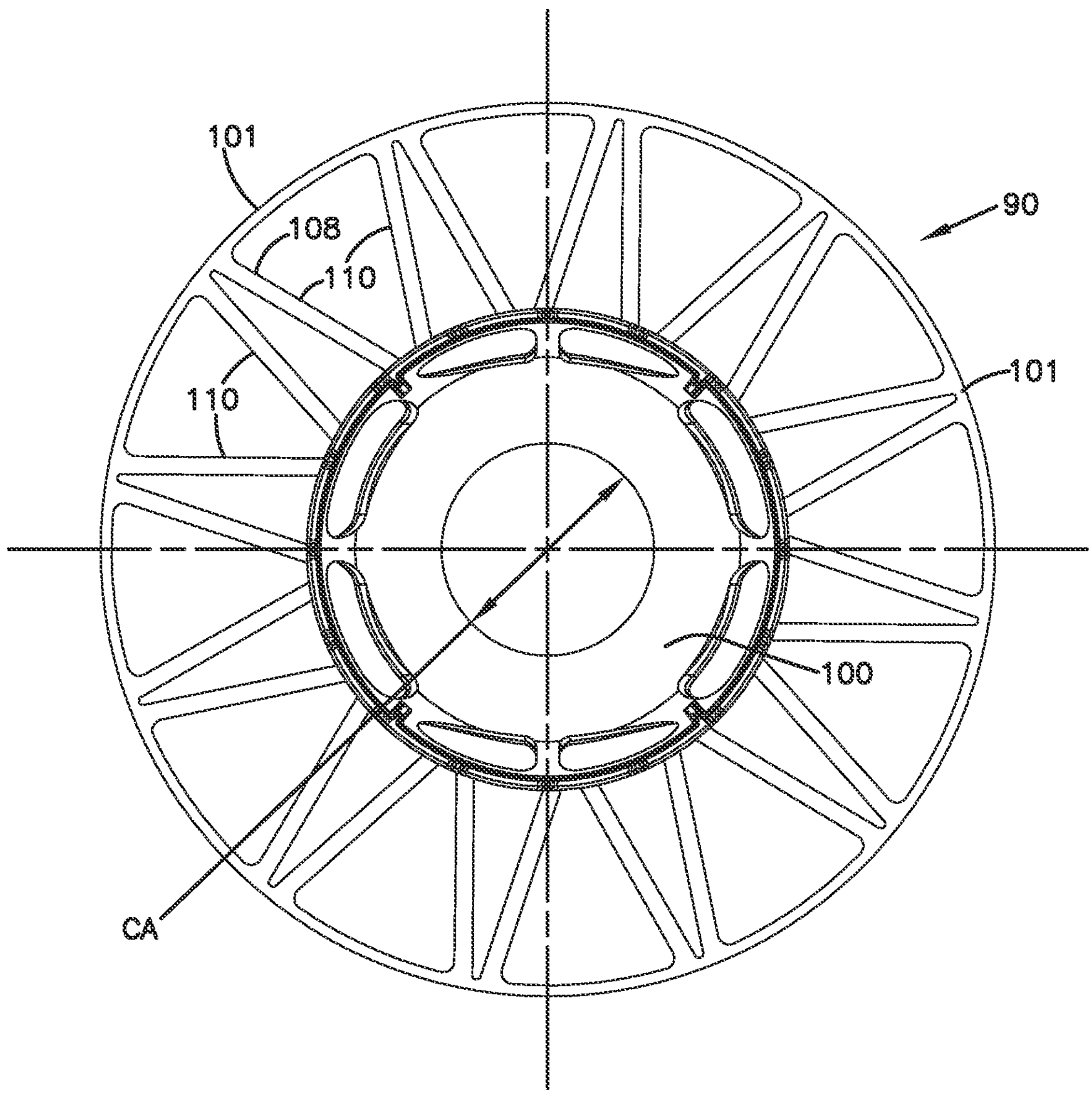
FIG. 12 is a second schematic end view of the component of FIGS. 9 and 10; the view of FIG. 12 being taken toward an end opposite that of FIG. 11.

In FIG. 12 an end view of support 90 is shown, generally taken toward end 127.

Figure 13:
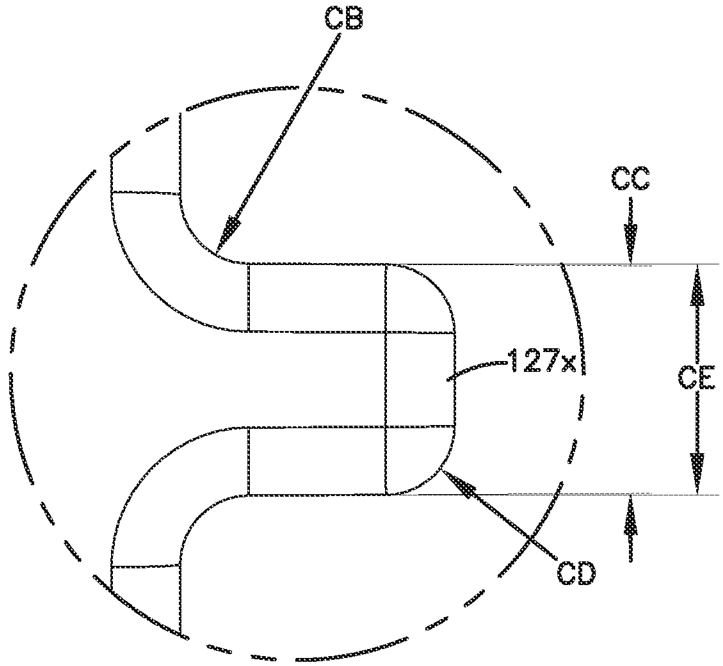
FIG. 13 is an enlarged fragmentary schematic view of an identified portion of FIG. 10.

In FIG. 13, an enlarged fragmentary view of a portion of FIG. 11 is depicted. In general, one of a plurality of end tabs 127*x* at end 127 is viewable. The tabs 27 facilitate molding end cap 46 securely in place.

Figure 14:
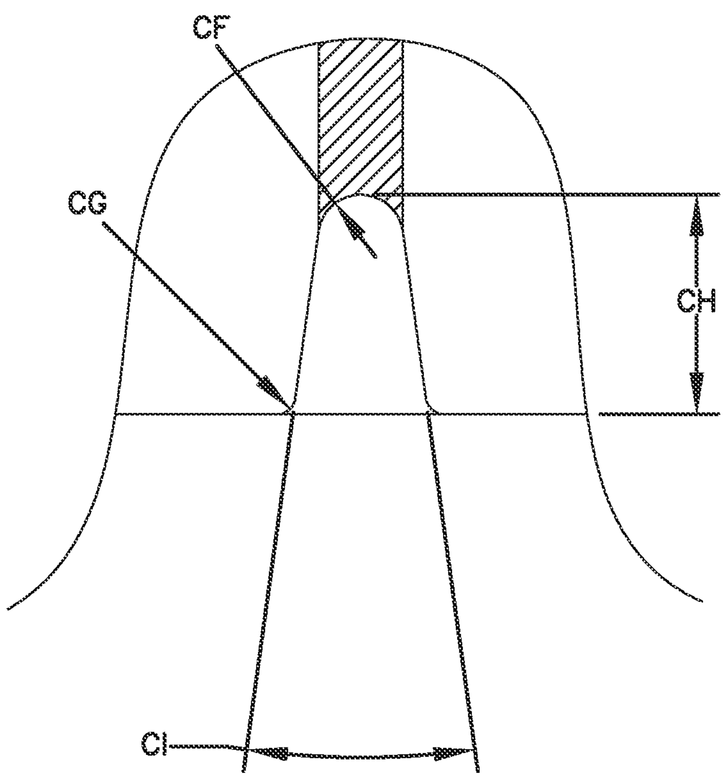
FIG. 14 is an enlarged fragmentary schematic cross-sectional view of an identified portion of FIG. 11.

In FIG. 14, an enlarged fragmentary cross-sectional view of an identified portion of FIG. 11 is shown.

Figure 15:
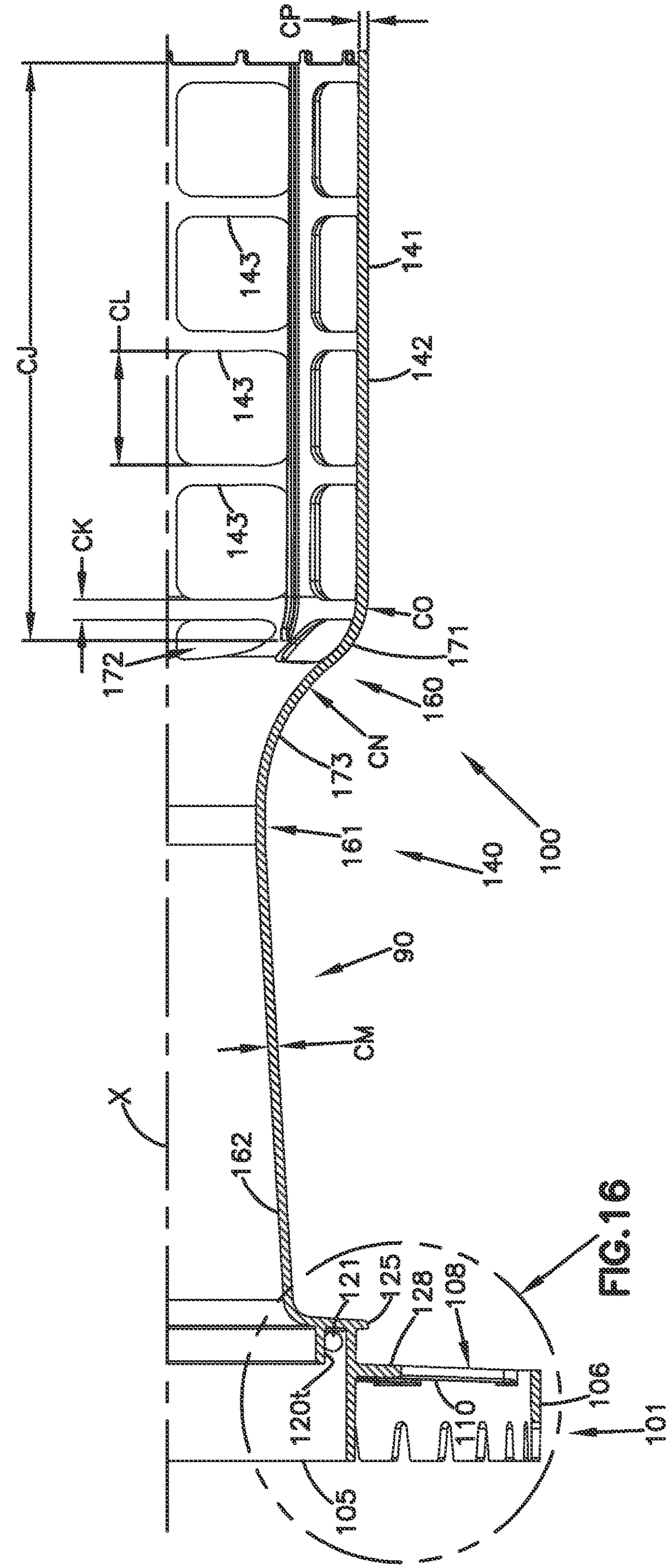
FIG. 15 is an enlarged fragmentary schematic cross-sectional view of a selected portion of the support component depicted in FIGS. 9 and 10.

In FIG. 15, a fragmentary cross-sectional view of a portion of support 90 is provided. Trough 120*t* can be seen. Also, between ring 120 and hub 105, a portion of an aperture 121 can be seen.

Figure 16:
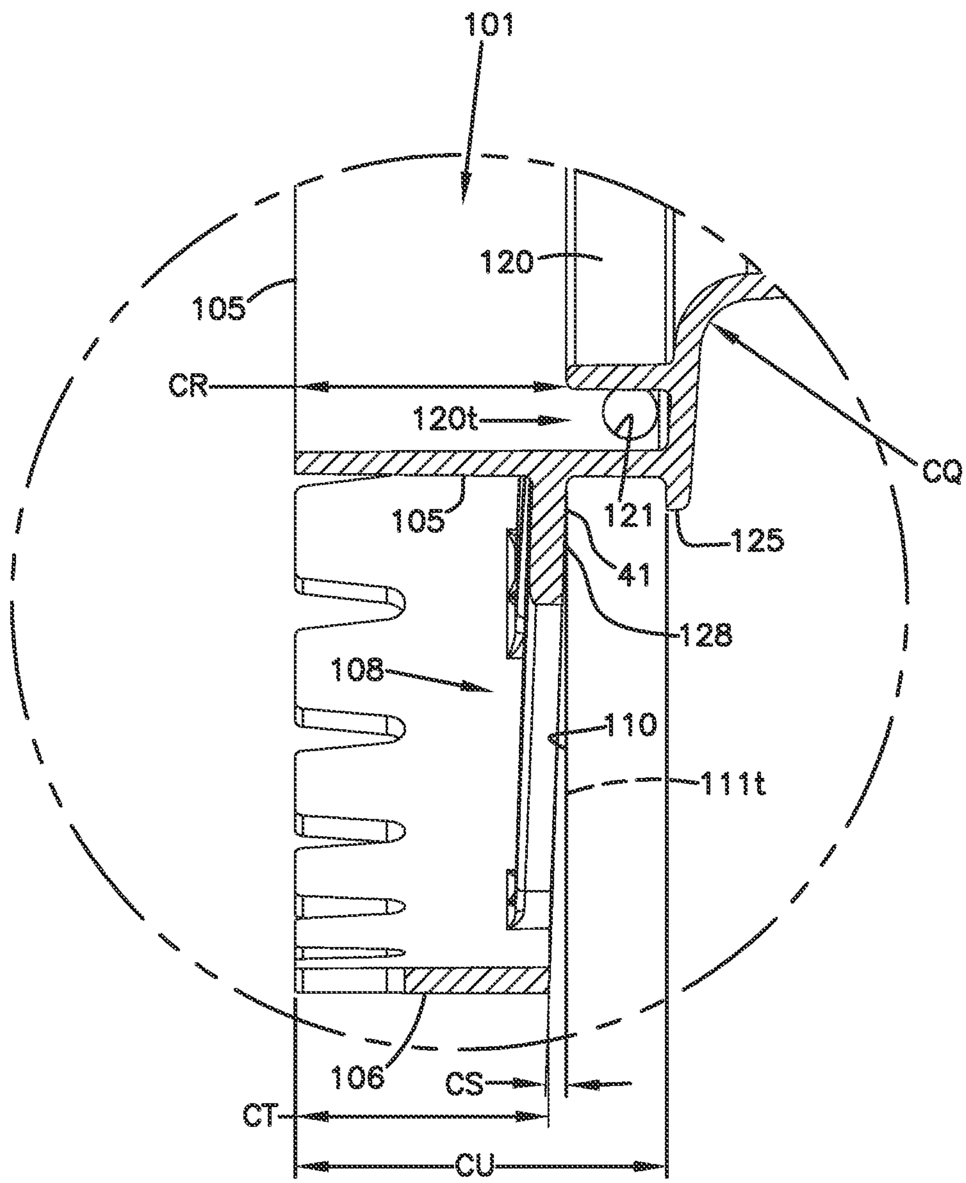
FIG. 16 is an enlarged fragmentary schematic view of a selected portion of FIG. 15.

In FIG. 16, an enlarged fragmentary view of a portion of end support structure 101 of support 90 is depicted.

Referring to FIG. 16, a particular preferred configuration for the end support 101 is provided. In particular, preferably, grid arrangement 108, in this example comprising ribs 110, ribs 110 slant away from the media end 41 (not shown in FIG. 16) in extension from adjacent inner hub 105 to adjacent outer ring 106. This slant or divergence from the media is generally indicated by angle CS, FIG. 16. Thus, when media is positioned over support 90, the media end 41 will generally engage support structure 101 at projection 128, FIG. 16, with the ribs 110 diverging away from the media 26. Indeed, the media end 41 will generally align with line 111*t*, FIG. 16. The angle CS will create a flow region for resin to flow across the ends of the media pack, to advantage. Generally, the angle CS will be at least 0.5°, typically at least 1°, and often more. Typically, angle CS will be within the range of 1°-3°, inclusive, although alternatives are possible.

The particular cartridge 25 depicted, includes an optional resonator or sonic choke although alternatives are possible. The optional resonator or sonic choke comprises portion 140 of support 90, FIG. 10. In more general terms, support 90 includes, in support section 100, an end perforate liner section 141 remote from the support section 101. The perforate section 141 will operate as an inner liner 142, adjacent media end 42, when the media 26 is positioned around liner 90. Apertures 143 in section 142 provide for air flow eventually to outlet aperture 50, FIG. 4.

Referring to FIGS. 10 and 16, in extension between the support section 101 and the perforate end section 142, a number of features are provided to form the optional sonic choke or resonator section 140. First, at section 160 a funneling down to throat 161 is provided as a transition region between end section 142 and throat 161. From throat 161 to engagement with end section 101 an expanded conical or funnel section 162 is provided. Together, section 160, throat 161 and section 162 define a sonic choke or resonator section 140. This helps inhibit transfer of noise outwardly from an engine system when cartridge 25 is used.

Referring to FIG. 10, it is noted that the optional resonator/sonic choke arrangement depicted can, optionally, be different from arrangements such as those described in U.S. Pat. No. 6,419,718 B1, in a number of manners. Referring to FIG. 10, it is noted that from liner section 141, and in extension toward throat 161, a tapering down section 160 is provided which has two oppositely curved sections when viewed in cross-section and/or from the exterior shown in FIG. 10. The first section 171 is curved with a concave side of the curve directed radially inwardly and a convex side of the curve directed radially outwardly. It is also noted that in region 171 aperture arrangement 172 is provided, for air flow. Indeed, region 171, as a result of aperture arrangement 172, will generally be at least 40% open, usually at least 50% open.

Between region 171 and throat 161, region 173 is provided which is shaped generally to curve with the concave side directed radially outwardly. Thus, a somewhat s-curve shape is provided in a side of support 90 (in cross-section) in transition from region 142 toward throat 161. It is noted that for the particular arrangement depicted, region 173 is solid and imperforate, which is advantageous, although alternatives are possible.

The throat 161 will typically have a cross-sectional dimension of at least 25 mm and usually not more than 35 mm, often on the range of 26-31 mm. It is configured to provide good resonator effect without undue restriction to air flow in use.

Conical region 175 generally tapers outwardly at an angle of each side relative to a central axis of about 3°-4°, thus providing a conical angle of spread indicated at DB, FIG. 10, of about 6-8°. A typical conical angle of spread is about 7°.

In general, sections 160, 161 and 162 provide for a sonic choke or resonator effect. This provides for inhibition of noise transfer through the air induction arrangement in the air cleaner, from the engine to the exterior environment. It also is configured to avoid undesirable restriction to air flow from the ambient into the air cleaner and through the filter cartridge 25. It has been particularly found that aperture arrangement 161 in region 162 facilitates this, while also helping air flow from those regions of media 26 that surround imperforate section 162 of the resonator, to enter the tube 162 to exit through aperture 50, FIG. 3.

The support 90, and features of support section 101 and sonic choke containing region 100 can be further understood by reviewing FIGS. 11-16.

Figure 29:
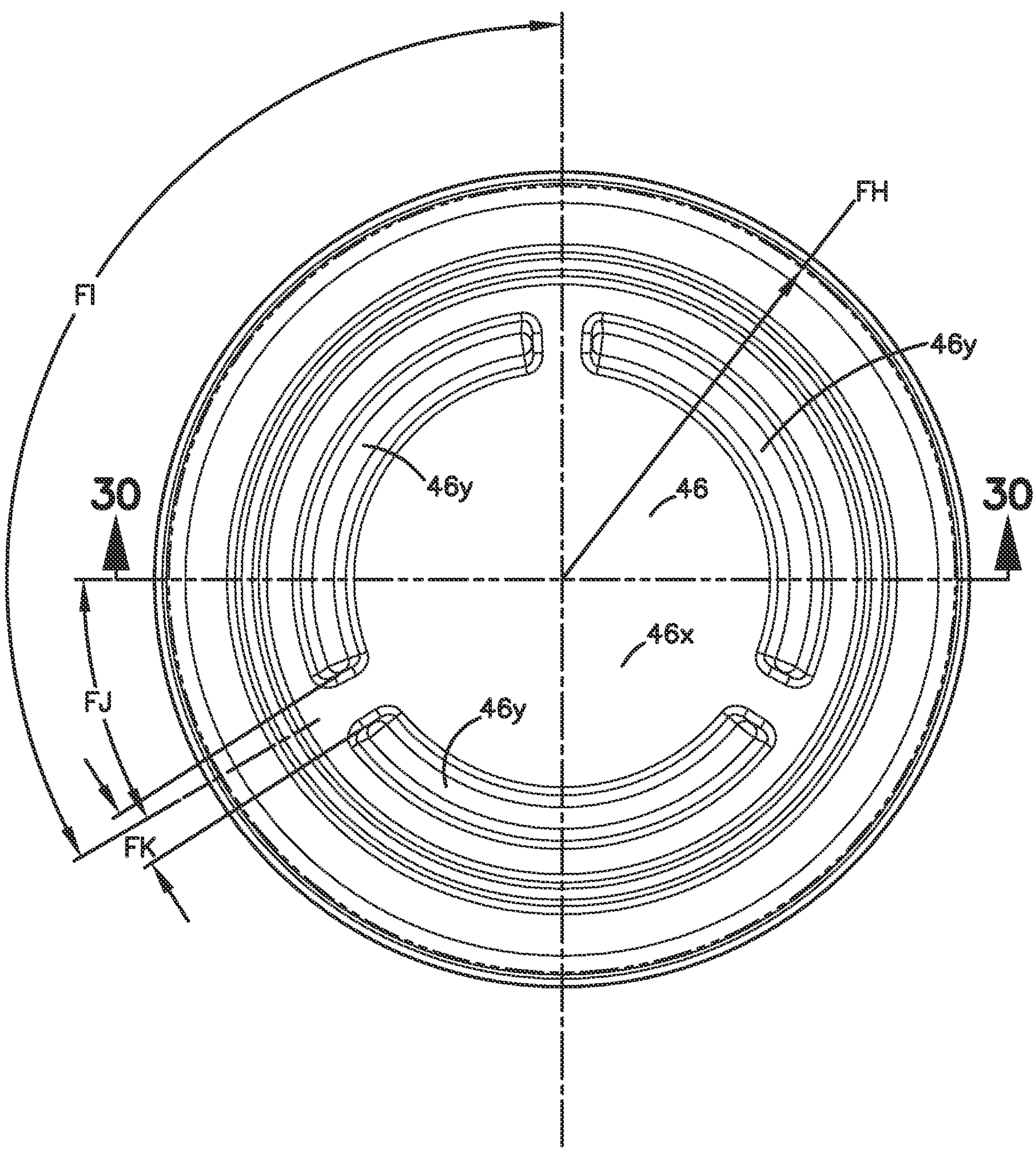
FIG. 29 is a schematic end view of a second end cap molding of the cartridge of FIG. 4.
Figure 30:
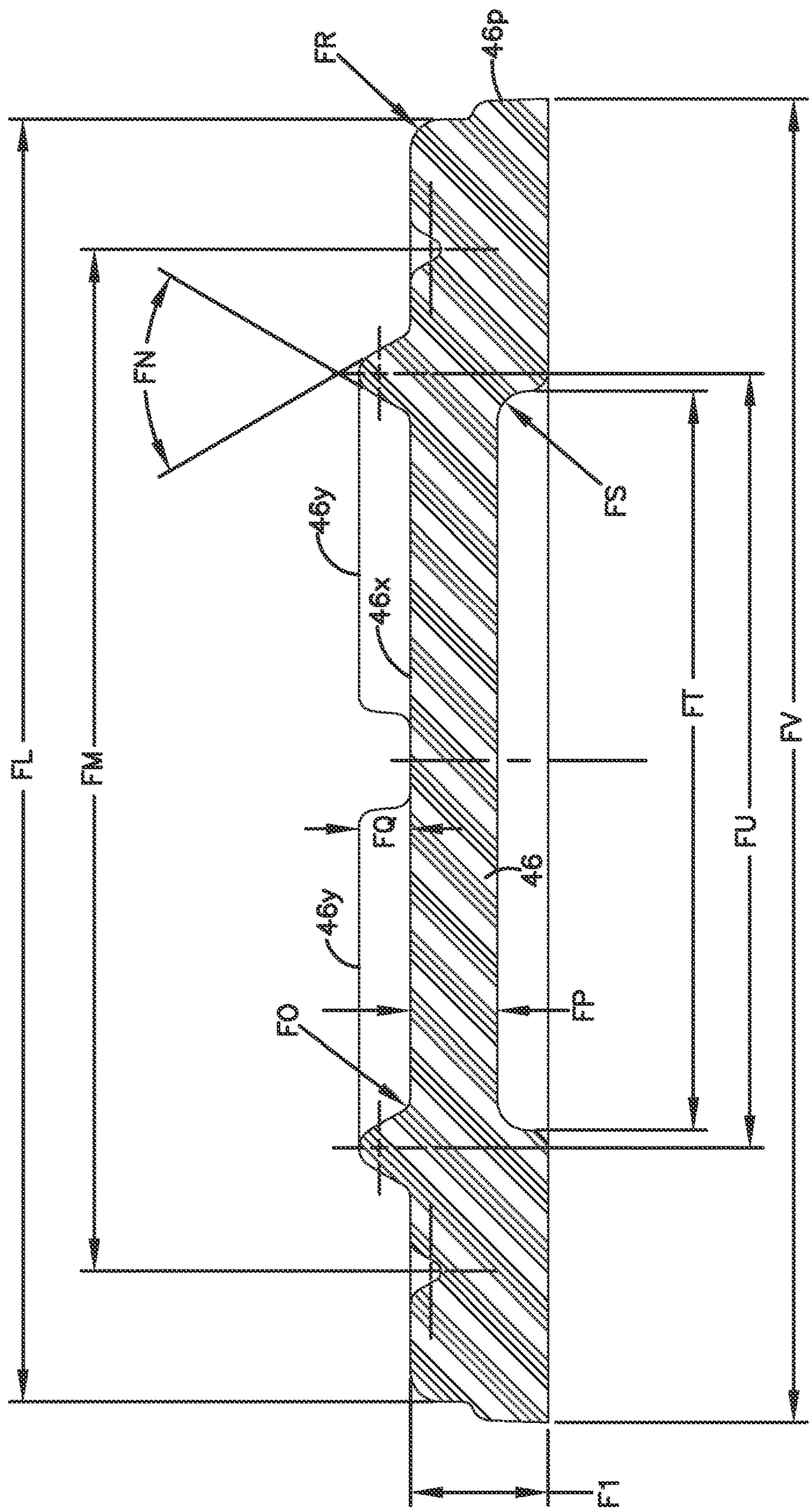
FIG. 30 is a schematic cross-sectional view of the molding of FIG. 29, taken generally along line 30-30, FIG. 29.

Attention is now directed to FIGS. 29 and 30, in which the second end cap 46 is depicted. As indicated previously, the second end cap 46 can be a molded-in-place end cap, although alternatives are possible. In FIG. 29, an end plan view of end cap 46 is shown. In FIG. 30, a cross-sectional view taken along line 30-30, FIG. 29 is shown. In FIG. 30, the second end cap 46 is depicted in a schematic view, without portions of the media 26 and liner 90 shown embedded therein. End cap 46 can be seen as having an outer axial (or end) surface 46*x* with a plurality of projections or bumpers 46*y* thereon. These will be engaged by access cover 4, during installation, to help provide secure support the cartridge 25 in the housing 2.

An outer perimeter portion 46*p*, FIG. 30, is sized to be positioned within housing shield section 33, FIG. 3 and to be supported within the shield section 33 against movement of the cartridge 25 to an undesirable extent.

With respect to construction of the cartridge 25, once the media pack 26 is positioned on the support 90 appropriately, there is no specific requirement as to the order in which the two end caps 45, 46 are formed by molding.

From an understanding of the above, some variations are possible with applications according to the present disclosure can be understood. For example, the support structure 81 need not be integral with interim support for the media. That is, the support structure 81 can be provided not attached directly or integral with, any structure around which the media is positioned, if desired. For example, the support 81 and any inner liner can be separately provided, and then each incorporated into the cartridge during manufacture, for example, each embedded in molded-in-place end cap material. Further, the cartridge can be provided with no inner liner, or with an inner liner surrounded by the media that is not configured as a sonic choke. Further, and referring to FIG. 9, structure of the support arrangement that supports the inner seal, for example at 105 need not be directly connected to an optional support used to support the outer seal, for example as shown at 118. Rather, a ring that supports the outer seal, if used, can be completely disattached from any structure that supports the inner seal.

Further, there is no specific requirement that different sections of the support structure or support arrangement being configured from the same material. For example, an inner liner can be made of an expanded metal construction, whereas support for one or both of the seals can be made from plastic.

IV. Selected Housing Section and Outlet Tube Features, FIGS. 17-28 and 31-32

In FIGS. 17-28 and 31-32, various features of the housing 2 and outlet tube 15 are shown in detail. These are discussed in this section.

Figure 17:
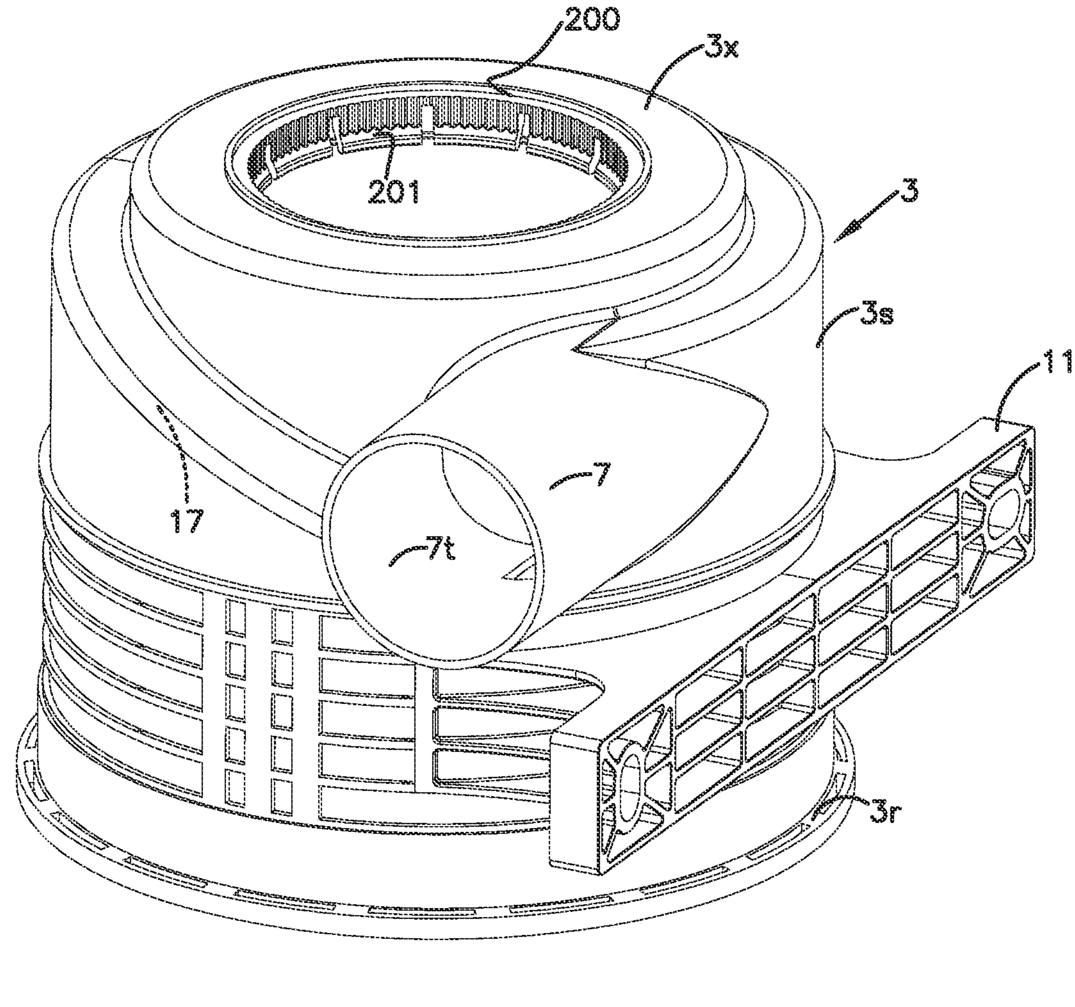
FIG. 17 is a schematic perspective view of a housing section of the assembly of FIG. 1-3.

Referring to FIG. 17, housing section 3 is depicted as it would typically appear, if molded from plastic. Viewable are previously described features as inlet tube 7*t*, sidewall 3*s* and mounting pad 11. Also depicted is rim 3*r* which would be engaged by latch arrangement 5 on access cover 4, FIG. 2. Outer housing features that define internal ramp 17 can be viewed.

End 3*x* of the housing section 3 is shown. Also shown is central aperture 200 into which a portion of an outlet tube 15 would project, in use. Lining aperture 200 is provided an optional interference corrugation or tooth arrangement 201) which operates as an indexing arrangement to facilitate positioning of outlet tube 15 as discussed below.

It is noted, referring to FIG. 17, that the housing section 3 depicted can be conveniently molded from plastic if desired, however it can be constructed from other materials.

Figure 18:
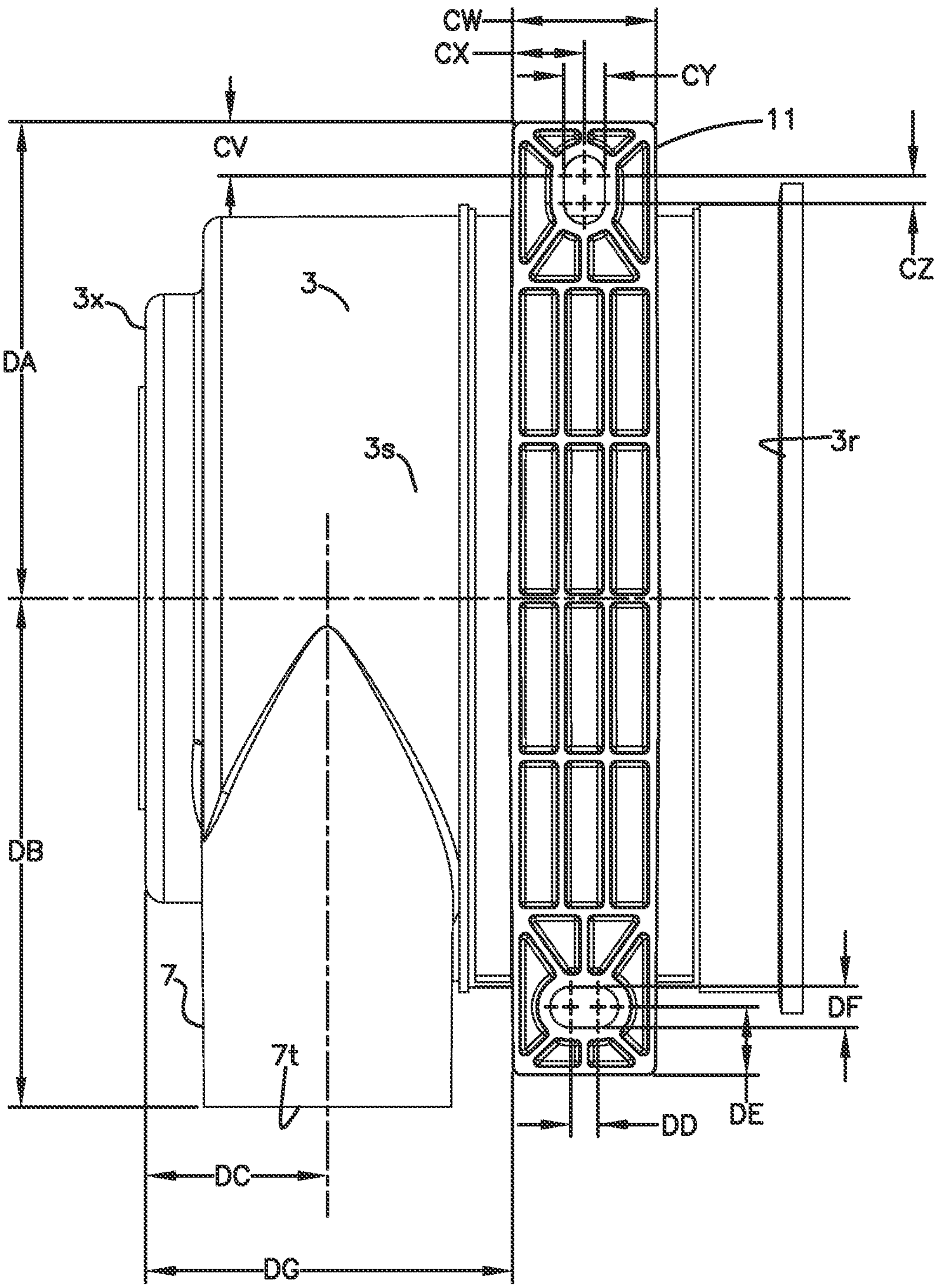
FIG. 18 is a schematic side elevational view of the housing section depicted in FIG. 17.
Figure 19:
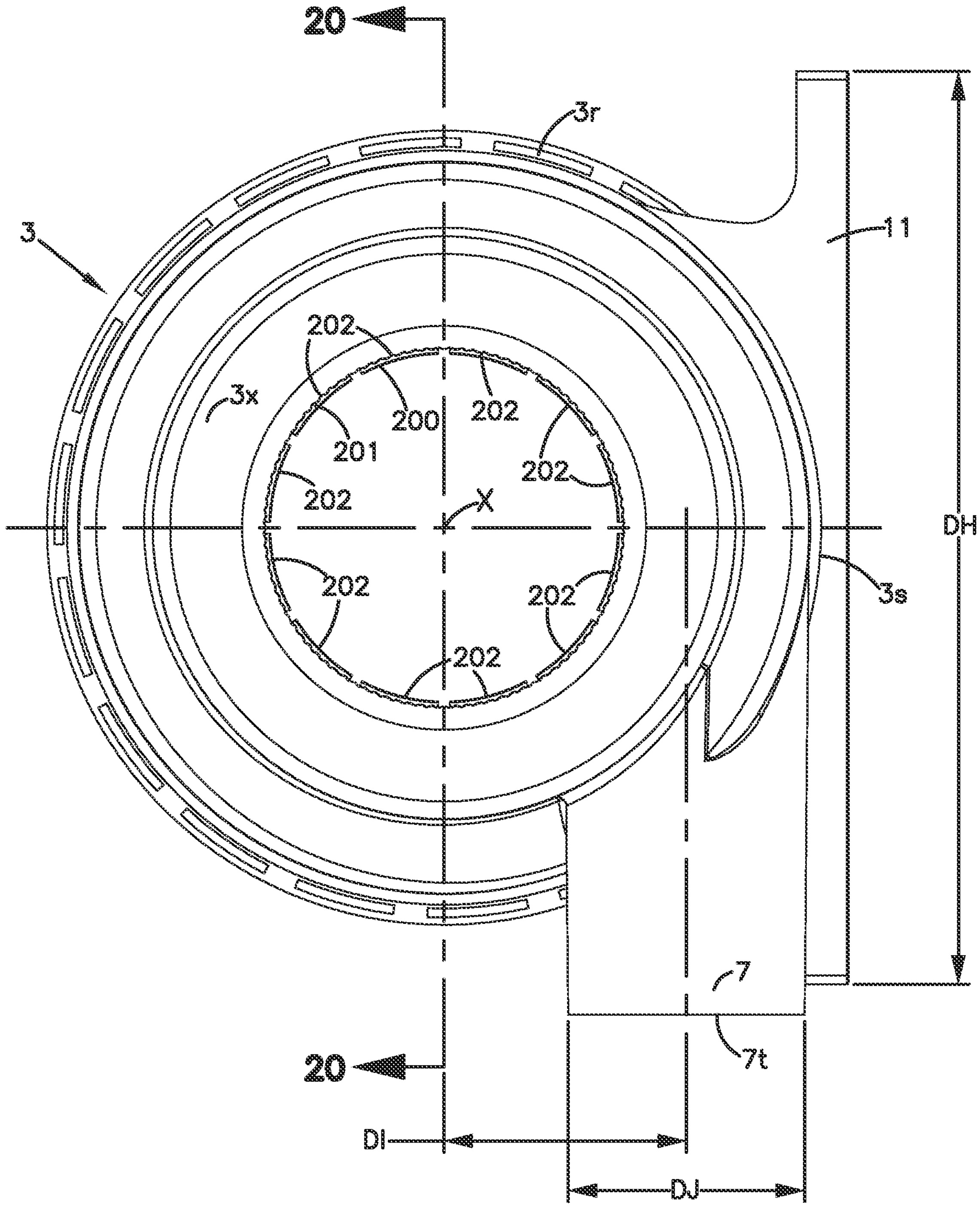
FIG. 19 is a schematic end view of the housing portion of FIG. 17-18.

In FIG. 18, a side elevational view of section 3 is depicted. In FIG. 19, an end plan view of the section 3 is shown taken generally toward end 3*x*. Here, aperture 200 with an interference region (in the example provided by rib or tooth region 201) is viewable. It is noted that the optional toothed or indexed region 201 optionally comprises plurality of outwardly flexible tabs 202. Also viewable is the tangential direction of inlet tube 7*t*, relating to sidewall 3*s* and central axis X.

Figure 20:
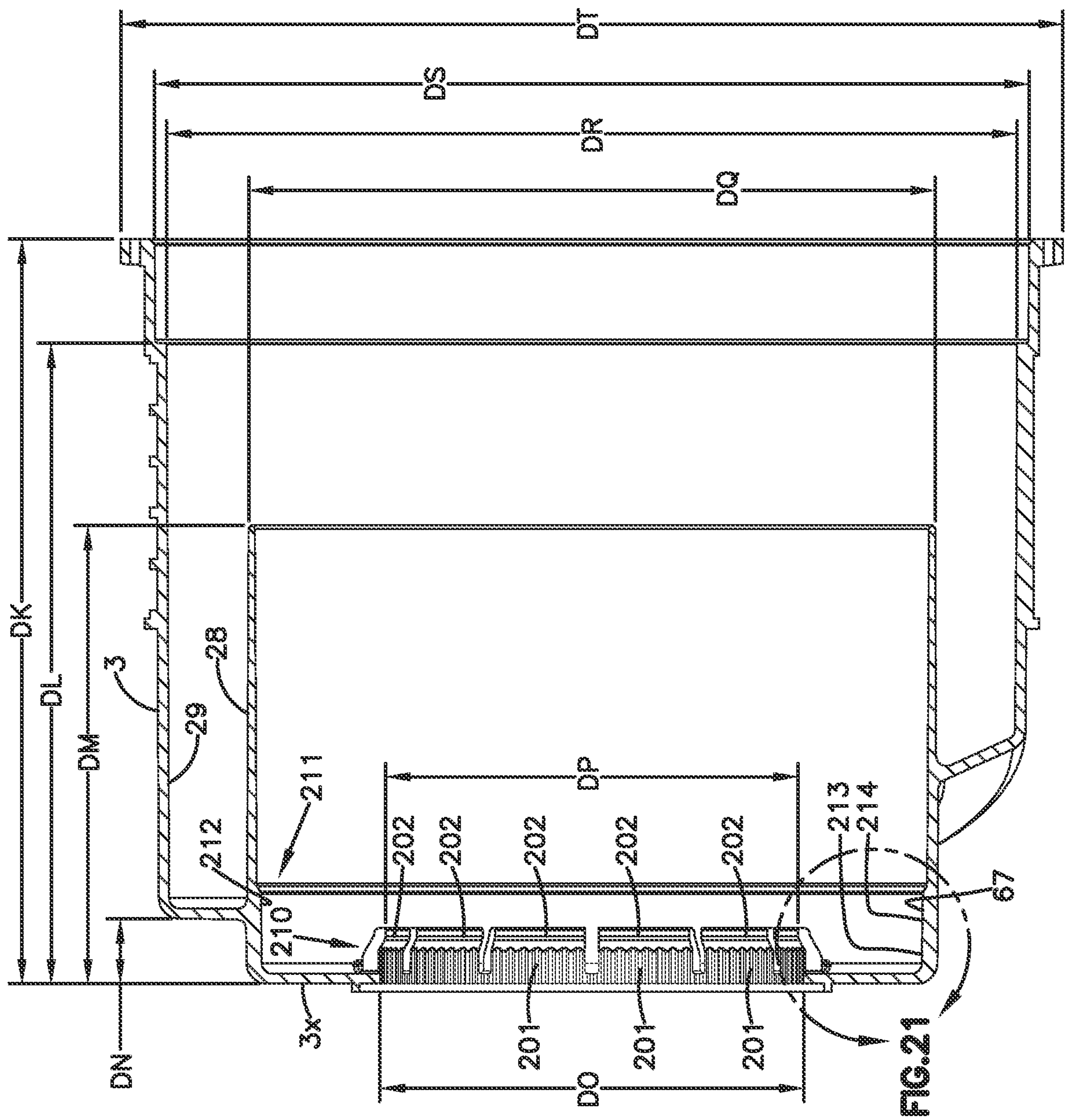
FIG. 20 is a schematic cross-sectional view of the housing section of FIG. 19, taken along line 20-20, FIG. 19.

In FIG. 20, a cross-sectional view taken generally along line 20-20, FIG. 19, is shown. In addition to features already described, at 210 is provided a projection arrangement that extends axially into interior 2*i* of the housing 2, from end 3*x*. It is projection 210 that engages a portion of the outlet tube to form a joint, in installation. The projection arrangement 210 comprises the plurality of optional tabs 202, with optional ribs or toothed sections along radially inner portions of arrangement 210.

Also referring to FIG. 20, attention is directed to inner sidewall region 211. Region 211 includes support section 212 that forms seal surface 67, for engagement by the surface 66 of optional secondary seal arrangement 65, FIGS. 3 and 3A. In region 211, surface 212 will (when used) generally include a first end region 213 configured for approximate line to line alignment with the cartridge 25, FIG. 3A; and, an optional opposite second end region 214 which will generally cause optional compression of seal material in region 66 during installation of cartridge 26, FIG. 3A.

Figure 21:
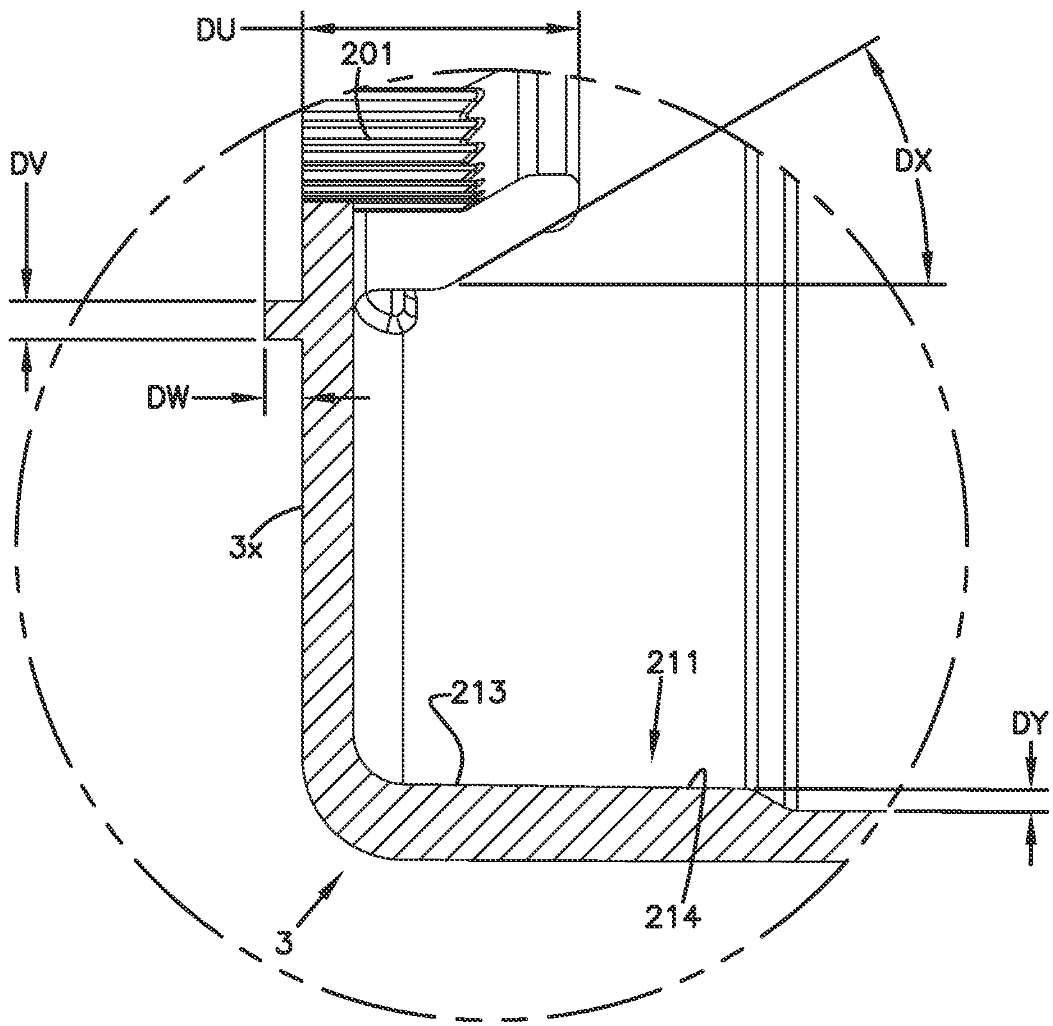
FIG. 21 is an enlarged schematic, fragmentary schematic view of a selected portion of FIG. 20.

In FIG. 21, an enlarged fragmentary view of a portion of FIG. 20 is provided. Regions 213 and 214 are viewable.

Figure 22:
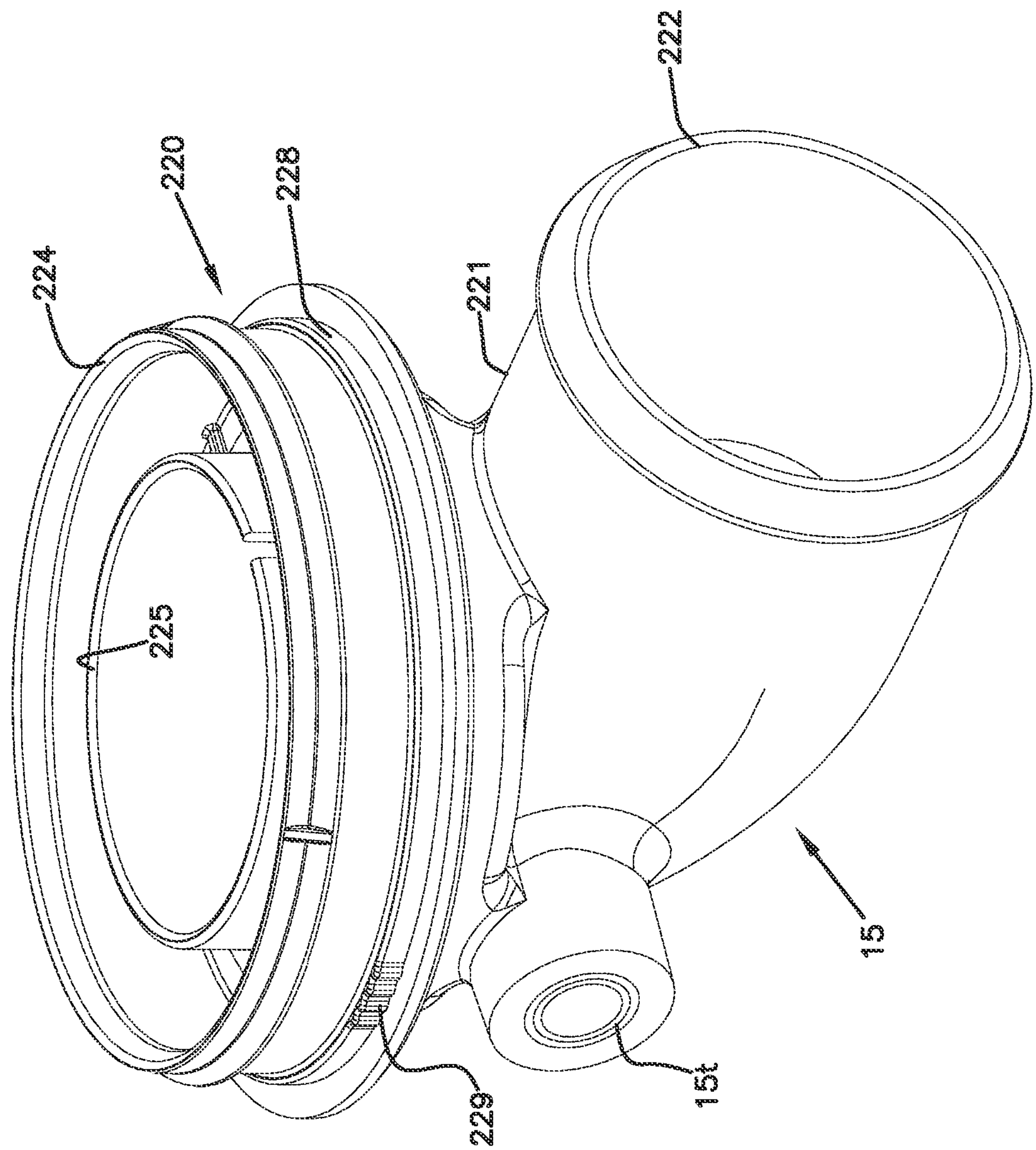
FIG. 22 is a schematic perspective view of a flow tube component of the assembly of FIGS. 1-3.

In FIG. 22, a perspective view of an outlet tube 15 is shown. The outlet tube 15 includes: a connector region 220 which engages housing section 3 in use. Tube 15 also includes gas flow tube region 221 and outlet 222. It is noted that the particular outlet tube 15 depicted is an elbow tube, i.e. the conduit therethrough makes it turn. Alternate configurations are possible.

Referring to FIG. 22, optional pressure tap 15*t* referenced above is shown in tube section 221.

Still referring to FIG. 22, connector section 220 can be seen as including two ring sections: outer ring 224 and inner ring 225. The rings 224, 225 are discussed further below.

Referring to FIG. 22, the connector region 220 is provided with peripheral ring section 228 having optional tooth/projection region 229 thereon. Tooth/rib region 229 is generally sized to interfere with optional tooth/ribbed areas 201 on housing section 3. Thus, the elbow-shaped tube 221 can be rotated to a particular angle relative a housing section 3 and will tend to remain in that orientation (indexed) unless overcome by a twisting motion.

Figure 23:
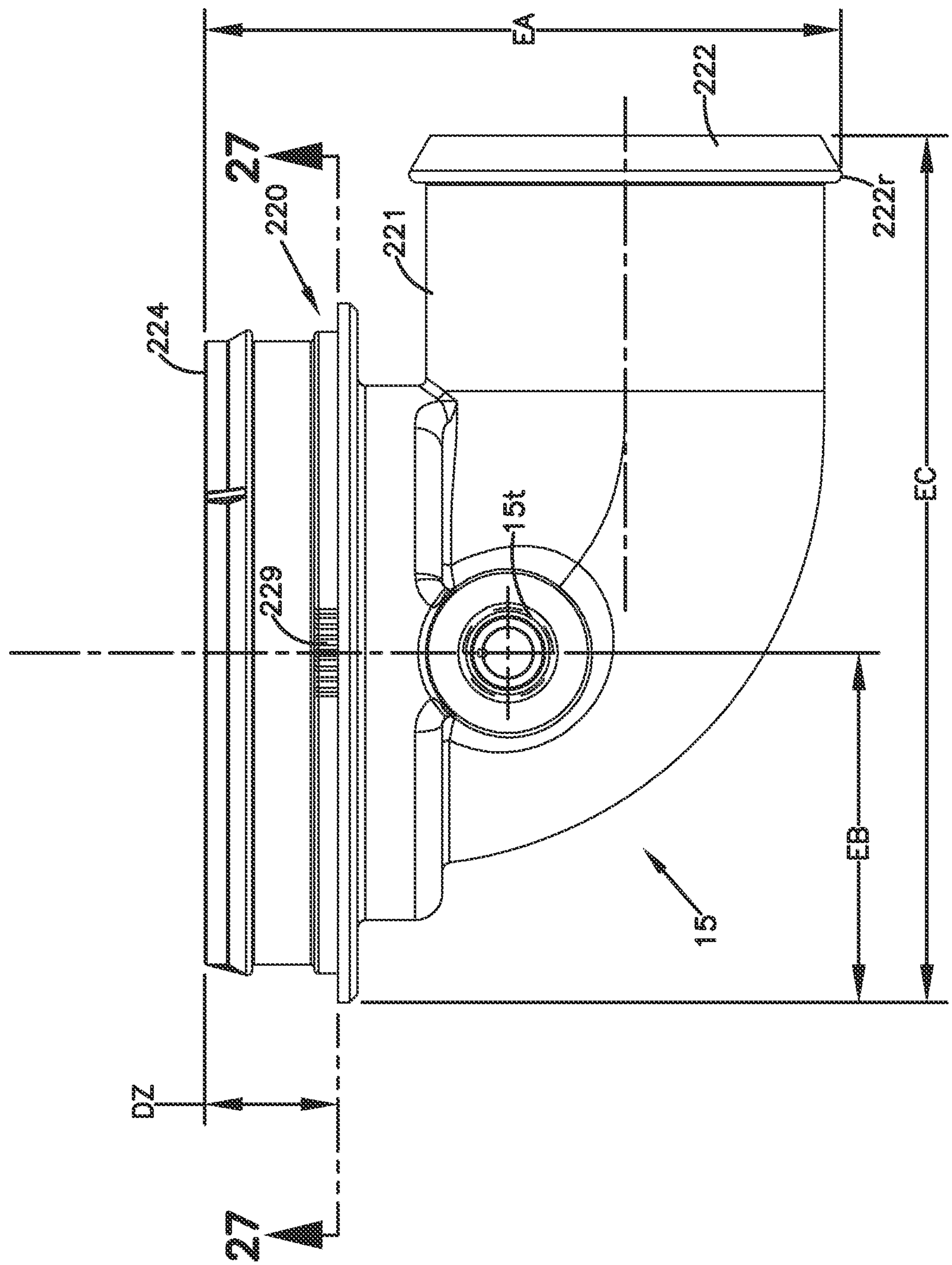
FIG. 23 is a schematic side elevational view of the component of FIG. 22.

In FIG. 23, a side elevational view of outlet tube 220 is depicted. It is noted that in outlet tube 221, a rim 222*r* is provided, to facilitate connecting a hose or other duct work connection.

Figure 24:
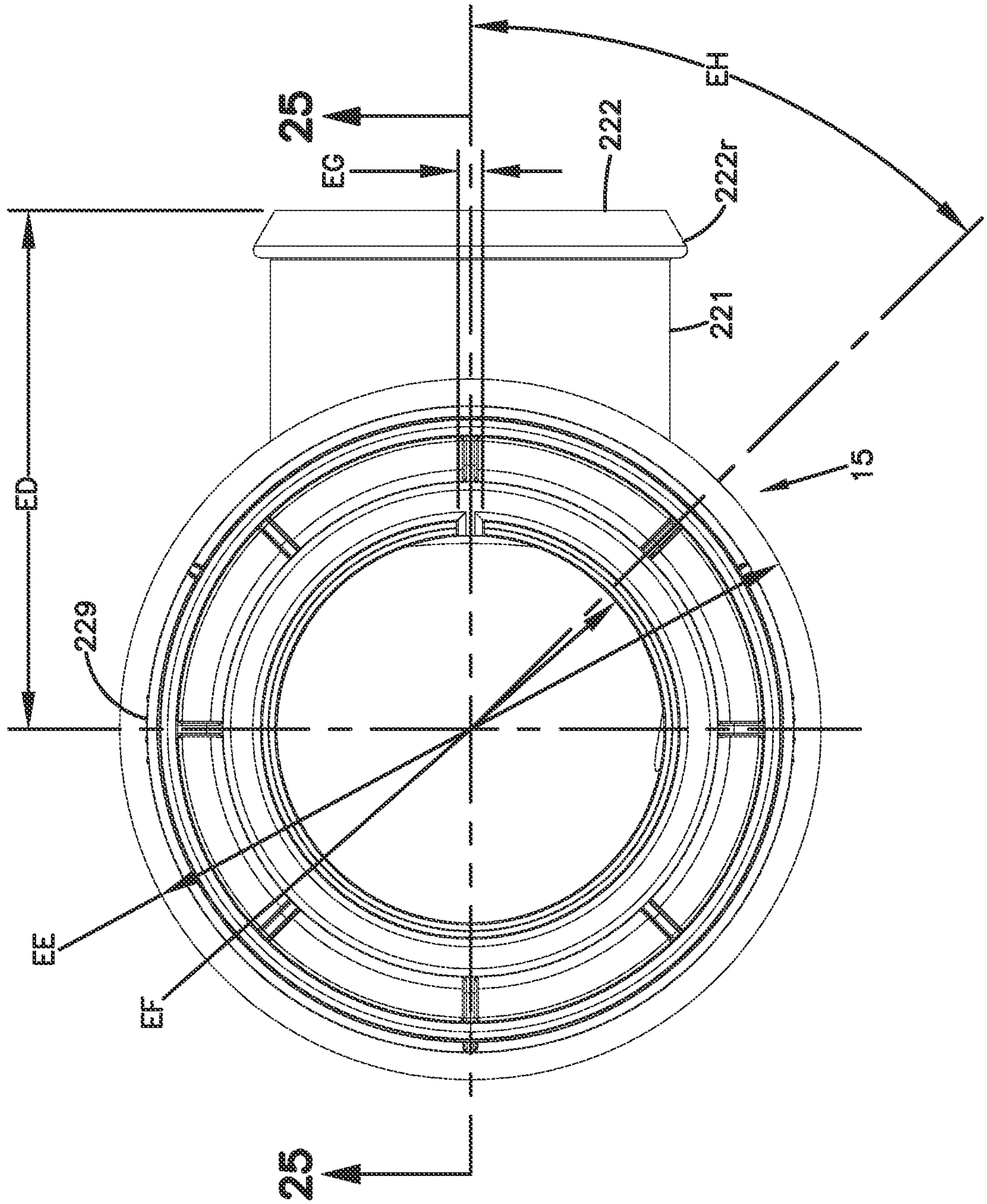
FIG. 24 is a schematic plan view of the component of FIGS. 23 and 24.
Figure 25:
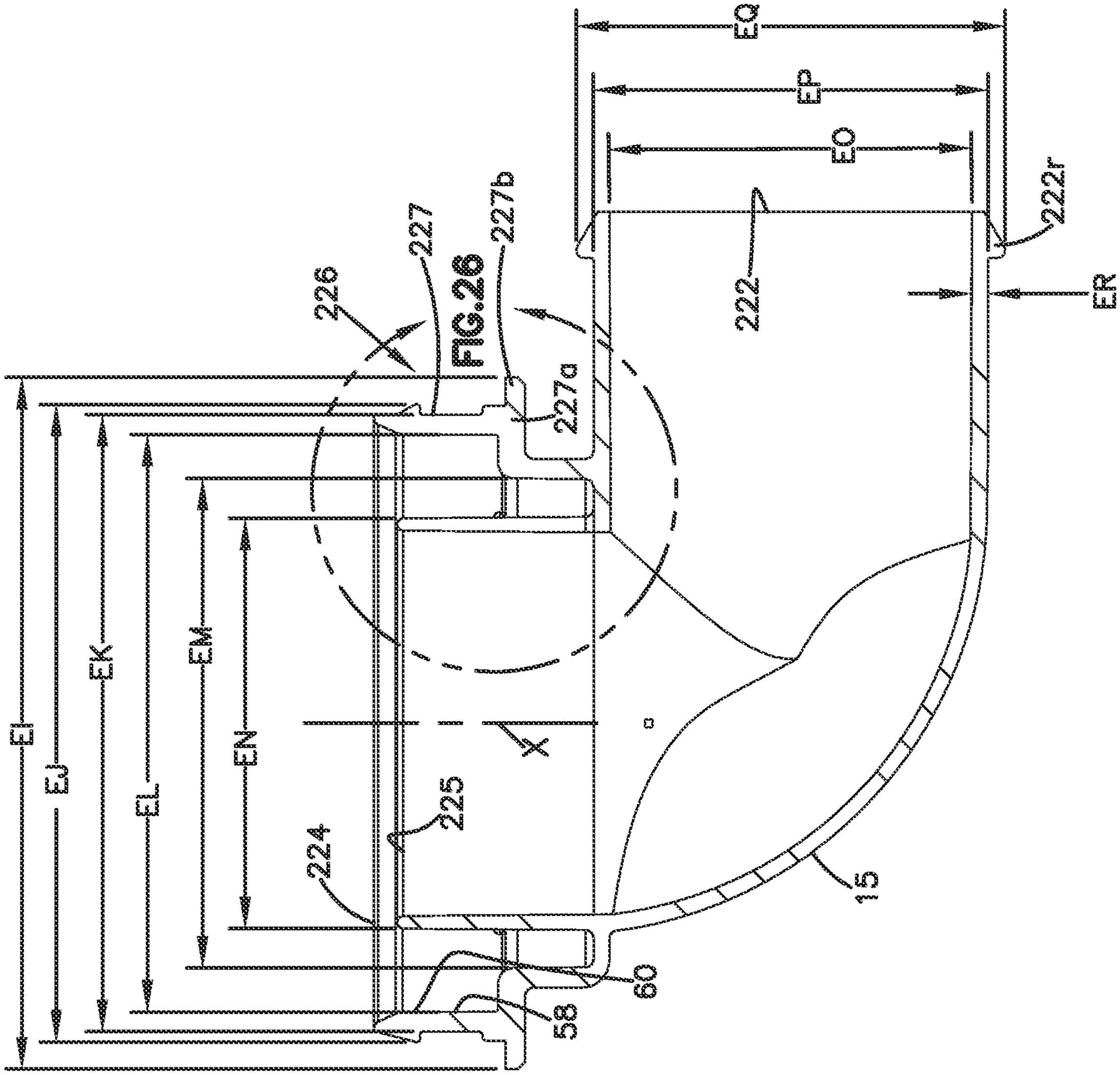
FIG. 25 is a schematic cross-sectional view taken generally along line 25-25, FIG. 24.

FIG. 24 is a plan view of outlet tube 15. FIG. 25 is a cross-sectional view taken generally along line 25-25, FIG. 24.

Referring to FIG. 25, as indicated previously, the connector section 222, generally comprises first and second ring sections 224, 225. Section 224 generally includes features for a secure connection to the housing section 3*x*. Section 224 also generally forms support 60 for the primary seal arrangement 55, FIG. 3A, section 225 provides an outlet flow section.

Still referring to FIG. 25, ring 224 can be seen as having an optional snap-fit lead in tip 226 and receiver section 227. Tip 226 will be pushed into aperture 200, FIG. 17 until snap-fit occurs, with portion of housing section 3 defining aperture 200 resting in region 227. Comparing FIG. 25 to FIG. 3A, it can be seen that tube 15 can be provided with an outer peripheral ring section 227*a* and base 227*b* on ring 224. In FIG. 3A, this ring 227*a* is shown with an axial projection 227*p* thereon. This axial projection 227*p* can engage around an axial outer projection 230, FIG. 3A, on housing end 230 to facilitate water sealing. It is noted that the ring 227*p*, FIG. 25, is shown without this optional projection 227*p* (viewable in FIG. 3A).

Figure 26:
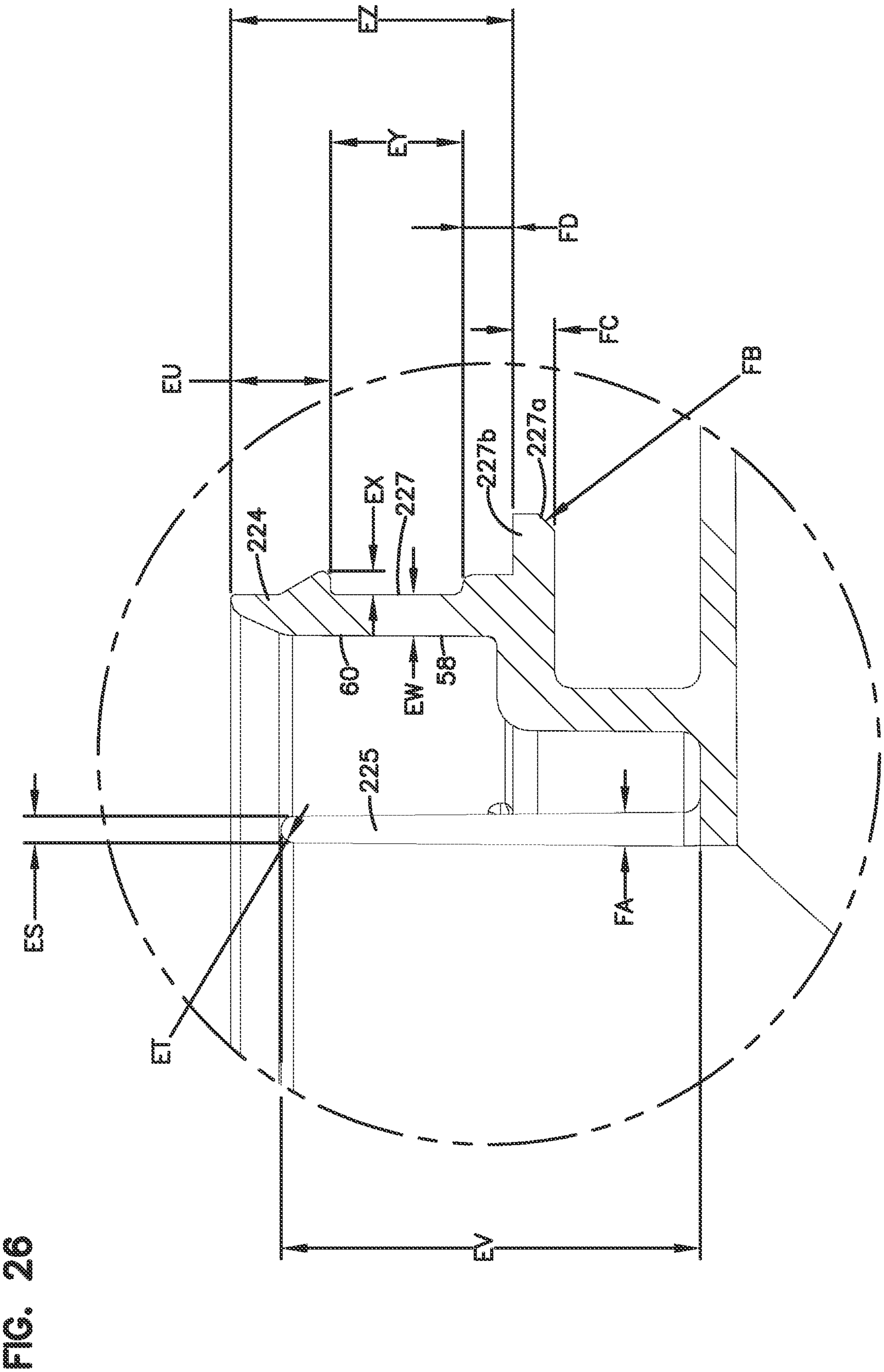
FIG. 26 is an enlarged schematic fragmentary view of a selected portion of FIG. 25.

In FIG. 26, an enlarged fragmentary view of a selected portion of FIG. 25 is shown.

Figure 27:
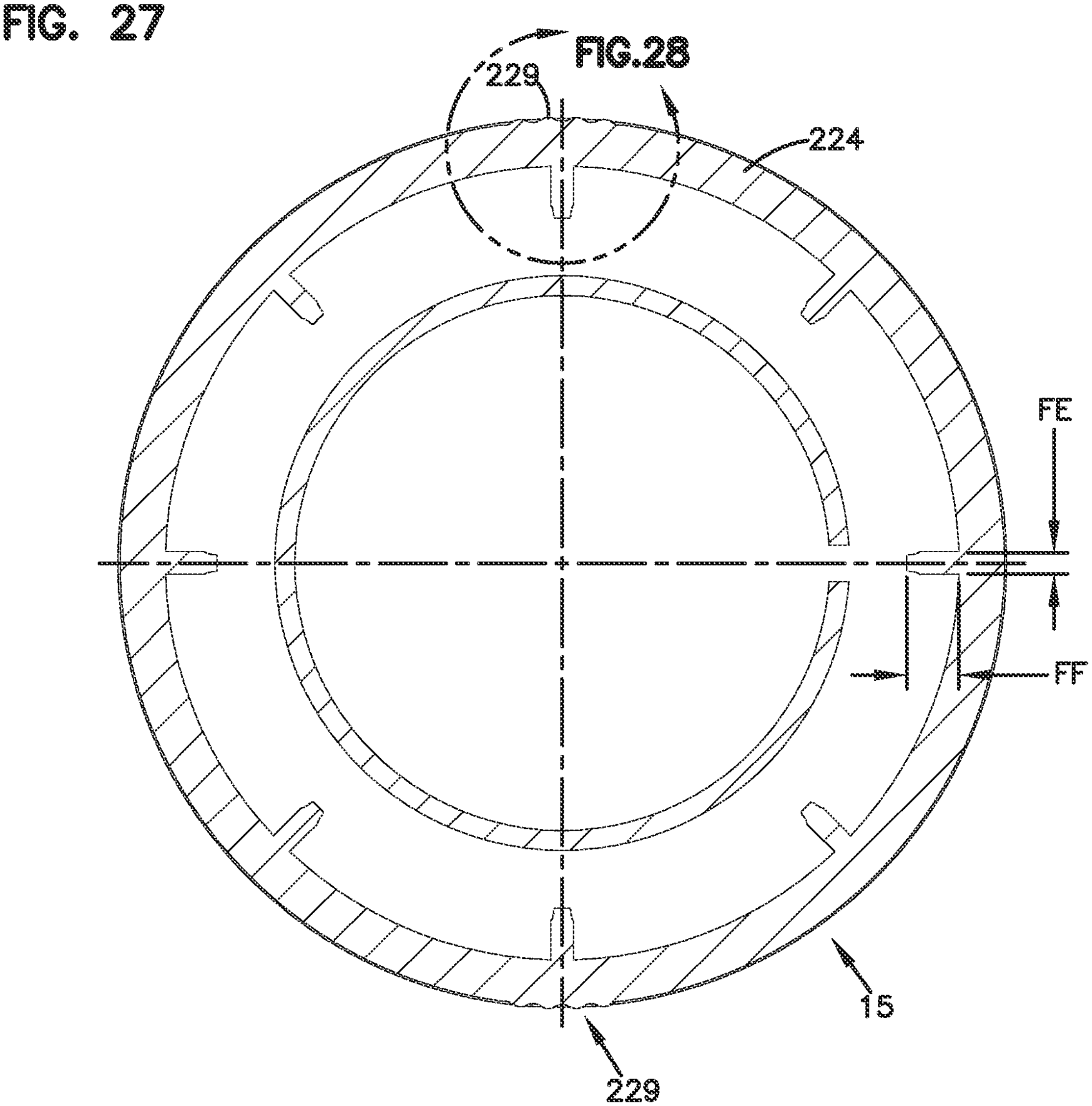
FIG. 27 is an enlarged schematic cross-sectional view taken generally along line 27-27, FIG. 23.

In FIG. 27, a cross-sectional view taken generally along line 27-27, FIG. 23 is shown.

Figure 28:
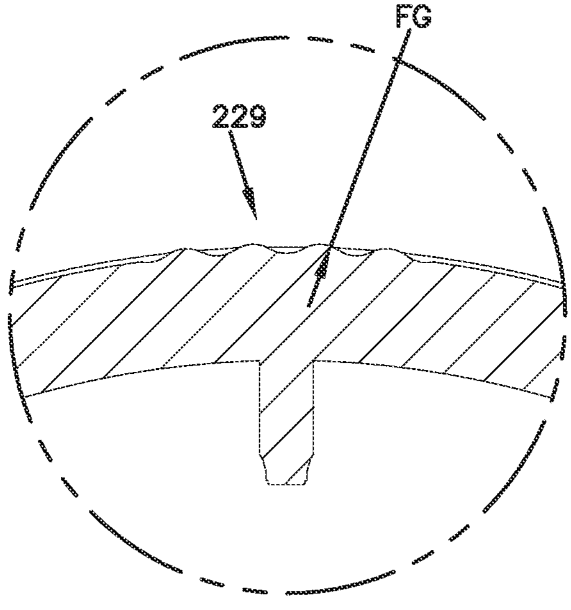
FIG. 28 is an enlarged, schematic, fragmentary view of an identified portion of FIG. 27.

In FIG. 28, an enlarged fragmentary view of a portion of FIG. 27 is viewable. In particular rib section 229 can be seen. Also viewable in FIG. 27 is that there are opposite rib section 229 on opposite sides of the ring 224.

Figure 31:
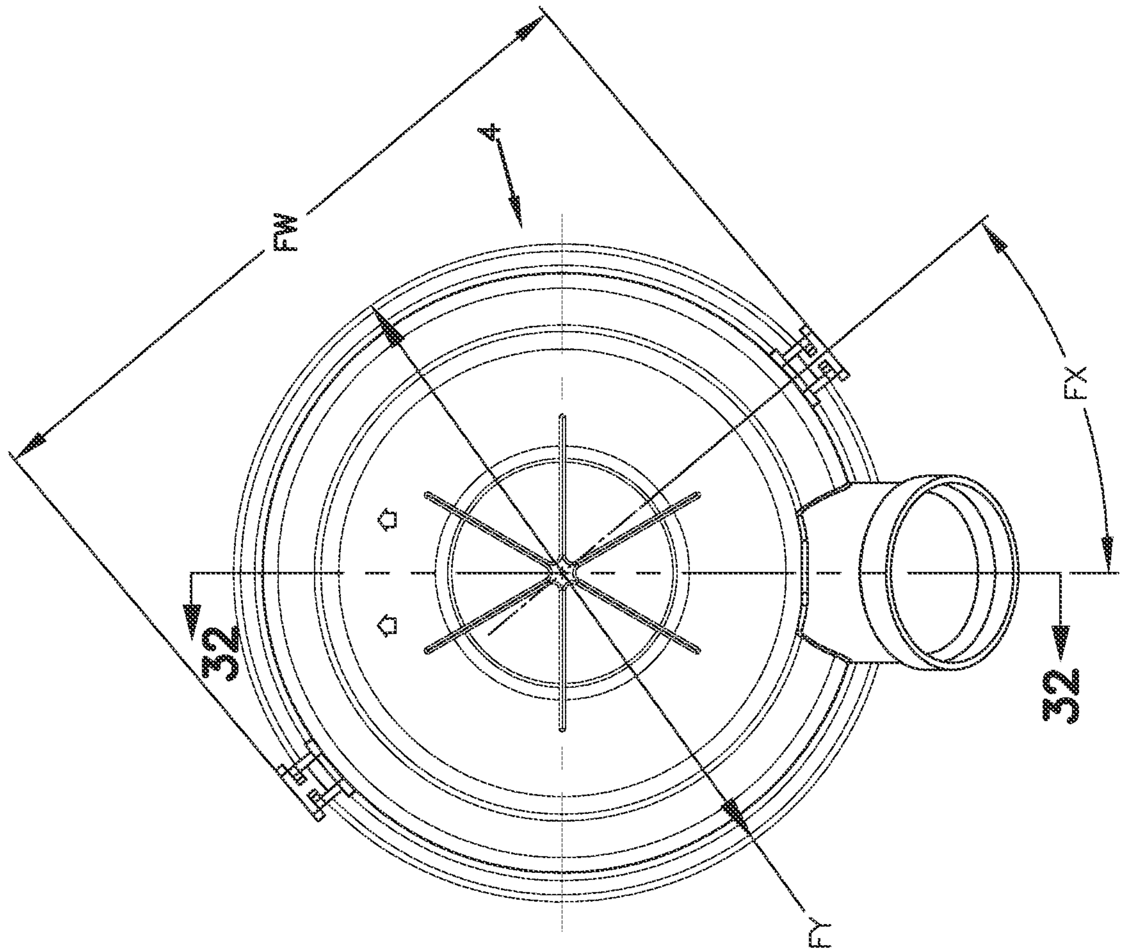
FIG. 31 is a schematic end perspective view of the second housing section of the assembly of FIG. 1-3.
Figure 32:
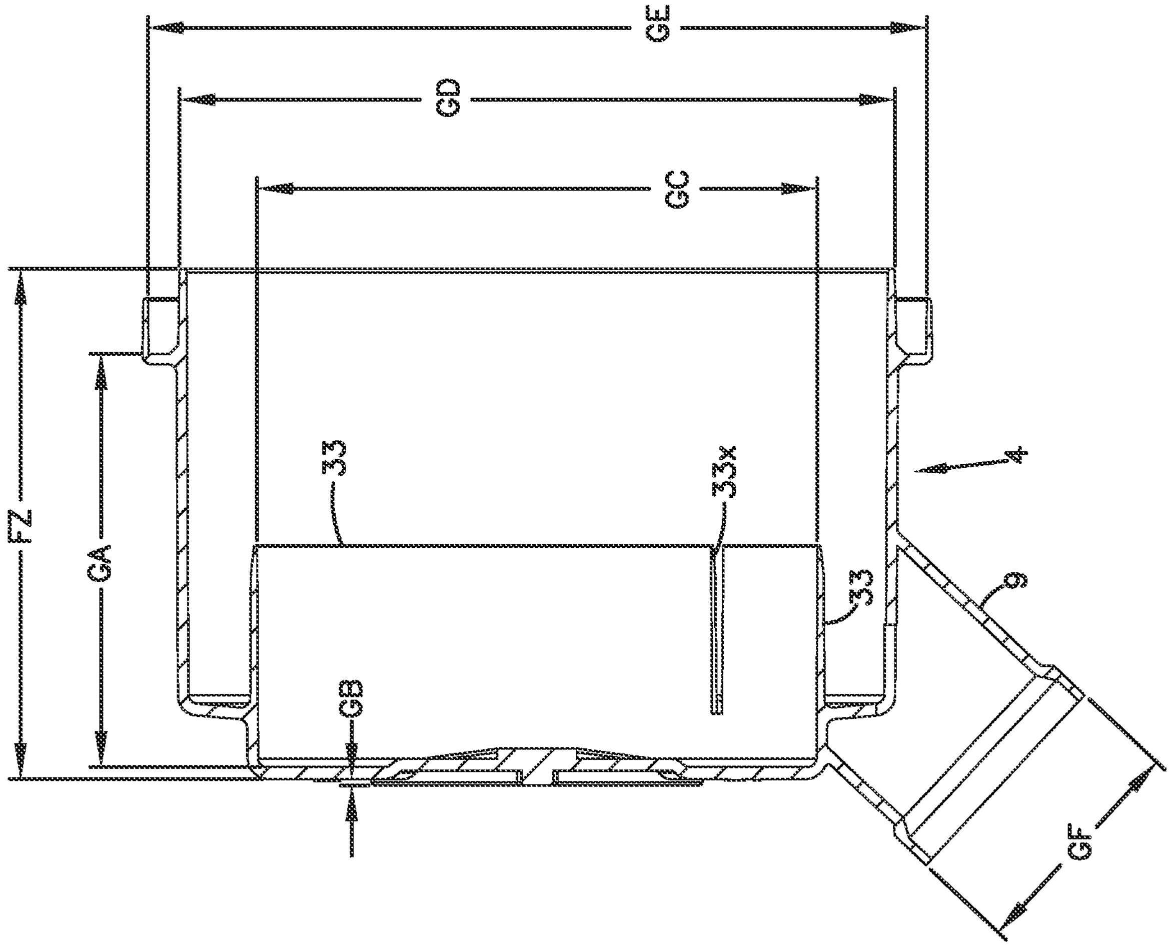
FIG. 32 is a schematic side cross-sectional view of the housing section of FIG. 31, taken along line 32-32, FIG. 31.

In FIG. 31, access cover 4 is depicted as it would be made if molded from plastic and without latches 5 positioned thereon. In FIG. 32, a cross-sectional view of access cover 4 is provided. Flange 33 is viewable. Slit or space 33*x* in flange 33 allows for drainage from flange 33 of water that may enter an interior flange 33, in use.

V. Detailed Discussion of Selected Specific Features

A. The Primary Seal Arrangement 55 and Recess, Receiver or Groove 73

Referring back to FIGS. 7 and 8, it is noted that in a typical assembly, the definition of the primary radial seal surface 55*s*, in the example depicted in optional recess, receiver or receiving groove 73 will be as discussed in this section, although alternatives are possible. Typically, the recess, receiver or groove 73, when present, will be at least 5 mm deep, usually at least 8 mm deep, often 10-25 mm deep, in deepest extension from at least one or the other of surfaces 72*x*, 72*i* and typically from both. Also, typically adjacent bottom end 73*b*, the recess, receiver or groove 73 will be at least 3 mm wide, typically at least 5 mm wide, between opposite sidewalls 73*x*, 73*i*, (disregarding any taper at the very bottom).

Alternately stated, typically, when used, the inner and outer sidewalls 73*i*, 73*x* of the optional recess, receiver or receiving groove 73, in a lower portion of the groove 73 are spaced at least 3 mm apart, typically at least 5 mm apart, often spaced an amount within the range of 5-10 mm inclusive, apart. Although alternatives are possible, typically the spacing is not more than 15 mm apart, at a widest location within a deepest 30% and typically at a widest location within a deepest 35% of the groove 73, when the seal surface formed in the recess, receiver or groove is circular. It is recognized that sidewall 73*x*, 73*i* may taper inwardly toward one another at the very bottom 73*b* of the groove however.

Typically, at its outside end adjacent surfaces 72*x*, 72, FIG. 8, the optional recess, receiver or groove 73 will be at least 5 mm wide and typically at least 7 mm wide, often 7-25 mm wide, when the seal surface formed in the groove is circular.

An axial length of the surface portion 73*r* of the recess, receiver or groove 73 (FIG. 8) that is compressed radially inwardly the most, as a radial outwardly directed seal, is formed in this region, will preferably have an axial length typically at least 5 mm long, typically 8-20 mm long; and, usually will be spaced from one or the other, and typically from both, of surface sections 72*x*, 72*i*, a distance of at least 4 mm, often an amount within the range of 4-15 mm.

Referring to FIG. 7, typically the portion of the molding 70*m* that defines radial seal surface 55*s* is at least 5 mm thick, typically at least 7 mm thick and usually 7-25 mm thick, in width (when undistorted) from aperture 50 to surface 55*s*. Preferably, surface 55*s* is not spaced further then 50 mm from aperture 50, although alternatives are possible. Also, typically the support 80, FIG. 5 is embedded in this region, spaced a distance from a closest portion of surface 55*s*, before distortion from compression in installation, that is not more than 20 mm and typically not more than 15 mm, although alternatives are possible.

In general, even with a variety of cartridges of a variety of sizes, such characterizations of the optional recess, receiver or receiving groove 73 when used will be useful and acceptable in providing for both: a good first radial seal 55; and, a region for receiving therein, axially projecting portions of both the outlet tube 15 and engaging portions of the housing section 3.

Typically, the molding 70*m* that defines a radial seal surface 55*x* is configured, relative to the support 80 so that the material that forms the radial seal will be such that seal surface 55*s* compress (maximally radially) toward the first seal support 80 at least 10% of its thickness, typically at least 15% of its undistorted thickness and usually an amount within 15-35% of its undistorted thickness, when installed. Typical examples would involve compression within the range of 20-30%, inclusive, of its undistorted radial thickness.

B. The Optional Outer Secondary Seal Surface 66

Referring again to FIGS. 7 and 8, typically the outer surface 66 is spaced radially from surface 55*s* a distance of at least 3 mm, often at least 5 mm, in many instances at least 10 mm, usually at least 15 mm, and in an arrangement when configured as shown typically at least 20 mm. Typically, this distance of spacing is on the order of 20-80 mm, but alternatives are possible.

Typically, the first radially directed seal surface has a seal perimeter largest cross-sectional size of at least 6 mm smaller, often at least 10 mm smaller, more often at least 20 mm smaller, and in an arrangement as depicted usually at least 30 mm smaller, than the second radially directed seal surface. The "seal perimeter largest cross-sectional size" will typically be a diameter when circular seal surfaces are defined. It is noted that typically, when the cartridge is as depicted, a first radially directed seal surface has a seal perimeter largest cross-sectional size of at least 30 mm smaller than the second radially directed seal surface.

Typically, the second seal surface 66, where compression occurs against the support 81, is spaced no more than 8 mm from that support 80. Typically, the material in this region is configured to compress at least 3% maximally (radially) toward the second seal support, usually at least 5%, and often an amount within the range of 5-20%.

It is noted that in the example depicted, although alternatives are possible, much of the seal axial length of surface 66 that is compressed during installation, is spaced axially away from surface 72*x* further than a bottom end of the receiving groove 73. This will be typical when the cartridge 25 is constructed as described herein. Usually, surface 66 extends over a distance of at least 2 mm beyond a bottom 73*b* of groove 73, axially, toward an opposite end 46 of the cartridge 25.

C. Usable Materials for Molding the End Caps 45, 46

A variety of materials can be used for the end cap materials 45, 46 when they are molded-in-place, to form both a good seal across ends of the media pack and good housing seals. Typically, a foamed material having a hardness Shore A, of no greater than about 30, typically no greater than about 22, was preferably below 20 is used. Typically, the material chosen has an "as molded density" of no greater than 28 lbs., per cubic foot (about 450 kilograms per cubic meter) more preferably no more than about 22 lbs. per cubic foot (355 kilograms per cubic meter) and typically no greater than about 18 lbs. per cubic foot (290 kilograms per cubic meter). Often, materials are chosen that have an as molded density within in the range of 13-17 pounds per foot (200-275 kilograms/cubic meter). Herein, the term "as molded density" is meant to refer to its normal definition of a weight divided by its volume. A water displacement or similar test can be used to determine volume of a sample of a molded foam. It is not necessary when applying the volume test, to pressure water absorption into the pores of the porous material, to displace the air that the pores represent. Thus, the water displacement test used, to determine sample volume, would be in immediate displacement without waiting for long period to displace air within the material pores. Alternately stated, only the volume represented by the outer perimeter of the sample need to be used for the as molded density calculation.

Typically, a resin is chosen that will rise during cure, and which increase in volume during cure by at least 40%, typically at least 60%; and, often an amount of 80% or greater.

Commercially available foaming polyurethane can be used for the end cap molded-in-place materials. A detailed description of usable polyurethane can be found in such prior art as WO 2006/026241, incorporated herein by reference.

D. The Media Pack

The particular material chosen for the media is a matter of choice for a selected application. When the filter assembly is an air cleaner, any of a variety of media materials now used in air cleaners can be used with principles according to the present disclosure.

The media pack can comprise only media 26 or the media can be provided with an inner and/or outer liner before installation in the cartridge 25. The media can be pleated, although alternatives are possible. The media can include hot melt media tip spacers or other media spacers if desired. The media may be provided with pleats spacers formed from corrugations and/or folds in the media. The media can be provided in a variety of configurations including cylindrical and conical, and with a variety of inner and/or outer perimeter definitions, for example circular or oval.

E. Example Dimensions of an Example Arrangement

The principles described herein can be applied in a variety of systems of a variety of sizes and specific features. Example dimensions are provided of a usable system. However, it is noted that these are meant to be exemplary only, and not to indicate in any specific manner, limitation on the broad application of the principles described. Example dimensional and angles indicated by reference letters in the drawings are as follows: AA=112 mm; AB=76.7 mm; AC=56.5 mm; AD=35.2 mm; AE=186.4 mm; AF=173.5 mm; AG=205.2 mm; AH=113.5 mm; AI=24.5 mm; AJ=42.7 mm; AK=54.4 mm; AL=269.8 mm; AM=136.4 mm; AN=47°; AO=280.3 mm; AP=130.4 mm; AQ=78.7 mm; AR=129.5 mm; AS=11 mm; AT=5.5 mm; AU=30°; AV=2 mm radius; AW=130.42 mm diameter; AX=128.45 mm; AZ=87.53 mm; BA=78.74 mm; BB=55.32 mm; BC=3 mm radius; BD=3 mm; BE=6 mm; BF=25.5 mm; BG=53.4 mm; BH=130.2 mm; BI=1.5 mm; BJ=6.62 mm; BK=16 mm; BL=3 mm radius; BM=2 mm radius; BN=1 mm radius; BO=1 mm radius; BP=4 mm radius; BQ=2 mm radius; BR=231.4 mm; BS=121.1 mm; BT=2 mm; BU=6.4 mm; BV=7°; BW=123.5 diameter; mm; BX=0.95 mm; BY=18°; BZ=47.6°' CA=29.36 mm diameter; CB=0.5 mm radius: CC=0.5°; CD=0.5 mm radius; CE=1.7 mm; CF=1.3 mm radius; CG=0.5 mm radius; CH=6.5 mm; CI=15.8°; CJ=95.6 mm; CK=3.3 mm; CL=18.9 mm; CM=1.5 mm; CN=30 mm radius; CO=14.2 mm radius; CP=0.2°; CQ=3 mm radius; CR=16 mm; CS=2°; CT=15 mm; CU=21.9 mm; CV=12 mm; CW=31.6 mm; CX=15.8 mm; CY=9 mm; CZ=6 mm; DA=105 mm; DB=112 mm; DC=40 mm; DD=6 mm; DE=15 mm; DF=9 mm; DG=80.7 mm; DH=210 mm; DI=55.8 mm; DJ=54.9 mm; DK=144.7 mm; DL=124.4 mm; DM=89 mm; DN=12.7 mm; DO=82.2 mm; DP=80 mm; DQ=33.1 mm; DR=164.9 mm; DS=169.6 mm; DT=182.7 mm; DU=10.9 mm; DV=1.5 mm; DW=1.5 mm; DX=30°; DY=0.9 mm; DZ=17 mm; EA=81.2 MM; EB=44.6 mm; EC=110.6 mm; ED=66 mm; EE=89.2 mm; EF=24.7 mm radius; EG=3.1 mm; EH=45°; EI=89.2 mm; EJ=82.21 mm; EK=79.56 mm; EL=74.5 mm; EM=63.1 mm; EN=52.9 mm; EO=46.7 mm; EP=50.8 mm; EQ=55.2 mm; ER=2.1 mm; ES=1.6 mm; ET=0.7 mm radius; EU=6 mm; EV=25.3 mm; EW=2.5 mm; EX=1.4 mm; EY=8 mm; EZ=17 mm; FA=2 mm; FB=45°; FC=2.5 mm; FD=3 mm; FE=2 mm; FF=4.9 mm; FG=1 mm radius; FI=120°; FJ=30°; FK=9.3 mm; FH=62.4 mm radius; FL=125.5 mm; FM=100 mm; FN=60°; FO=1.5 mm radius; FP=8.5 mm; FQ=5 mm; FR=3 mm radius; FS=3 mm radius; FT=72.3 mm; FU=75.8 mm; FV=29.5 mm; FW=196.5 mm; FX=40°; FY=186.4 mm; FZ=120.5 mm; GA=97.7 mm; GB=1.5 mm; GC=132.28 mm; GD=168.9 mm; GE=183.9 mm; GF=54.9 mm.

F. The Optional Resonator/Sonic Choke

As indicated above, in an aspect of the present application, the filter cartridge 25 can be provided with an optional resonator/sonic choke (or sonic choke/resonator). An example sonic choke is provided which includes: a throat; an expanding funnel section between the throat and a first end piece (cap) of the cartridge; a permeable liner section adjacent the second end piece (cap) of the cartridge; and, a transition region between the throat and the liner section. In the example depicted, the transition region tapers downwardly to the throat, and includes: an outwardly convex permeable section adjacent the liner section; and, an outwardly concave section adjacent the throat.

In an example depicted, the throat has an internal diameter of at least 25 mm, typically at least 26 mm and often within the range of 26-35 mm, inclusive.

In an example depicted, the funnel section is impermeable, although alternatives are possible. The funnel section generally expands from the throat to the first end piece (cap) at an internal angle of at least 5° and typically within the range of 6°-8°, inclusive, in expansion from the throat to the first end piece (cap).

In an example arrangement depicted, the outwardly concave section of the transition region is preferably impermeable, i.e. it is a solid wall. This provides advantage with respect to the combination of noise suppression and air flow characteristics of the resonator/sonic choke.

Typically, the outwardly concave section of the transition region is an outer radius of curvature of at least 25 mm, typically an outer radius of curvature within the range of 26-35 mm, inclusive.

Typically, the outwardly convex section of the transition region has a radius of curvature of at least 10 mm, typically an amount within the range of 12-18 mm, inclusive.

Typically, the outwardly convex section of the transition region is at least 40% open, typically at least 50% and often 60% open or more. By "open" reference is meant to the amount of outwardly convex section that comprises aperture as opposed to solid wall. This particular configuration facilitates air flow, from regions of the media 26 that directly surround an impermeable conical section, into an interior of the sonic choke and resonator, and then through the outlet end cap 50.

VI. Alternate Embodiments; Alternate Applications of Selected Principles, FIGS. 33-70

A. General

In FIGS. 33-57, some optional alternate principles and features applicable in arrangements according to the present disclosure are provided. The features in part relate to alternate configurations for the primary seal that can be implemented to advantage. These alternate primary seal configurations can be used with a secondary seal, or they can be used in arrangements without a secondary seal, and advantage can still be obtained.

In FIGS. 58-65, a preferred mold arrangement and molding techniques for making portions of filter cartridges of the type depicted in FIGS. 33-57 are depicted.

In FIGS. 66-70, schematic depictions of alternate seal shapes that can be used in filter cartridge and assemblies according to the present disclosure are shown.

B. The Second Embodiment and Variations of FIGS. 33-57

Figure 33:
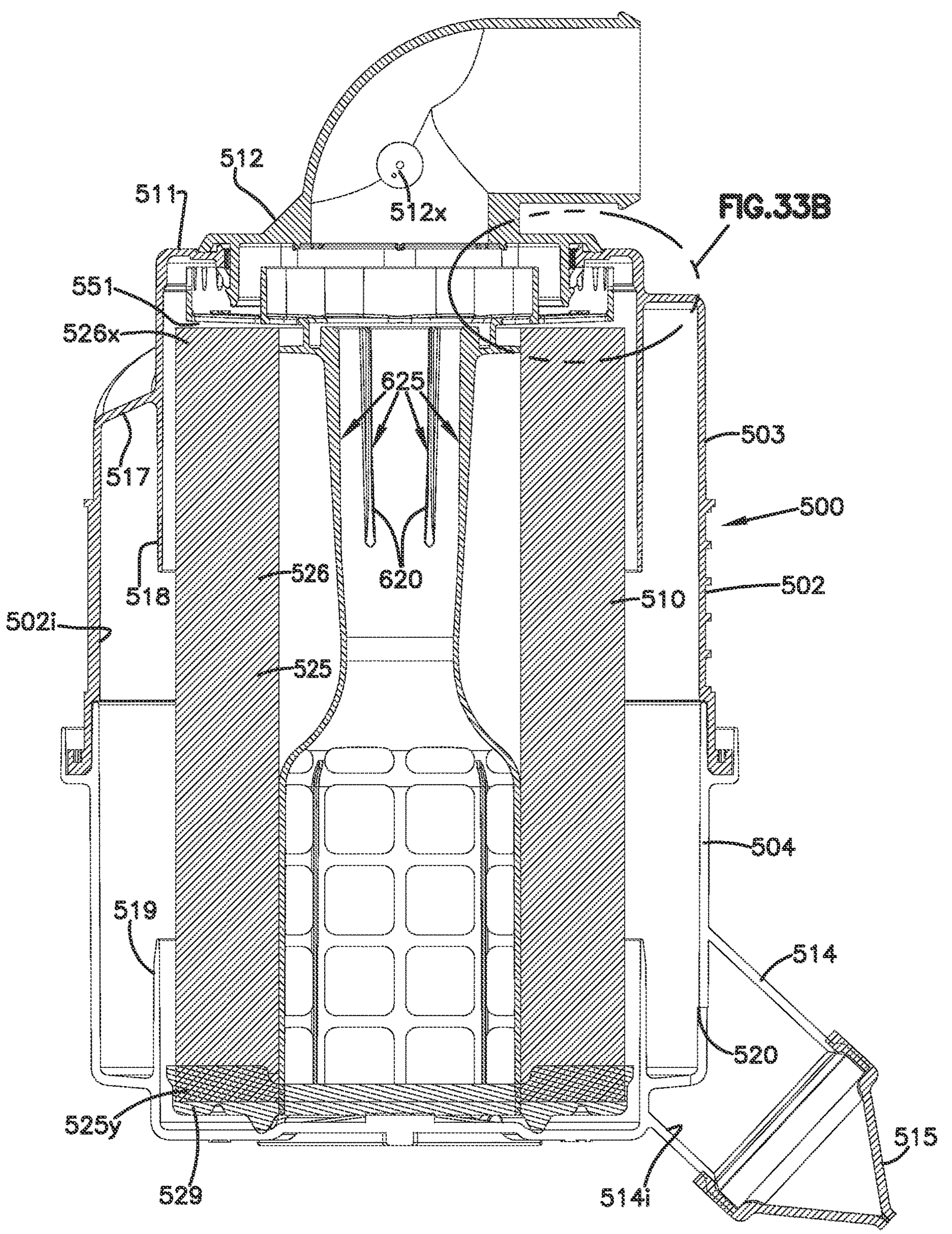
FIG. 33 is a schematic side elevational view of a second embodiment of an air cleaner assembly according to the present disclosure; the view of FIG. 33 being a cross-section taken along line 33-33, FIG. 33A.

The reference numeral 500, FIG. 33, generally depicts a filter (in the example an air cleaner) assembly according to a second embodiment of the present disclosure, which uses a modified and advantageous primary seal between a filter cartridge and a housing. Referring to FIG. 33, the air cleaner assembly 500 is depicted in cross-section and comprises housing 502 defining a main housing body 503 and access cover 504; the access cover 504 being removably secured to the housing body 503 by a latch arrangement 505, not shown in FIG. 33, see FIG. 51.

The housing 502 defines an interior **502*i*, in which is positioned a removable and replaceable, i.e. serviceable, filter cartridge 510. The cartridge 510 is discussed in detail below. It is noted that in FIG. 33 a portion of an end piece (cap) on the cartridge 510 is not shown, so internal structural detail can be seen. This will be understood by reference to the discussion below of FIGS. 34-35**.

Still referring to FIG. 33, the air cleaner assembly 500 includes, on housing 502, an end wall 511 with an air flow tube 512 projecting outwardly therefrom. Tube 512 will typically be a clean air outlet tube used analogously to tube 15, FIG. 1; however if reverse flow is used, it would be an inlet tube. Tube 512 also includes an optional pressure tap **512*x* thereon. The tube 512 can, as shown, be a separate structure from a remainder of the housing 502, which is then attached to a remainder of the housing 502 to form the overall housing of the air cleaner assembly 500**. Alternatives are possible.

The housing 502 depicted further includes an optional dust ejector tube arrangement 514 with evacuator valve arrangement 515 positioned thereon.

Figure 51:
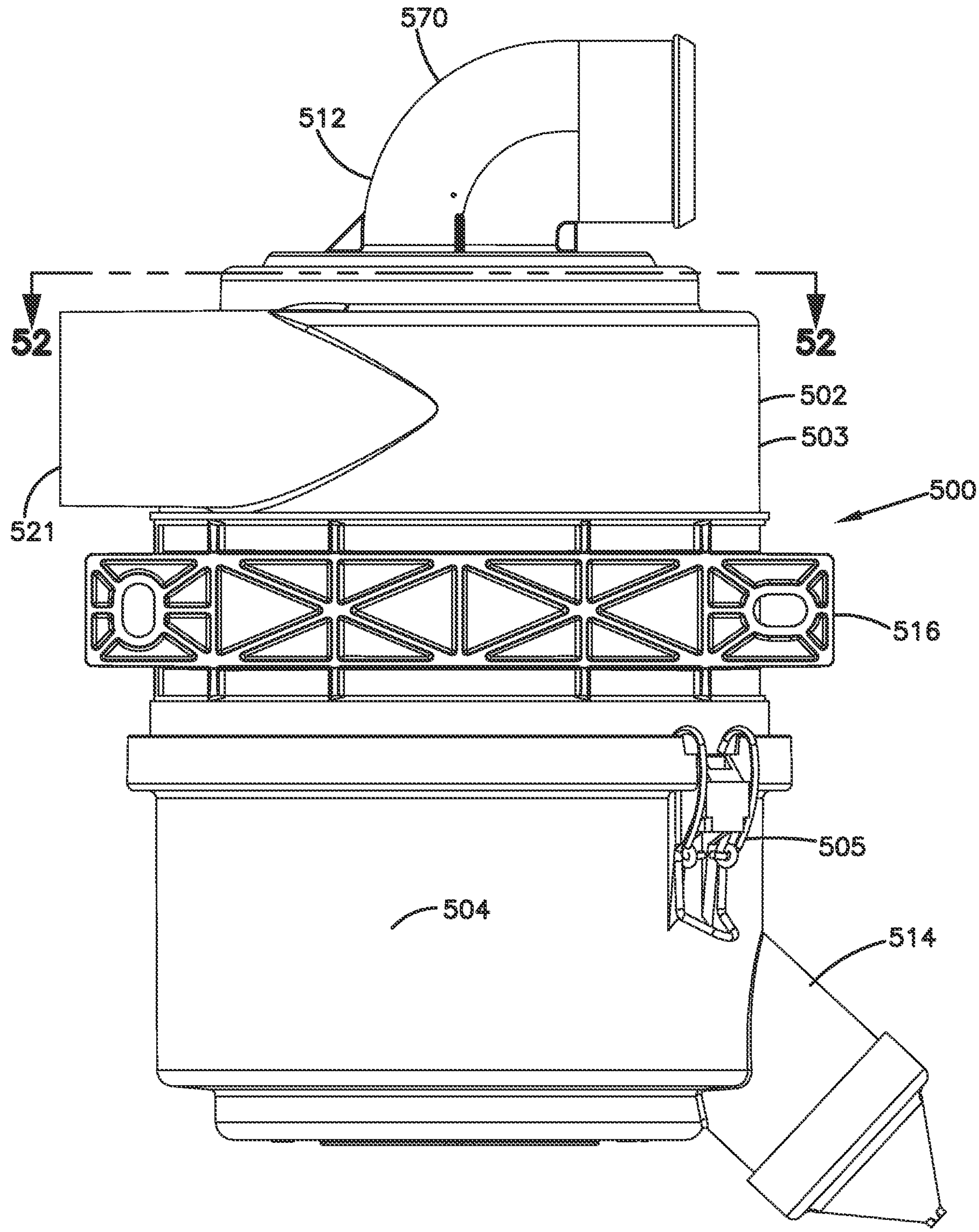
FIG. 51 is a schematic side elevational view of the assembly depicted in FIG. 33.

Referring to FIG. 51, an optional mounting pad arrangement on the housing 502 is shown at 516.

Referring back to FIG. 33, air flow inlet ramp is shown at 517. A shield in body section 503 is shown at 518 and a shield in access cover section 504 is shown at 519. Aperture 520 is positioned in access cover 504 for dust and water access to an interior of ejector tube 514 shown at **514*i***.

At 521, FIG. 51, an air cleaner assembly inlet tube is depicted.

Figure 33A:
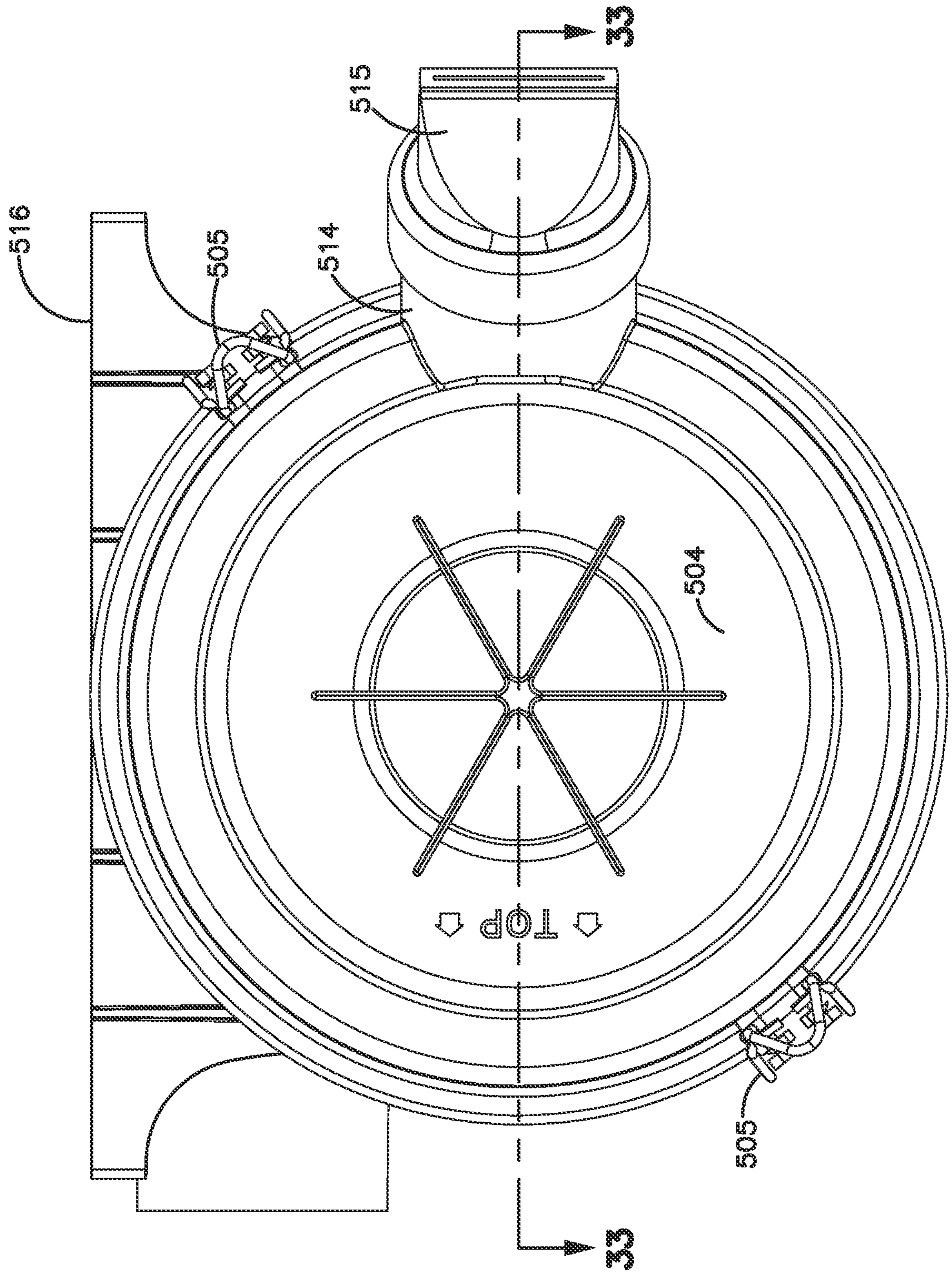
FIG. 33A is an access cover end plan view of the assembly depicted in FIG. 33.

In FIG. 33A, a plan view taken toward access cover 504 is provided. FIG. 33A indicates, at line 33-33, the view of FIG. 33.

As thus far described, the assembly 500 is generally analogous to assembly 1. The features identified may be configured to operate analogously to similar features described in connection with the embodiment of assembly 1, previously described.

Figure 35:
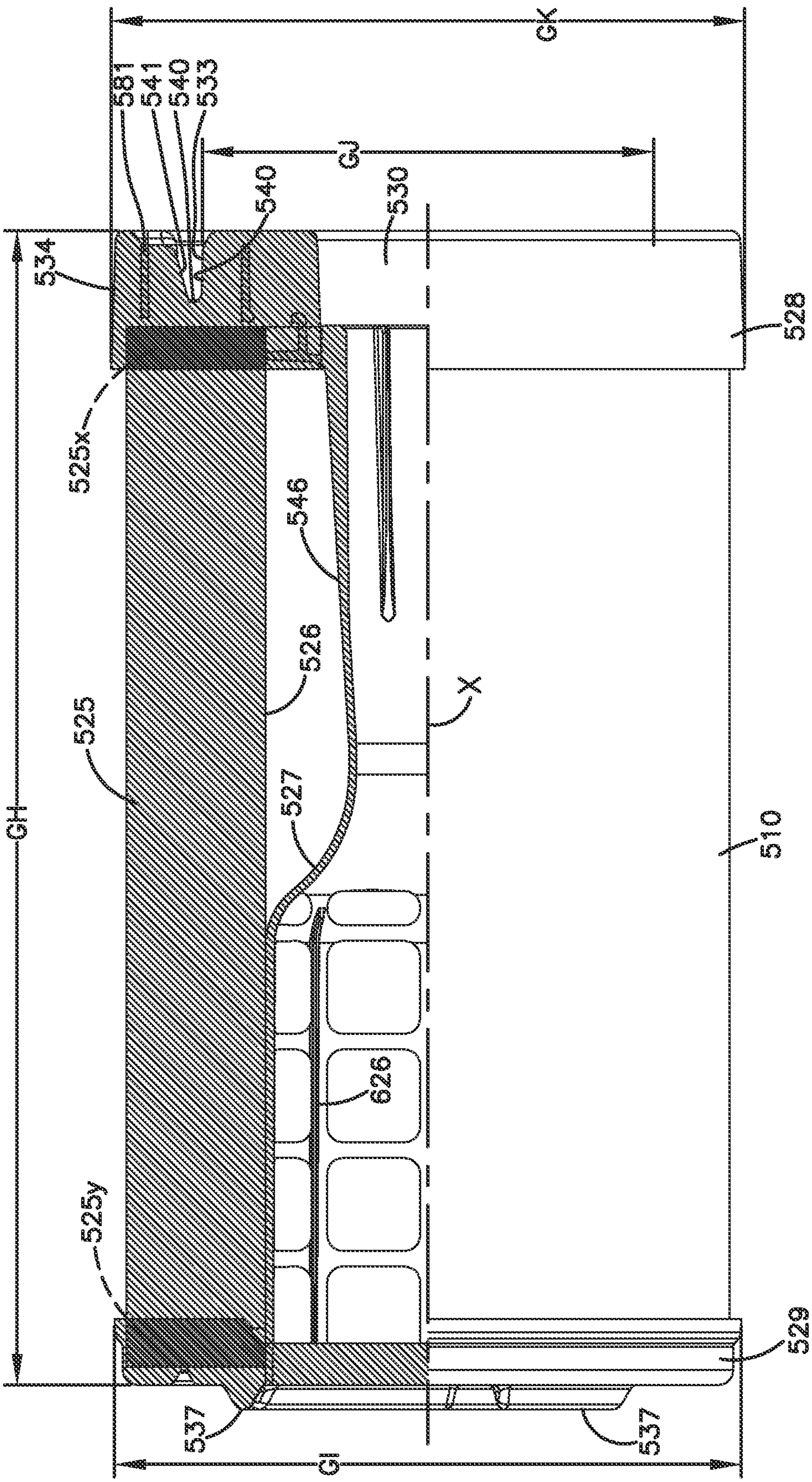
FIG. 35 is a schematic side elevational view of the filter cartridge depicted in FIG. 34, with portions shown broken away and in cross-section to indicate internal detail.

Attention is now directed to FIG. 35, a side elevational view of cartridge 510 with portions shown in cross-sectional view to observe internal detail. The cartridge 510 is a service component, usable with air cleaner 500. Specifically, when access cover 504 is removed from a remainder of the housing 502, cartridge 510 can be installed or be removed for servicing.

In general, and referring to FIG. 35, the cartridge 510 comprises media 525, in the example positioned around an open filter interior 526 (and a central cartridge axis X) although alternatives are possible, in extension between first and second end pieces (or end caps) 528, 529. It is noted that in FIG. 35, end piece 528 is positioned at an exit (in the example open) end of the cartridge 510, through which air (gas) can flow during operation. In FIG. 33, the cartridge 510 is positioned without certain portions of end piece (cap) 528 in place, so that preferred internal structural detail can be viewed. The portions of end piece (cap) 528 not depicted in FIG. 33 are, for typical applications of the principles described herein, molded-in-place portions, although alternatives are possible.

Typically then, and although alternatives are possible, at least a portion of end piece 528 is molded-in-place, with end **525*x* of the media 525 embedded therein; and, at least a portion of end piece 529 is molded-in-place, with end 525*y* of media 525 embedded therein. The media 525** can comprise pleated media, although alternatives are possible. The selection of the media and media form is a matter of choice for efficiency and usage lifetime concerns, and generally media and media features such as those discussed previously, or used in a variety of air (gas) filters, can be used.

The media 525 is shown positioned around an inner liner or central support 527, which, in the example depicted, includes an optional resonator/sonic choke arrangement 546 which may be generally as previously described for cartridge 25, FIG. 5.

End piece 529 is typically a closed end piece, as shown, and may generally correspond to end piece (cap) 42, FIG. 5.

End piece 528 is an open end piece with central air flow aperture 530 therethrough. End piece 528 includes a first, primary, seal arrangement 533 and an optional, secondary, seal arrangement 534. The optional secondary seal arrangement 534 may be configured generally analogous to seal arrangement 66, FIG. 5, discussed previously, although alternatives are possible, including ones described in later embodiments discussed below.

As with of the earlier described embodiment, primary seal arrangement 533 is configured in the example depicted as a radially outwardly directed radial seal or seal surface, positioned in axial overlap with the media. It can be alternately configured as a radially inwardly directed seal, however, if desired. The cartridge central axis is indicated at X, and radial direction in this context is meant to indicate a direction toward (if inward) or away from (if outward) axis X.

Also, as with the earlier described embodiment, typically the primary seal arrangement 833 is a "non-clamp", "non-clamping" or "clampless" seal arrangement, in that no additional clamp is provided which needs to be tightened, to provide secured engagement and sealing. Rather, the seal establishes upon appropriate and proper installation of the cartridge 510 within a housing.

Figure 37:
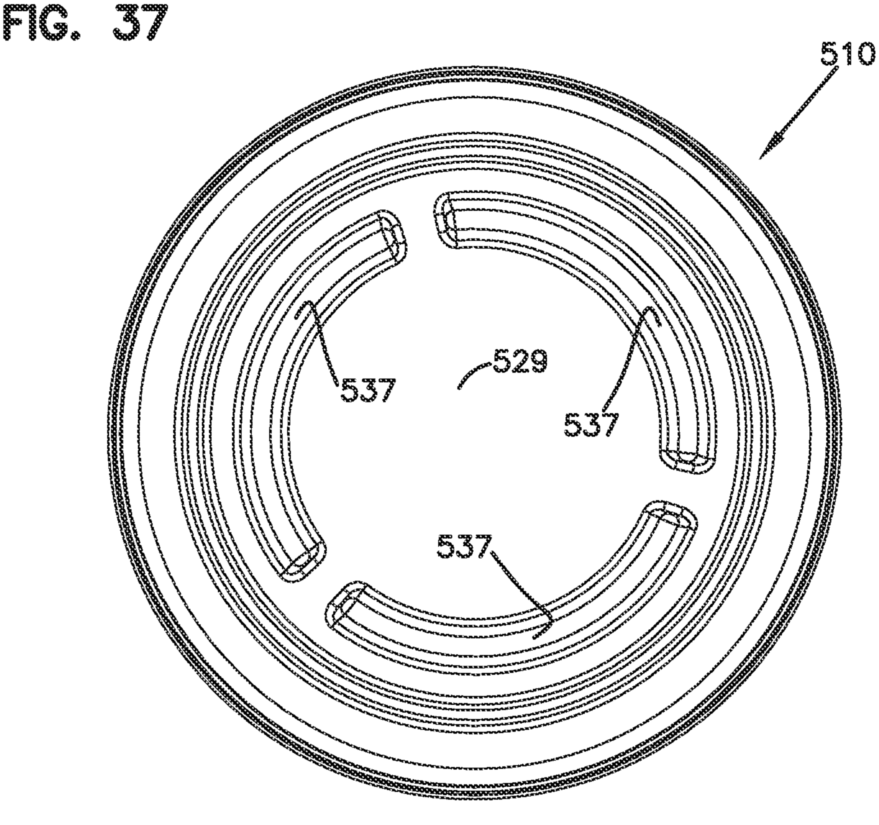
FIG. 37 is a schematic closed end perspective view of the filter cartridge of FIG. 35.

Referring to FIG. 37, closed end piece 529 is depicted with a bumpers 537 analogous to bumpers 464 (FIG. 29) previously described. The end piece 529 is also viewable in the bottom perspective view of FIG. 34.

Figure 34:
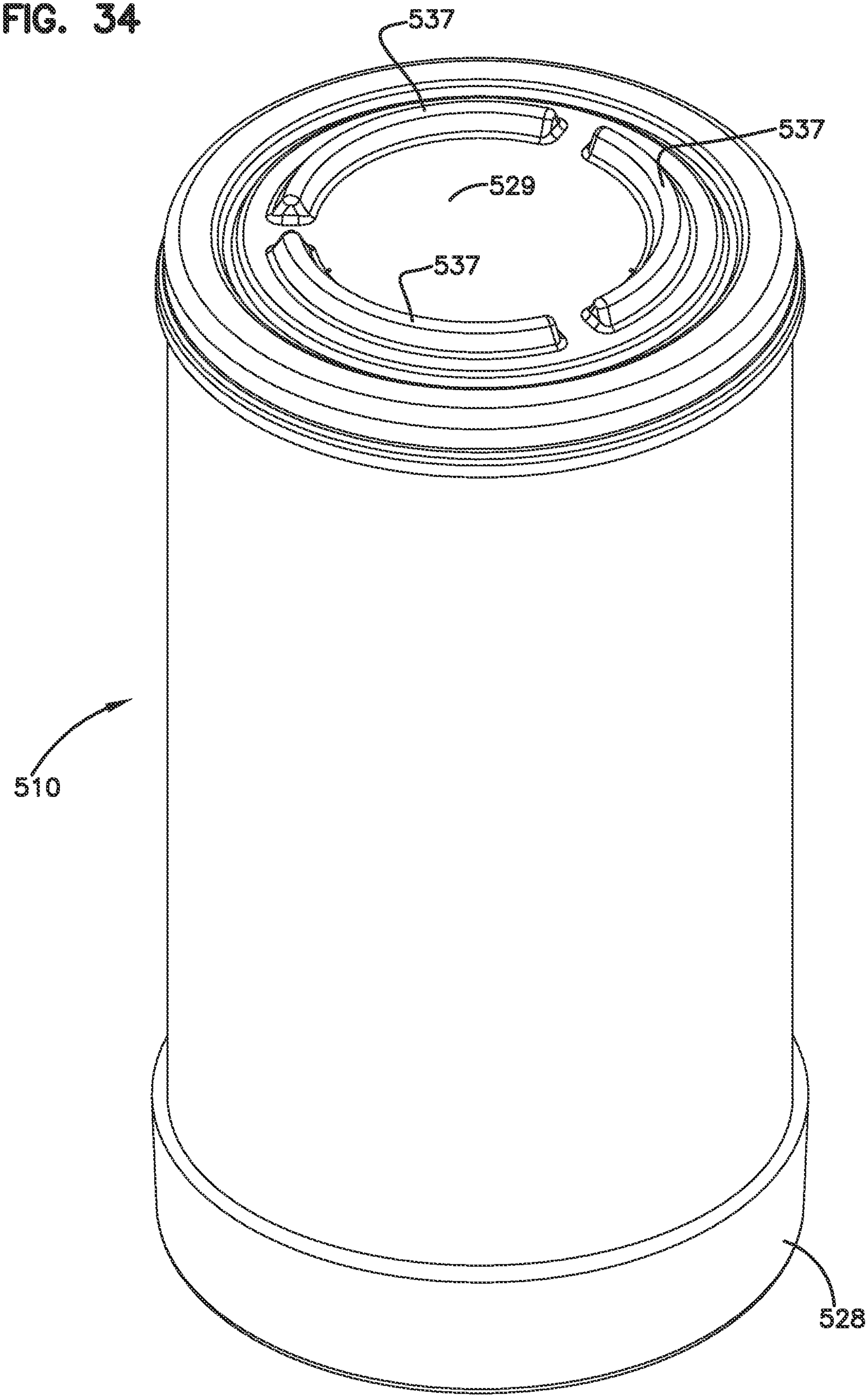
FIG. 34 is a schematic, closed end view of a filter cartridge using the assembly of FIG. 33.
Figure 34A:
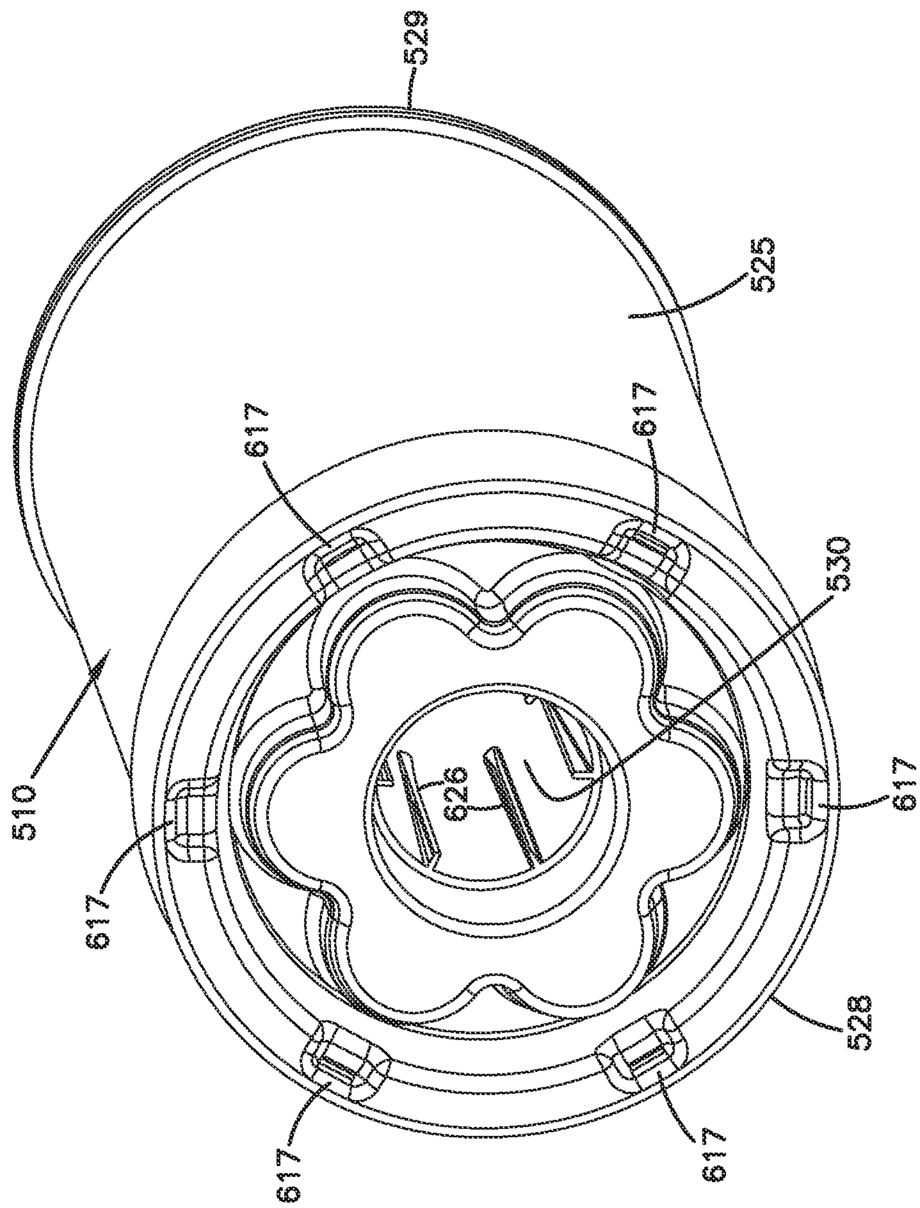
FIG. 34A is a schematic outlet end perspective view of the filter cartridge of FIG. 34.

In FIG. 34A, an isometric view of cartridge 510 is provided, the view being generally toward end piece 528 and aperture 530

Figure 36:
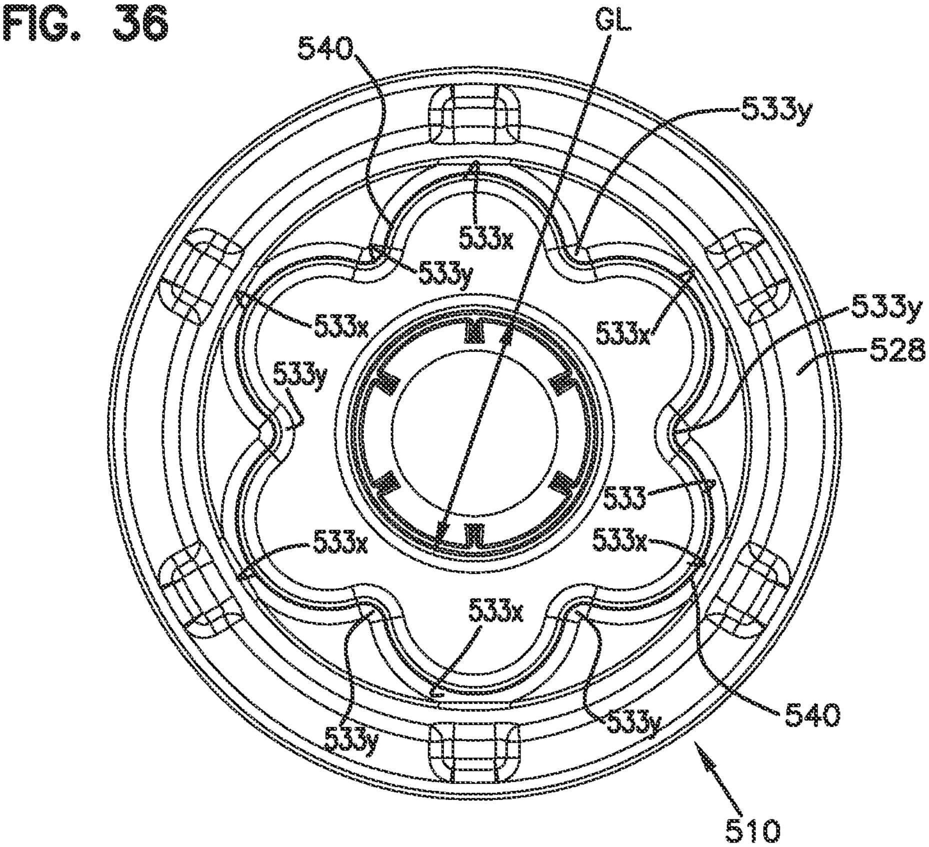
FIG. 36 is a schematic open end plan view of the filter cartridge of FIG. 35.

Attention is now directed to FIG. 36. FIG. 36 is an end view of cartridge 510 taken generally toward end piece 528. At 533, the radially directed housing seal (or seal surface) that forms the primary seal arrangement is shown. Again, it is noted that for the particular example depicted, the housing radial seal 533 is directed generally radially outwardly, with respect to a cartridge central axis X, FIG. 35, although alternatives are possible.

Referring to FIG. 36, for the example cartridge 510 depicted the primary seal 533 comprises a seal surface defining a non-circular configuration. It is preferably a configuration having alternating outwardly projecting (in the example outwardly directed convex) sections or lobes 533*x* spaced by, in the example non-straight, (typically inwardly projecting and in the example curved, concave) sections 533*y*. The particular number of outwardly projecting (in the example curved, convex) seal surface sections 533*x* and inwardly projecting (in the example curved, concave) sections 533*y* is not critical to obtaining at least some advantage. Typically, the number of each will be at least two; usually at least three, sometimes 4-8, inclusive, and often each and preferably will be a number within the range of 4-10, for example 6-8, inclusive, although alternatives are possible.

In alternate definitions, the seal surface 533 can be characterized as comprising a plurality of spaced lobes or radially outwardly projecting (for example convex) sections 533*x*, spaced from one another by (in the example non-straight, for example concave) sections 533*y* of surface 533. Typically, there are at least two such outwardly projecting lobes or sections, usually at least three, sometimes 4-8, inclusive, and often and preferably an amount within the range of 4-10, inclusive (for example, 6-8, inclusive) although alternatives are possible.

Still referring to FIGS. 35 and 36 surrounding the primary seal member or surface 533 is provided recess, receiver or receiving groove 540. The recess, receiver or receiving groove 540 is a receiver positioned and defined to receive, projecting therein, a portion of the housing end 511 and tube 512, analogously to groove 73, see FIG. 3A.

For the particular cartridge 510 depicted, the recess, receiver or receiving groove 540 is configured with an inner wall forming surface 533 that is preferably non-circular in definition as described. Preferably, the outer wall 541 of the groove 540, FIG. 35, is generally circular in definition around central axis X, although alternatives are possible.

Figure 38:
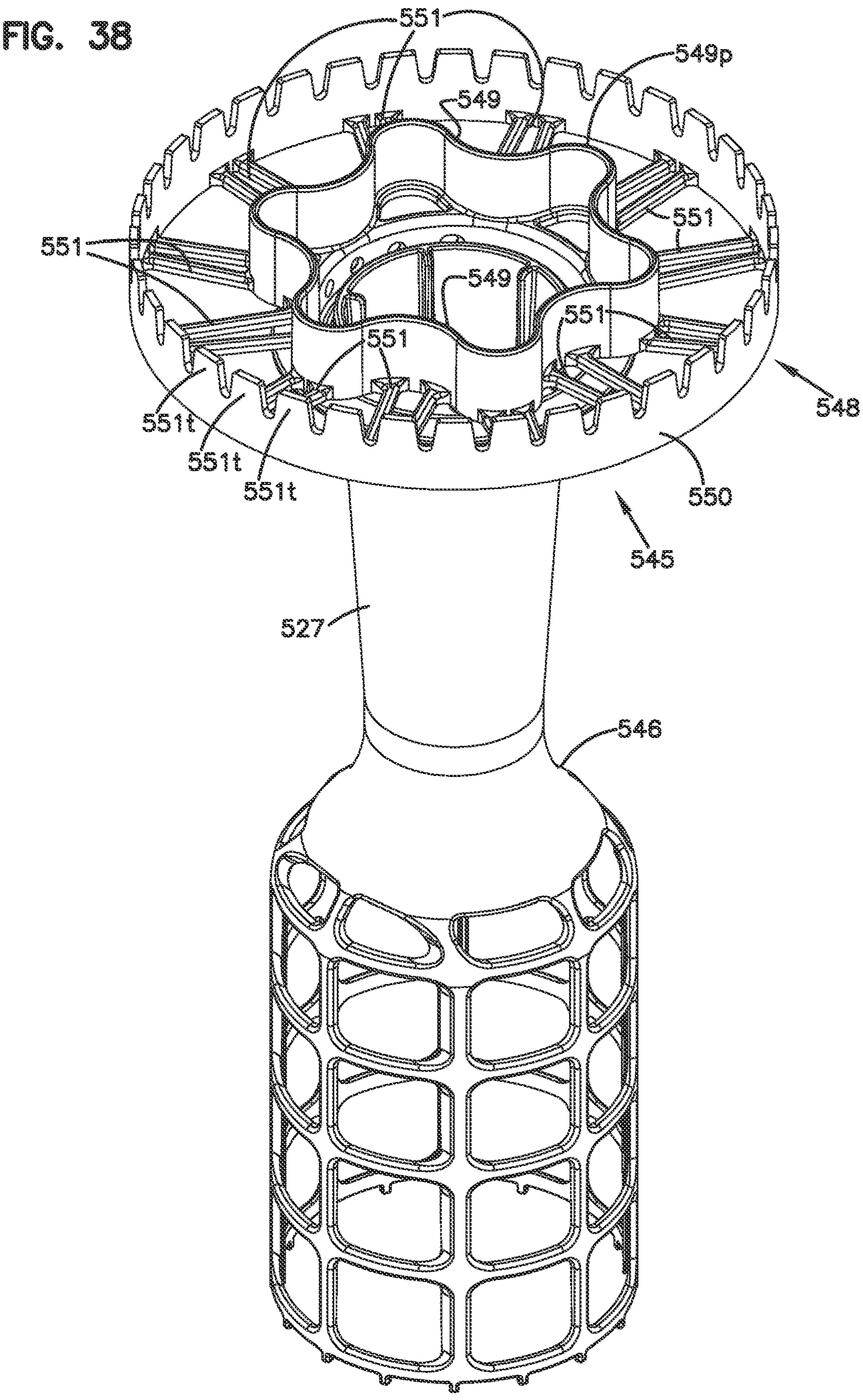
FIG. 38 is a schematic outlet end plan view of an internal component of the filter cartridge of FIG. 35.

In FIG. 38, a central support 545, for cartridge 510 is shown. The support 545 can be made and used as support 527, FIG. 35. It can be analogous to support 90, discussed above in connection with FIGS. 9-16 for the embodiment of FIGS. 1-32, except as modified to accommodate the non-circular seal 535. In the example depicted, the support 545, in part, defines optional sonic resonator/choke 546.

Referring to FIG. 38, support 545 includes an end structure 548 comprising an inner seal support or hub 549 spaced from, and surrounded by, outer support 550, secured by struts or open grid work arrangement 551. The support 549 will be embedded in the end piece 528 (and seal arrangement 533) in use, providing support for controlled compression in installation. Thus, support 549 operates in many ways analogously to support 105, FIG. 9. The particular hub 549 depicted, includes a continuous wall having a non-circular shape preferably comprising a plurality of radially outwardly projecting (in the example curved) lobes or seal support sections 549*x* alternating with radially inwardly projecting (in the example curved) seal sections 549*y*. (Alternatively, in the example depicted hub 549 can be characterized as non-circular and comprising a plurality of lobes 549*x* separated by, in the example non-straight, radially inwardly projecting sections 549*y*). Characterizations of various usable hub shapes for hub 549 are discussed in more detail below.

The number of radially outwardly projecting (for example curved or convex) sections 549*x* and inwardly directed (for example curved or concave) sections 549*y* when the shape is as shown, is appropriate for the seal configuration involved. Thus, there are typically at least two of each, usually at least three of each sometimes 4-8, inclusive, and often and preferably an amount within the range of 4-10, inclusive, for example 6-8 inclusive, of each.

Referring to FIG. 38, it is noted that the in the example depicted the non-circular seal support section of hub 549 is solid and continuous, i.e. does not have lateral apertures therethrough in extension axially beyond struts 551 toward tip 549*p*. This will be typical, although alternatives are possible.

The outer support 550 and struts 551 may be generally analogous to support 108 and struts 110, FIG. 9.

It is again noted that support 545 includes an optional sonic choke arrangement 546 in the arrangement depicted, typically analogous to the sonic choke arrangement described with respect to FIG. 10.

Figure 39:
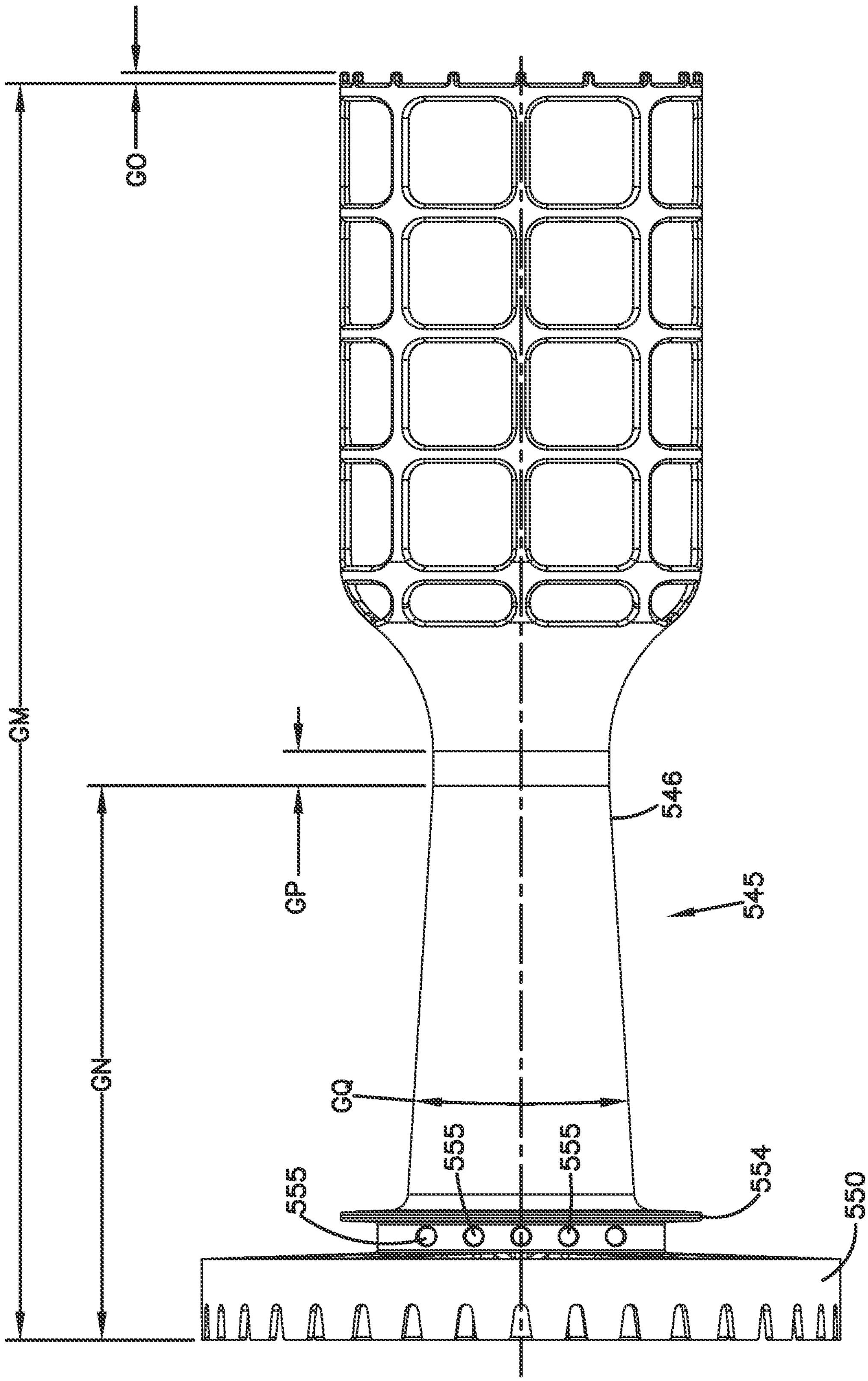
FIG. 39 is a schematic side elevational view of the component of FIG. 38.

In FIG. 39, a side elevational view of support 545 is depicted. Ring 554 is viewable, analogous to ring 125 FIG. 10. Flow apertures 555 for resin, analogous to flow apertures 121 are depicted. In sum, referring to FIG. 39, the example support 545 depicted is generally analogous to support 90 except for the specific configuration of the inner support (or hub) 549, FIG. 38.

Figure 40:
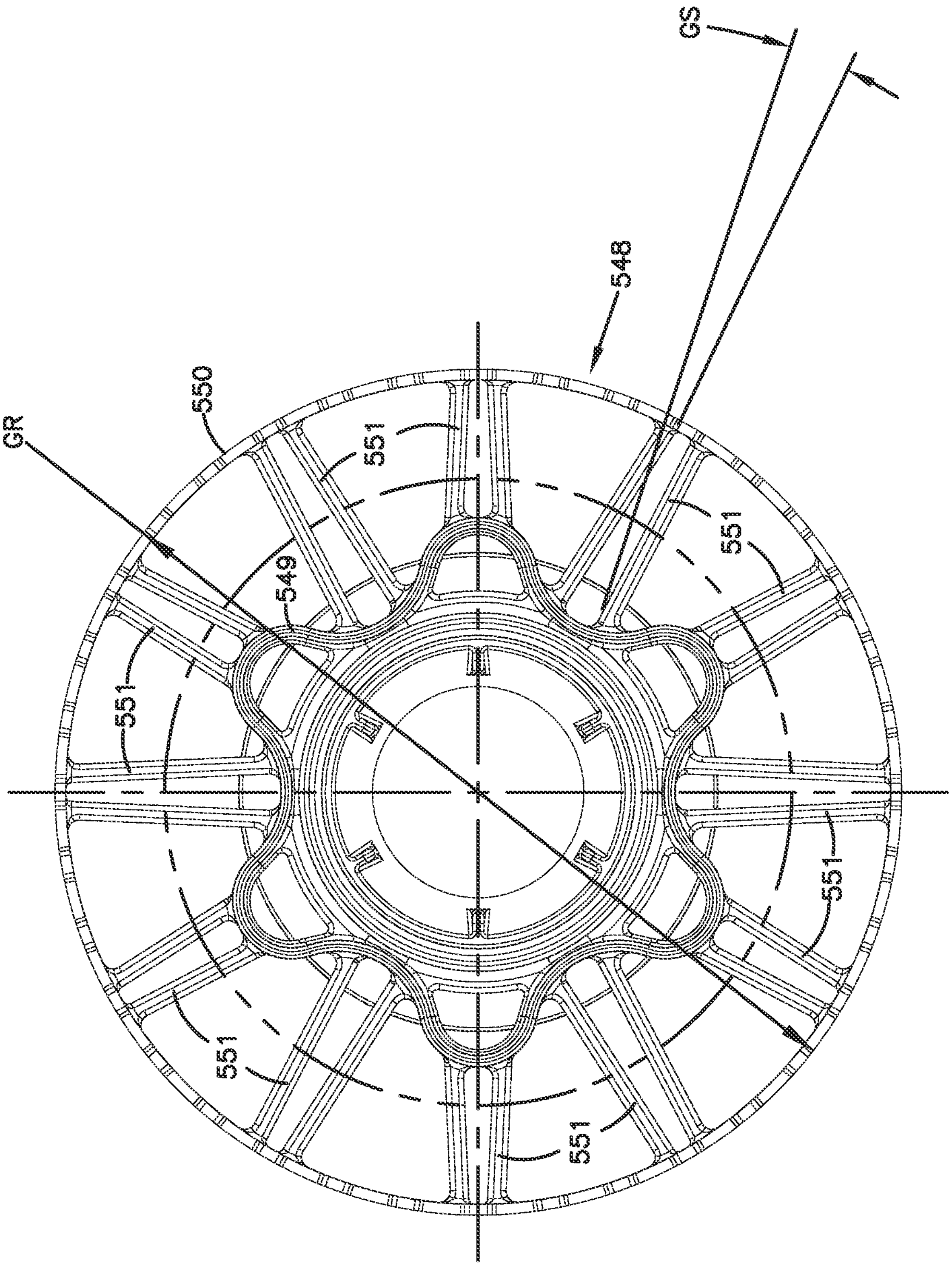
FIG. 40 is a schematic outlet end plan view of the component of FIG. 38.
Figure 41:
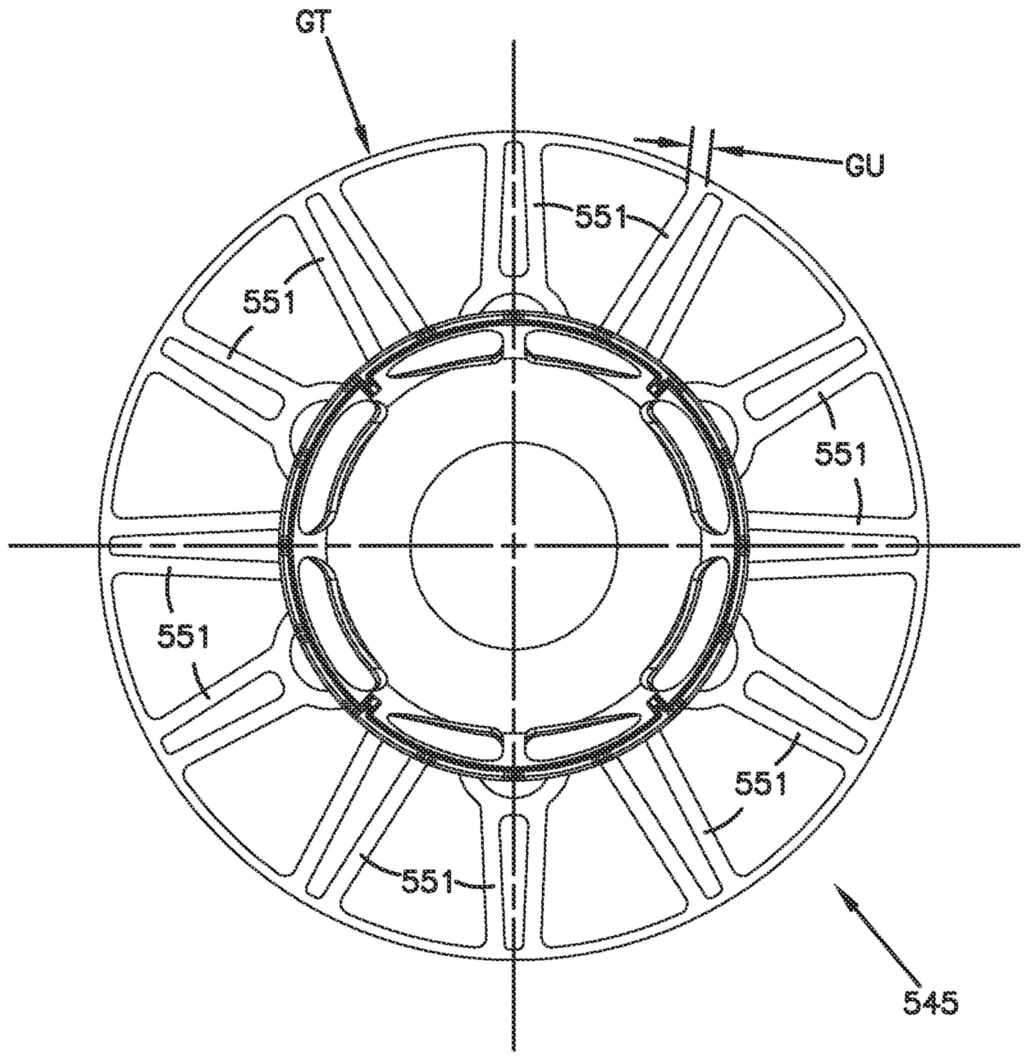
FIG. 41 is a schematic end view of the component of FIG. 39; the view of FIG. 41 being taken toward and opposite end of that shown in FIG. 40.

In FIG. 40, an end view of structure 548 is viewable. In FIG. 41, an opposite end view of support 545 is viewable.

Figure 42:
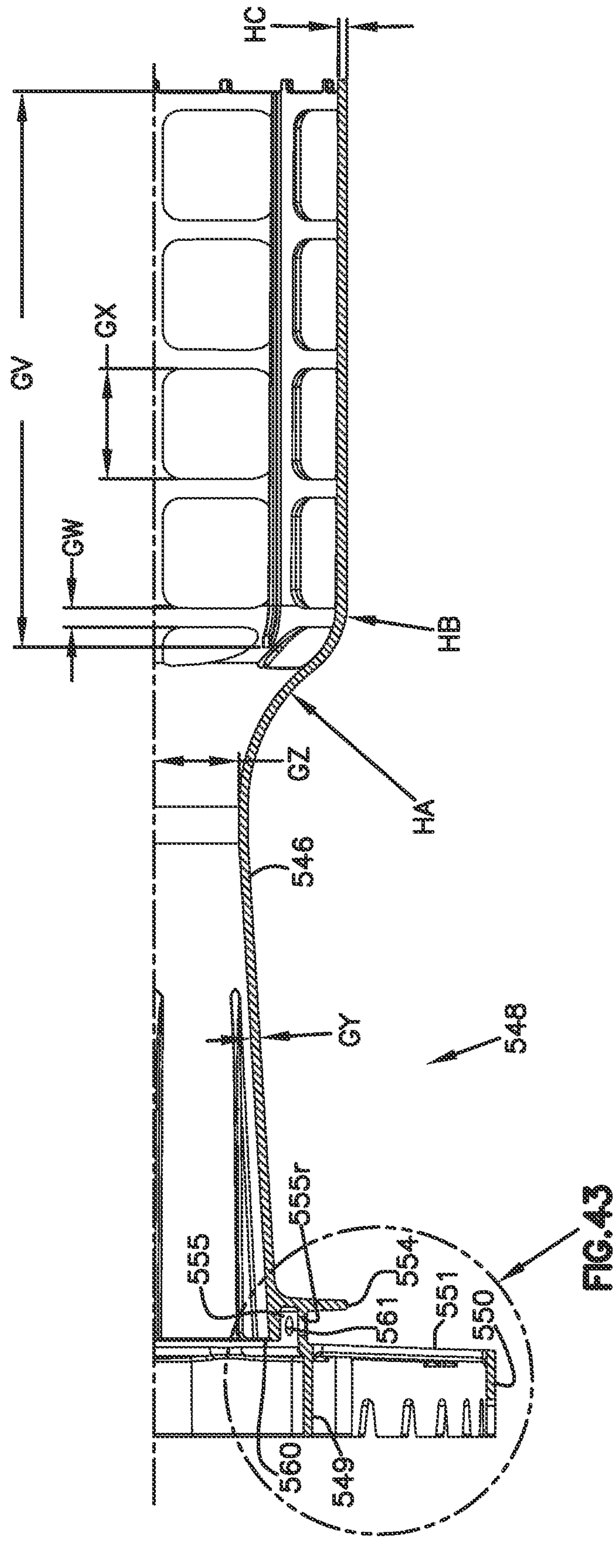
FIG. 42 is an enlarged fragmentary schematic cross-sectional view of the component depicted in FIG. 39.

In FIG. 42, an enlarged fragmentary cross-sectional view of support 548 is depicted. It can be seen that the support section 548 includes an inner axial flange 560 defining a trough 561 analogously to flange 120 and trough 120*e*, FIG. 16. The aperture 555 provides for resin flow into trough 561.

Figure 43:
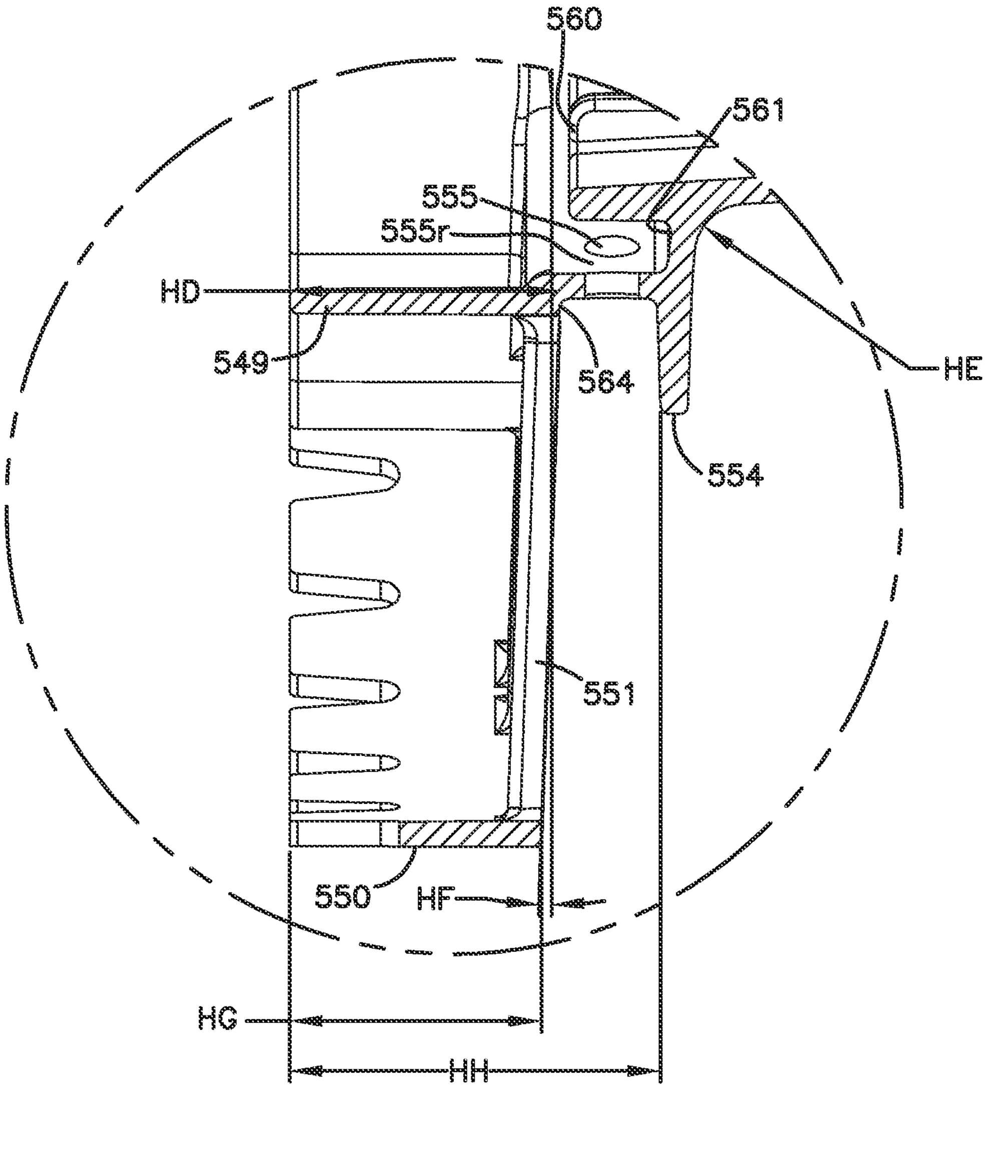
FIG. 43 is an enlarged fragmentary schematic cross-sectional view of an identified portion of FIG. 42.

In FIG. 43, an enlarged fragmentary view of a portion of FIG. 42 is viewable. A radially inward region of the struts 551, analogous to portion 128, FIG. 16, is shown at 564. Also, it can be seen that strut 551 is extended at an angle HF relative to a plane perpendicular to central axis X of greater than 0° and generally analogous to the angle discussed above in connection with FIG. 16 at CS. Referring to FIG. 33, a slanting of the struts 551 away from the media 525*x* and in extension radially outwardly is viewable. It is noted that in FIG. 33, the media 525 is not shown abutting any portion of the grid arrangement 551. It is expected, however, that on the radial innermost portion, there may be some axial contact between the two, in some instances.

Figure 44:
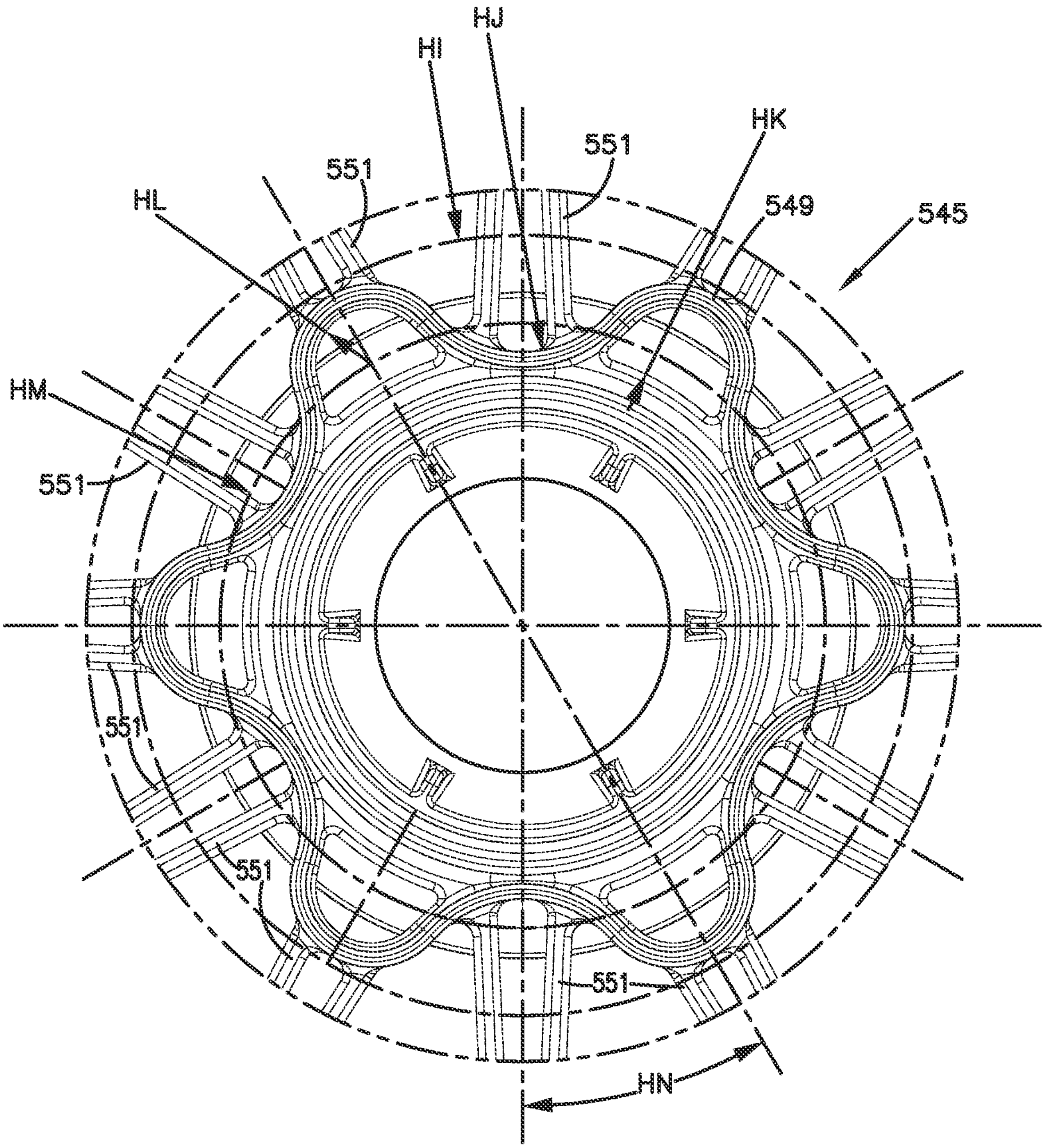
FIG. 44 is a schematic fragmentary plan view of a portion of FIG. 40.

In FIG. 44, a fragmentary view of support 545 is depicted.

Figure 45:
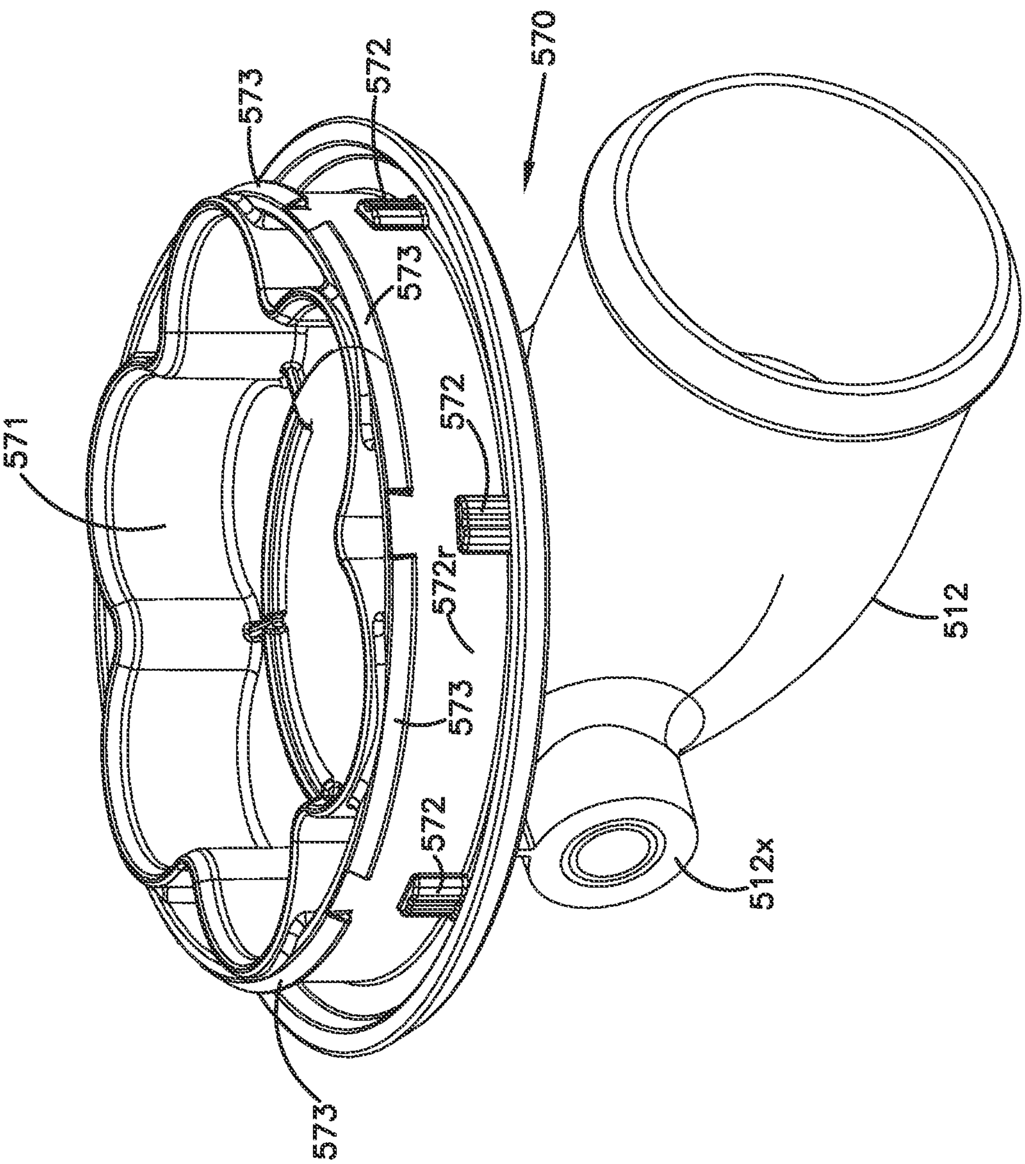
FIG. 45 is a schematic perspective view of an outlet tube component usable with the assembly of FIG. 33.

In FIG. 45, a flow (in the example outlet) tube construction 570 is depicted, having outlet tube 512 thereon, along with pressure tap 512*x*. The outlet tube 512 includes a seal surface 571, in the example directed comprising a radially inwardly directed seal surface against which seal 533 will form a radially outwardly directed seal, when cartridge 510 is engaged. In many other manners, tube arrangement 570 can be generally analogous to tube arrangement 15, FIG. 22. It is noted that projections 572, for rotational interlock with the housing 502, mounted on ring 572*r* differ in shape, number and location from section 228, FIG. 22. This is discussed further below.

In FIG. 45, tube construction 570 is viewed as having a plurality of radially spaced snap-fit cam projections 573 radially positioned on ring 572*r*. The ring 572*r* is a portion of the tube construction 570 that is pushed into the receiver aperture and a housing section in use. Projections 573 will provide a snap-fit when this occurs, inhibiting separation.

Figure 46:
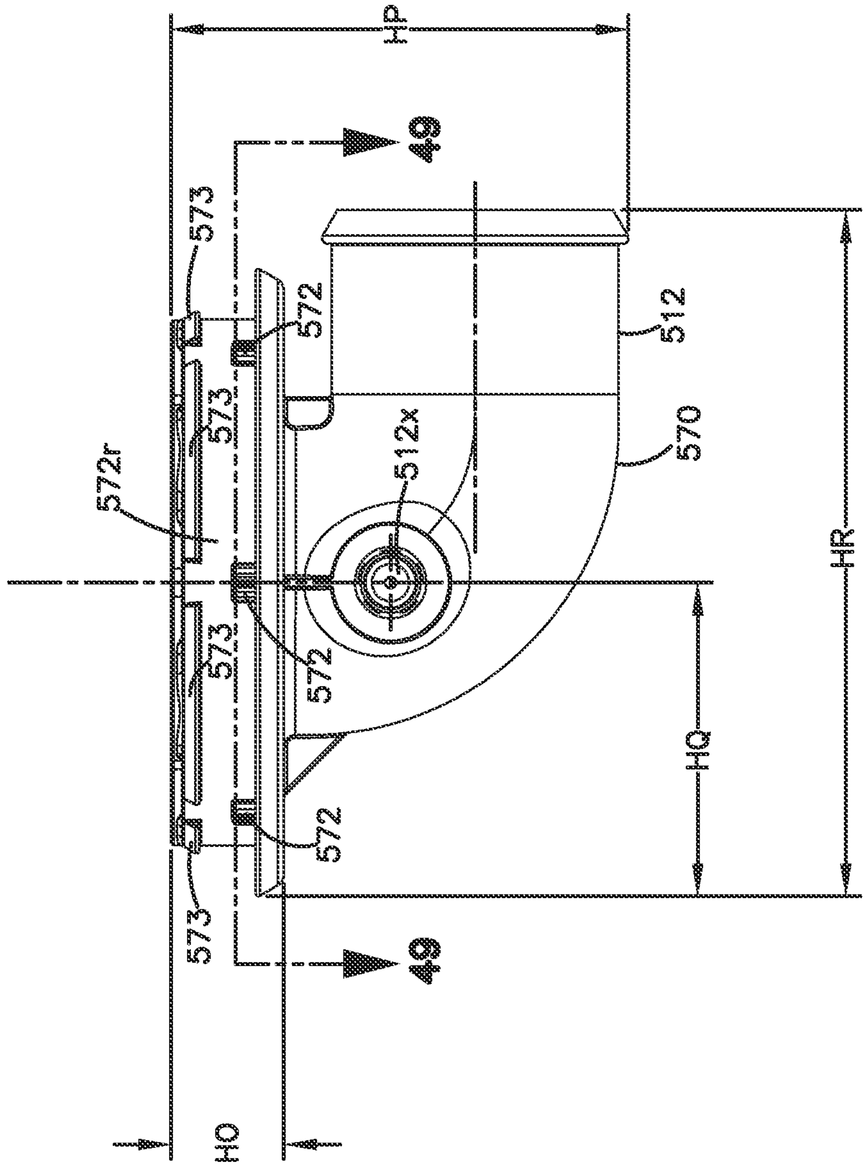
FIG. 46 is a schematic side elevational view of the outlet tube of component of FIG. 45.
Figure 47:
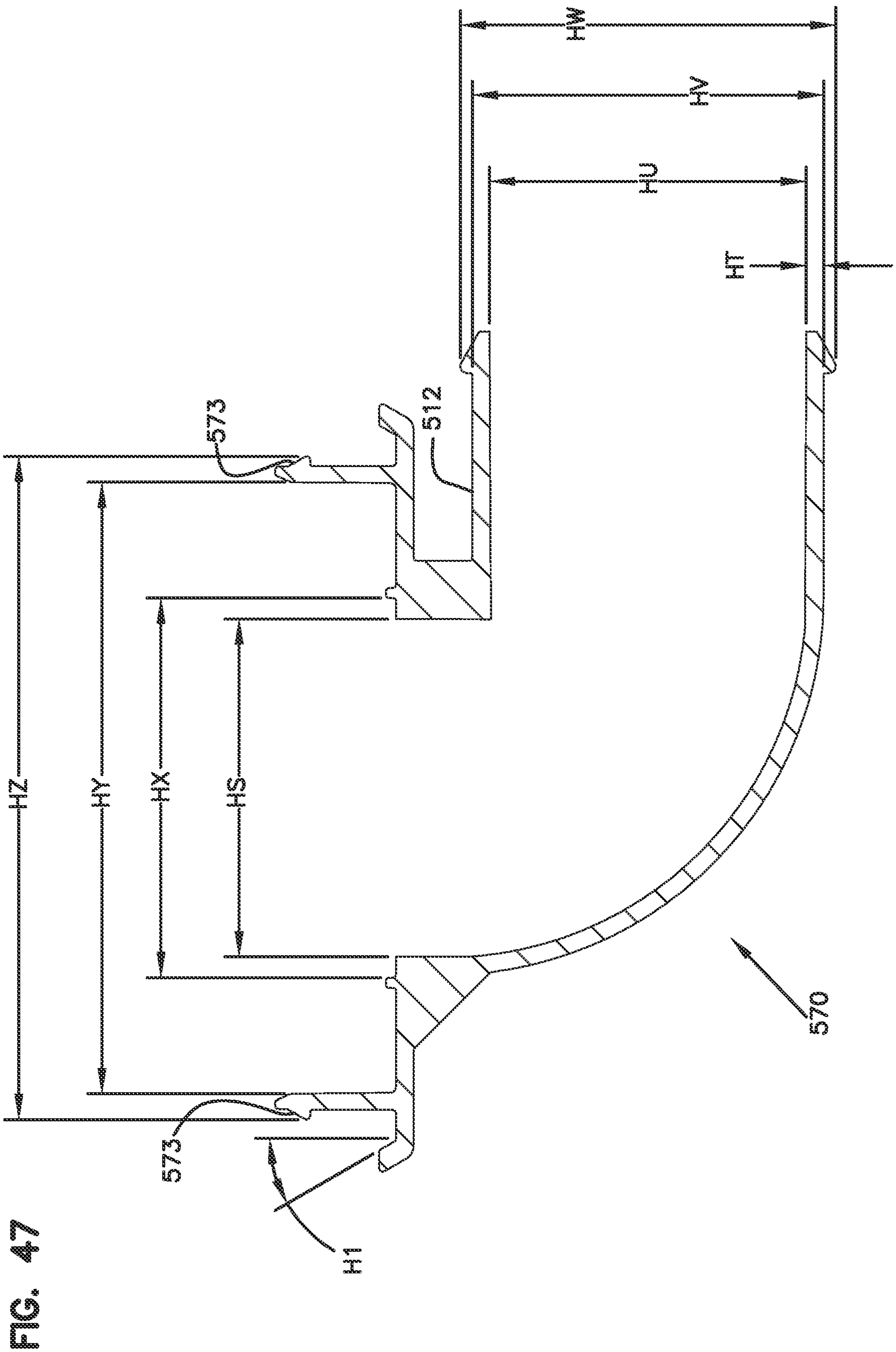
FIG. 47 is a schematic side cross-sectional view taken of the component of FIGS. 45 and 46, taken generally along line 47-47, FIG. 48.
Figure 48:
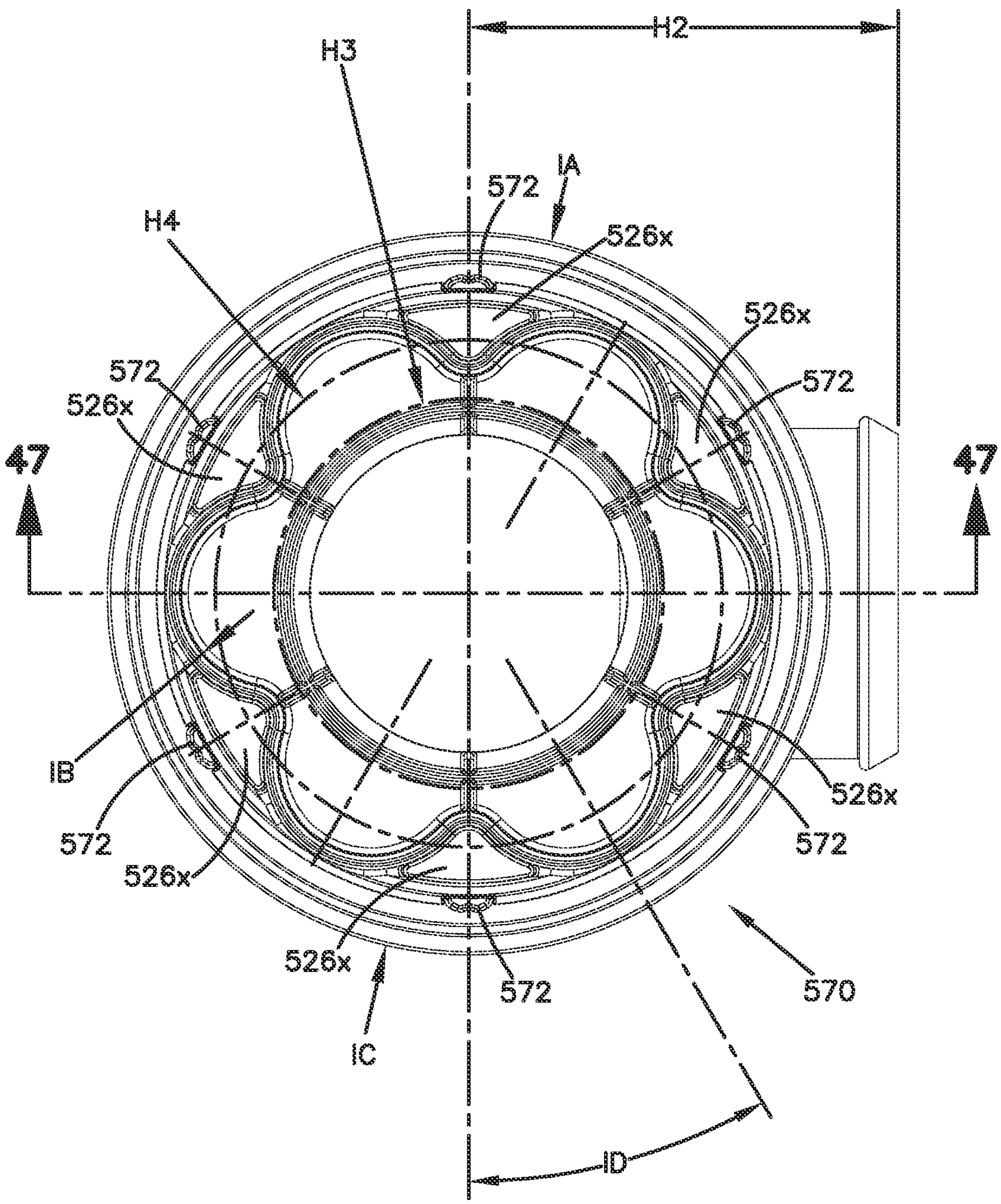
FIG. 48 is a schematic end plan view of the component depicted in FIGS. 45 and 46.
Figure 49:
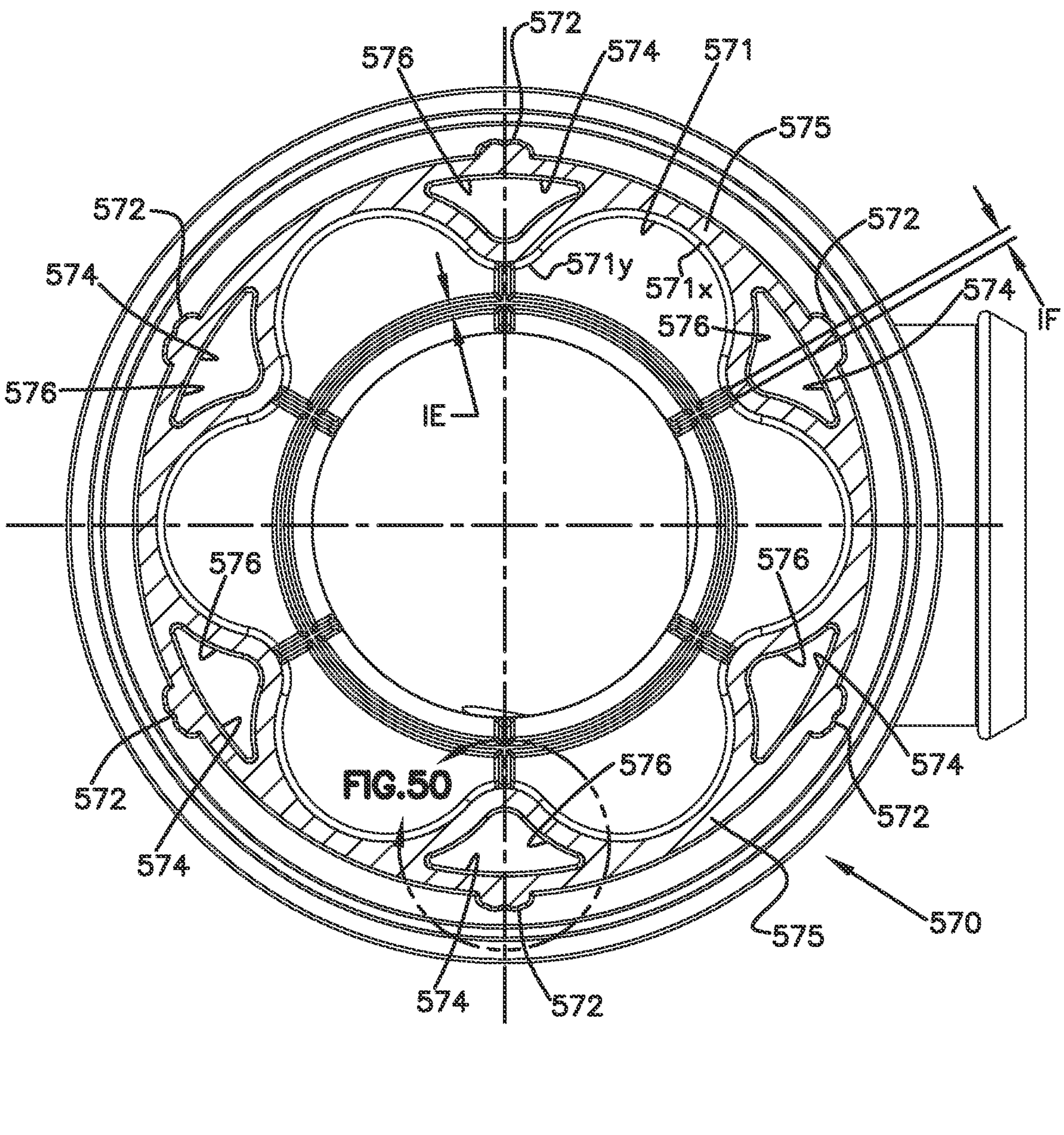
FIG. 49 is a schematic cross-sectional view taken generally along line 49-49, FIG. 46.
Figure 50:
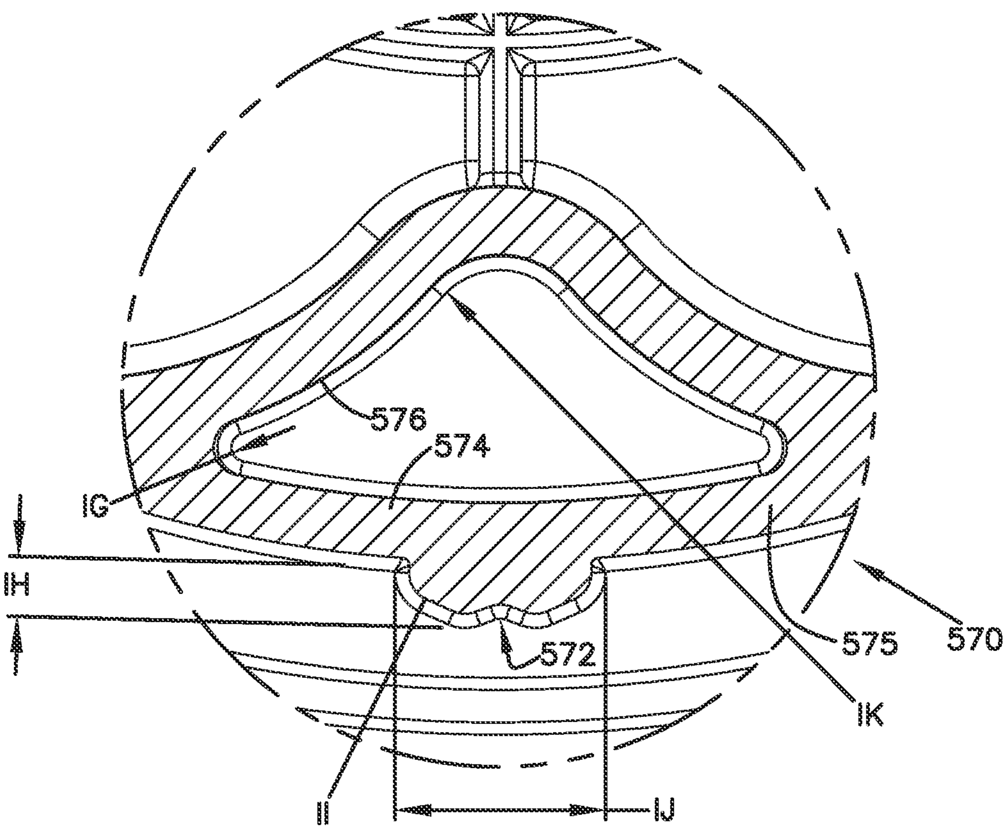
FIG. 50 is an enlarged schematic fragmentary view of an identified portion of FIG. 49.

In FIG. 46, a side elevational view of tube construction or arrangement 570 is depicted. In FIG. 48 a top plan view of the tube construction 570, FIG. 46, is shown. In FIG. 47, a cross-sectional view taken generally along line 47-47, FIG. 48 is depicted. In FIG. 49, a cross-sectional view taken generally along line 49-49, FIG. 46 is depicted. In FIG. 50, an enlarged fragmentary view of an identified portion of FIG. 49 is shown.

Attention is directed to FIG. 49. It is noted that individual projections 572, in the example tube 570 depicted, are each positioned in radial alignment with a thin extension 574 of wall 575; in each instance radially aligned with a hollow section 576. This allows for some spring effect as tube 570 is rotated and projections 572 engage a toothed housing section, to facilitate rotational lock of section 570 in a housing 502. Also, it helps avoid any deformation that might occur in the regions 574, either during formation or under pressure from the projections 572, from affecting the shape of seal surface area 571. For example, it is important that surface 571 be properly molded, during plastic molding of tube 570. The hollows 526 facilitate even cooling to get minimal distortion in surface 571. In FIG. 50, one of the hollow sections 576 is readily viewable in detail.

In general, for the cartridge 510 depicted in FIG. 35, the housing seal 533 is a non-circular side surface of a groove 540, and is shaped to have a plurality of alternating seal surface sections that are either radially outwardly projecting or inwardly projecting (in the example depicted curved) creating a seal perimeter that is non-circular and comprises alternating outwardly projecting and inwardly projecting sections. Referring to FIG. 49, when a cartridge 510 is installed, the cartridge seal arrangement 533 is pressed into sealing engagement (by radial seal) with a similarly shaped seal support 571 in the housing, without a separate clamp. In the particular example depicted the seal housing surface 571 is formed as part of an outlet tube construction 570.

In the example cartridge 510, the primary seal arrangement is configured as the radially inside surface or wall (outward facing surface 533) of recess, receiver or receiving groove 540 in the end cap 528, FIG. 35. The recess, receiver or receiving groove 540 is configured to receive projecting therein, not only the portion of the outlet tube into which sealing occurs, but also a portion of the housing sidewall snap-fit to the tube. Thus, a joint in the housing, between the outlet tube section 570 and the housing end wall 511, is received in the groove 540 of the cartridge 516, see FIG. 33.

By a comparison of FIGS. 36, 38 and 49, it can be understood that when the seal configuration comprises alternating radially outwardly projecting sections 533*x* and inwardly projecting sections 533*y*, and the housing seal surface 571 (FIG. 49) also comprises alternate outwardly projecting sections 571*x* and radially inwardly projecting sections 571*y*, the surface sections 571*y* can project in between outwardly segments 533*x* of the seal arrangement 533. This can help lock the seal arrangement 533 rotationally. Further, it provides for a secure, unique feel to the installer of the cartridge 510, helping the installer tell that the cartridge 510 is properly installed and fully sealed. This facilitates installation without leaving a leak path in the primary seal 533. It is especially convenient when the number of segments 533*y* is at least 4, since proper engagement occurs with relatively little cartridge rotation.

It is noted that the primary seal 533 is all that is required in some applications. However, advantage can be obtained from having a secondary seal in some instances. This is discussed in the next portion of this section.

Referring to FIG. 35, the cartridge 510 includes a secondary seal 534, FIG. 35 that engages a housing sidewall. The secondary seal 534, similarly to the second seal 65 and seal surface 66, FIG. 4, can be supported by an optional seal support 581 on the cartridge 510, embedded in the end cap material. This optional support is provided by optional support 550 on structure 545, FIG. 38.

Optional support 550 includes optional spaced tabs 531*t*, similarly to the support, of the embodiment of FIGS. 1-32. Indeed, for the configuration of the primary seal 533, the arrangement of FIGS. 33-50 is generally analogous to the arrangement of FIGS. 1-32.

A number of advantages are provided by the seal configuration depicted, for the primary seal 533. Again, the (outlet) tube 570 cannot be very radially rotated relative to the housing body 503, once the tube 570 engaged by the cartridge 510. Thus, a more secure seal can be obtained not subject to rotational stresses and forces.

Further, the multi-lobe or multi-projection seal is "self-aligning" because parts of the (typically curved) sealing surfaces on the various lobes or projections face partially and circumferentially in a tangential direction. That is, portions of the seal surface 533 are not directed perfectly radially. Thus, as the seal 533 is pushed in place, any imbalance in pressure on the lobes (projections) will cause the seal to rotate a little and self-correct for any misalignment. The seal 533 is still referenced as radial, since the sealing compression is still greatly toward or away from axis X, as opposed to being in axial alignment therewith (i.e. in the longitudinal direction of axis X).

In addition, as discussed above, the unique configuration of the seal 533 can help the service provider ensure that a proper cartridge 510 for the system has been selected, and it will be fairly straight forward to recognize when the cartridge is not properly installed, since the components can be selected such that inhibition to closing the access cover will result until the cartridge lobes properly align with the outlet tube lobes.

It is noted that further discussion regarding possible seal configurations and seal advantages is provided herein below.

Attention is now directed to FIG. 51, a side elevational view of assembly 500. In FIG. 51, the housing 502 can be seen as comprising section 503 and access cover 504 secured together by latch arrangement 505. Also viewable if that the outlet tube 512 can comprise a portion of tube 570, the inlet 521 and the ejector tube 514. Attention is directed to the cross-section line 52-52, which, it will be understood from further discussion below, is taken through a portion of the housing section 503, the outlet tube 512 and the cartridge 510.

Figure 52:
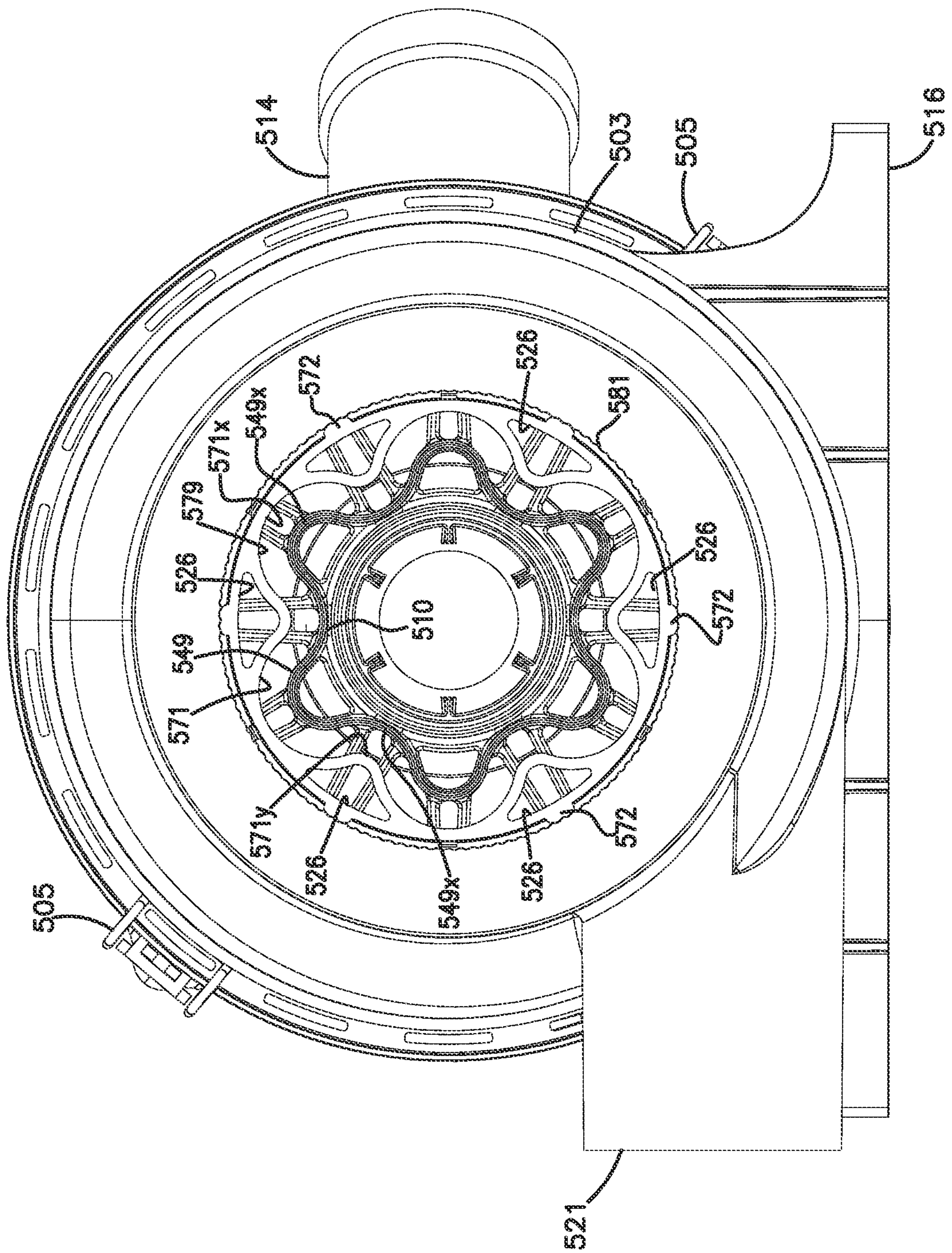
FIG. 52 is a schematic cross-sectional view taken generally along line 52-52, FIG. 51.

Attention is directed to FIG. 52. FIG. 52 is drawn showing portions of the cartridge 510 aligned with portions of the housing section 503, where sealing will occur. However, it is noted that the molded-in-place portions of end cap 528 are not depicted in FIG. 52, so structural detail can be viewed.

First, referring to FIG. 52, attention is directed to seal surface 571 and hub 549. It will be understood that the space 579 between the two, can be filled by the material forming seal surface 533, i.e. part of the molded-in-place portions of end piece 528. It can be seen that the outwardly directed projection(s) 549*x* on the hub 549 are aligned with outwardly projecting regions 571*x* on surface 571; and, the inwardly projecting region(s) 549*y* on the hub 549 are aligned with inwardly projecting regions 571*y* on the wall 571. Further, it can be seen that rotational interference will occur, preventing rotation. Also, it will be seen that as the cartridge 510 is inserted into the sea surface 571 should some misalignment occurs, as the service provider rotates the cartridge 510 slightly, that service provider will feel the seal as it locks into proper engagement.

Also, referring to FIG. 52, engagement between individual ones of the projections 572 in a ratchet or resistance manner, with toothed or ratchet surface or region 581 in the housing section 503 can be seen. This is discussed in further detail below.

Figure 53:
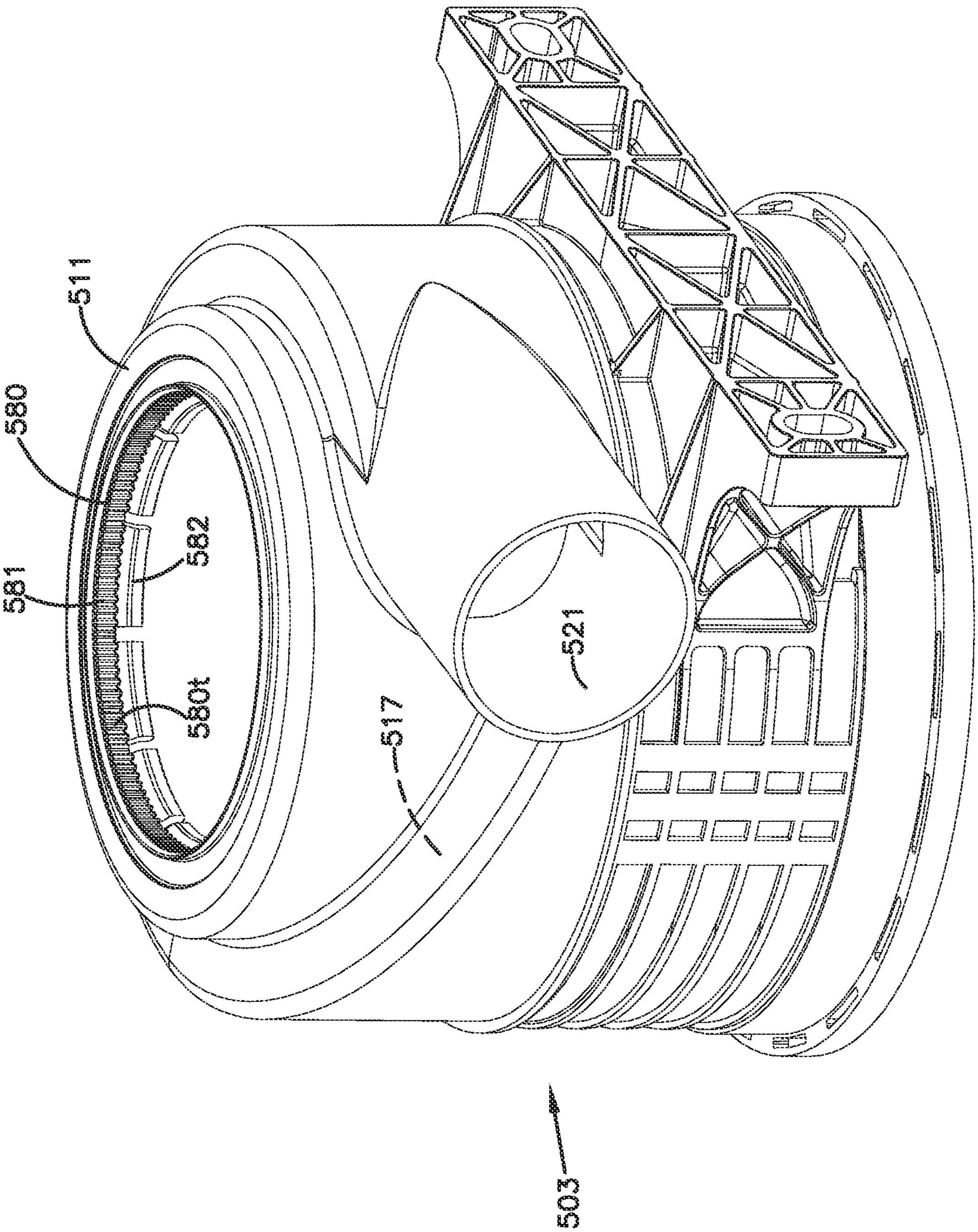
FIG. 53 is a schematic perspective view of a housing component of the assembly of FIG. 51.

In FIG. 53, a perspective view of housing section 503 is shown. At end 511, aperture 580 is depicted. The aperture 580 includes a portion 580*t* lined with notches, teeth or ratchet structure 581 and flex tabs 582. As the tube structure 570, FIG. 45, is inserted into aperture 580, members 572 will engage teeth 581 to help secure the tube 570 in a selected rotational orientation. Flex tabs 582 will help provide for a snap-fit affect, as will members 573, FIG. 46. It is noted that the tube can be rotated manually to overcome the ratchet effect, during initial installation, so that when an elbow tube 512 is used, it can be rotated as desired. Once the cartridge 510 is installed, however, it tends to lock the tube 570 in a particular rotational orientation. This is, in part, due to the effect of the perimeter or secondary seal on 534, on the cartridge 510 as discussed above, engaging a sidewall section of the housing section 503. Also, inhibition of rotation of the tube 570 will result from axial pressure on the cartridge 510 driving it against end 511, as the access cover 504 is put in place.

Figure 54:
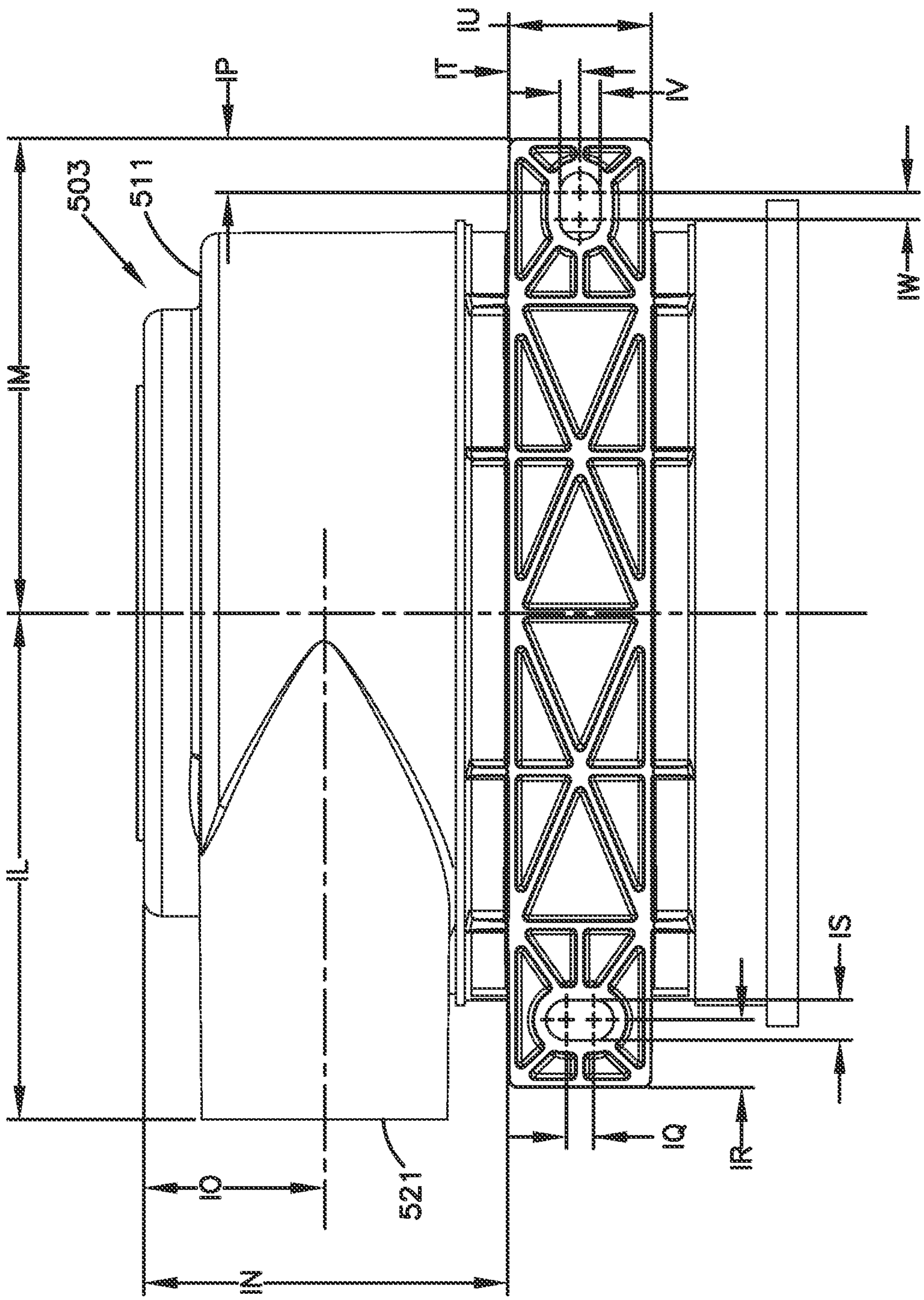
FIG. 54 is a schematic plan view of the housing component of FIG. 53.
Figure 55:
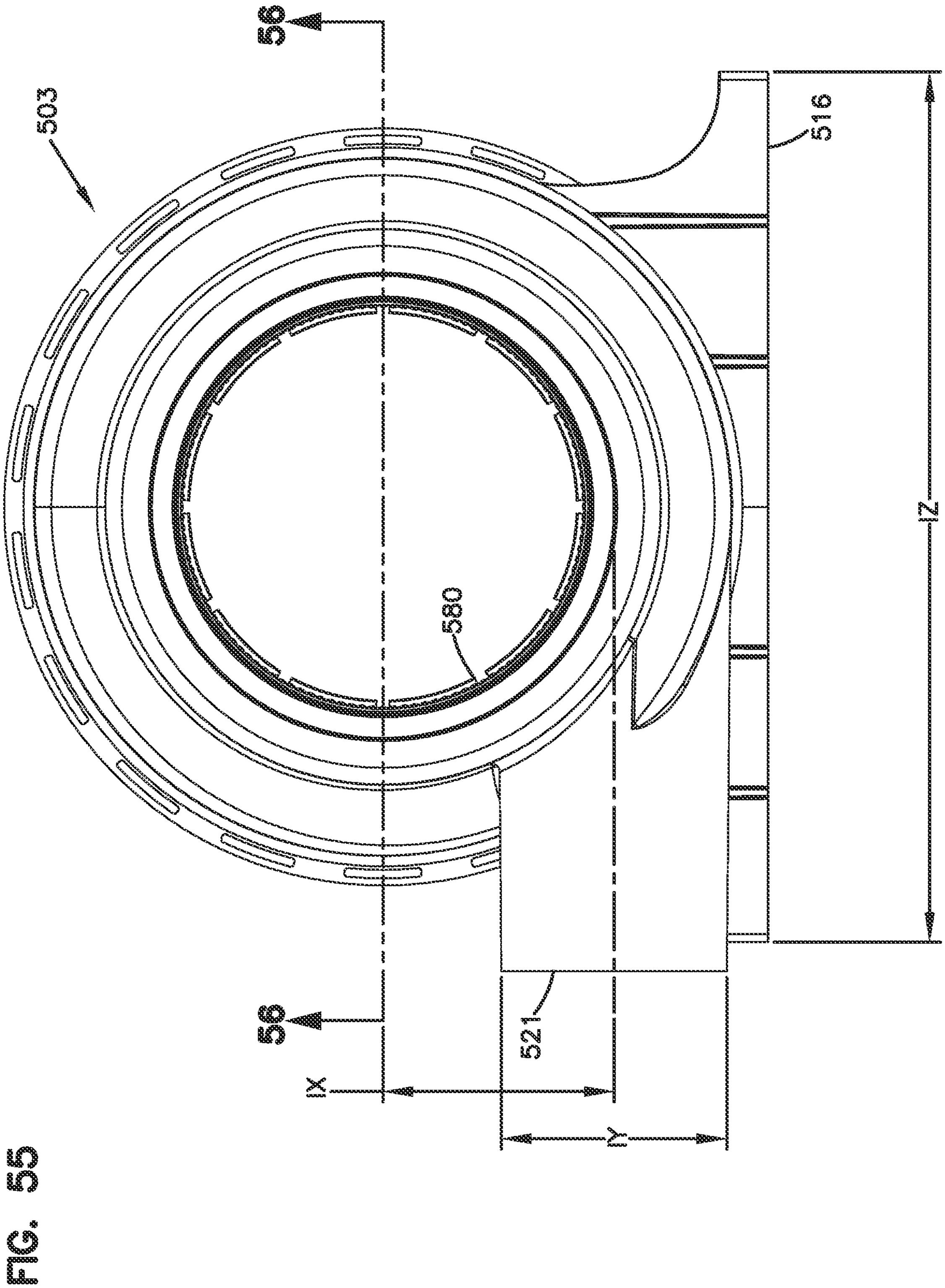
FIG. 55 is a schematic end plan view of the housing component of FIG. 53.
Figure 56:
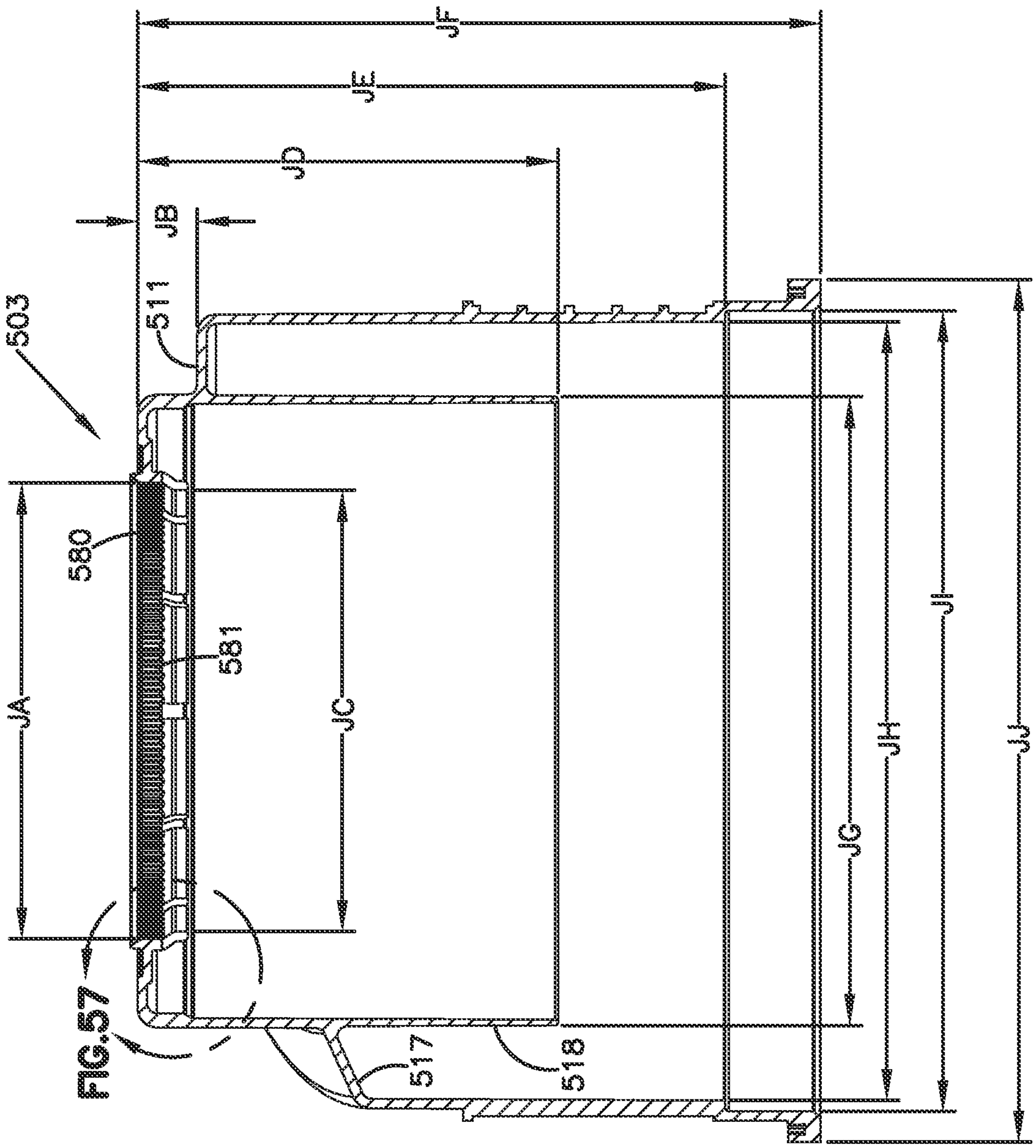
FIG. 56 is a schematic cross-sectional view taken generally along line 56-56, FIG. 55.
Figure 57:
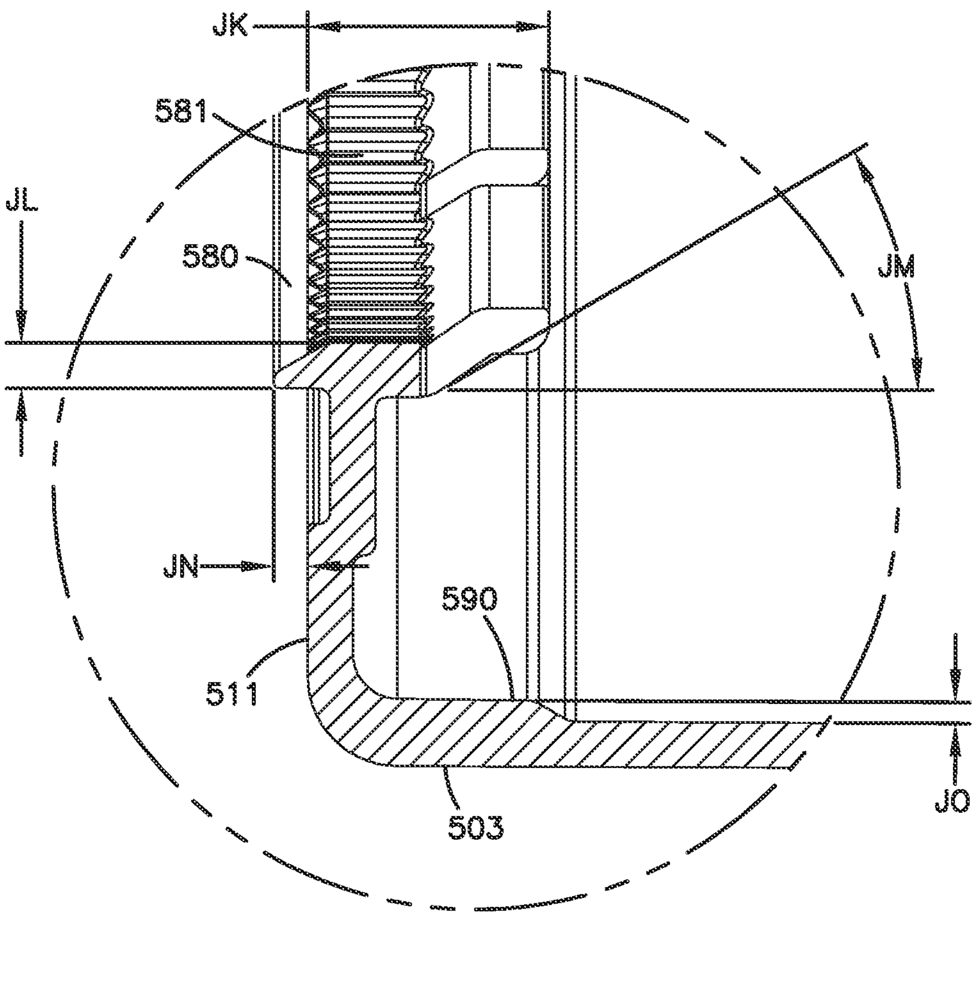
FIG. 57 is a schematic enlarged fragmentary view of an identified portion of FIG. 56.

In FIG. 54, a side elevational view of housing section 503 is provided. In FIG. 55, a top plan view of housing section 503 is provided. In FIG. 56, a cross-sectional view taken along line 56-56, FIG. 55, is provided. In FIG. 57, an enlarged fragmentary view of a portion indicated in FIG. 56 is provided. At 590, FIG. 57, a seal surface portion of housing section 503 is depicted, against which secondary seal surface 534 of cartridge 510, FIG. 35 seals when the cartridge 510 is installed. This is analogous to the embodiment of FIGS. 1-32.

Figure 33B:
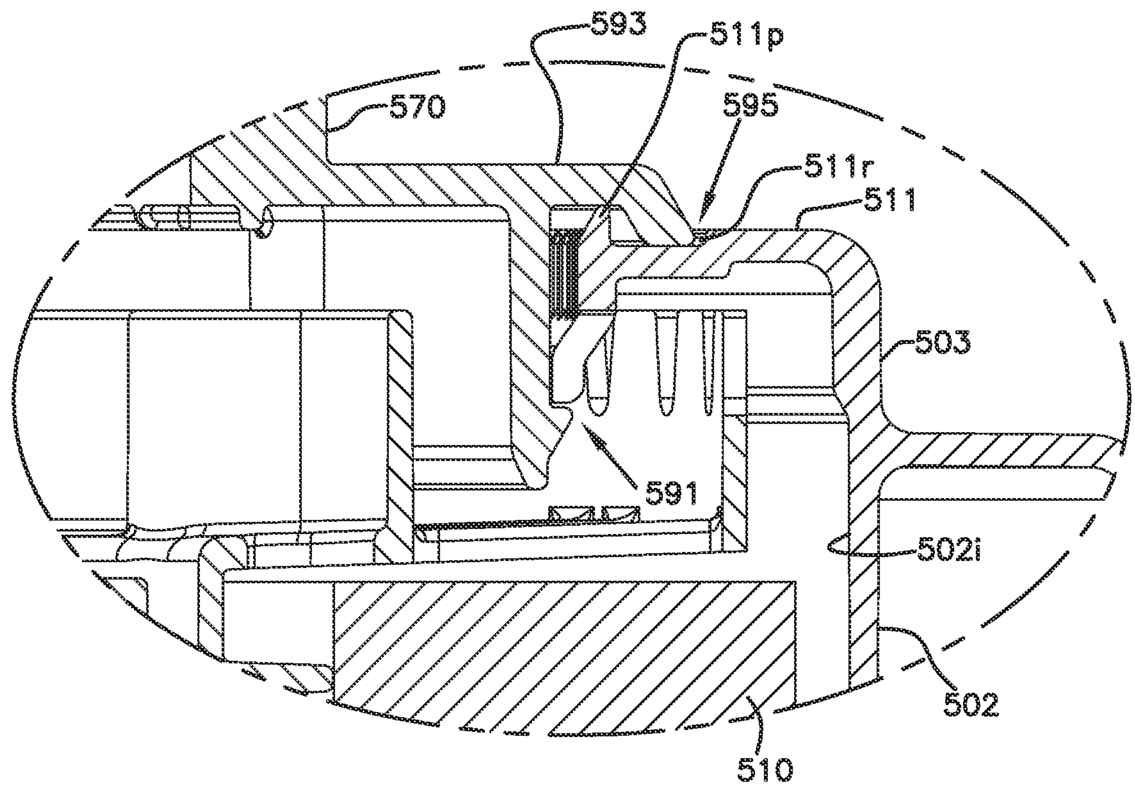
FIG. 33B is an enlarged fragmentary view of an identified portion of FIG. 33.

Attention is now directed to FIG. 33B, an enlarged fragmentary view of a portion of FIG. 33, showing engagement between a portion of tube 570 and end 511 of housing section 503. In FIG. 33B, analogous to FIG. 33, portions of molded-in-place seal material of end cap 528 are not shown, so structural detail can be viewed.

Referring to FIG. 33B, at 591, a joint is depicted between tube 570 and the housing section 502 which will project into recess, receiver or receiving groove 540 on the cartridge 510, FIG. 35, during installation. Also, viewable in FIG. 33B is structure effective for inhibiting water leakage in the joint 591. Specifically, in FIG. 33, it can be seen that the tube 570 includes a radially projecting mounting ring portion 593 that engages end 511, and rim projection section 595 that projects toward end 511; and, end 511 includes a recess 511*r* into which the rim section 595 projects. Also, end wall 511 includes a projection ring 511*p* that projects toward ring portion 593 from tube 570, at a location surrounded by rim projection section 595. When the snap-fit engagement between the tube 570 and housing sections 503 occurs at end 511, a tortuous path for water movement indicated by ring projection 595 in recess 511*r*, and projecting ring 511*p* inhibits water from flowing into interior 502*i* of the housing 502. This effect is particularly desirable, when housing 502 is oriented with end 511 projecting upwardly.

C. Assembly of Cartridge 510, Especially End Piece 528, FIGS. 58-65

In a preferred application of principles according to the present disclosure, end piece 528 includes a portion molded-in-place, on preformed portions of the cartridge 510. Specifically, end piece 528 comprises material molded-in-place over end 525*x* of the media 525, and various portions of support arrangement 545, adjacent seal supports 549, 550 and struts 551. Methods and mold arrangements applicable to accomplish are discussed in this section, in connection with FIGS. 58-65.

Figure 58:
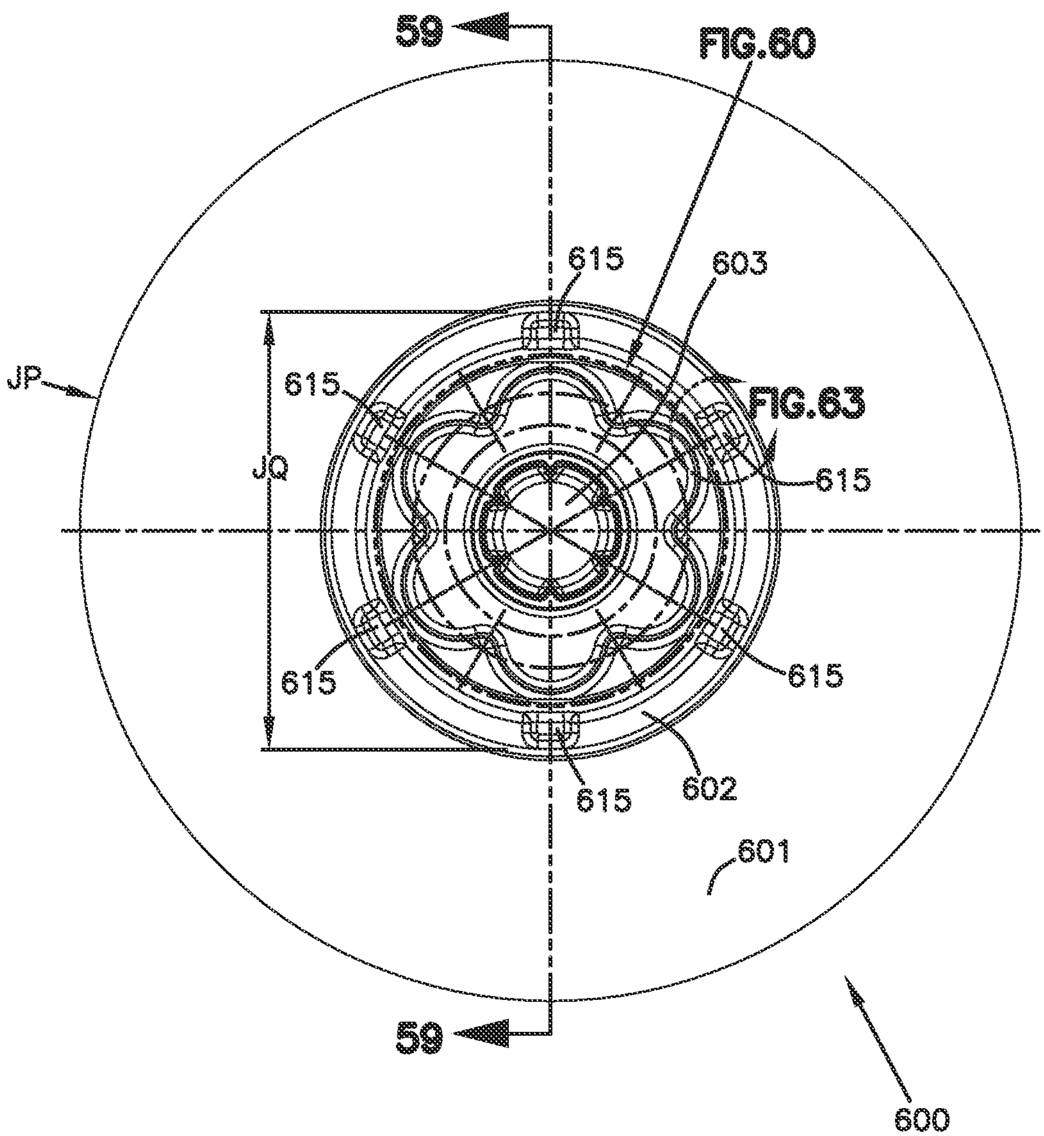
FIG. 58 is a schematic top plan view of a mold component usable to form a portion of the cartridge of FIG. 34A.

In FIG. 58, a top plan view of a mold 600 is depicted. The mold 600 comprises a perimeter ring surface 601 surrounding a mold cavity 602. Centrally positioned within the mold cavity 602 is central projection 603. During construction of a cartridge 510, resin is dispensed in mold cavity 602, typically with spinning to distribute the resin. The media (media pack) and support are then inserted into the mold cavity 602 and the resin is then molded onto the media pack and support in an appropriate manner to form end cap 528.

Figure 59:
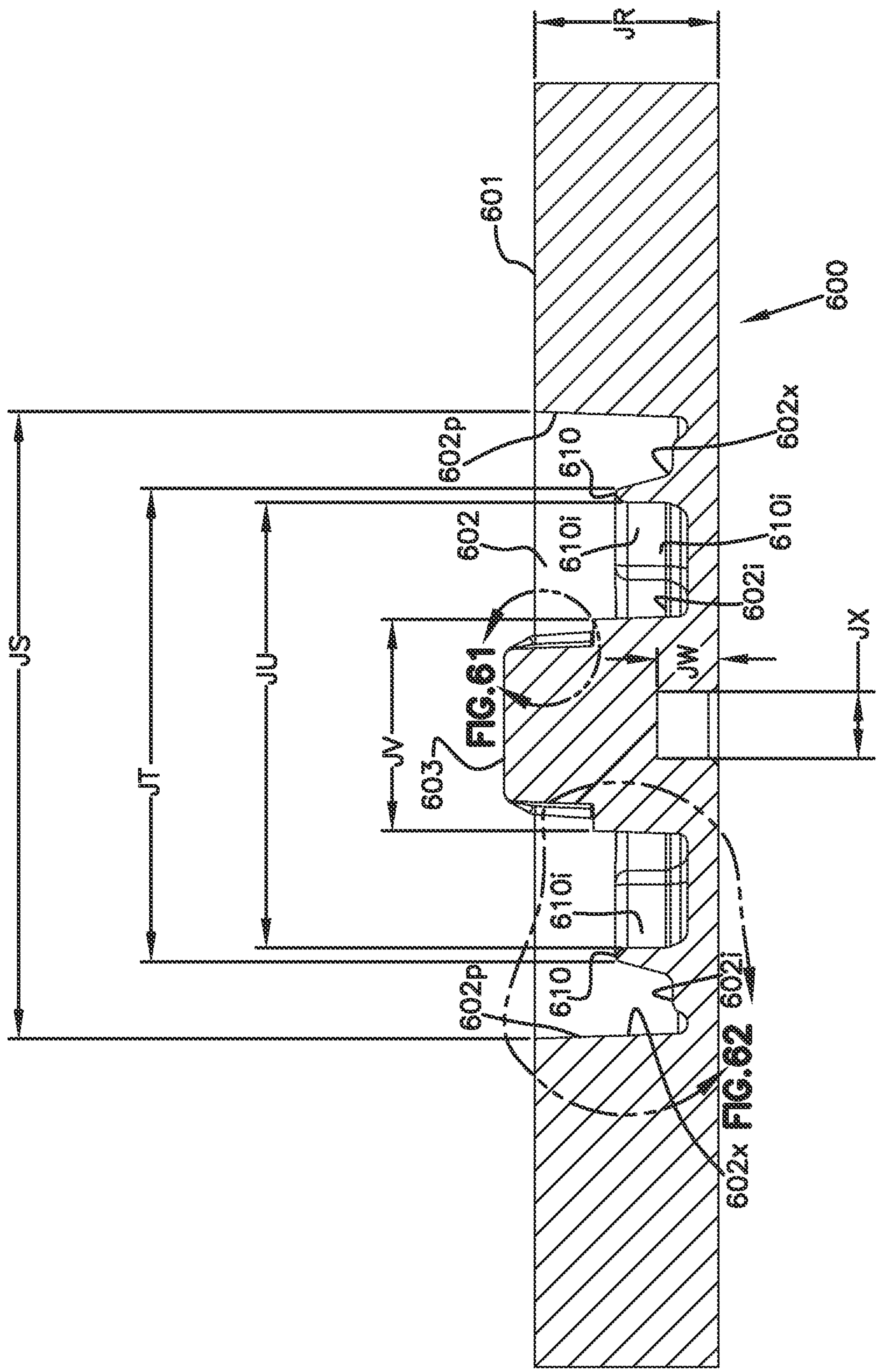
FIG. 59 is a schematic cross-sectional view of the mold component of FIG. 58, taken along line 59-59 thereof.

In FIG. 59, a cross-sectional view of mold 600 is provided. It is noted that cavity 602 includes ring 610 therein, which, in the molded cartridge, end cap 528 will form groove 40, FIG. 35.

Radially outwardly from projection 610 is mold cavity section 602*x*, an outer perimeter of which, located at 602*p*, will form the outer seal surface 534, FIG. 35 in the molded material.

Positioned radially inwardly from support 610 is inner mold cavity section 602*i*. Inner surface 610*i* of projection 610 will be configured to form outwardly directed radial seal surface 533, FIG. 35, for the primary seal.

Figure 60:
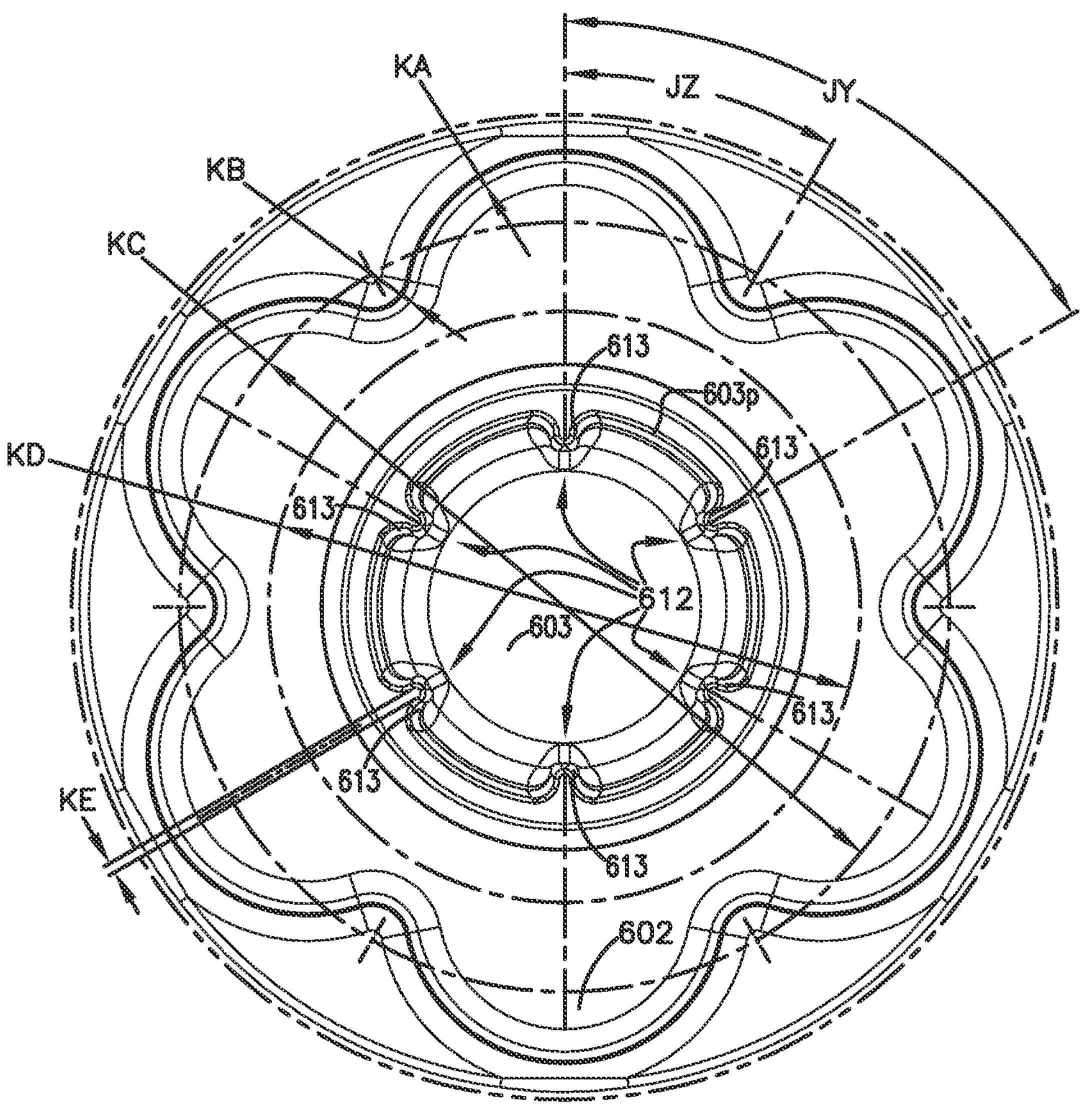
FIG. 60 is a schematic enlarged fragmentary view of a portion of FIG. 58.

In FIG. 60, an enlarged fragmentary view of cavity 602 and central projection 603 is depicted. It is noted that the central projection 603 includes an outer perimeter 603*p* with a first member of a mold rotational alignment arrangement therein, indicated generally at 612. For the particular arrangement depicted, the mold rotational alignment arrangement 612 comprises a plurality of recesses or grooves 613, generally vertically oriented and positioned spaced from one another, radially, around an outer perimeter of projection 603. The particular assembly depicted uses six such grooves, although alternates (usually 3-10, inclusive) are possible. It is also noted that the grooves are depicted radially evenly spaced from one another around a center of post 603; however, alternatives are possible. The operation of these grooves 613 will be understood from further discussion below.

Figure 61:
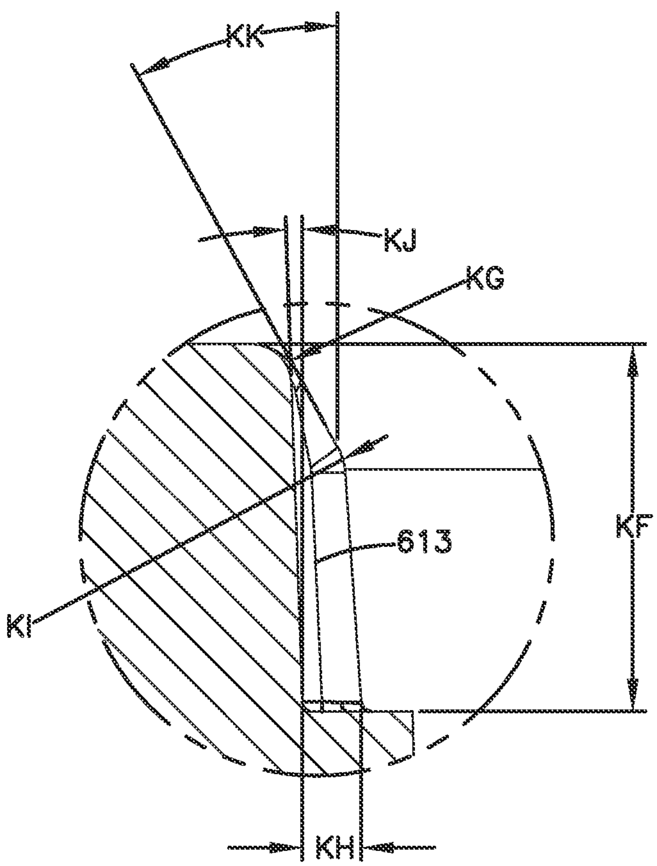
FIG. 61 is a schematic enlarged fragmentary view of a portion of FIG. 59.

In FIG. 61, an enlarged fragmentary view of an identified portion of FIG. 59 is depicted. The portion depicted is a cross-sectional view taken through one of the grooves 613.

Figure 62:
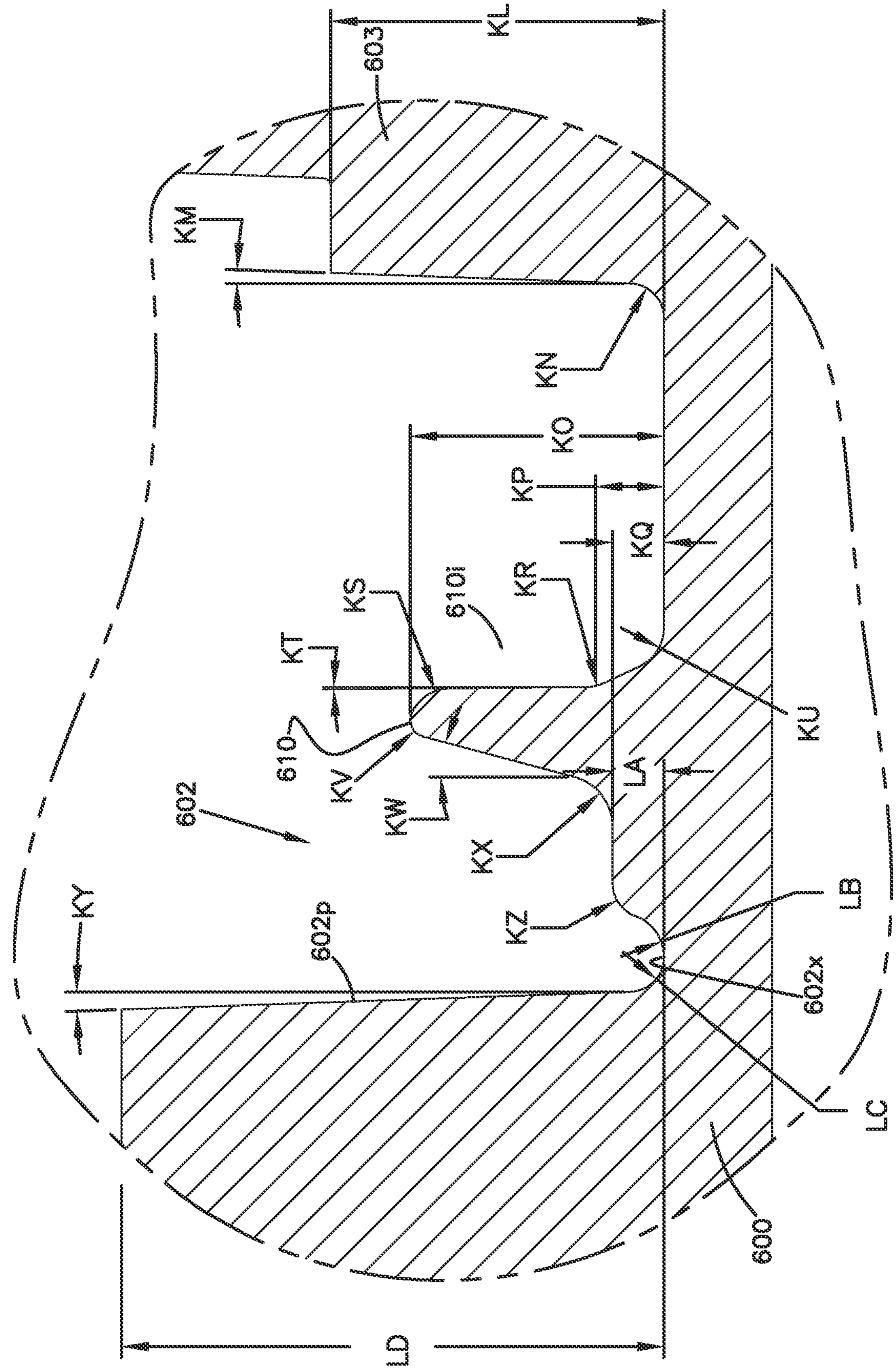
FIG. 62 is a schematic enlarged fragmentary portion of FIG. 59.

In FIG. 62, a fragmentary cross-sectional view of a second identified portion of FIG. 59 is shown. Depicted is a cross-sectional view through the mold cavity 602 with features previously identified generally indicated.

Figure 63:
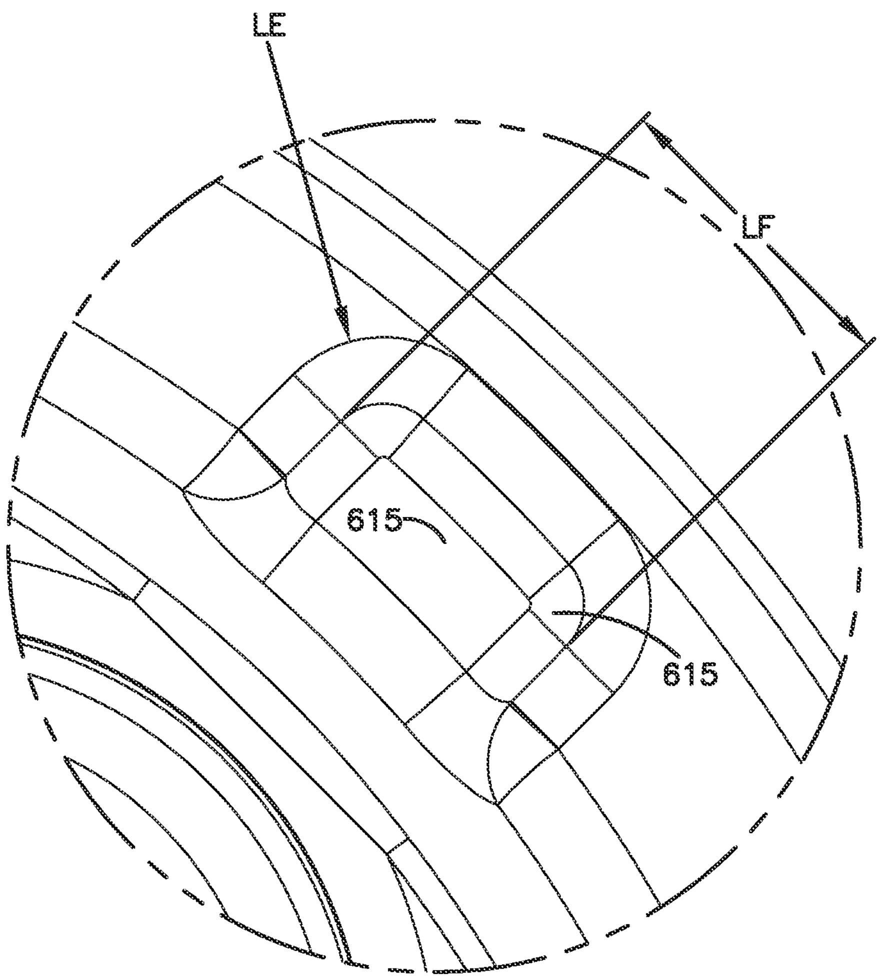
FIG. 63 is a schematic enlarged fragmentary view of a portion of FIG. 58.

In FIG. 63, an enlarged fragmentary view of a portion of FIG. 58 is shown. The portion viewed in FIG. 63 depicts a mold stand-off 615 to facilitate molding. Referring to FIG. 58, a plurality of such mold stand-offs 615 are shown. The stand-offs 615 will leave artifacts in the end cap 528, see FIG. 34A at 617. The stand-offs 615 ensure that the media and support are appropriately supported in the mold.

Figure 64:
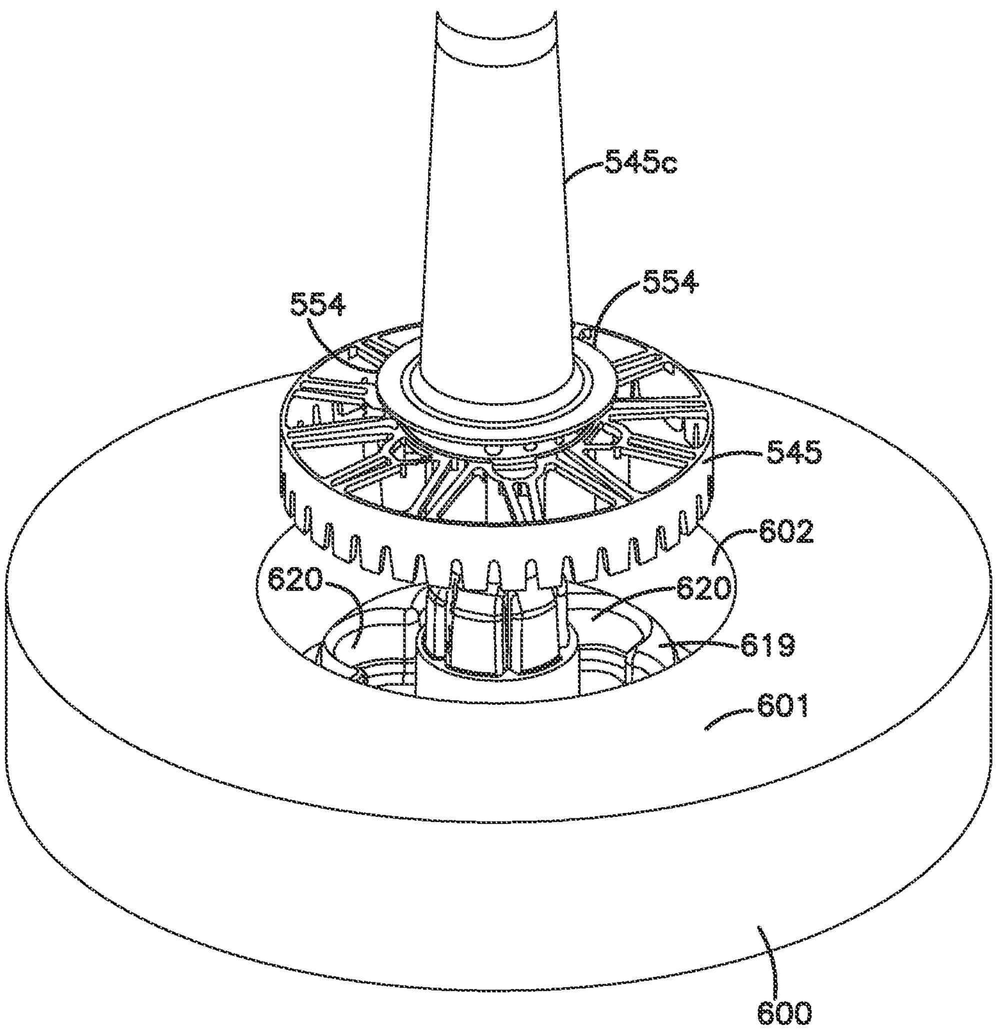
FIG. 64 is an exploded schematic view depicting an association between an inner filter support of FIG. 38 and a mold of FIG. 58.

In FIG. 64, a schematic depiction is provided with a step of inserting cartridge structure into the mold for forming the end cap 528. It is noted that, for ease in viewing detail, the media is not depicted in FIG. 64, although the media would be present during the insertion. Referring to FIG. 64, the mold 600 is depicted. Structure 545 is shown being lowered into the mold cavity 602. Before such insertion, media will generally have been positioned around center 545*c*. The media that would surround ring 554. Also, before insertion of the cartridge components, resin will typically have been dispensed in the cavity 602, usually toward region 619, but with spinning of the mold 600.

It will be understood that the support 545 needs to be properly radially oriented in the mold, relative to outwardly mold portions 620 that will mold the seal surface for seal 533. An approach to accomplish this, can be understood by reference to FIG. 65.

Figure 65:
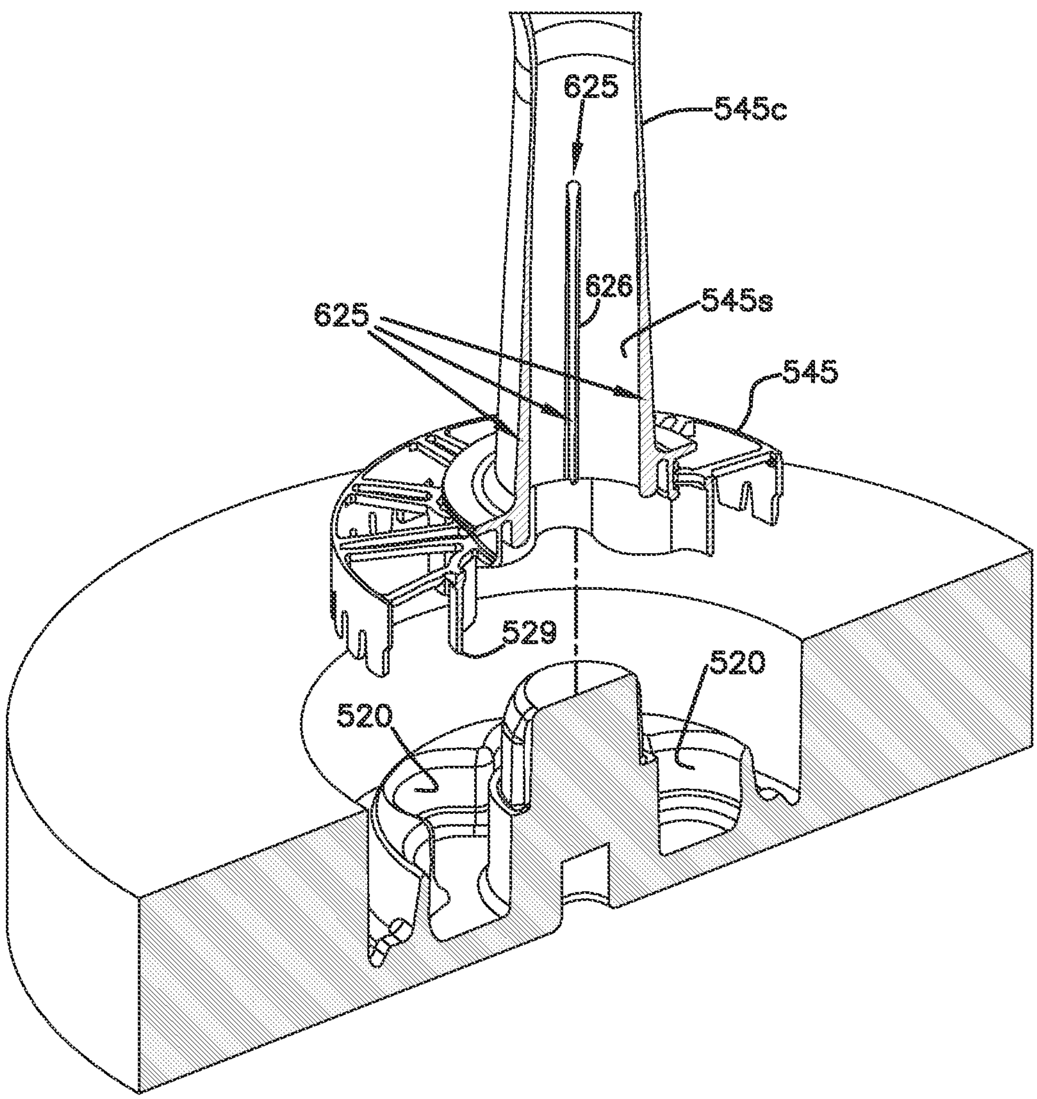
FIG. 65 is a schematic exploded cross-sectional view of the arrangement depicted in FIG. 64.

Referring to FIG. 65, it can be seen that the cartridge support 545 includes, in center 549*c* an inner surface 545*s* with a second member of a mold rotational alignment arrangement 625 thereon. The second member 625 comprises a plurality of radially inwardly directed projections 626. The projections 626 are configured and positioned to engage member 612 on central post 603. For the particular arrangement shown, the members 626 are projection configured as vertical ribs, (although alternative shapes are possible) oriented and spaced to be received within recesses 613, as support 545 is lowered into the mold 600. Thus, the support 545 cannot be fully lowered into mold 600, unless ribs 626 engage receivers 613. This provides for a rotational indexing, so that the hub 529 on the support 545, FIG. 65 aligns, rotationally, with the mold sections 520 appropriately.

D. Some Example Dimensions

In FIGS. 33-63 some example dimensions are provided as follows: GH=280.3 mm; GI=128.3 mm; GJ=92.4 mm; GK=129.8 mm; GL=45.4 mm; GM=231.4 mm; GN=102.1 mm; GO=2 mm; GP=6.4 mm; GQ=7°; GR=117.5 mm; GS=7°; GT=117.5 mm diameter; GU=2.8 mm; GV=95.6 mm; GW=3.3 mm; GX=18.9 mm; GY=1.5 mm; GZ=14.62 mm; HA=30 mm radius; HB=14.2 mm radius; HC=0.2°; HD=16 mm; HE=3 mm radius; HF=2°; HG=14.8 mm; HH=21.9 mm; HI=77.93 mm diameter; HJ=11.7 mm radius; HK=27.9 mm radius; HL=5.5 mm radius; HM=60.41 mm diameter; HN=30°; HO=20 mm; HP=81 mm; HQ=55.5 mm; HR=121.5 mm; HS=48.9 mm; HT=2.5 mm; HU=45.8 mm; HV=50.8 mm; HW=54.2 mm; HX=54.9 mm; HY=88.46 mm; HZ=96 mm; H1=30°; H2=66 mm; H3=59.9 mm diameter; H4=77.9 mm diameter; IA=111 mm; IB=14.2 mm radius; IC=111 mm; ID=30°; IF=1.5 mm; IG=0.5 mm radius; IH=2.1 mm; II=1 mm radius; IJ=7.5 mm diameter; IK=2.7 mm radius; IL=112 mm; IM=105 mm; IN=80.5 mm; IO=40 mm; IP=12 mm; IQ=6 mm; IR=15 mm; IS=8.9 mm; IT=15.8 mm; IU=31.6 mm; IV=8.9 mm; IW=6 mm; IX=55.8 mm; IY=54.4 mm; IZ=210 mm; JA=96.5 mm; JB=12.7 mm; JC=93.5 mm; JD=89 mm; JE=124.4 mm; JF=144.7 mm; JG=133.1 mm; JH=164.9 mm; JI=169.6 mm; JJ=182.7 mm; JK=10.7 mm; JL=2 mm; JM=30°; JN=1.5 mm; JO=0.9 mm; JP=266.7 mm diameter; JQ=124 mm; JR=38.1 mm; JS=130.2 mm; JT=98.2 mm; JU=92.6 mm; JV=43.9 mm; JW=12.7 mm; JX=14 mm; JY=60°; JZ=30°; KA=15.1 mm radius; KB=4.8 mm radius; KC=77.9 mm diameter; KD=59.9 mm diameter; KE=1 mm; KF=18.6 mm; KG=2.9 mm radius; KH=3 mm; KI=2.9 mm radius; KJ=2°; KK=28.2°; KL=19.5 mm; KM=2°; KN=2 mm radius; KO=14.9 mm; KP=4 mm; KQ=3 mm; KR=2.5 mm radius; KS=2.5 mm radius; KT=0.5°; KU=2.5 mm radius; KV=1 mm radius; KW=15°; KX=3 mm radius; KY=2°; KZ=2 mm radius; LA=3 mm; LB=2.5 mm radius; LC=2 mm radius; LD=31.8 mm; LE=4.5 mm radius; and, LF=11.3 mm. Of course, the dimensions are indicative of an example arrangement only, and alternate dimensions can be used.

E. Some Example Potential Alternate Seal Configurations; General Seal Descriptions; Various Alternate Structures 1. Alternate Example Seal Surface Definitions, FIGS. 66-70

A variety of seal configurations can be used with principles according to the present disclosure. In FIGS. 66-70, several examples are shown. These are schematic depictions, and merely are meant to show potential seal definition, and support definition.

Figure 66:
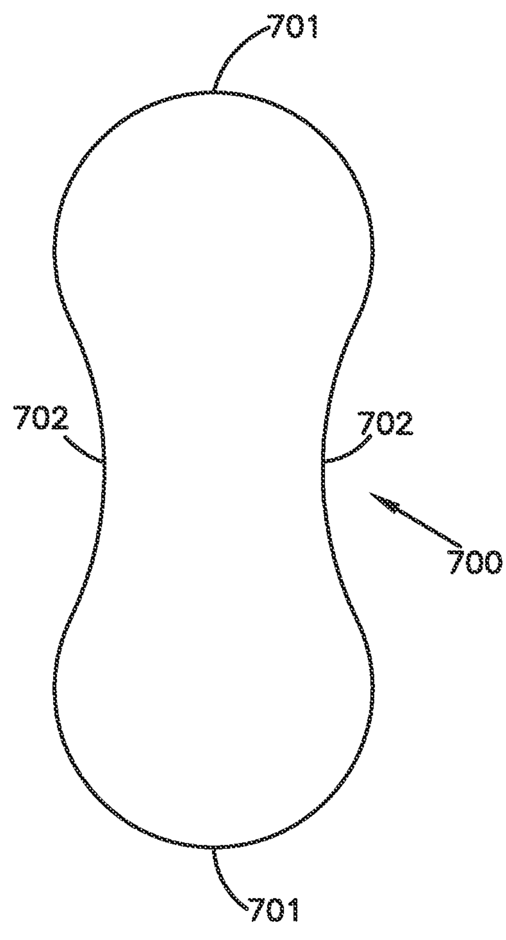
FIG. 66 is a schematic depiction of alternate seal configuration to the one shown in FIG. 36.

In FIG. 66, a somewhat "peanut" shape is depicted at 700 with two radially outwardly projecting sections or lobes 701 spaced by two inward projecting sections 702. Of course, the specific configurations of lobes 701, and sections 702 can be modified from that depicted.

Figure 67:
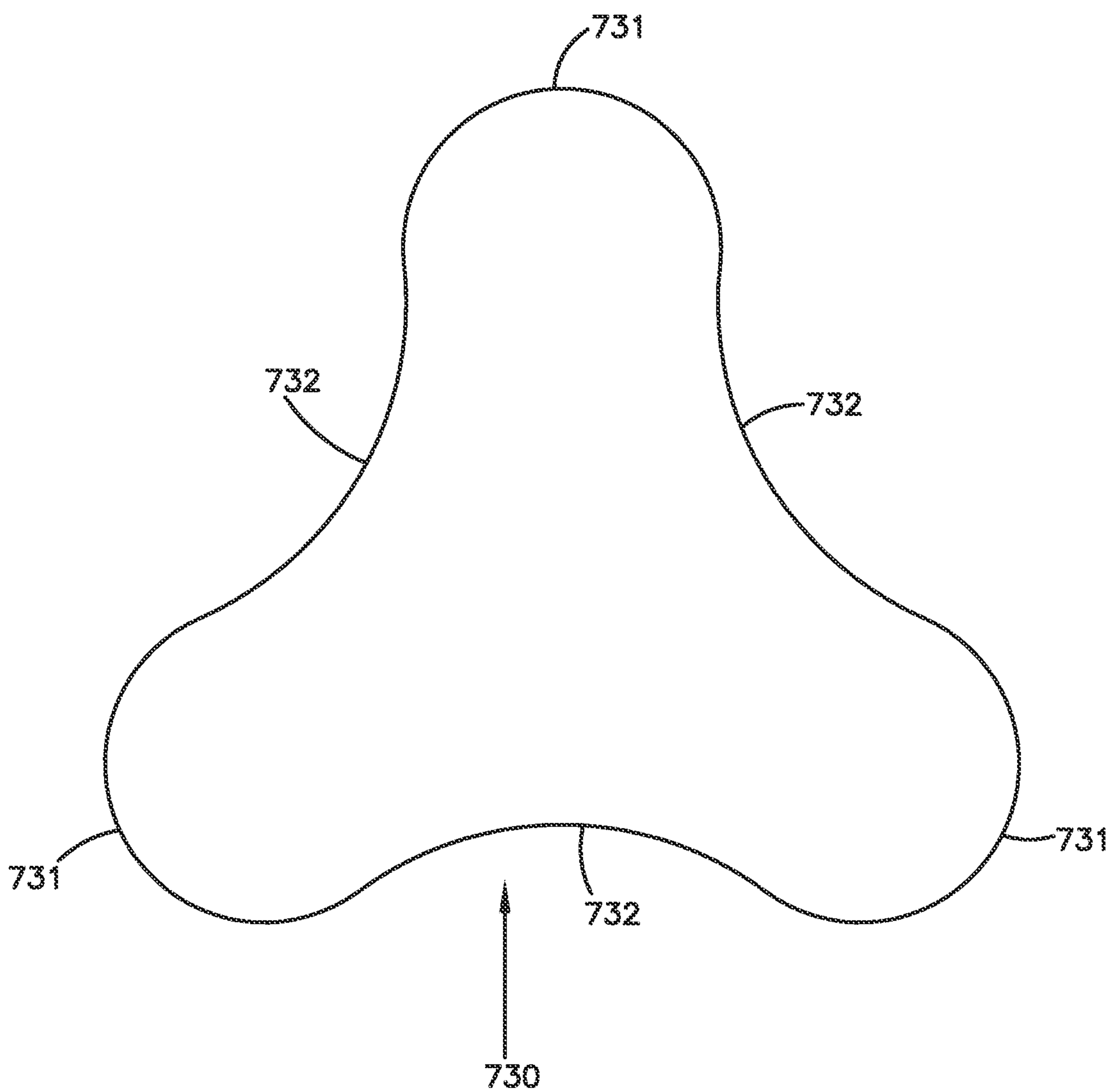
FIG. 67 is a schematic depiction of a second alternate seal configuration to the one depicted in FIG. 36.

In FIG. 67, a tri-lobe configuration is shown at 730, with three radially outwardly projecting sections or lobes 731 and three radially inwardly projecting sections 732.

Figure 68:
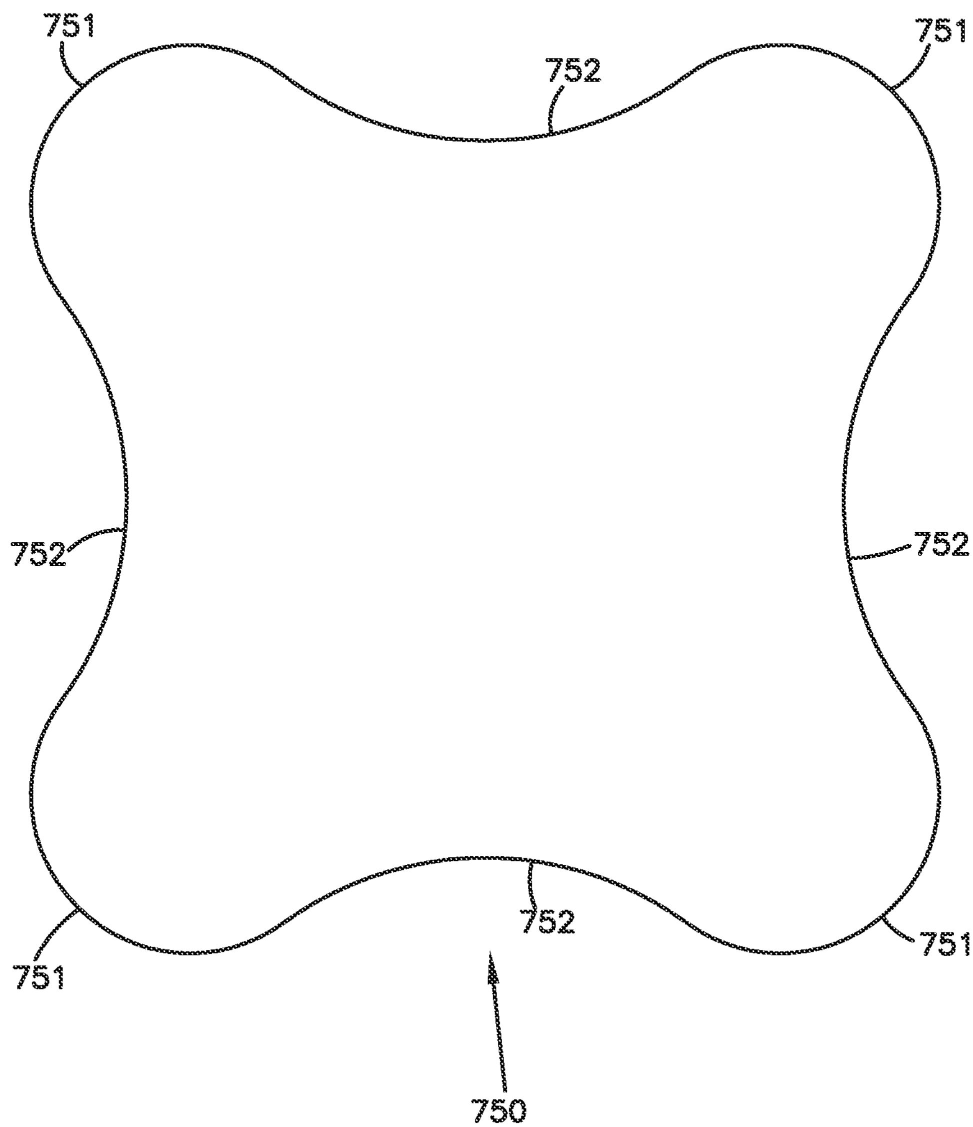
FIG. 68 is a schematic depiction of a third alternate seal configuration to the one depicted in FIG. 36.

In FIG. 68, a "four-lobe" configuration is depicted at 750, including a plurality (4) of radially outwardly projecting sections or lobes 751 separated by radially inwardly directed projections or sections 752.

Figure 69:
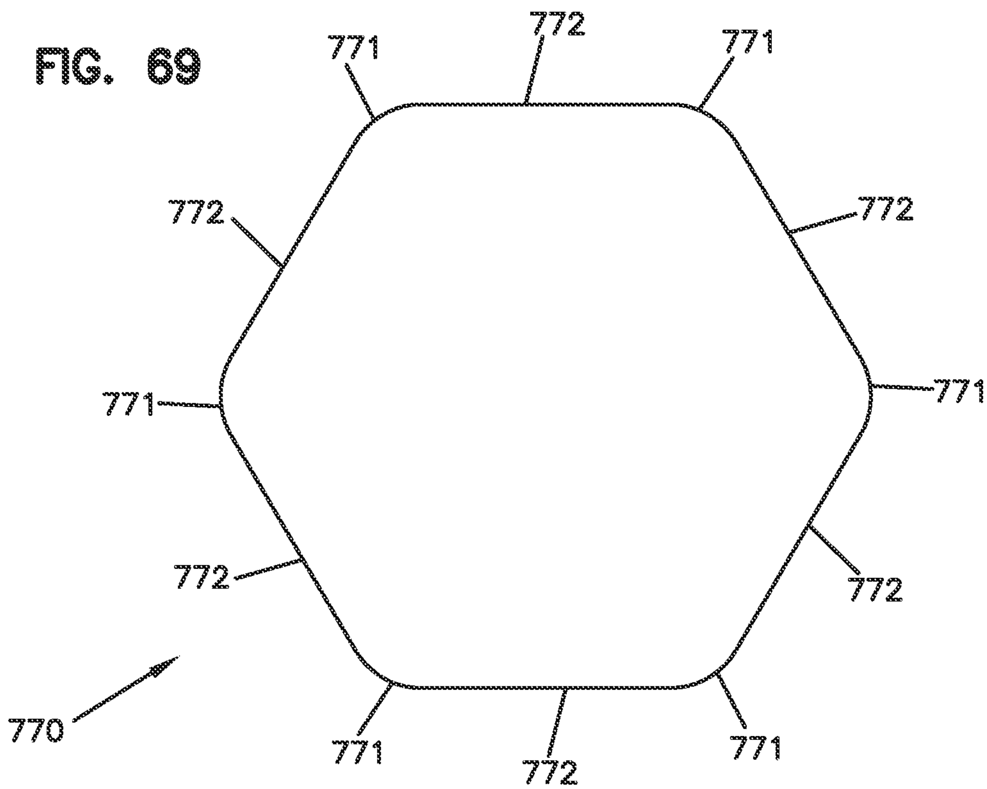
FIG. 69 is a schematic depiction of a fourth alternate seal configuration to the one depicted in FIG. 36.

In FIG. 69, seal arrangement having radially outwardly projecting sections is depicted at 770, in this instance with six radially outwardly projecting sections 771 separated by sections 772. In this instance, the sections 772 are straight in direction between the projections 771, and do not project radially inwardly. However, sections 772 could be configured to project inwardly, to advantage.

Figure 70:
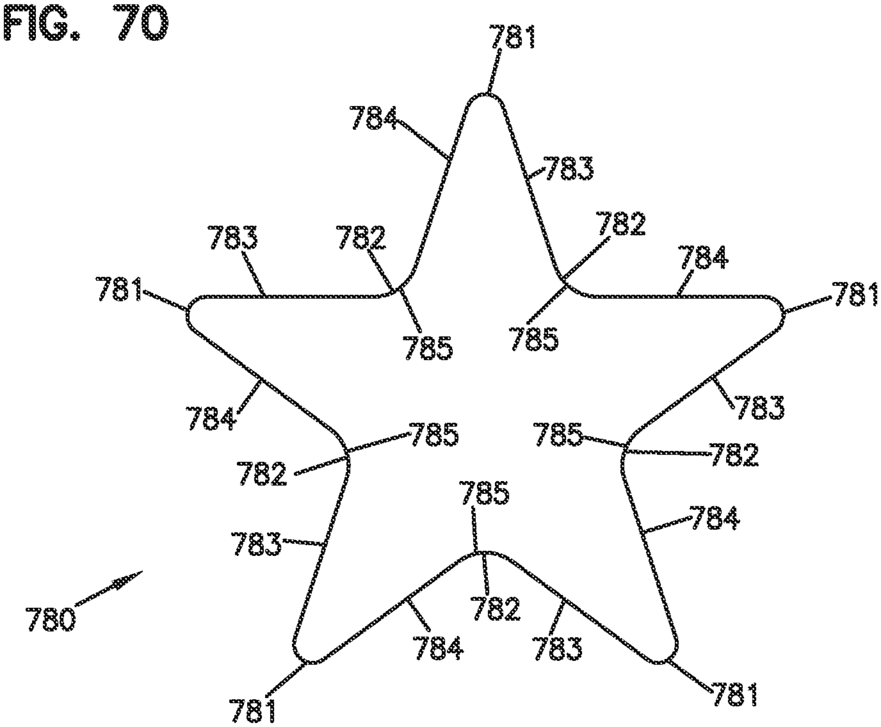
FIG. 70 is a schematic depiction of a fifth alternate seal configuration to the one depicted in FIG. 36.

In FIG. 70, a seal arrangement is depicted at 780 having five outwardly projecting sections 781 separated by five inwardly projecting sections 782, in this instance, the inwardly projecting sections 782 are in total non-straight, but each comprises straight sections 783, 784 on opposite sides of a radially innermost vertex 785.

For any of the embodiments of FIGS. 66-70, alternate shapes to the lobes and sections are possible. Further, the configurations of FIGS. 66-70 demonstrate that a variety of configurations with alternate numbers of sections or lobes can be used.

2. General Description of Selected Seals and Seal Surfaces Depicted or Described Herein Above It is noted that although the seal of the arrangements of FIGS. 35 and 66-70 are sometimes characterized as "radial." However, as a result of the non-circular shape, some of the sealing forces will be directed other than specifically at or away from the central axis X of the cartridge. The seals are nevertheless characterized herein as "radial", since, in general, the seal surfaces on the cartridge and housing are generally radially directed and the sealing forces are either radially outwardly directed or radially inwardly directed, around the axis X, depending on whether an outward or inward seal surface is involved. Alternately stated, the compression forces are still not axial (i.e. in the longitudinal direction of axis X), but rather are generally radial. There are applications, however, where the seal forces are not aligned directly toward or away from the axis X in each of these non-circular configurations.

In more general terms, radial seals comprise seal surfaces that surrounds (directed toward away from) a central axis. That central axis in many instances will comprise a central axis of a filter cartridge around which media is also positioned. However, from alternative arrangements described herein below, it will be understood that a radial seal can be a seal that surrounds an axis that is not also a central axis for the cartridge (by contrast, an axial seal is a seal that is generally aligned with a central axis around which the seal is positioned, typically also, but not necessarily in all instances, a central cartridge axis X).

In the general terminology used herein, the various housing seal arrangements depicted can also be characterized as generally comprising a radially directed seal surface, since the seal direction for the various housing seals depicted in the drawings, is generally with a surface of the seal engaging some portion of the housing (be it a portion of an outlet tube or outer portion of the housing, depending on whether which of the two of the housing seals is involved) that can be generally characterized as a "radially directed surface." In each instance, the surface that actually forms the seal is directed around (and facing toward or away from) a central axis X (typically, also of the cartridge) as opposed to an axial seal which would be generally with seal forces directed in the longitudinal direction of the central axis X. The examples depicted are "outward radial seal surfaces" or "outwardly directed radial seals" since the actual surface of the seal member on the cartridge that will form a seal in engagement with a housing, is generally directed away from a central axis of the cartridge, as opposed as toward the axis. However, many of the principles described herein can be applied in alternate arrangements in which the seal surface on the cartridge that engages the housing to form a seal is directed radially toward the central axis.

The radial housing seals described herein can be generally characterized as "non-clamp," "non-clamping" or "clampless" arrangements or by similar terms. By this it is meant that the seal arrangements typically do not involve the use of a clamp such as a hose clamp or other structure that needs to be tightened in order to provide for a secure seal. Rather, the seals are established by mere installation, with compression of the seal material against a surface of the housing being directed by a cartridge component.

With respect to the arrangements of FIGS. 33-70, the primary seal surface which is non-circular can be characterized as having at least two spaced radially outwardly projecting seal surface sections. Indeed, except for the arrangement of FIG. 66, each has at least three, spaced, radially, outwardly projecting seal surface sections, typically 4-10 (inclusive) spaced radially outwardly projecting seal surface sections. Here, the term "radially outwardly projecting" is meant to indicate the lobe, vertex or projecting section shape in direction around, and relative to, the central axis, as opposed to whether the seal surface is directed to form an inwardly directed or outwardly directed seal. That is, a radially outwardly projecting section is a section of a seal surface that projects away from the central axis for the seal (and typically also the cartridge) without regard to which direction the seal surface itself faces for sealing. For the "six outwardly projecting seal section" arrangement of FIG. 36, these projections are indicated at 533*x*. For the "two" outwardly projecting sections of FIG. 66, these sections are indicated at 701. For the three outwardly projecting arrangement of FIG. 67, these sections are indicated at 731. For the four outwardly projecting section arrangement of FIG. 68, these sections are indicated at 751. For the six outwardly projecting section arrangement of FIG. 69, the sections are indicated at 771; and, for the five outwardly projecting section arrangement of FIG. 70, these sections are indicated at 781.

Except for the arrangement of FIG. 69, each of the seal arrangements in FIGS. 33-36 and 66-70, has one radially inwardly projecting seal section positioned between each of the radially outwardly projecting sections defined above. For the arrangement of FIG. 36, these are indicated at 533*y*. For the arrangement of FIG. 66, these sections are indicated at 702. For the arrangement of FIG. 67, these sections are indicated at 732. For the arrangement of FIG. 68, these sections orientated at 752. For the arrangement of FIG. 70, these sections are indicated at 782. It is noted that the arrangement of FIG. 69 has straight sections extending between the outwardly projecting regions, and thus does not have such inwardly projecting seal sections. Again, in connection with this portion of the definition of the seal surface of the inwardly projecting seal surface sections refer to the geometric direction relative to the central axis, that the surface section bends or projects as opposed to the direction of the seal surface forces for sealing.

It is noted that in many of the arrangements, the inwardly directed seal surface sections are non-straight. By this, in connection with the general terminology used herein, reference is meant to the extension of the seal surface relative to the outwardly projecting sections, in extension between the outwardly projecting sections. This characterization is accurate for all of the seal arrangements depicted in FIG. 30 and FIGS. 66-68 and 70, but not the seal arrangement depicted in FIG. 69.

It is noted that even the seal arrangement depicted in FIG. 70 is 'non-straight", in connection with a definition of extension between the outwardly projecting sections 781, since although in FIG. 70, subsections 783 and 784 are each straight, the total extension of each section 782 is not straight between the projections 781.

Typically the radially outwardly projecting seal surface sections are positioned radially evenly spaced around the cartridge central axis, and indeed this is the case in each of the arrangements depicted herein. However, there is no specific requirement for this even radial spacing and many of the principles described herein can be applied in alternate arrangements. The same can be said of the radially inwardly projecting seal sections.

The radially outwardly projecting seal surface sections will typically be curved to a radius of at least 5 mm, usually not more than 35 mm and often within the range of 15-30 mm, inclusive, for convenient seal molding, manufacture and use. However, alternatives are possible. Radially inwardly projecting sections will also typically be radiused to a curvature of at least 2 mm and often an amount within the range of 2-35 mm for convenient manufacture. However, again, alternatives are possible.

Typically, when principles according the present disclosure are applied in preferred arrangements, the seal surface which forms the primary seal, for example seal 533, will be positioned in radial overlap with an end of the media, typically spaced at least 3 mm outwardly from the inner most perimeter of the media, and at least 5 mm inwardly from an outermost portion for the media. Also, typically its largest cross-sectional size is at least 3 mm, usually at least 5 mm, often at least 8 mm smaller than a largest cross-sectional size of an outer perimeter seal, typically at least 10 mm smaller and most typically at least 15 mm smaller, when the arrangement includes an outer perimeter seal or second radially directed seal arrangement as discussed herein.

There is no specific requirement that the cartridge include two seal arrangements, although it is preferred for the applications of the present preferred described embodiments. Also, there is no specific requirement that the primary seal 533 be a side of groove, although that too is typical and preferred for applications described herein. Further, there is no specific requirement that the surface of a groove that does not comprise a housing seal, when a groove is used, be circular in definition, with a slanted surface, but this will be typical and preferred.

Herein, when reference is made to a radially directed seal surface sizes, perimeter or cross-sectional size or dimensions, reference is meant to the surface when undistorted by installation, unless otherwise stated. Thus, the size is sometimes referred to in the terminology as "undistorted cross-sectional size" or by similar terms.

3. Some Example Alternate Structures

Figure 33C:
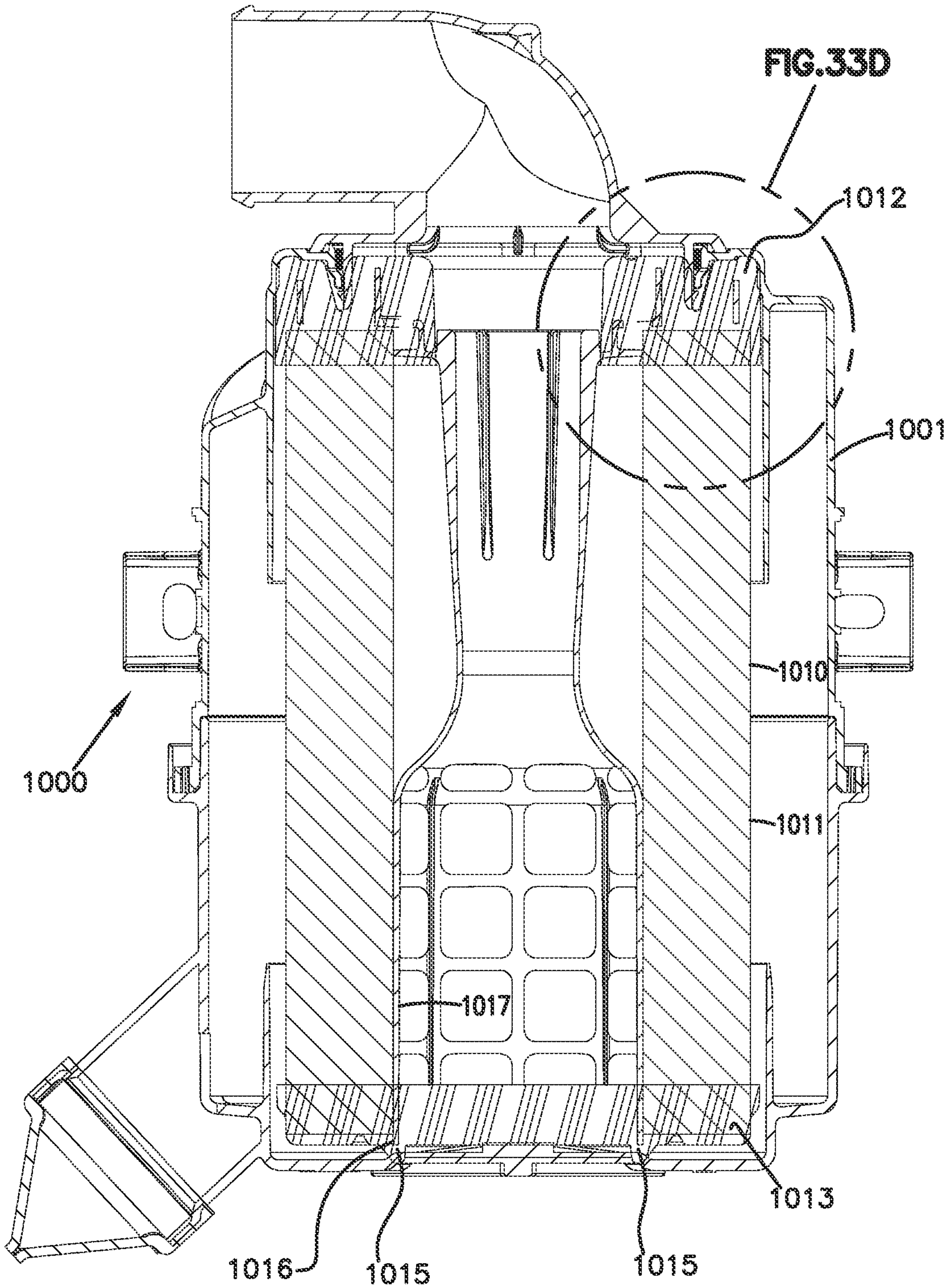
FIG. 33C is a schematic cross-sectional view analogous to FIG. 33, but showing selected variations of the second embodiment of the air cleaner assembly; the view of FIG. 33 including a depiction of molded-in-place portions of two end caps.

Attention is now directed to FIG. 33C. FIG. 33C is generally analogous to FIG. 33, but shown in a different rotational orientation, with respect to general features, but does show some variations of specific features.

The assembly of FIG. 33C should be understood to have a construction and features generally analogous to those described above for the assembly of FIG. 33, when like parts are depicted.

Referring to FIG. 33C, an assembly 1000 is depicted, comprising a housing 1001 having a cartridge 1010 removably positioned therein. The cartridge 1010 may be generally analogous to a cartridge previously discussed, comprising media 1011 extending between first and second end pieces 1012, 1013. An example difference is that at closed end piece 1013, an outward bumper projection arrangement 1015 is depicted that is oriented in axial overlap with an end 1016 of support structure 1017 around which media 1011 is positioned. This differs from the assembly of FIG. 33, in which a bumper arrangement is positioned in radial offset from an end of a support.

Figure 33D:
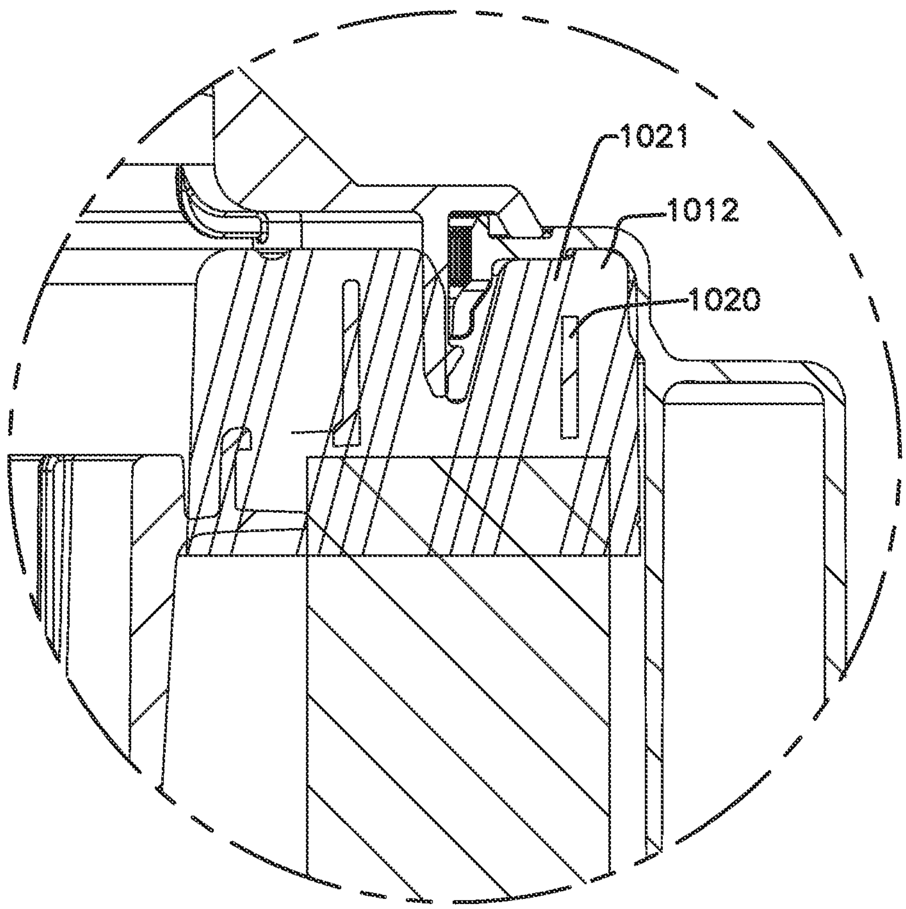
FIG. 33D is an enlarged fragmentary schematic view of selected portions of FIG. 33C.
Figure 33E:
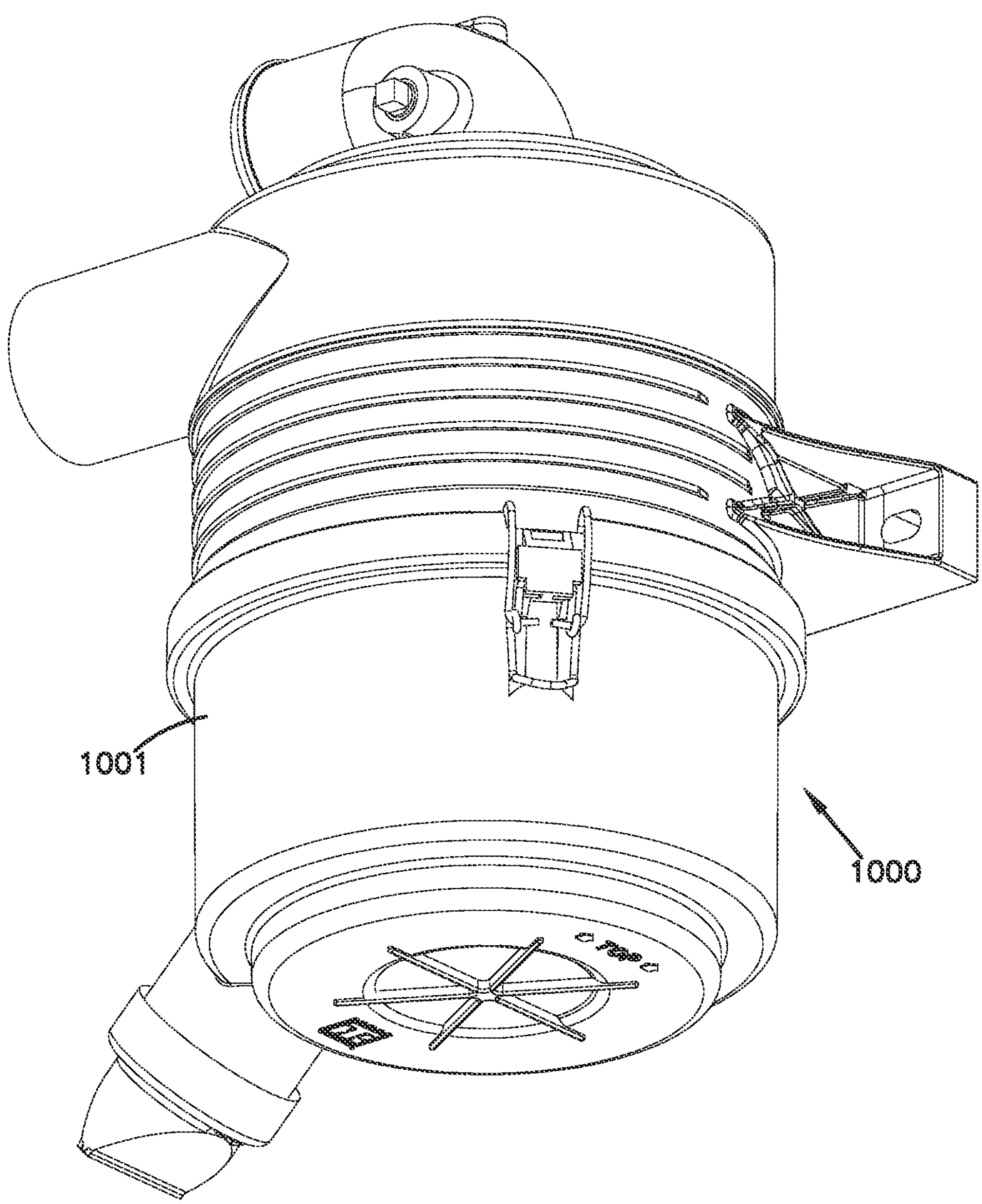
FIG. 33E is a perspective view of a housing usable with the variation of FIGS. 33C-D.

Referring to FIG. 33D, an enlarged fragmentary portion of FIG. 33, it is noted that end piece or end cap 1012 is configured with differences in structural detail from a previously depicted end cap, but is generally analogous in operation. In particular, detail of support 1020 embedded within molded-in-place material 1021 is different.

In FIG. 33, a perspective view of assembly 1000 and housing 1001 is provided.

Figure 34B:
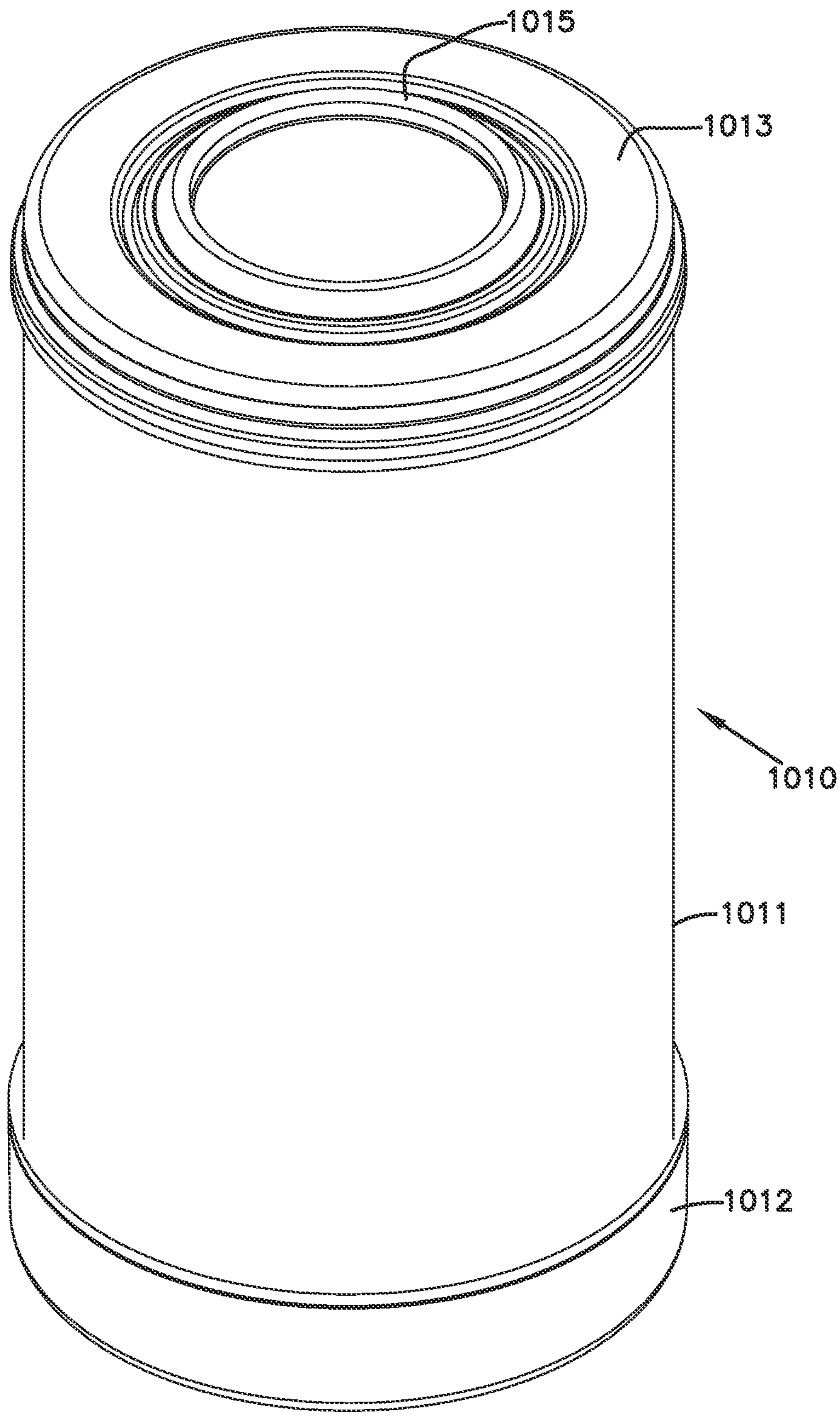
FIG. 34B is a schematic closed end perspective view of the filter cartridge of a variation of FIGS. 33C-33D.

In FIG. 34B, a bottom perspective view of cartridge 1010 is depicted. In the example depicted, the bumper arrangement 1015 is depicted as continuous ring, rather than a segmented ring. The principles can be practiced with a segmented ring.

Figure 34C:
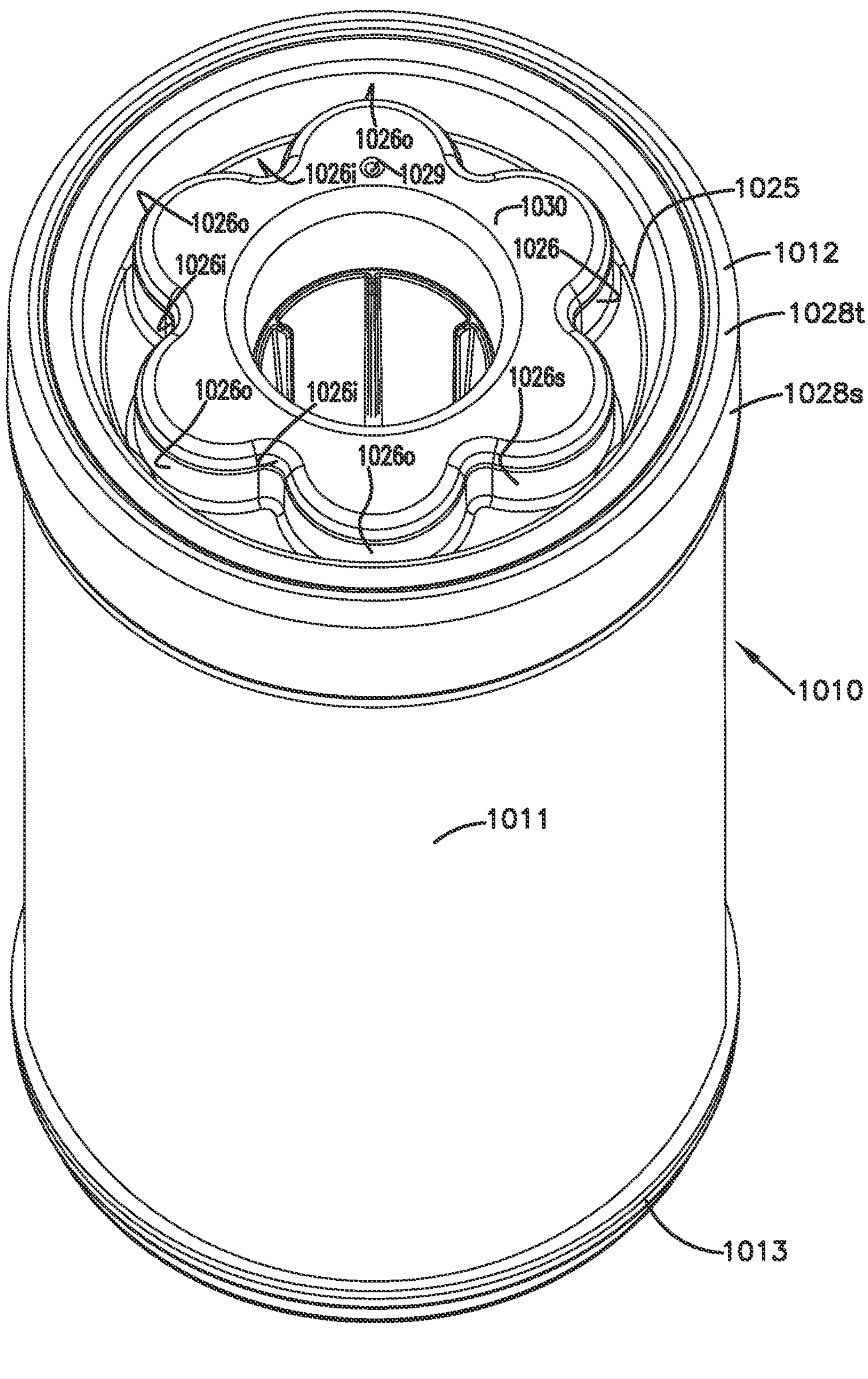
FIG. 34C is a schematic outlet end perspective view of the filter cartridge of FIG. 34B.

In FIG. 34C an open end perspective view of the cartridge 1010 is depicted with media 1011 extending between 1012 and 1013. At end piece 1012, a recess receiver or groove 1025 is depicted, having inner wall 1026 configured to form a radially directed seal surface 1026*s* that comprises a plurality of radially outwardly directed lobes or projections 1026*o* separated by spaced inwardly directed recess or regions 1026*i*, analogously to previously described arrangement. Further, the cartridge 1010 is depicted with an outwardly directed seal surface 1028*s*, which surrounds surface 1026 forming a secondary or second radial seal.

Figure 35A:
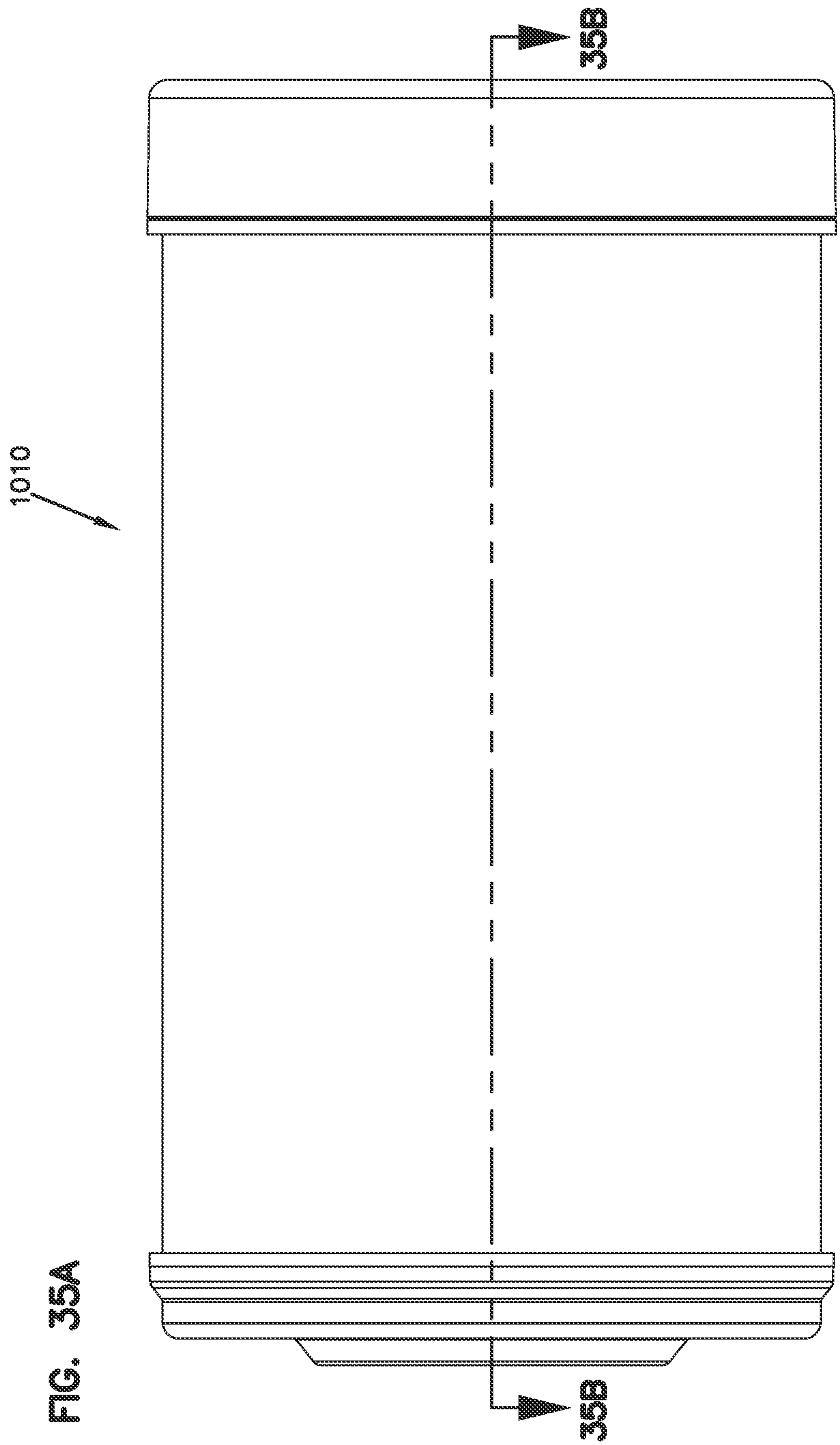
FIG. 35A is a schematic side elevational view of the filter cartridge of FIG. 34C.
Figure 35B:
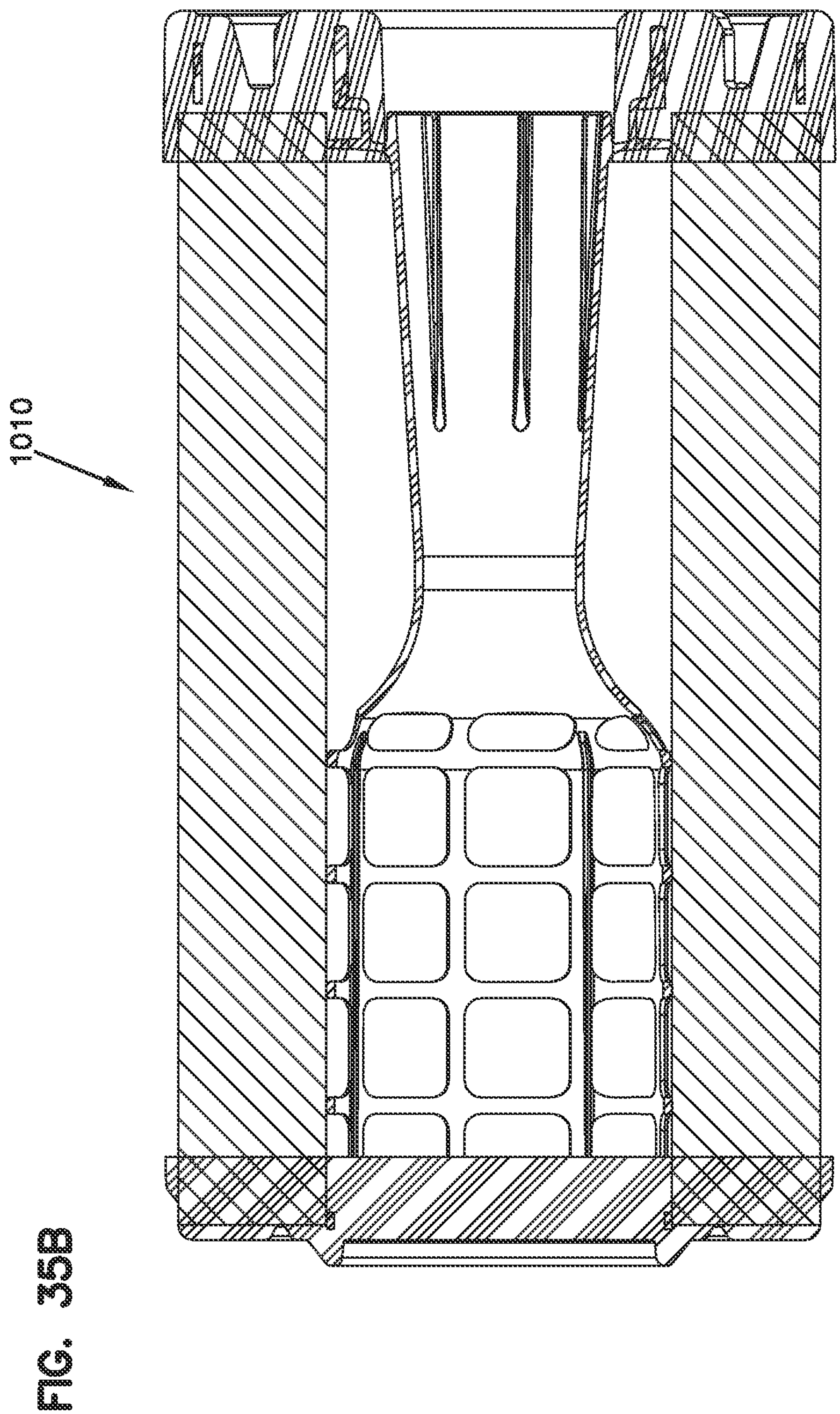
FIG. 35B is a schematic cross-sectional view of the filter cartridge of FIG. 35A.
Figure 36A:
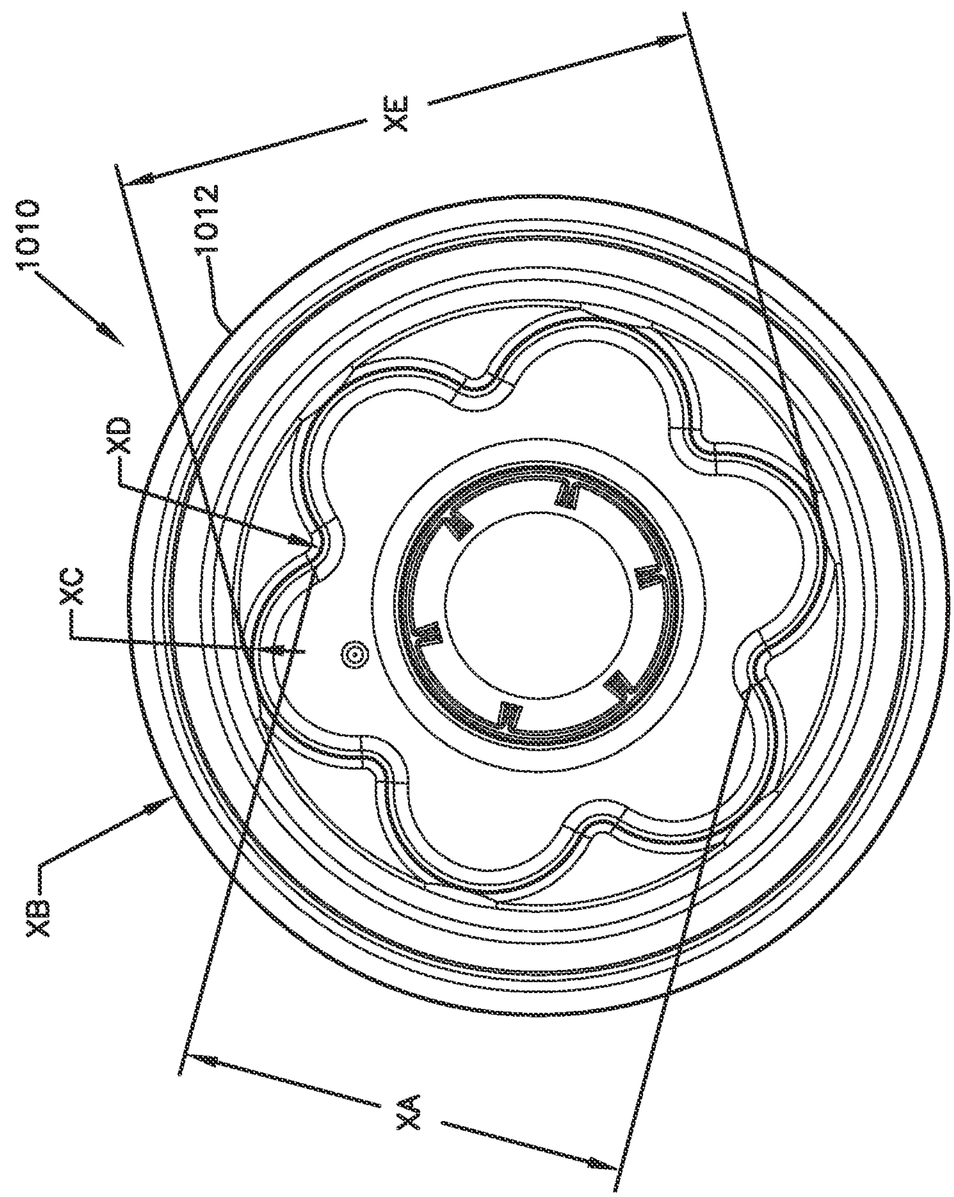
FIG. 36A is a plan view of an outlet end of the filter cartridge of FIGS. 35A-35B.

In FIG. 35A a side elevational view of cartridge 1010 is depicted. In FIG. 35B, a cross-sectional view of cartridge 1010 is depicted. In FIG. 36A a plan view of cartridge 1010, taken toward end piece 1012 is depicted. Example dimensions are as follows: XA=71 mm; XB=129 mm radius; XC=16 mm radius; XD=3 mm radius; and, XE=93 mm.

Figure 37A:
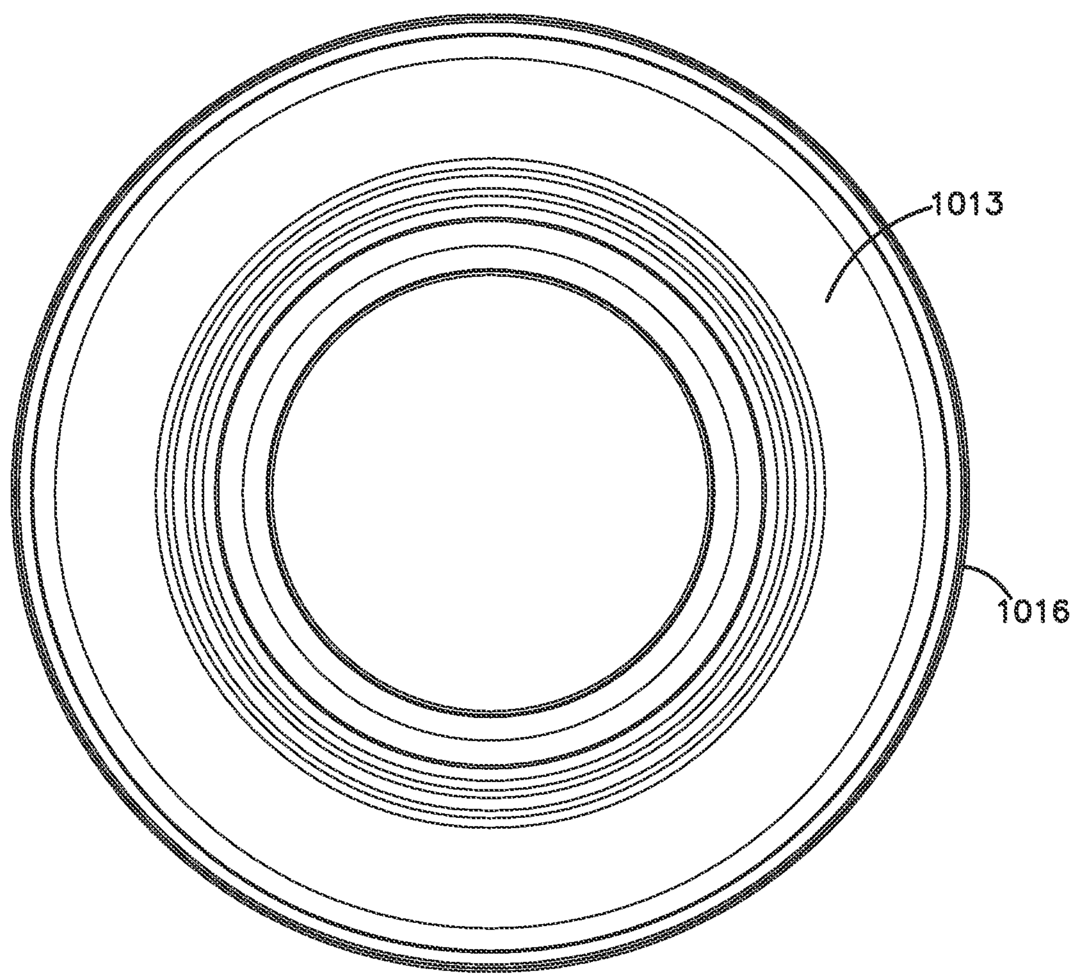
FIG. 37A is a plan view of a closed end of the filter cartridge of FIGS. 35A-35B.

In FIG. 37A, an end view taken toward end piece 1013 of cartridge 1010 is depicted.

F. Additional Comments regarding Advantageous Seal Features

As indicated above, there is no specific requirement that a filter cartridge or cartridge assembly include all of the features characterized herein, in order to obtain some advantage according to the present disclosure. Indeed, advantage can be obtained in some filter cartridges, by implementation of a preferred first seal configuration as characterized herein, in the presence or absence of a second seal configuration as characterized herein.

In many typical applications, with respect to application of an advantageous seal arrangement, the filter cartridge comprises media having first and second ends; the media typically surrounding and defining an open filter interior. A first open end cap is positioned in the first end of the media. It can be a molded-in-place end cap, with the first end of the media embedded therein, as described above. However, alternatives are possible.

A housing seal arrangement is positioned on the first end cap. In an example definition provided herein, the housing seal arrangement comprises a first radially directed seal surface having at least two, typically at least three, and preferably at least four, spaced, radially outwardly projecting seal surface projections. By "radially outwardly projecting seal surface sections" in this context, reference is meant to the direction the surfaces project out from a central axis, and not to the direction the surface faces to form a seal. Thus, the reference is to the shape of the "lobes" or sections themselves and not to the direction of sealing. Thus, the arrangement can have multiple radially outwardly projecting seal surface sections and be either an outwardly directed radial seal or an inwardly directed radial seal.

Typically, the outwardly projecting seal surface section is separated by non-straight seal sections, for example radially inwardly projecting seal sections, although alternatives are possible.

Typically and preferably, there are 4-12, inclusive, (often 4-10, inclusive) spaced, radially outwardly projecting seal surface sections. Alternatives are possible.

There is no specific requirement than the outwardly projecting surface sections are generally curved, or outwardly, convex but this will be typical. Also, they will typically be molded to a circular radius, although alternatives are possible. Similarly, when inwardly projecting seal surface sections are positioned between the outwardly projecting seal surface sections, typically they are curved (i.e. outwardly concave) and typically the curvature is to a circular radius, although alternatives are possible.

There is no specific requirement that the curvature of the outwardly projecting seal surface sections be the same as the curvature of the inwardly projecting seal surface sections. Indeed, in a selected depicted arrangement the outwardly projecting sections of seal surface are curved to a larger radius than the seal surfaces of the inwardly projecting seal surface sections, although alternatives are possible.

Typically, the seal definition is provided by material molded-in-place over (on) a support that also has radially outwardly projecting sections, and, in typical preferred arrangements, radially inwardly projecting sections.

Typically, the seal surface having the non-circular definition generally defined as above is a side surface of a receiving groove positioned in a molded-in-place end cap. An example is depicted in which the seal surface is a radially inside surface of such a groove, configured with a seal surface directed radially outwardly. Alternatives are possible.

Typically, the seal surface defined in this section, which is non-circular and includes the sections as defined, is positioned in overlap with an end of the media, with the seal surface recessed radially inwardly from an outermost portion of the media pack, and spaced radially outwardly from an innermost portion of the media. When the media is pleated, the indication is that the seal is typically positioned with a radial outermost extension spaced inwardly from the outer pleat tips and a radially inward most extension positioned radially outwardly from the inner pleat tips. Typically, the entire seal surface is spaced at least 3 mm from each of the inner and outer pleat tips.

Many of the principles described in this section with respect to a non-circular radial seal, can also be applied in connection with a second or outer radially directed seal, in accord with general principles described herein above in For example a secondary or outer seal can be provided which has a larger cross-sectional dimension than the largest cross-sectional dimension of the non-circular inner seal.

VII. Further Embodiments and Selected Variations, FIGS. 71-111

A. General

In FIGS. 71-111 some alternate principles and features applicable in arrangements supporting the present disclosure are provided. These features, in part, relate to optional alternate configurations for the primary seal that can be implemented to advantage. The optional alternate primary seal configurations can be used with a secondary seal or can be used in arrangements without a secondary seal and advantage can still be obtained.

Selected ones of the arrangements of FIGS. 71-111 also relate to a use of an optional indexing arrangement to facilitate alignment of the filter cartridge with a selected advantageous outlet tube configuration. These features can be used with the seal arrangement and variations described in connection with FIGS. 71-89, or with alternate seal arrangements as described herein.

Selected ones of the arrangements of FIGS. 71-111 also relate to variations in the optional secondary seal that can be applied in a variety of arrangements according to the present disclosure.

Further, selected variations lead to alternate seal and/or support types and approaches. These can be applied in various ones of the embodiments characterized herein, as desired.

It is noted also that selected ones of the embodiments of FIGS. 71-111 are depicted without the use of a resonator or sonic choke. A sonic choke or resonator in accord with the previously described embodiments can be incorporated as part of selected ones of the arrangements of FIGS. 71-111, if desired.

Selected ones of the embodiments of FIGS. 71-111 relate to alternate media types that can be used in arrangements according to the present disclosure. Also, selected ones of the embodiments relate to filtration of crankcase ventilation gases.

B. The Embodiments and Variations of FIGS. 71-89

Figure 71:
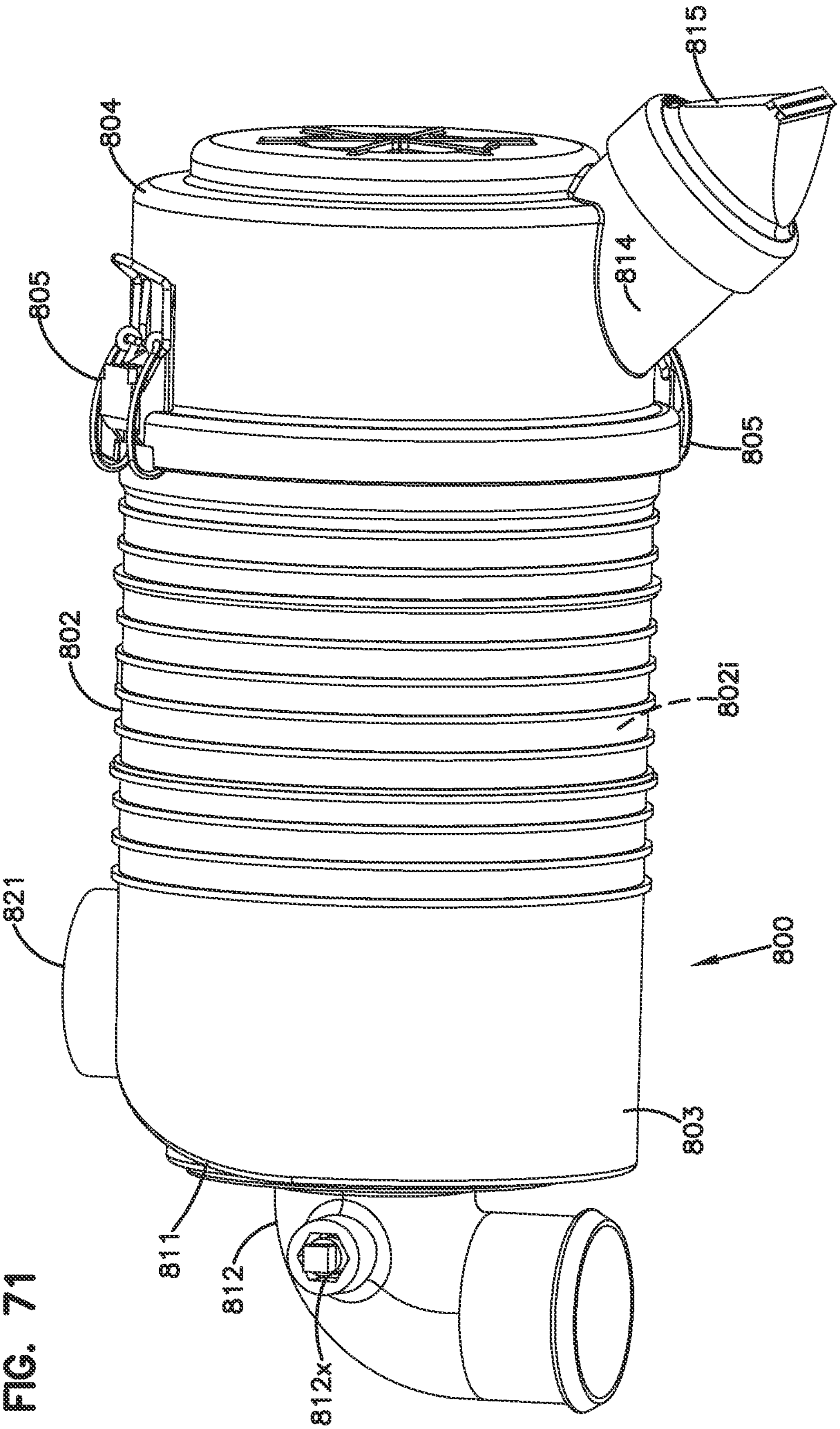
FIG. 71 is a schematic side perspective view of a third embodiment of an air cleaner assembly according to the present disclosure.

The reference numeral 800, FIG. 71 generally depicts an air (gas) cleaner (filter) assembly according to another filter (air cleaner) assembly embodiment of the present disclosure. Referring to FIG. 71, the filter (for example air or gas cleaner) assembly 800 is depicted as comprising housing 802 defining a main housing body 803 and access cover 804; the access cover 804 being removably secured to the housing body 803, for example by latch arrangement 805.

Figure 72:
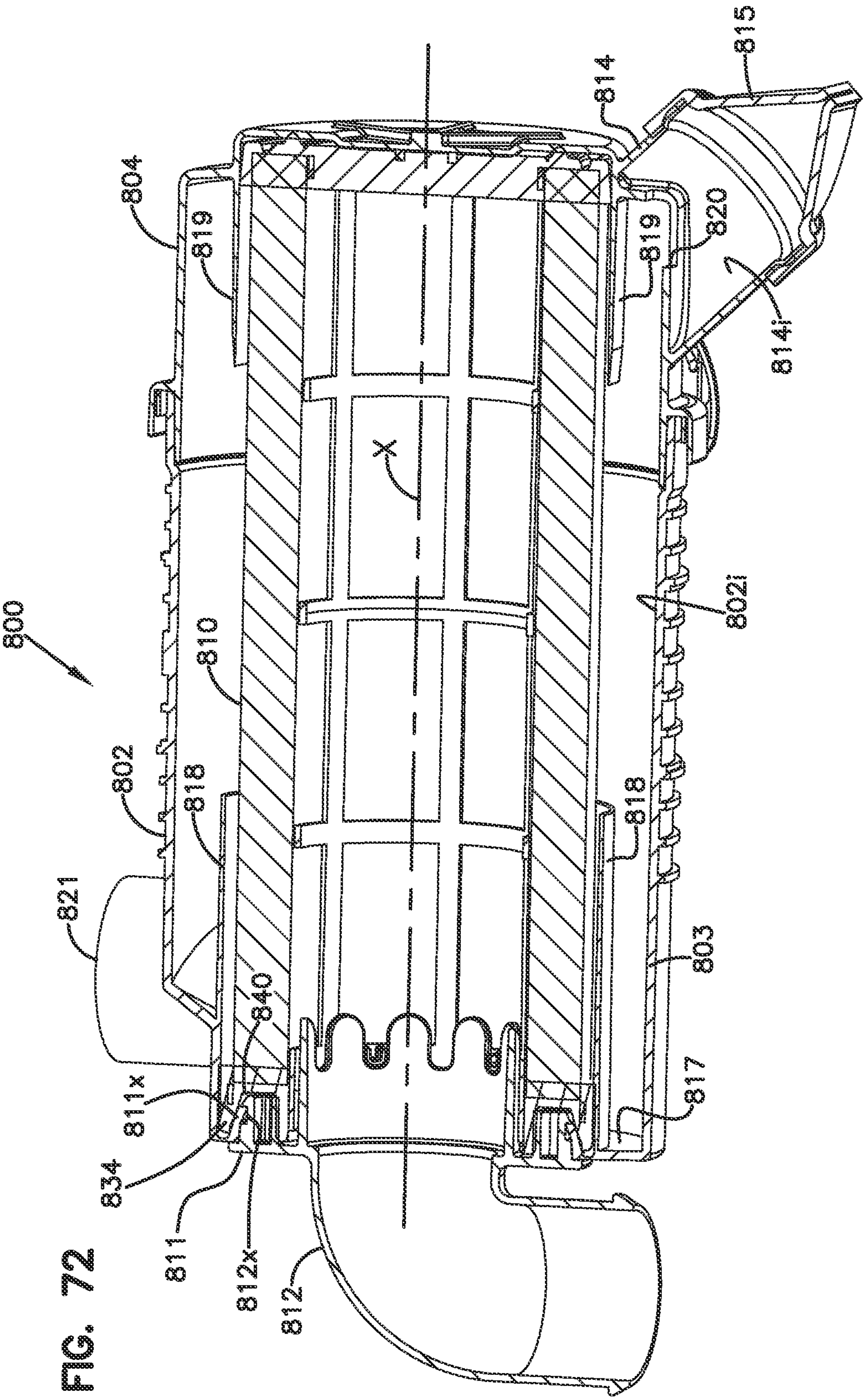
FIG. 72 is a schematic cross-sectional view of the air cleaner of FIG. 71.

The housing 802 defines an interior 802*i* in which is positioned a removable and replaceable, i.e. serviceable, filter cartridge component or cartridge 810 (not viewable in FIG. 71, see FIG. 72). The filter cartridge 810 is discussed in detail below.

Still referring to FIG. 71, the air (gas) cleaner assembly 800 includes, on housing 802, an end wall 811 with an air flow (outlet) tube 812 directed outwardly therefrom. Tube 812 will typically be, for a forward flow system as depicted, a clean air outlet tube used analogously to tubes 15, 512 discussed above. Tube 812 includes an optional pressure tap 812*x* thereon. The housing 802 depicted further includes an optional dust ejector tube arrangement 814 with an optional evacuator valve arrangement 815 positioned thereon.

The housing 802 can be provided with a mounting pad arrangement thereon, analogous to previously described embodiments, if desired. In the alternative, a clamp or additional arrangement can be releasably attached to the housing 802 to mount the air cleaner assembly 800.

Still referring to FIG. 71, at 821 a second air flow (inlet) tube to the air (gas) cleaner assembly 800 is depicted. Tube 821 will typically be used to direct unfiltered air (gas) into the housing 802. Tube 821 will typically be configured as a tangential air (gas) flow inlet tube, but alternatives are possible.

Attention is now directed to FIG. 72, a cross-sectional view of the filter (air cleaner) assembly 800. Filter cartridge 810 is viewable positioned within (air cleaner) housing interior 802*i*. An air flow inlet ramp arrangement is shown at 817. A shield section is housing body 803 is shown at 818; and, a shield section in access cover section 804 is shown at 819. Aperture 820 is positioned in access cover 804 for dust and water access to an interior of ejector tube 814 shown at 814*i*.

As thus far described, the assembly 800 is generally analogous to previously described assemblies 1 and 500. The features identified can be configured to operate analogously to similar features in connection with those embodiments.

A selected difference in the embodiments of FIGS. 71-89, from the previous described embodiment, is that the filter cartridge 810 is not depicted with a "sonic choke" or "resonator" therein. However, a sonic choke or resonator analogous to those previously described can be used with the embodiment of FIGS. 71-89.

Selected ones of additional differences of the embodiment of FIGS. 71-89 with respect to previously described embodiments, relate to the configuration of the (outlet) tube 812 where it is engaged by the filter 810; and, selected features of the filter cartridge 810 where it engages the (outlet) tube 812. These are discussed further below.

Figure 73:
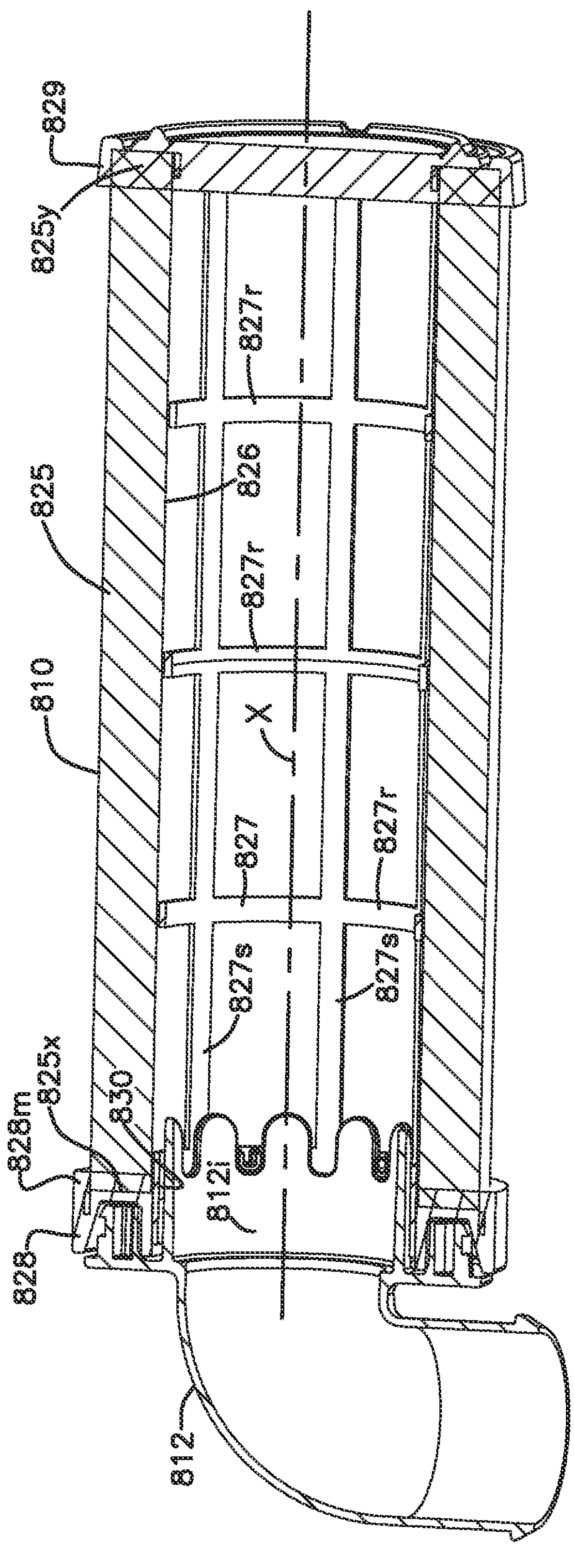
FIG. 73 is a schematic cross-sectional view of selected housing flow tube and filter cartridge features of the assembly of FIGS. 71 and 72.

Attention is first directed to FIG. 73, which depicts the (outlet) tube 812 and cartridge 810 in interaction with one another. That is, other portions of the air cleaner assembly 800, FIGS. 71 and 72 are not shown in FIG. 73, to facilitate understanding. Of course, the components depicted in FIG. 73 would typically be used in the environment of the overall air cleaner 800, FIG. 72.

Referring to FIG. 73, the cartridge 810 is shown in cross-sectional view. It is a service component usable in the air cleaner 800. Specifically, when access cover 804, FIG. 73, is removed from a remainder of the housing 802, cartridge 810 can be installed in, or be removed from, the housing 802.

In general, and referring to FIG. 73, the cartridge 810 comprises media 825, in the example positioned around an open filter interior 826 (and a central cartridge axis X) in extension between first and second end pieces (or end caps) 828, 829. It is noted that in FIG. 73, end piece 828 is positioned at an open end of the cartridge 810; and, thus, is an open end piece or end cap through which air flows during operation. In contrast, end piece 829 is depicted as a closed end cap, i.e. it has no central air flow aperture therethrough. This will be typical, although alternatives are possible with selected features described herein.

Typically, although alternatives are possible, at least a portion of 828*m* of end piece 828 is molded-in-place, typically with end 825*x* (or end portion) of the media 825 secured thereto, for example embedded therein. Also, although alternatives are possible, typically at least a portion of end piece 829 is molded-in-place, with end 825*y* of media 825 embedded therein. The media 825 can comprise pleated media although alternatives are possible. The particular selection of media 825 is a matter of choice for efficiency and lifetime of concerns. Generally media and media features such as those previously discussed can be used.

The media 825 is shown positioned in extension around an optional porous inner liner or central support 827 which, in the example depicted, comprises a lattice including a plurality of longitudinal sections 827*s* interconnected by ribs 827*r*. Alternate constructions for the optional support 827 can be used. However, in general, when used, the support 827 will be configured to be sufficiently porous for desirable (air) gas flow, and to be sufficiently structurally sound or rigid to support the media 825. Again, it can be configured as a resonator/sonic choke, if desired. Indeed, in some applications the media can be provided without an open interior, as discussed below.

End piece 828 is an open end piece with a central aperture 830 therethrough. In use, air flows through aperture 830. Also, an inner tube portion 821*i* of a housing flow tube 812 projects through aperture 832, in use.

Figure 78:
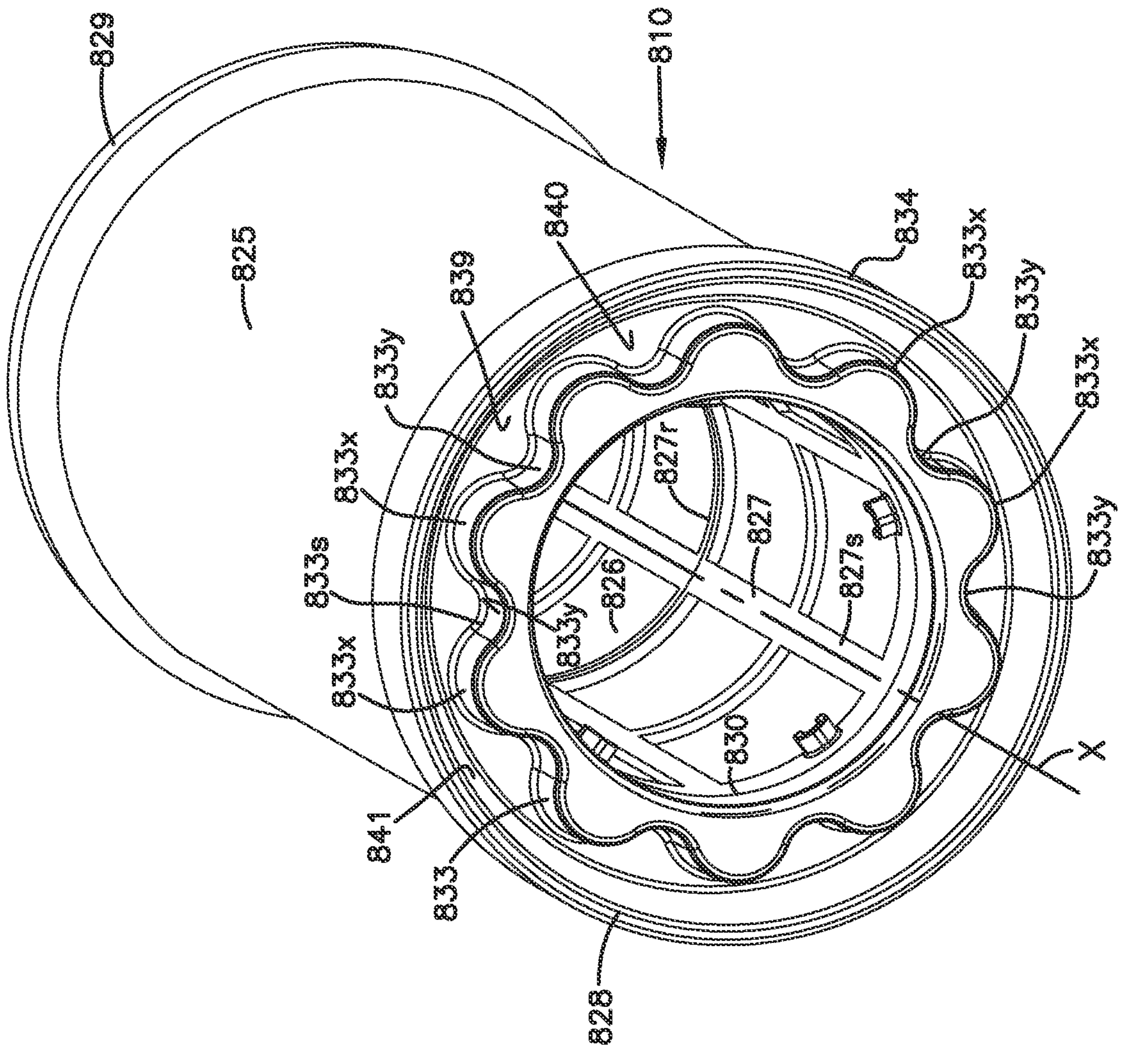
FIG. 78 is a schematic open end perspective view of the filter cartridge of FIGS. 74 and 75.

Referring to FIG. 78, a perspective view of cartridge 810 taken toward end piece 828, the central aperture 830 is viewable providing air flow therethrough in connection with open filter interior 826. End piece 828 includes a first, primary, seal arrangement 833 and an optional secondary seal arrangement 834. The optional secondary seal arrangement 834 may be configured and located generally analogously to seal arrangements 66, 534, previously discussed, but it can also be configured differently.

Figure 72A:
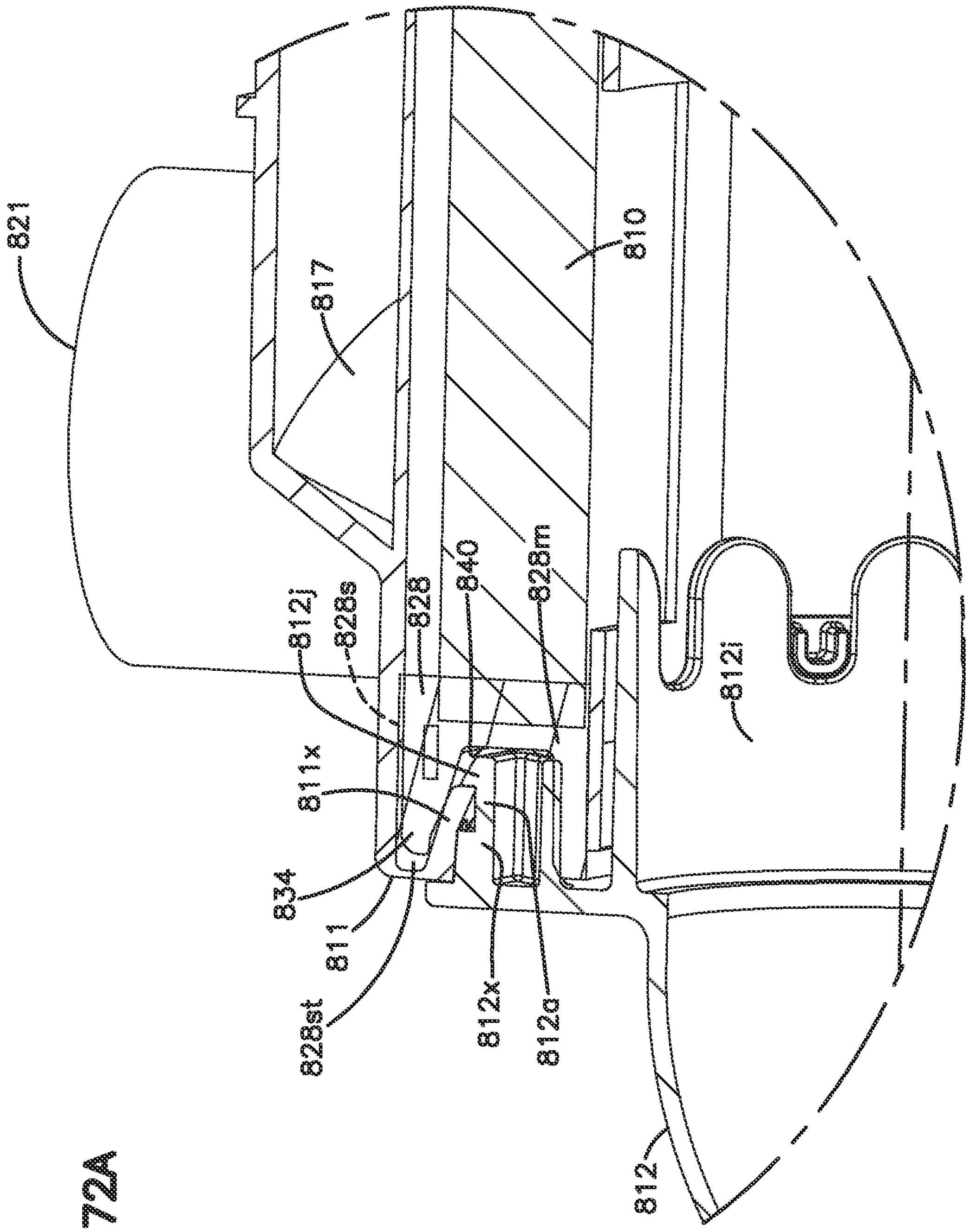
FIG. 72A is an enlarged, fragmentary, schematic view of a portion of FIG. 72.

Referring to FIG. 72A, an enlarged fragmentary view of a portion of FIG. 72, for the example, this optional secondary seal arrangement 834 is provided within a portion that can flex radially outwardly, due to the absence of a specific support therein. Thus, portion(s) of the housing/outlet tube that project(s) into the receiver groove can be configured to deflect region 834 outwardly, and to press region 834 against surrounding portions of the housing to form the secondary seal. Typically those portions of the (outlet) flow tube/housing that cause the deflection are configured so as not form a seal with region 834. It is noted that region 834 in some applications of the techniques described herein, can be provided with a rigid seal support therein, and operate without the described deflection, if desired.

Referring back to FIG. 79A, as with selected earlier embodiments, primary seal arrangement 833 is configured in the example depicted as a radially directed radial seal surface, positioned in axial overlap with an end of the media 825. The seal surface can be generally radially outwardly directed, as shown; but it can be alternately configured as a radially inwardly directed seal, if desired. The cartridge (and seal) central axis is indicated at X and the term "radially" in this context, consistent with previous descriptions, is meant to indicate toward (if inward) or away from (if outward) axis X. Indeed, if there were no cartridge axis X, the seal 833 would still be characterized as radial seal, since it would surround a central axis (corresponding to axis X) with seal forces generally either toward or away from that axis. This characterization of radial seal is a general one, applicable to any of the embodiments described herein.

Also, as with the earlier described embodiments, typically the primary seal arrangement 833 is preferably a "non-clamp", "non-clamping" or "clampless" seal arrangement in that no additional clamp is provided which needs to be tightened. Rather, the seal preferably establishes (on appropriate and proper installation in the cartridge 810 in an appropriate housing 802) without an additional clamp.

Still referring to FIG. 78, for the example cartridge 810 depicted, the primary seal 833 comprises a radially directed seal surface 833*s*, in this example defining a non-circular configuration although alternatives are possible. The example seal arrangement 833 depicted is a configuration having alternating outwardly projecting sections or lobes 833*x* (in the example outwardly directed convex sections) 833*x*, spaced by (in the example non-straight, typically inwardly projecting and in the example curved or concave) sections 833*y*. The particular number of outwardly projecting (in the example curved) seal surface lobes or sections 833*x* and inwardly projecting (in the example curved) sections 833*y* is not critical to obtain at least some advantage. Typically, the number of each will be at least two; usually at least three; and, can be (in accord with a previous described embodiments) of a number of at least four, for example within the range of 4-12, inclusive, sometimes 4-10, inclusive. However, in the particular example depicted, the number of sections 833*x* and sections 833*y* is 10 each; with a typical application involving 4-10, inclusive, such sections. However, again, the number can vary from this.

As with certain previously described embodiments, in alternate definitions, the seal surface 833 can be characterized as comprising a plurality of spaced lobes or radially outwardly projecting (outwardly convex) sections 833*x*, spaced from one another by (in the example non-straight, inwardly projecting, for example outwardly concave) sections 833*y* of surface 833. Typically, there at least two such outwardly projecting lobes or sections, usually at least three, often at least four and typically an amount within the range of 4-12, inclusive, for example 4-10, inclusive, although alternatives are possible.

Still referring to FIG. 78, in the example depicted, surrounding the primary seal member surface 833*s* is optional recessed surface or portion 839, which, in the example depicted, is a recess, receiver or receiving groove 840. The recess, receiver or receiving groove 840 is a receiver positioned, and defined, to receive, projecting therein, a portion of the housing end 811 and/or tube 812, analogously to receivers 73, 540, previously described. This will be discussed in further detail below.

It is noted that the principles described herein in connection with seal 833 can be applied when seal surface 833 is not surrounded by a recessed or receiving groove. That is, seal surface 833 can comprise a seal surface on a projection of end cap 828. Indeed this is the case with certain of other embodiments described herein as well. However, it is convenient and advantageous to provide a recess, receiver or receiving groove 840 surrounding the surface 833*s*, in arrangements including all of the various features discussed herein.

For the particular cartridge 810 depicted, the receiver, recess or receiving groove 840 can be viewed configured with a radially inner wall forming surface 833 that is preferably non-circular in definition around axis X as described; and, a radially outer wall 841 of the groove 540 that is generally circular in definition around central axis X, although alternatives are possible.

In FIG. 72, the recess, receiver or receiving groove 840 can be seen with a portion 811*x* of housing end 811 and a portion 812*x* of outlet tube 812 projecting therein. In connection with this attention is also directed to FIG. 72A, an enlarged fragmentary view of a portion of FIG. 72.

Again, as discussed previously, the particular secondary seal 834 depicted is configured so that portion 811*x* of the housing and portion 812*x* of the outlet tube will deflect a non-supported end region of secondary seal arrangement

834 outwardly, to engage a seal tube surrounding sections of the housing. This optional deflection can be useful in instances where, for size concerns, it may not be desired to provide a rigid support within end regions of the secondary seal 834. It can be applied with many of the variations discussed herein, for optional secondary seals.

Figure 75:
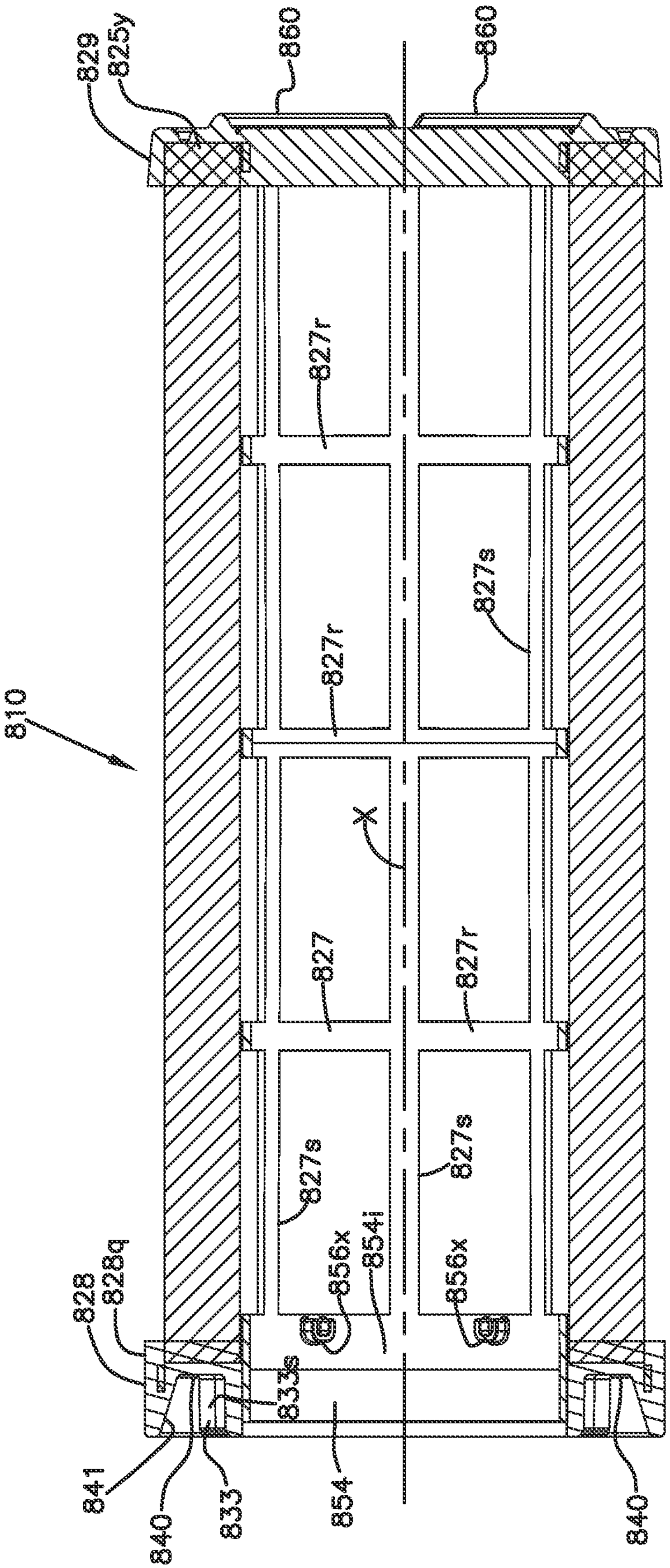
FIG. 75 is an enlarged, schematic, cross-sectional view of the filter cartridge component depicted in FIG. 74.

In FIG. 75, the cartridge 810 is depicted in cross-section, and the recess, receiver or receiving groove 840 (having inner wall 833 and outer wall 841) is readily viewable. The groove 840 can be dimensioned as previously described with analogous features, if desired.

Figure 84:
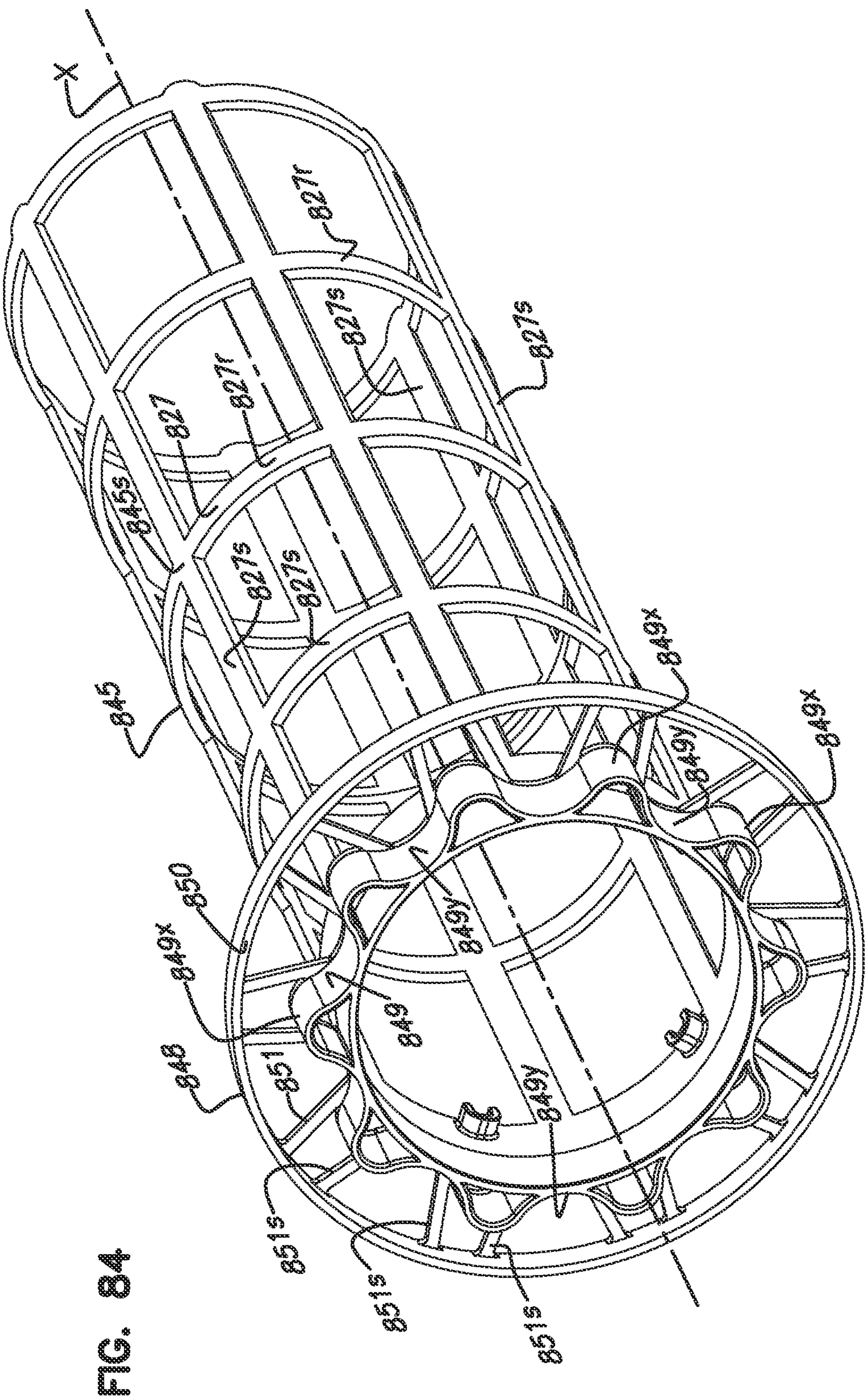
FIG. 84 is an enlarged, schematic, outlet end perspective view of a component of the filter cartridge component depicted in FIGS. 74 and 75.

In FIG. 84, a support structure or central support 845 for the cartridge 810 is shown. The support 845 can be made as a preform and used in proportion as cartridge 810 as the support 827, FIGS. 72 and 73. Consistent with alternative arrangements described above, the support 845 can, in an alternate application, be configured to define a resonator/sonic choke. However, the particular support 845 depicted includes a central section 845*s* that defines a central cartridge support 827 that is porous but does not operate as a resonator/sonic choke. Rather, it comprises a lattice structure of elongates strips 827*s* interconnected by ribs 827*r*.

Analogously to support 545, support structure 845 includes an end structure 848 comprising an inner seal support or hub 849 spaced from, and surrounded by, optional outer rim 850. Spanning the gap between the hub 849 and rim 850, is provided an optional open grid arrangement 851, comprising struts 851*s*. Typically, the seal support 849 will be embedded in a molded-in-place portion of end piece 828 (and seal arrangement 833) in use, providing support for control of compression in installation. Thus, hub 849 operates in many ways analogously to similar portion of supports 105, 549. The particular hub 849 depicted, includes a continuous wall having a non-circular shape preferably comprising a plurality of radially outwardly projecting (in the example curved) support sections 849*x* alternating with radially inwardly projecting (in the example curved) seal sections 849*y*. (Alternatively, in the example depicted, hub 849 can be characterized as non-circular and comprising a plurality of lobes 849*x* separated by, in the example, non-straight, radially inwardly projecting sections 849*y*).

The number of radially outwardly projecting (for the example curved) sections 849*x*, and inwardly (for the example curved) sections 849*y*, when the shape is as shown, is appropriate for the seal configuration. Thus there are typically at least two of each, usually at least three of each, and often at least four of each, for example 4-12, inclusive.

Referring to FIG. 84, it is noted that in the example depicted, the non-circular seal support section of hub 849 is solid and continuous, i.e. it does not have lateral apertures or slits therethrough in extension axially beyond struts 851 toward tip 849*p*. As with previously described embodiments, this will be typical, although alternatives are possible.

The optional outer support 850 and struts 851 may be generally analogous to support 550 and struts 551 or support 108 and struts 110, previously discussed. However, in the particular embodiment depicted, the outer hub 850 differs in that it is shorter in extension toward tip 849*p*; and, the edge or tip 849*p* is continuous and has no slots or slits therein. In some instances, hub 850 can be left off with struts or projections 851*s* outwardly shaped to terminate in a molded-in-place portion of end piece 828.

Still referring to FIG. 84, it is noted that for the particular arrangement depicted the support structure 845 is configured with the seal support or end structure 848 integral with a portion that (comprising the lattice structure) is surrounded by the media. This is optional and preferred in many instances for convenient manufacture. However, there is no specific requirement that support structure be a single integral piece, and portions that support the seal(s) can be constructed separate from optional portions that support the media. Further, the materials of the two sections can be separate, one being plastic, the other metal if desired. When both sections are present but not integral with one another, they can be secured in place by both being embedded in molded-in-place material of the end cap, or they can be attached to one another prior to cartridge assembly.

It is also noted that when the optional outer rim 850 is used to support a seal, it does not need to be attached to remainder of the end structure 848 by rigid connection if desired. For example, a ring (or seal support) that is not attached to a remainder of the support structure 845, can be used if desired. Further, there is no specific requirement that support structure within outer portions of the end piece be circular, or be continuous in construction.

Figure 85:
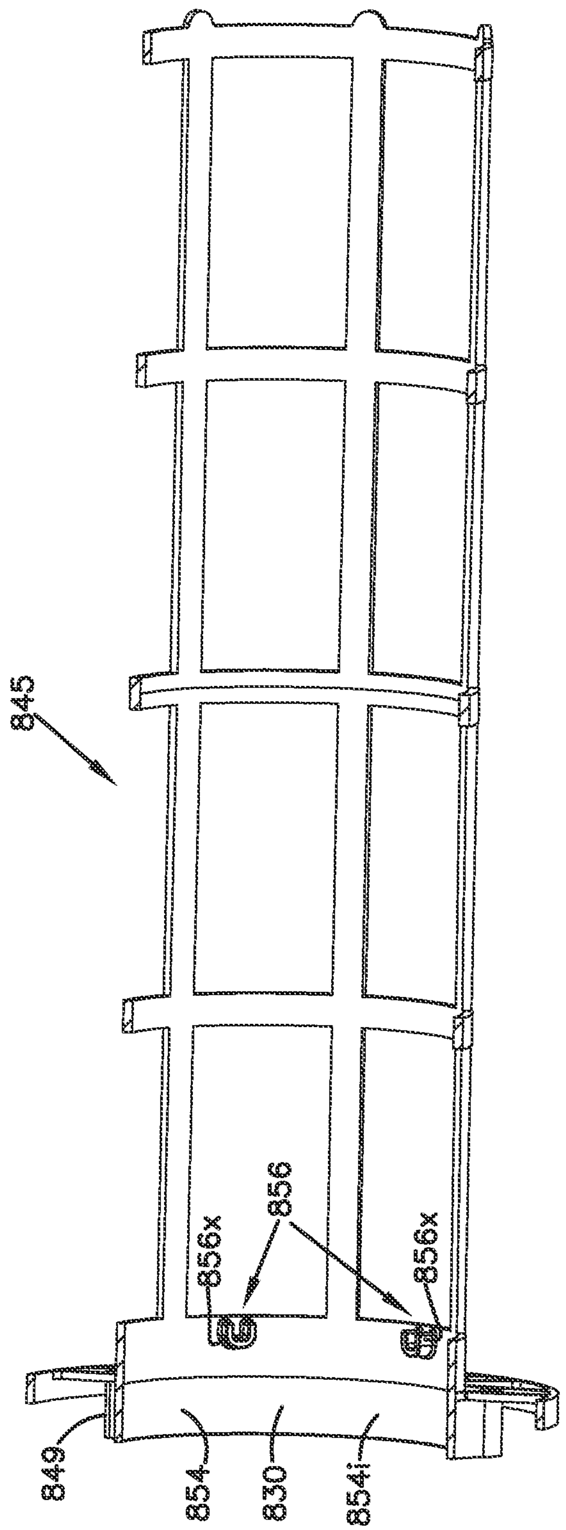
FIG. 85 is a schematic side cross-sectional view of the component depicted in FIG. 84.

In FIG. 85, a side cross-sectional view of support 845 is depicted. Surrounded by section 849, support 845 includes an end internal ring structure 854 which, in part, defines outlet aperture 830 through end cap 828, FIGS. 73 and 75, and the resulting cartridge 810. Support section 854 (or more generally cartridge 810) includes a typically radially inwardly facing (or inner) surface 854*i* having thereon a first member 856 of a cartridge-to-outlet tube (or outlet tube-to-cartridge) rotational alignment arrangement. The first member 856 in the example depicted, comprises one or more (and in the example a plurality of) spaced projection(s) 856*x* on surface 854*i*, typically projecting radially inwardly, i.e. toward central cartridge axis X, FIG. 75. For the particular example depicted, the projections 856*x* are non-circular. In the example the projections 850*x* are u-shaped, with the open end of the u generally directed toward the cartridge closed end cap 829; and, with the arrow or curved end directed toward the outlet 830, i.e. away from the closed end cap 829 and/or the second end of the media. This will be typical and advantageous for reasons discussed below. However, alternate shapes and orientations are possible. Non-circular projections 856*x* will be typical and preferred.

In more general terms, at least one, and typically each, projection 856*x* has a non-circular shape with a narrow end and a wider portion (typically an end). The narrower end is generally further from the second end of the media, than the wider portion (typically an end). In the example depicted of a u-shaped projection, the narrow end is the center or curve of a u and the wider portion (in the example an end) is the ends of the sides of the u. Of course, a "diamond" or "oval" shape could be used as a variation, in which a narrow end is directed away from the second end of the media, i.e. analogously to the "u" and with a wider portion (in this example, a central portion) closer to the second media end.

Figure 87:
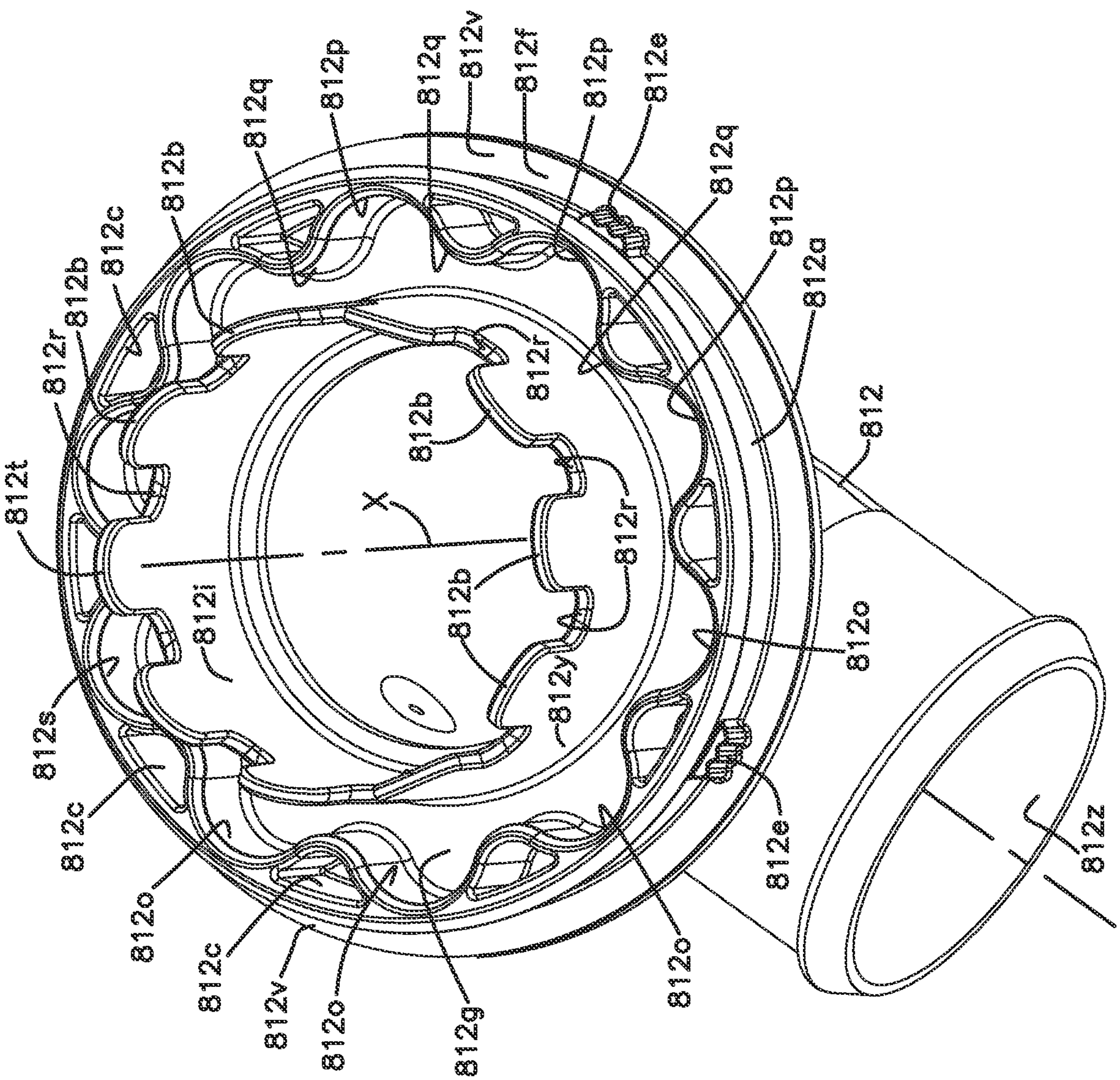
FIG. 87 is an enlarged, schematic, perspective view of a housing tube component of the assembly depicted in FIGS. 71 and 72.

Attention is now directed to FIG. 87. In FIG. 87, the flow (outlet) tube 812 is depicted. Herein, the flow tube 82 is characterized as a portion of the housing 802. In use, the outlet tube 812 is typically secured to a remainder of the housing 802 at end 811. In general, the outlet tube 812 can be viewed as having the following general features: mounting flange arrangement 812*f*; seal surface 812*s*; internal flow tube section 812*i* and external flow tube section 812*z*. In general terms, the mounting flange arrangement 812*f* provides for mounting of the flow tube 812 on end 811 of the housing 802, as discussed below. The seal surface or seal member 812*s* is a surface against which a seal on the cartridge 810 seals when the cartridge is installed. The inner flow tube section 812*i* projects into the housing and defines a flow tube section that projects into interior 830 of the cartridge 810 to receive gas flow therefrom, once filtered. Further, the flow tube 812*i* includes features for rotational indexing with the cartridge 810, discussed in more detail below. The exterior flow tube section 812*z* is a conduit for directing filtered gas flow outwardly from the housing 803. The particular exterior flow tube 812*z* depicted has a right angle turn or elbow, although alternatives are possible, as with previously described embodiments.

Attention is now directed to the inner flow tube section 812*i*. The inner flow tube section 812*i* includes a tip end, or edge 812*t*, that projects most interiorly of the housing 802, that has at least one recess and typically a plurality of recesses 812*r* therein. The recesses, 812*r* are spaced from one another by projections or tabs 812*b*. For the particular assembly depicted, there are 10 spaced recesses 812*r*, but the specific number is not critical to obtaining some advantage.

The recesses 812*r* are each sized to receive therein a projection 856*s*, FIG. 85, on the cartridge 810. The recesses 812*r* are rotationally located, around central axis X, so that they can only receive the projection(s) 856*x*, FIG. 75, if the cartridge 810 is appropriately rotationally oriented around central axis X. This rotational indexing is configured so that receipt of a projection(s) 856*x* into the recess of 812*r* can only occur when a rotational alignment of the cartridge 810 around the axis X is such that the seal lobes 833*x* are appropriately oriented relative to receiving sections 812*o* of the seal surface 812*s* for convenient and appropriate sealing.

In general terms, the projections 856*x* comprise a first member of a cartridge-to-outlet tube (or outlet tube-to-cartridge) rotational (indexing) alignment arrangement; and, the recesses 812*r* comprises second member of a cartridge-to-outlet tube (or outlet tube-to-cartridge) rotational alignment (indexing) arrangement. Alternately stated, the assembly 800 includes a projection/receiver (indexing) arrangement that operates as rotational alignment (indexing) arrangement between the cartridge 810 and the outlet tube 812, such that the cartridge 810 can only be installed fully in the housing 802, when the cartridge 810 is rotated around central axis X such that it is in one of one or more selected rotational orientations that allow(s) for full insertion with the seal appropriately aligned. It is noted that for the particular example depicted, the projection arrangement is positioned on the cartridge and the receiver arrangement is positioned on the housing, i.e. on the outlet tube 812. However, alternative arrangements are possible.

It is noted that for the particular example depicted, the cartridge 810 includes a member of a rotational alignment arrangement 856 that comprises 5 (typically 2-8) spaced projections 856*x*, however the number is not specifically critical. What is important is that interference occurs unless the cartridge 810 is appropriately radially aligned around axis X.

It is noted that there are more receivers 812*r* than there are projections 856*x*. This is typical, but not specifically required. The number of recesses 812*r* is selected so that as the service provider is installing the cartridge, if desired rotational alignment does not initially occur, it takes relatively little rotation of the cartridge to achieve sufficient alignment for full insertion to occur.

It is noted that typically each of the projections 856*x* is sized and shaped so that when received within properly receiver 812*r*, it does not actually engage outlet tube section 812*i* in direct contact. This will be preferred, but is not required in all applications.

Also, it is noted that the non-circular, for example "u-shape" to the projections 856*x* provides for convenient arrangement in that if it is bumped into the tip 812*t* during installation, it can easily be rotated without catching, yet the u-shape provides for a construction that is not readily broken off. This is facilitated by the narrow end and wide section as described. Alternatives are possible.

It is noted that generally, the projections 856*x* are positioned so that they will engage tips 812*t* before the non-circular seal arrangement of the seal lobes 833*x* starts to insert substantially into engagement with a seal surface 812*x*. A reason this may be preferred is so that the cartridge will need to be properly rotationally aligned before the end of the cartridge adjacent the seal surface bumps into or interferes with portions of the structure that forms surface 812*s*.

It is noted that the projection selection receiver range revolving recesses 812*i* and projections 856*x* can be applied with features that occur with alternate embodiments described herein.

Still referring to FIG. 87, attention is now directed to recess or groove 812*g* positioned between tube 812*t* and seal surface 812*s*. The recess or groove 812*g* is a receiving groove, for receiving, projecting therein, a portion of cartridge 810 during cartridge installation. In particular, the groove 812*g* is sized and configured to receive a portion of end piece 828 indicated generally at 828*p*, FIG. 78. That portion 828*p* of end piece 828 comprises a projection having an outer surface comprising seal surface 833.

As discussed previously, seal surface 833 is non-circular, and in the example shown, comprises a plurality of radially outwardly projecting sections 833*x* separated by radial inwardly projecting recesses 833*y*.

Referring now to FIG. 87, groove 812*g* is defined between inner wall 812*y* and outer wall 812*o*. One of the walls 812*y*, 812*o* will generally be configured as a sealing surface for the cartridge 810. For the particular embodiment depicted, since the cartridge 810 has a seal surface 833 that is radially outwardly directed, the seal wall (indicated at 812*s*) of the groove 812*g* will be the outer, radially inwardly facing, wall 812*o*.

The seal surface 812*s*, then, has a shape and definition that is also non-circular, and conforms to the seal surface 833 in a manner such that when engaged by the seal surface 833, sealing, through some compression of the material and projection 828*p*, occurs. Thus, given the particular shape of surface 833 described previously, surface 812*s* comprises a plurality of radially outwardly projecting regions 812*p* spaced from one another by regions 812*q*. For the example depicted, the regions 812*q* are non-straight, and are typically radially inwardly projecting. Thus, regions 812*p* are inwardly concave (or outwardly convex) and regions 812*q* are inwardly convex (or outwardly concave).

Regions 812*p* and 812*q* are located, radially, around central axis X such that alignment with surface 833 for full assertion and sealing will occur when the rotational indexing between the projections 856*x* and the recesses 812*r* occur.

When the arrangement is generally as described herein, the number of sections 812*p* and the number of sections 812*q* will generally match the corresponding number of similar regions on the cartridge 810 although alternatives are possible. Typically, the number of radially outwardly projecting sections 812*p* will be at least two, usually at least three, often at least four, typically 4-12, inclusive, often 4-10, inclusive, although alternatives are possible. In the example, there are 10 sections 812*p*, but alternatives are possible.

Still referring to FIG. 87, attention is directed to mounting flange 812*f* The mounting flange 812*f* comprises a radially outwardly directed rim section 812*v* and an axial section 812*a*. The axial section 812*a* forms a rim around region 812*f* It is noted that apertures 812*c* are positioned in rim 812*a*, at a location aligned with inwardly projecting sections 812*q* of surface 812*s*. These apertures 812*c* help to ensure there is some spring in the material of the ridge 812*a* at this location and also to help ensure even cooling of the plastic.

The projection 812*a* is sized and configured for snap-fit engagement with a remainder of the housing. Further, the rim or projection 812*a* includes spaced interference section 812*e* thereon, for engagement with the remainder of the housing at end 811 as discussed below, for rotational stability.

Referring to FIG. 72A, as indicated previously at 811*x*, a portion of the housing end 811 is depicted, projecting axially inwardly. The tube 812 is mounted by pushing flange 812*a* into an aperture defined by flange 811*x*, and into engagement with flanges 811*x*. As shown, the flange 812*a* includes an end projection 812*j* to facilitate snap-fit engagement. Further, an interior surface of projection 811*x* can be fitted with grooves or ribs, for rotational interlock with projections 812*e*, FIG. 87, to facilitate rotational alignment.

Still referring to FIG. 72A and also FIG. 72, other features previously described can be used. For example the end cap or end piece 828 can be provided with an optional outwardly directed radial perimeter seal 828*s* positioned to engage a surrounding portion of the housing 802, if desired. This secondary seal is optional, however, as previously indicated. When a secondary seal is used, typically it is larger than the first seal, in cross-sectional dimension, as previously discussed for alternate embodiments. As discussed, the perimeter seal 828*s* can be configured to radially deflect, or it can be provided with an internal support. Also, the tip portion 828*st* of the outer seal 828*s* can be provided as a continuous ring, but alternatives (such as a discontinuous ring with recesses therein) are possible). An example recess is shown in phantom line in FIG. 74 at P.

Figure 79:
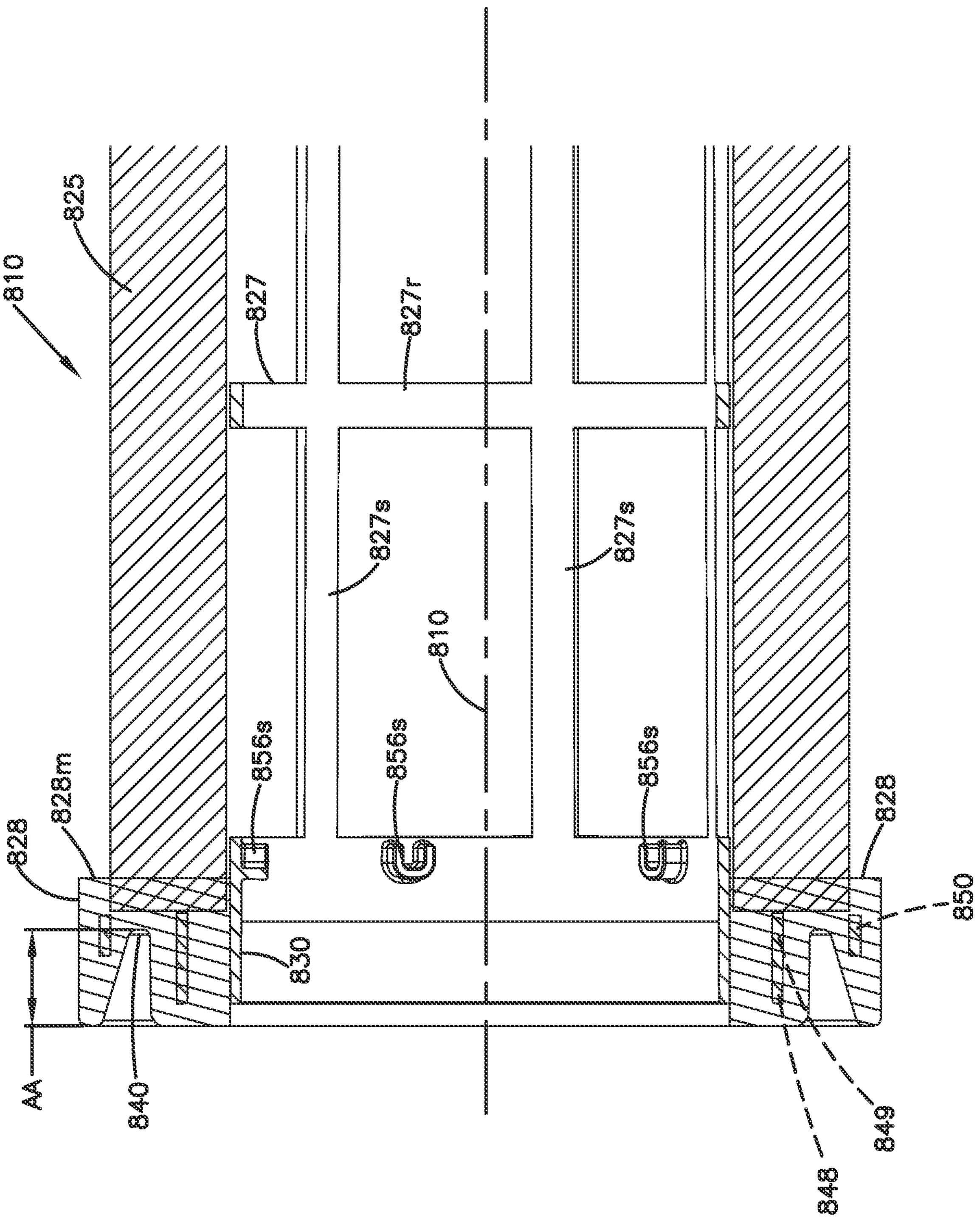
FIG. 79 is an enlarged, fragmentary, schematic cross-sectional view of the selected portion of the filter cartridge depicted in FIGS. 74 and 75.
Figure 83:
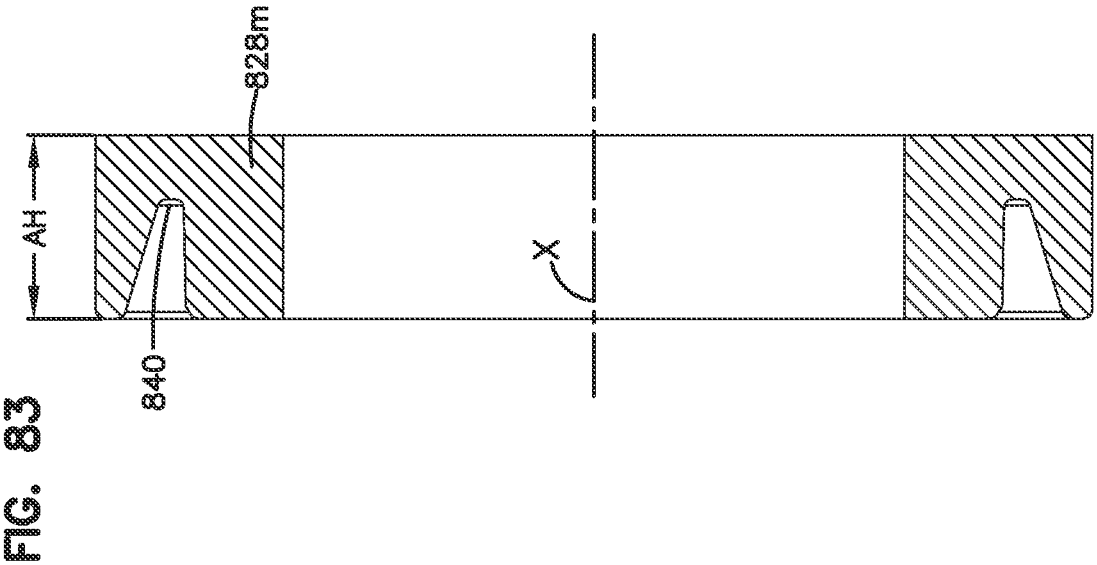
FIG. 83 is an enlarged, schematic, cross-sectional view of the molded end cap portion depicted in FIG. 82.
Figure 82:
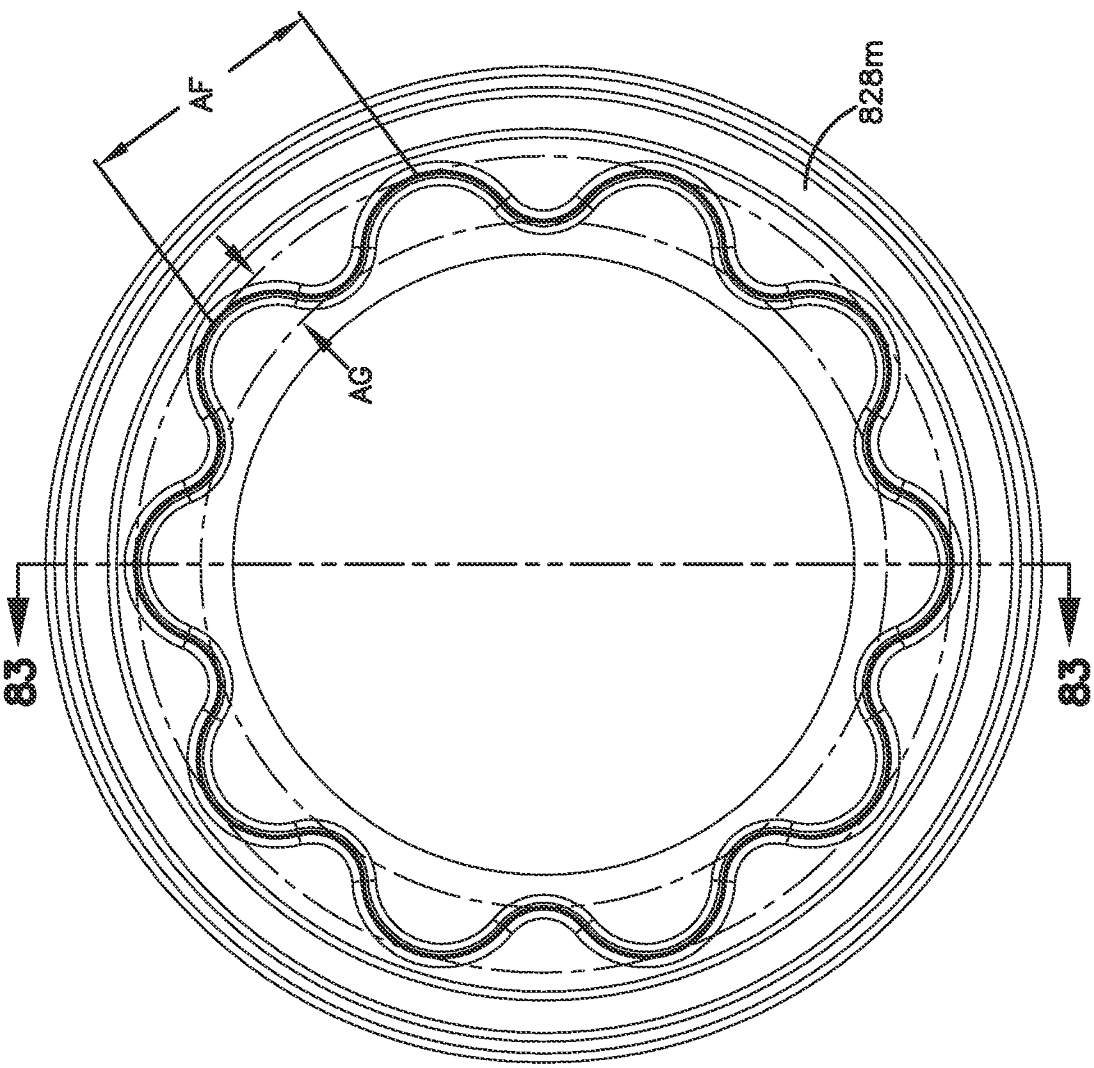
FIG. 82 is an enlarged, schematic, end plan view of a molded end cap portion of the cartridge depicted in FIG. 77.

Typically portion 828*m* of the end cap will be molded-in-place, for example, from a moldable urethane or similar material, having portions of framework 845, FIG. 85 embedded therein, as can be seen by reference to FIG. 79. In FIGS. 82 and 83 molded portions of 828 are depicted as they would appear if they had no structural material embedded therein, but the same perimeter definition.

Figure 74:
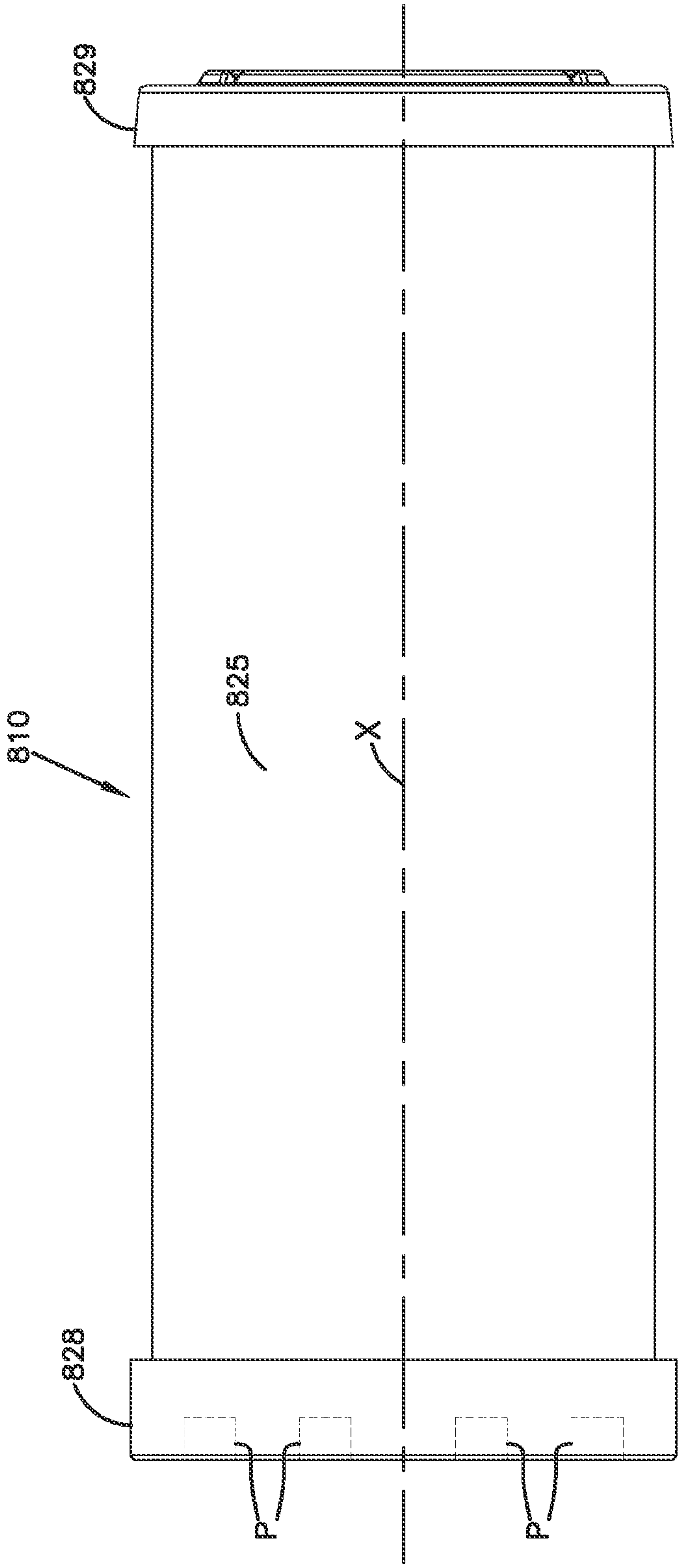
FIG. 74 is a schematic side elevational view of the filter cartridge component usable in the assembly of FIGS. 71-73.

Remaining ones of the figures depicted in the embodiment of FIGS. 71-89 are generally depicted as follows. In FIG. 74 a side elevational view of cartridge 810 is depicted, schematically. The media 85 can be seen extending between end pieces 828-829. Central axis X is depicted.

Figure 76:
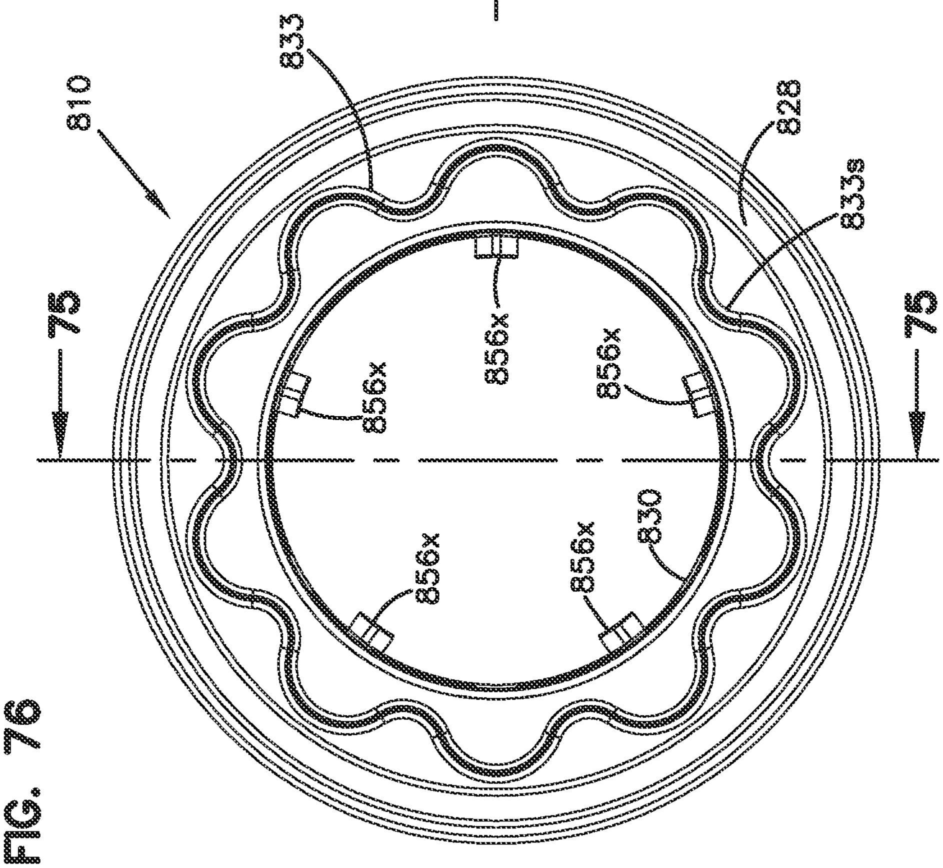
FIG. 76 is an enlarged, schematic, end view of an open end of the cartridge of FIGS. 74 and 75.

In FIG. 76 an end view of cartridge 810 is depicted, taken generally toward end piece 828. The first or primary seal arrangement 833 is viewable, with radially outwardly directed seal surface 833*x*. Also viewable through aperture 830 are projections 856*x*. It is noted that a cross-sectional line FIG. 75 is depicted in FIG. 76.

Figure 77:
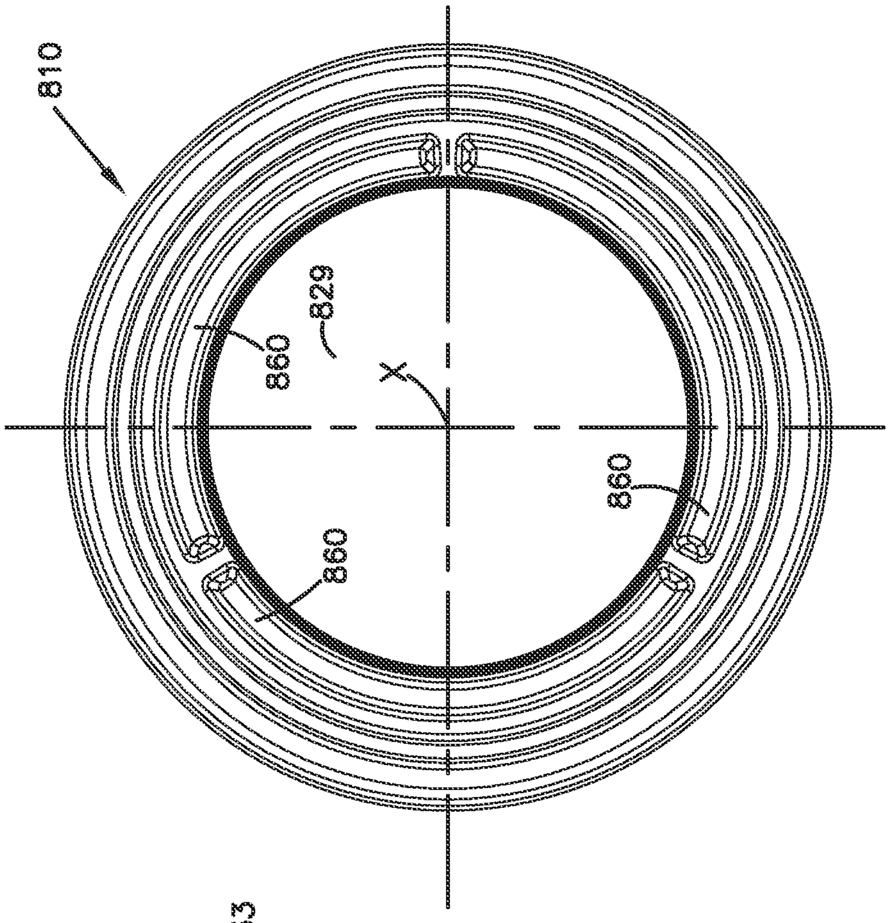
FIG. 77 is an enlarged, schematic, end view of a closed end of the filter cartridge of FIGS. 74 and 75.

In FIG. 77 an end view of cartridge 810 taken generally toward end piece 829 is viewable. End piece 829 is depicted with a projection ring 860 molded to a portion thereof, in the example depicted as a segmented ring. Projection 860 can engage the access cover, and provide stabilization to the cartridge 810 when installed.

In FIG. 79, an enlarged fragmentary cross-sectional view of a selected portion of the cartridge 810 is provided. Portions of end piece 848, included seal support 849 and outer rim 850 can be seen embedded within molded in place end piece 828.

Figure 80:
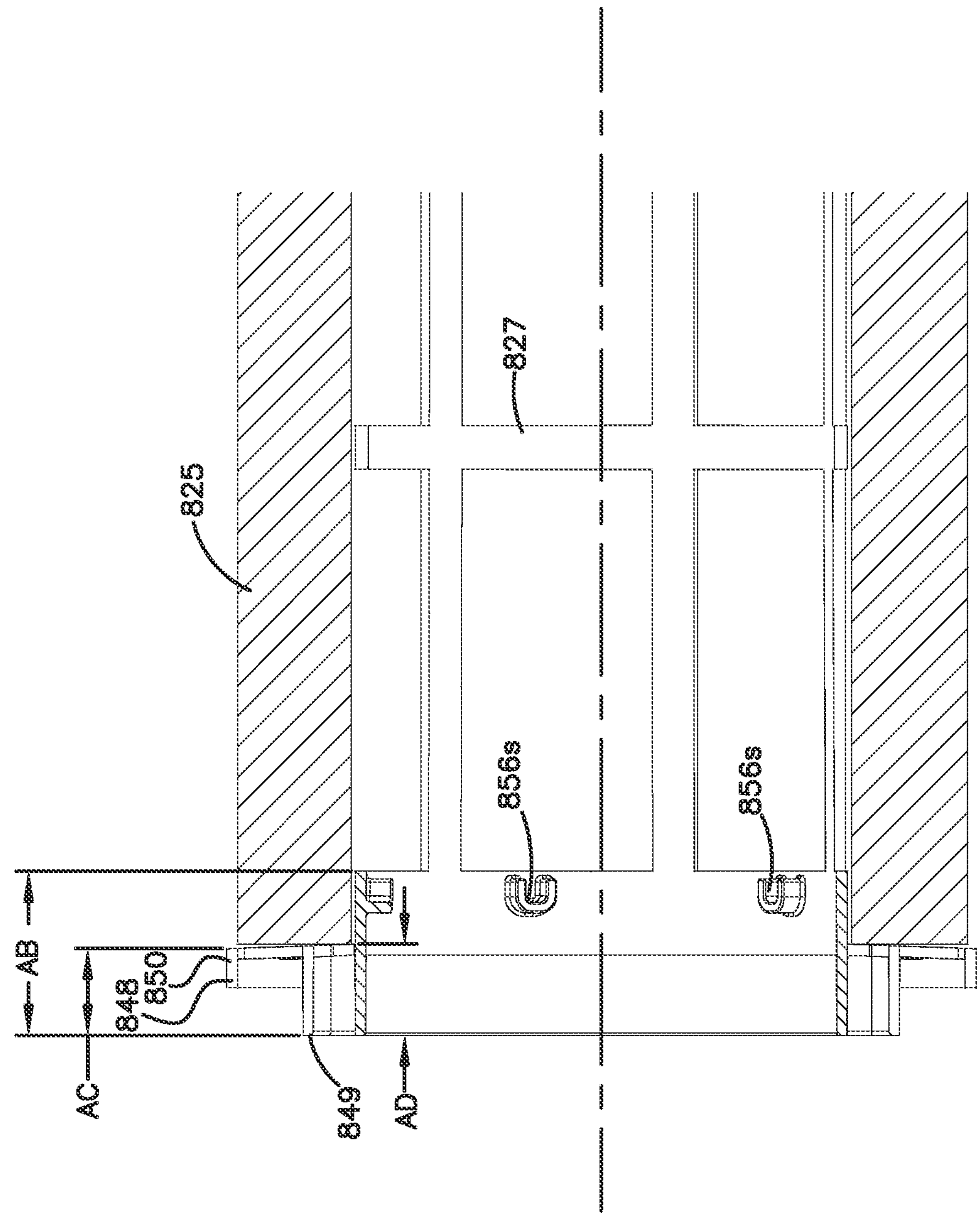
FIG. 80 is an enlarged fragmentary, schematic, cross-sectional view of a portion of the filter cartridge depicted in FIG. 79, but without a molded end cap potting that is viewable in FIG. 79, thereon.

In FIG. 80, structural portions of FIG. 79, but without molded in place portion 828, m of end piece 828 are depicted. In particular, media 825 is shown, in extension around support 827. Axial alignment between the media 825 and end portion 848 of the support is viewable. It can be seen that the strut 851, FIG. 84, generally slant away from the media 825 in radial outward extension, consistent with previous described embodiments. In general, the construction of FIG. 80 can then be placed in a mold along with resin, to form the overmolded or molded portion 828*m* of the end cap 828, FIG. 79.

In positioning the structure of FIG. 80 in the mold, projections 856 can be used to provide radial orientation with respect to the mold, analogously to fins or projections 626, FIG. 65, with the mold as appropriately configured. Thus, the projections 856*x* can be used for two purposes: to control molding of portion 828*m* of the end cap 828 in providing a desired and configuration; and, to provide rotational indexing with respect to a housing, in particular outlet tubing internal section 812*i*, as previously described.

Figure 81:
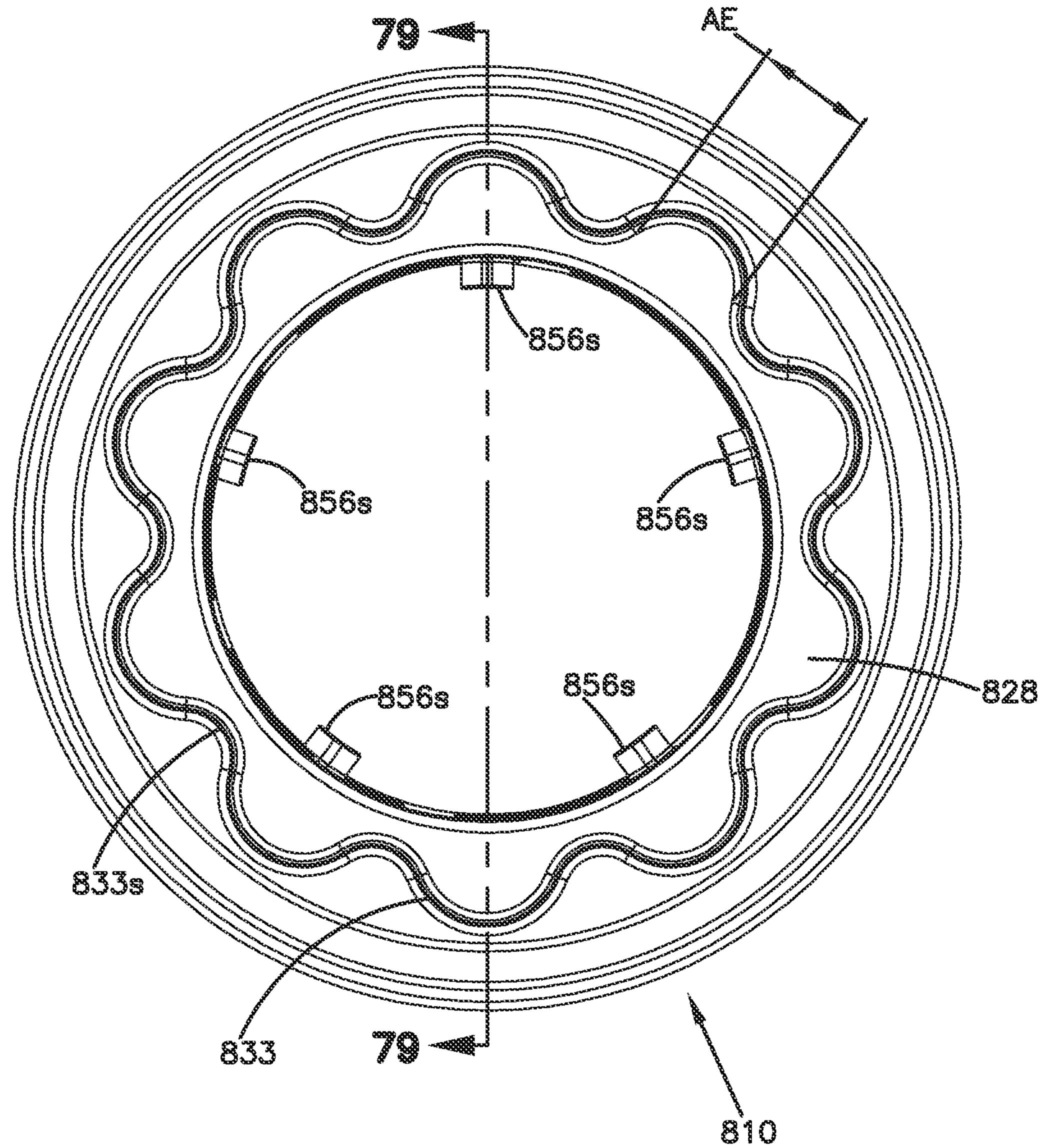
FIG. 81 is an enlarged, schematic, view generally analogous to FIG. 76, but with selected dimension information provided.

In FIG. 81, an end view of cartridge 810 taken toward end piece 828 is provided. It generally defines the cross-section line for FIG. 79.

In FIG. 82, a schematic plan view of molded-in-place portion 828*m* of the end piece 828 is depicted. In FIG. 83, a cross-sectional view of that molded-in-place portion 828*m* is provided. It is noted that FIG. 83 generally shows the perimeter definitions of the molded-in-place portion 828*m*. Of course, in an actual cartridge, structural material would be embedded within the end portion 828*m*.

Figure 86:
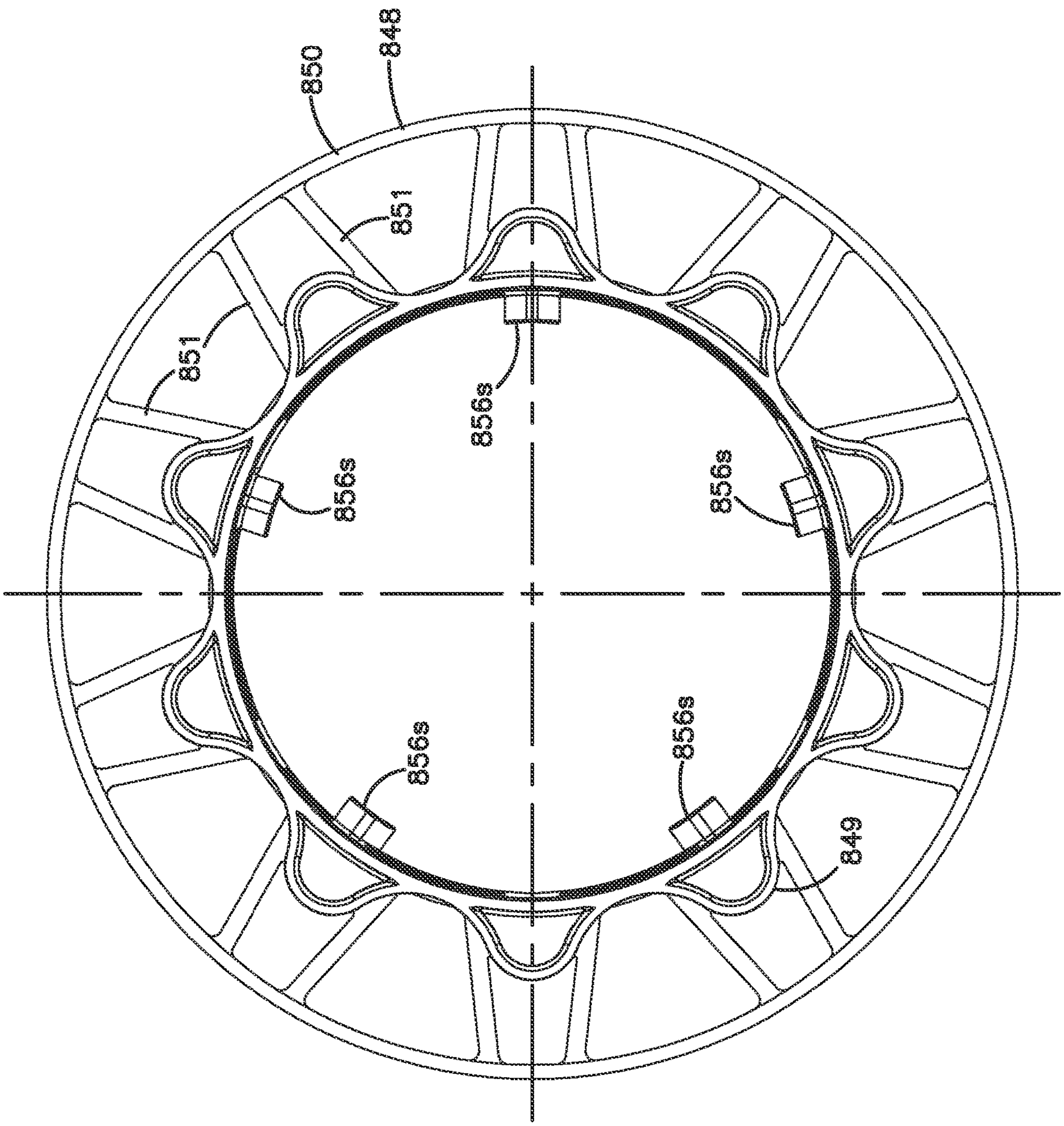
FIG. 86 is an enlarged, schematic, outlet end view of the component depicted in FIGS. 84 and 85.

In FIG. 86, an end view of support 845, FIG. 84, is provided; the view being generally taken toward end structure 848.

Figure 88:
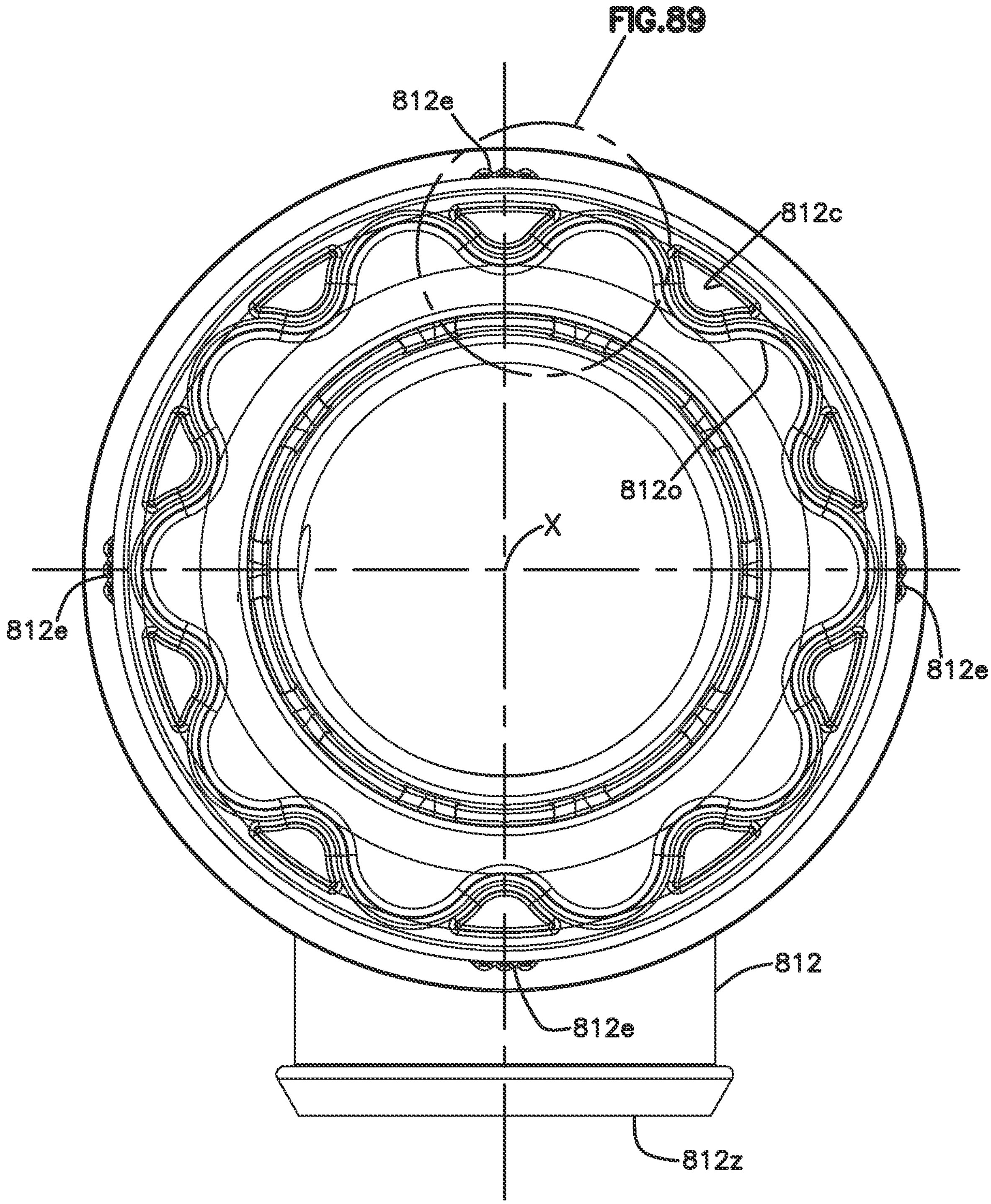
FIG. 88 is an enlarged, schematic, plan view of the component depicted in FIG. 87.
Figure 89:
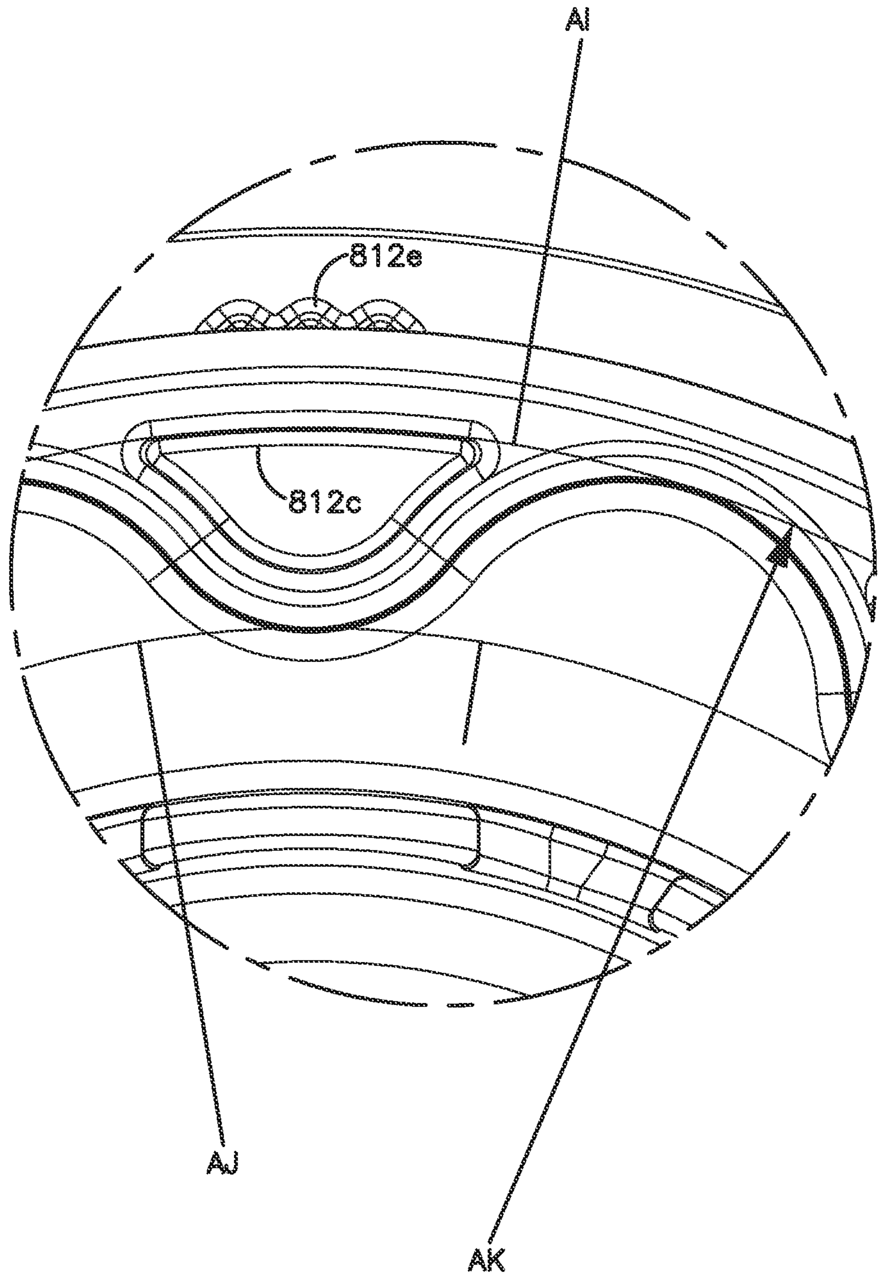
FIG. 89 is an enlarged, schematic, fragmentary view of an identified portion of FIG. 88.

In FIG. 88, the tube 812 is depicted, having been fully described above in connection with the perspective view of FIG. 87. In FIG. 89, an enlarged fragmentary portion of FIG. 88 is viewable.

From the above, it will be apparent that construction of the cartridge can generally be analogous to previously described cartridges herein. Preform 845 would be configured as a support. The media 825 would be positioned around the support and then the two end pieces 828, 829 would be positioned, typically by being molded-in-place. The projection arrangement 856*s* can be used to appropriately rotationally align the combination of media and support 845 in the mold, for formation of the seal surface 833*x*. This would be analogous to previous described embodiments especially with respect to fins 626, FIG. 65. It is noted that the projection arrangement 856*s* can be used alternatively for previously described embodiments.

For the embodiment depicted in FIGS. 71-89, example dimensions are provided as follows: in FIG. 79, AA=13 mm; In FIG. 80, AB=22.5 mm; AC=11.9 mm; AD=12.5 mm; In FIG. 81, AE=13.5 mm; In FIG. 82 AF=27.5 mm; and, AG=7.1 mm; In FIG. 83, AH=20 mm; and, In FIG. 89, AI=7.1 mm major to minor dimension; AJ=36.8 mm radius; and, AK=43.9 mm radius. Other dimensions of a usable arrangement can be evaluated and considered from scale. Of course, alternate dimensions and alternate relative dimensions can be used with the principles described herein as is the case for all embodiments.

Still referring to FIGS. 71-89, the receiving groove 840, for example, as depicted in FIG. 79, can be provided with dimensions generally analogous to previously discussed receiving grooves, with respect to: depth and extension from nearest adjacent outer portions of the end piece; width in, deepest portions of the groove; width of outermost opening portions of the groove; amount of compression of the seal toward any embedded support; spacing between the inner seal and the optional outer seal; etc.

The embodiment of FIGS. 71-89 can be practiced with various features of previously described embodiments and alternatives discussed herein. The descriptions of the various embodiments depicted are not meant to be exclusive from one another with respect to the application of features or principles described. Thus, the features of principles of one can be applied in the others, if consistent with other features present.

Although having two seals configured as shown is optional, it can be advantageous. In particular, the inner seal having the non-circular shape, prevents the cartridge from rotating during use, even when the outer seal is circular. This can inhibit possible generation of contaminant material which can migrate to otherwise clean surfaces and/or clean air regions. Further, having two radial seals oriented as shown, with filtering flow from the outside to the inside (out-to-in) through the cartridge provides that only the outer (optional) second seal is oriented where dust particles are located in the housing. This means that the seal surface near the inner seal is generally kept clean during servicing, whether or not the inner seal is non-circular.

An advantage to the non-circular shape, is reduction of vibrational movement of the element. For a given diameter of element, the non-circular seal shape of the primary seal provides a longer perimeter than the simple circumference of an ordinary circular seal. More specifically, the amount of seal surface area in contact with structure in a housing and available to resist movement (for example, to resist axial movement) is greater than the amount of such a surface in a correspondingly sized circular shaped seal. Thus, the non-circular shape, especially using the alternating outwardly curved and inwardly curved sections, provides advantage with respect to the support of the cartridge against seal movement.

It is noted that in the embodiment previously described, the end piece on the cartridge opposite the end with the seal, is generally described as closed. In alternative applications that end piece could be open. In the example of FIG. 73, this would correspond to end piece or end cap 829. Again, it is noted that the end piece, FIG. 29 (which in some embodiments is optional) can be provided open, if appropriate for operation of the cartridge. If it needs to be closed for proper operation of the cartridge, it could be closed by structure in the housing or other material.

Attention is now directed to an optional feature understandable from FIG. 75. Referring to FIG. 75, surface 833*s*, previously described, is the surface which forms a first seal with a housing. At 828*q*, is a seal surface that forms an optional second seal with a housing. When two radial seal surfaces 833*s*, 828*q* are used, one of which is non-circular as explained above for surface 833*s*, it will in some instances be preferred that the outer perimeter surface 828 (and the portion of the end piece on which it is position, which in the example, is generally circular) have a different maximum axial reach in extension from the second or remote end of the media, indicated at 825*y*, than the maximum axial reach of the seal surface 833*s* and the portion of the end piece on which it is positioned. Defined with more specificity, surface 833*s* will have a maximum axial reach, i.e. a portion maximally spaced from second end 825*y*, a given amount. That amount may preferably be different than any portion of surface 828*q* that engage the housing to form a radially directed seal. Preferably, the difference is at least 0.5 mm, usually at least 1 mm, and often 2 mm or longer in total reach.

When the regions of the two sections is different, which is longer depends on a balancing of preferences. For example, in some instances, it would be preferred that the surface 833*s* be a portion of an inner end piece region that has the longer reach. The reason for this preferred arrangement with the respect to the maximum axial reach and distance from end 825*y* will be apparent from an understanding of the operation. As the cartridge 810 is installed, the installer may need to rotate the cartridge slightly in order to ensure that the non-circular seal surface 833*s* is appropriately aligned with portions of a housing, to allow full insertion and sealing to occur. It would be preferable if during this rotational alignment, the outer perimeter radial seal 828*q* is not already engaged, as this would resist rotation. By having a maximum reach of surface of 833*s* greater than the maximum reach of surface 828*q*, it can be understood that the rotation can occur more readily. This preferred arrangement can be practiced with any of the embodiments described herein, to advantage.

However, in some instances, limitation to the insertion of the cartridge 810 will be provided by the projection arrangement 856*x*, engaging the flow tube prior to region 828 (and tip 841) reaching a point of sealing resistance. When this is the case, it may be desired to have the outer ring of the end piece be longer than the inner portion on which seal 833 is located. The reason for this is if the cartridge 810 is stood on end piece 828, the outer ring will inhibit regions adjacent seal 833 from contacting contaminate.

Thus, whether the region that forms surface 833*s* has the same axial reach as the region that forms the outer perimeter 828*q*, or is different (either longer or short) may turn on other features of the system and concerns. However, advantages from the variations can be obtained as explained.

It is not meant to be suggested, however, that every feature of any given embodiment must be applied in that embodiment for a useful and advantageous arrangement to result. Selected advantages can be achieved while not using all of the features depicted and discussed.

VIII. Some Example Variations in the Arrangement of FIGS. 71-89

A. The Variations of FIGS. 71A, 71B, 72B, 71C, 72C, 74A, 75A, 75B, 76A, 77A, 78A and 78B In FIGS. 71A, 71B, 71C, 72B, 72C, 74A, 75A, 75B, 76A, 77A, 78A and 78B some selected variations in the features described above in connection with the embodiments of FIGS. 71-89 are depicted and described. It is noted that features of these variations can be applied in many of the other embodiments described herein, including, for example the embodiments of FIGS. 1-70.

Figure 71A:
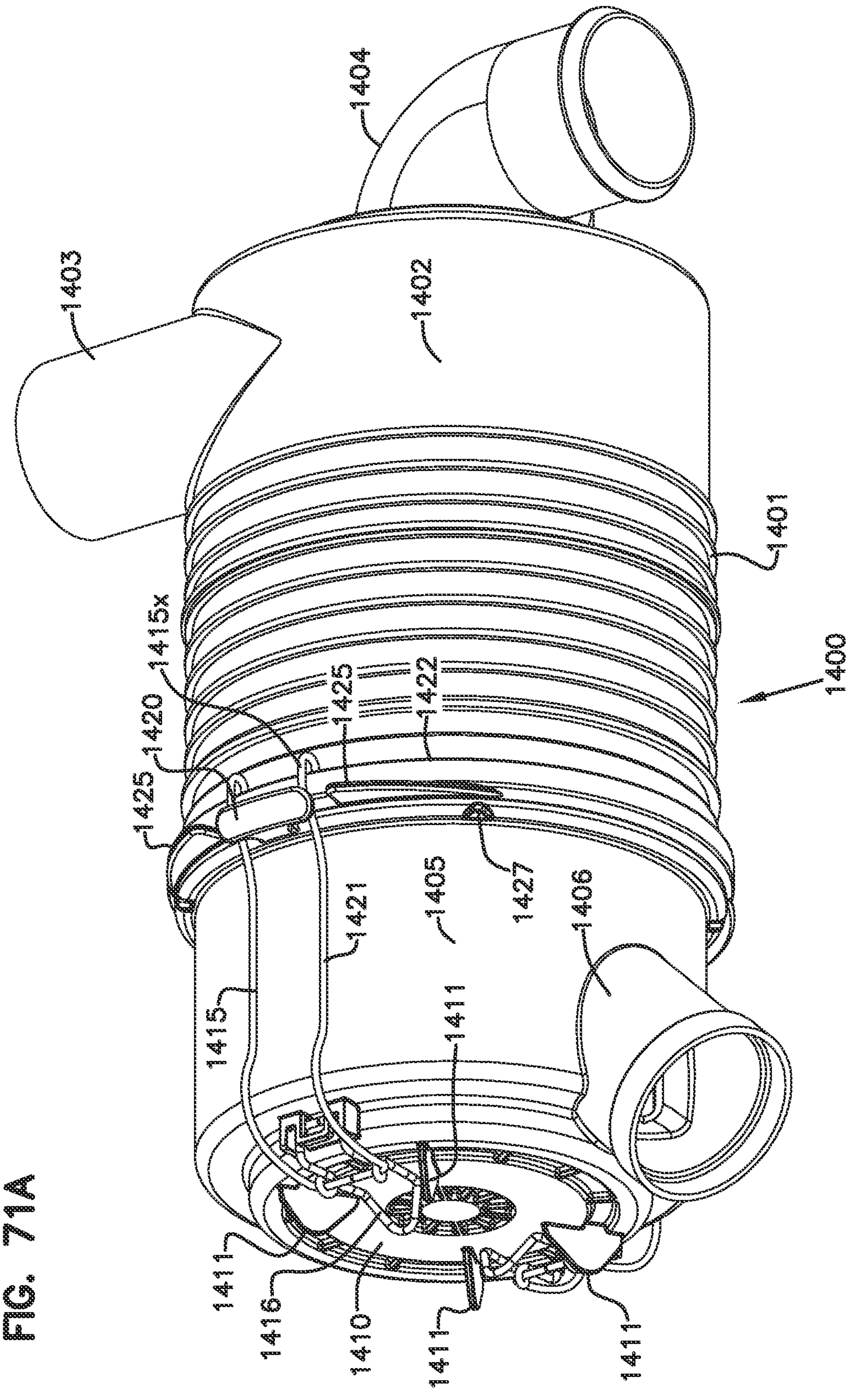
FIG. 71A is a schematic perspective view of an air cleaner assembly in accord with a variation in the embodiment of FIG. 71.

Referring first to FIG. 71A, a filter assembly 1400 is depicted. The filter assembly 1400 comprises a housing 1401 having features generally in accord with those previously described: i.e. a housing body section 1402 with an (inlet) flow tube 1403 and an (outlet) flow tube 1404 and a removable access cover 1405. The removable access cover 1405 is shown with a dust ejector tube 1406 thereon. The dust ejector tuber 1406 is depicted without an evacuator valve arrangement thereon, but one would typically be used.

It is noted that, unlike previously described arrangements, end 1410 of the access cover 1405 is depicted with a plurality of axially projecting tabs 1411 thereon. Further, a latch arrangement 1415 is depicted which includes a thumb catch, tab or latch section 1416, positioned in overlap with end 1410. The latch tab 1416 is positioned in overlap with end 1410 for convenient access during servicing. The tabs 1411 help provide that when the access cover is stood on a surface with end 1410 projecting downwardly, latch section 1416 is protected from being damaged. It also helps avoid the possibility of the latch being inadvertently opened or damaged, if something brushes or bumps against end 1410. As a result of tab 1416 being in overlap with end 1410, the latch 1415 has a relatively long reach, to latch end 1415*x*. At 1420, a retention feature is depicted that helps to hold the latch 1415 close to the outer surface of the access cover 1405. It also serves as a guide for the latch arrangement 1415. When the latch arrangement 1415 is opened, the latch section 1421 travels toward outlet 1404. The section of latch arrangement 1421 near projection 1420 is angled so that as it travels toward the outlet 1404, the end of the latch moves outward to clear the retention flange 1422 on body section 1402 Projections 1425 protect the latch retention structure 1420 from being broken, as the housing 1401 is handled.

At 1427 is provided a radiused dimple in the access cover 1405, that can interfere with the radial saw tooth arrangement on an end of the body 1402 (not viewable projecting inside of access cover 1405). This allows the service cover to be retained at a selected angular position, and to be easily secured in that position.

Figure 71B:
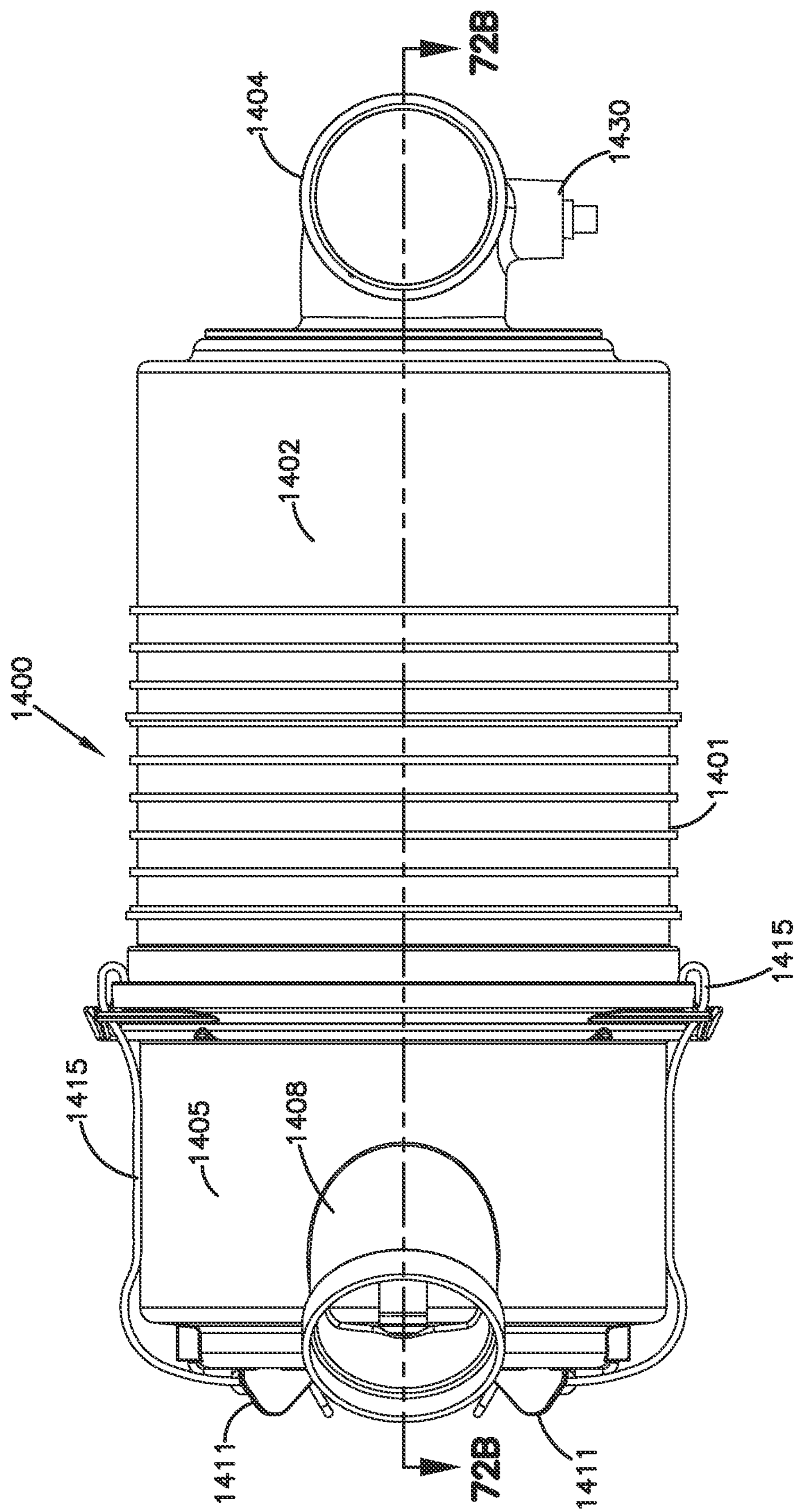
FIG. 71B is a schematic side view of a variation of FIG. 71A.

In FIG. 71B a side view of the assembly 1400 is depicted. The outlet 1404 is depicted with an optional tap 1430, usable in accord with principles previously described herein for other embodiments.

Figure 72B:
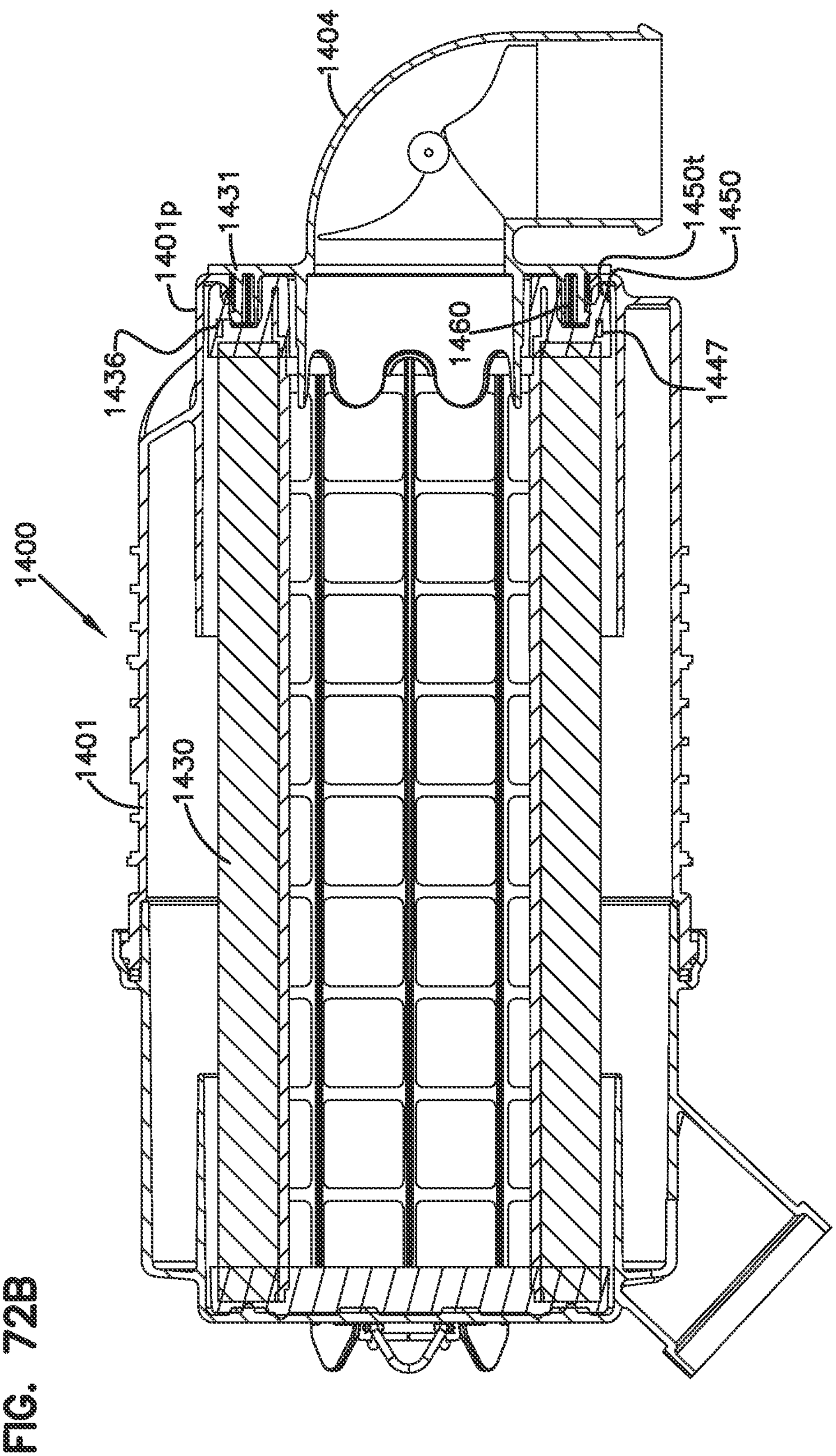
FIG. 72B is a schematic cross-sectional view taken generally along 72B-72B, FIG. 71B, showing variations from the views of FIGS. 72 and 72A.

In FIG. 72B, a cross-sectional view of assembly 1400 taken along lines 72B-72B, FIG. 71B, is depicted. Within housing 1401 is depicted a serviceable filter cartridge 1430 generally comprising features as previously described, see FIGS. 72 and 72A for previously described, related, features.

Still referring to FIG. 72B, it is noted that the outlet tube construction or flow tube construction 1404 includes a flange 1431 that extends, radially, nearly to an outer perimeter of the housing 1401, for example a portion of the outer perimeter being indicated at 1401*p*. This variation can be implemented with other embodiments described herein.

Figure 74A:
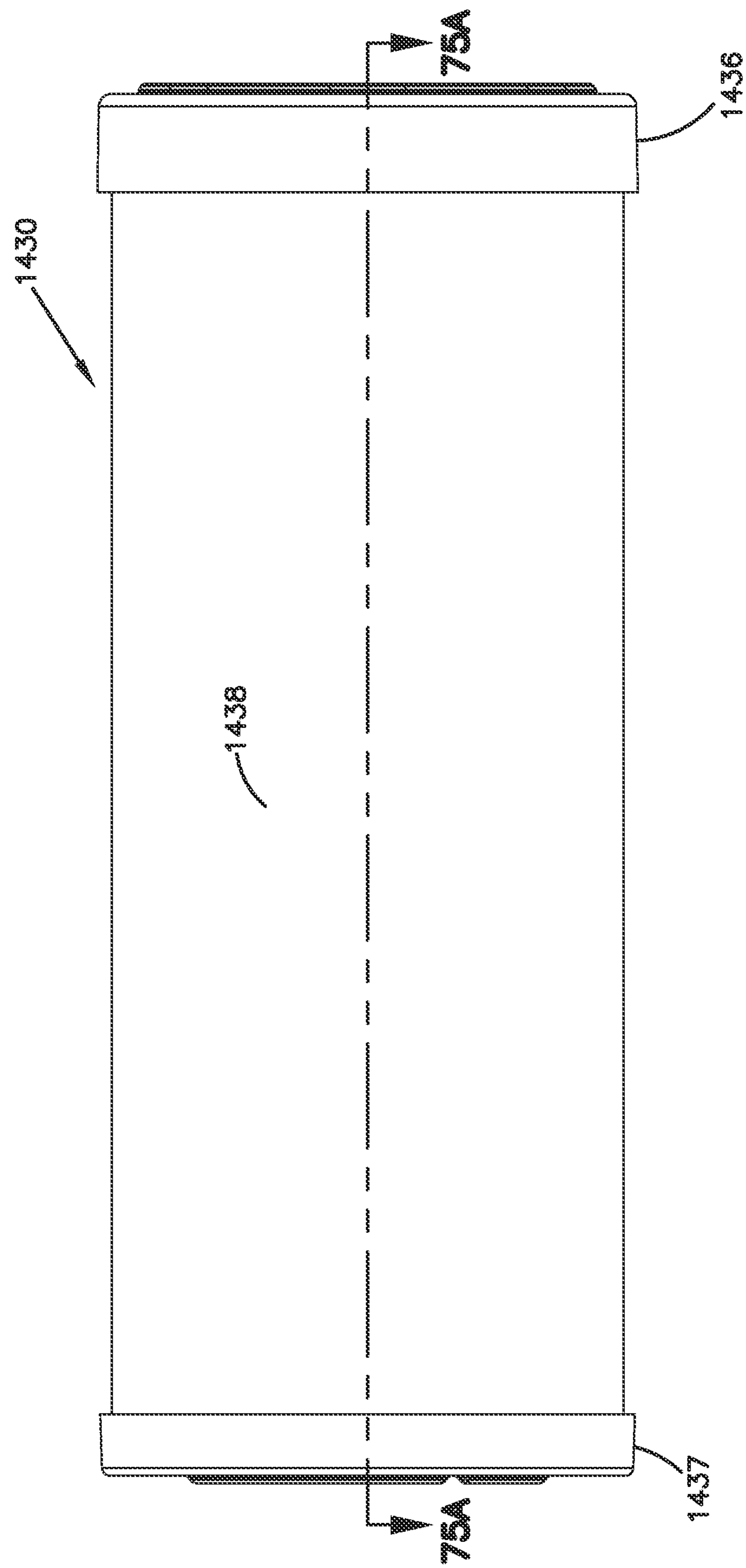
FIG. 74A is a schematic side elevational view of a filter cartridge used in a variation of FIGS. 71A, 71B and 72B.
Figure 75A:
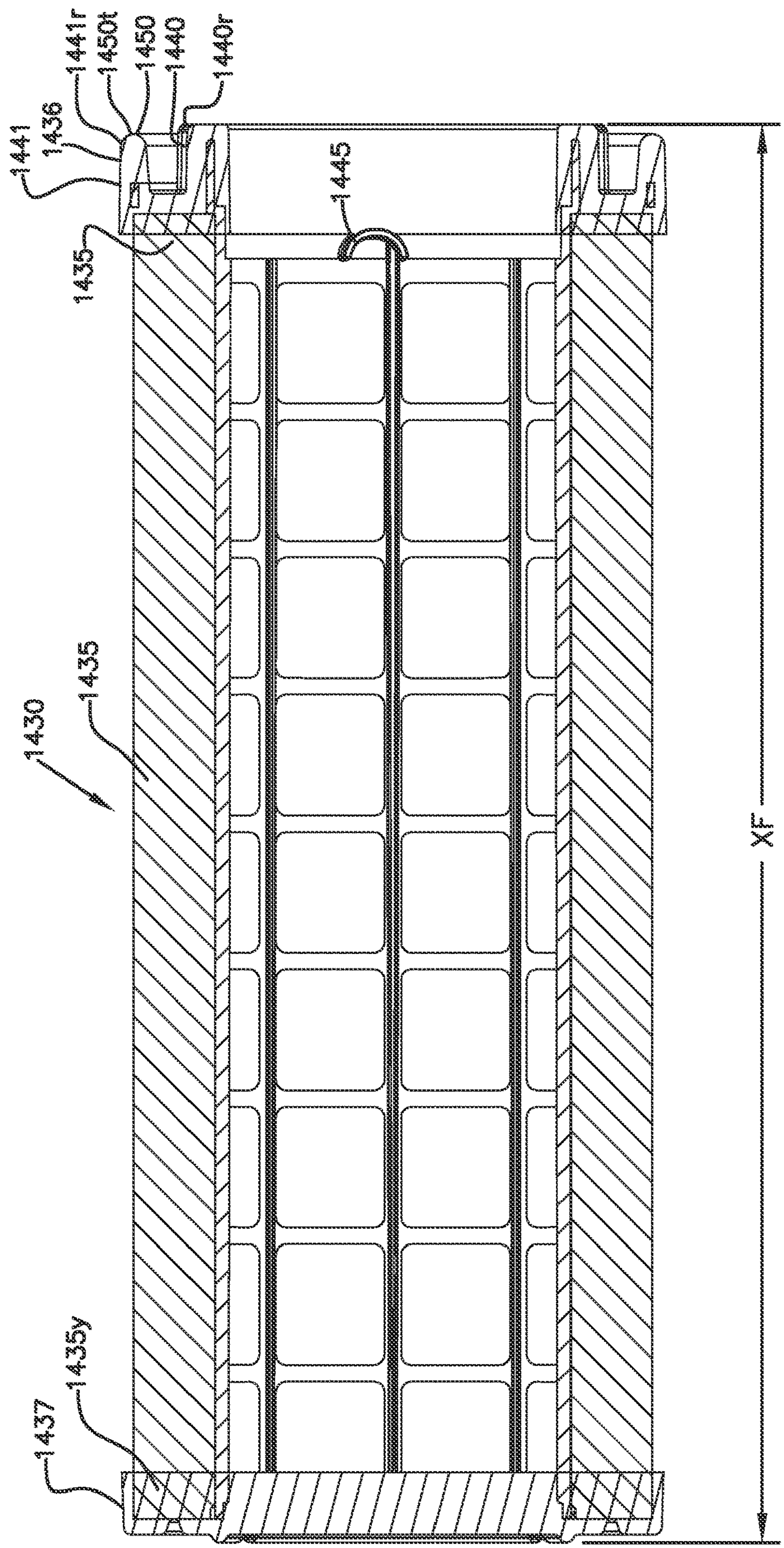
FIG. 75A is an enlarged cross-sectional view of the variation of FIG. 74A, taken generally along lines 75A-75A, FIG. 74A.

Attention is now directed to FIG. 74A, a side elevational view of cartridge 1430. The cartridge 1430 generally comprises media 1435 extending between first and second end pieces 1436, 1437. In FIG. 75A, a cross-sectional view taken generally along line 75A-75A, FIG. 74A, is depicted. Here, the cartridge 1430 is depicted in cross-sectional view.

Referring to end piece 1436 it can be seen that first seal 1440 which can be a non-circular seal as previously described, is shown projecting to a furthest outmost reach 1440*r* in extension away from remote end or second end 1435*y* of the media 1435, that is further than a limit of reach indicated at 1441*r* of a secondary outer seal 1441. The two seals 1440 and 1441 are depicted as a portion of end piece 1436 positioned on end 1435*x* of the media 1435. This can be advantageous in some arrangements since it helps provide that as the seal 1440 is inserted, seal 1441 has not yet been engaged.

Referring to FIG. 75A, dimension XF for an example would be 273 mm, although alternatives are possible.

Still referring to FIG. 75A, it is noted that the cartridge 1430 depicted includes a radial projection 1445 usable as an indexing member, in a manner analogous to those previously described for other embodiments.

Referring back to FIG. 72B, preferably the portion of the end piece 1436 forms an outer rim or ring 1450 does not include the substantial portion of seal support extending all the way toward a tip 1450*t*; and, portions of the housing that are pressed into groove 1460 are sized to deflect flexible end 1450 radially outwardly against the housing during installation, to facilitate sealing. Again, this variation can be applied with a variety of the alternative embodiments described herein.

Also referring to FIG. 72B, support 1447 which provides some support at in end piece, and near the outer perimeter, can be a separate ring from a remainder of support structure within the cartridge 1430.

Figure 71C:
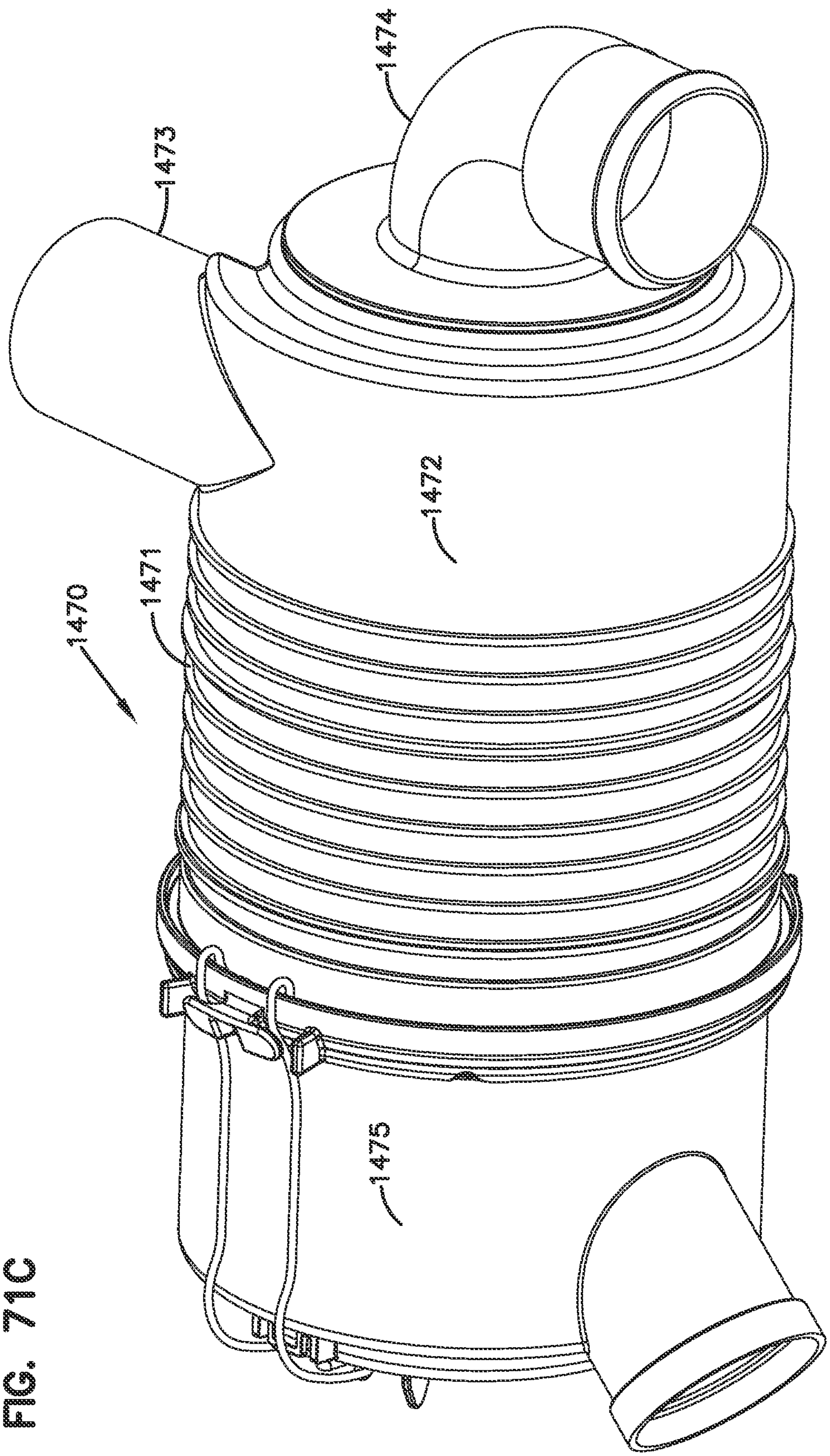
FIG. 71C is a schematic side perspective view of a further variation in the arrangement in FIG. 71.
Figure 72C:
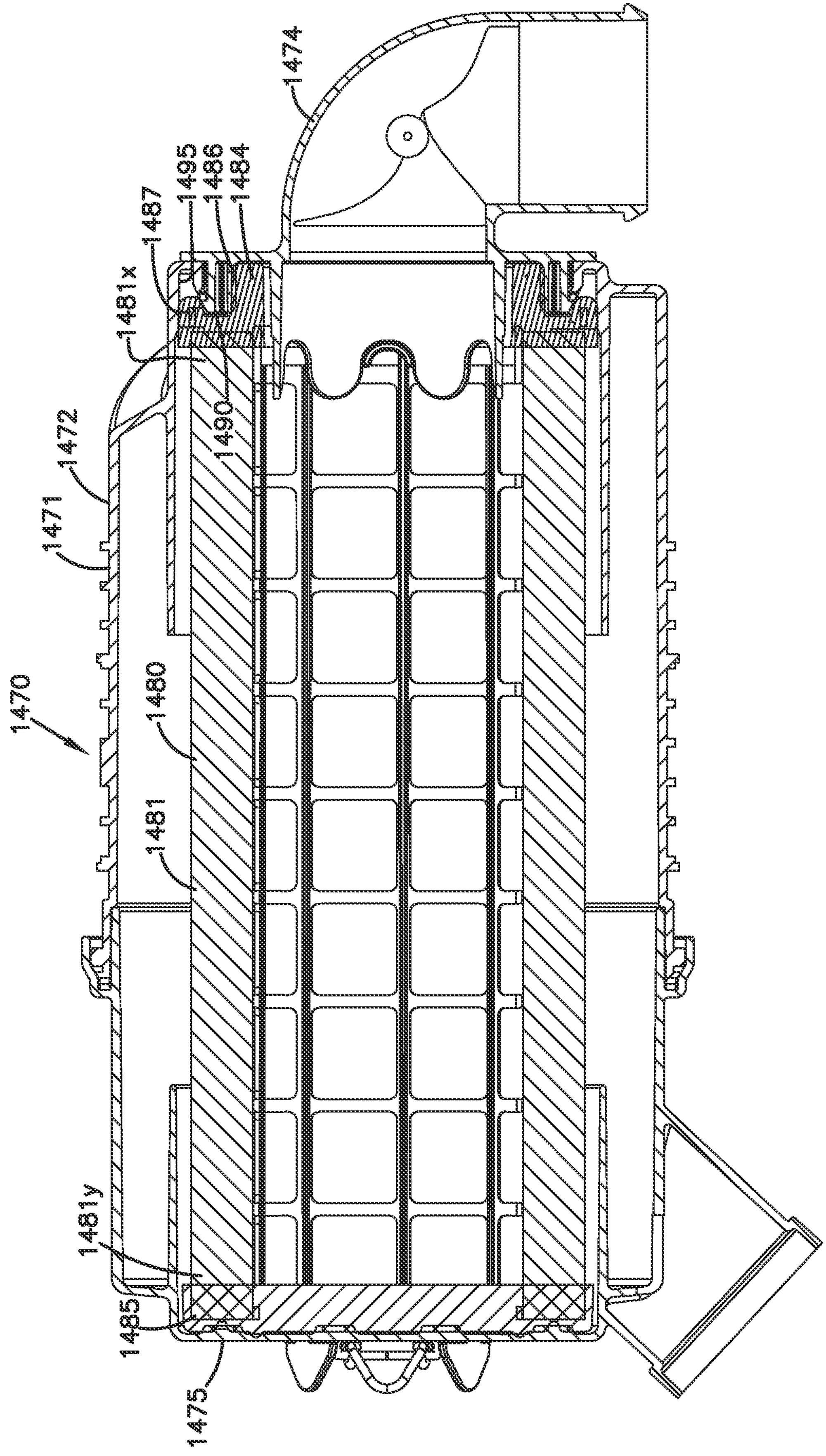
FIG. 72C is a schematic cross-sectional view of the arrangement depicted in FIG. 71C.

Attention is now directed to FIG. 71C. FIG. 71C is a further alternate embodiment 1470 of a filter assembly according to the present disclosure. It includes many of the general features described above for the arrangement 1400 but with some modification and specific structural detail. Thus, the arrangement 1470 comprises a housing 1471 that includes a body section 1472 and access cover 1475. The housing 1471, in this example on the access cover 1472, includes a gas flow inlet 1473 and gas flow outlet 1474. In FIG. 72C, a cross-sectional view of assembly 1470 is provided. Here cartridge 1480 can comprise media 1481 having first and second opposite ends 1481*x*, 1481*y* positioned in extension between end pieces 1484, 1485.

End piece 1484, positioned on first end 1481 of the media, comprises an end piece which has an open central flow aperture therethrough, and which includes a seal arrangement thereon. The seal arrangement in the example depicted, comprises first radially directed seal 1486 and a second radially directed seal 1487, with a receiving groove 1490 positioned between the two seals 1486, 1487. In the example depicted, each of the seals 1486, 1487 is radially outwardly directed. The first seal 1486 is positioned with a largest radial outer cross-sectional dimension smaller than an outer perimeter cross-sectional size of the media 1481. The seal surface 1486 may be circular but typically it will be non-circular in accord with principles described herein above.

In the example depicted in FIG. 72C, the maximum axial reach of the end cap portion of the seal surface 1486 thereon, extends further in extension away from end 1481*y*, than does a maximum amount of extension of the region of the end cap that includes seal surface 1487 thereon. This may be a convenient construction, if space within region 1495 is too narrow to accommodate a projection extending therein.

Figure 75B:
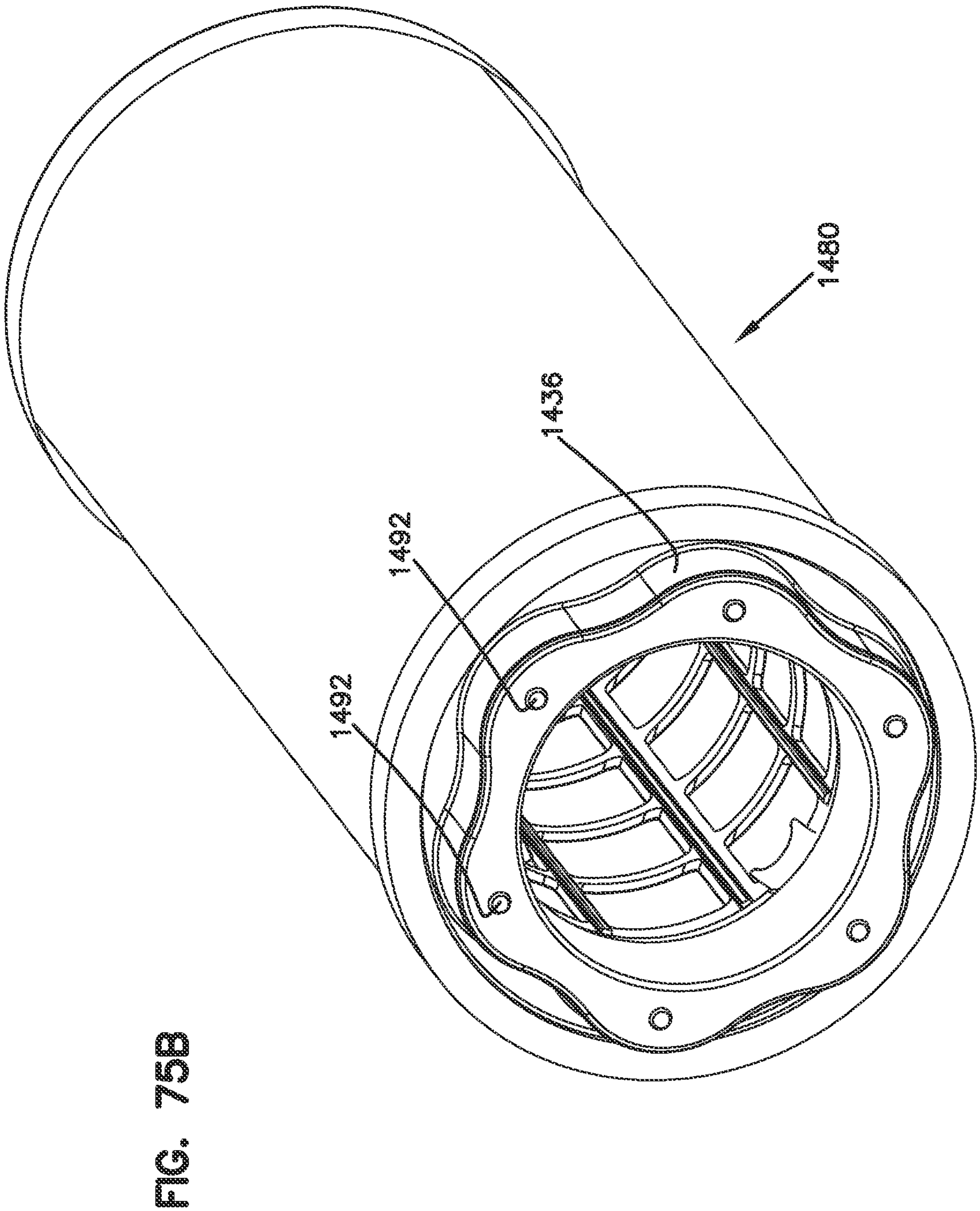
FIG. 75B is an outlet end perspective view of the filter cartridge in general accord with FIG. 72C.
Figure 76A:
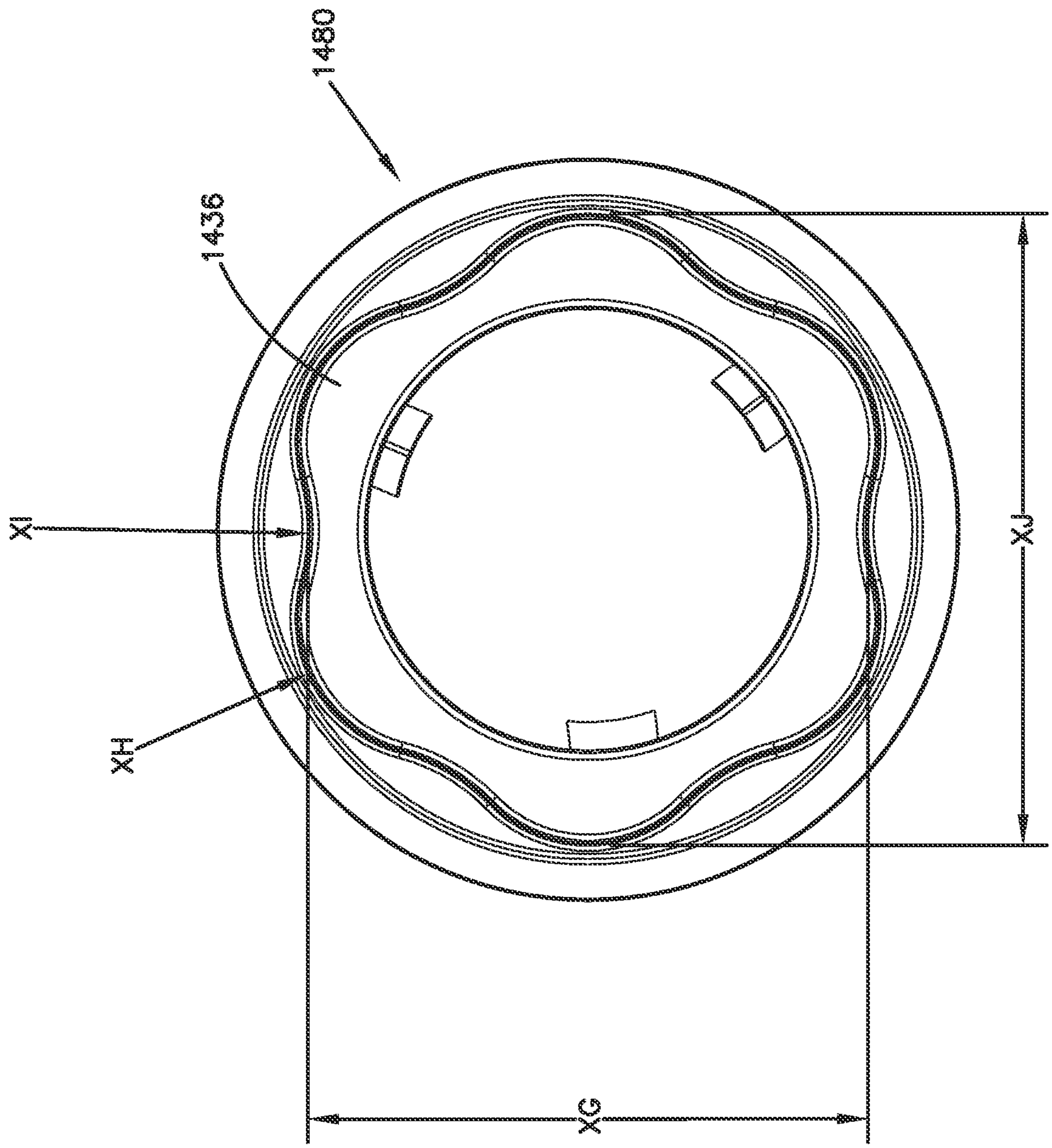
FIG. 76A is a schematic open end plan view of the filter cartridge variation of FIG. 75A.

In FIG. 75B, an outlet end perspective view of cartridge 1480 is depicted. Projections 1492 are shown positioned on an end of end piece 1436. The projections 1492 can be configured to engage in end wall, and facilitate stabilization of the cartridge 1480 in place during use. In FIG. 76A an end view of cartridge 1480 is depicted but without optional projection 1492. Example dimensions are provided as follows: XG=80 mm; XH=20 mm radius; XI=27 mm radius; and, XJ=90 mm.

Figure 77A:
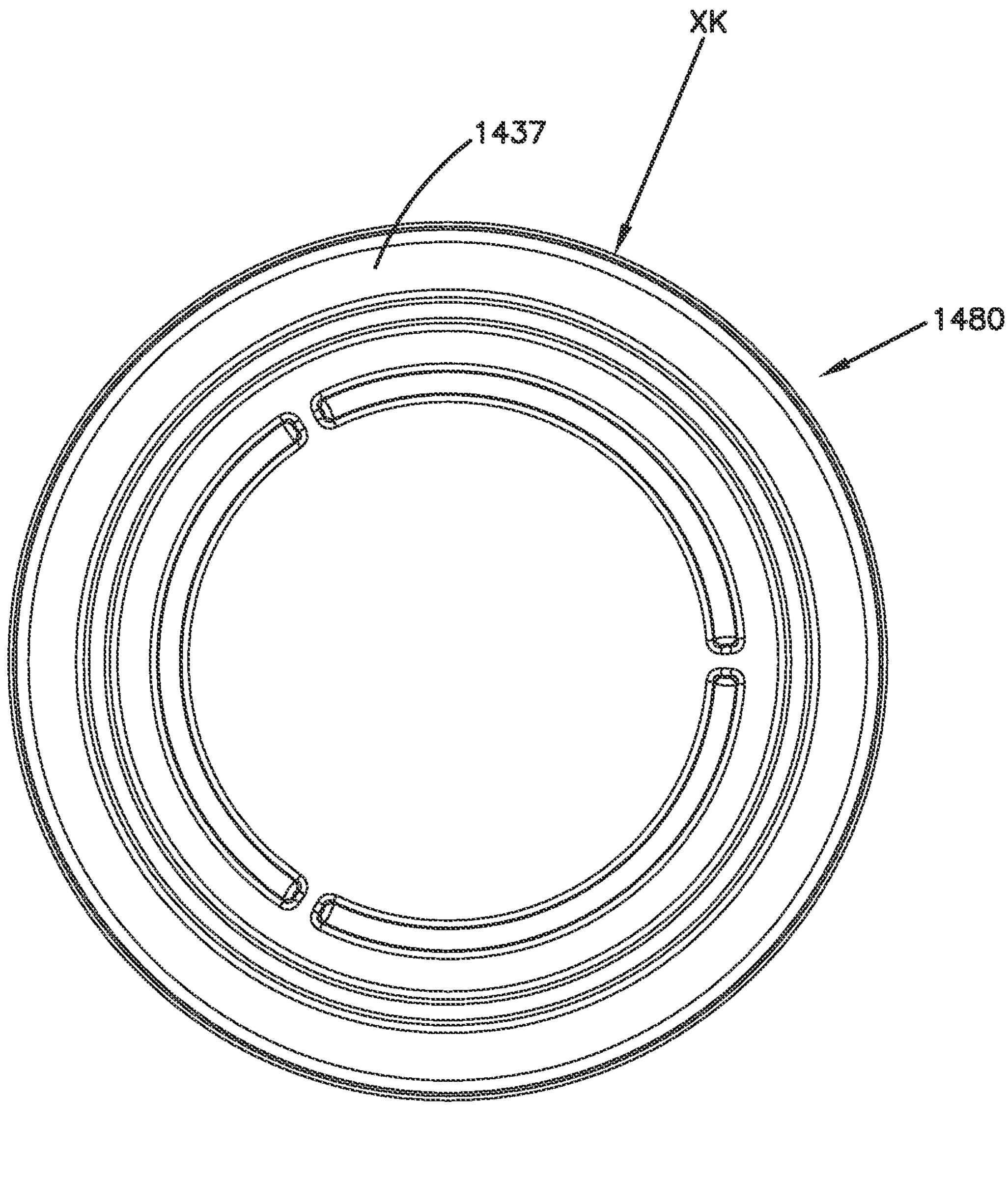
FIG. 77A is a schematic end view of a closed end of the filter cartridge of the variations of FIGS. 74A and 75A.
Figure 78A:
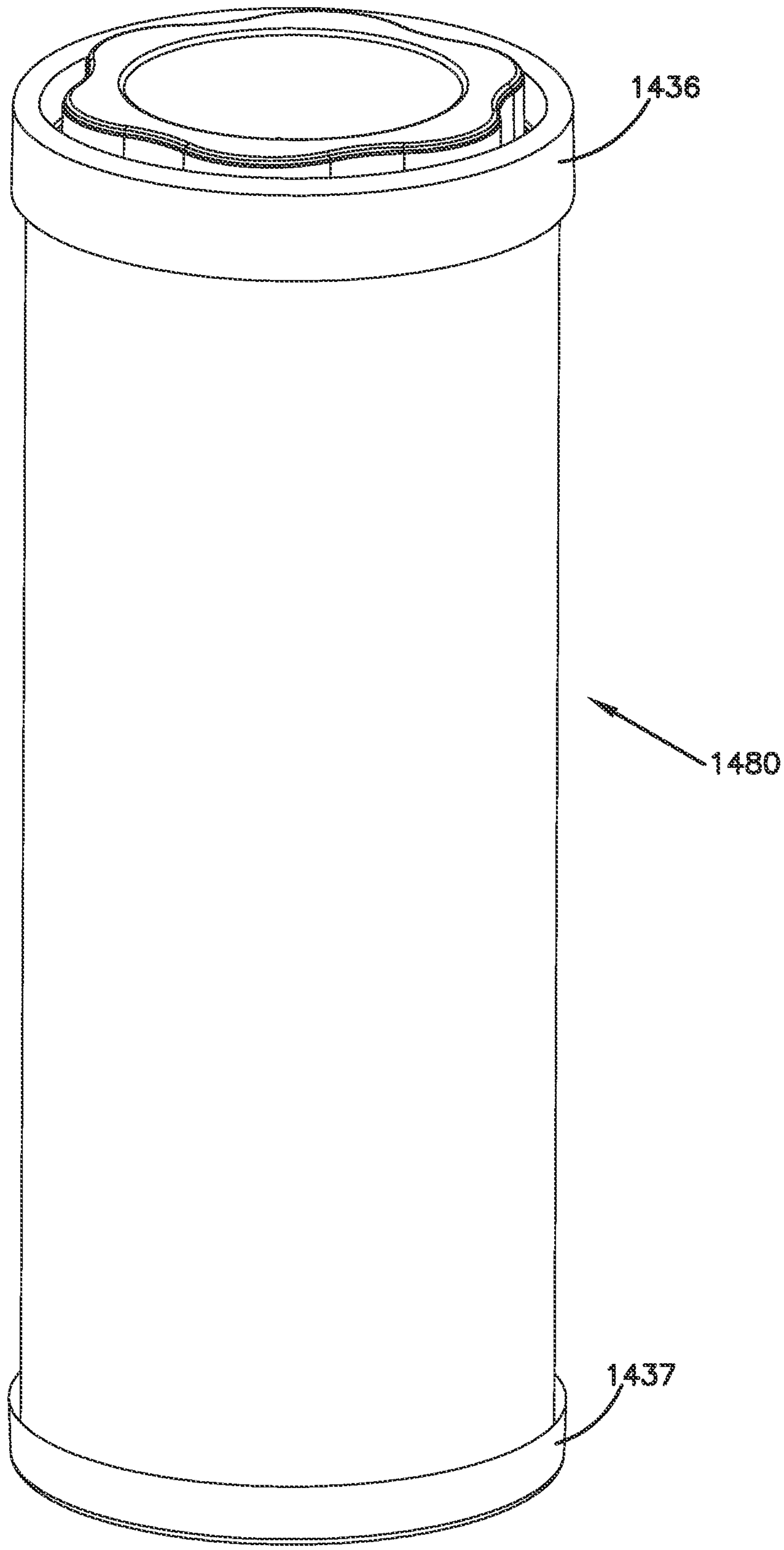
FIG. 78A is a schematic open end perspective view of the filter cartridge variation depicted in 74A and 75A.
Figure 78B:
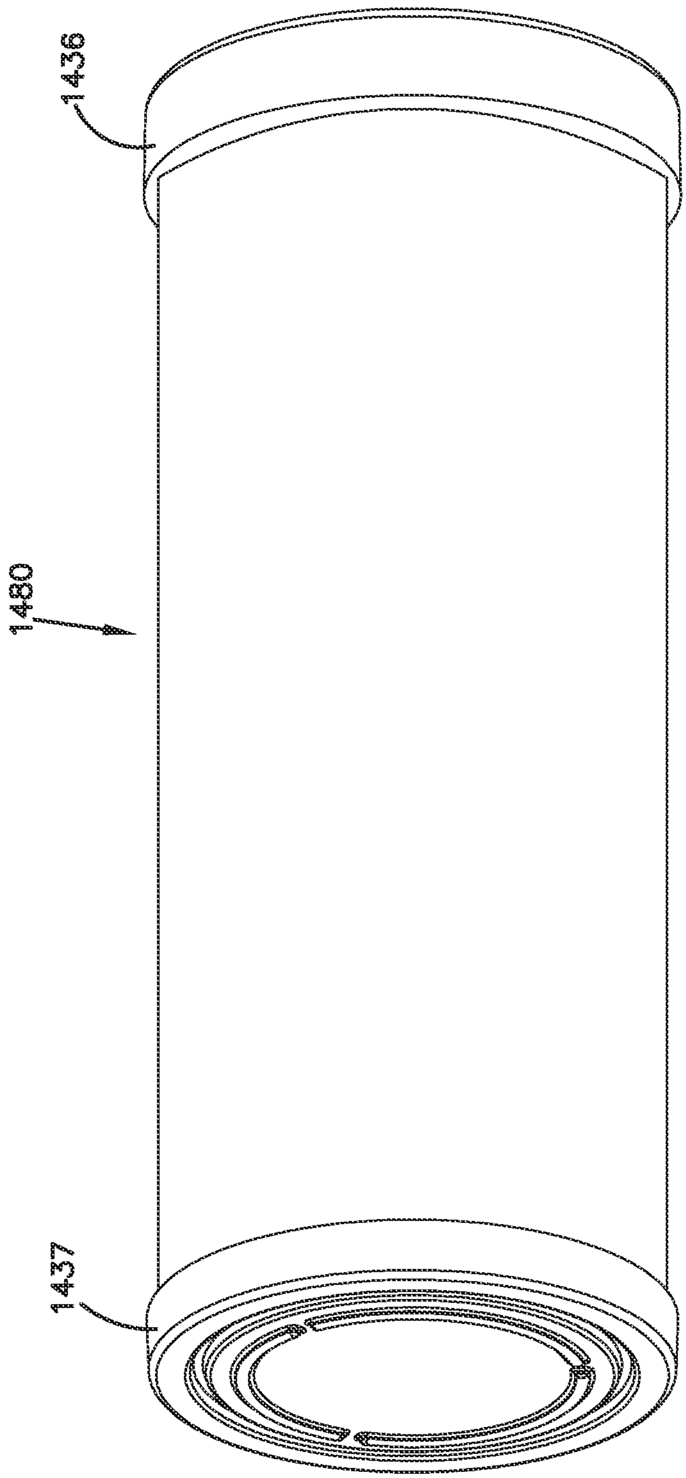
FIG. 78B is a closed end perspective view of a filter cartridge variation depicted in FIGS. 74A, 75A, and 78A.

In FIG. 77A, an end view of the closed end 1437 of cartridge 1480 is depicted, with an example dimension provided as follows: XK=106 mm. In FIG. 78A, a perspective view of cartridge 1480 is depicted and in FIG. 78B a further perspective view of cartridge 1480 is depicted.

From the above, it will be understood that in some applications, it may be desirable to have the end piece having the primary seal thereon include an outer rim portion that is relatively short relative to the maximum extension of the portion of the end having the primary seal thereon, or relatively long relative to that end portion. For further various arrangements it may be desirable to have the outer portion of the end cap material be relatively flexible, radially, so it can be flexed against a housing, if desired, or it may be desirable to have it supported by an internal structural support. The principles described herein can be applied to an advantage in a variety of such arrangements, and these variations can be applied in a variety of the embodiments described herein.

B. Additional Variations, FIGS. 90-101

Figure 90:
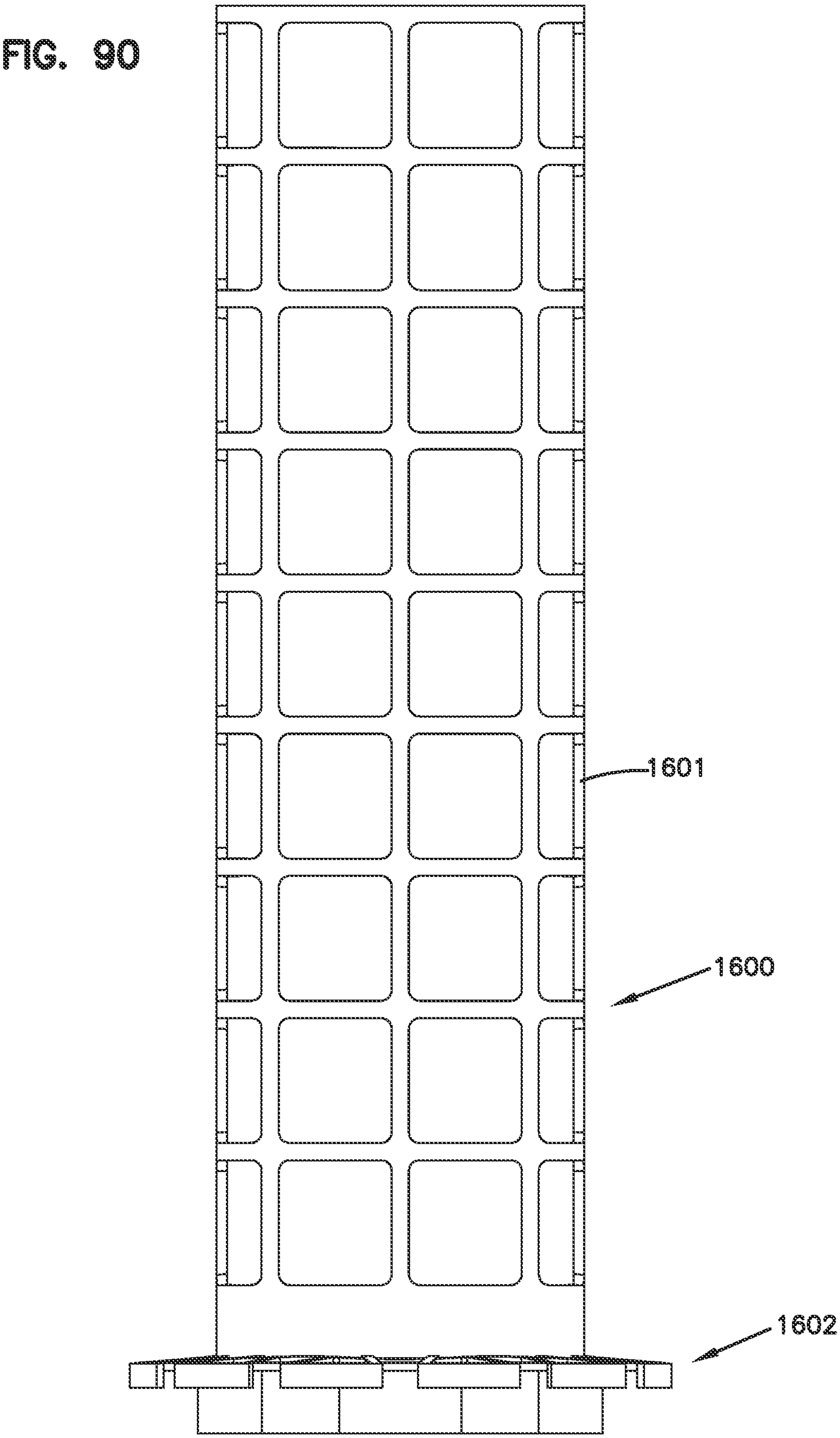
FIG. 90 is an schematic side elevational view of an alternate support structure for use in the cartridge according to the present disclosure.

In FIG. 90, a variation applicable in various ones of the embodiments described herein, is depicted. In FIG. 90, what is depicted, is variations in a support structure 1600 that can be used in various filter cartridges described herein. The support structure 1600 depicted, includes a support section 1601 which serves as a media support and around which media would be positioned during use. The particular support section 1601 is depicted as a media support that does not include a resonator/sonic choke arrangement, however, it could be configured with a resonator/sonic choke section, for example, previously described, if desired. The support structure 1600 also includes end support structure which will typically be embedded in molded-in-place portions of an end piece and which can operate as a seal support.

Figure 91:
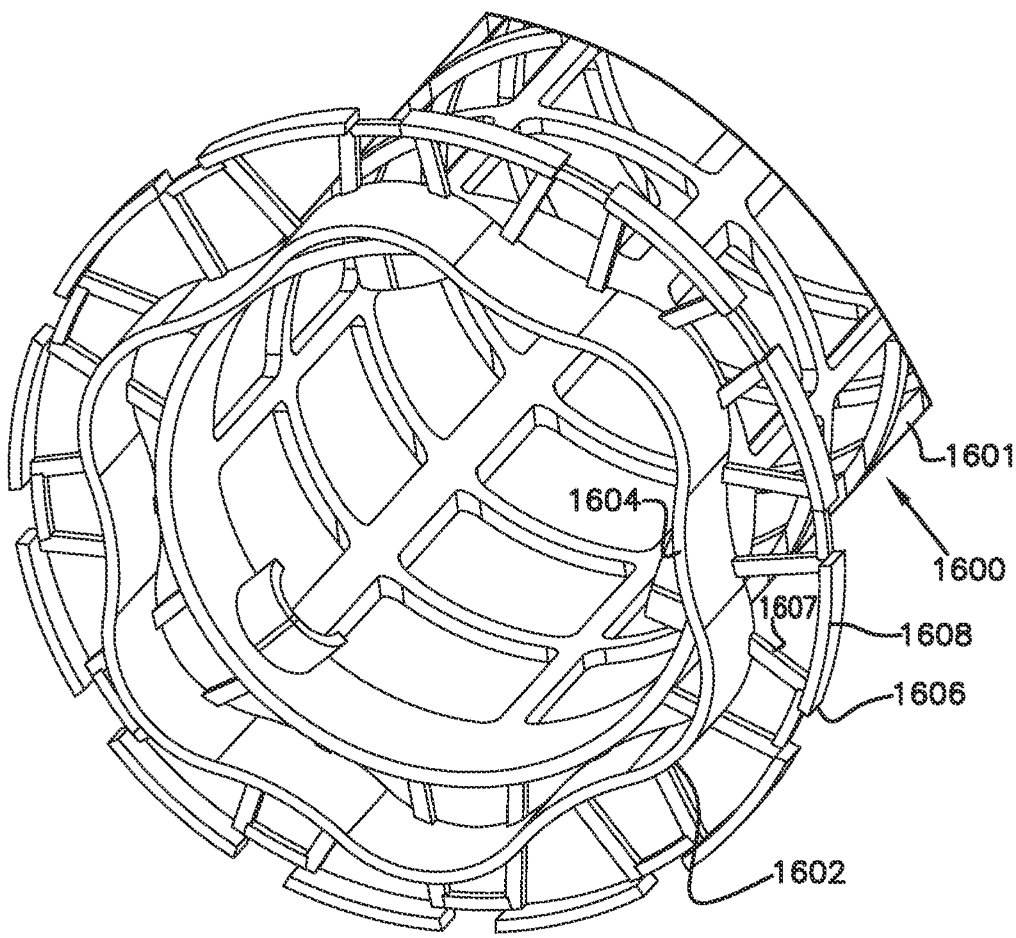
FIG. 91 is a schematic fragmentary perspective view of the support structure of FIG. 90.

In FIG. 91, a fragmentary perspective view of the support structure 1600 is depicted, directed generally toward end support structural 1602. The end support structure 1602 includes a primary seal support 1604 configured to support a non-circular seal, comprising a plurality of outwardly projecting sections and inwardly projecting sections as previously described.

Projecting radially outwardly from the primary seal support 1604 is a support arrangement 1606 comprising ribs 1607 and outer flange sections 1608.

Figure 92:
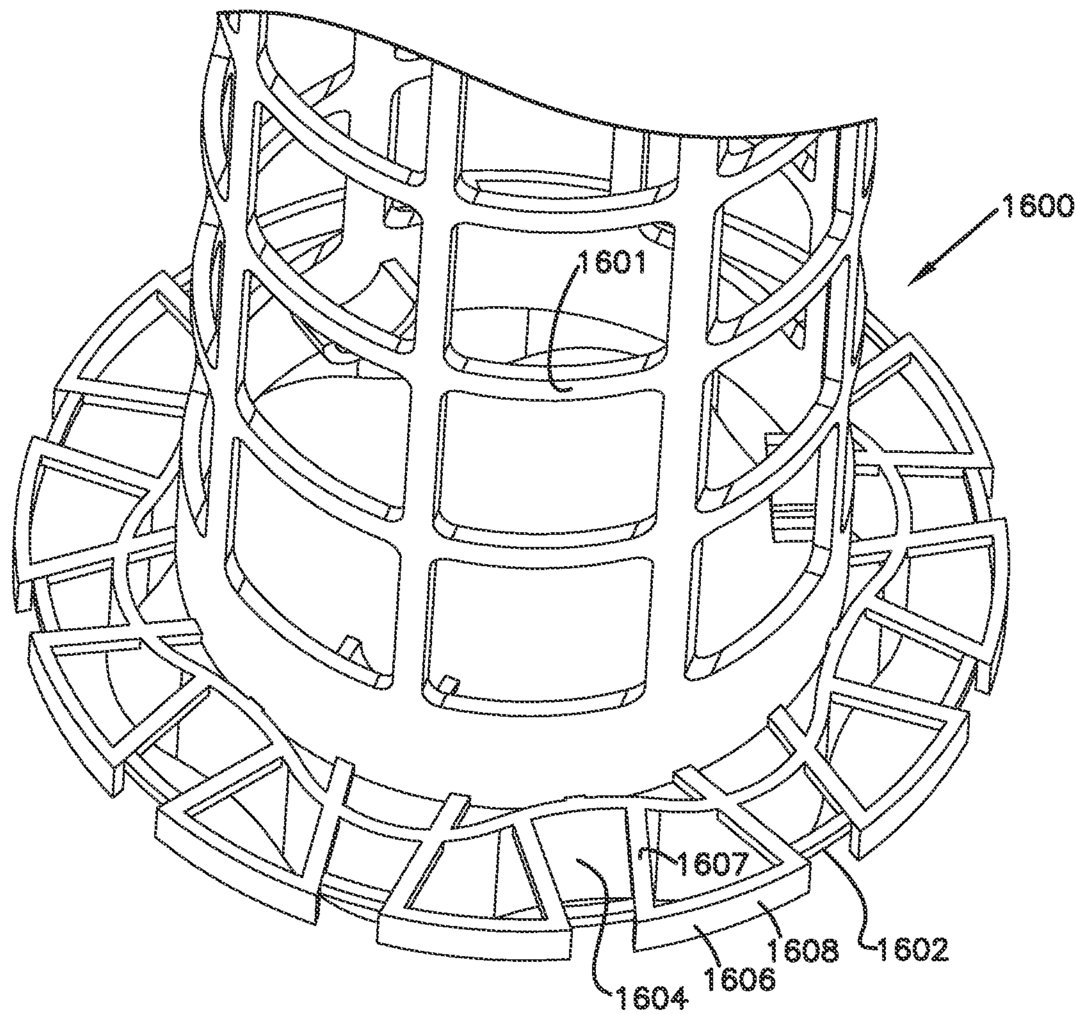
FIG. 92 is a second schematic fragmentary view of the support structure of FIGS. 90 and 91.

In FIG. 92, a second perspective view is shown, to facilitate understanding.

From FIGS. 90-92, one can understand that the principles can be applied in an arrangement in which an outermost rim is a segmented section rather than a continuous ring. This can be practiced with many of the various cartridges shown and described herein.

Figure 93:
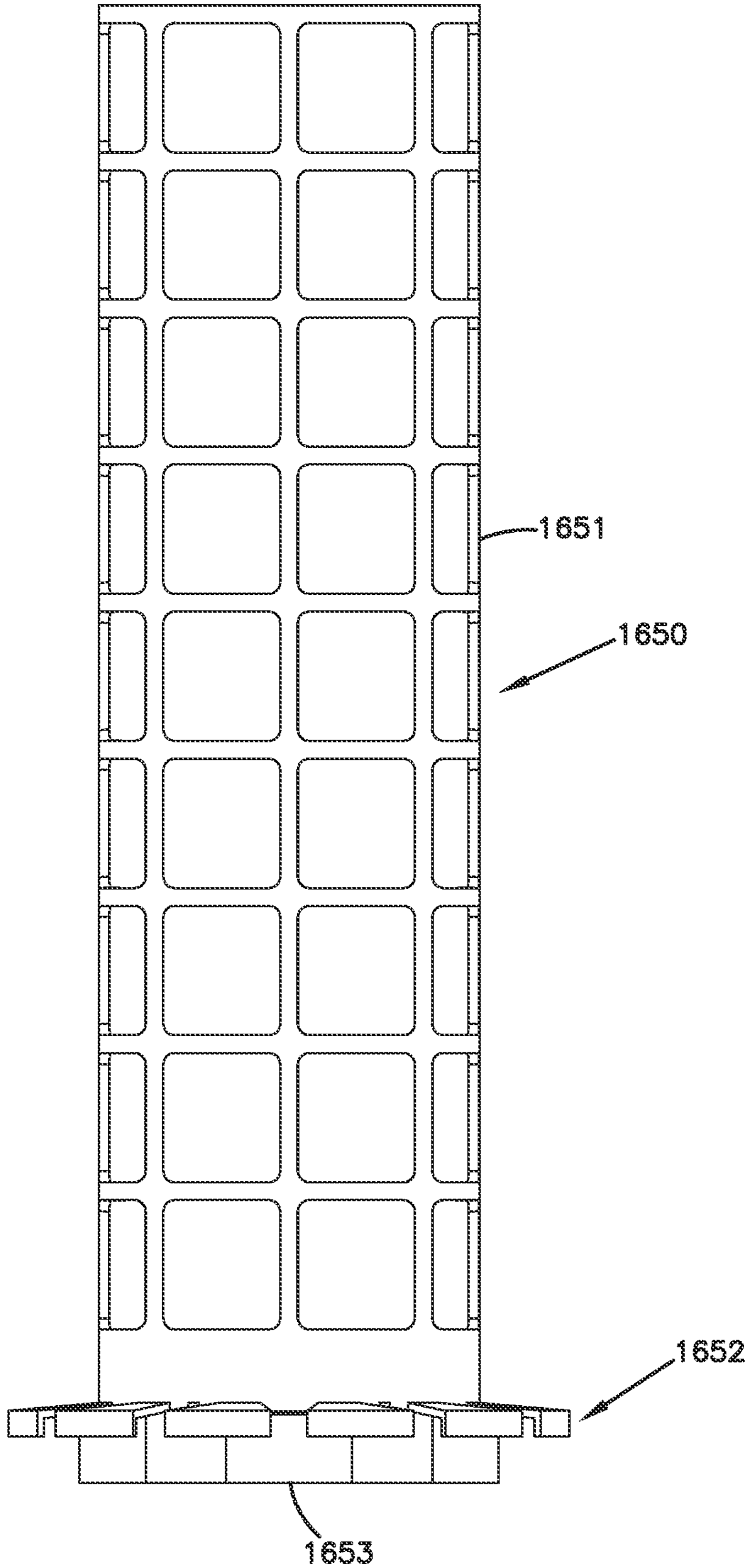
FIG. 93 is a schematic side elevational view of a second alternate support structure according to the present disclosure.

In FIG. 93, a further alternate support structure 1650 is depicted. Support 1650 is analogous to support structure 1600 and includes a support section 1651 for supporting media, and inlet section 1652 which would normally be embedded in end cap material during use. Again, the media support section 1651 is depicted as a porous media support, but can be provided with a resonator/sonic choke configuration/feature if desired. The end section 1652 is typically embedded in molded-in-place portions of an end piece is use; and, includes a seal support section 1653 for the primary seal. It can be circular but is depicted configured to provide support for a primary seal that comprises alternating outwardly projecting and inwardly projecting sections.

Figure 94:
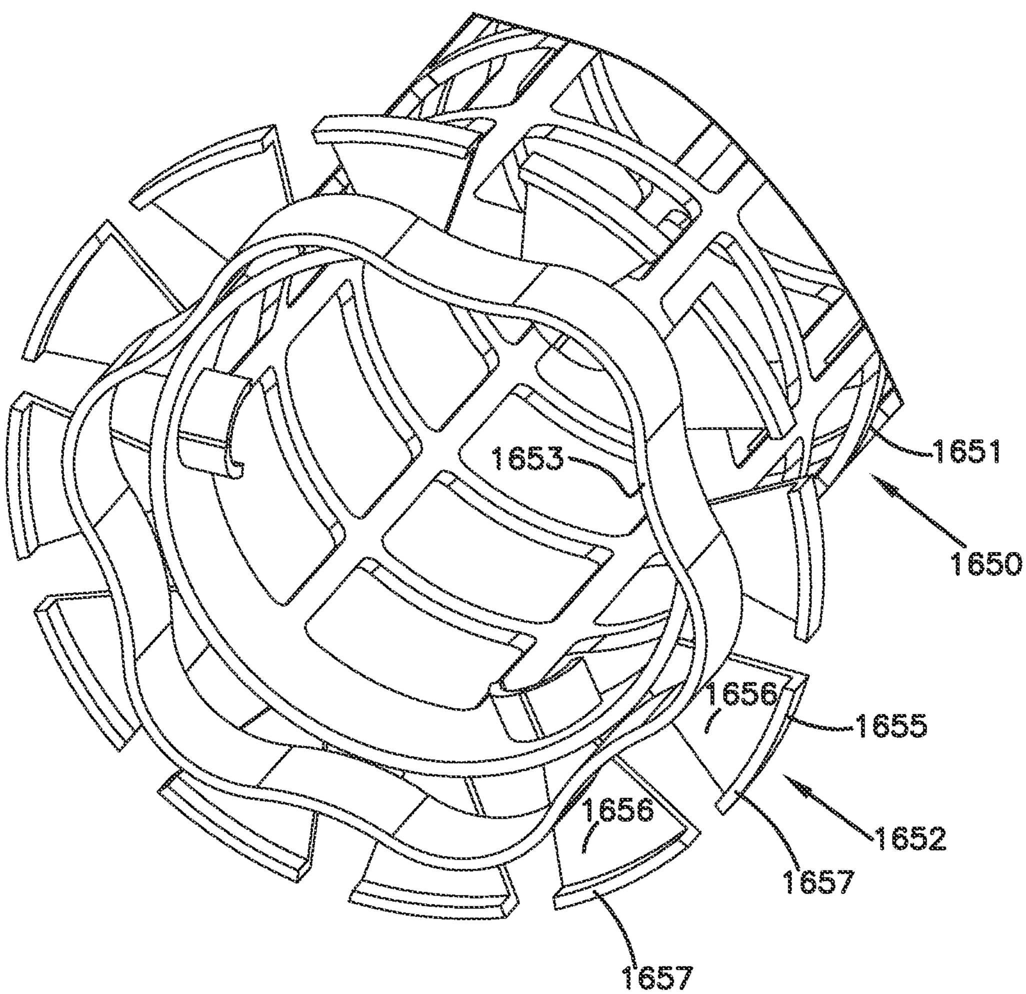
Figure 95:
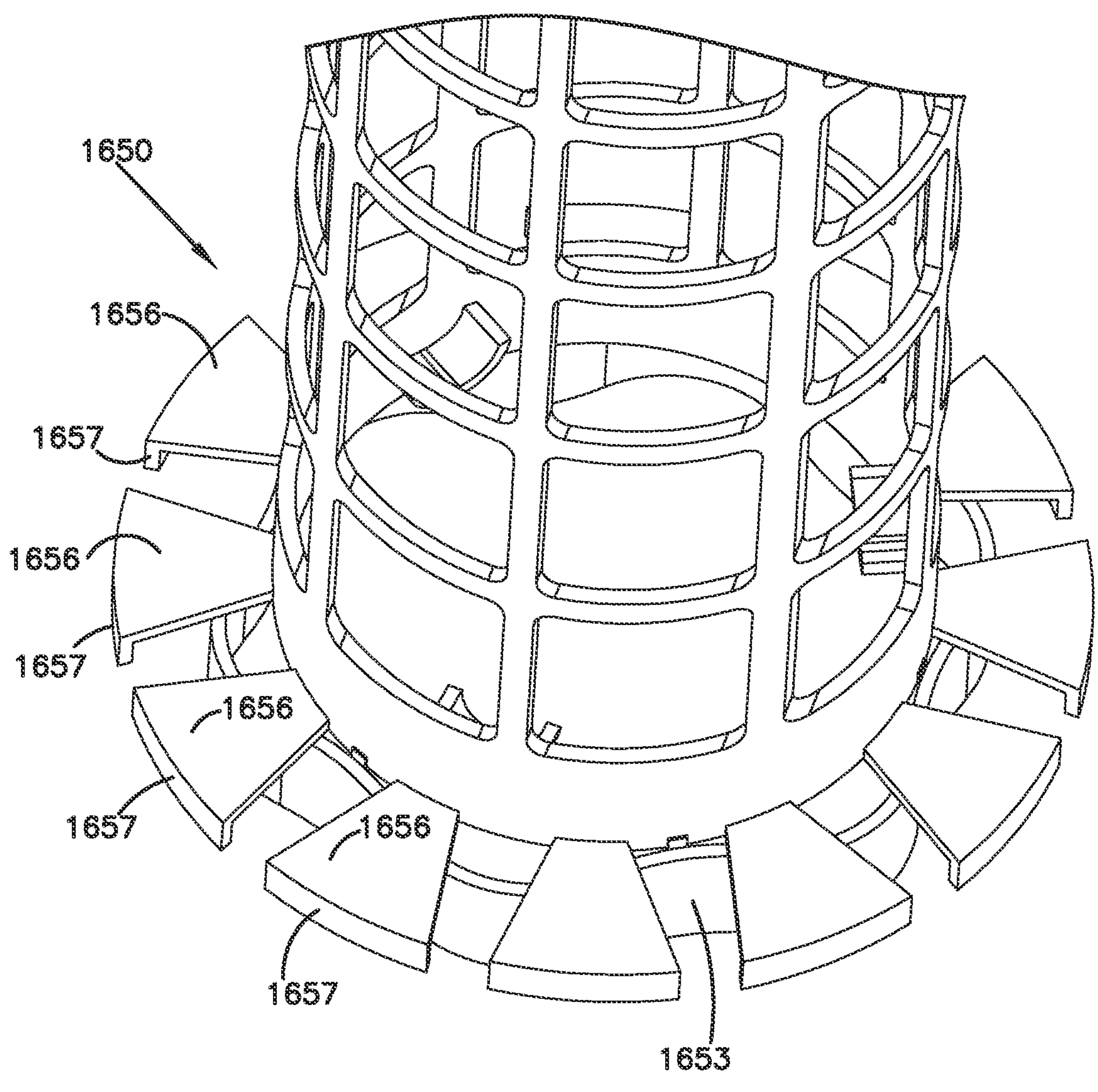

In FIG. 94, a perspective view is shown, and projecting radially outwardly from sections 1653 are support section 1655 comprising radial sections 1656 and axial projections 1657. In FIG. 95, an alternate perspective view is shown, for further examination. From a review of FIGS. 93-95, it will be understood that support for an outer seal can be provided by a section that comprises an outer support region and segments that is not supported by ribs but rather is secured to other portions of the support structure in alternate manners. Also, axial support sections 1651 can be used.

The principles of FIGS. 93-95 can be applied in many of arrangements described herein.

In FIGS. 96-101, a variation relating to providing a seal support separately from a media support is provided.

Figure 96:
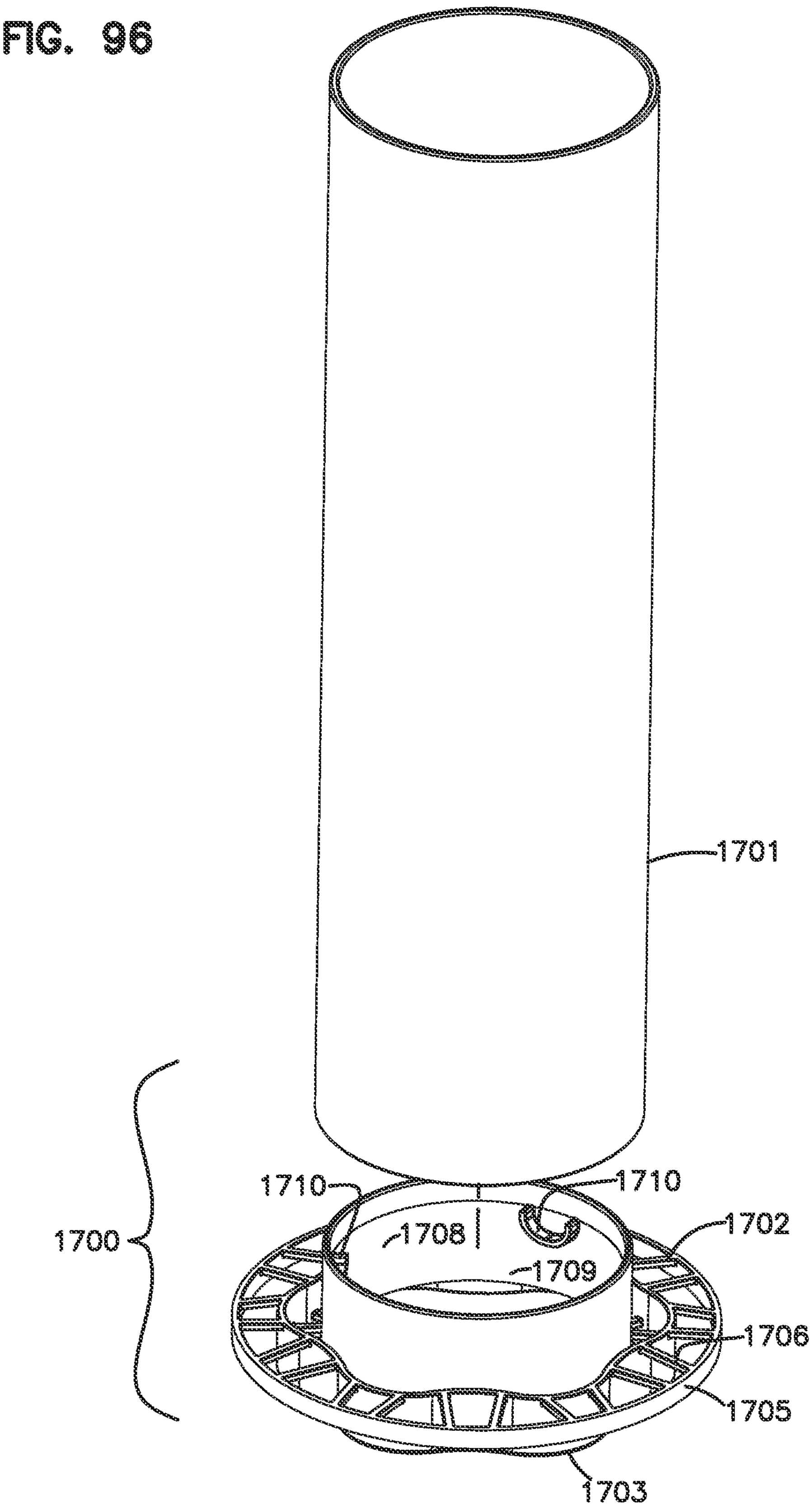

Attention is first directed to FIG. 96, in which construction 1700 is shown. Construction 1700 is depicted schematically and comprises a media support section 1701 and seal support section 1702. It can be seen that the two sections 1701, 1702 are separate from one another, i.e. not integral with one another. Support section 1701 is shown schematically. While it can comprise a porous tube with a lattice structure, as a media support, it can be configured as a resonator/sonic choke section if desired. The intent in the depiction of FIG. 96, is simply to show schematically there is a section that projects into an interior surrounded by media in use.

Support section 1702 can be in accord with any of the variety of supports described previously herein. In the example depicted, it comprises a primary seal support 1703 which can be alternately configured to support a variety of differently shaped seals. In the particular example support 1703 is configured to support a seal arrangement in which the seal comprises a plurality of inwardly projecting and outwardly projecting sections. Also provided on the support 1702 is an outer rim 1705 secured by ribs 1706. Variations discussed above can be used.

Figure 97:
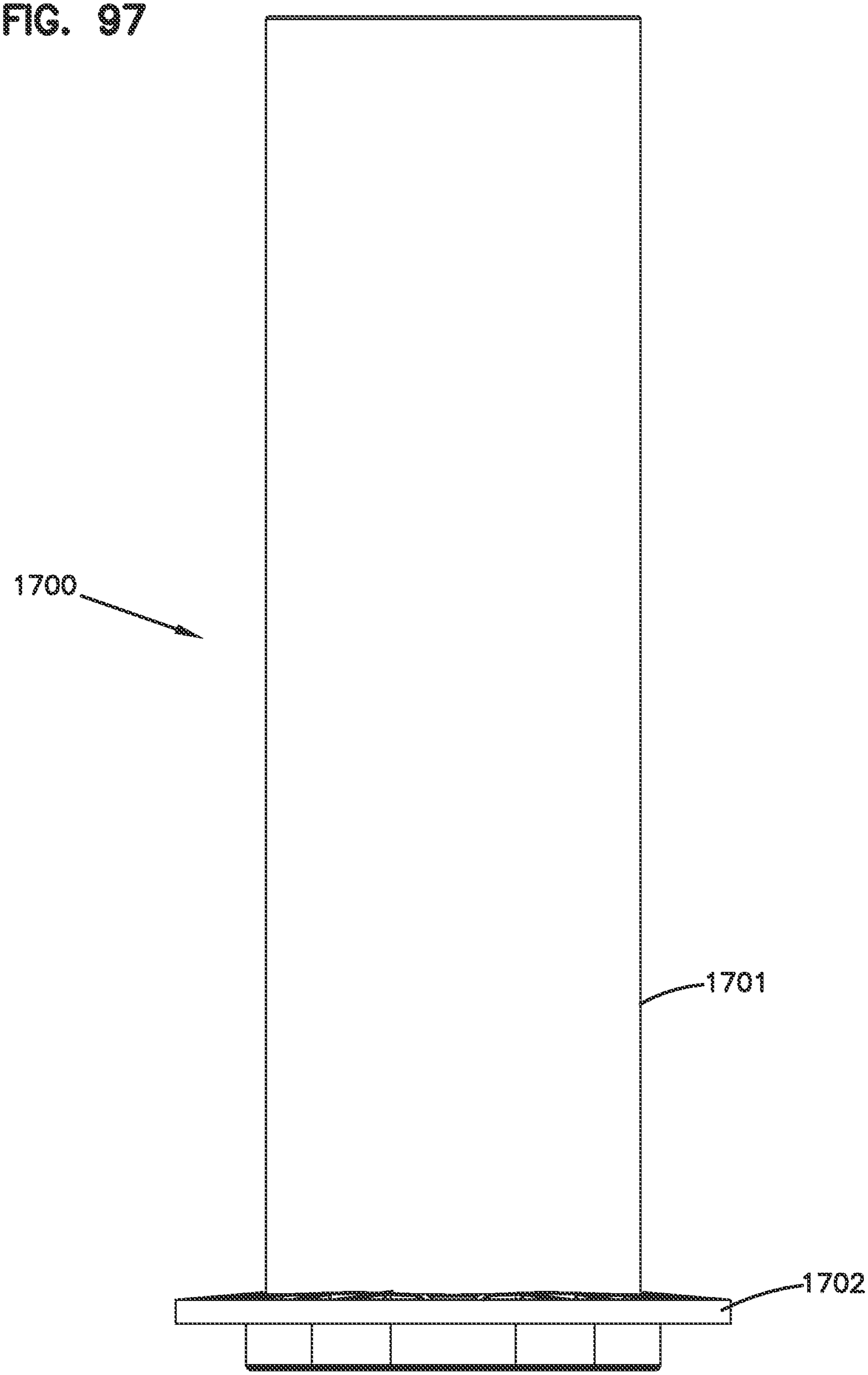
Figure 98:
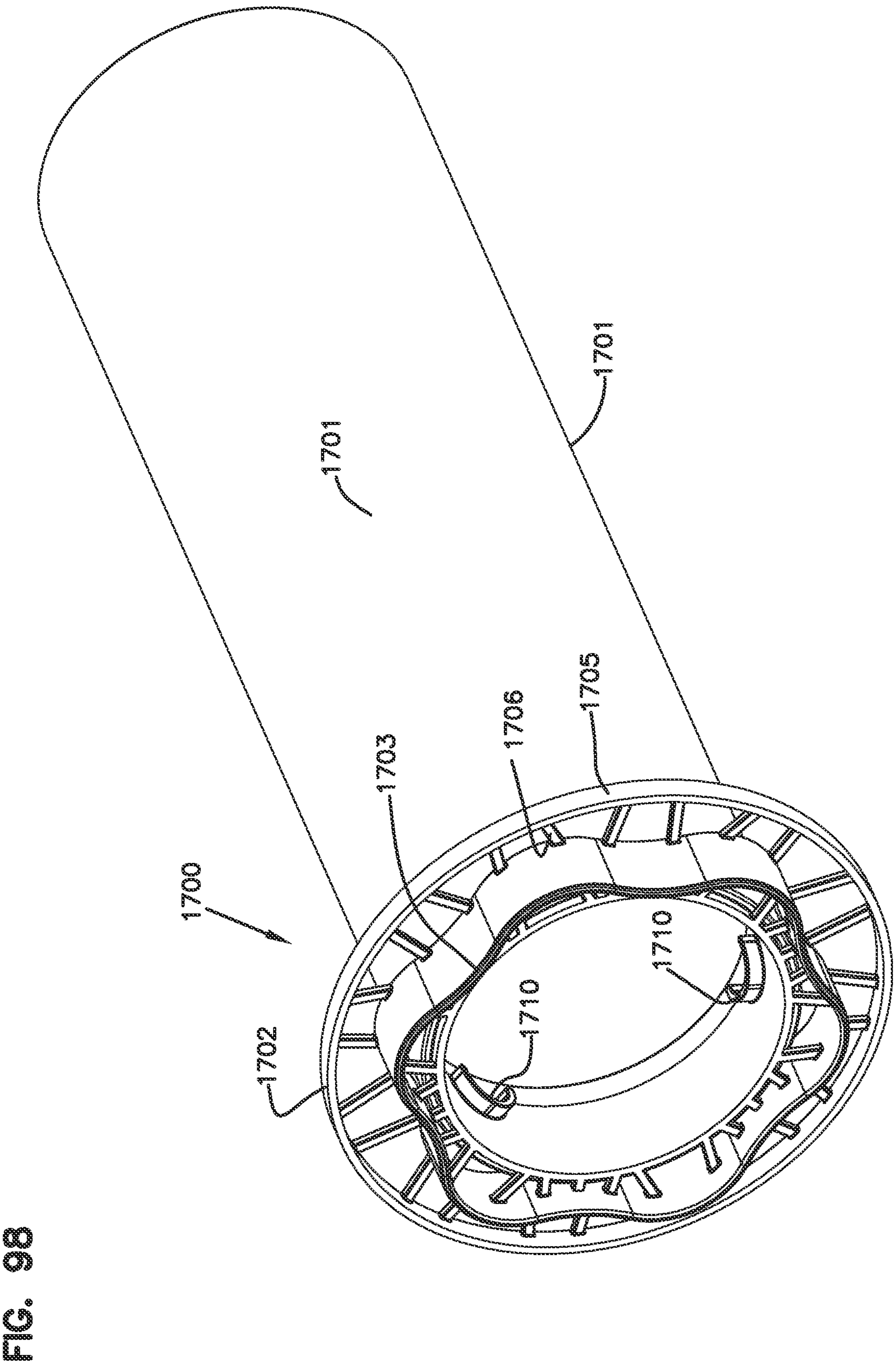
Figure 99:
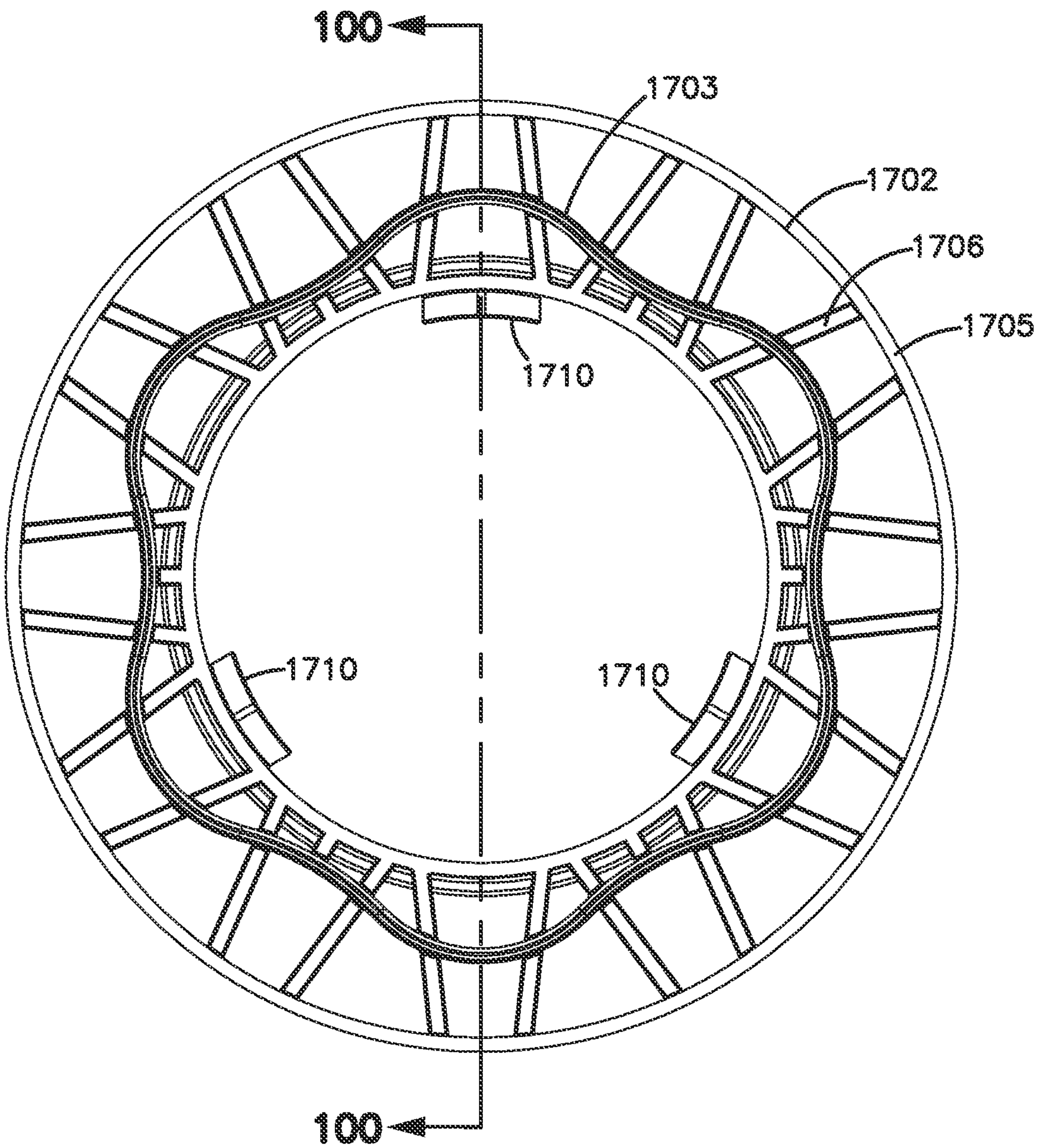
Figure 100:
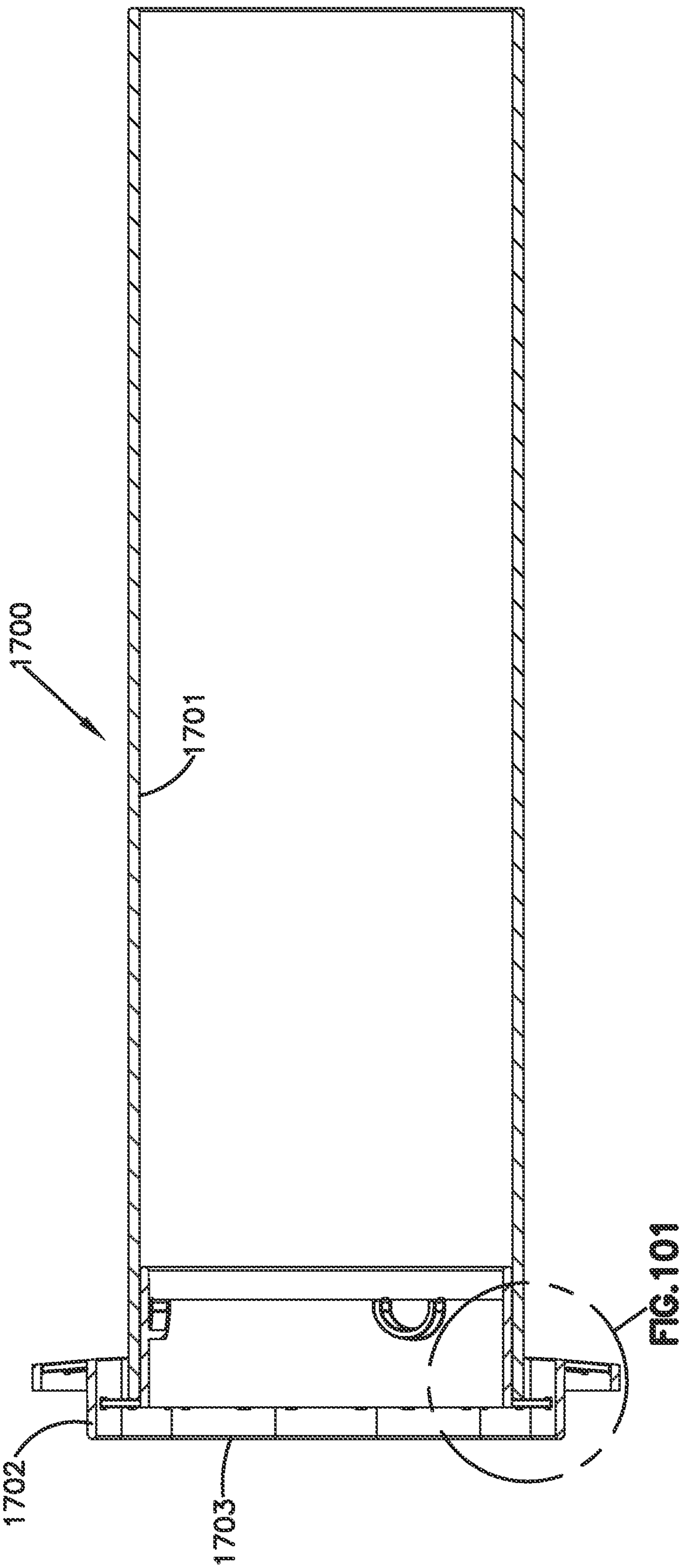
Figure 101:
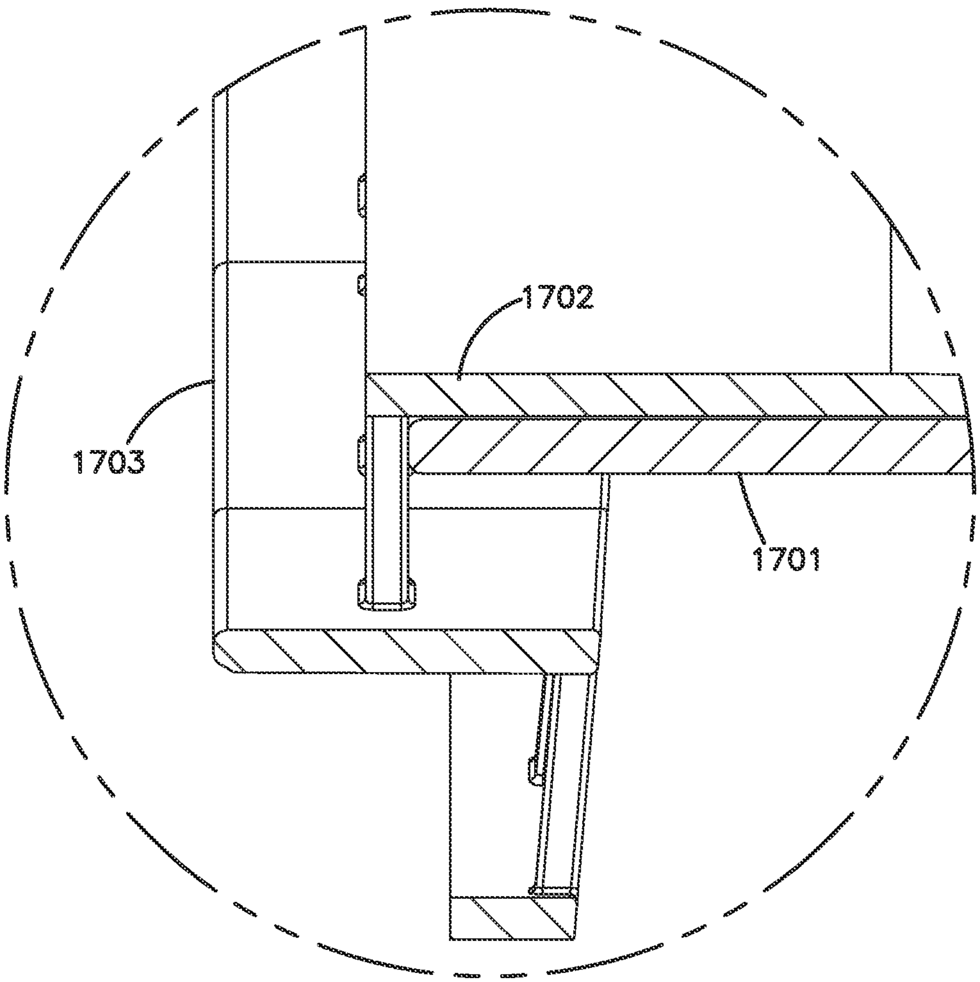

Support 1702 further includes a central section 1708 with an air flow aperture 1709 therethrough and with optional members 1710 of a radial indexing arrangement thereon. In FIG. 97, section 1401 and 1402 are shown brought together as they typically would be during typical assembly. In FIG. 98, structure 1700, FIG. 97, is depicted schematically with sections 1701 and 1702 as previously described. In FIG. 99, and end view taken toward section 1702 is provided, with features as previously described. In FIG. 100, a cross-sectional view of support structure 1700 is depicted with sections 1701 and 1702 as previously described. In FIG. 101, an enlarged fragmentary view of a portion of FIG. 100 is depicted again with sections as previously described.

It will be understood that during preparation of the cartridge, the support 1700 can be assembled from non-integral pieces, which would then be put together during molding an end piece to secure the parts together and to provide for appropriate features in the cartridge. The non-integral pieces can be made from the same material or different materials.

IX. An Example Embodiments with a Straight Through Flow Constructions, FIGS. 102-107

Herein, above, the examples described generally relate to arrangements in which the media of the cartridge surrounds an open filter interior, and during filtering flow goes through this media into the open filter interior and then exits through an open end piece and an end of the media pack. The principles described herein can be applied in alternate arrangements in which the media is constructed for "straight through flow", i.e. in which flow during filtering enters one end of the media and exits an opposite end. Example can be understood by reference to FIGS. 102-107. Of course the housing would be modified for use with a straight through flow cartridge.

Figure 102:
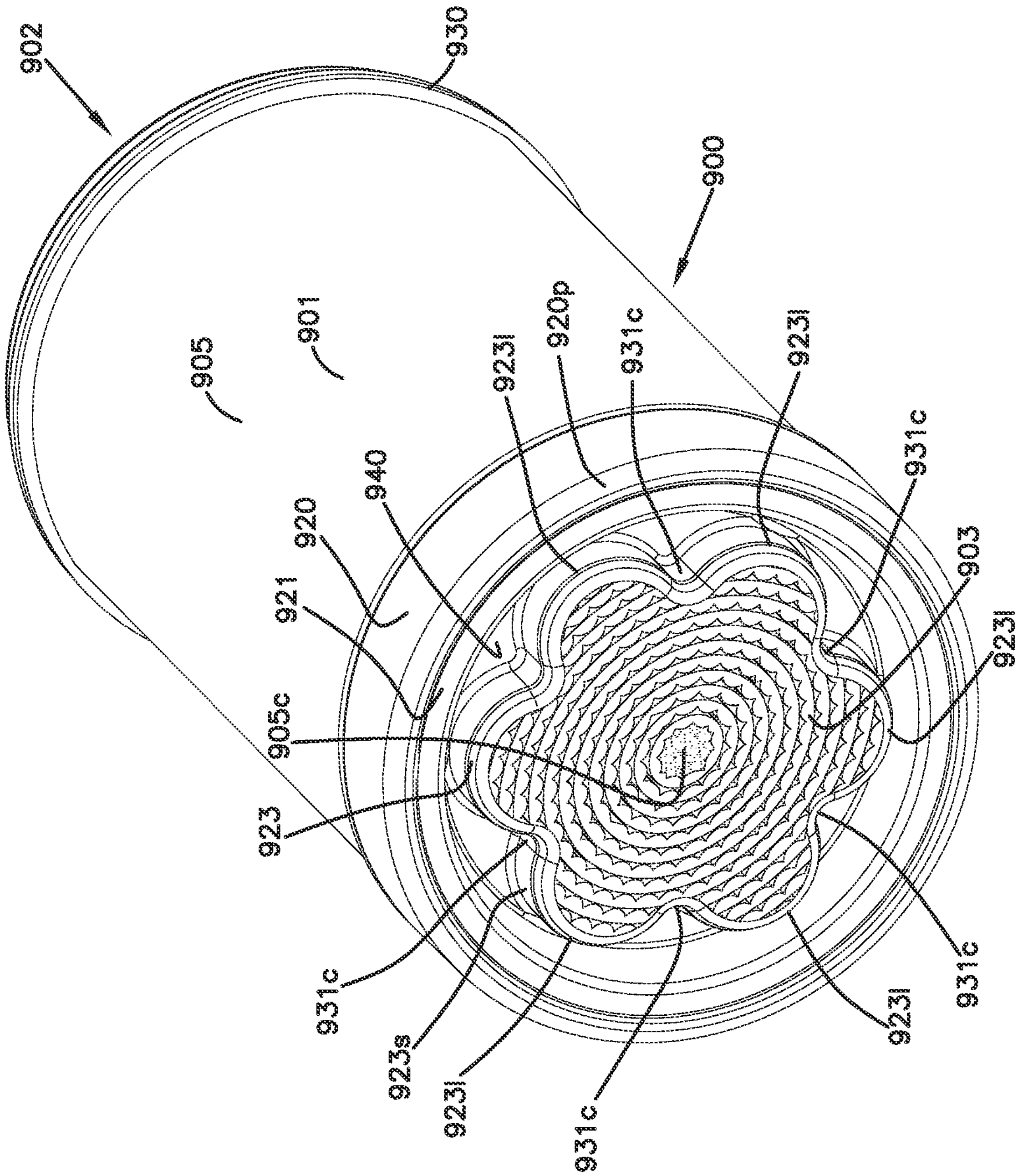

Referring to FIG. 102, a cartridge 900 is depicted comprising a media pack 901 configured for straight through flow during filtering. As an example, unfiltered air (gas) can enter into end 902 and exit through opposite end 903 as filtered air (gas). The media 905 can be configured in a variety of ways, for example, as a fluted construction with flutes extending between the opposite ends or flow faces 902, 903, provided with inlet flutes open at end 902 and closed at end 903, and outlet flutes closed at end 902 and open at end 903, with the media 903 configured such that air which enters 902 cannot exit end 903 without passing through the media. Such media can be provided for example in the form described in U.S. Pat. Nos. 6,190,432 and 7,396,376 incorporated herein by reference, in which the media pack comprises fluted materials secured to facing materials and formed in the media pack with appropriate flute seals for operation.

Figure 103:
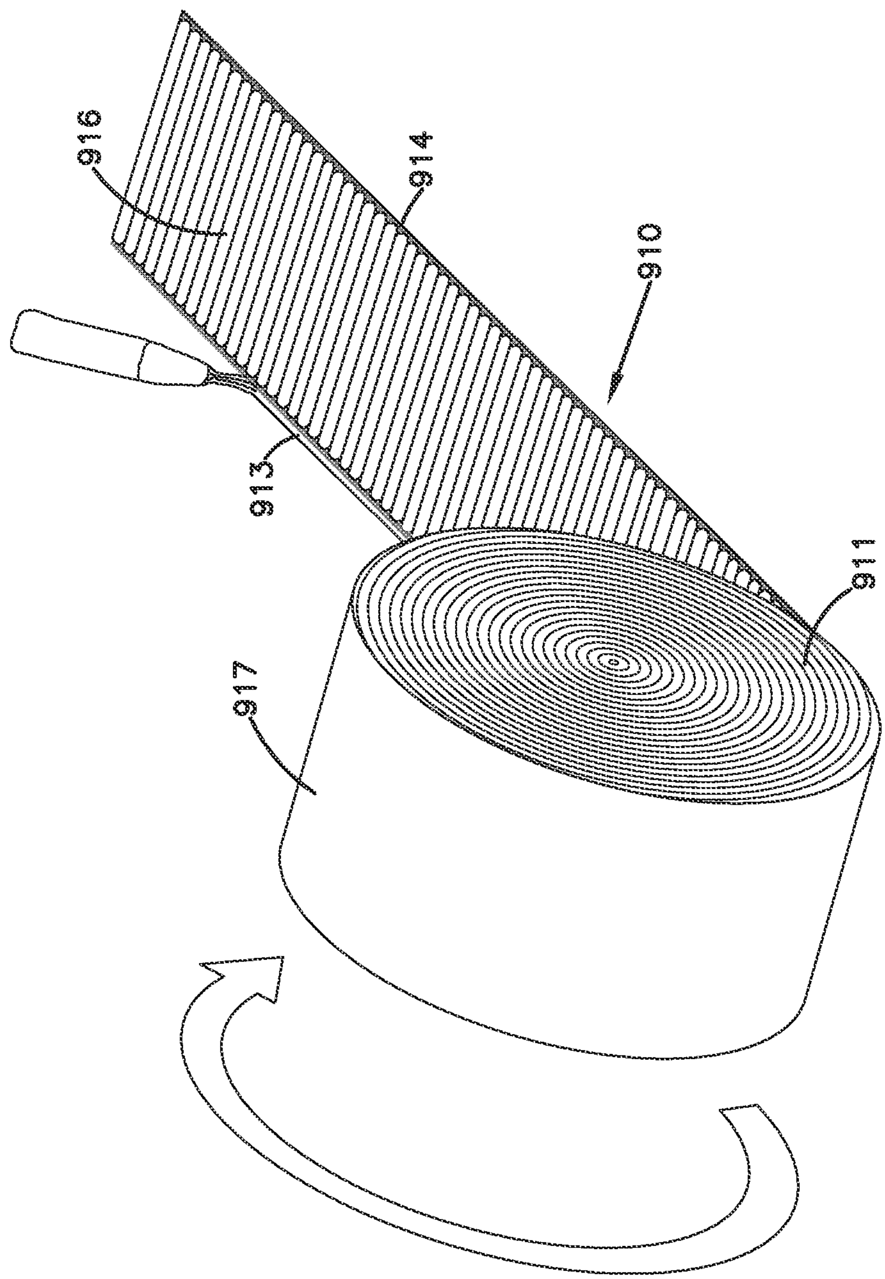

Typical examples comprise a fluted sheet secured to a facing sheet (for example) and coiled as shown in FIG. 103 at 910. Construction of such media, is, for example, described in U.S. Pat. Nos. 6,190,432 and 7,396,736 incorporated herein by reference. It can be made of a variety of materials and can be provided with a surface treatment such as fine fiber, if desired. Referring to FIG. 103, the coil 911 is shown with a seal 912 formed at one end of the flutes 913 as the media is coiled, and with a second flute 914 already formed between a fluted sheet 916 and a facing sheet 917. Such a coil 911 can then be used in the media pack of cartridge 900.

Referring back to FIG. 102, the cartridge 900 is depicted as having an end piece 920 at a first end of the media 905. The end piece 920 depicted includes a molded-in-place portion 921 configured to have a first seal member 923 generally as previously described, in the form of a radial seal 923*s* (in the example a radially outwardly directed seal) comprising a plurality of outwardly curved (convex) lobes 923*l* spaced by, preferably, non-straight, inwardly directed, preferably outwardly facing, (concave) regions 931*c*. The shape and number of lobes 923*l* can be as previously described for other embodiments. Further, the seal material forming surface 923*s* can be molded over a structural support if desired.

The particular end piece 920 depicted includes an optional receiving groove 940 surrounding the seal surface 923*s*; the groove being generally as previously described. Further, the end piece 920 includes an outer perimeter 920*p* that can be formed from the seal material to provide a secondary perimeter seal as previously described. Further, the end piece 920 can include an optional support structure embedded within the perimeter 920*p* to form a support for seal 920*p*.

A support structure, as indicated above, can be included embedded within molded-in-place portions of end piece 920, and would thus be out of view of the embodiment shown in FIG. 90. It can be provided with a support for 923*l* and support for seal 920*p* if desired. If used, the support could be configured not to extend into a center of the media 905, if desired, since in this instance media 905 is not coiled around an open filter interior. Rather, a central section 905*c* of the media coiled can simply be plugged at end 903.

Still referring to FIG. 102, the cartridge 900 depicted is provided with a second end piece 930 adjacent end 902, to facilitate gripping. End piece 930 is optional. It would typically be open at end 902 to allow flow passage into the media pack.

The media pack of cartridge 900, FIG. 90, can be provided with an impermeable sheath or shield surrounding the media if desired. However, such a shield would be optional, and the media pack can be simply a coiled construction of facing media secured to fluted media, if desired. The features of the end piece 920 can be, in general, in accord with the descriptions provided herein above for other embodiments, except modified where needed to accommodate the media type.

The depiction in FIG. 102 is schematic, it is not meant to precisely to depict any selected embodiment, but rather be indicative of how the principles described herein can be applied in arrangements which uses a media of the type described above, for straight through flow. Again, if used, the housing would be configured for a straight through flow cartridge.

It is noted that in the example depicted, portions of the end piece 920 are positioned over an end of the media 905, and thus would block flow through outer perimeter portions of the media, i.e. various ones of radially outer most flutes. If desired, the end piece 920 can be provided with a support which provides that molded-in-place portions of the end piece 920, and any preform support portion, are supported spaced away from ends of the flutes, at media face, so that radially outer most flutes, or at least fewer flutes, are blocked from exit flow therefrom. Principles described in connection with U.S. Pat. Nos. 6,190,432 and 7,396,376 for supports and seal members thereof, can be applied to accomplish this result.

It is noted that the embodiment of FIGS. 102 and 103 can be practiced with the variations described previously herein, in connection with other embodiments, especially as to detailed configuration of seal dimensions, receiver groove dimensions, seal location and direction etc.

Figure 104:
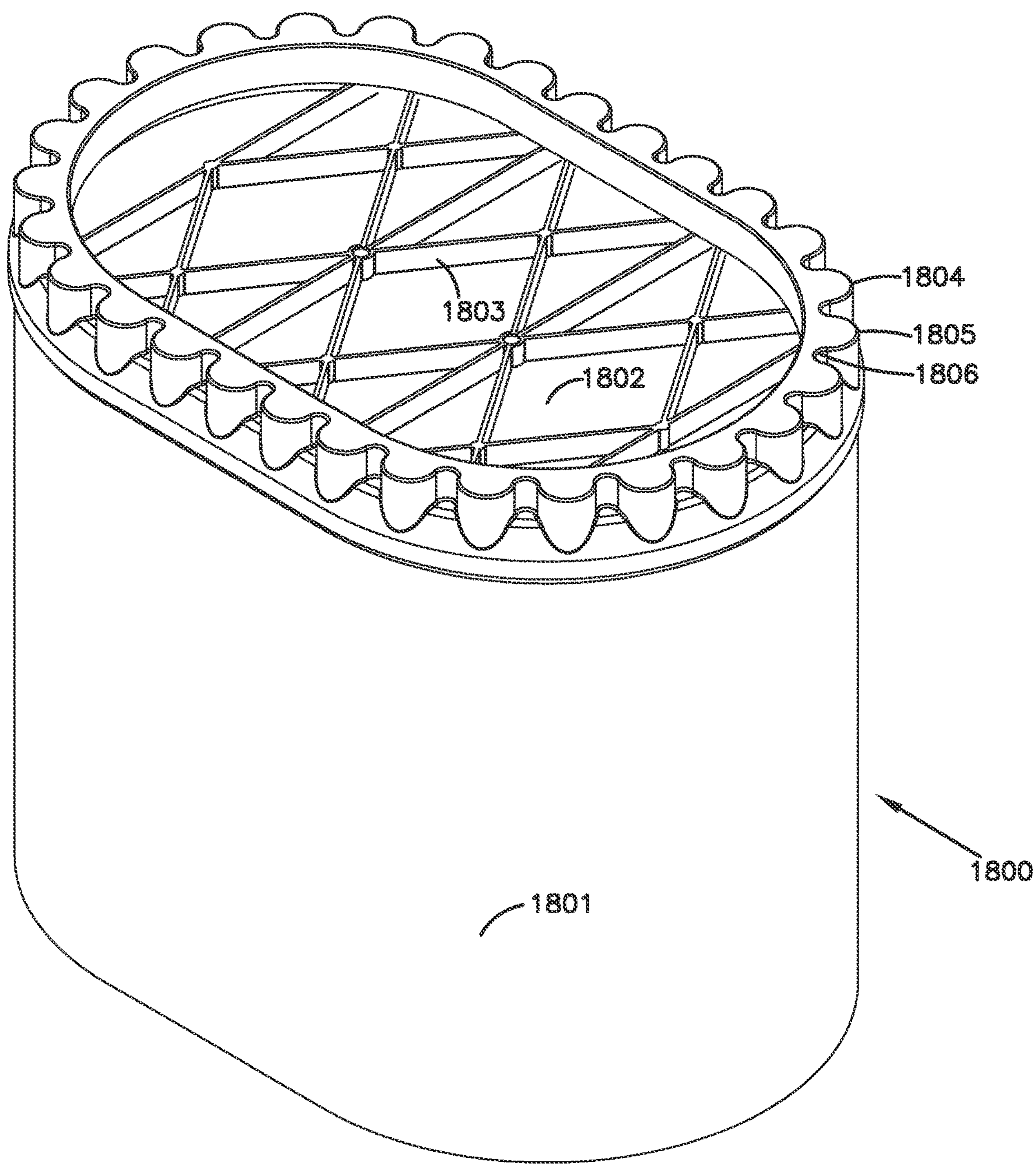
Figure 105:
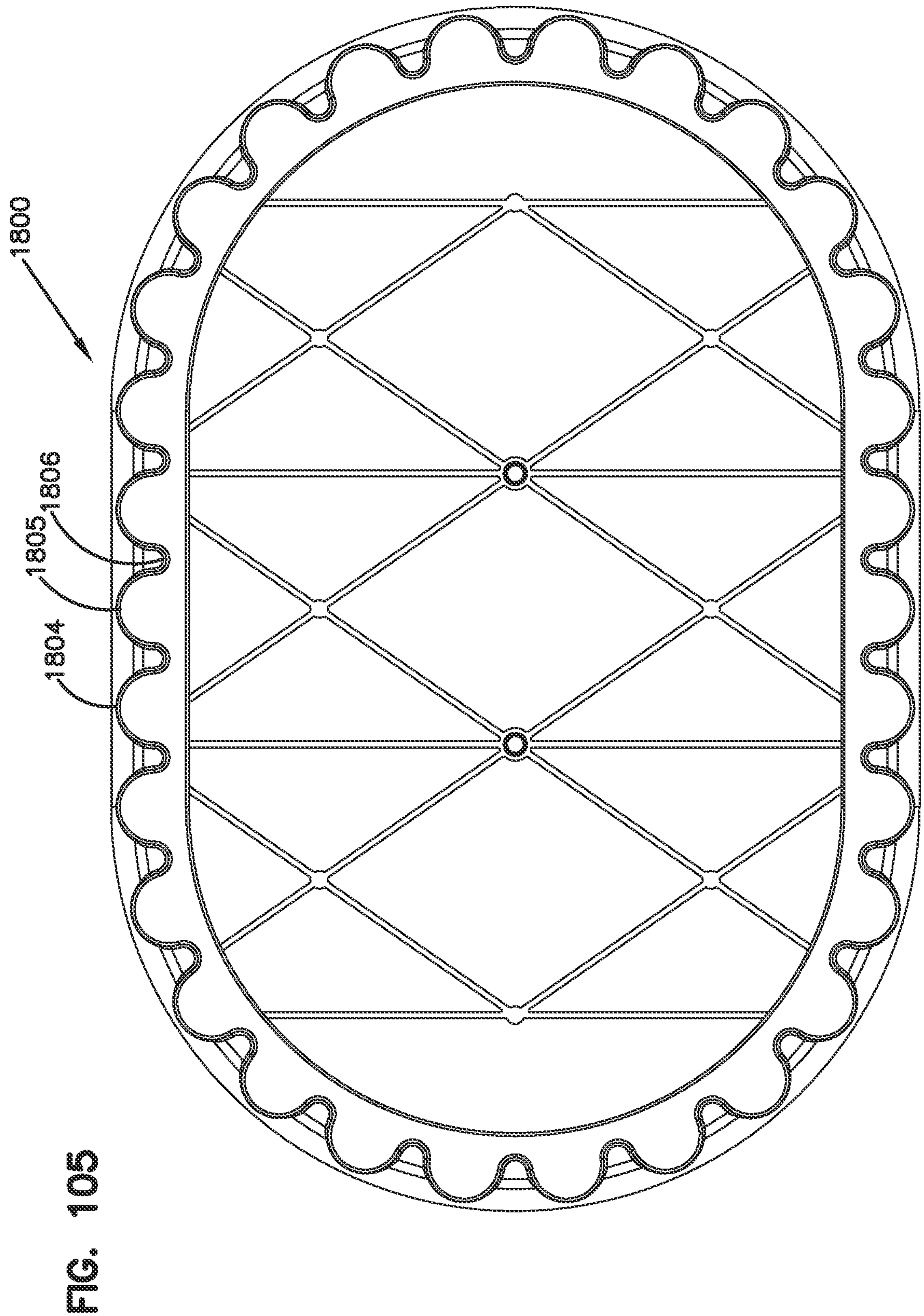

The principles described can be applied in straight through flow constructions without circular configurations, see for example the arrangement of FIGS. 104, 105. In FIG. 104, the cartridge 1800 is depicted comprising a media pack 1801 using media generally as described above in connection with FIG. 103, except coiled in a non-circular pattern. Such oval arrangements are described for example in WO 00/50149 and WO 2005/063361, incorporated herein by reference.

An end 1802 of the media is depicted, having a support 1803 thereon as seal arrangement 1804 therearound. The seal arrangement 1804 depicted comprises a plurality of outwardly projecting sections 1805 separated by inwardly projecting sections 1806, to form a non-circular radially (in the example outwardly) directed seal. Here, many more than 12 each of such sections are shown, but alternatives are possible. Of course, the principles could be applied with a radially inwardly directed seal. It is noted that the particular embodiment of FIG. 104 is as a single primary seal, although the principles could be applied in embodiment with an optional secondary outer seal if desired. In FIG. 105, an end view of cartridge 1800 is depicted with features as described.

It is noted that a variety of straight through flow constructions using media comprising fluted sheets secured to facing sheets are known, in which the media pack is not configured from a coiled arrangement but rather comprises a stack of sheets of media, the sheets comprise fluted media secured to facing media. Examples are described in U.S. Pat. No. 8,216,334, incorporated herein by reference. The principles described herein can be applied with such arrangements. An example is depicted in FIGS. 106 and 107, which comprise variations of the arrangements depicted in U.S. Pat. No. 8,216,334, incorporated herein by reference.

Referring first to FIG. 106, filter cartridge 1850 is depicted. The filter cartridge 1850 includes a media pack 1851 configured for straight through flow. The surface of media pack 1851 depicted at 1852 is generally an inlet surface or face. Internally within the cartridge 1850 at 1853, an outlet surface or face will be provided. The media pack 1851 can comprise for example a stack of strips of media, the various strips comprising fluted media secured to facing media, with inlet and outlet flutes extending between surfaces 1852, 1853.

Still referring to FIG. 106, the cartridge 1850 includes end piece 1855, 1856 mounted thereon. It is noted that the end pieces 1855, 1856 depicted are molded-in-place onto the media 1851, but alternatives are possible. Further, the cartridge 1850 includes a sheath 1860 that extends around selected portions of the media pack 1851, and variations in the configuration are possible.

Still referring to FIG. 106, end piece 1856 is an open end piece, having a flow aperture 1870 therethrough, for gas flow. Typically aperture 1890 is an outlet aperture, allowing for egress from an interior of cartridge 1850 of filtered gas, typically air.

In the arrangement depicted, aperture 1870 is shown having thereon, a radially directed seal 1871 comprising a plurality of lobes 1872 separated by recesses 1873. In the example depicted, the seal 1871 is a radially inwardly directed seal, and the lobes 1871 are radially inwardly projecting (convex) and the recesses 1873 are radially outwardly projecting (concave). This indicates that the principles can be applied with a radially directed seal. However, it is noted that the cartridge 1850 could be configured with an outwardly directed seal if desired.

In FIG. 107 an end view of cartridge 1850 is depicted with features as described.

X. Application of the Principles in a Crankcase Ventilation Cartridge, FIGS. 108-111

As indicated above, the principles described herein can be applied in connection with filtration of a variety of materials including various gases and in some instances, liquids. Many of the applications will preferably involve filtering of air, for example, engine intake air for internal combustion engines. However, the principles can be provided in filtration of other gases, such as crankcase ventilation gases. Examples are depicted in FIGS. 108-111.

A first example is provided in FIGS. 108-109. The crankcase ventilation filter assembly, with which these principles are depicted, can be one otherwise generally in accord with the descriptions of U.S. Ser. No. 61/503,008 and U.S. Ser. No. 61/665,501, incorporated herein by reference.

Referring to FIG. 108, a cartridge 1900 is depicted comprising media 1901 positioned in extension between opposite ends 1902, 1903. The particular media 1901 depicted is configured surrounding an open filter interior 1905. Media selection for a crankcase ventilation gas filter can be made in accord with the general principles well known therefor, for example in accord with WO 2008/157251, incorporated herein by reference.

The cartridge 1900 is depicted having end pieces 1910, 1911 between which the media 1901 extends. Although alternatives are possible, in a typical application for crankcase ventilation filter cartridges, the media 1901 would not be embedded in the end pieces 1910, 1911 but would merely extend therebetween. Typically the end pieces 1910, 1911 would comprise portions of structure that include media support structure but alternatives are possible.

End piece 1910 is depicted as having an outer perimeter 1911 having a radially directed seal thereon. The radially directed seal is configured comprising a plurality of outwardly directed lobes 1915 spaced by recesses or inwardly projecting regions 1916.

In FIG. 109, a plan view of cartridge 1900 is depicted, with features as indicated. Example dimensions are as follows: XL=5 mm radius; XM=18.7 mm radius; XN=106.34 mm; and, XO=100.5 mm.

Still referring to FIGS. 108 and 109, it is noted that a crankcase ventilation filter cartridge is configured to filter crankcase ventilation gases, which generally include a liquid (fine droplet or aerosol) phase as well as a solid particulate phase. The media is generally selected as a coalescing media for the liquid particles, and a drainage path is typically provided for draining of liquid collected by the cartridge. The cartridge can be configured for out-to-in flow during filtering or in-to-out filtering. Depending on the direction of the flow, the second end cap may be provided with an opening therethrough, to facilitate liquid drainage flow. Principles relating to this are described in WO 2007/53411 and WO 2008/157251, incorporated herein by reference.

In FIGS. 110, 111, a further example of a crankcase ventilation filter cartridge is depicted. It is noted that the cartridge is configured generally analogously to the cartridge that can be used in systems having features such as those described in WO 2007/53411 and WO 2008/157251, incorporated herein by reference.

Referring to FIG. 111, cartridge 1950 is depicted comprising media 1951 extending between opposite end pieces 1952, 1953. Herein, end piece 1952 is provided with first and second seal sections thereon, first section 1955 comprising a radially directed seal (in the example, a radially outwardly directed seal) comprising a plurality of outwardly projecting sections 1956 separated by radially inwardly projecting sections 1957. The primary seal 1955 is depicted surrounded an open central aperture 1958.

End piece 1958 is depicted as having a perimeter section 1960 spaced from seal arrangement 1955 radially by receiving groove 1961. The perimeter rim 1960 can define an outwardly directed seal 1965, seal 1965 has a secondary seal if desired.

In FIG. 111, an end view of cartridge 1950 is depicted, with features previously described indicated.

In FIG. 111, example dimensions are as follows: XP=129 mm diameter; XQ=16 mm radius; XR=3 mm radius; XS=93 mm; and, XT=71 mm.

XI. Further Characterizations; Selected Variations; Additional Examples, FIGS. 112-206

A. Media Variations

As indicated by the above descriptions, variations in the media definition can be accommodated with the principles according to the present disclosure. The media can be: configured around an open central interior (see for example FIGS. 34A, 34C, 72 and 75B); or, configured in a straight-through flow pattern (see for example FIG. 102). The media can be pleated, or it can be non-pleated. The media can be configured in a generally cylindrical, pattern (FIGS. 34A, 34C, 72 and 75B) but it can also be in a generally conical form, with the media around a central interior. The media can even define a non-circular cross-sectional perimeter shape, for example oval, see for example FIG. 104.

When the media is pleated, as indicated previously, generally the references to the inner and/or outer media perimeters are meant to be references the perimeters defined by the pleat tips. When it is indicated that a perimeter has a particular shape, or that the media has a particular shape, in cross-sectional and/or perimeter definition, the general shape referenced is meant, without regard to minor variations in the geometric shape, for example due to pleat tip distortion. When the media is conical, or tapered in outer dimension, often the configuration will be such that the media tapers downwardly in cross-sectional size from the closed end of the cartridge toward the open end of the cartridge.

Other media variations can be used beyond those previously shown. For example in certain embodiments, an arrangement is used in which while the media, typically pleated, does define a generally cylindrical pattern, but the pleated media is distorted around a central media axis that is not co-linear with (or parallel to) a central axis through the open aperture, and/or surrounded by the radial seal definition. Alternately stated, with such a configuration the two opposite end pieces can be oriented with centers eccentrically positioned with respect to one another, or otherwise in accord with the general descriptions of U.S. Ser. 61/829,666, filed May 31, 2013; U.S. Ser. No. 61/832,269, filed Jun. 7, 2013; and, U.S. Ser. No. 61/974,273, filed Apr. 2, 2014, each of which is incorporated herein by reference.

B. Seal Variations

As indicated in previously described embodiments, in many applications of the techniques described herein, one of the end pieces (a first open end piece) of the filter cartridge has a housing seal arrangement thereon, often molded integral therewith. The housing seal arrangement generally comprises a first radially directed seal surface. That radially directed seal surface can be generally a surface facing away from a central axis surrounded by the seal surface (or a central air flow aperture arrangement surrounded by the seal surface, i.e. be a radially outwardly directed seal); or, a seal surface facing generally toward a central axis (or the central air flow aperture arrangement) surrounded by the seal surface (i.e. it can be radially inwardly directly radial seal); or, in some instances both types of seal surfaces can be used (i.e. both a radially inwardly and a radially outwardly directed seal surface). An example of the outwardly directed radial seal surface is found in FIG. 75B. An example of a radially inwardly directed seal surfaces are also provided. Further, examples of both are provided.

Generally, the non-circular configuration can be characterized (or understood) as being in extension of the seal surface around a central air flow aperture. By this it is meant that as one traces the seal surface around the air flow aperture arrangement (or central axis), a non-circular pattern is defined by the seal surface. In a typical application, that non-circular configuration comprises radially projecting sections, whether radially inwardly or outwardly, to define a plurality of spaced radially projecting, spaced, lobes (either inwardly or outwardly directed lobes) in the seal surface, as the seal surface extends around the air flow aperture. Again, by this it is meant that as one traces the surface definition around the air flow aperture (or central axis around which a seal is positioned), one traces a pattern of lobes spaced by recesses. This can be characterized as being an undulating seal surface, in the direction of extension around the aperture. Typically, there will be at least three lobes alternating with at least three recesses. Often the number of each will be within the range of 4-12, inclusive.

The seal surface (whether inwardly directed or outwardly directed) can be characterized with respect to its spacing relative to the inner perimeter and/or outer perimeter of the media. Typical such characterizations will be with respect to the percentage distance across the media from the inner perimeter to the outer perimeter (or the outer perimeter to the inner perimeter) of the location of the surface in axial overlap with the media. A typical approach to characterizing this will be with respect to the location of the tips of the various lobes (whether inwardly or outwardly directed). Typically, the lobes will not be positioned at either the innermost perimeter or the outermost perimeter of the media, in axial overlap therewith. Rather, it will sometimes be spaced from each by at least 5% of a distance across the media from at least one (and sometimes from each) perimeter; and, often at least 10%. In some instances, the spacing will be at least 15% from at least one, and often from each perimeter, and in some instances, at least 20% from at least one, and often from each, perimeter.

In many instances the various lobes will be of uniform shape in angular (rotational) spacing on center, around a central seal axis or open interior. The same will be typically being the case for recesses between the lobes.

The outer perimeters of the lobes and the perimeters of the recesses therebetween can be made to a circular radius, but alternatives are possible. In some instances, the curvature of the lobes and recesses can be approximately the same radius; however, in many instances they will vary substantially. In some instances, the radius of the recesses between the lobes will be relatively small by comparison to the radius of the lobes. An example of this is shown in FIG. 34A. In such situations, the radius of the lobes may be at least two times larger than the recesses, often 3-7 times larger than the recesses, (i.e. the recesses could be less one-half the radii of the lobes). This will be typical, for example, in certain applications of small cartridges. It is noted that when such a large difference occurs, many of the forces of sealing become directed at an angle relative to the radial direction. This effect can be used with respect to facilitating centering and modifying the feel to the installer during installation and removal.

In other instances, the radius of the recess between the lobes can be relatively large by comparison to the perimeter radius of the lobes themselves. An example of this is also shown. When this is the case, the recesses may have a radius substantially larger than the lobes, for example, about two times the radius of the lobes, often 2-4 times the radius of the lobes, (i.e. the lobes could be less than one-half the radii of the recesses). Such a design will tend to direct more of the compression forces in a more radial direction by comparison to the arrangement of FIG. 34A.

Of course other relative radii can be used, including ones about equal.

The amount of urethane used to form the seal arrangement can be varied for efficiency, by techniques of adjusting the seal arrangement shape. For example, the radial thickness of the projection having the seal surface thereon can be varied by thinning out the surface of the surface opposite the seal surface, in distance from the seal surface. An example of this is shown in some examples wherein a circular radius is used for the surface opposite the seal surface having the lobes, but in which that circular surface has been recessed toward the seal surface to make a total amount of urethane used in the seal bulge or seal projection less.

Another example is shown in which an undulating shape is used for both radial surfaces of a seal projection. Now the overall seal projection (projection on which the seal surface is positioned) can be of even radial thickness and thus use less urethane.

Such seal arrangements and surfaces can be made in accord with the techniques described herein. With respect to any support within the seal, when used, it can be modified accordingly and positioned accordingly. Again, it may be solid with respect to the surface against which the seal compresses, but it may also have apertures therein in some instances.

Many of the techniques can be applied in the absence of a second outer, often circular, perimeter seal, but many can be applied in the presence of such a water or weather seal. The water or weather seal can be configured such as shown in FIG. 34C, in which it extends to a location surrounding the main radial seal, in some instances further than the main radial with a groove or gap therebetween that receives a portion of the housing during sealing. However, it can also be a perimeter seal that is around an outside of the media or adjacent the end of the media, but positioned to engage a portion of a housing to form a weather seal therewith, during installation.

The seal can be configured in a unique pattern to assist an identification of an appropriate part for a given system, if desired.

C. Variations in the Engagement of the Cartridge with the Housing

Variations can be made in the manner in which the cartridge engages the housing. The cartridge can be configured to engage a portion of the housing that is not removed during servicing, as for example, characterized in various embodiments described above. However, the housing can also be configured to have the housing portion that engages the non-circular seal be a portion on a removable access cover.

Some selected variations in the manner in which the cartridge engages the housing can be understood from FIG. 134.

In FIG. 134, the cartridge 5001 is depicted with a media 5002 surrounding an open interior 5002*i*, in extension between first and second end pieces 5003, 5004. End piece 5004 would typically be closed, whereas end piece 5003 is an open piece, with a central air flow aperture arrangement or aperture 5003*o* therethrough.

A sealing projection 5005 is positioned on, in the example as an integral part, of end piece 5003. Sealing projection 5005 has a radially outwardly directed surface 5005*x* and a radially inwardly directed or inner surface 5005*i*. Each of these surfaces is defined in an undulating pattern, with lobes 50051 alternating with recesses 5005*r* as the surface (5005*x*, 5005*i*) extends around aperture 5003*o*, or a central seal axis. For the example depicted, each of the surfaces 5005*x*, 5005*i* has six lobes and six recesses. These two surfaces are positioned such that recesses on the inner surface 5005*i* are opposite lobes on the outer surface 5005*x*. Thus, projection 5005 can be relatively narrow, and if desired constant, in radial width or thickness to save urethane use.

Either or both of surfaces 5005*x* and 5005*i* can be used as a sealing surface, as will be apparent from the following.

Referring to FIG. 134, at 5015*x*, a portion of a housing is shown schematically. The portion 5015*x* includes a recess or groove 5015*g* positioned between sidewalls 5015*x* and 5015*i*. The groove 5015*g* would be shaped and configured to receive, projecting therein, seal projection 5005 when the cartridge is installed. Either or both of surfaces 5015*x*, 5015*i* can be configured as a housing seal surface, for sealing engagement with respect to surface 5005*x*, 5005*i*, respectively, on the cartridge 5001, in a sealing manner. (If both sides 5015*x*, 5015*i* provided sealing, projection 5005 may not need a seal support therein).

Of course, these variations can be used with a variety of seal configurations including ones in which opposite surfaces of the radial projection do not themselves, both have undulating (spaced lobes) configurations.

Other arrangements for interaction with the housing can be used in assemblies according to the present disclosure. For example, the closed end piece of the cartridge can be configured with a receiver projection therein, to allow for engagement with a housing portion during installation. A central projection can be included on the closed end piece that defines a receiver arrangement on a side opposite the first end piece, for engagement with the projection on a housing section in installation. The arrangement of the projection/receiver arrangement can be, for example, in accord any of U.S. Ser. No. 61/829,666, filed May 31, 2013; U.S. Ser. No. 61/832,269, filed Jun. 7, 2013; and, U.S. Ser. No. 61/974,273, filed Apr. 2, 2014, incorporated herein by reference.

Alternate or other projection/receiver arrangements can be used, for example in accord with U.S. Pat. Nos. 8,480,778, and/or 8,545,588, incorporated herein by reference.

D. Design Variations—Generally

The arrangements characterized herein can be implemented in a variety of alternate forms providing for a unique attracted and easily identifiable appearance. The various arrangements depicted in the figures show manners in which this can be implemented.

In some of the figures, phantom lines are used to indicate possible alternatives. For example, the general configuration of the open end piece can be used in connection with a variety of remaining cartridge features. Further, the specific features of the open end cap itself can be varied widely in many instances, to achieve different effects and appearance.

Also in the various drawings broken lines are sometimes used to show that the cartridge can be varied in length. In the example shown, in which such broken lines are used, the typical application would be with the scale being the same as shown by the distance between the two end caps in the figure. However, a wide variety of alternatives are possible. In some instances bottom views are not shown, in which case it should be understood to have no specific requirement of design features thereon, and can be varied as shown herein.

E. Additional Example Cartridge Variations, FIGS. 112-206

In FIGS. 112-206, some additional example variations and cartridges arrangements having features according to the present disclosure are provided. It is noted that in general, analogously positioned features in the cartridge have analogous function to those similar or similarly positioned features, in arrangements previously described, even though the features may be varied in specific appearance and detail. It is noted that the drawings are provided in "sets" for each cartridge. Within each "set" the first figure of the cartridge depicted, is a "perspective" or isometric view. In many instances, the views of the cartridges are provided in more variations with respect to the location of phantom lines. When this is the case, the phantom line variation of a figure is designated by a capital letter following the figure number. For example, FIG. 112 is a first variation (isometric view), with FIGS. 112A and 112B being second and third variations of that cartridge modified with respect to phantom lines.

A first additional example cartridge variation is depicted in FIGS. 112-116B. In FIG. 112, a perspective view is depicted. The reference numeral 2101 generally indicates the cartridge variation. The cartridge 2101 is shown with break lines Z indicating that the length is a variable. As with other figures, while a typical length would be to the scale indicated by the depicted distance between the opposite ends or end pieces, and the portion shown at the break between lines Z would be filled in with continuance of the lines shown, alternatives are possible.

Referring to FIG. 112, the cartridge 2101 comprises media 2102 extending between first and second end pieces 2103 and 2104; end piece 2103 being depicted in the embodiment as open, i.e. having a central air flow aperture or aperture arrangement or 2103*o* therethrough.

The media 2102 extends around an open central interior 2102*i*. In the example shown, a frame piece 2107 is depicted with the media wrapped therearound. End piece 2103 has a seal arrangement 2105 thereon, in accord with the present disclosure as a seal projection. The seal arrangement has a radially outwardly directed seal surface 2105*x* comprising alternating lobes 21051 and inner recesses 2105*r*. The seal arrangement 2105 also includes a radially inwardly directed surface, for example seal surface, 2105*i* comprising inwardly directed lobes 21051 and recesses 2105*r* therebetween.

Consistent with the descriptions above for FIG. 203, the cartridge 2101 can be used for radially outwardly sealing, radially inwardly sealing or both.

For the particular arrangement depicted, each of the seal surfaces 2105*x*, 2105*i* comprises six lobes alternating with six recesses, although the number can be varied. Further, the various lobes and recesses in each surface are symmetrically and evenly positioned. Alternatives are possible. It is noted that because, for the particular cartridge 2101 depicted, seal arrangement or seal projection 2105 is maintained of a relatively constant thickness, the outward lobes in the surface 2105*x* may be larger, i.e. configured to a larger radius, than the inward lobes of the inner surface 2105*i*.

The media 2102 is not depicted in detail. A variety of media configurations can be used, a typical one being with pleated media.

It is noted that the cartridge 2101 includes an adhesive bead 2108 coiled therearound, used with media having outer pleat tips. It is optional.

In FIGS. 113, 114, 115 and 116, alternate views of the cartridge 2101 are shown. In FIGS. 113 and 114 it can be seen that the closed end (2104) includes a member of a projection/receiver in general accord with U.S. Ser. No. 61/829,666, filed May 31, 2013; U.S. Ser. No. 61/832,269, filed Jun. 7, 2013; and, U.S. Ser. No. 61/974,273, filed Apr. 2, 2014 incorporated herein by reference.

It is noted that FIGS. 112A, 113A, 114A, 115A and 116A represent analogous views to FIGS. 112, 113, 114, 115 and 116, but different portions shown in phantom, indicating optional approaches. It is also noted that in FIGS. 112B, 113B, 114B, 115B, and 116B, another analogous cartridge is shown, with further indications or variations by phantom lines.

In other figures, sets of drawings are provided with general features analogous to the ones described above in this section, but varied with respect to specific features. It is noted that in some instances, three variations with respect to phantom lines are provided of each, but not with respect to all. Of course, analogous phantom line depictions could be used for any of the arrangements.

It is also noted that with respect to side views not all are necessarily depicted. What is depicted is sufficient side views, which can be used in connection with the other views provided, to understand the general features of the valorous sides. Also, in some instances, symmetry is provided by the design.

The various phantom line versions are not meant to indicate the only variations that are possible in the appearance or the design of the various cartridges. Selected features that are shown in solid line can be changed to phantom, or that are shown in phantom lines can be changed to solid, depending on the overall appearance intended.

It is noted that reference numerals are not used in many figures. It is meant to be understood that by positioning the cartridge in analogous orientations and views, that similarly positioned parts would have similar function to those parts described herein. Variations in specific appearance are not meant to indicate variation in general function. Analogously positioned parts, and features, then, are intended to have analogous function.

It is noted that many of the embodiments are depicted with a closed end cap having a "projection" arrangement thereon. This would typically be molded from a compressible material, and can be used as a compressible projection to help secure the cartridge in position.

It is noted that some of the cartridges are depicted with closed ends and "featureless" depictions. A variety of features can be used on the closed end cap, in these instances.

It is noted that the projection/receiver arrangement variation, for example in the embodiment of FIG. 112 in which the closed end cap has a projection extending toward the open end cap (that defines a receiver on an opposite side) can be used in a variety of the arrangements. Also, it can be varied substantially with respect to specific form and configuration.

XII. Selected General Comments and Observations

A. Additional Characterizations from U.S. Ser. No. 13/662,022 filed Oct. 26, 2012

According to the present disclosure, filter assemblies, components and features thereof are described. There is no specific requirement that an assembly, component or feature include all of the specific detail characterized herein, in order to obtain some benefit according to the present disclosure.

According to an aspect of the present disclosure, a filter cartridge for use in a filter assembly is described. The air filter cartridge generally comprises media having first and second ends; in certain embodiments the media surrounding and defining an open filter interior. The media can be pleated, but alternatives are possible. The media can have a generally cylindrical perimeter shape or alternate shapes.

A first end piece (typically an end cap) is positioned on the media, for example at an end. The first end piece is generally an open end piece, with a central aperture therethrough. In selected embodiments, the first end piece is an end cap that preferably extends completely across a first end of the media, fully enclosing the first end of the media. However, alternatives are possible. Typically, portion(s) of the first open end piece are molded-in-place, although alternatives are possible.

In many arrangements, a second end of the media is engaged by an optional second end piece. In selected embodiments, the second end piece is typically a closed end cap having no central aperture therethrough, but alternatives are possible. The second end piece can be molded-in-place, or include molded-in-place portions, although alternatives are possible.

In an example filter cartridge depicted, housing seal arrangement is positioned on the first end piece. In certain examples, the housing seal arrangement includes a (first) radially directed seal surface. In selected examples depicted, the (first) radially directed seal surface is non-circular in perimeter direction, for example having at least two, spaced, radially outwardly projecting seal surface sections, typically at least three spaced radially outwardly projecting seal surface sections and preferably at least four, spaced, radially outwardly projecting seal surface sections (typically 4-12, inclusive, such sections, usually outwardly convex in shape). The radially outwardly projecting seal surface sections, in many embodiments described herein, are spaced from one another by non-straight, for example radially inwardly projecting, usually outwardly convex seal surface sections, although alternatives are possible. Typically, the seal surface is oriented in axial overlap with the media.

Typically, the seal surface sections are radially outwardly directed, and configured to form an outwardly directed first radially directed seal surface. Examples are depicted in which the first radially directed seal surface comprises six outwardly curved surface sections and six inwardly curved surface sections. In another example ten outwardly curved sections alternating with the inwardly curved sections are used.

Example housing seal arrangements are described that comprise: a first radially directed seal arrangement having a first seal surface and an optional second radially directed seal arrangement having a second seal surface. Typically, when both are present, the first seal surface is spaced radially at least 5 mm from the second seal surface, often at least 10 mm typically at least 15 mm therefrom, although alternatives are possible.

Typically, the first radially directed seal surface (when the cartridge is not installed) has a seal perimeter largest cross-sectional size at least 5 mm smaller, usually at least 10 mm smaller, often at least 20 mm smaller than a largest cross-sectional size of the second radially directed seal surface, and sometimes at least 30 mm smaller, when the optional second seal is present. When both of the seal surfaces define a circular pattern, the perimeter cross-sectional size generally comprises the seal diameter of the seal surface (undistorted by installation).

An example is provided in which the first end piece includes a molded-in-place portion having a first end (or portion) of the media embedded therein; the first seal surface and the optional second seal surface typically each comprising surfaces of the molded-in-place portion.

In some example arrangements depicted, the first radially directed seal surface is radially outwardly directed radial seal surface, although alternatives are possible. In some example arrangements depicted, the optional second radially directed seal surface is a radially outwardly directed radial seal surface, for example around an outer perimeter of the first end cap. Alternatives are possible.

In some example arrangements depicted, the first end piece includes a receiving groove therein; and, the first seal surface comprises a sidewall or surface portion of the receiving groove. Typically, the receiving groove is at least 5 mm deep from a nearest adjacent axial end surface of the first end piece, usually at least 8 mm deep and typically an amount within the range of 10-25 mm deep, from a nearest adjacent outer axial end surface of the first end piece.

Typically, the receiving groove has opposite inner and outer sidewall sections spaced at least 3 mm apart, usually at least 4 mm apart. In the embodiment of FIGS. 1-32 they are spaced typically not more than 15 mm apart, at a location within a deepest 30% of the receiving groove and usually at a location with a deepest 35% of the receiving groove. The very bottom most part of the receiving groove, however, may involve a tapering of the sidewalls together somewhat. In alternate applications, the seal groove may vary in width, around a non-circular seal surface.

Typically, for the embodiment of FIGS. 1-32 described, the receiving groove has opposite inner and outer sidewall sections spaced apart no more than 15 mm at some location in a deepest 30% of the groove, typically spaced no more than 15 mm at same location in a deepest 35% of the receiving groove.

Typically, the receiving groove has a cross-section with an outward flare or outwardly opening outer end sections adjacent an outer end surface of the first end piece, with a maximum opening width of at least 5 mm, typically at least 7 mm and often substantially more.

In example arrangements depicted, the first end piece has a first seal support embedded therein, which provides a support to the first radial seal. Typically, the first seal support is a relatively stiff construction and is positioned no further than 20 mm from the first seal surface, when the cartridge is undistorted. Typically, it is no more than 15 mm from the first seal surface, when the cartridge is undistorted by installation. Also, typically the material between the first seal surface and the first seal support is configured to distort (compress) at least 10% toward the first seal support during installation, usually at least 15%, typically an amount within the range of 15-35% inclusive, and, most often, an amount within the range of 20-30%, inclusive.

The first end cap piece optionally be provided a second seal support embedded therein positioned no more than 10 mm, typically no more than 8 mm from the optional second seal surface of the second seal arrangement. Typically, when used, the second seal arrangement is configured to distort (compress) a surface portion thereof, maximally, at least 3%, typically at least 5%, and often an amount within the range of 5-20%, inclusive, in compression toward the optional second seal support, in installation.

In an example, when used the second seal surface includes a surface portion that extends axially toward the second end of the media, at least 2 mm further, usually at least 4 mm further, than the deepest portion of the receiving groove and/or any portion of the first seal surface.

Herein above, arrangements are described with two radial seals, an inner and radially outer perimeter seal, in which one of the radial seals is on a portion of the end piece that has a greater maximum axial reach maximum extension away from a second or remote end of the media, than does the other. This can provide different advantages described, depending on which is longer.

Example arrangements are depicted in which an optional resonator/sonic choke arrangement (or sonic choke/resonator) is provided. The resonator/sonic choke includes a first end embedded in the first end piece, a central throat, a transition region and a perforate end region adjacent an opposite end of the resonator/sonic choke from the first end cap. The transition region extends between the central throat and the perforate end region, and preferably includes a sidewall section, with an outwardly directed concave region and an outwardly directed convex region. The outwardly directed concave region or section is typically adjacent the central throat and the outwardly directed convex section or region is typically adjacent the liner section. The outwardly directed convex section is typically at least 40% and usually at least 50% open and sometimes 60% or more open. By open in this context, reference is meant to aperture open area as a % of perimeter area.

The outwardly directed concave region has a surface radius that is typically of at least 25 mm and often an amount within the rage of 26-35 mm, inclusive.

The central throat typically has an internal diameter of at least 25 mm and usually within the range of 27-35 mm, inclusive.

The resonator/sonic choke (or sonic choke/resonator) includes a funnel section expanding in width in extension between the throat and the first end piece. Usually, the funnel section has a funnel angle of at least 5°, typically an amount within the range of 6–8°, inclusive.

Example filter cartridges are depicted in which a seal support structure comprises a perform embedded in the first end piece, with a seal support structure including: a central hub; and, a strut arrangement secured to the central hub extending radially outwardly thereon. The strut arrangement can extend to an optional outer ring, to form an open grid arrangement. In examples depicted the struts extend at an axial angle of at least 0.5°, typically at least 1° and often an amount within the range of 1–3°, inclusive, in a direction away from the media (or the second end cap or a plane perpendicular to the cartridge central axis) as the strut extends in extension away from the hub, for example toward the outer ring is used. The hub may comprise a circular seal support or non-circular seal support; examples of each being depicted.

Typically, the outer support, when used, includes a seal support region extending over an axial length of 5-15 mm, inclusive, although alternatives are possible.

In an example depicted, the central hub includes a base region adjacent the media with a resin flow aperture arrangement therethrough. In an example depicted, the support structure includes a central ring surrounded by, and spaced from, the central base region; the central region forming a trough with a central hub, with communication into the trough provided by the aperture arrangement in the base region of the central hub.

Principles of the present invention can be applied in a variety of filter cartridges using selected ones or alternate features to those characterized above. As an example characterization, according to the present disclosure, an air filter cartridge is provided that includes media, for example as previously characterized; and, a first end piece molded-in-place, the first end piece having an outer perimeter surface defining a housing seal arrangement. The first end piece preferably includes a groove therein having a depth of at least 5 mm, and may include one or more features as previously described for a receiving groove. For example, a portion of a sidewall surface of the groove can be a housing seal surface.

According to the present disclosure, another aspect of an advantageous filter cartridge can be characterized as follows. The filter cartridge can include media, for example with first and second ends, and, for example, surrounding and defining an open filter interior. A first end piece can be molded-in-place and can have the media first end secured thereto, for example embedded therein; and, the first end cap can have first and second radially directed seal surfaces. The seal support structure is embedded in the first end piece and includes a first seal support ring embedded in the first end cap at a location adjacent to, and spaced from, the first seal surface, to operably provide back-up to material forming the first seal surface, to control compression. An optional second seal support ring can be positioned surrounding and spaced from the first seal support ring; the second seal support ring being embedded in the first end cap at a location adjacent to, and spaced from, the second seal surface an amount sufficient to provide control of compression of seal material that forms the second seal surface.

With such an arrangement, an example is depicted in which the first seal surface is a radially outwardly directed seal surface, although alternatives are possible. Also, in an example depicted, the second seal surface is a radially outwardly directed seal surface, and can be a perimeter surface.

In an example depicted, the first seal surface is a sidewall surface of a groove positioned in the first end cap.

Various ones of the features previously characterized can be used with this aspect of this disclosure.

In another aspect of the present disclosure, a filter cartridge is provided having an optional support surrounded by the media, the support including an optional resonator and/or sonic choke configuration therein, as generally defined and discussed above. This aspect can optionally be used with various features of the first end cap and seal arrangement as discussed or in other air filter arrangements.

Herein, embodiments are described, in which the principles of the present disclosure can be applied in a cartridge having a straight through flow construction, i.e. a cartridge in which the media is configured for filtering as air passes from an inlet end to an opposite outlet end of the media pack. An example media pack is described in which the media comprises a plurality of flutes extending between opposite ends of the media pack, a set of inlet flutes being open adjacent the inlet end and closed adjacent the outlet end, and a set of outlet flutes being closed adjacent the inlet end and open the adjacent outlet end.

Also according to the present disclosure, filter (for example (air or gas) cleaner assemblies are described. The filter (for example air cleaner or gas) assemblies will generally comprise a housing having a (air or gas) flow inlet and an (air or gas) flow outlet. A filter cartridge having selected features as characterized above is operably and removably positioned within the housing.

In an example depicted and described, the housing comprises a body section having a flow tube secured thereto, with a joint between the housing body section and the flow tube; and, a first end cap of an (air or gas) filter cartridge installed in the housing includes an end groove therein into which a portion of the joint between the housing body section of the flow tube projects. In an example depicted, the filter cartridge is removably sealed to the flow tube by a radial seal positioned along a sidewall of the groove. Specific examples are described in which the radial seal is an outwardly directed radial seal. In one example, the seal is circular. In other example, the seal is non-circular.

In an example depicted, the air flow cartridge is not sealed to the body section other than the flow tube, by any portion of the first end cap positioned in the groove. Rather, the first end cap includes an outer perimeter radial seal that is removably secured to a surrounding portion of the body section.

Such configurations can advantageously isolate a joint in the housing, between a cartridge seal against the flow tube and a cartridge seal against the housing sidewall, to advantage.

The principles described herein can be applied in a variety of filter assemblies. Examples are described in which the principles applied to (air) gas filter assemblies. Examples are described include air filters and crankcase ventilation filter assemblies. The principles can be applied to a variety of alternate gas filtration arrangements, in some instances even with liquid filter assemblies.

Again, the principles, techniques, and features described herein can be applied in a variety of systems, and there is no requirement that all of the advantageous features identified be incorporated in an assembly, system or component to obtain some benefit according to the present disclosure.

B. Additional Characterizations

1. A filter cartridge comprising: (a) media having first and second ends; the media surrounding and defining a central open interior; (b) a first piece positioned at the first end of the media; (i) the first piece having a central air flow aperture arrangement therethrough; (c) a second, closed, end piece positioned at the second end of the media; and, (d) a housing seal arrangement positioned on the first end piece; the housing seal arrangement comprising: (i) a first, radially directed, seal surface defining a non-circular configuration, in extension around the central air flow aperture arrangement;

(A) the non-circular configuration comprising at least three radially projecting sections, to define a plurality of spaced radially projecting lobes, separated by recesses, in the seal surface as the seal surface extends around the air flow aperture.

2. A filter cartridge according to characterization 1 wherein: (a) the first, radially directed, seal is a radially outwardly directed seal surface.

3. A filter cartridge according to characterization 1 wherein: (a) the housing seal arrangement includes a second, radially directed, seal surface defining a non-circular configuration, in extension around the central air flow aperture arrangement; (i) the second, radially directed, seal surface having a non-circular configuration comprising at least three radially projecting sections to define a plurality of spaced radially projecting lobes in the second seal surface, as the second seal surface extends around the air flow aperture.

4. A filter cartridge according to characterization 3 wherein: (a) the first seal section and second seal surface comprise opposite, radially directed, sides of a seal projection that undulates along a path around the central air flow aperture arrangement.

5. An air filter cartridge according to claim 1 wherein: (a) the first seal surface comprises 4-12, inclusive, radially projecting lobes.

6. An air filter cartridge according to characterization 1 wherein: (a) the first seal surface comprises one of two radially oppositely directed surfaces of a central seal projection; (i) a radially directed surface, opposite the first seal surface, being generally circular in extension around the central air flow aperture arrangement.

7. An air filter cartridge according to characterization 1 wherein: (a) the media defines an inner media perimeter and an outer media perimeter; and, (b) the first seal surface extends toward a first seal surface central axis; (i) the first seal surface being positioned, in axial overlap with the first end of the media, at a location with tips of the lobes thereon spaced: at least 5% of a distance across the first media end from the inner media perimeter to the outer media perimeter; and, at least 5% of a distance across the first media end from the outer media perimeter to the inner media perimeter.

8. An air filter cartridge according to characterization 1 wherein: (a) the media defines an inner media perimeter and an outer media perimeter; and, (b) the first seal surface extends toward a first seal surface central axis; (i) the first seal surface being positioned, in axial overlap with the first end of the media, at a location with tips of the lobes thereon spaced: at least 15% of a distance across the first media end from the inner media perimeter to the outer media perimeter; and, at least 15% of a distance across the first media end from the outer media perimeter to the inner media perimeter.

9. An air filter cartridge according to characterization 1 wherein: (a) the media defines an inner media perimeter and an outer media perimeter; and, (b) the first seal surface extends toward a first seal surface central axis; (i) the first seal surface being positioned, in axial overlap with the first end of the media, at a location with tips of the lobes thereon positioned: at least 20% of a distance across the first media end from the inner media perimeter to the outer media perimeter; and, at least 20% of a distance across the first media end from the outer media perimeter to the inner media perimeter.

10. An air filter cartridge according to characterization 1 wherein: (a) the housing seal arrangement includes a second seal surface spaced from the first seal surface with a groove therebetween.

11. An air filter cartridge according to characterization 10 wherein: (a) each one of the first seal surface and second seal surface is radially, outwardly, directed.

12. An air filter cartridge according to characterization 11 wherein: (a) the second radially directed surface defines a circular configuration in extension around the central aperture.

13. A filter cartridge according to characterization 1 wherein: (a) the media is cylindrical in extension around a central cartridge axis.

14. A filter cartridge according to characterization 1 wherein: (a) the media is conical in extension around a central cartridge axis.

15. A filter cartridge according to characterization 1 wherein: (a) the media is pleated.

16. A filter cartridge according to characterization 1 wherein: (a) the housing seal arrangement comprises molded-in-place seal material having an undulating seal support positioned therein.

17. An air filter cartridge according to characterization 1 wherein: (a) each one of the spaced radially projecting lobes has a first perimeter radius; and, (b) the lobes are spaced from one another by a recess section of a second perimeter radius; (i) wherein the first perimeter radius is larger than the second perimeter radius.

18. An air filter cartridge according to characterization 1 wherein: (a) each one of the spaced radially projecting lobes has a first perimeter radius; and, (b) the lobes are spaced from one another by a recess section of a second perimeter radius; (i) wherein the first perimeter radius is smaller than the second perimeter radius.

19. An air filter cartridge according to characterization 18 wherein: (a) each one of the spaced radially projecting lobes has a first perimeter radius; and, (b) the lobes are spaced from one another by a recess section of a second perimeter radius; (i) wherein the first perimeter radius is less than one-half of than the second perimeter radius.

20. A filter cartridge according to characterization 1 wherein: (a) the media is distorted from cylindrical, such that it generally extends around a central cartridge axis that extends at an acute angle relative to a central axis of the central air flow aperture arrangement.

What is claimed:

1. A filter cartridge comprising:

(a) filter media having first and second ends; the filter media surrounding and defining a central open interior;

(b) a first end piece positioned at the first end of the filter media and a second end piece positioned at the second end of the filter media;

the first end piece having an aperture therethrough; and (ii) the first end piece having a projection arrangement extending axially from the first end piece in a direction away from the second end piece;

(A) the projection arrangement extending continuously about the aperture;

(B) the projection arrangement having a radially inwardly directed surface and a radially outwardly directed surface;

(C) the radially inwardly directed surface comprising at least three radially projecting sections, to define a plurality of spaced radially projecting sections, separated by recesses, in the radially inwardly directed surface in a direction around the aperture;

(D) the radially outwardly directed surface comprising at least three radially projecting sections, to define a plurality of spaced radially projecting sections, separated by recesses, in the radially outwardly directed surface in a direction around the aperture;

(E) the radially inwardly directed surface and the radially outwardly directed surface being positioned on opposite sides of the projection arrangement; and (F) at least one of the radially inwardly directed surface or the radially outwardly directed surface is a radially directed seal surface.

2. A filter cartridge according to claim 1 wherein:

(a) the filter media is cylindrical in extension around a central cartridge axis.

3. A filter cartridge according to claim 1 wherein:

(a) the filter media is conical in extension around a central cartridge axis.

4. A filter cartridge according to claim 1 wherein:

(a) the filter media is pleated filter media.

5. A filter cartridge according to claim 4 wherein:

(a) the pleated filter media comprises spacers formed by corrugations in the pleated filter media.

6. A filter cartridge according to claim 4 wherein:

(a) the pleated filter media comprises spacers formed by folds in the pleated filter media.

7. A filter cartridge according to claim 4 wherein:

(a) the pleated filter media includes outer pleat tips having an adhesive bead therearound.

8. A filter cartridge according to claim 1 wherein:

(a) the first and second end pieces have centers eccentrically positioned with respect to one another.

9. A filter cartridge according to claim 1 wherein:

(a) in each one of the radially inwardly directed surface and the radially outwardly directed surface, the radially projection sections are spaced from axial overlap with each of an innermost perimeter and an outermost perimeter of the filter media.

10. A filter cartridge according to claim 1 wherein:

(a) in the radially outwardly directed surface, a radius of the radially projection sections is larger than a radius of the recesses.

11. A filter cartridge according to claim 10 wherein:

(a) in the radially outwardly directed surface, the radius of the radially projection sections is at least two time larger than the radius of the recesses.

12. A filter cartridge according to claim 10 wherein:

(a) in the radially outwardly directed surface, the radius of the radially projection sections is 3 to 7 times larger than the radius of the recesses.

13. A filter cartridge according to claim 1 wherein:

(a) in the radially inwardly directed surface, a radius of the radially projection sections is larger than a radius of the recesses.

14. A filter cartridge according to claim 1 wherein:

(a) the radially projection sections in the radially outwardly directed surface and in the radially inwardly directed surface each have a circular radius; and, (b) the recesses in the radially outwardly directed surface and in the radially inwardly directed surface each have a circular radius;

(i) radii of the radially projection sections in the radially outwardly directed surface each being larger than radii of the recesses in the radially outwardly directed surface; and (ii) radii of the radially projection sections in the radially inwardly directed surface each being larger than radii of the recesses in the radially outwardly directed surface.

15. A filter cartridge according to claim 1 wherein:

(a) the radially projection sections in the outwardly directed surface are radially evenly spaced around an axis.

16. A filter cartridge according to claim 1 wherein:

(a) the projection arrangement comprises an axially extending support and a compressible material.

17. A filter cartridge according to claim 16 wherein:

(a) the compressible material is molded onto the axially extending support.

18. A filter cartridge according to claim 16 wherein:

(a) the axially extending support is embedded in the compressible material.

19. A filter cartridge according to claim 16 wherein:

(a) the compressible material is configured to compress at least 10% between the radially outwardly directed surface and the axially extending support.

20. A filter cartridge according to claim 16 wherein:

(a) the compressible material is configured to compress 20-30%, inclusive, between the radially outwardly directed surface and the axially extending support.

21. A filter cartridge according to claim 16 wherein:

(a) the axially extending support is located no greater than 20 mm from the radially outwardly directed surface.

22. A filter cartridge according to claim 16 wherein:

(a) the axially extending support is located about 5-14 mm from the radially outwardly directed surface.

23. A filter cartridge according to claim 16 wherein:

(a) the compressible material is configured to compress at least 10% between the radially inwardly directed surface and the axially extending support.

24. A filter cartridge according to claim 16 wherein:

(a) the axially extending support is a preform formed from molded plastic.

25. A filter cartridge according to claim 24 wherein:

(a) the axially extending support is secured to a structure than extends toward the second end piece.

26. A filter cartridge according to claim 25 wherein:

(a) the structure that extend toward the second end piece extends completely from the first end piece to the second end piece, and supports the filter media.

27. A filter cartridge according to claim 1 wherein:

(a) the second end piece comprises a closed end cap.

28. A filter cartridge according to claim 27 wherein:

(a) the closed end cap is a molded-in-place end cap.

29. A filter cartridge according to claim 1 wherein:

(a) the aperture in the first end piece is an outlet.

30. A filter cartridge according to claim 29 wherein:

(a) the outlet is located radially inwardly from the radially inwardly directed surface.

31. A filter cartridge comprising:

(a) filter media having first and second ends and a central cartridge axis extending through the first and second ends;

(i) the filter media surrounding and defining a central open interior; and (ii) the filter media comprising pleated media; and (b) a first end piece positioned at the first end of the filter media;

(i) the first end piece having an outlet aperture therethrough; and (ii) the first end piece having a projection arrangement extending axially in a direction of the central cartridge axis from the first end piece in a direction away from the filter media second end;

(A) the projection arrangement extending continuously about the aperture;

(B) the projection arrangement having a radially inwardly directed surface and a radially outwardly directed surface;

(C) the radially inwardly directed surface comprising at least two radially projecting sections, to define a plurality of spaced radial projections, separated by at least one recess, in the radially inwardly directed surface in a direction around the aperture;

(D) the radially outwardly directed surface comprising at least two radially projecting sections, to define a plurality of spaced radial projections, separated by at least one recess, in the radially outwardly directed surface in a direction around the aperture;

(E) the radially inwardly directed surface and the radially outwardly directed surface being positioned on opposite sides of the projection arrangement; and (F) at least one of the radially inwardly directed surface or the radially outwardly directed surface is a radially directed seal surface.

32. A filter cartridge according to claim 31 wherein:

(a) the projection arrangement comprises an axially extending support and a compressible material.

33. A filter cartridge according to claim 32 wherein:

(a) the axially extending support is a preform formed from molded plastic.

34. A filter cartridge according to claim 32 wherein:

(a) the axially extending support is secured to a structure than extends toward the second end piece.

35. A filter cartridge according to claim 34 wherein:

(a) the structure that extend toward the second end piece extends completely from the first end piece to the second end piece, and supports the filter media.

36. A filter cartridge according to claim 31 further comprising:

(a) a second end piece positioned on the second end of the filter media and comprising a closed end cap.

37. A filter cartridge according to claim 36 wherein:

(a) the closed end cap is a molded-in-place end cap.

* * * * *